US011146771B2

(12) United States Patent
Ikeda et al.

(10) Patent No.: US 11,146,771 B2
(45) Date of Patent: Oct. 12, 2021

(54) DISPLAY CONTROL DEVICE, DISPLAY CONTROL METHOD, AND PROGRAM

(71) Applicant: SONY CORPORATION, Tokyo (JP)

(72) Inventors: Tetsuo Ikeda, Tokyo (JP); Takayuki Sakamoto, Kanagawa (JP); Tomohiro Ishii, Tokyo (JP); Atsushi Izumihara, Kanagawa (JP); Masayuki Yamada, Tokyo (JP); Yohei Fukuma, Chiba (JP); Yuzuru Kimura, Kanagawa (JP); Yasushi Okumura, Tokyo (JP); Takashi Shibuya, Tokyo (JP); Katsuya Hyodo, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/106,641

(22) PCT Filed: Sep. 2, 2014

(86) PCT No.: PCT/JP2014/073106

§ 371 (c)(1),
(2) Date: Jun. 20, 2016

(87) PCT Pub. No.: WO2015/098189

PCT Pub. Date: Jul. 2, 2015

(65) Prior Publication Data

US 2017/0031530 A1 Feb. 2, 2017

(30) Foreign Application Priority Data

Dec. 27, 2013 (JP) ............................ JP2013-273369

(51) Int. Cl.

| | |
|---|---|
| ***H04N 9/31*** | (2006.01) |
| ***G06F 3/042*** | (2006.01) |

(Continued)

(52) U.S. Cl.
CPC ........... *H04N 9/3194* (2013.01); *G03B 17/54* (2013.01); *G06F 3/0425* (2013.01);
(Continued)

(58) Field of Classification Search
CPC .. H04N 9/3194; H04N 9/3155; H04N 9/3179; H04N 9/3182; H04N 5/74;
(Continued)

(56) References Cited

U.S. PATENT DOCUMENTS 8,643,703 B1 * 2/2014 Karakotsios .............. G06F 3/14 345/156
2005/0108655 A1 * 5/2005 Andrea .................. G06F 9/451 715/798

(Continued)

FOREIGN PATENT DOCUMENTS

CN 102165394 A 8/2011
CN 102263577 A 11/2011

(Continued)

OTHER PUBLICATIONS

Sep. 22, 2017 EP communication issued for related EP application No. 14874868.4.

(Continued)

*Primary Examiner* — Stephen G Sherman
(74) *Attorney, Agent, or Firm* — Paratus Law Group, PLLC

(57) ABSTRACT

There is provided a display control device, display control method, and program capable of executing control such that information can be displayed more appropriately and efficiently according to an environment in which information is displayed or a situation of displayed information, the display control device including: a display control unit configured to decide a display region of a display object to be displayed on (Continued)

a display surface according to information regarding a real object on the display surface.

14 Claims, 291 Drawing Sheets

(51) Int. Cl.

| | |
|---|---|
| ***H04N 5/74*** | (2006.01) |
| ***G03B 17/54*** | (2021.01) |
| ***H04R 29/00*** | (2006.01) |
| ***H04S 7/00*** | (2006.01) |
| ***G06F 3/0483*** | (2013.01) |
| ***G06F 3/0481*** | (2013.01) |
| ***G06K 9/00*** | (2006.01) |
| ***G06F 3/0487*** | (2013.01) |
| ***G06F 3/0488*** | (2013.01) |
| ***G06F 3/0482*** | (2013.01) |
| ***G06F 3/16*** | (2006.01) |
| ***G09G 5/36*** | (2006.01) |
| ***G09G 5/377*** | (2006.01) |
| *G06F 3/0484* | (2013.01) |

(52) U.S. Cl.
CPC .......... *G06F 3/0481* (2013.01); *G06F 3/0482* (2013.01); *G06F 3/0483* (2013.01); *G06F 3/0487* (2013.01); *G06F 3/04883* (2013.01); *G06F 3/04886* (2013.01); *G06F 3/167* (2013.01); *G06K 9/00355* (2013.01); *G09G 5/363* (2013.01); *G09G 5/377* (2013.01); *H04N 5/74* (2013.01); *H04N 9/3155* (2013.01); *H04N 9/3179* (2013.01); *H04N 9/3182* (2013.01); *H04R 29/005* (2013.01); *H04R 29/008* (2013.01); *H04S 7/40* (2013.01); *G06F 3/0428* (2013.01); *G06F 3/04845* (2013.01); *G06F 2203/04101* (2013.01); *G06F 2203/04808* (2013.01); *G09G 2354/00* (2013.01); *H04R 2201/40* (2013.01); *H04R 2430/01* (2013.01)

(58) Field of Classification Search
CPC .... G03B 17/54; G06K 9/00355; G09G 5/363; G09G 5/377; G09G 2354/00; H04R 29/005; H04R 29/008; H04R 2201/40; H04R 2430/01; H04S 7/40; G06F 3/0428; G06F 3/04845; G06F 3/167; G06F 3/04886; G06F 3/0425; G06F 3/0481; G06F 3/0482; G06F 3/0483; G06F 3/0487; G06F 3/04883; G06F 2203/04101; G06F 2203/04808
See application file for complete search history.

(56) References Cited

U.S. PATENT DOCUMENTS

| | | | | |
|---|---|---|---|---|
| 2007/0300182 | A1* | 12/2007 | Bilow | G06F 3/0488 715/799 |
| 2008/0154922 | A1 | 6/2008 | Arai | |
| 2010/0079369 | A1* | 4/2010 | Hartmann | G06F 3/0416 345/156 |
| 2011/0294433 | A1* | 12/2011 | Matsubara | H04M 1/7253 455/41.3 |
| 2012/0076353 | A1 | 3/2012 | Large | |
| 2012/0249741 | A1* | 10/2012 | Maciocci | G06F 3/011 348/46 |
| 2012/0284619 | A1 | 11/2012 | Myllyla et al. | |
| 2013/0057588 | A1* | 3/2013 | Leonard | G06F 3/04845 345/660 |
| 2013/0093708 | A1* | 4/2013 | Annett | G06F 3/041 345/173 |
| 2013/0343601 | A1 | 12/2013 | Jia et al. | |
| 2014/0240357 | A1* | 8/2014 | Hou | G09G 5/373 345/647 |
| 2015/0042556 | A1* | 2/2015 | Tao | G06F 3/012 345/156 |

FOREIGN PATENT DOCUMENTS

| | | | |
|---|---|---|---|
| CN | 102668601 | A | 9/2012 |
| CN | 103092344 | A | 5/2013 |
| JP | H05-107638 | A | 4/1993 |
| JP | 2004-233845 | A | 8/2004 |
| JP | 2005-317032 | A | 11/2005 |
| JP | 2006-072071 | A | 3/2006 |
| JP | 2006-178205 | A | 7/2006 |
| JP | 2006-287735 | A | 10/2006 |
| JP | 2007-036482 | A | 2/2007 |
| JP | 2007-282077 | A | 10/2007 |
| JP | 2008-033049 | A | 2/2008 |
| JP | 2008-037419 | A | 2/2008 |
| JP | 2008-158631 | A | 7/2008 |
| JP | 2009-025921 | A | 2/2009 |
| JP | 2010-033604 | A | 2/2010 |
| JP | 2010-113455 | A | 5/2010 |
| JP | 2011-040227 | A | 2/2011 |
| JP | 2011-227199 | A | 11/2011 |
| JP | 2012-058704 | A | 3/2012 |
| JP | 2012-513047 | A | 6/2012 |
| JP | 2013-518383 | A | 5/2013 |
| JP | 2013-182624 | A | 9/2013 |
| JP | 2013-214259 | A | 10/2013 |
| JP | 2013-235416 | A | 11/2013 |

OTHER PUBLICATIONS

Oct. 17, 2017, EP communication issued for related EP application No. 14873382.7.
Oct. 23, 2017, EP communication issued for related EP application No. 14874038.4.
May 22, 2017, CN communication issued for related CN application No. 201480069947.6.
Jun. 29, 2017, EP communication issued for related EP application No. 14873569.9.
May 8, 2018, Japanese Office Action issued for related JP Application No. 2015-554600.
Jun. 12, 2018, Japanese Office Action issued for related JP Application No. 2015-554598.
Aug. 3, 2018, Chinese Office Action issued for related CN application No. 201480069948.0.
Jan. 25, 2018, Chinese Office Action issued for related CN application No. 201480069947.6.
Oct. 23, 2018, Japanese Office Action issued for related JP Application No. 2015-554597.
Oct. 9, 2018, Japanese Office Action issued for related JP Application No. 2015-554599.
Nov. 1, 2018, Chinese Office Action issued for related CN application No. 201480070024.2.
Nov. 8, 2018, Chinese Office Action issued for related CN application No. 201480070025.7.
Jan. 8, 2019, Japanese Office Action issued for related JP Application No. 2015-554600.
Apr. 3, 2019, Chinese Office Action issued for related CN Application No. 201480070025.7.
May 7, 2019, Japanese Office Action issued for related JP Application No. 2015-554597.
Dec. 3, 2019, Japanese Office Action issued for related JP Application No. 2015-554597.
Apr. 7, 2020, Japanese Office Action issued for related JP application No. 2019-129657.

* cited by examiner

FIG. 116
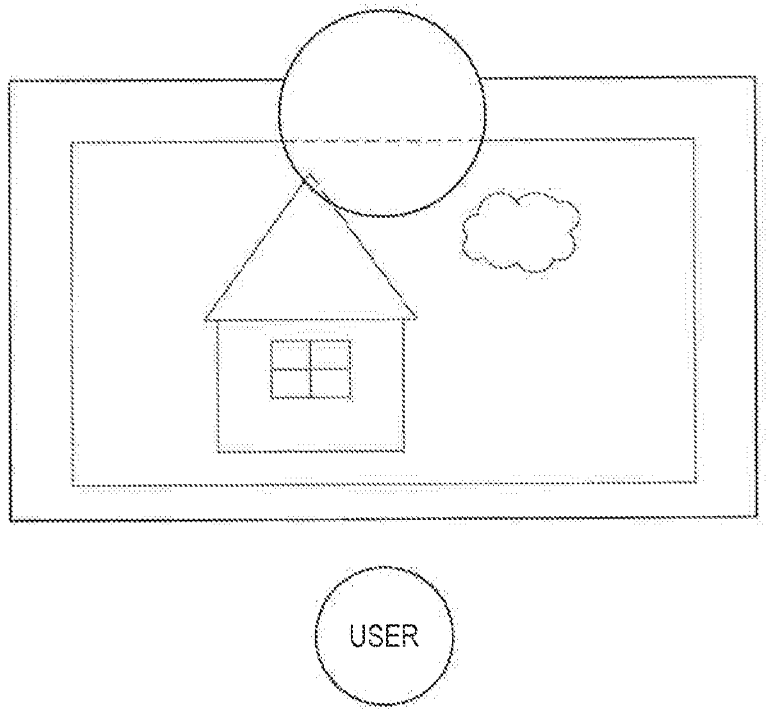
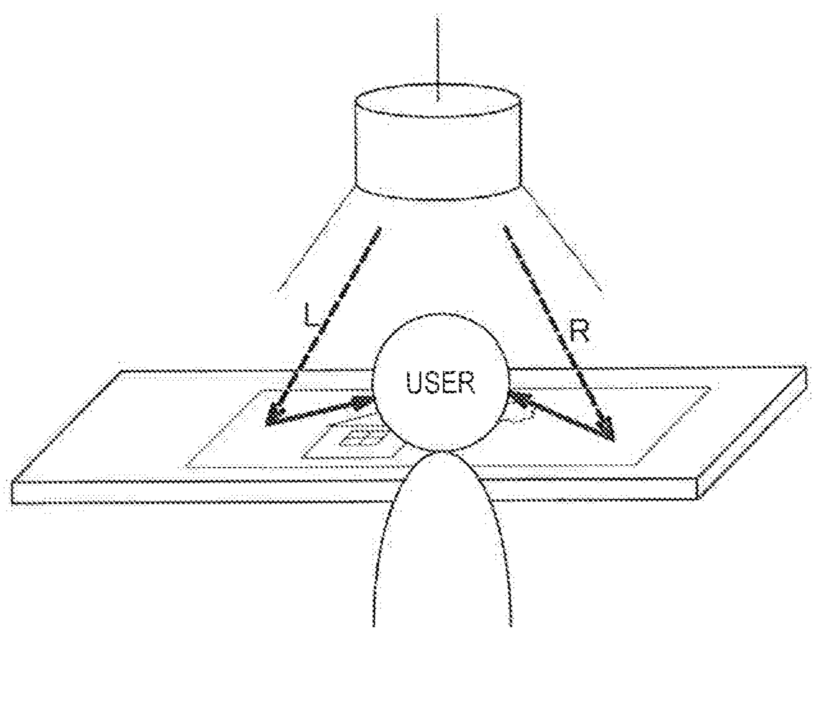

FIG. 152

| APPLICATION | CONTENT | BRIGHTNESS | NOTIFICATION |
|---|---|---|---|
| CINEMA MOVING IMAGE PLAYER | APPLICATION DARKENING TO REPRESENT IMMERSION IN MOVIE | 0 | UNNECESSARY |
| CHILD MOVING IMAGE PLAYER | APPLICATION BRIGHTENING BECAUSE CHILD IS NOT ALLOWED TO VIEW ANIMATION OR LIKE IN DARK PLACE | 80 | NECESSARY |
| CANDLE APPLICATION | APPLICATION PROJECTING CANDLE TO TABLE | 20 | NECESSARY |
| PROJECTION MAPPING APPLICATION | APPLICATION PROJECTING VIDEO TO INSIDE OF ROOM OR OBJECT | 0 | UNNECESSARY |
| GLOBE APPLICATION | APPLICATION PROJECTING GLOBE TO HEMISPHERE | 0 | NECESSARY |
| SCREEN RECOGNITION APPLICATION OF MOBILE TERMINAL | APPLICATION RECOGNIZING SCREEN (LUMINESCENT OBJECT) OF MOBILE TERMINAL<br>SCREEN IS WHITENED DEPENDING ON DYNAMIC RANGE OF RECOGNITION CAMERA WHEN FULLY DARKENED<br>SLIGHTLY DARKEN FOR PURPOSE OF REDUCING HIGHLIGHT SO THAT LUMINESCENT SCREEN IS EASILY RECOGNIZABLE | 30 | UNNECESSARY |
| FOOD PACKAGE RECOGNITION APPLICATION | APP RECOGNIZING FOOD PACKAGE (REFLECTOR)<br>BRIGHTEN SO THAT PACKAGE WHICH IS REFLECTOR IS EASILY RECOGNIZABLE | 100 | UNNECESSARY |
| GENERAL OBJECT RECOGNITION APPLICATION | APP CARRYING OUT RECOGNITION WITHOUT DISTINCTION BETWEEN LUMINESCENT OBJECT AND REFLECTOR<br>BRIGHTEN HALF BECAUSE WHAT IS PLACED ON PROJECTION SURFACE IS NOT KNOWN | 50 | UNNECESSARY |

FIG. 158
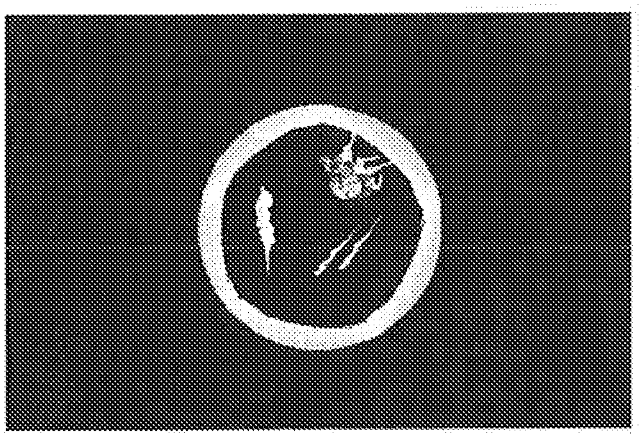
(a)
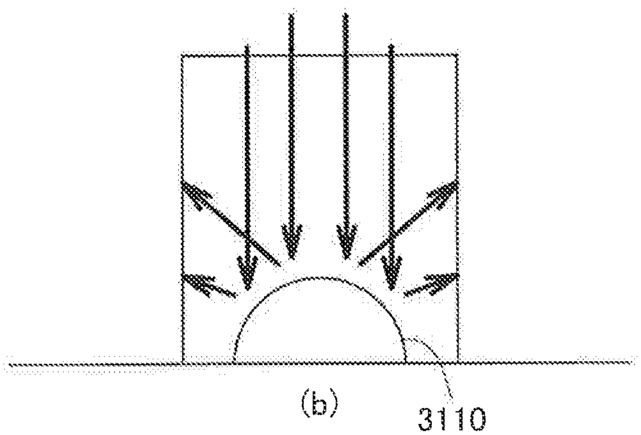
(b)
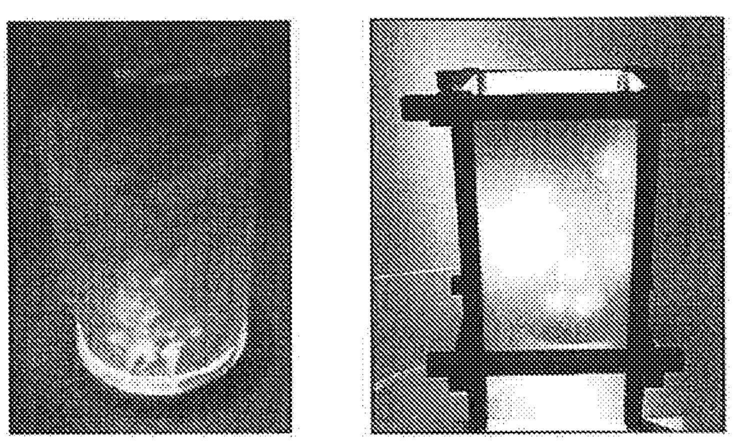
(c)

FIG. 159
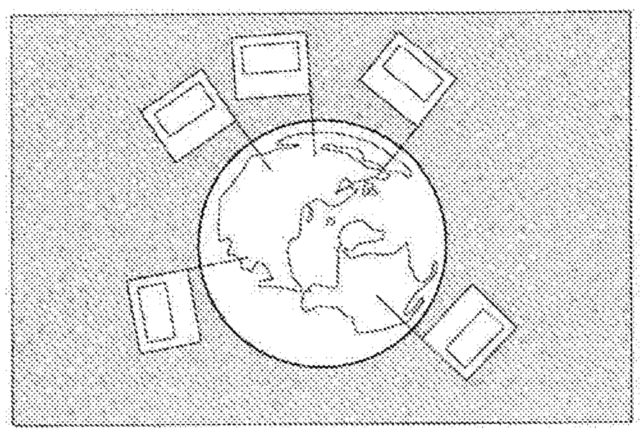
(a)
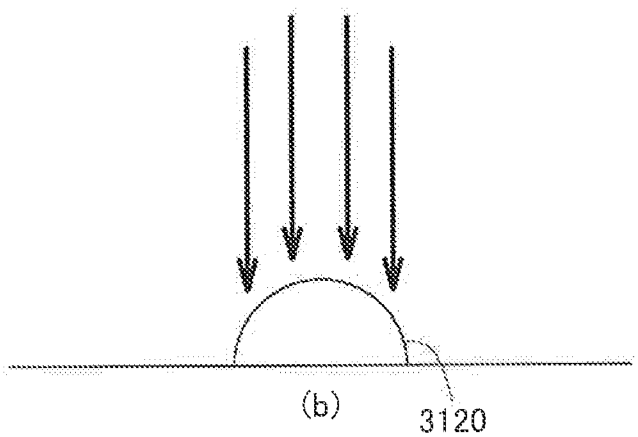
(b)
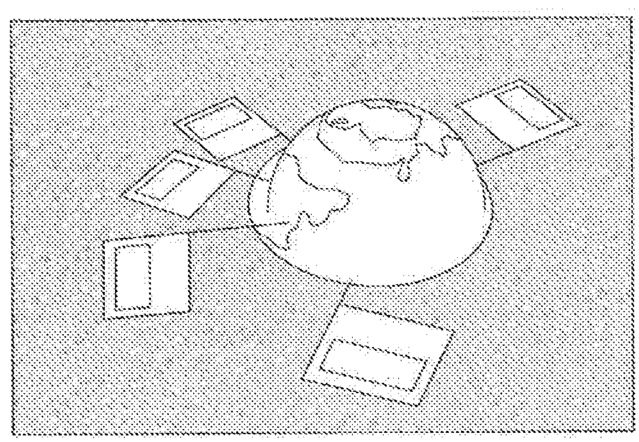
(b)

FIG. 161
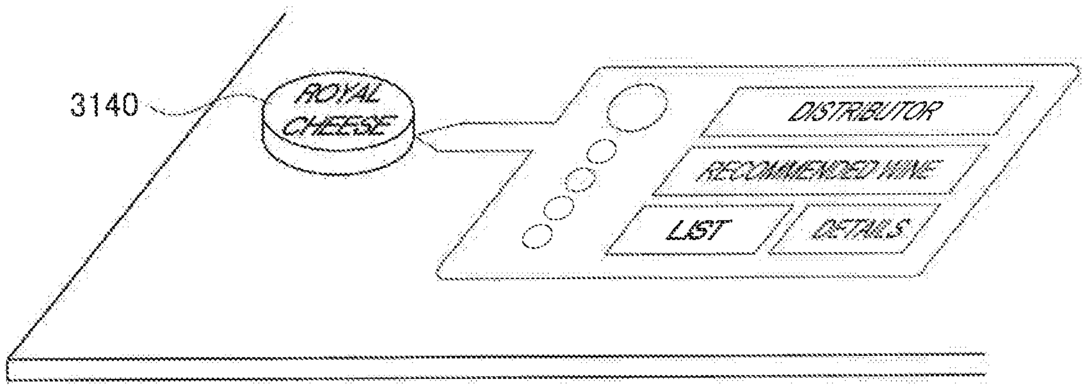
(a)
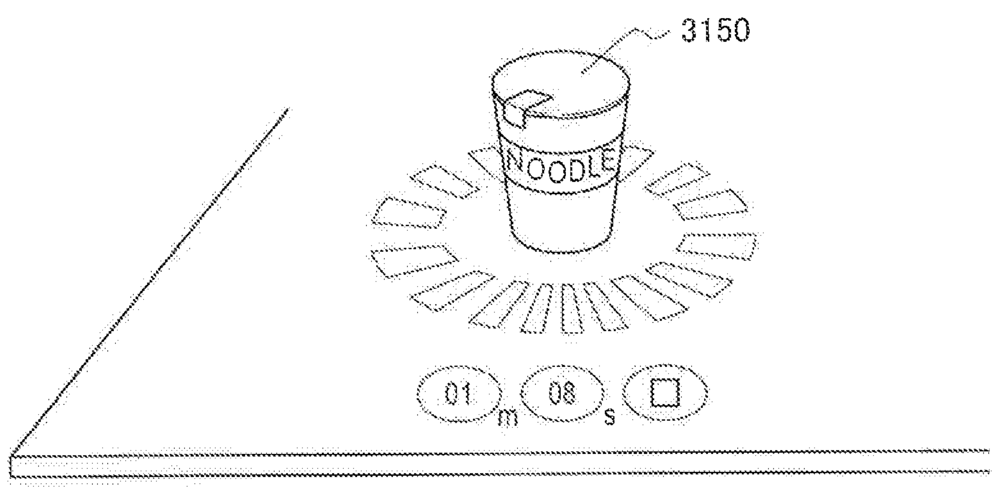
(b)

(a)

(b)

3200

3200

3200

3200

3200

3200

3200

FIG. 191
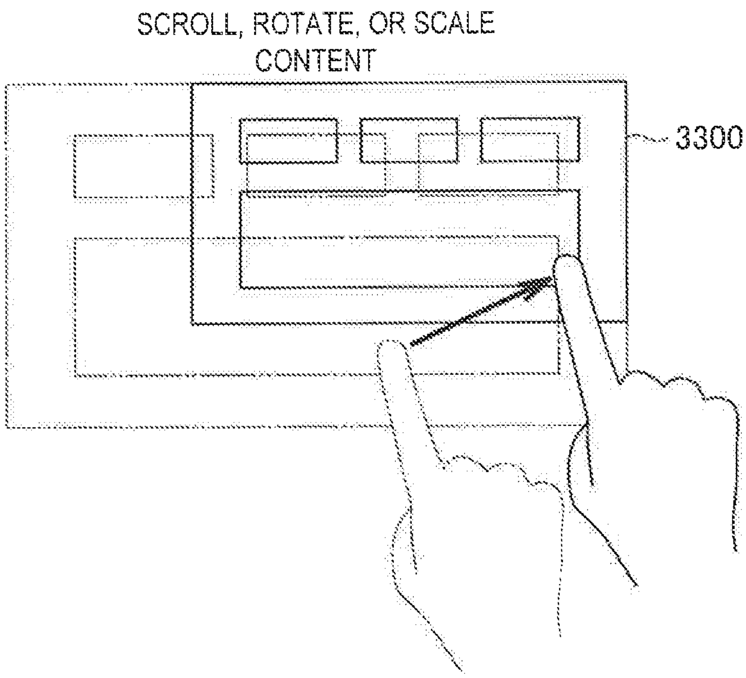
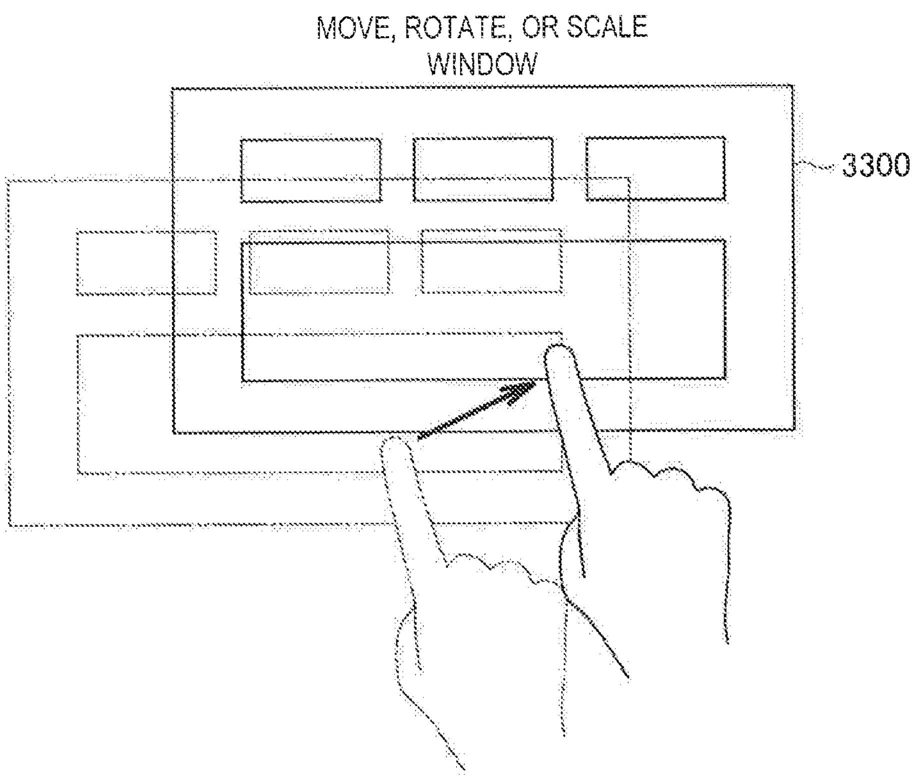

FIG. 193
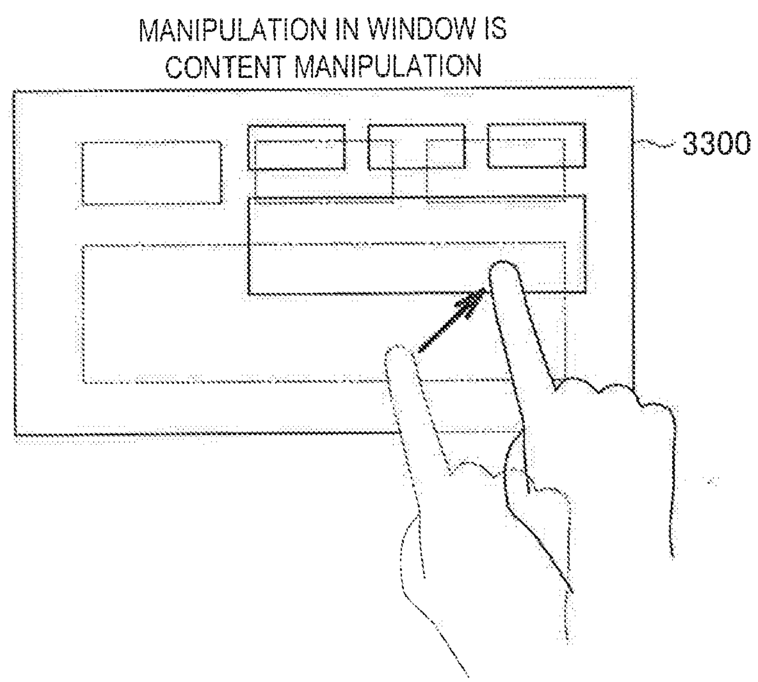
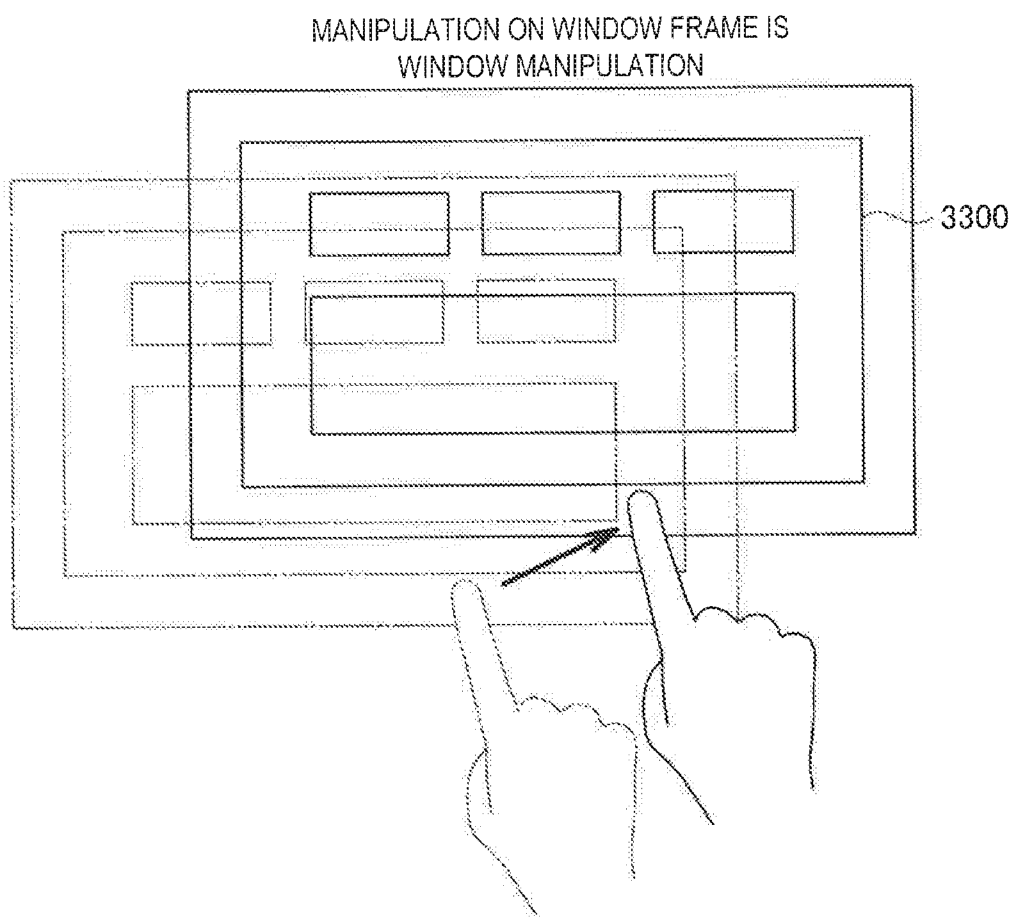

(2)

(1)

(1)

(2)

FIG. 218
(1)
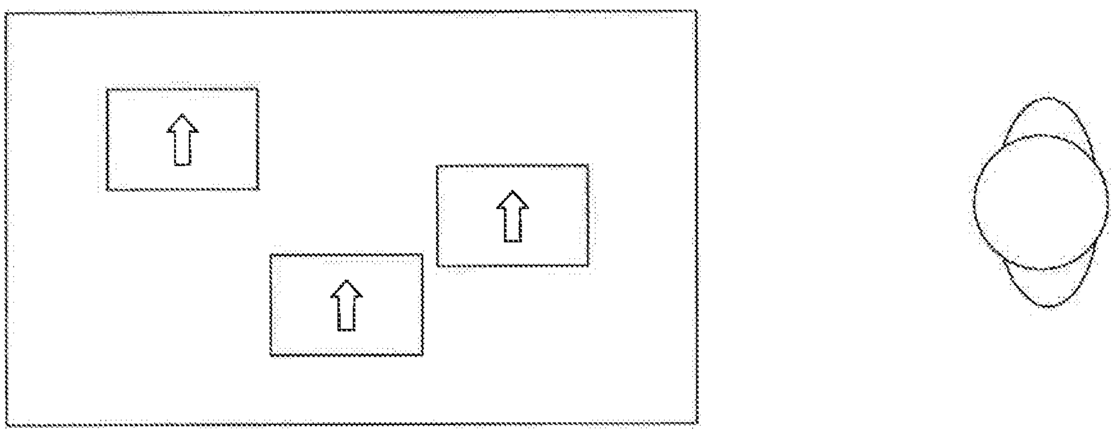
(2)
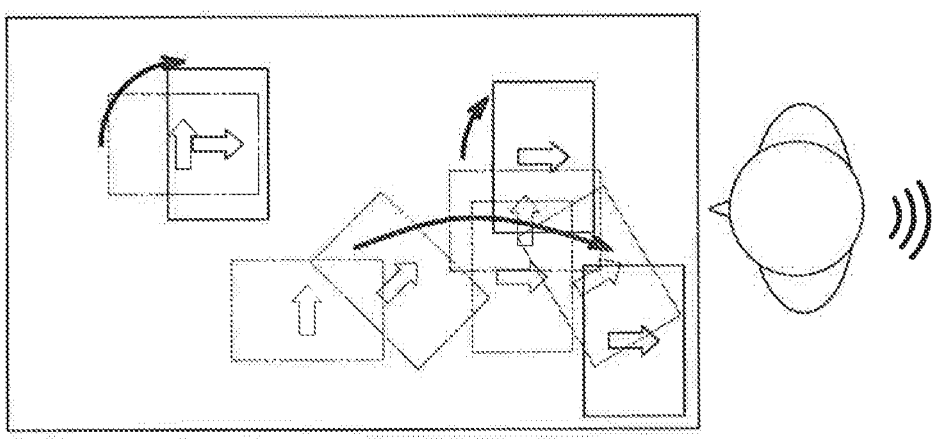

FIG. 226
(1)
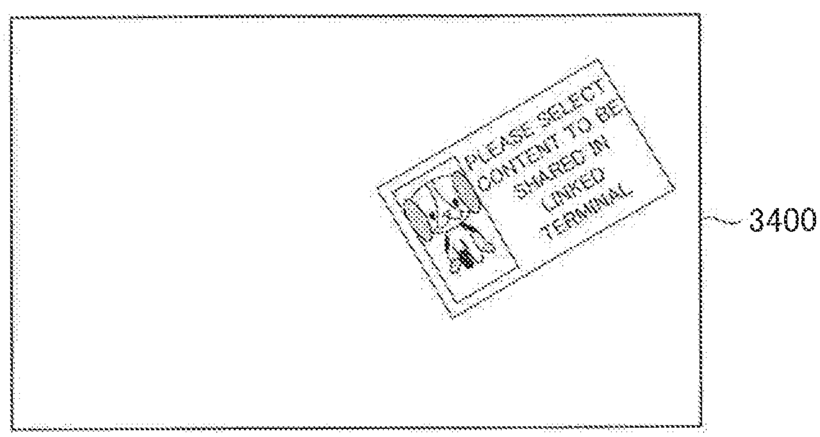
(2)
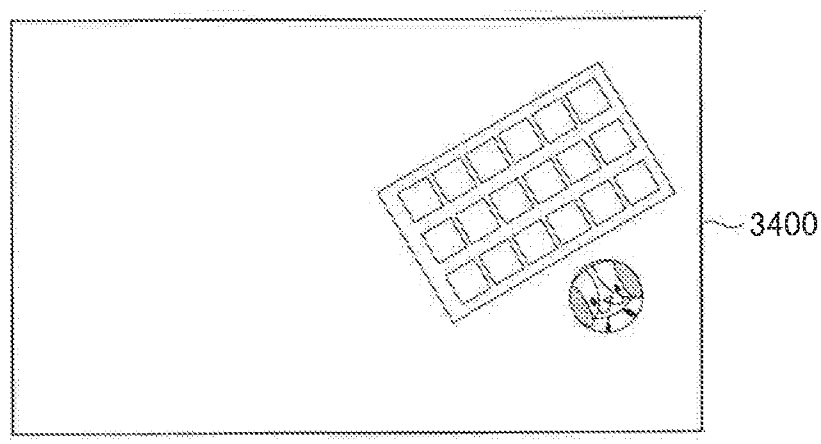

| | |
|---|---|
| θ1 | 45° |
| L1 | 1m |
| Y1 | 1080 px |

| | |
|---|---|
| θ2 | 45° |
| L2 | 2m |
| Y2 | 1080 px |
| MAGNIFICATION | 0.5 |

| | |
|---|---|
| θ1 | 45° |
| L1 | 1m |
| Y1 | 1080 px |

| | |
|---|---|
| θ2 | 60° |
| L2 | 1m |
| Y2 | 1080 px |
| MAGNIFICATION | 0.72 |

FIG. 295
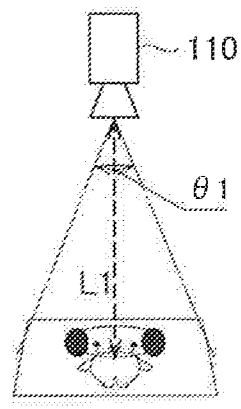
| | |
|---|---|
| θ 1 | 45° |
| L1 | 1m |
| Y1 | 1080 px |
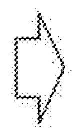
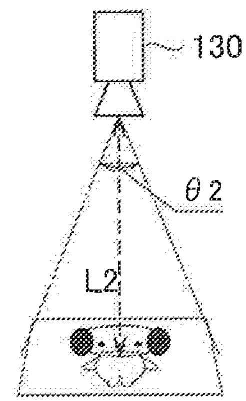
| | |
|---|---|
| θ 2 | 45° |
| L2 | 1m |
| Y2 | 720 px |
| MAGNIFICATION | 1.5 |

B

A

FIG. 308
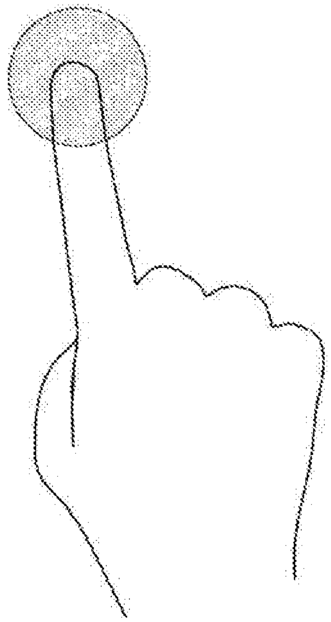
A
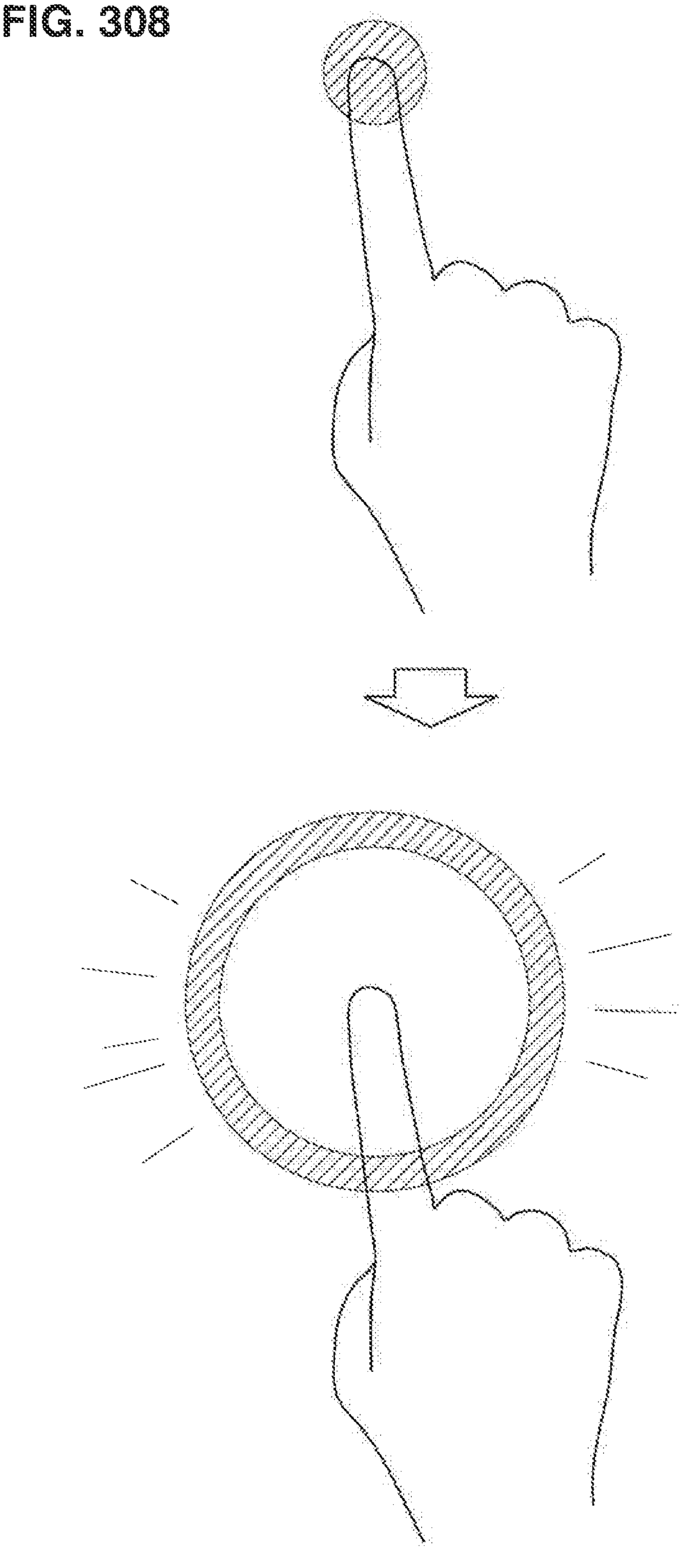
B

DISPLAY CONTROL DEVICE, DISPLAY CONTROL METHOD, AND PROGRAM

CROSS REFERENCE TO PRIOR APPLICATION

This application is a National Stage patent application of PCT International Patent Application No. PCT/JP2014/073106 (filed on Sep. 2, 2014) under 35 U.S.C. § 371, which claims priority to Japanese Patent Application No. 2013-273369 (filed on Dec. 27, 2013), which are all hereby incorporated by reference in their entirety.

TECHNICAL FIELD

The present disclosure relates to a display control device, a display control method, and a program.

BACKGROUND ART

Devices displaying various kinds of information through manipulations on touch panels, such as smartphones or tablet terminals, have become widespread. In tablet terminals, the sizes of screens have also increased and uses of simultaneous manipulations of a plurality of users are considered. In the related art, projectors have been used as devices that display information.

Many technologies for efficiently displaying information have been proposed in the related art. For example, Patent Literature 1 below proposes a method of simultaneously displaying a plurality of windows at the time of display of information. Specifically, by displaying display information regarding a window on the rear side thinner than display information regarding a window on the front side in a portion in which first and second windows are superimposed, it is possible to view the display information regarding both of the windows.

CITATION LIST

Patent Literature

Patent Literature 1: JP H8-123652A

SUMMARY OF INVENTION

Technical Problem

When devices such as the smartphones, tablet terminals, and projectors display information, environments in which information is displayed or situations of displayed information may not normally be said to be constant. In view of the foregoing circumstances, it is necessary to execute control such that information can be displayed more appropriately and efficiently according to environments in which information is displayed or situations of displayed information.

It is desirable to propose a novel and improved display control device, a novel and improved display control method, and a novel and improved program capable of executing control such that information can be displayed more appropriately and efficiently according to an environment in which information is displayed or a situation of displayed information.

Solution to Problem

According to the present disclosure, there is provided a display control device including: a display control unit configured to decide a display region of a display object to be displayed on a display surface according to information regarding a real object on the display surface.

According to the present disclosure, there is provided a display control method including: deciding, by a processor, a display region of a display object to be displayed on a display surface according to information regarding a real object on the display surface.

According to the present disclosure, there is provided a program causing a computer to function as: a display control unit configured to decide a display region of a display object to be displayed on a display surface according to information regarding a real object on the display surface.

Advantageous Effects of Invention

According to the present disclosure described above, it is possible to provide a novel and improved display control device, a novel and improved display control method, and a novel and improved program capable of executing control such that information can be displayed more appropriately and efficiently according to environments in which information is displayed or situations of displayed information.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 116 is an explanatory diagram illustrating a user interface according to specific example 10.

FIG. 120 is an explanatory diagram illustrating a user interface according to specific example 12.

FIG. 121 is an explanatory diagram illustrating a user interface according to specific example 12.

FIG. 122 is an explanatory diagram illustrating a user interface according to specific example 12.

FIG. 123 is an explanatory diagram illustrating a user interface according to specific example 12.

FIG. 124 is an explanatory diagram illustrating a user interface according to specific example 13.

FIG. 125 is an explanatory diagram illustrating a user interface according to specific example 13.

FIG. 126 is an explanatory diagram illustrating a user interface according to specific example 13.

FIG. 127 is an explanatory diagram illustrating a user interface according to specific example 13.

FIG. 128 is an explanatory diagram illustrating a specific example of a karuta card assistance application.

FIG. 129 is an explanatory diagram illustrating a specific example of a conversation assistance application.

FIG. 130 is an explanatory diagram illustrating a specific example of a projection surface tracking application.

FIG. 131 is an explanatory diagram illustrating a specific example of a projection surface tracking application.

Figure 132:
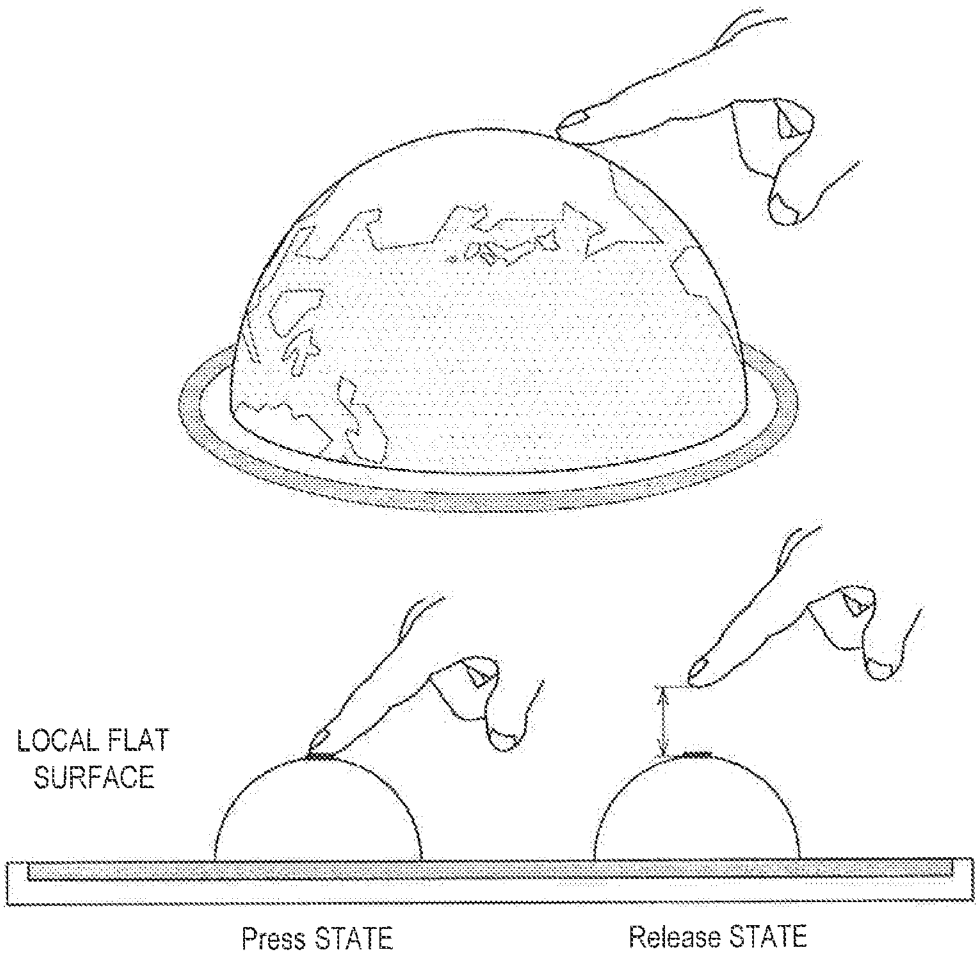

FIG. 132 is an explanatory diagram illustrating a specific example of a projection surface tracking application.

Figure 133:
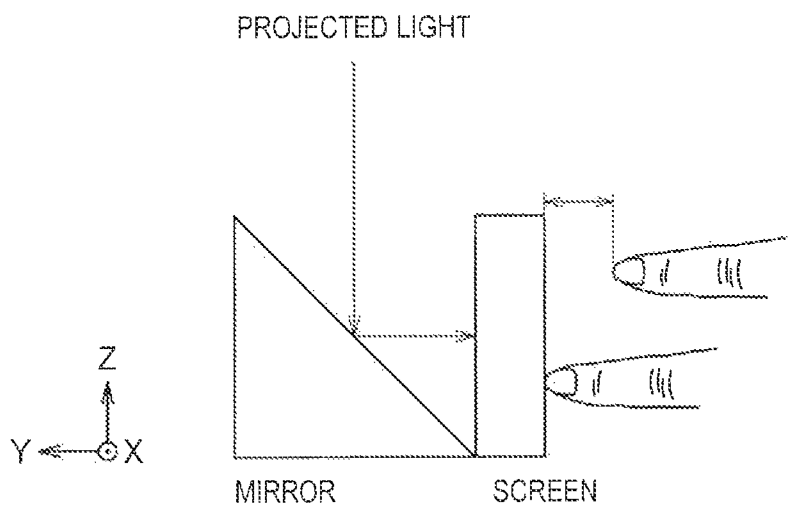

FIG. 133 is an explanatory diagram illustrating a specific example of a projection surface tracking application.

Figure 134:
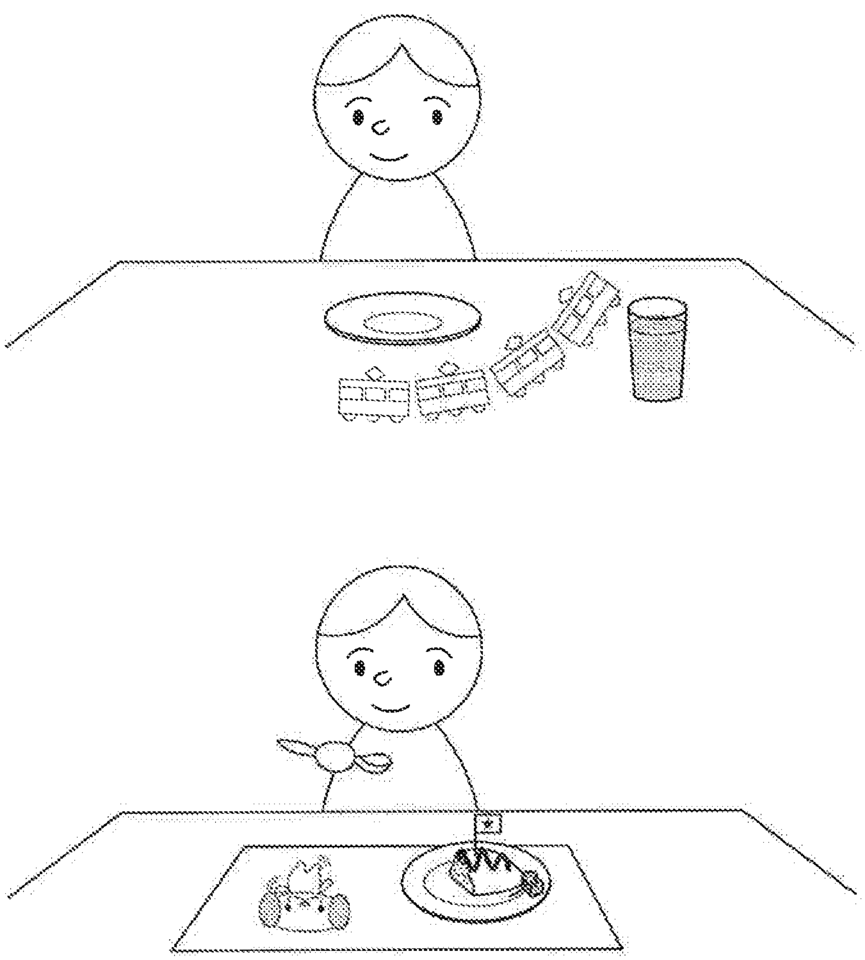

FIG. 134 is an explanatory diagram illustrating a specific example of a meal assistance application.

Figure 135:
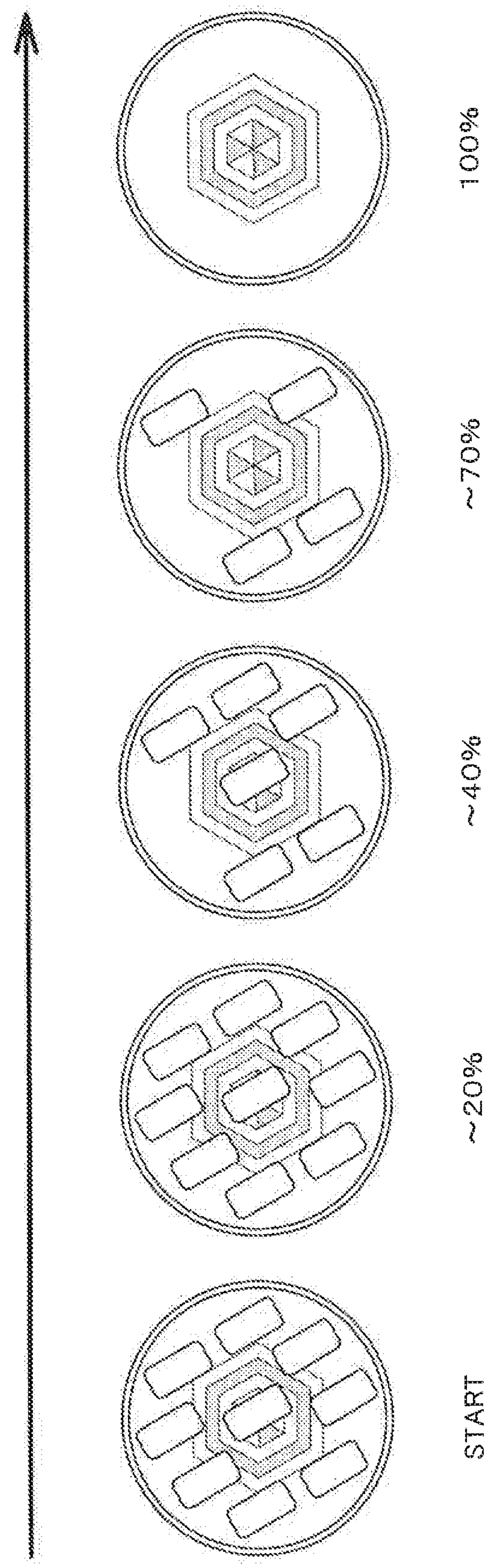

FIG. 135 is an explanatory diagram illustrating another specific example of the meal assistance application.

Figure 136:
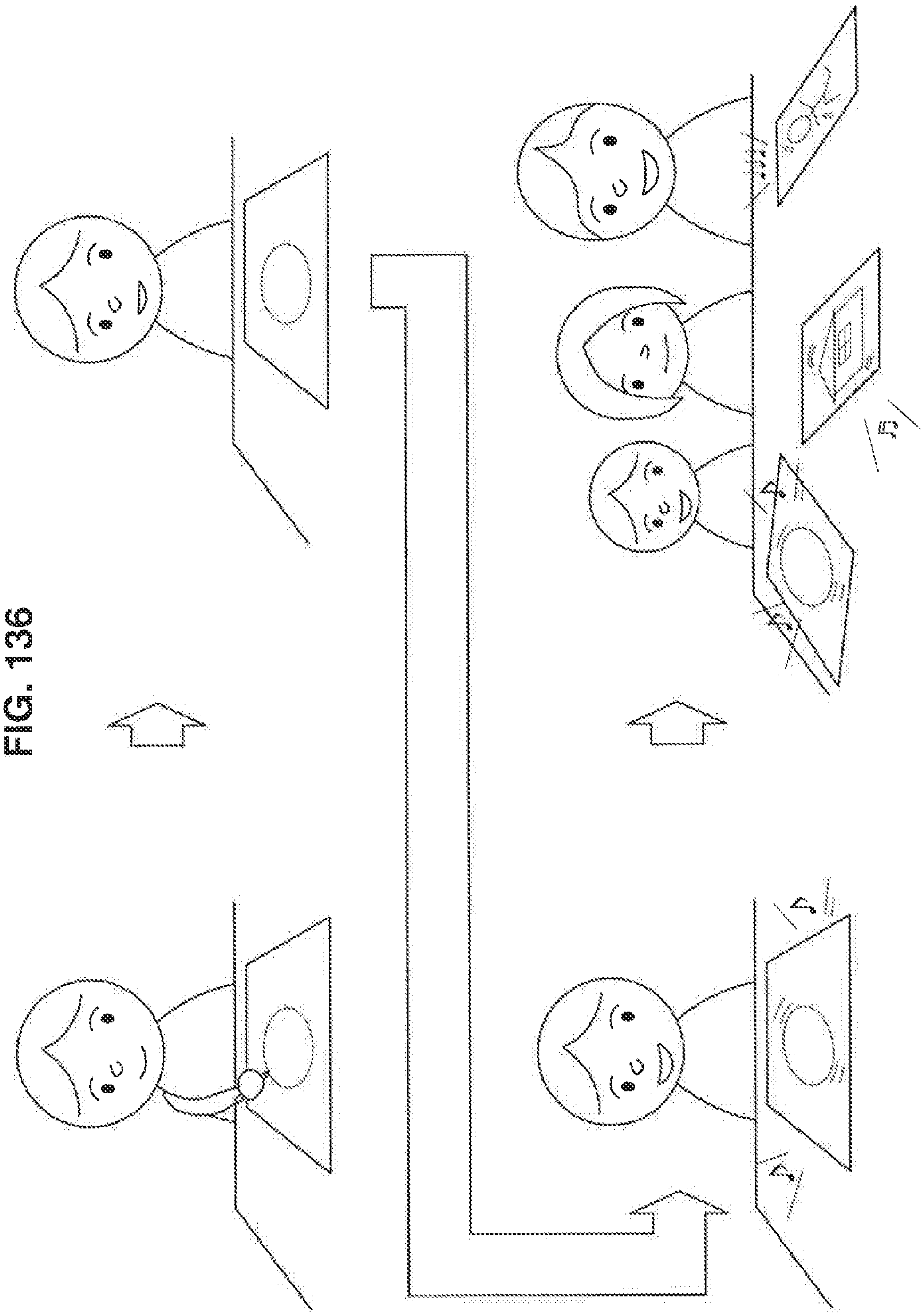

FIG. 136 is an explanatory diagram illustrating a specific example of a motion effect application.

Figure 137:
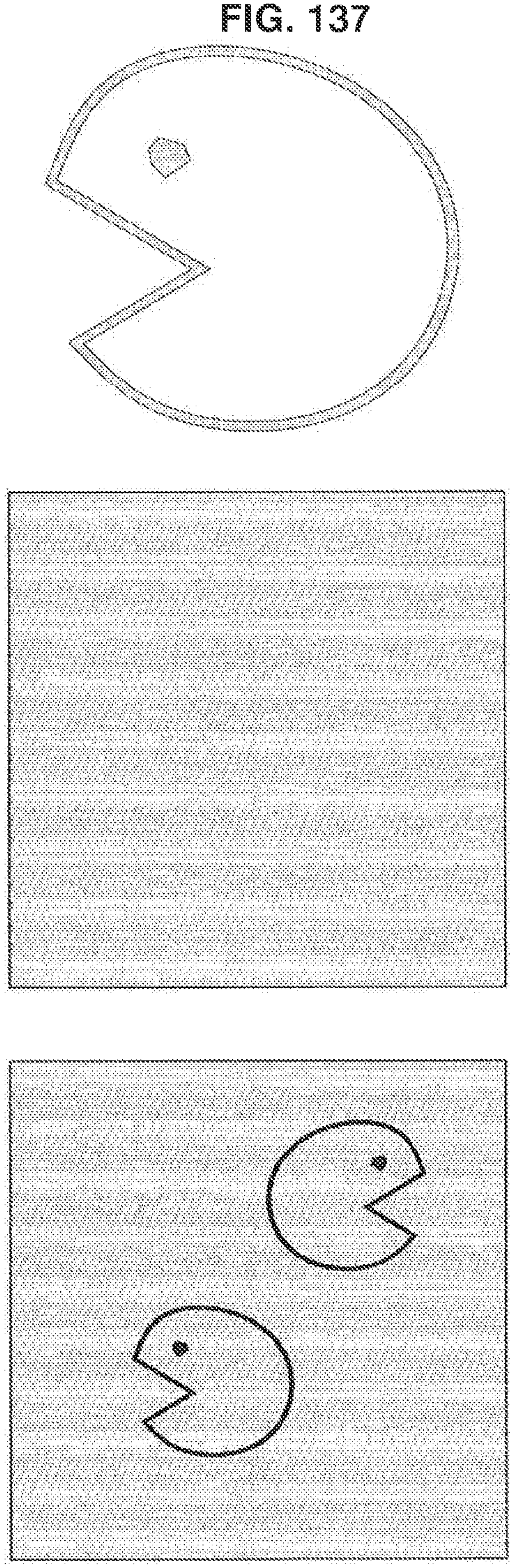

FIG. 137 is an explanatory diagram illustrating a specific example of the motion effect application.

Figure 138:
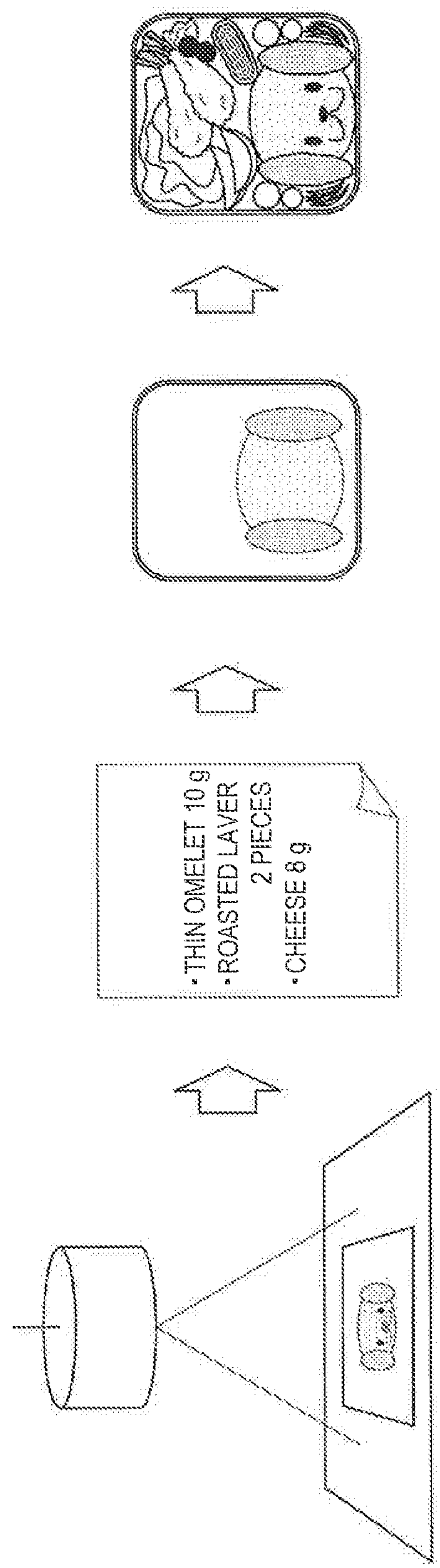

FIG. 138 is an explanatory diagram illustrating a specific example of a lunch box preparation supporting application.

Figure 139:
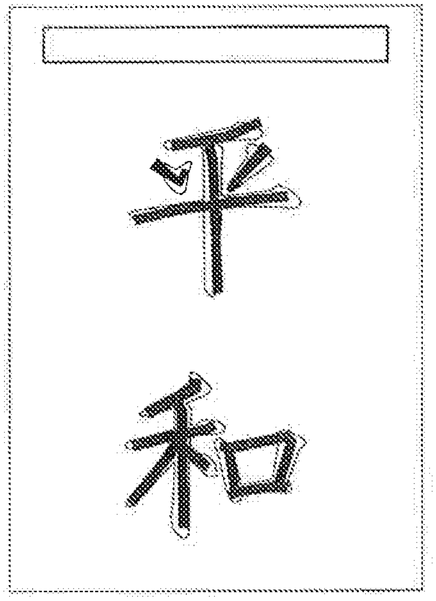

FIG. 139 is an explanatory diagram illustrating a specific example of user assistance by a daily assistance application.

Figure 140:
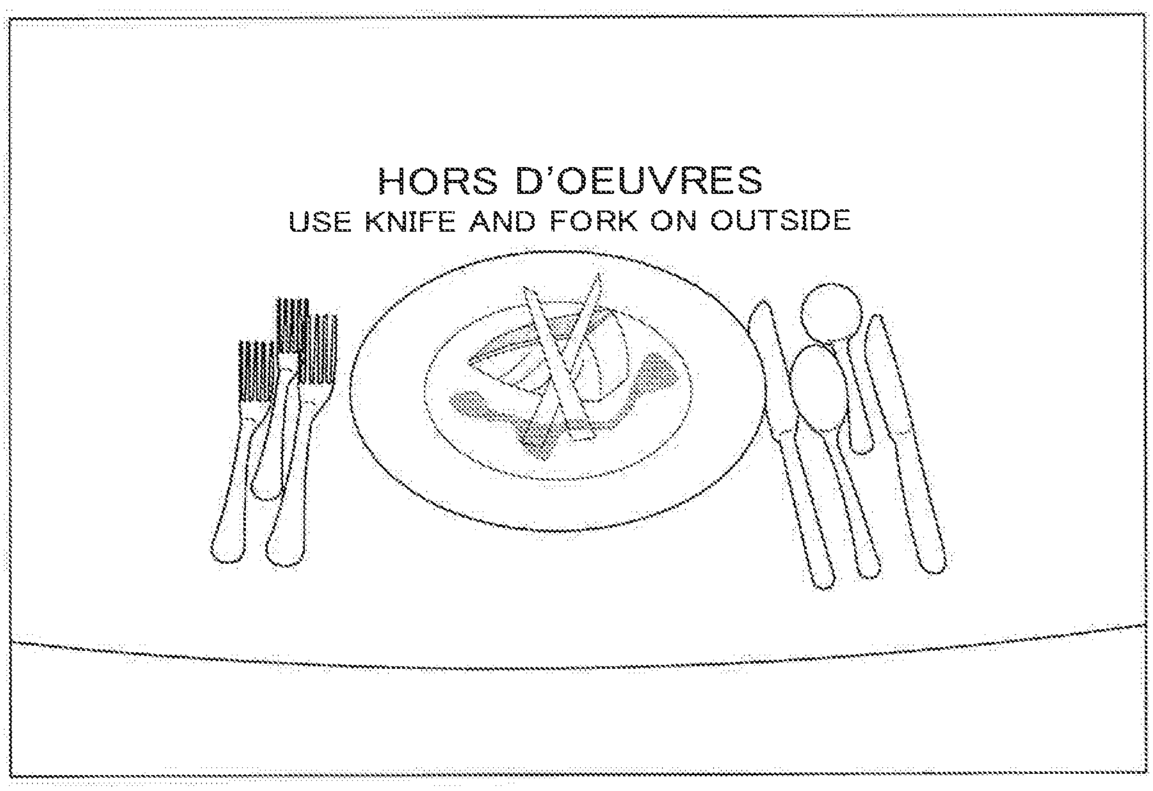

FIG. 140 is an explanatory diagram illustrating a specific example of user assistance by a daily assistance application.

Figure 141:
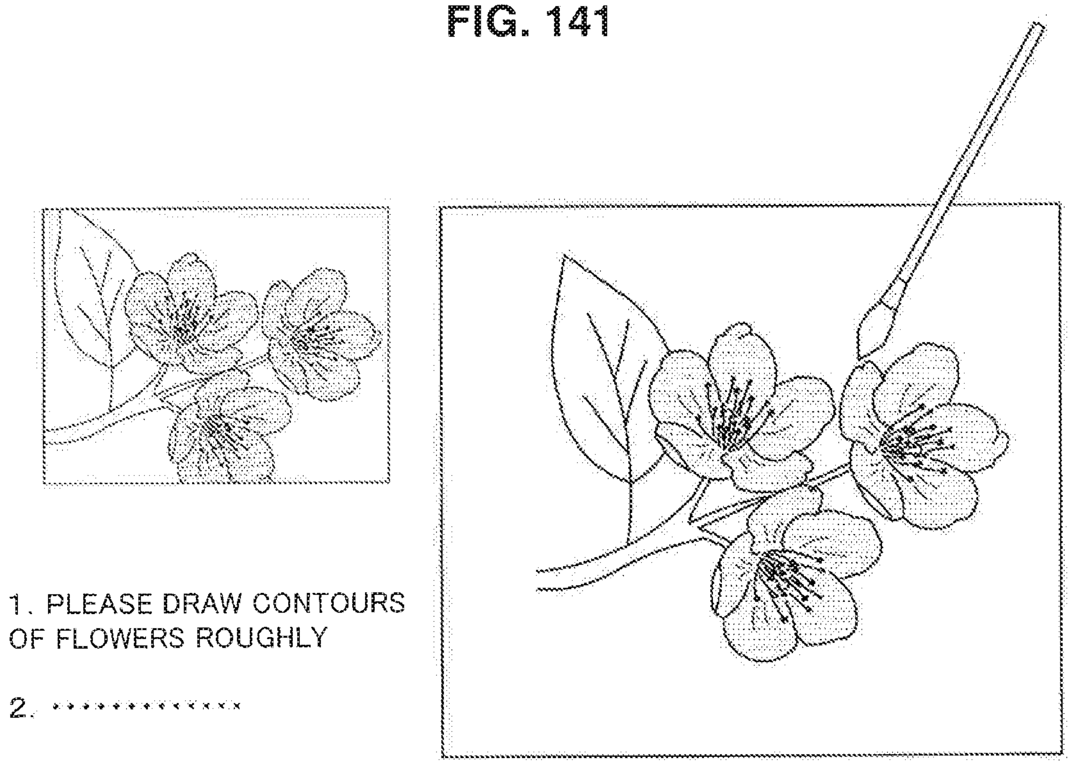

FIG. 141 is an explanatory diagram illustrating a specific example of user assistance by a daily assistance application.

Figure 142:
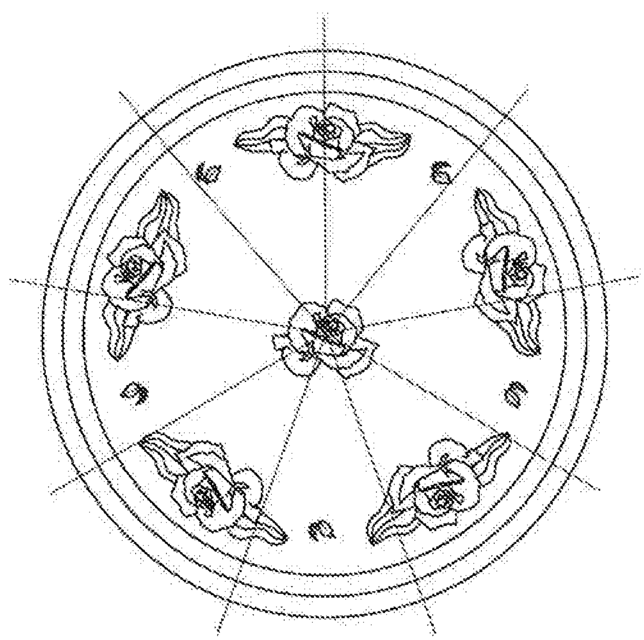

FIG. 142 is an explanatory diagram illustrating a specific example of user assistance by a daily assistance application.

Figure 143:
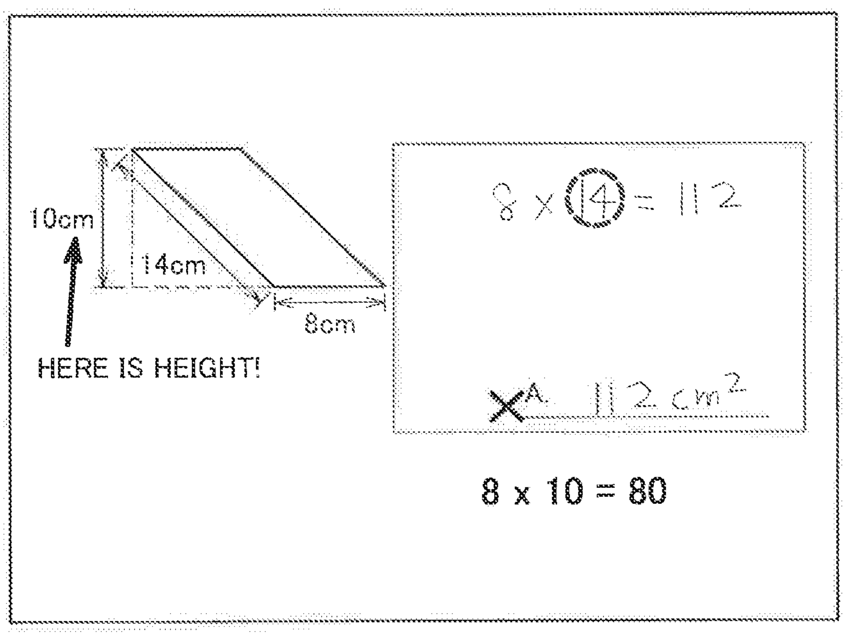

FIG. 143 is an explanatory diagram illustrating a specific example of user assistance by a daily assistance application.

Figure 144:
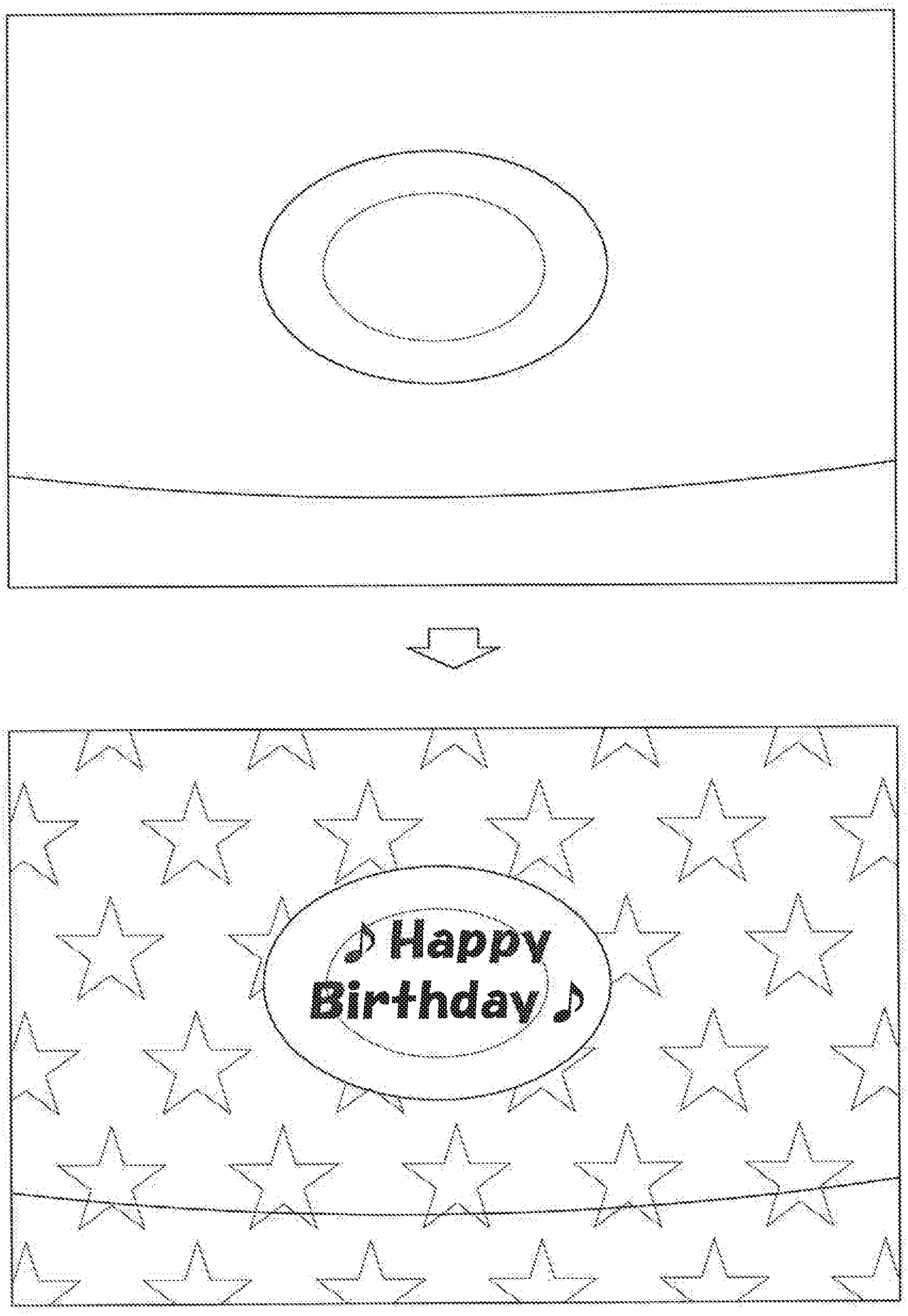

FIG. 144 is an explanatory diagram illustrating a specific example of a dining table representation application.

Figure 145:
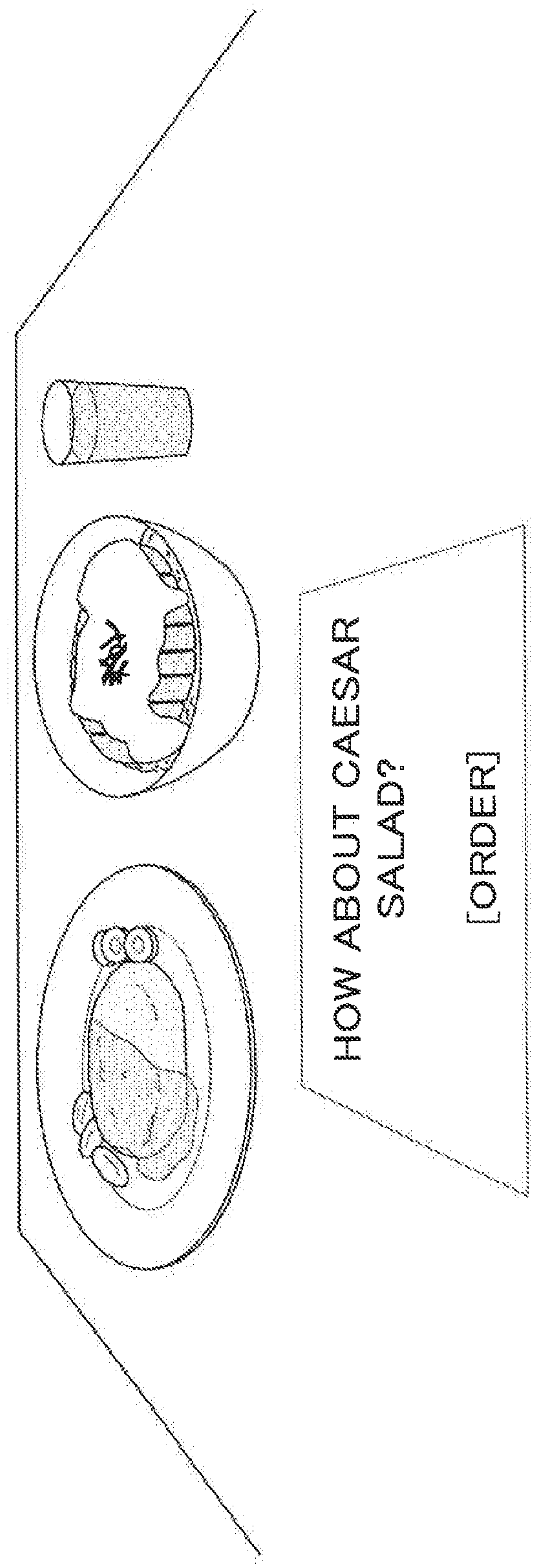

FIG. 145 is an explanatory diagram illustrating a specific example of a food recommendation application.

Figure 146:
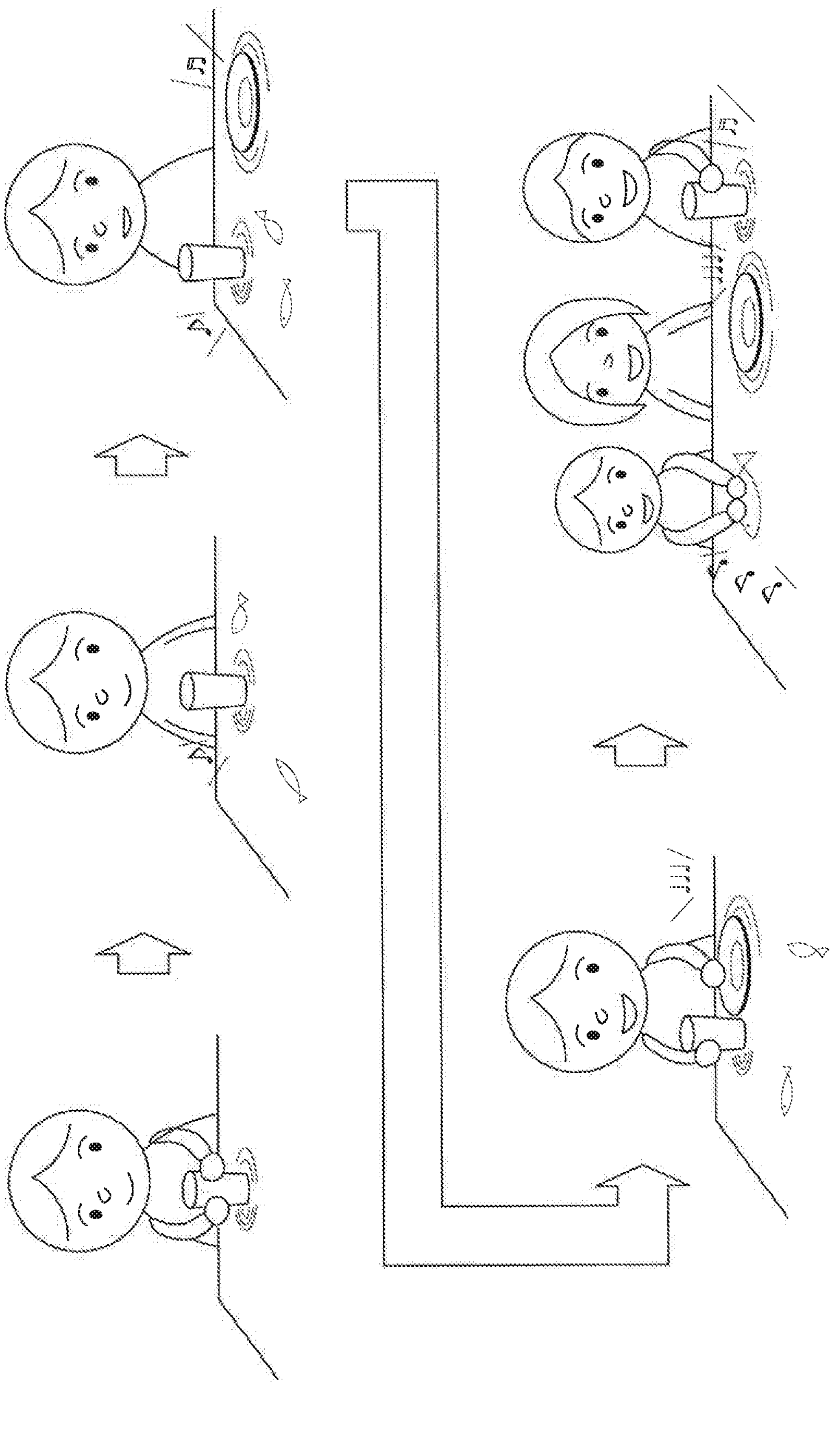

FIG. 146 is an explanatory diagram illustrating a specific example of a tableware effect application.

Figure 147:
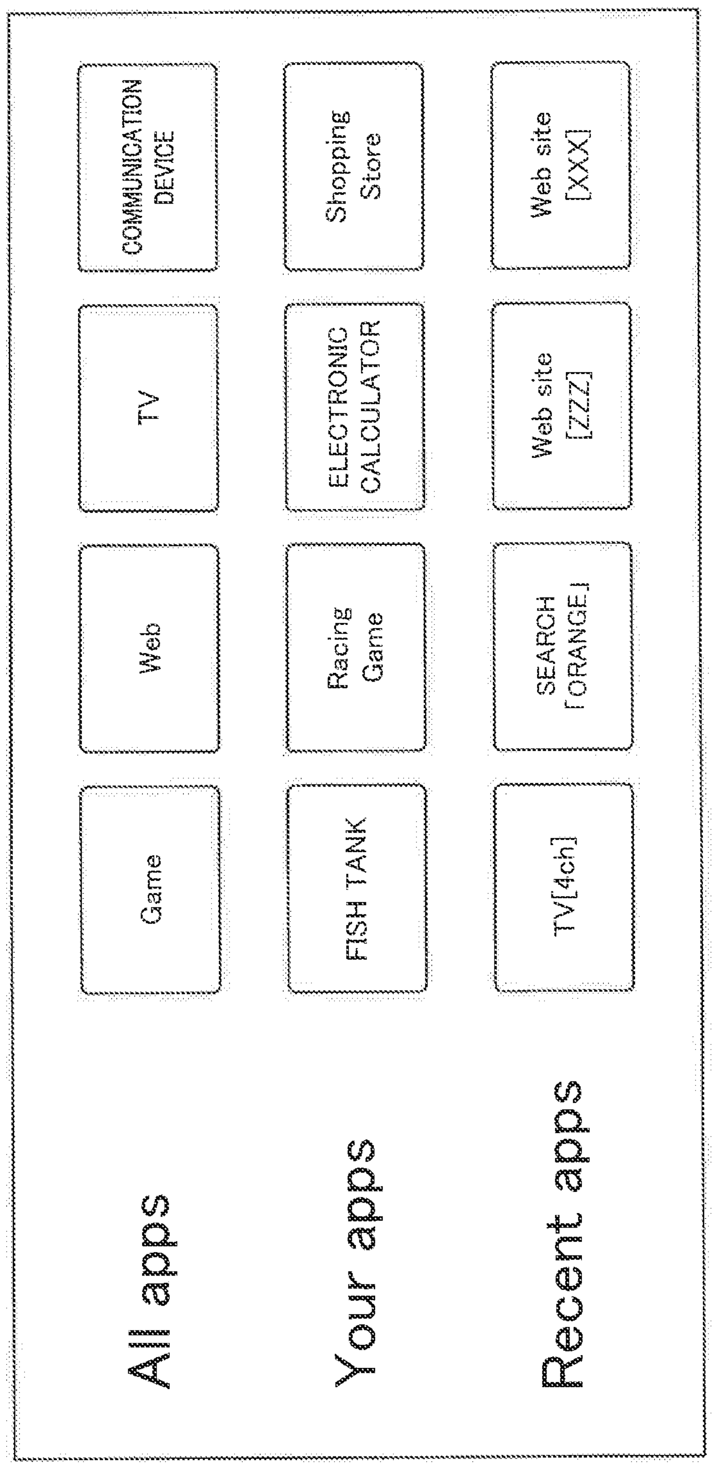

FIG. 147 is an explanatory diagram illustrating a specific example of an inter-room linking application.

Figure 148:
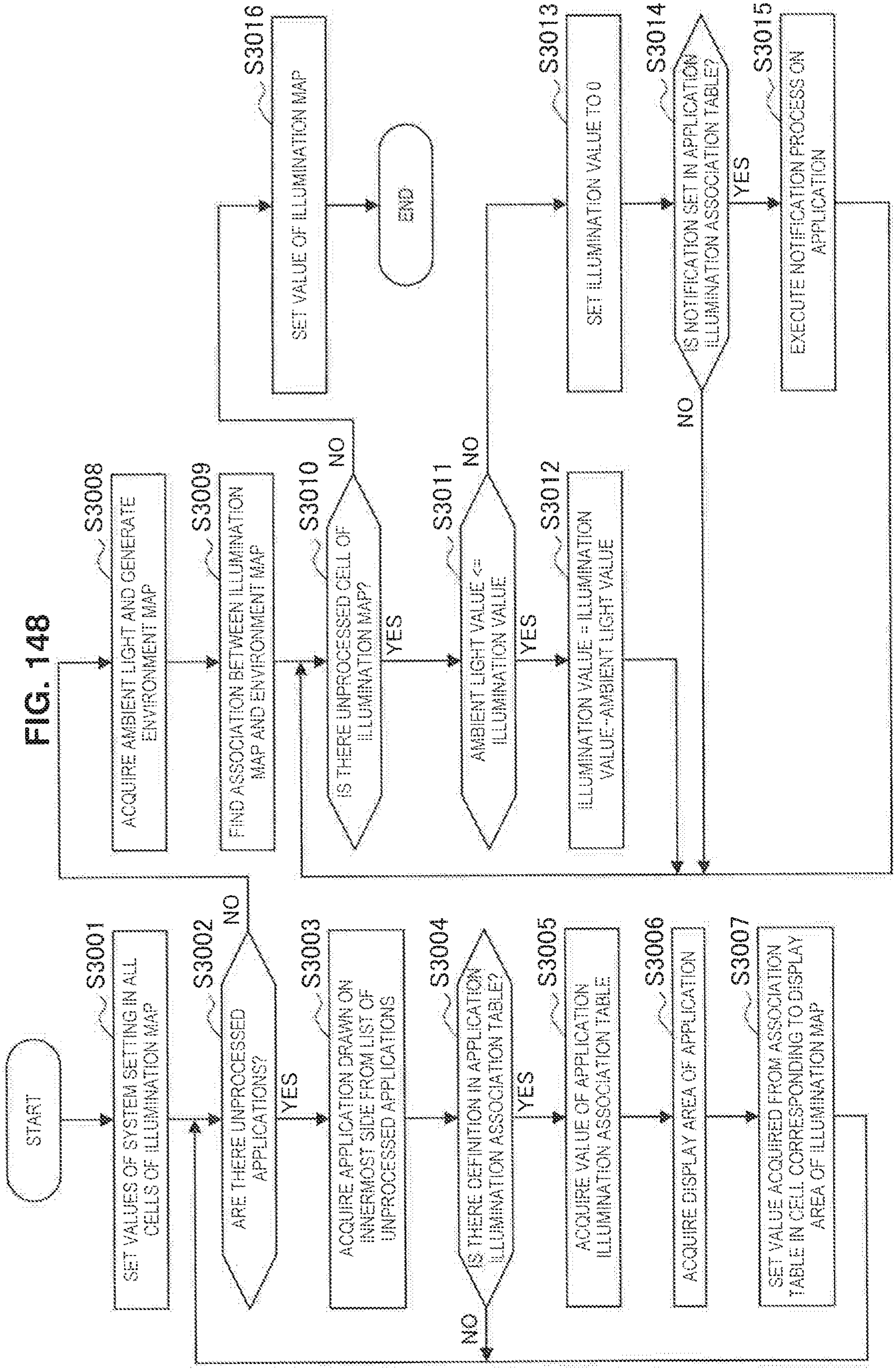

FIG. 148 is a flowchart illustrating an example of an operation of the information processing system 100 according to an embodiment of the present disclosure.

Figure 149:
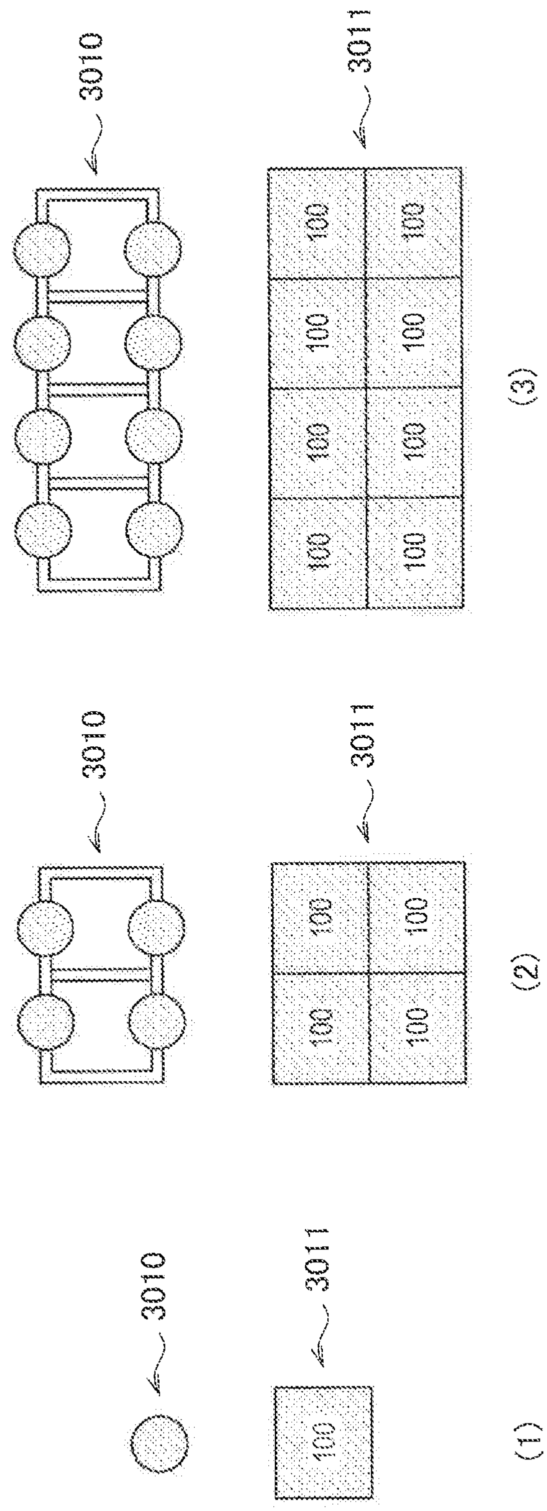

FIG. 149 is an explanatory diagram illustrating an example of an illumination map.

Figure 150:
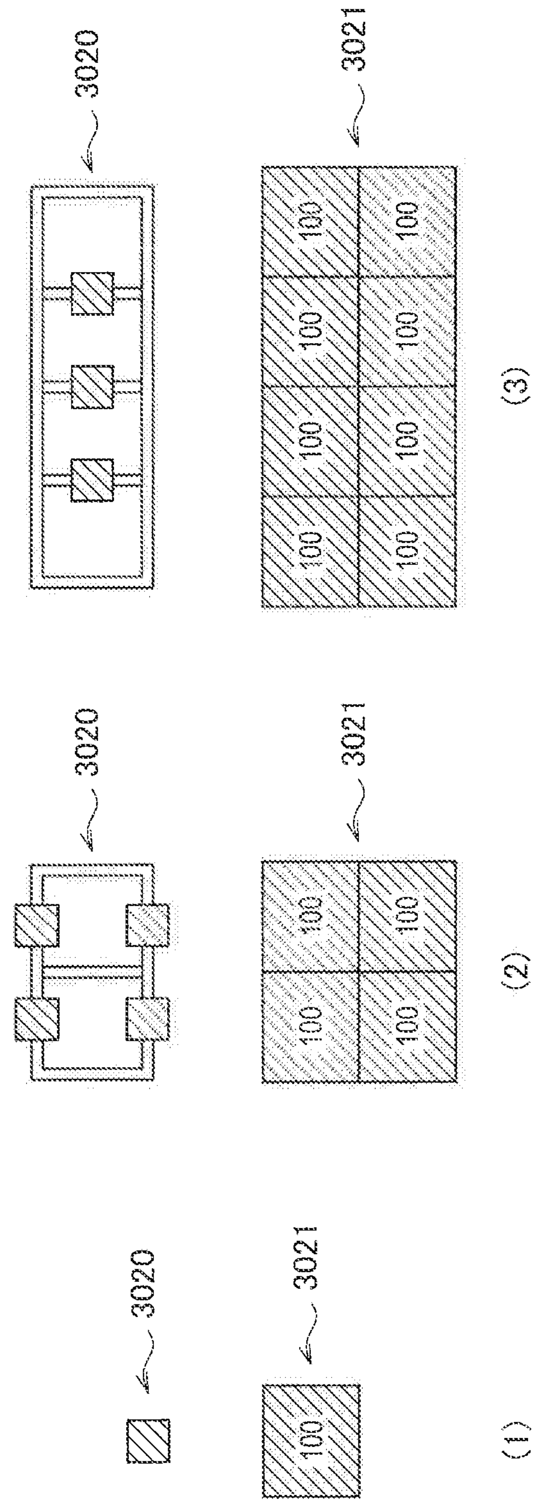

FIG. 150 is an explanatory diagram illustrating an example of an environment map.

Figure 151:
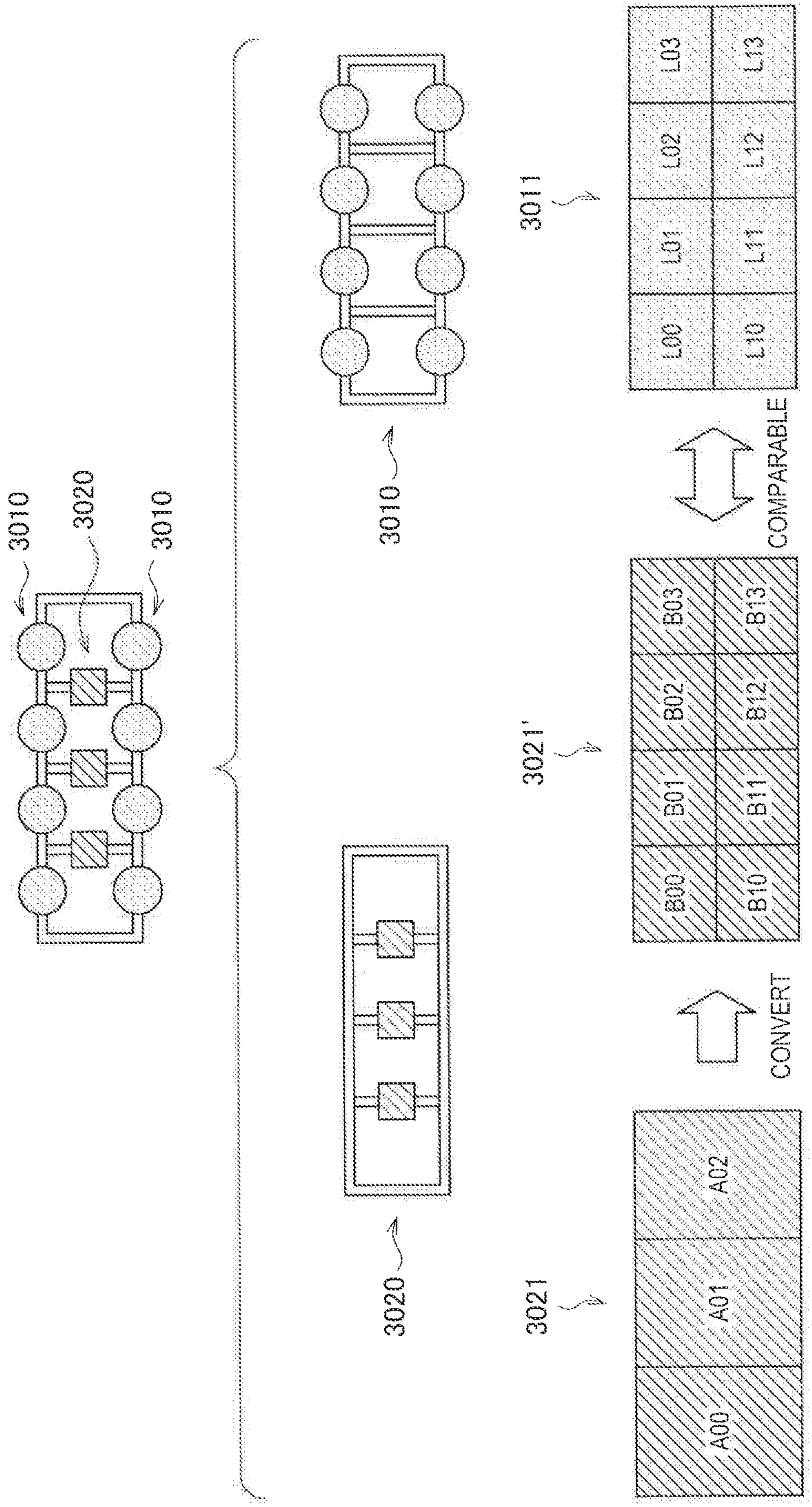

FIG. 151 is an explanatory diagram illustrating an example of association between the illumination map and the environment map.

FIG. 152 is an explanatory diagram illustrating an example of an application illumination association table.

Figure 153:
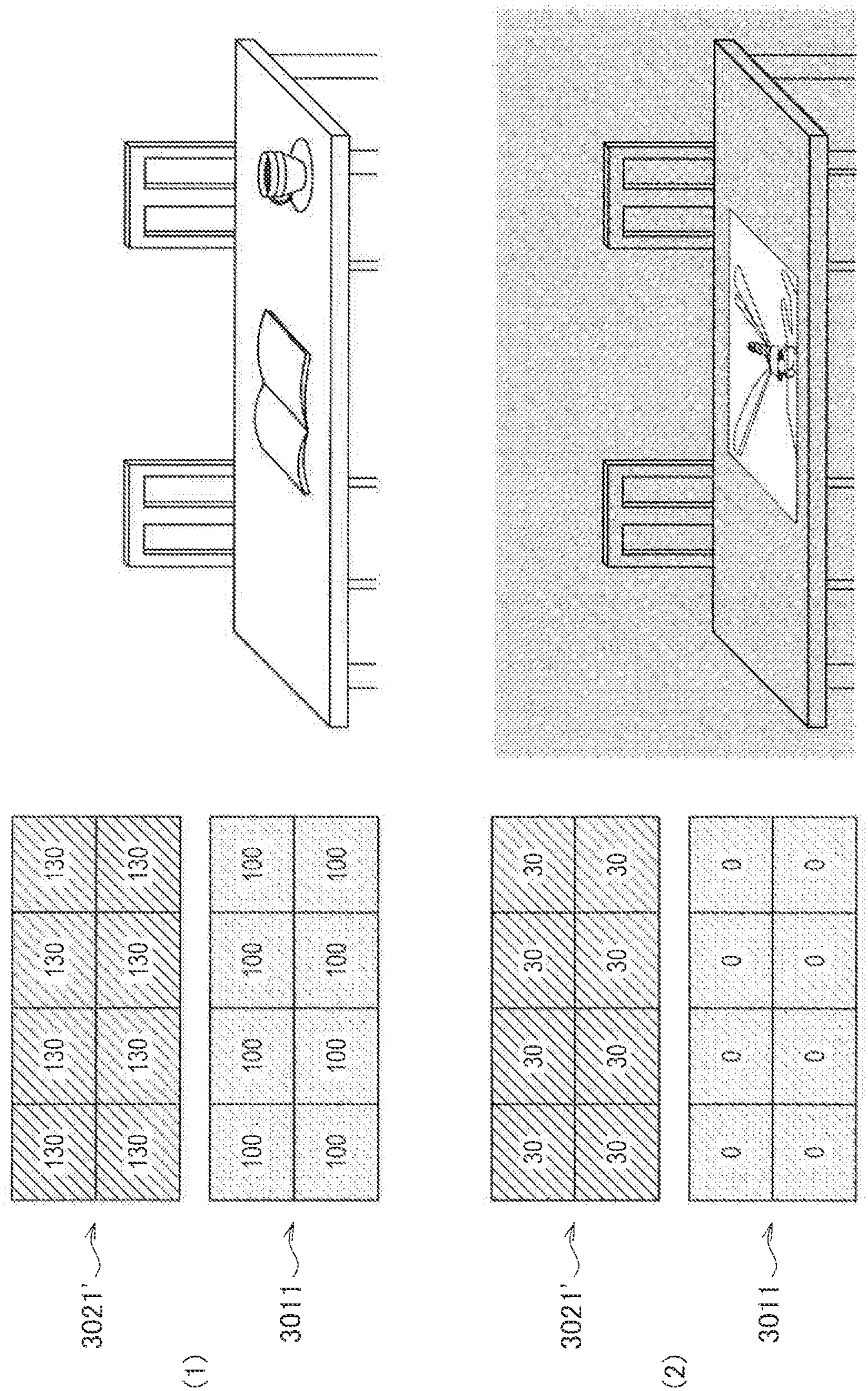

FIG. 153 is an explanatory diagram illustrating examples of values of the illumination map and the environment map.

Figure 154:
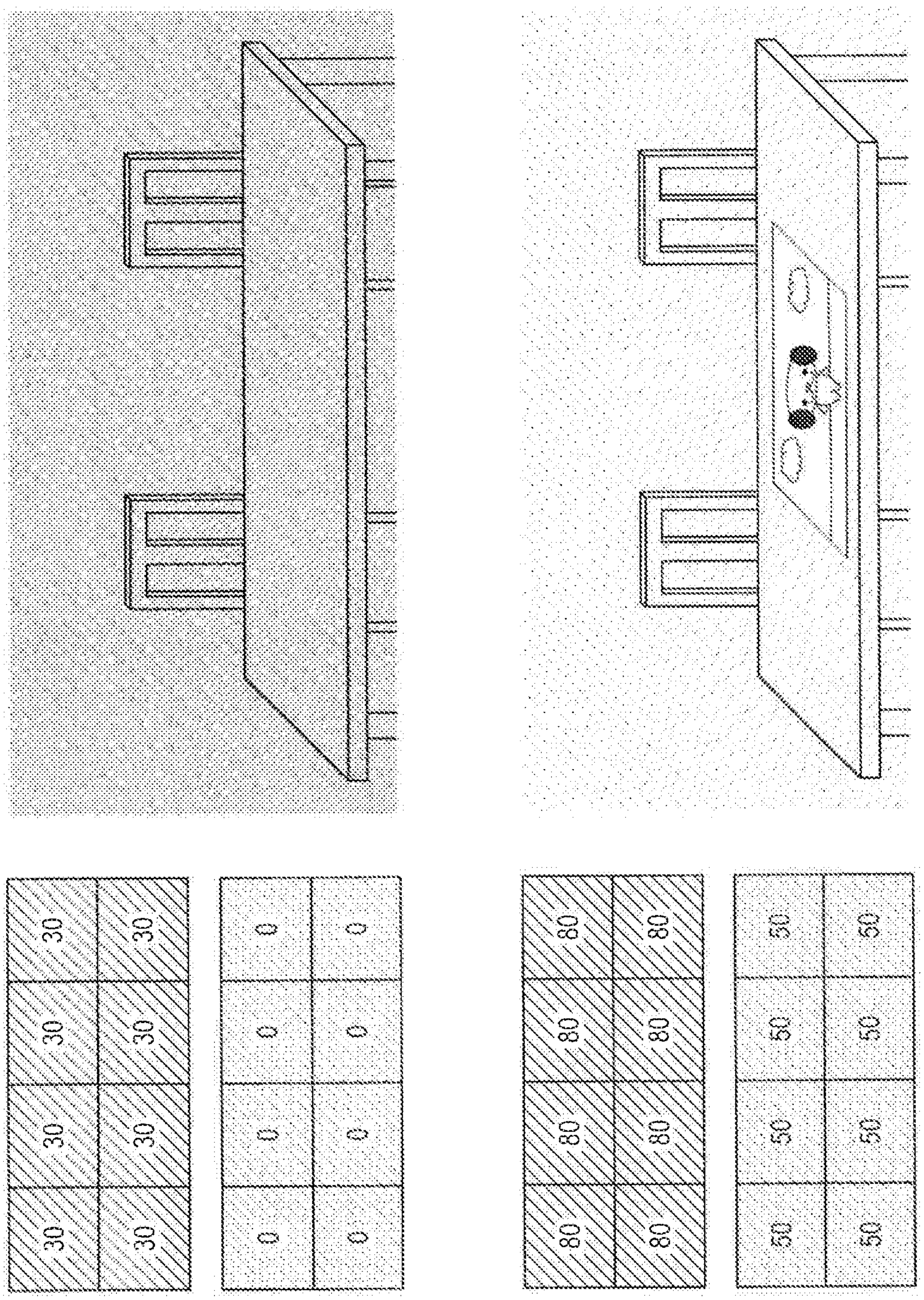

FIG. 154 is an explanatory diagram illustrating examples of values of the illumination map and the environment map.

Figure 155:
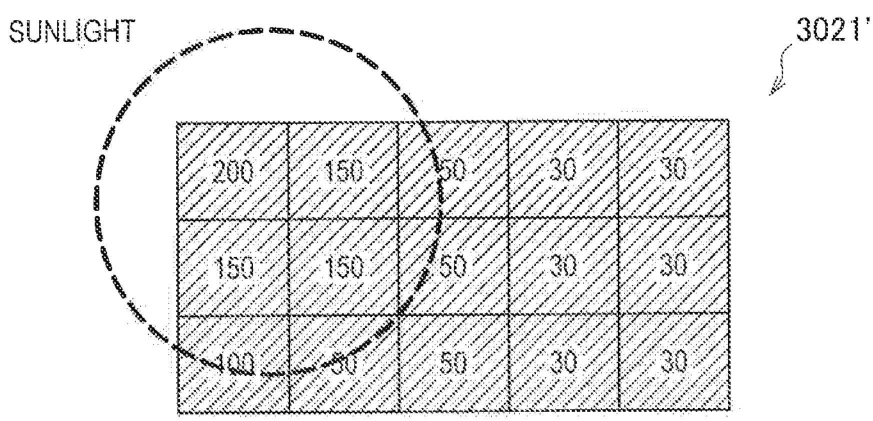

FIG. 155 is an explanatory diagram illustrating an example when outside light is reflected to the environment map.

Figure 156:
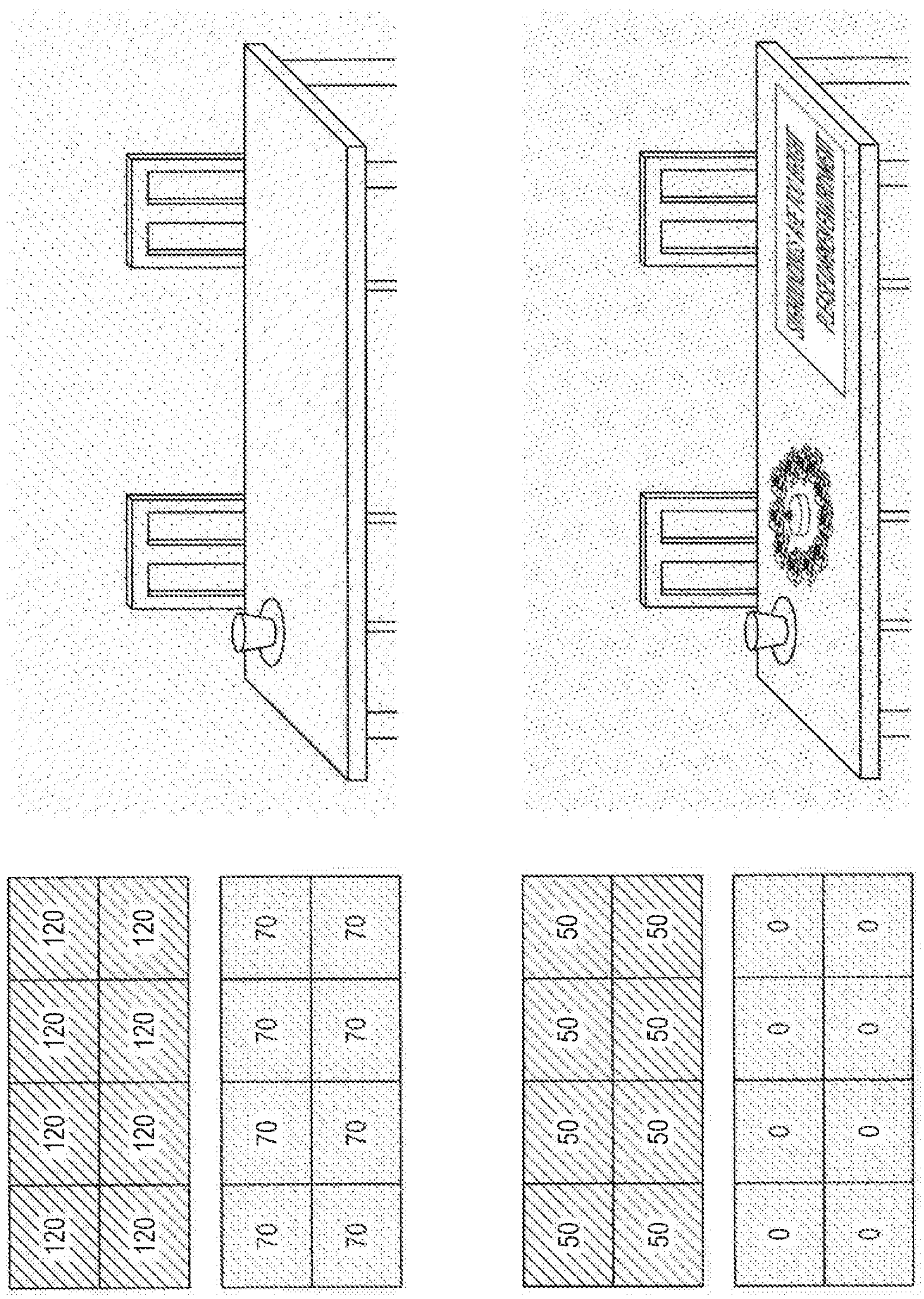

FIG. 156 is an explanatory diagram illustrating examples of values of the illumination map and the environment map.

Figure 157:
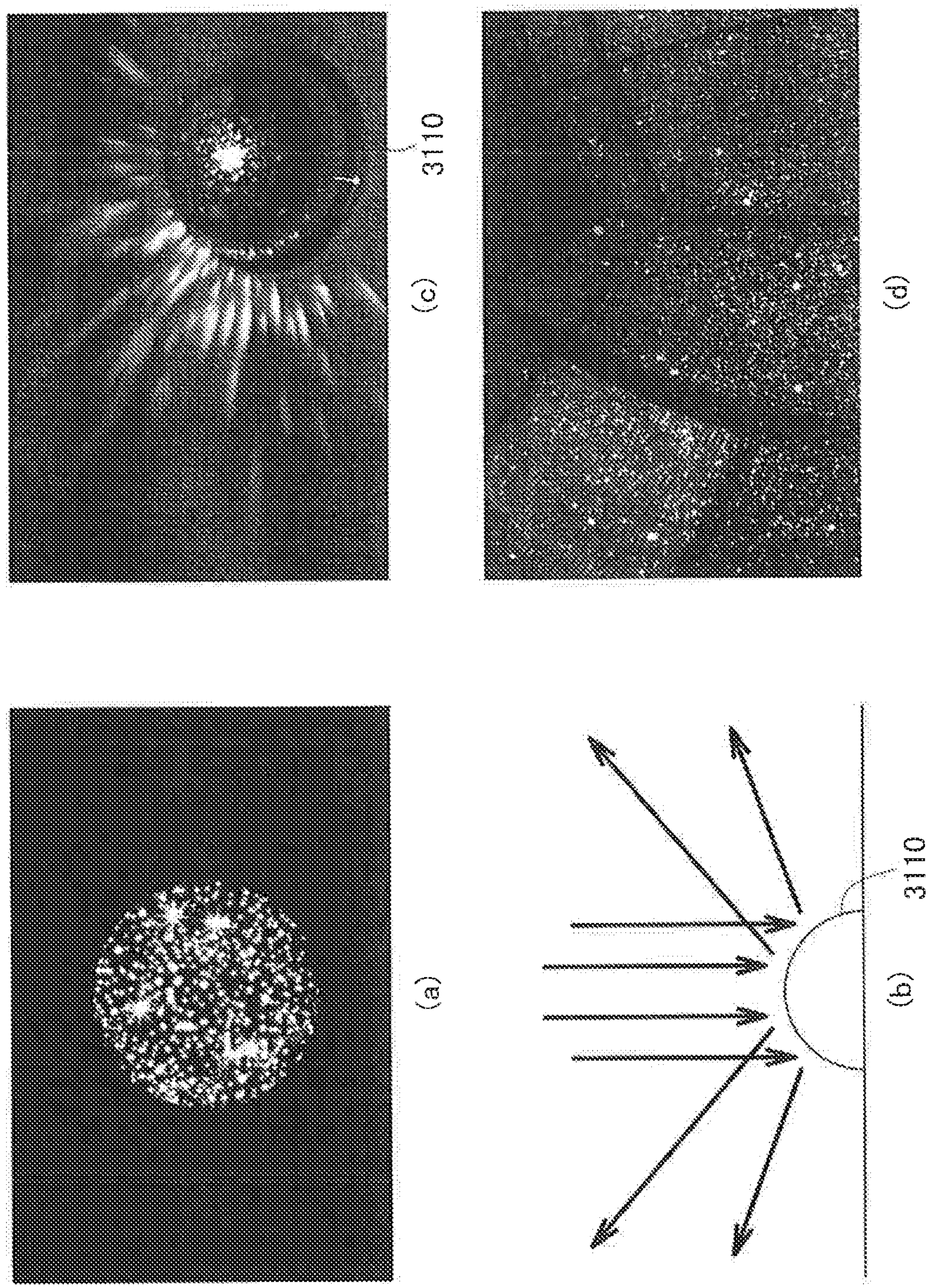

FIG. 157 is an explanatory diagram illustrating a specific example of an application.

FIG. 158 is an explanatory diagram illustrating a specific example of an application.

FIG. 159 is an explanatory diagram illustrating a specific example of an application.

Figure 160:
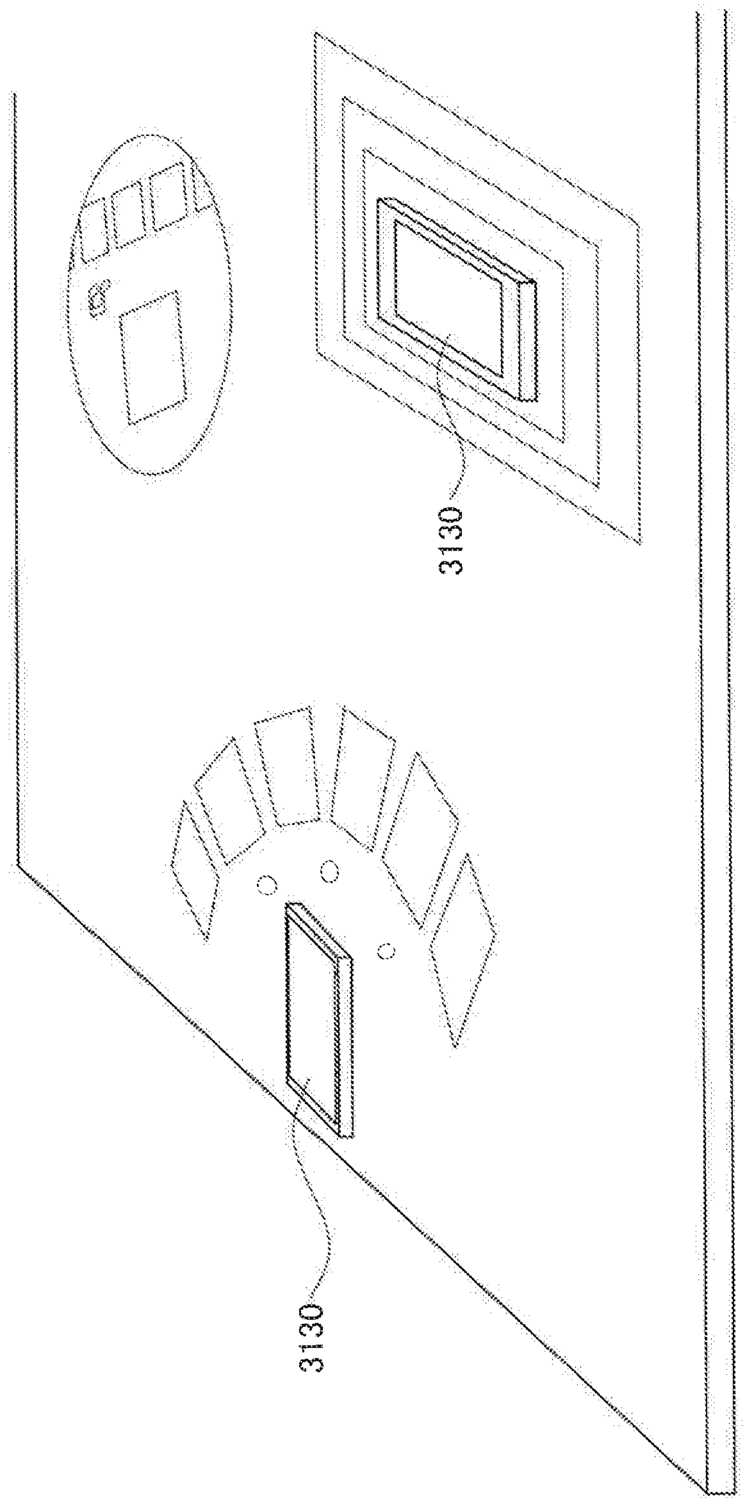

FIG. 160 is an explanatory diagram illustrating a specific example of an application.

FIG. 161 is an explanatory diagram illustrating a specific example of an application.

Figure 162:
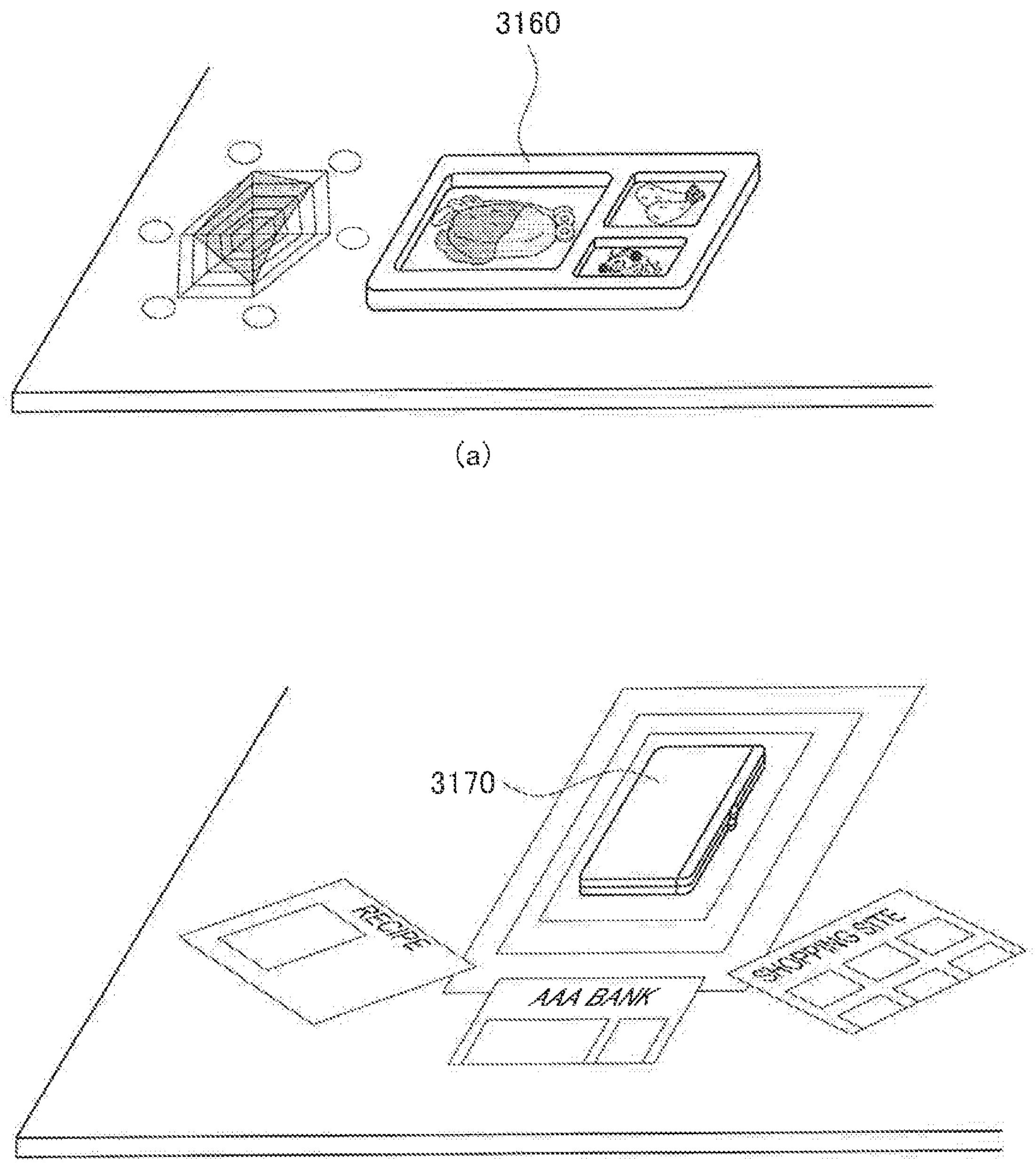

FIG. 162 is an explanatory diagram illustrating a specific example of an application.

Figure 163:
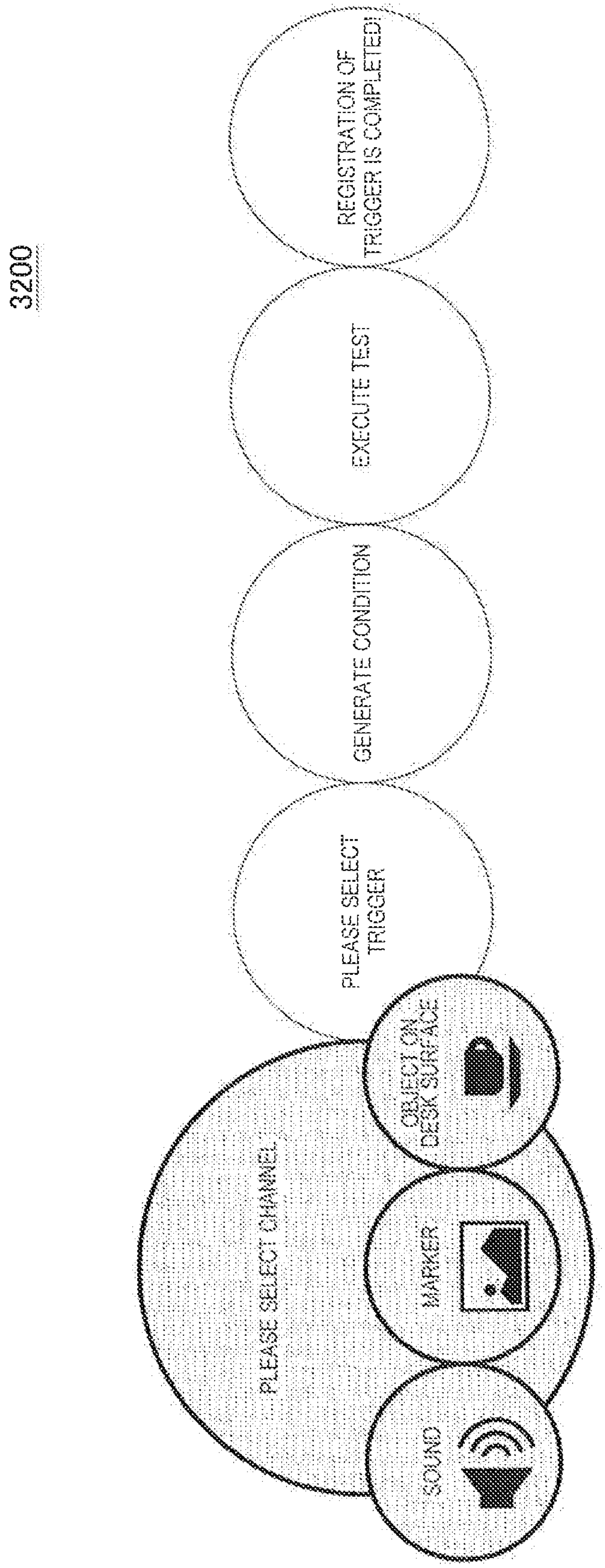

FIG. 163 is an explanatory diagram illustrating an example of a GUI.

Figure 164:
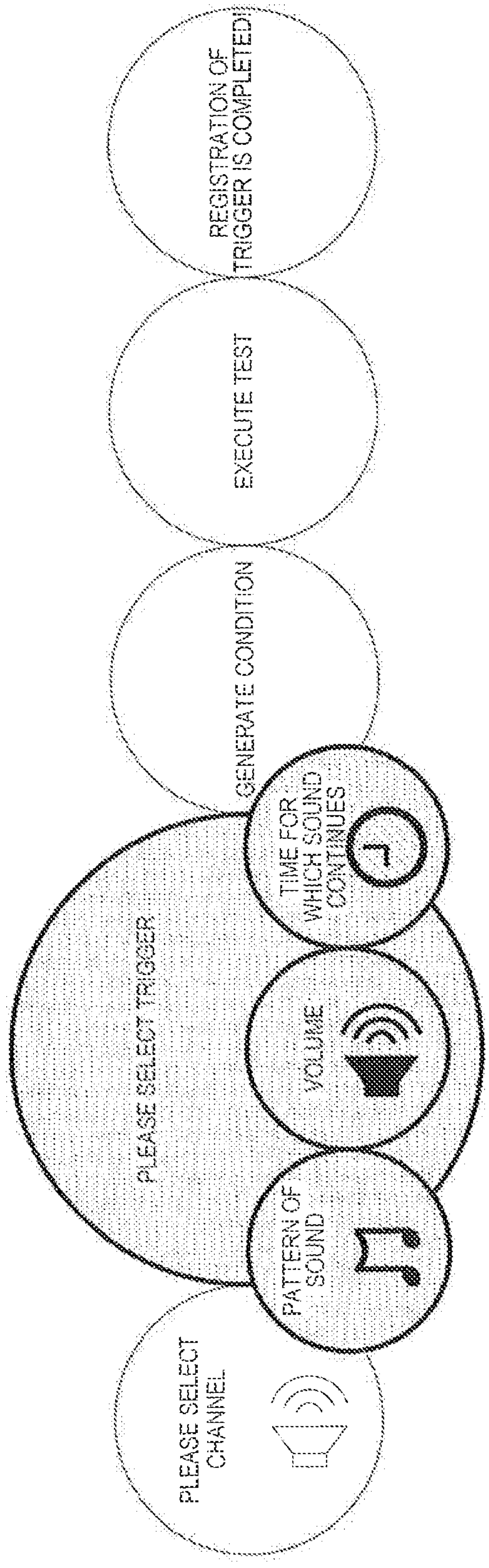

FIG. 164 is an explanatory diagram illustrating an example of a GUI.

Figure 165:
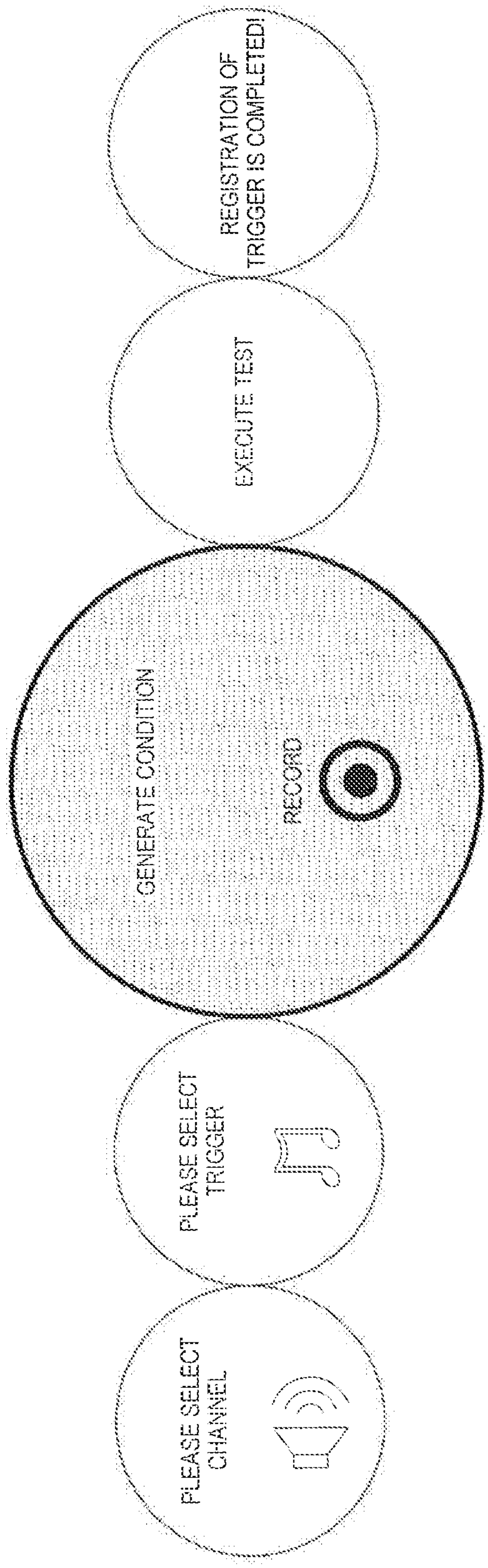

FIG. 165 is an explanatory diagram illustrating an example of a GUI.

Figure 166:
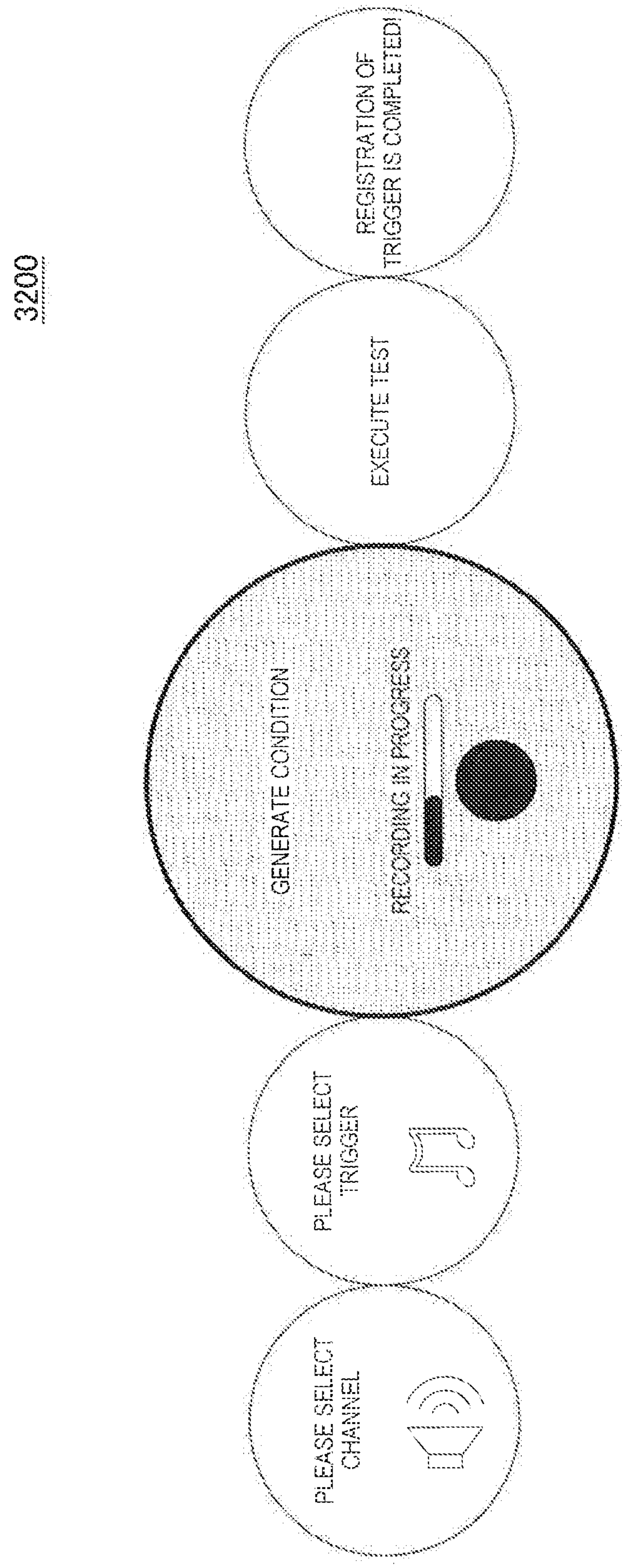

FIG. 166 is an explanatory diagram illustrating an example of a GUI.

Figure 167:
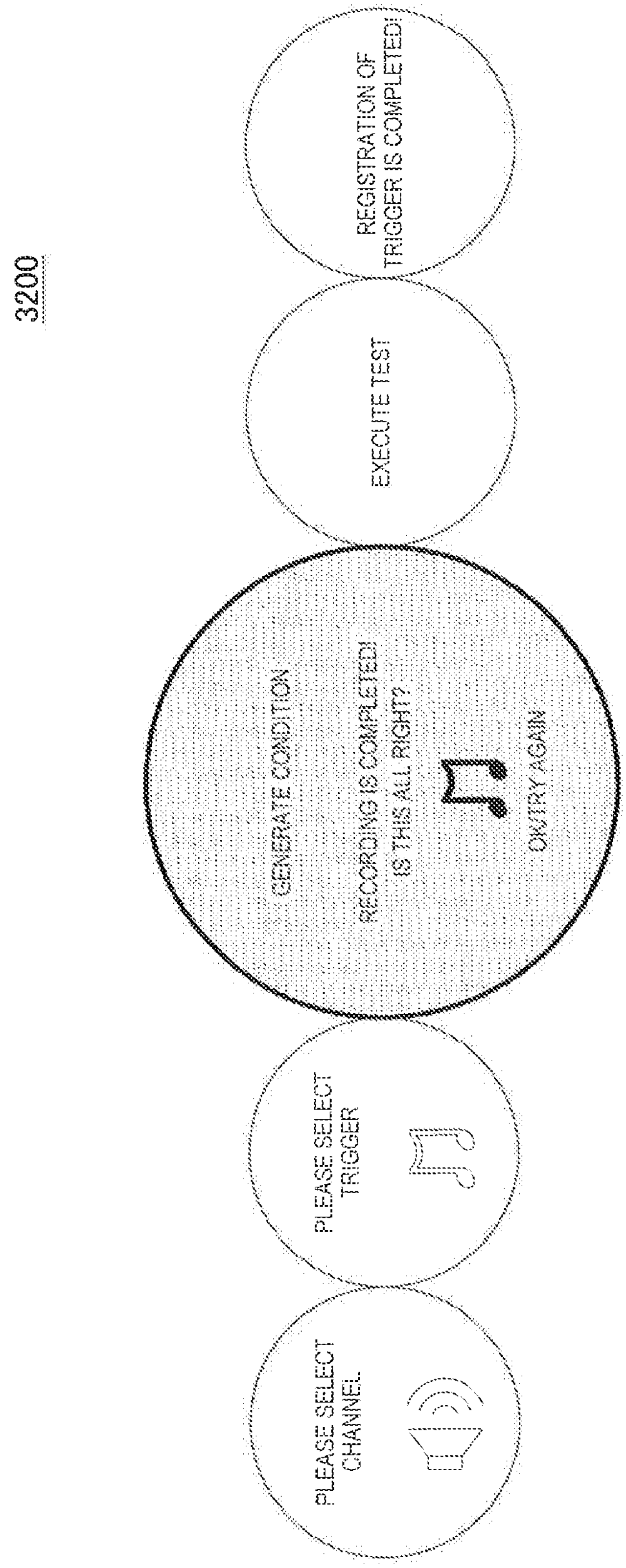

FIG. 167 is an explanatory diagram illustrating an example of a GUI.

Figure 168:
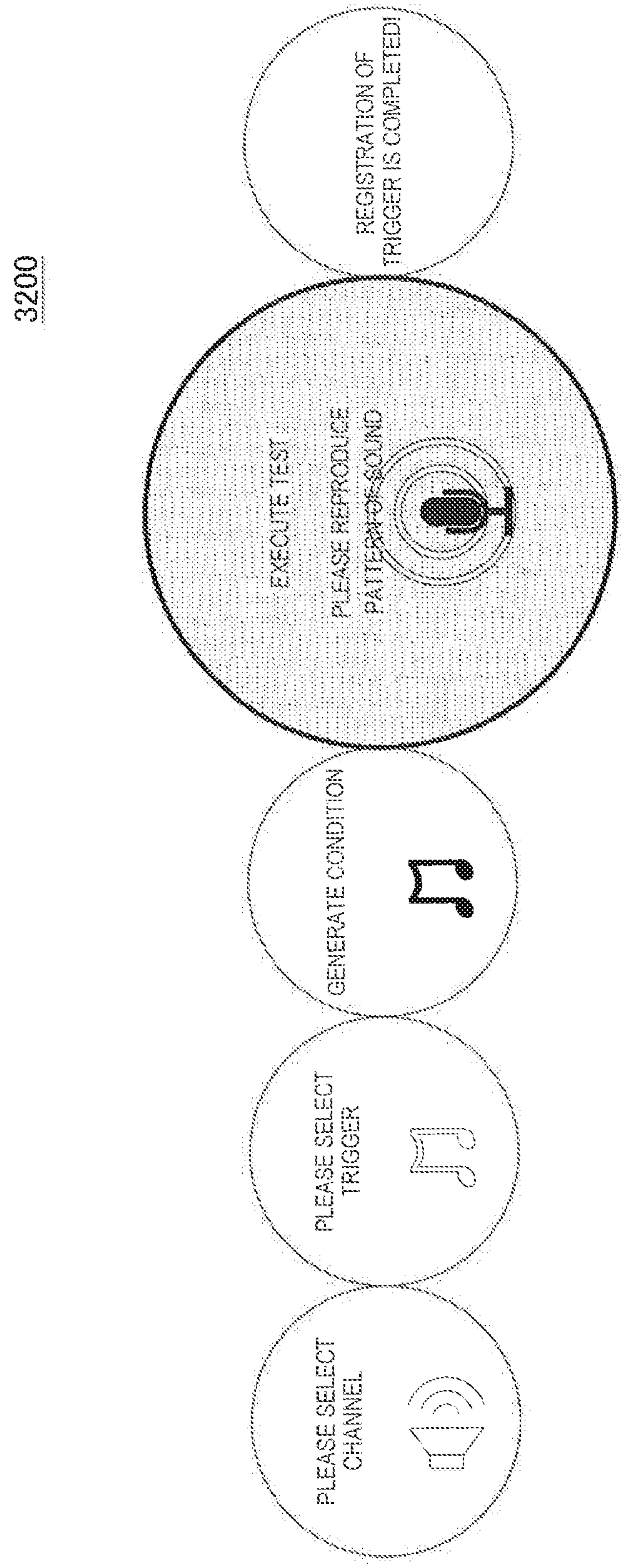

FIG. 168 is an explanatory diagram illustrating an example of a GUI.

Figure 169:
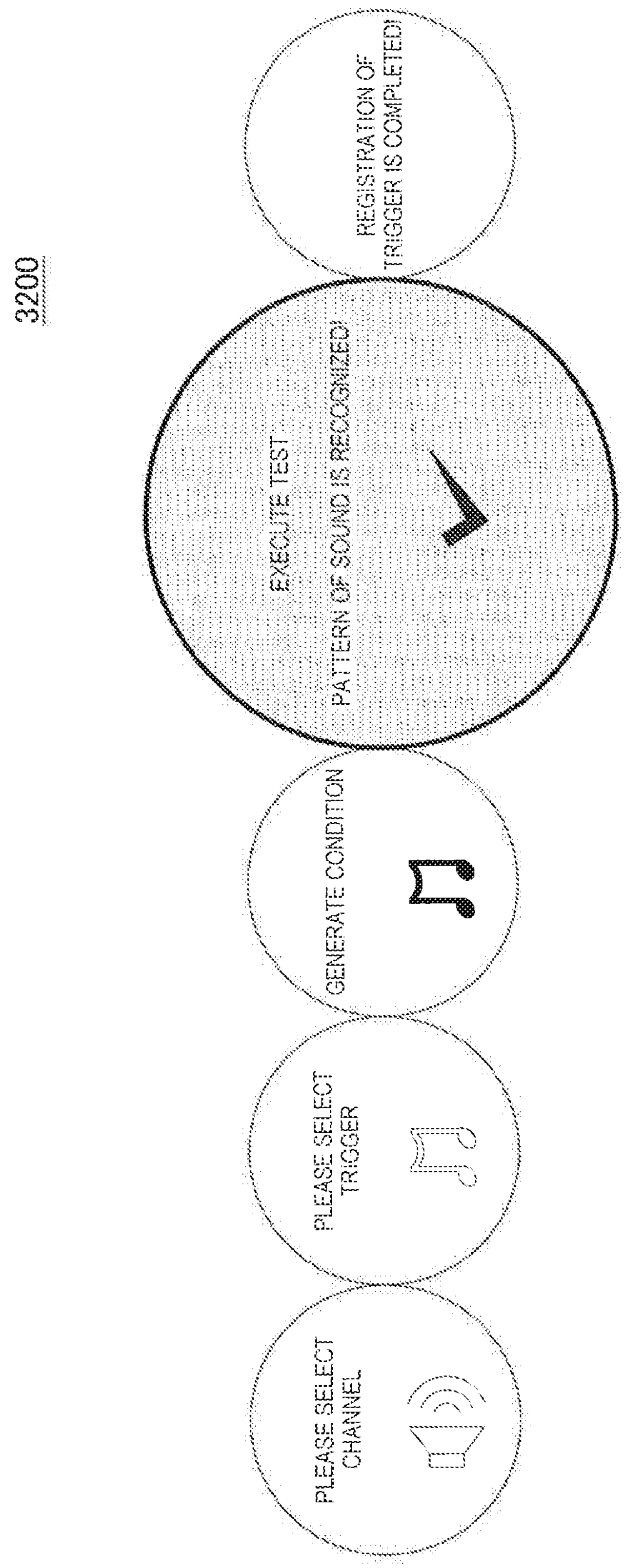

FIG. 169 is an explanatory diagram illustrating an example of a GUI.

Figure 170:
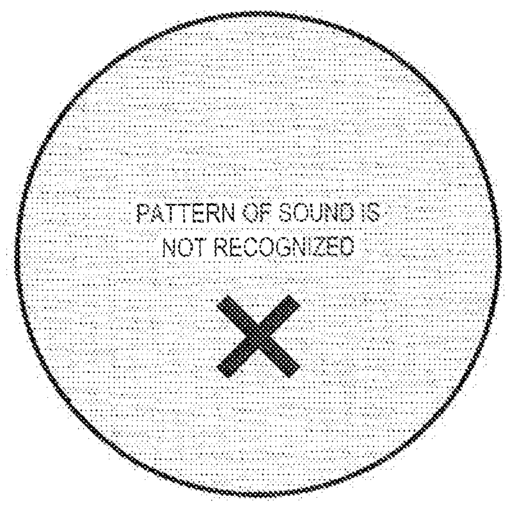

FIG. 170 is an explanatory diagram illustrating an example of a GUI.

Figure 171:
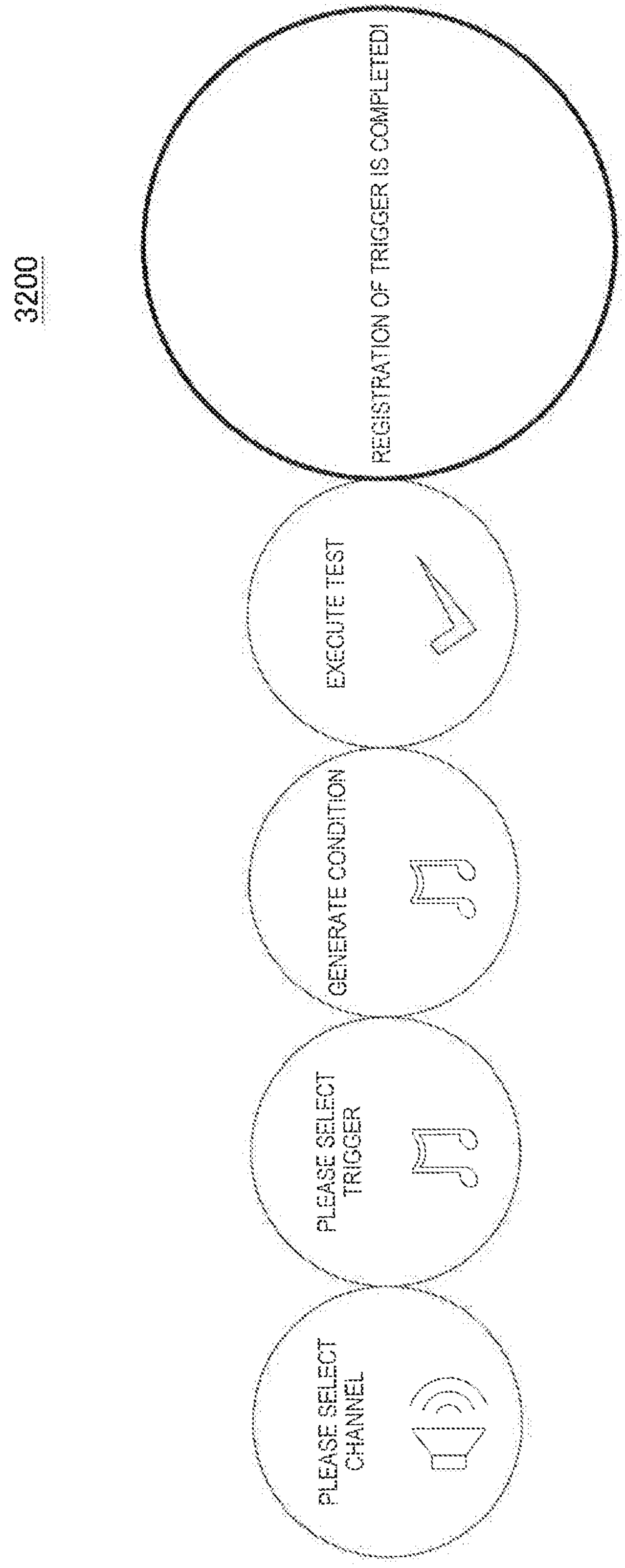

FIG. 171 is an explanatory diagram illustrating an example of a GUI.

Figure 172:
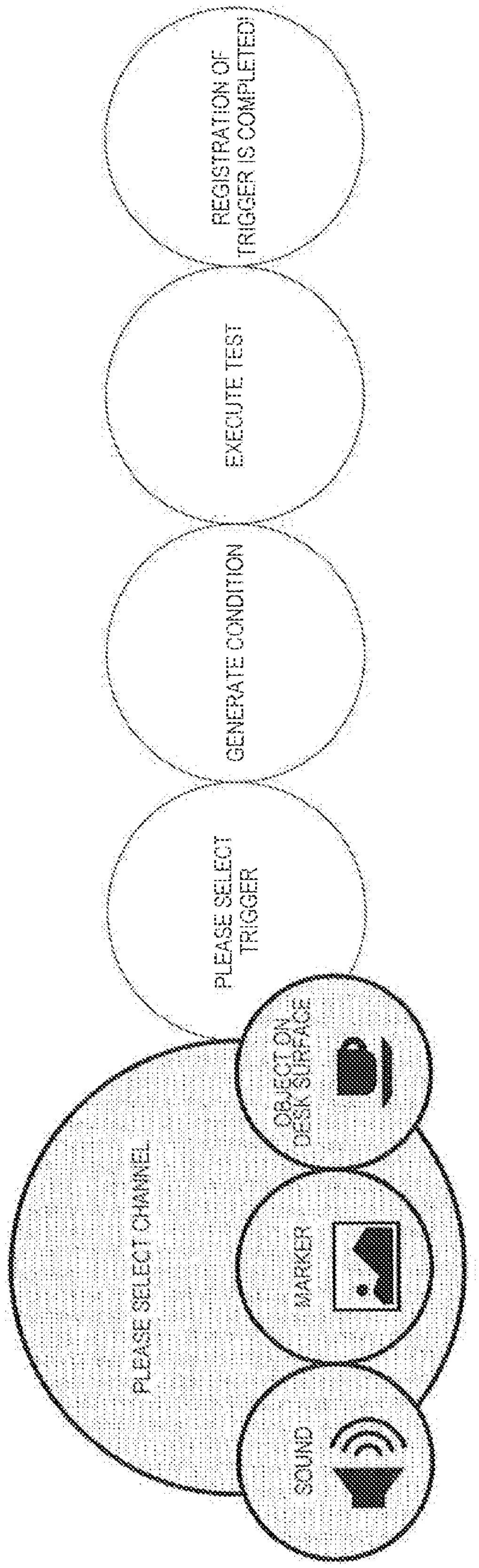

FIG. 172 is an explanatory diagram illustrating an example of a GUI.

Figure 173:
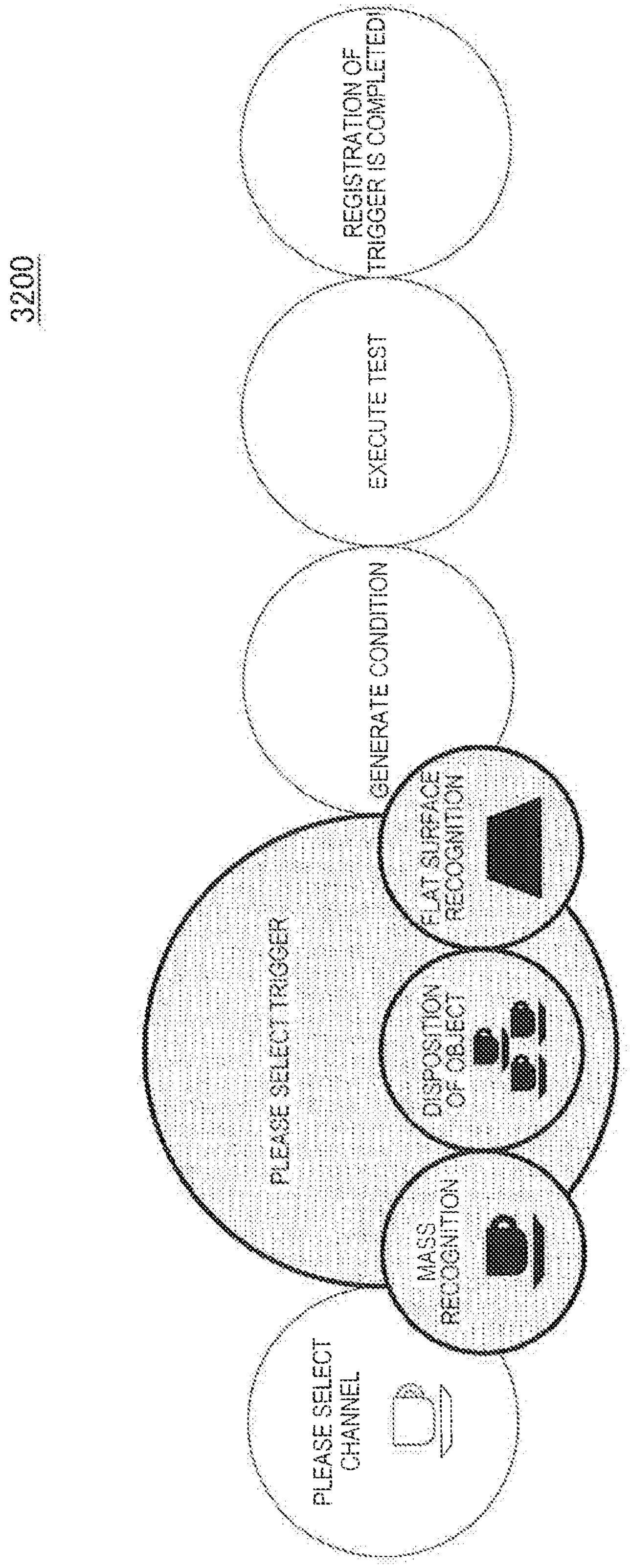

FIG. 173 is an explanatory diagram illustrating an example of a GUI.

Figure 174:
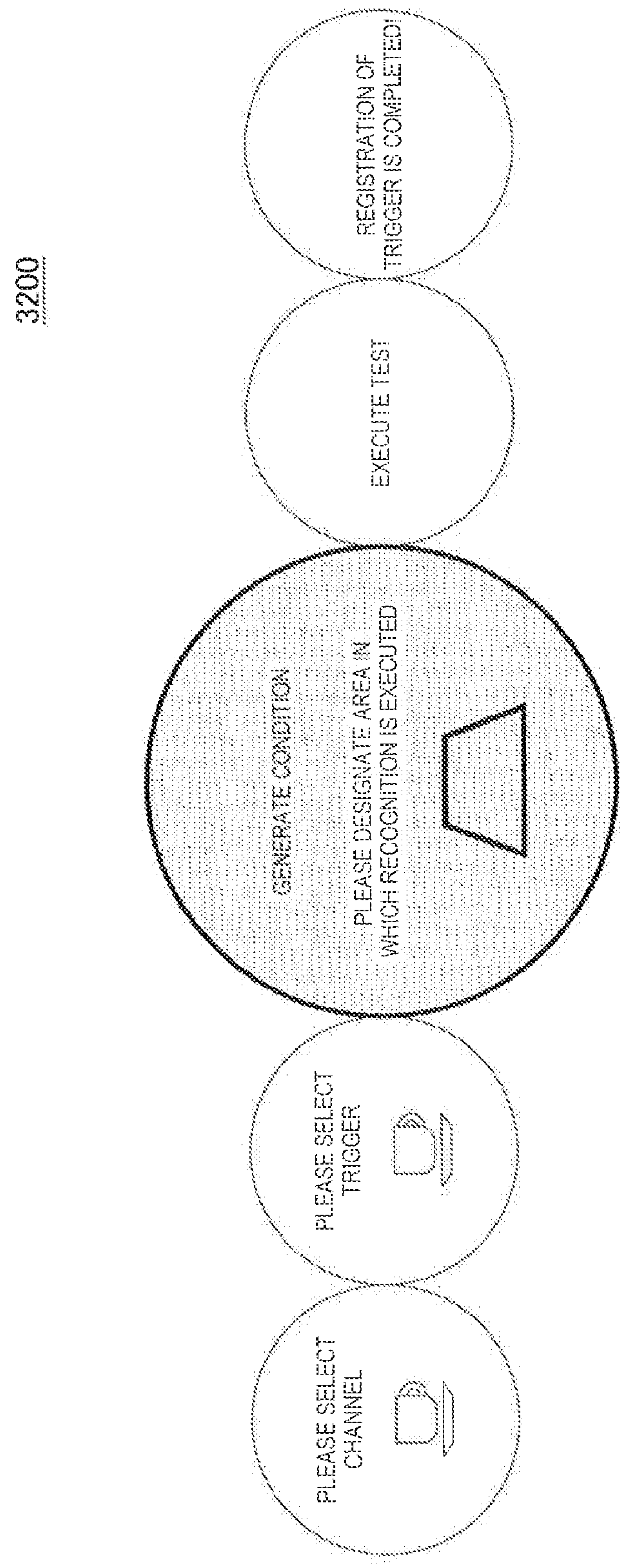

FIG. 174 is an explanatory diagram illustrating an example of a GUI.

Figure 175:
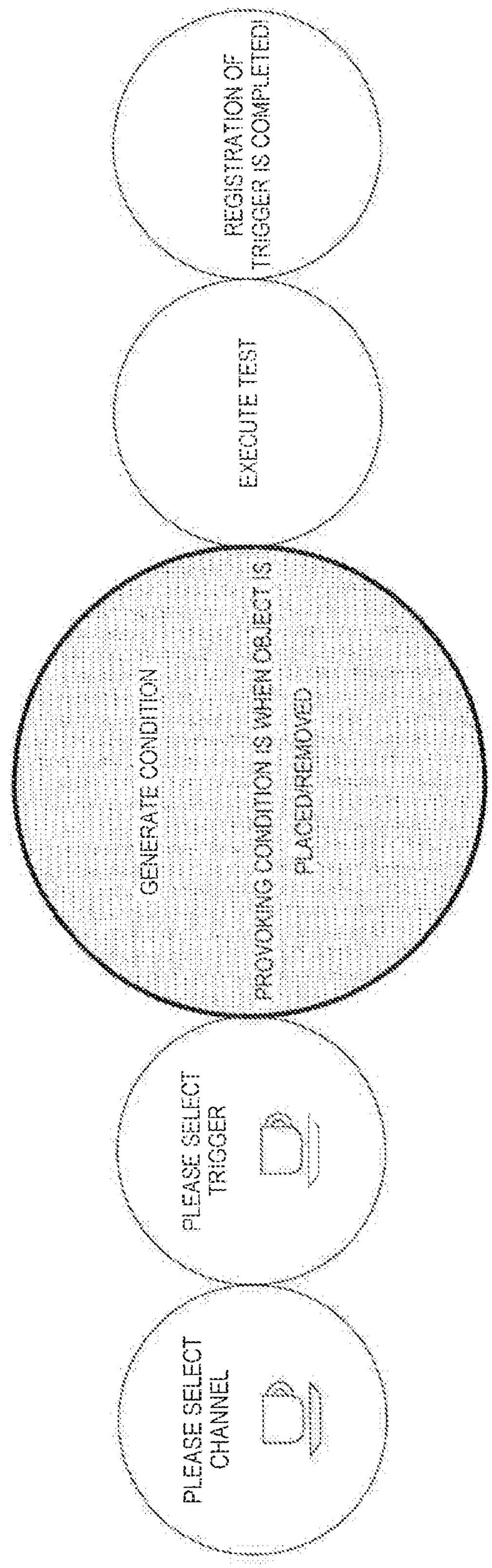

FIG. 175 is an explanatory diagram illustrating an example of a GUI.

Figure 176:
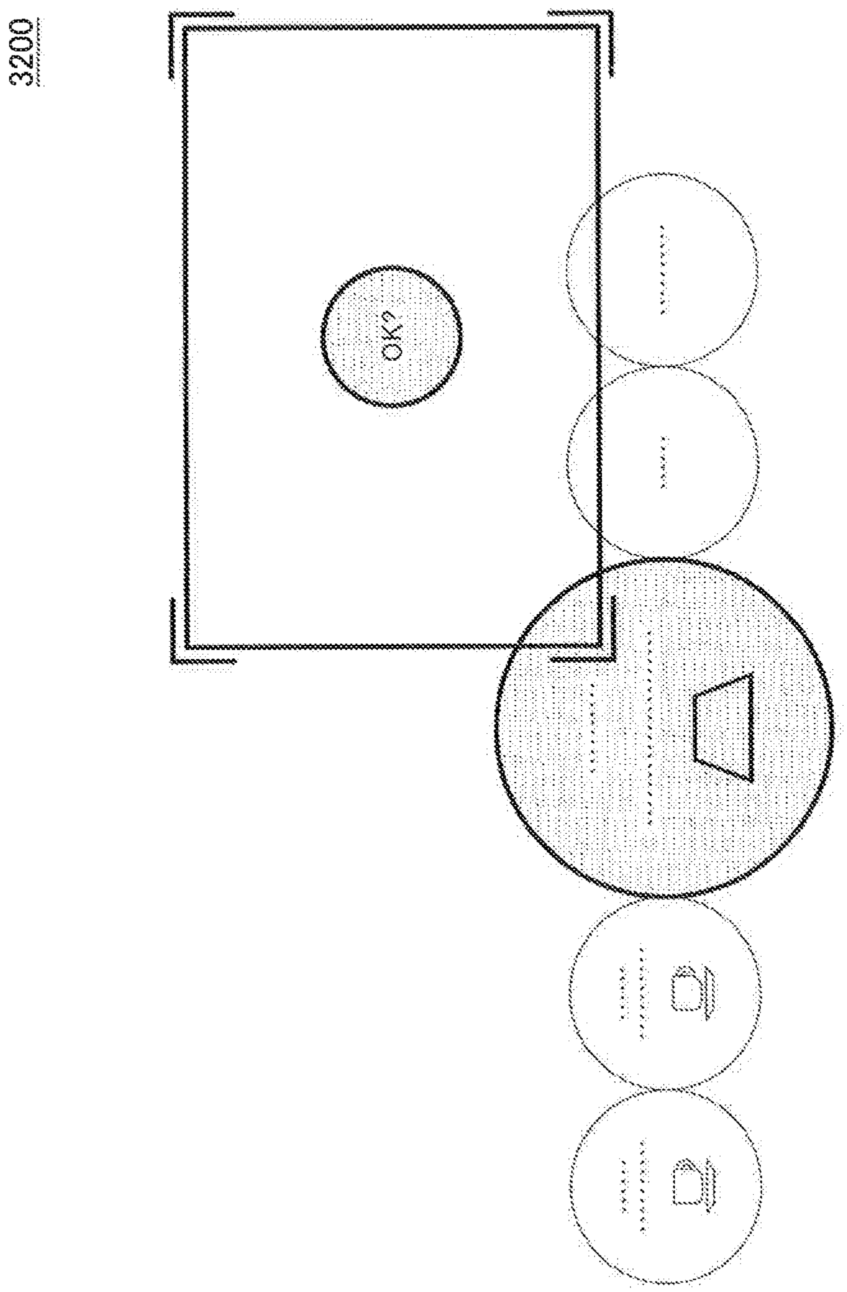

FIG. 176 is an explanatory diagram illustrating an example of a GUI.

Figure 177:
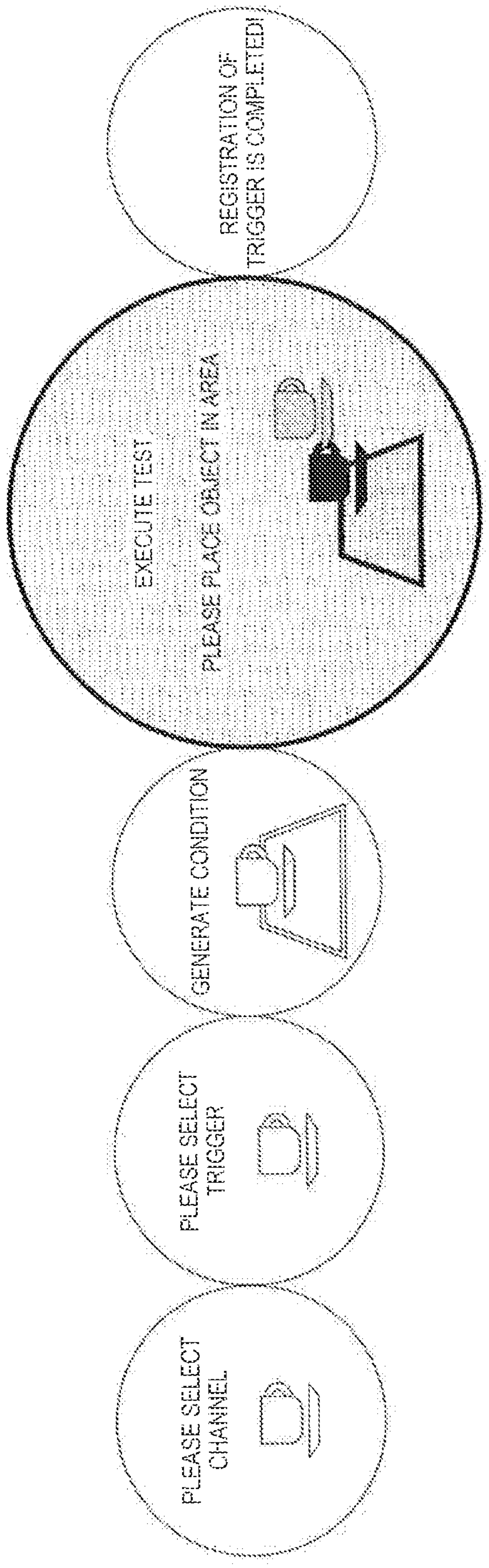

FIG. 177 is an explanatory diagram illustrating an example of a GUI.

Figure 178:
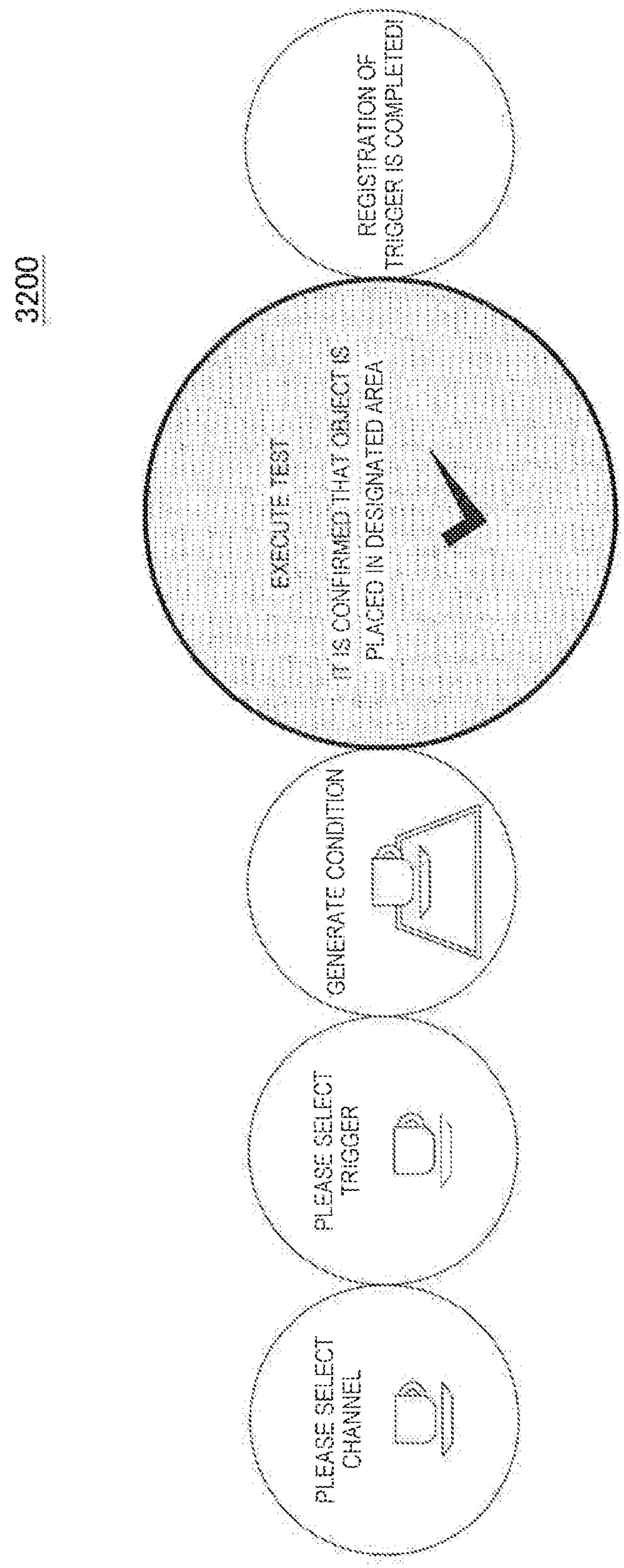

FIG. 178 is an explanatory diagram illustrating an example of a GUI.

Figure 179:
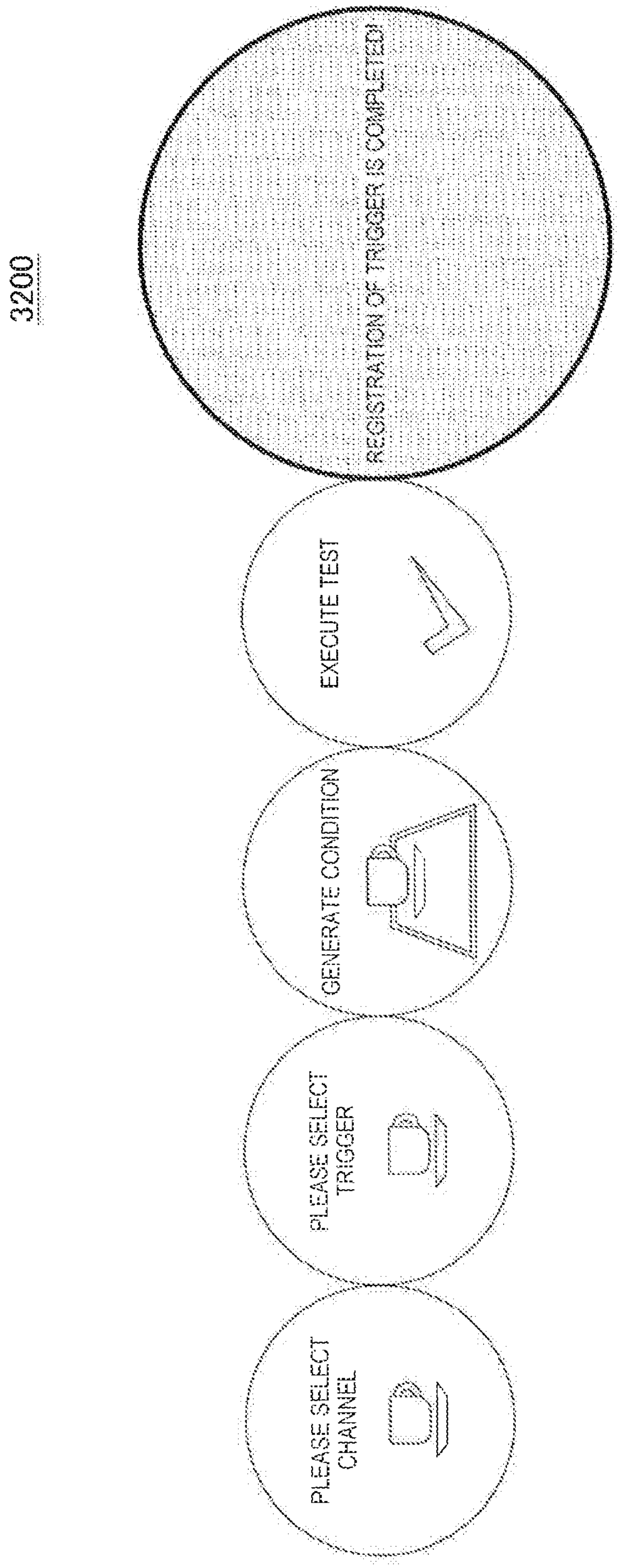

FIG. 179 is an explanatory diagram illustrating an example of a GUI.

Figure 180:
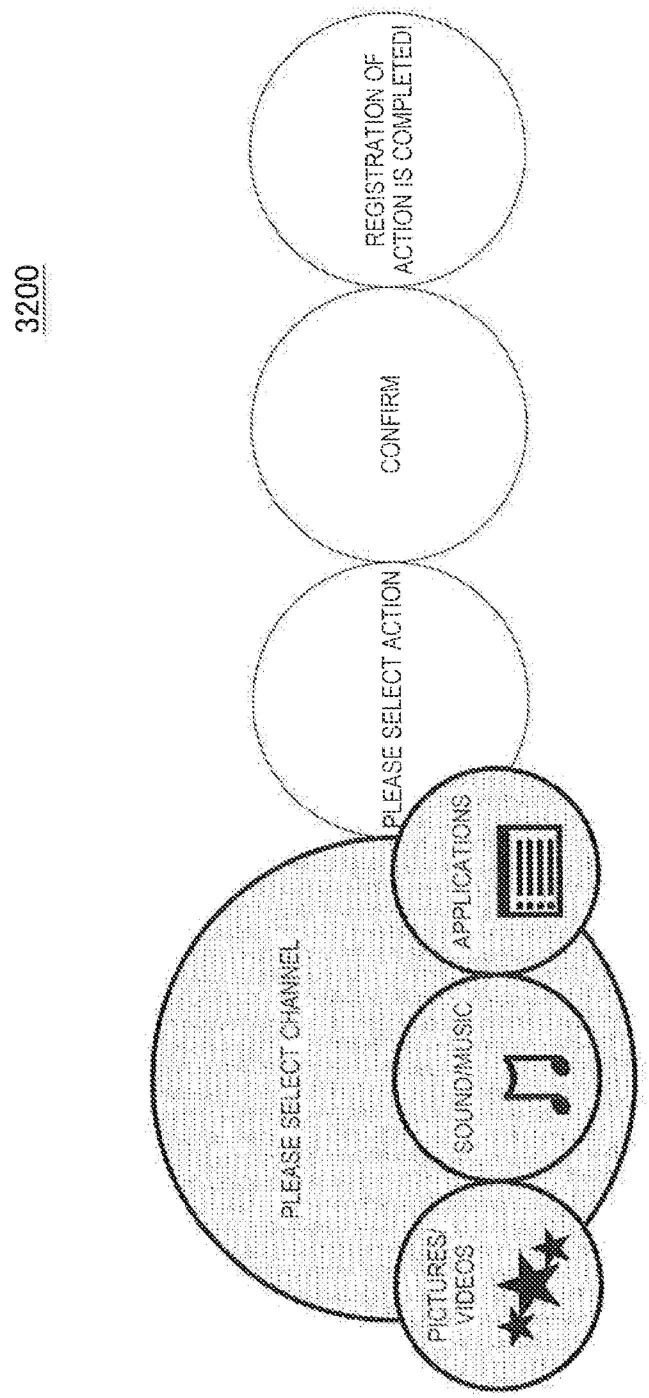

FIG. 180 is an explanatory diagram illustrating an example of a GUI.

Figure 181:
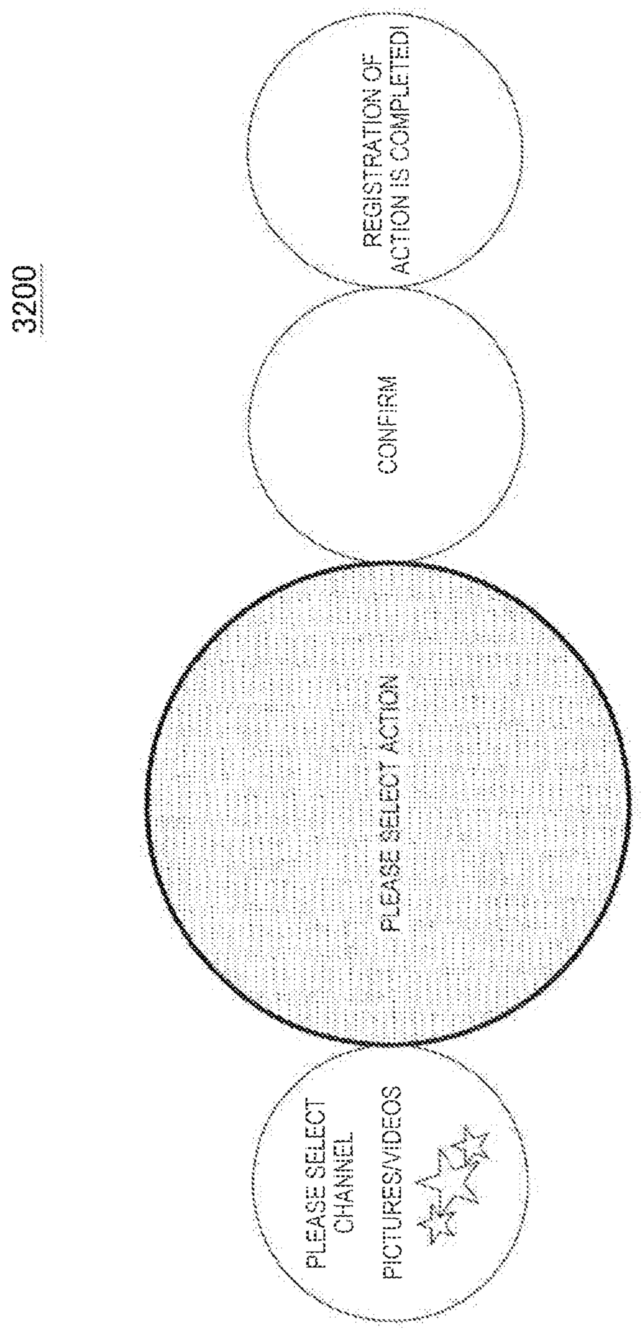

FIG. 181 is an explanatory diagram illustrating an example of a GUI.

Figure 182:
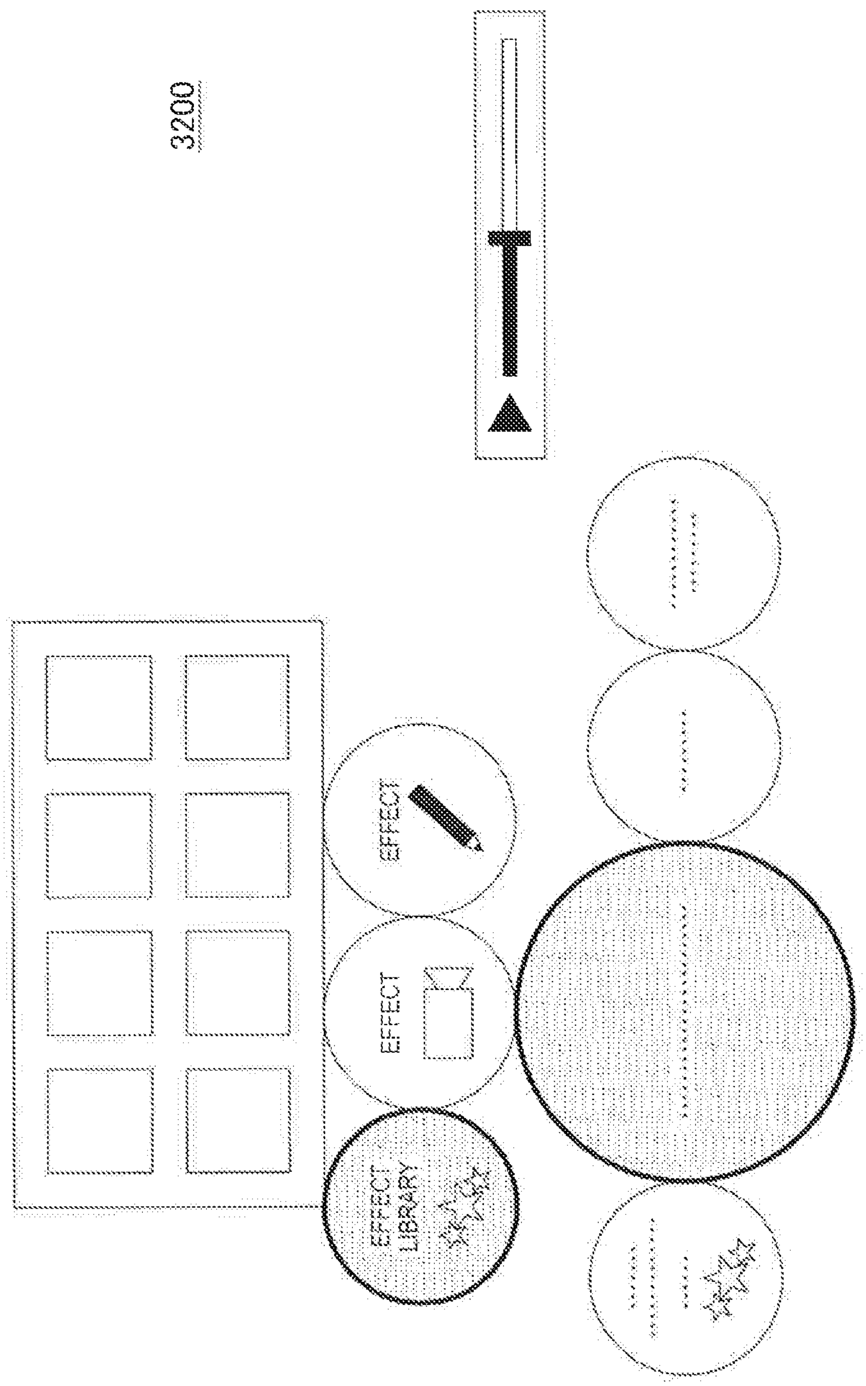

FIG. 182 is an explanatory diagram illustrating an example of a GUI.

Figure 183:
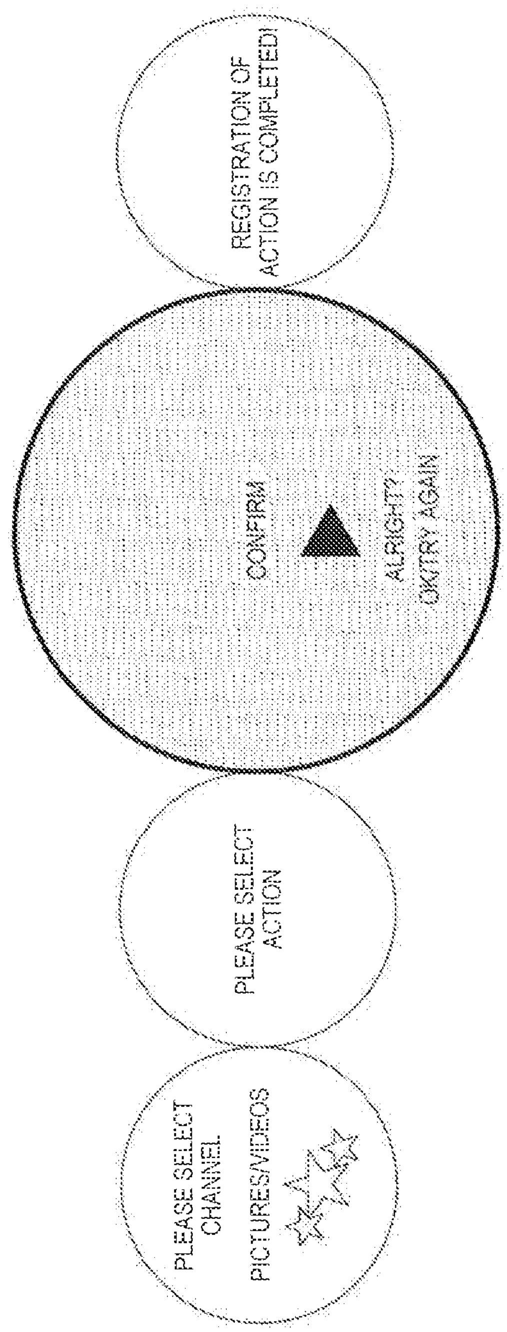

FIG. 183 is an explanatory diagram illustrating an example of a GUI.

Figure 184:
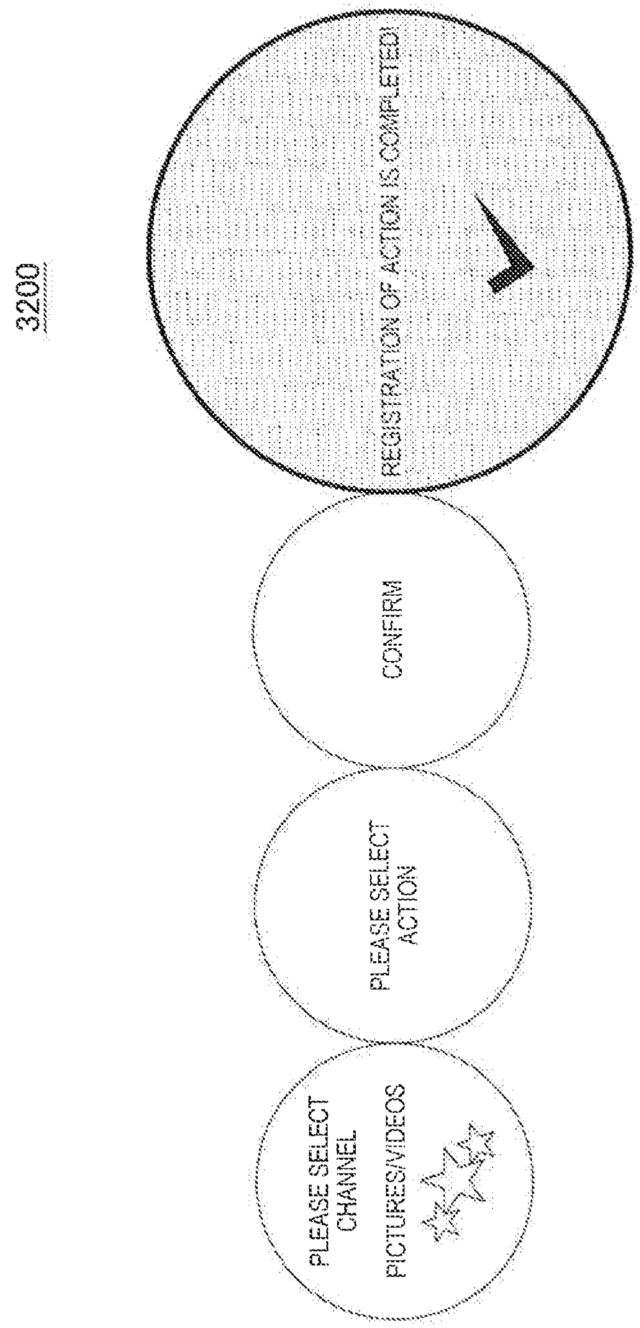

FIG. 184 is an explanatory diagram illustrating an example of a GUI.

Figure 185:
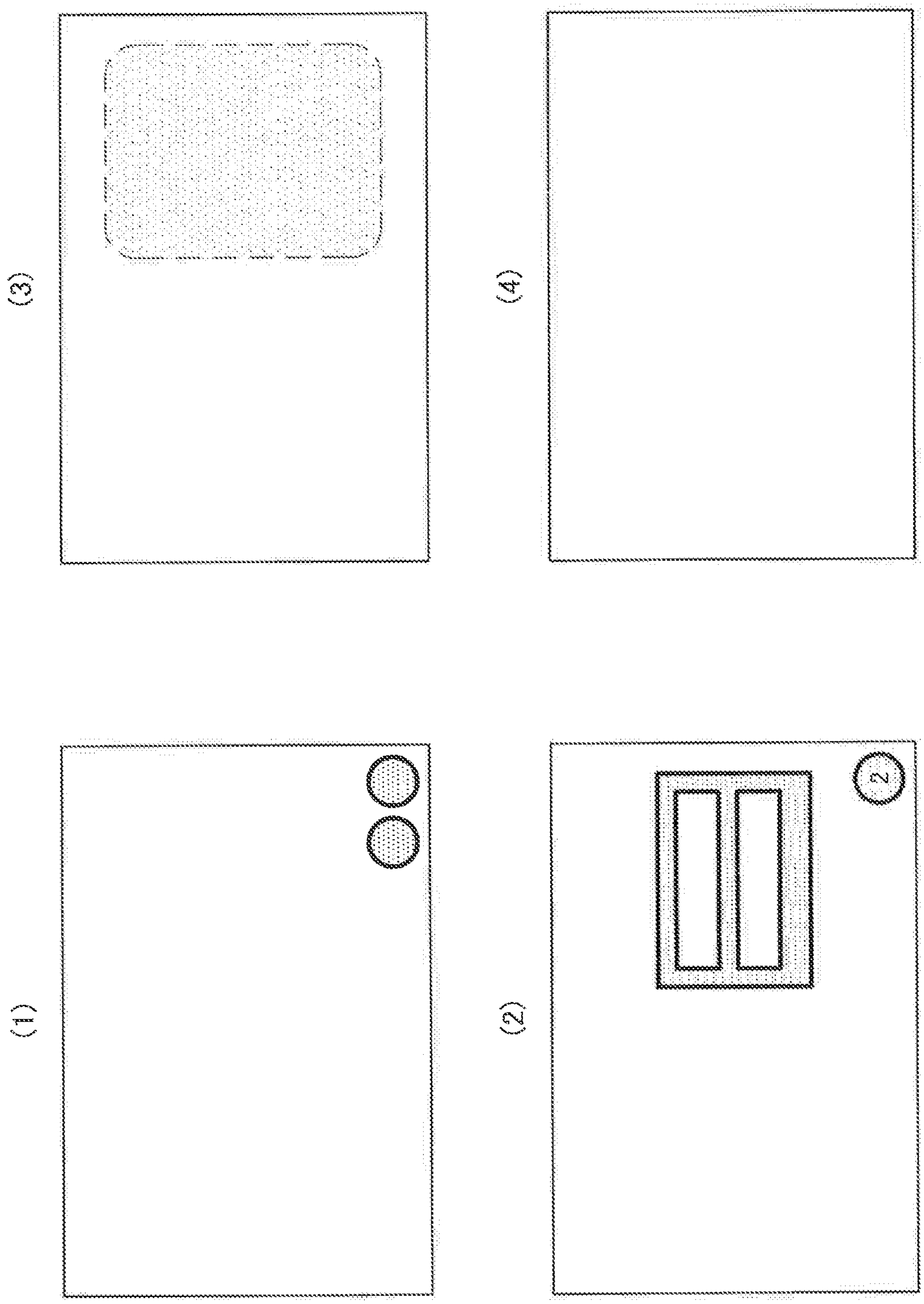

FIG. 185 is an explanatory diagram illustrating an example of visibility of a provoking function.

Figure 186:
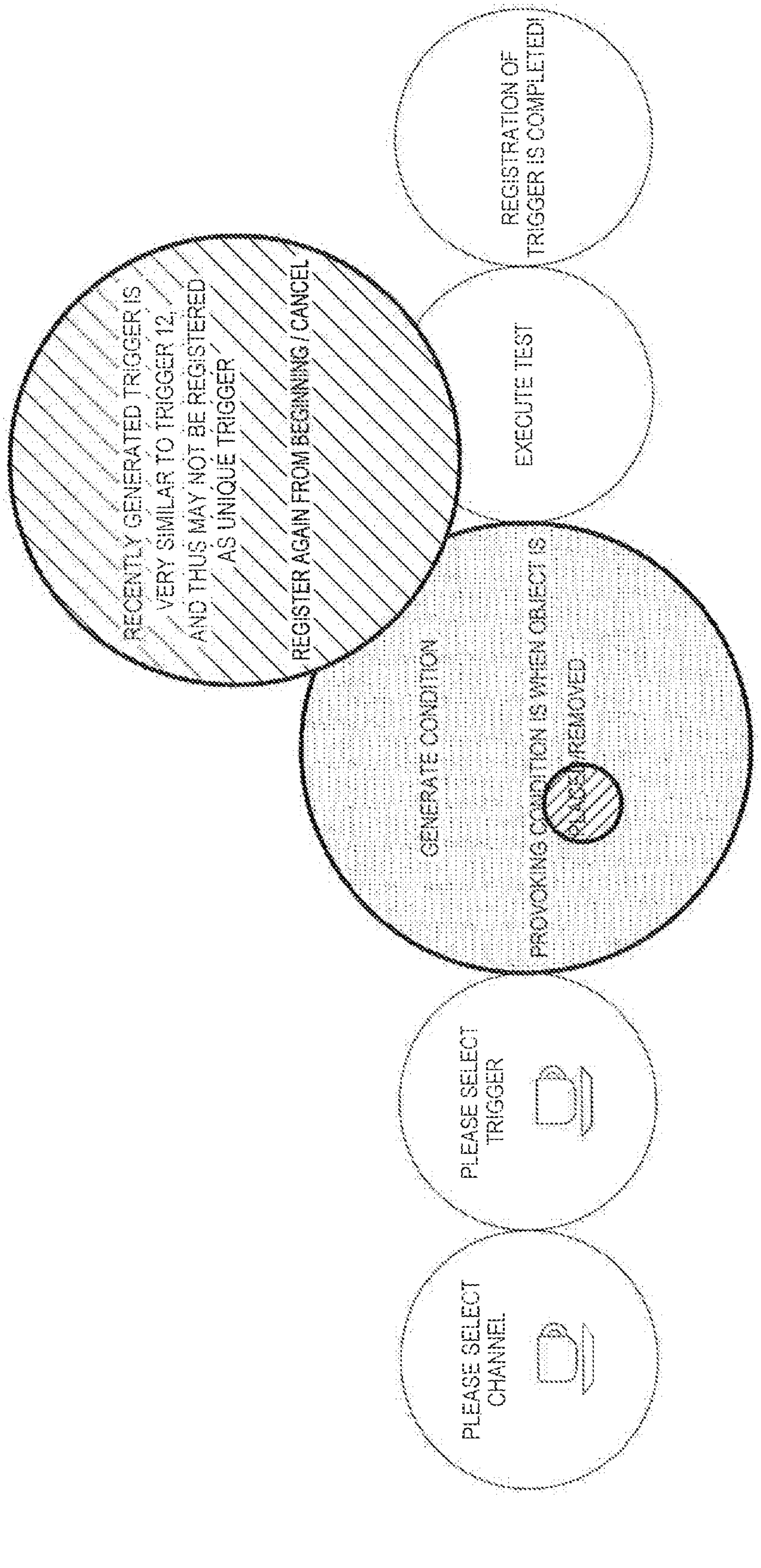

FIG. 186 is an explanatory diagram illustrating an example of a GUI.

Figure 187:
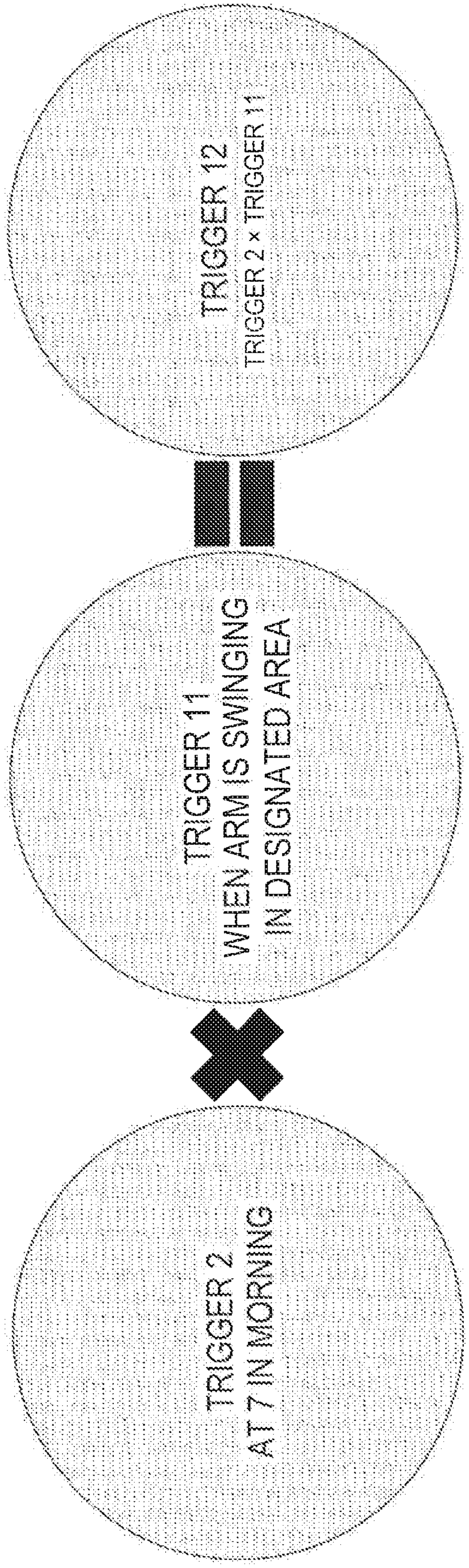

FIG. 187 is an explanatory diagram illustrating an example of a combination of triggers.

Figure 188:
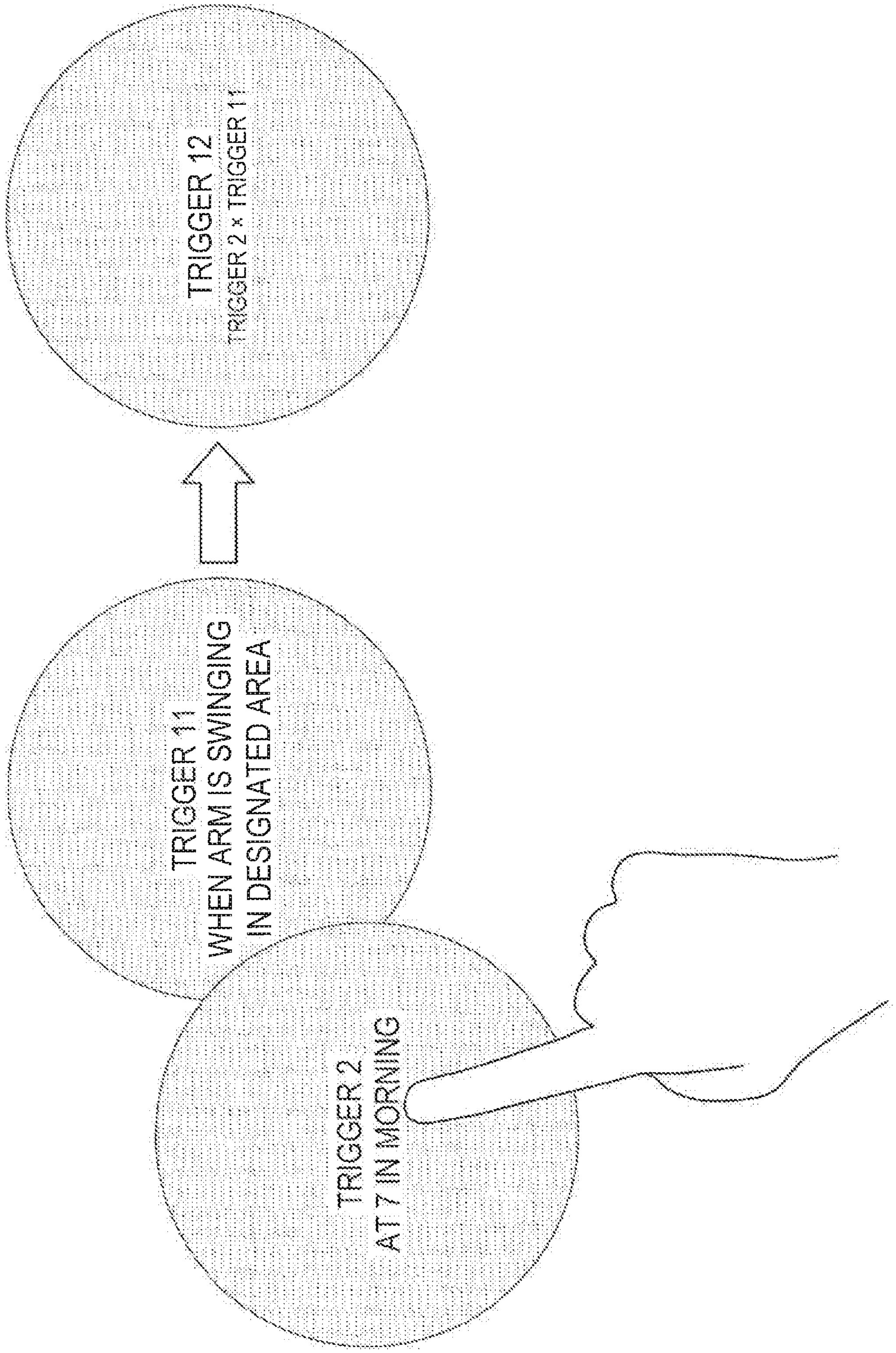

FIG. 188 is an explanatory diagram illustrating an example of a GUI.

Figure 189:
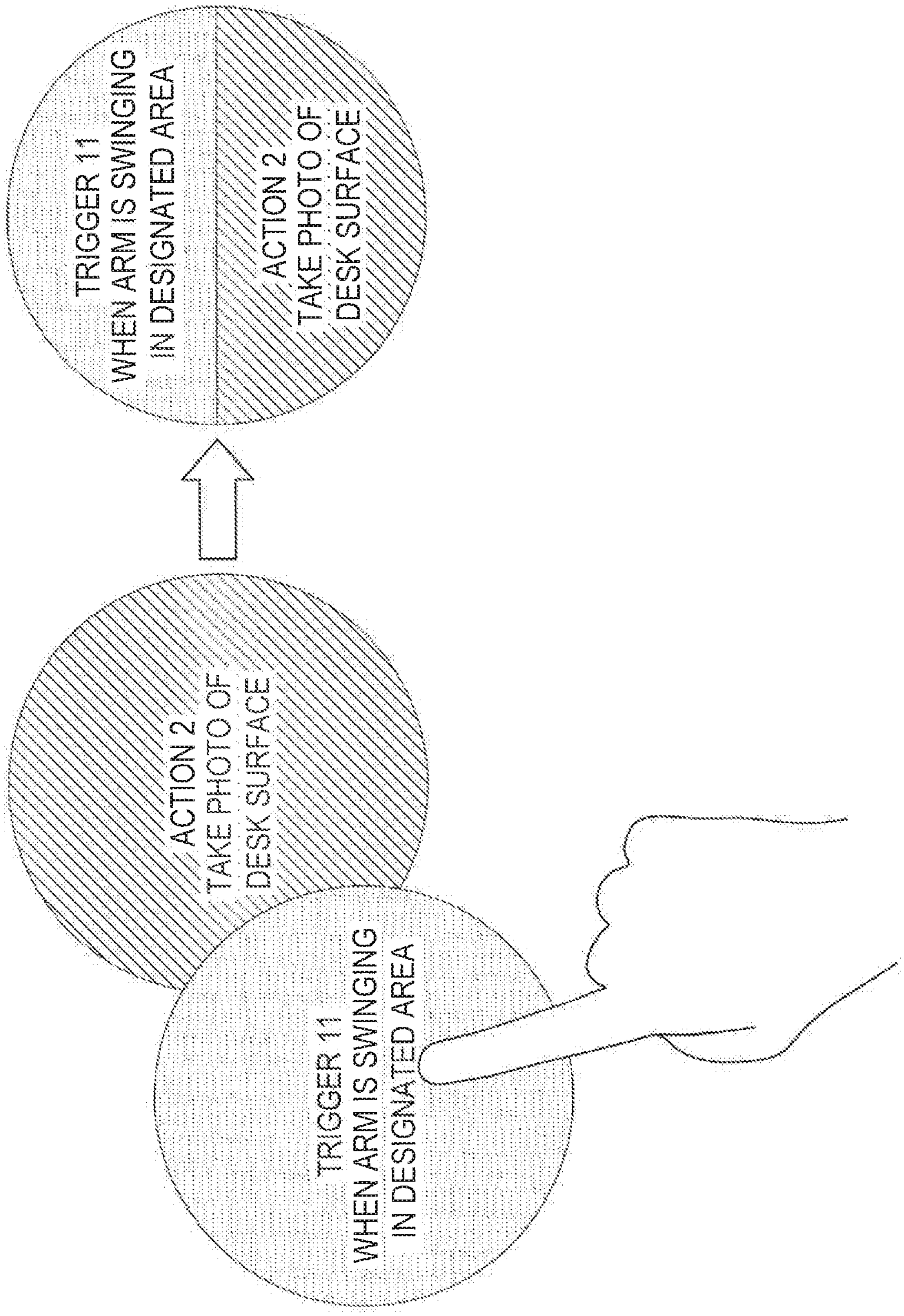

FIG. 189 is an explanatory diagram illustrating an example of a GUI.

Figure 190:
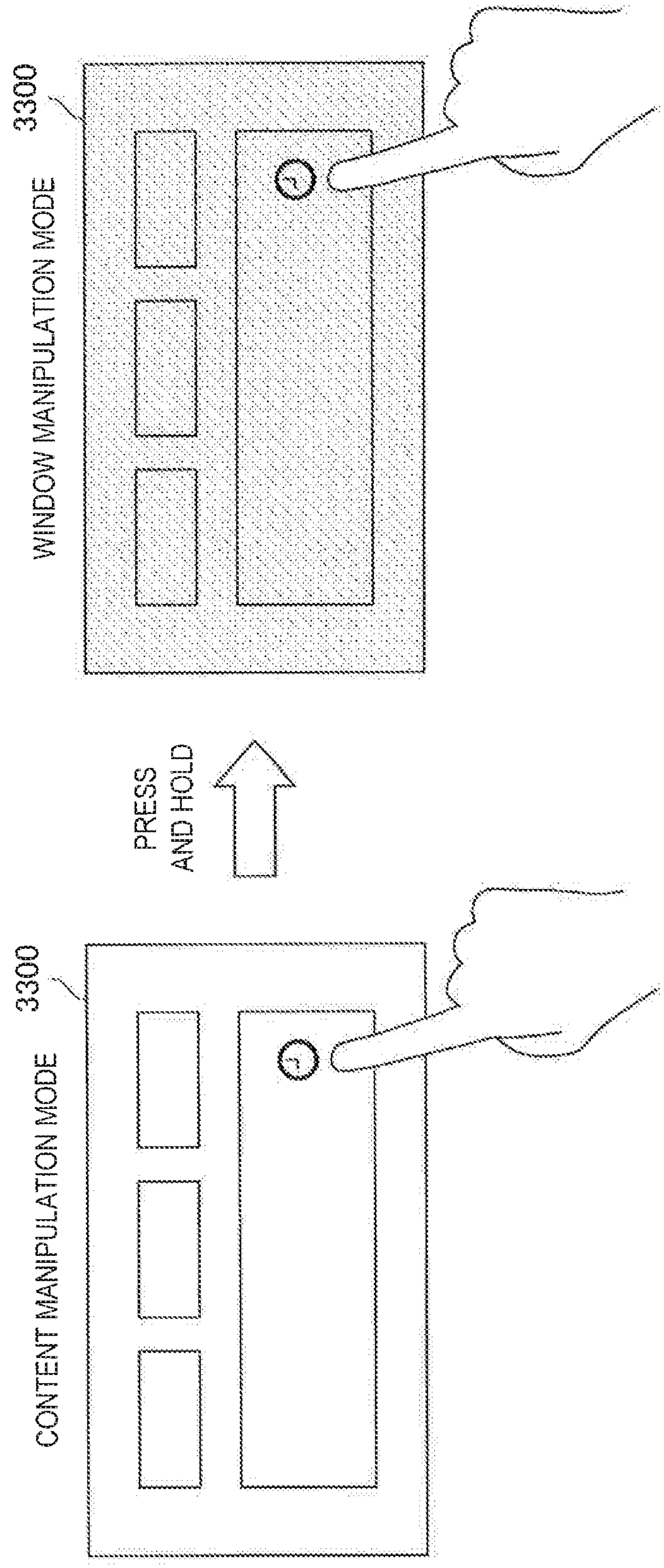

FIG. 190 is an explanatory diagram illustrating an example of a manipulation method and a mode of a window.

FIG. 191 is an explanatory diagram illustrating an example of a manipulation method and a mode of a window.

Figure 192:
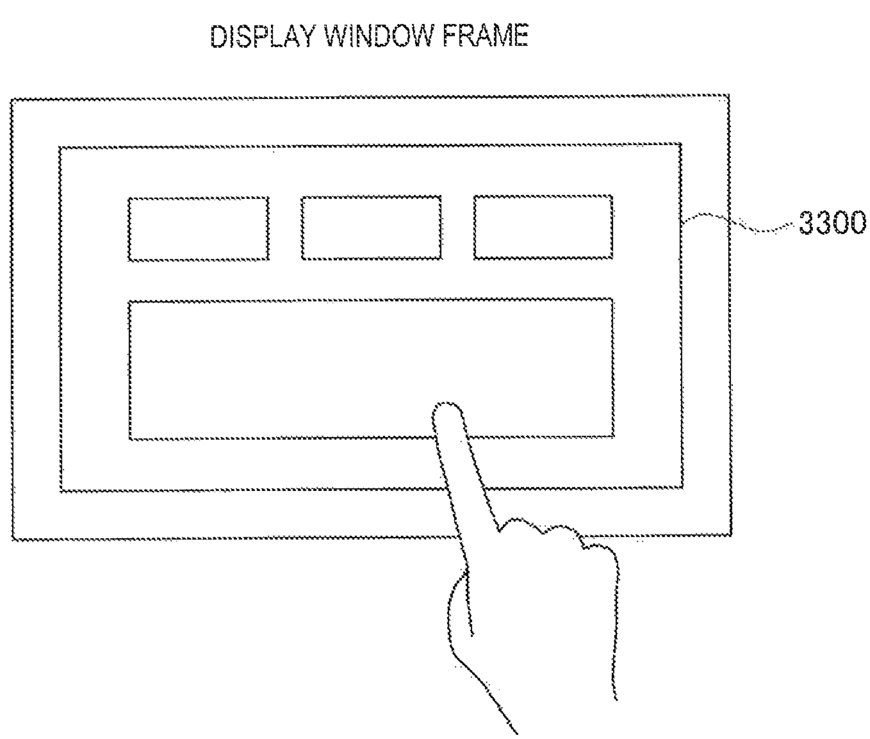

FIG. 192 is an explanatory diagram illustrating an example of a manipulation method and a mode of a window.

FIG. 193 is an explanatory diagram illustrating an example of a manipulation method and a mode of a window.

Figure 194:
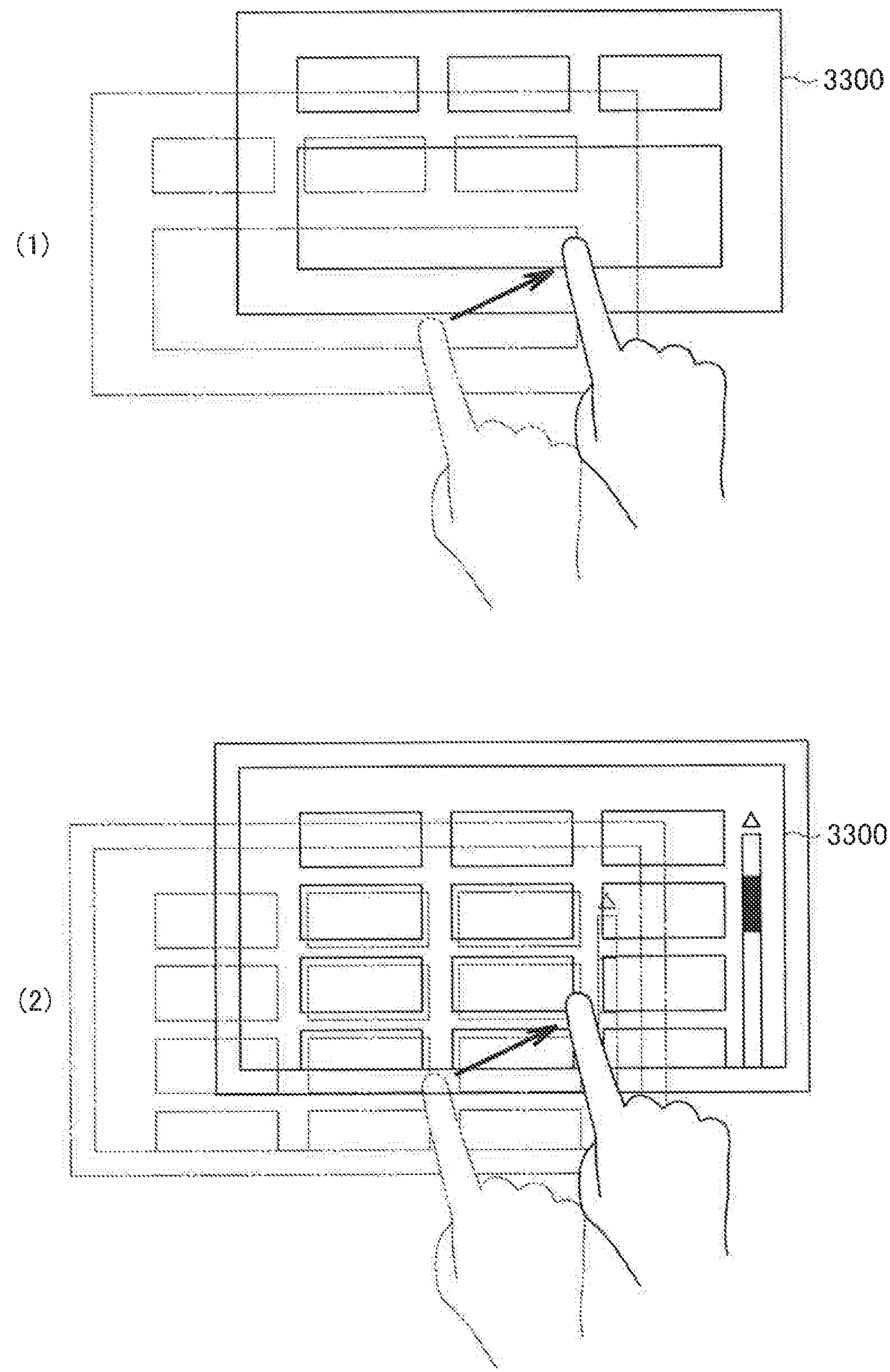

FIG. 194 is an explanatory diagram illustrating an example of a manipulation of a window.

Figure 195:
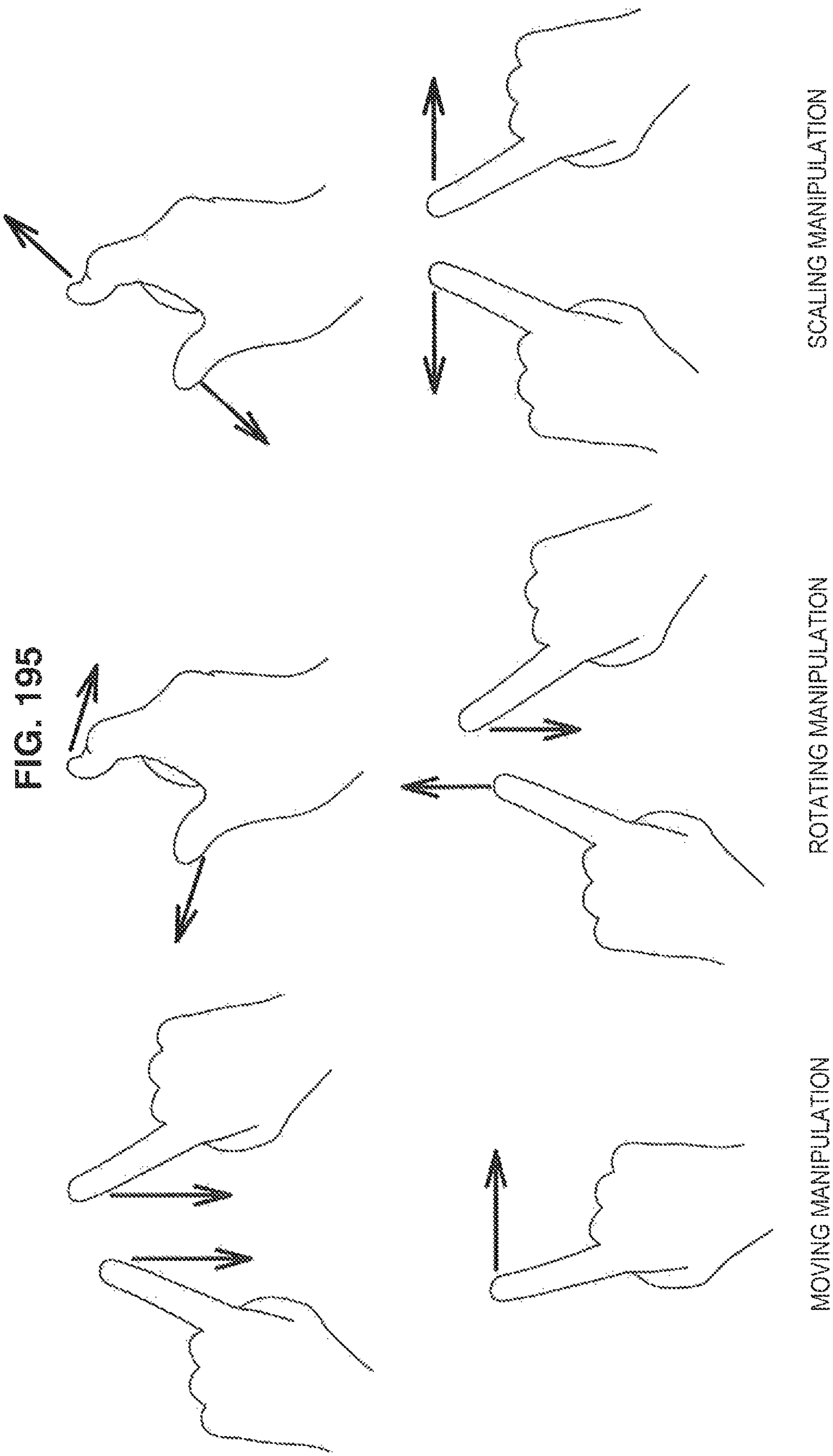

FIG. 195 is an explanatory diagram illustrating manipulations by a user.

Figure 196:
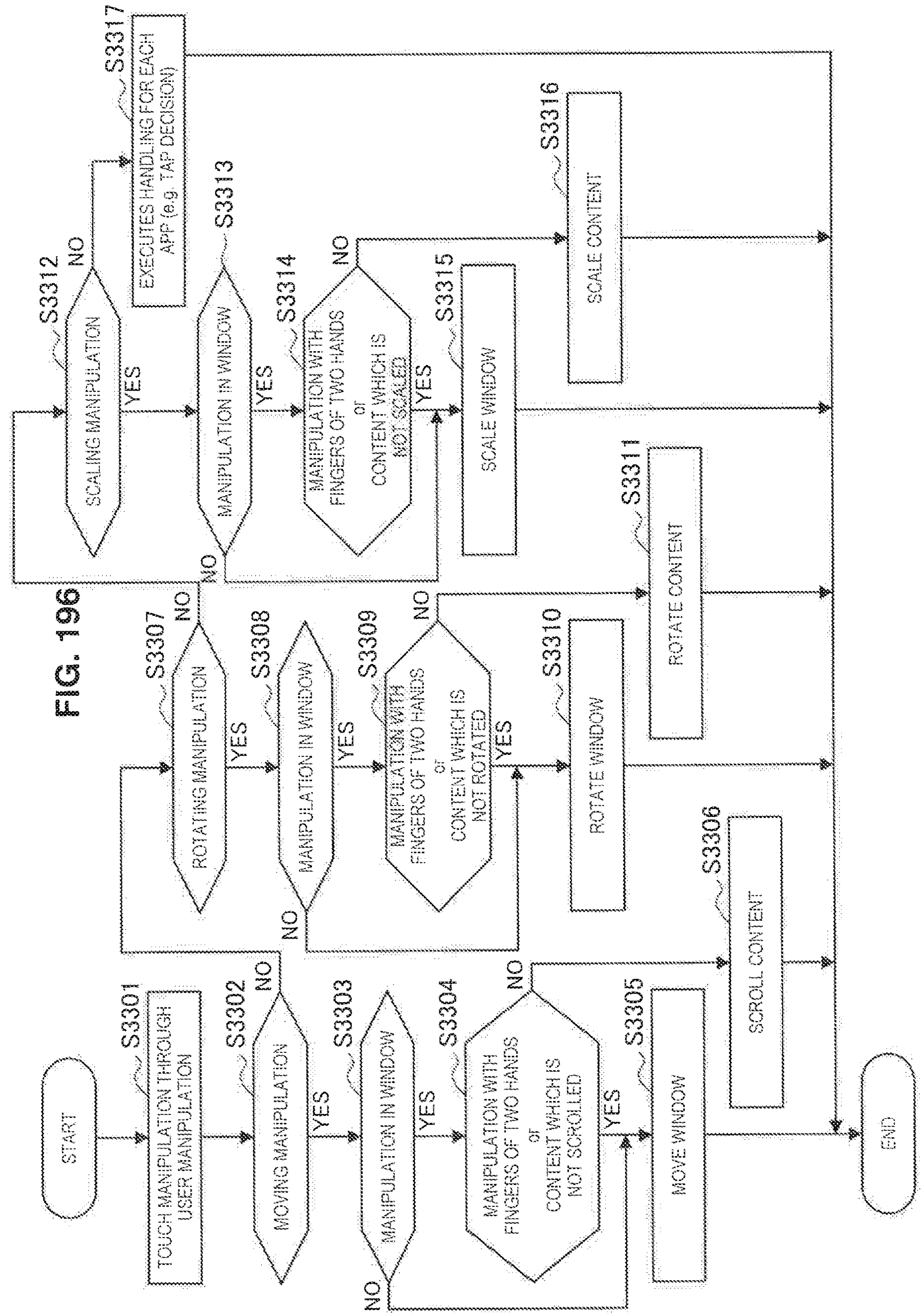

FIG. 196 is a flowchart illustrating an example of an operation of the information processing system 100 according to an embodiment of the present disclosure.

Figure 197:
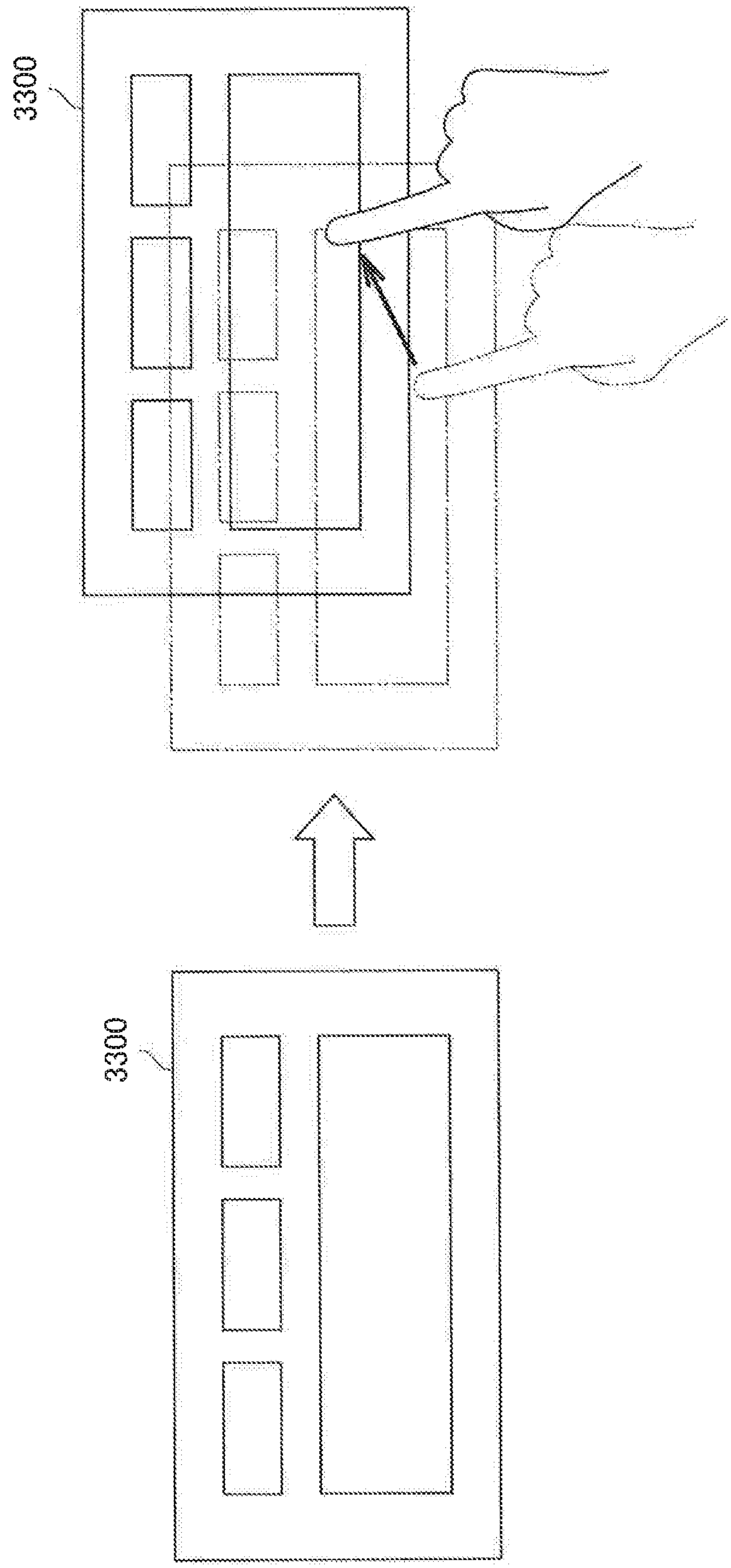

FIG. 197 is an explanatory diagram illustrating an example of a manipulation on a window by the user.

Figure 198:
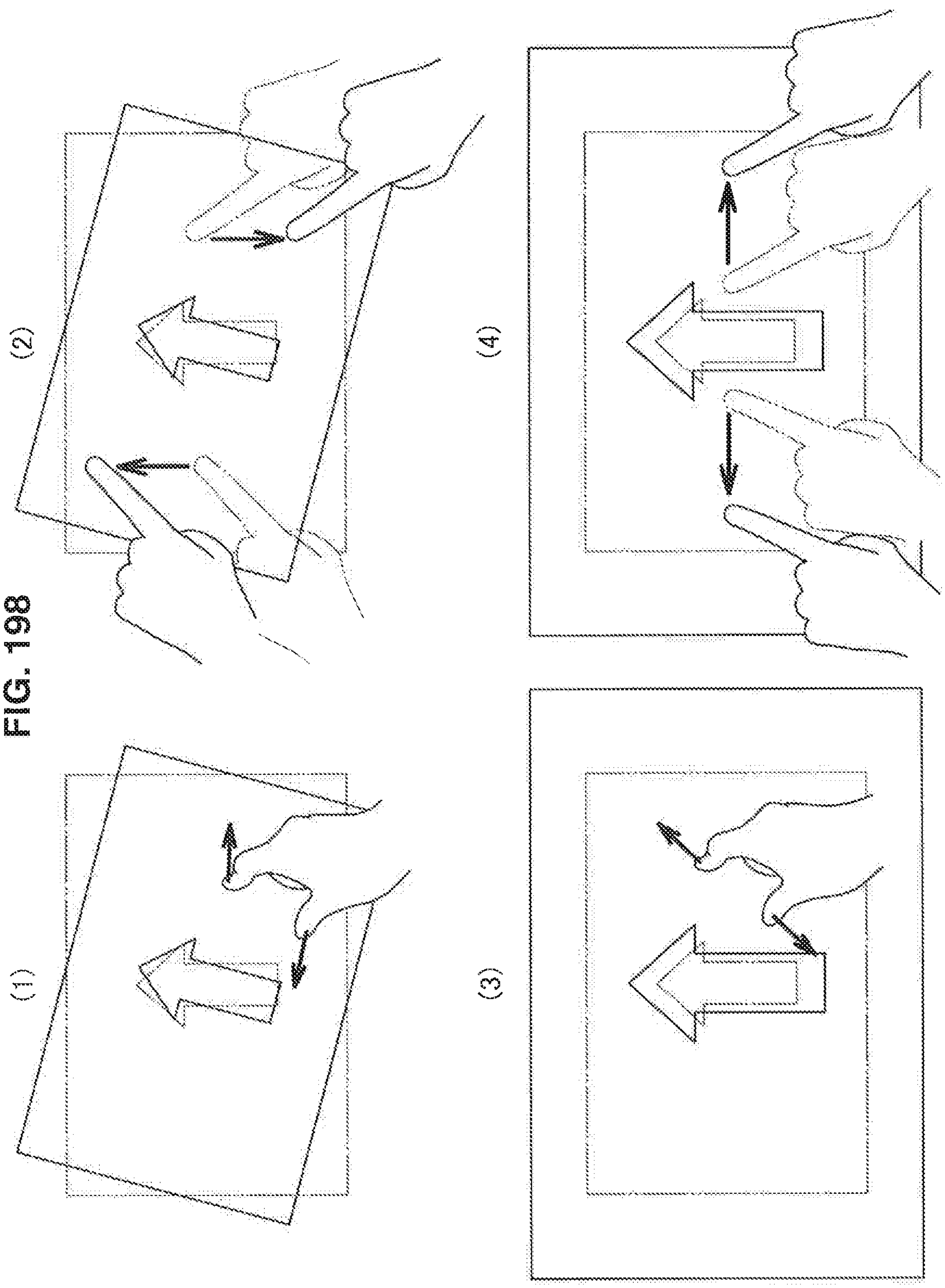

FIG. 198 is an explanatory diagram illustrating an example of a manipulation on a window by the user.

Figure 199:
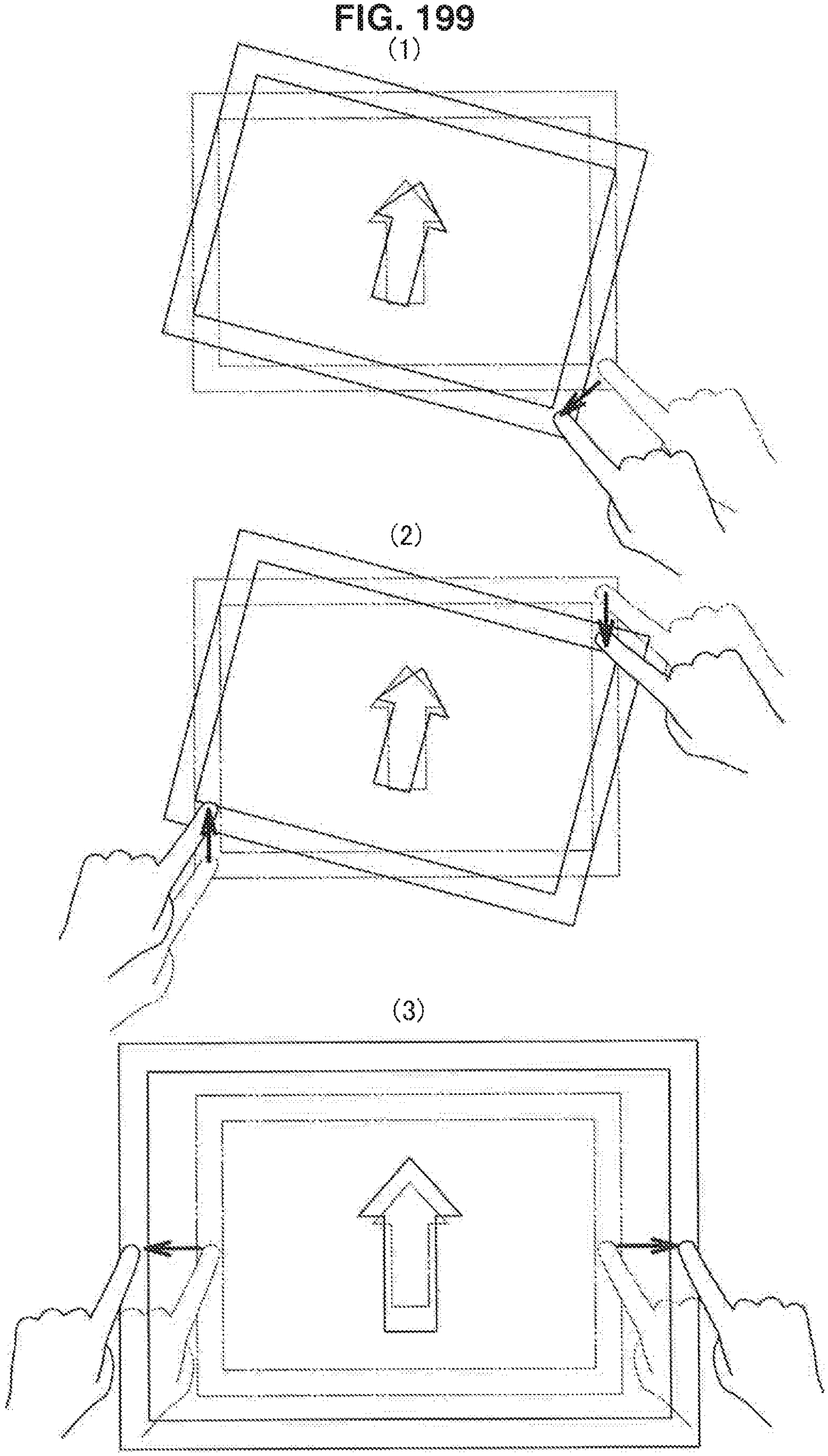

FIG. 199 is an explanatory diagram illustrating an example of a manipulation on a window by the user.

Figure 200:
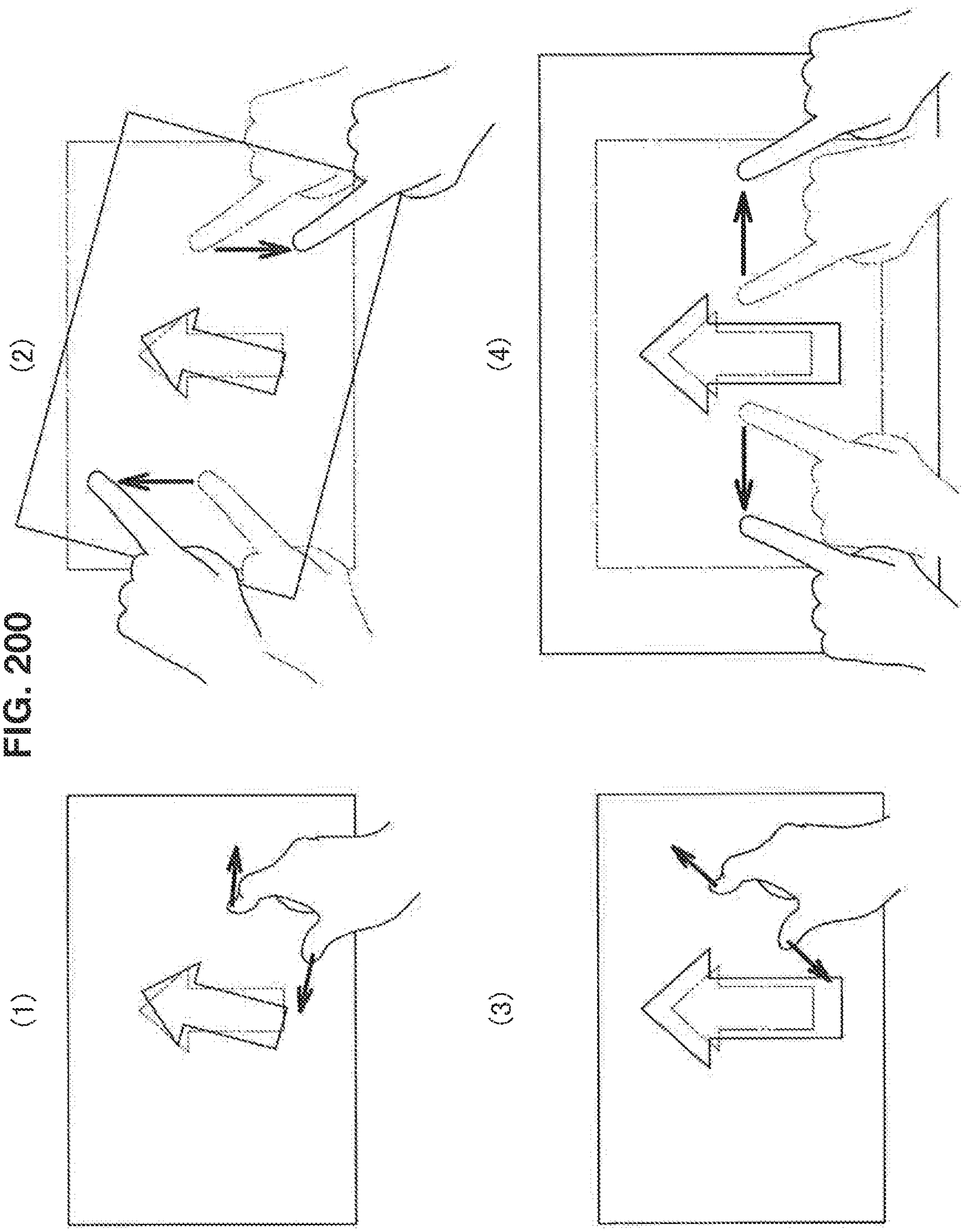

FIG. 200 is an explanatory diagram illustrating an example of a manipulation on a window by the user.

Figure 201:
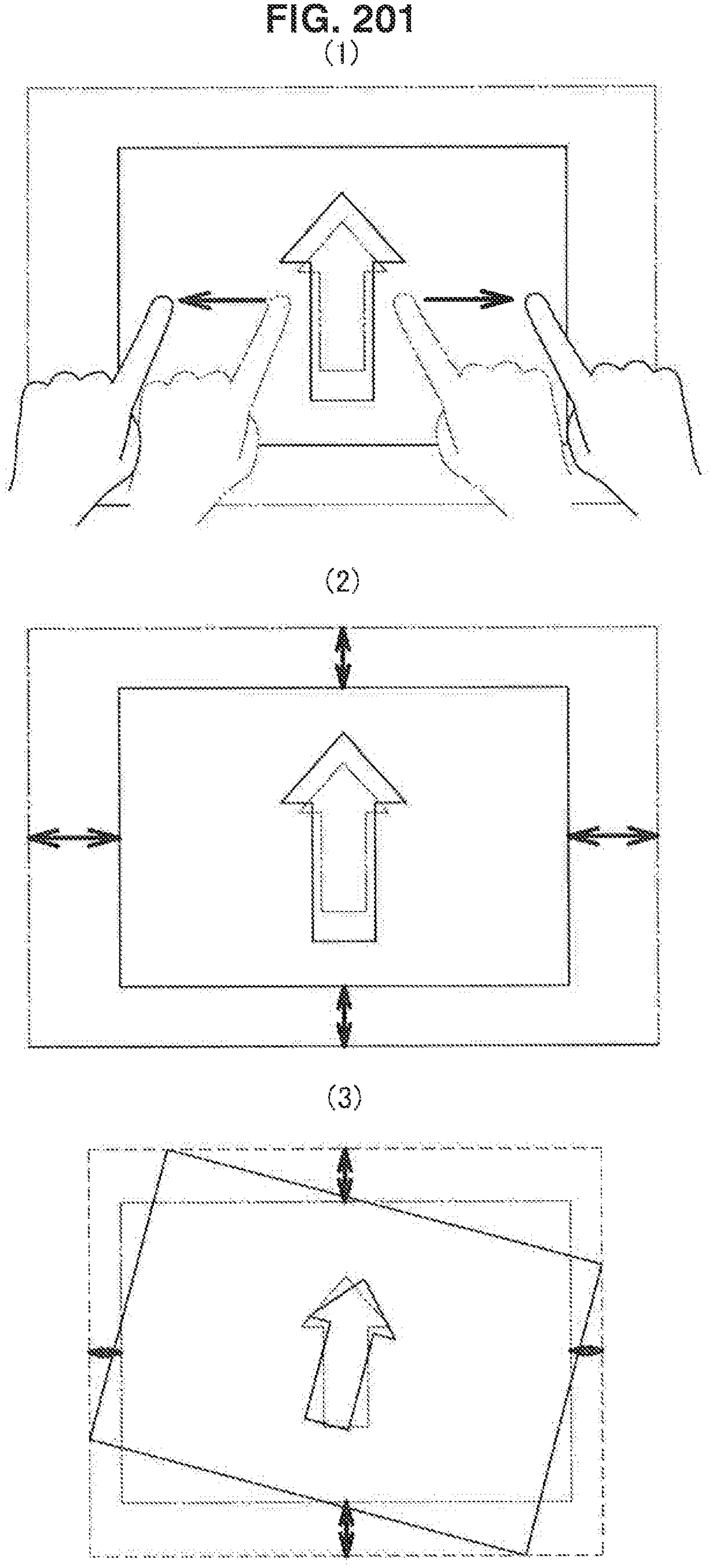

FIG. 201 is an explanatory diagram illustrating an example of a manipulation on a window by the user.

Figure 202:
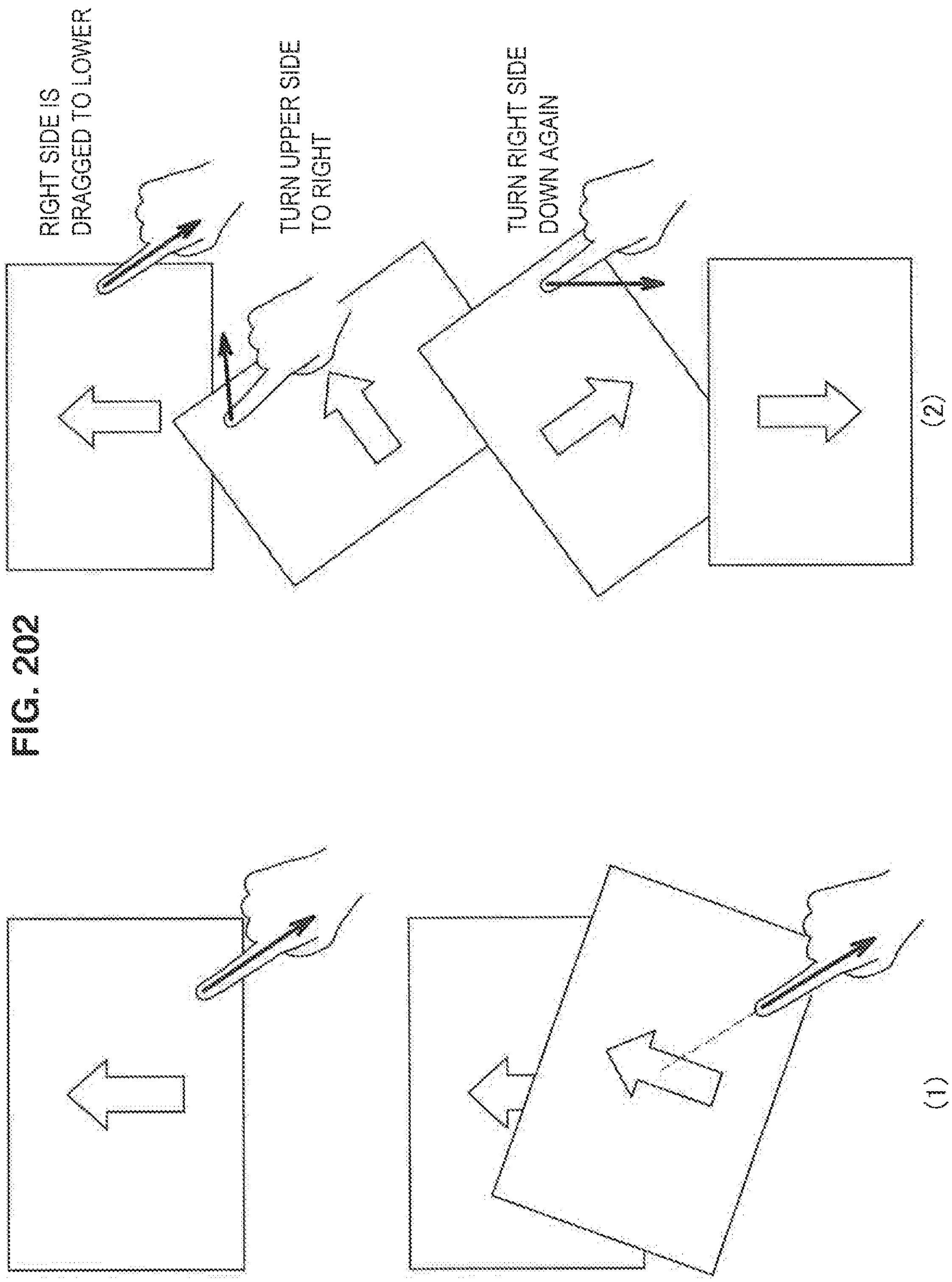

FIG. 202 is an explanatory diagram illustrating an example of a manipulation on a window by the user.

Figure 203:
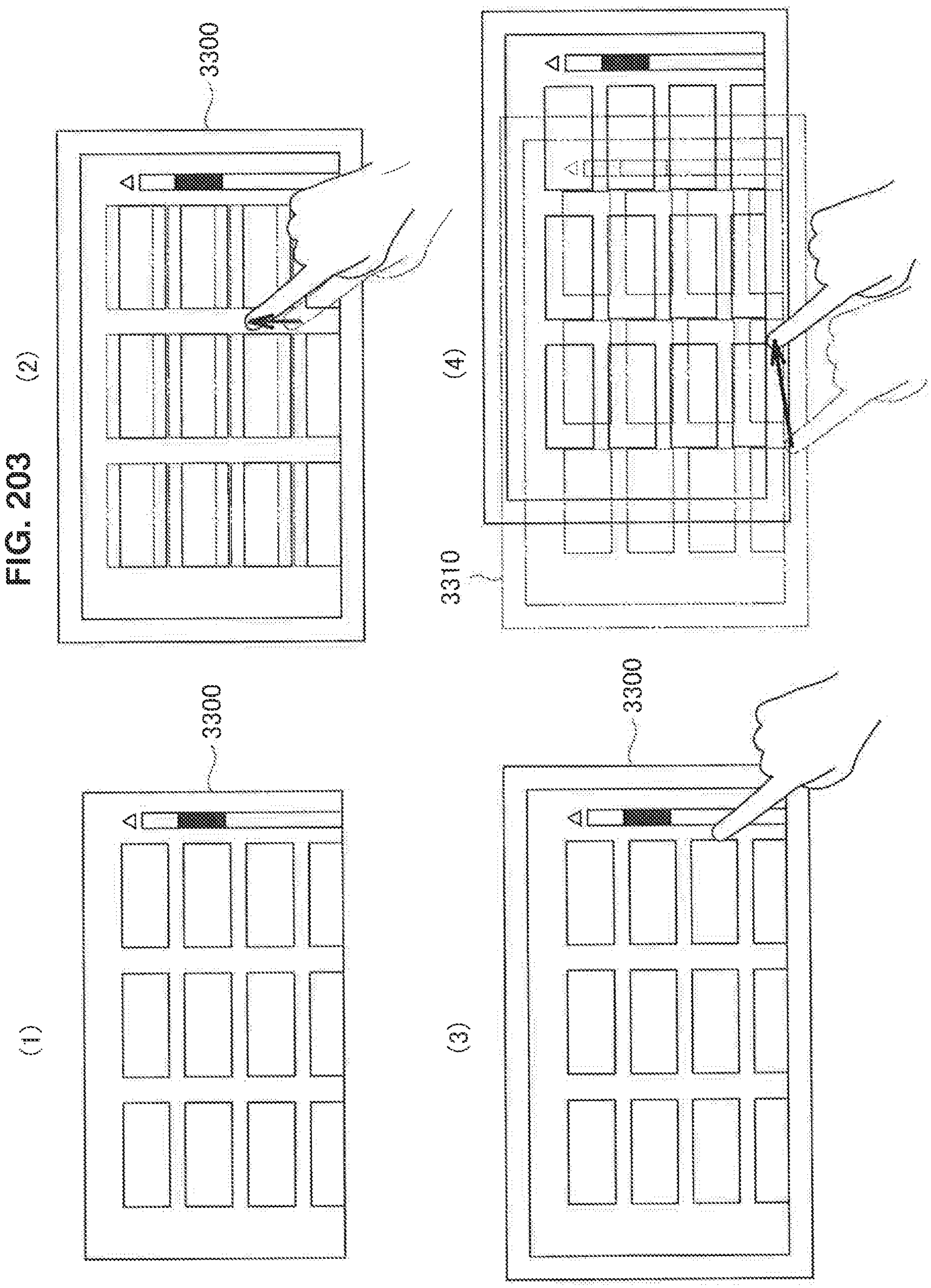

FIG. 203 is an explanatory diagram illustrating an example of a manipulation on a window by the user.

Figure 204:
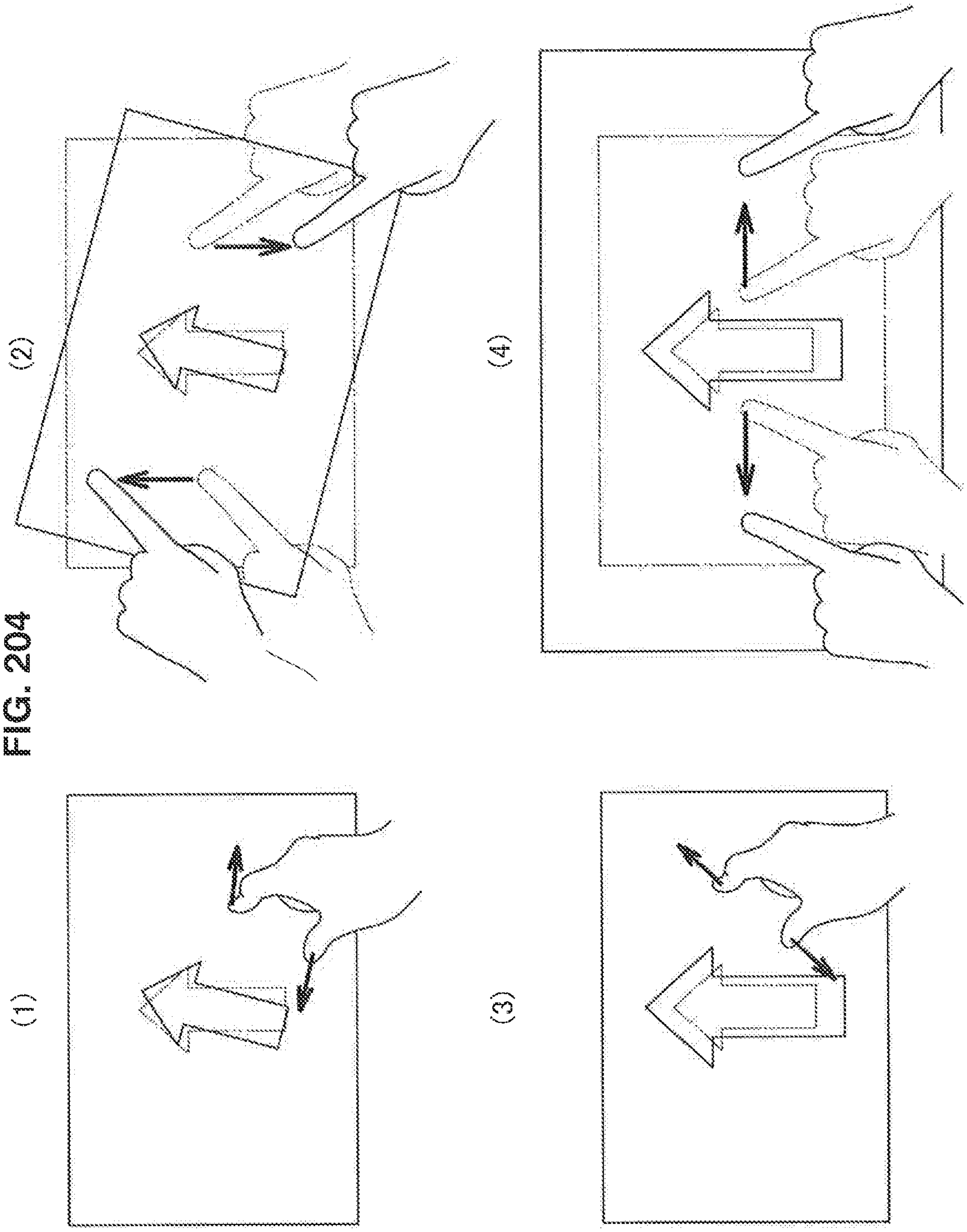

FIG. 204 is an explanatory diagram illustrating an example of a manipulation on a window by the user.

Figure 205:
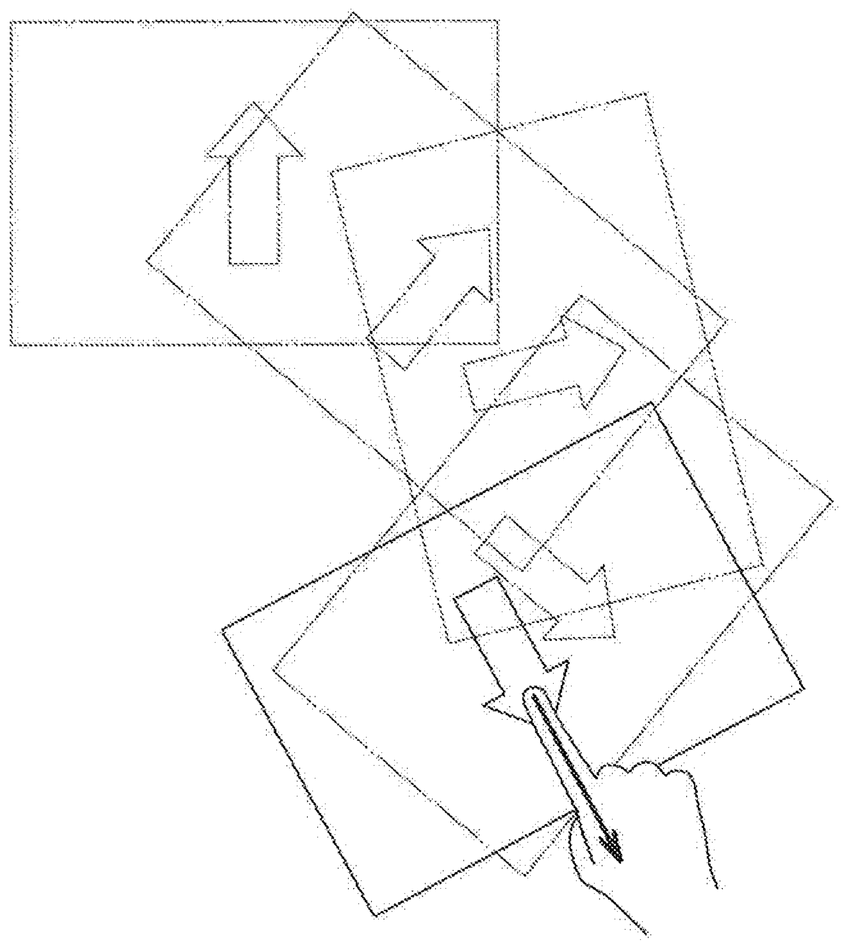

FIG. 205 is an explanatory diagram illustrating an example of a manipulation on a window by the user.

Figure 206:
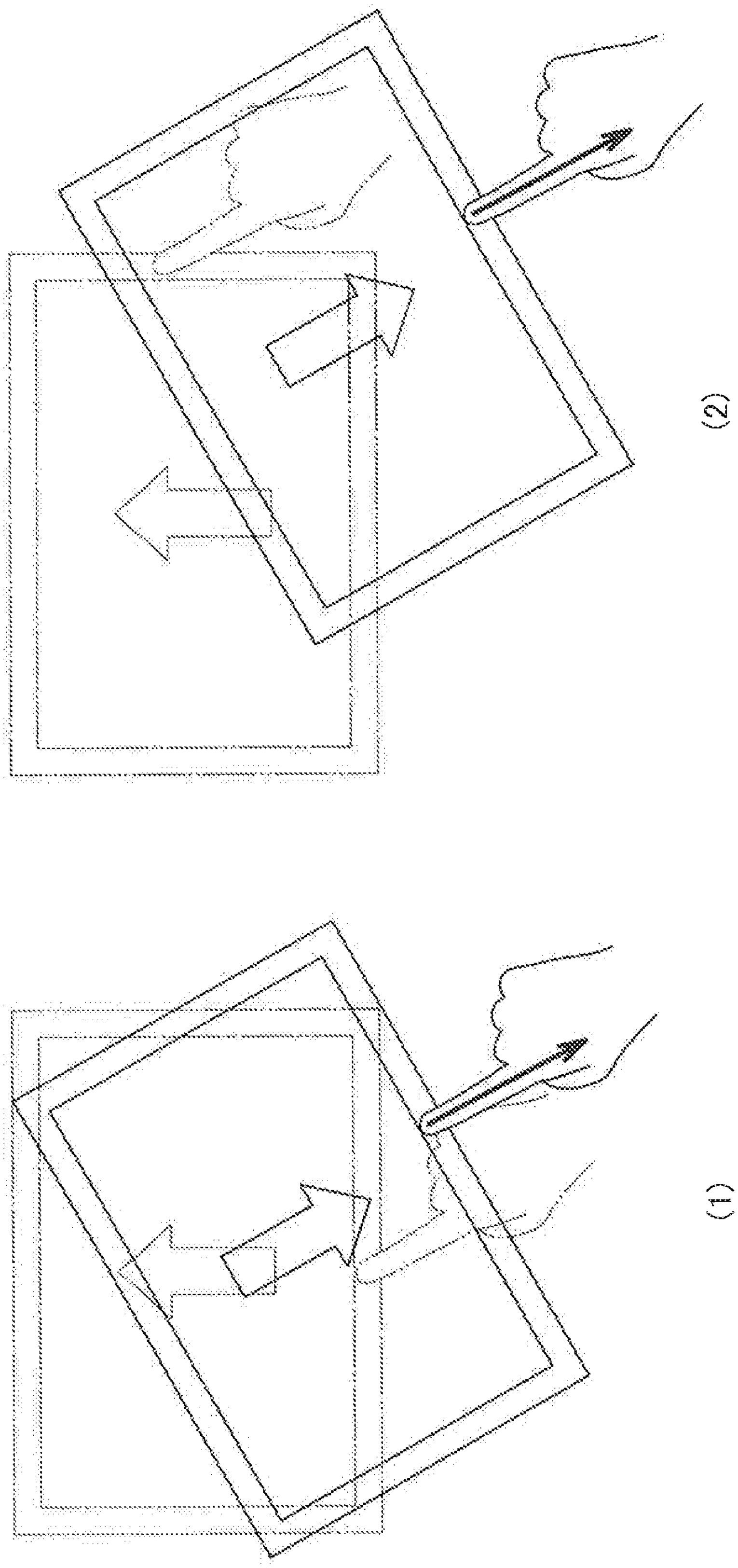

FIG. 206 is an explanatory diagram illustrating an example of a manipulation on a window by the user.

Figure 207:
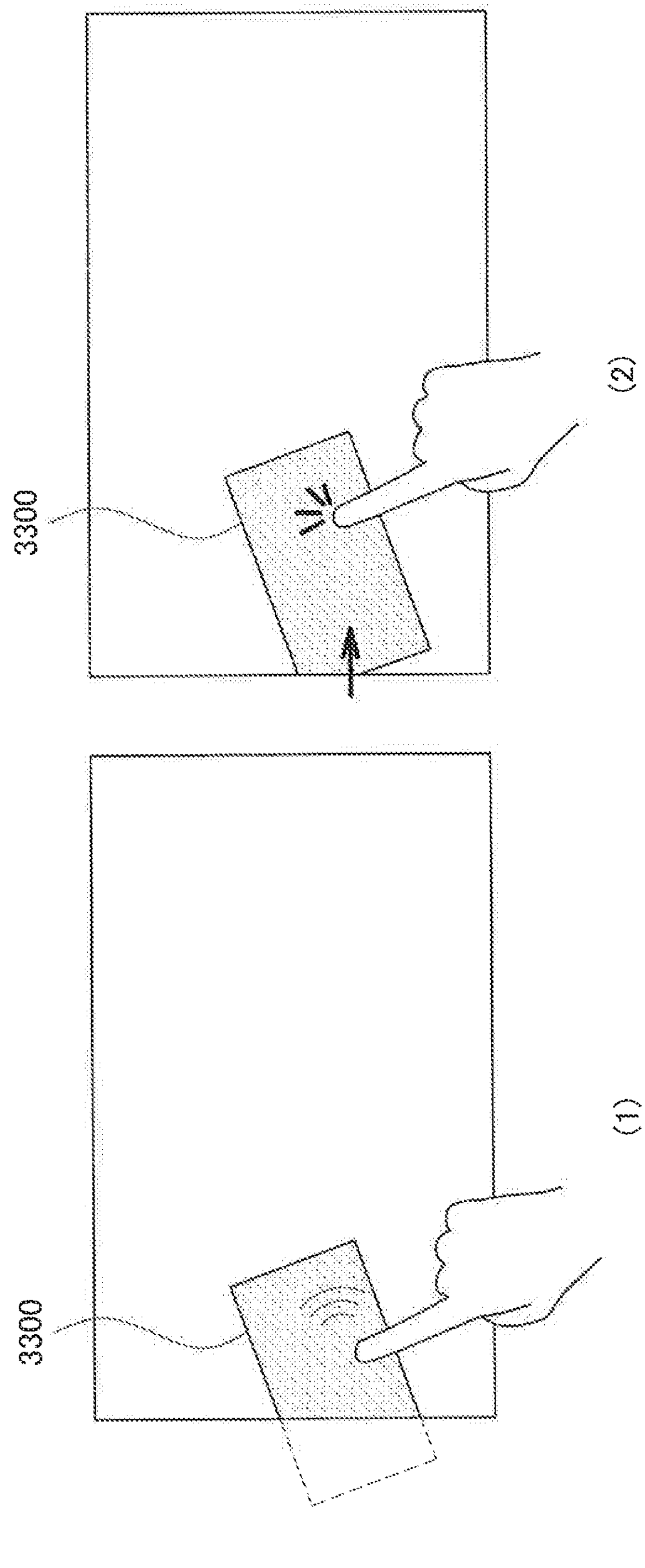

FIG. 207 is an explanatory diagram illustrating an example of a manipulation on a window by the user.

Figure 208:
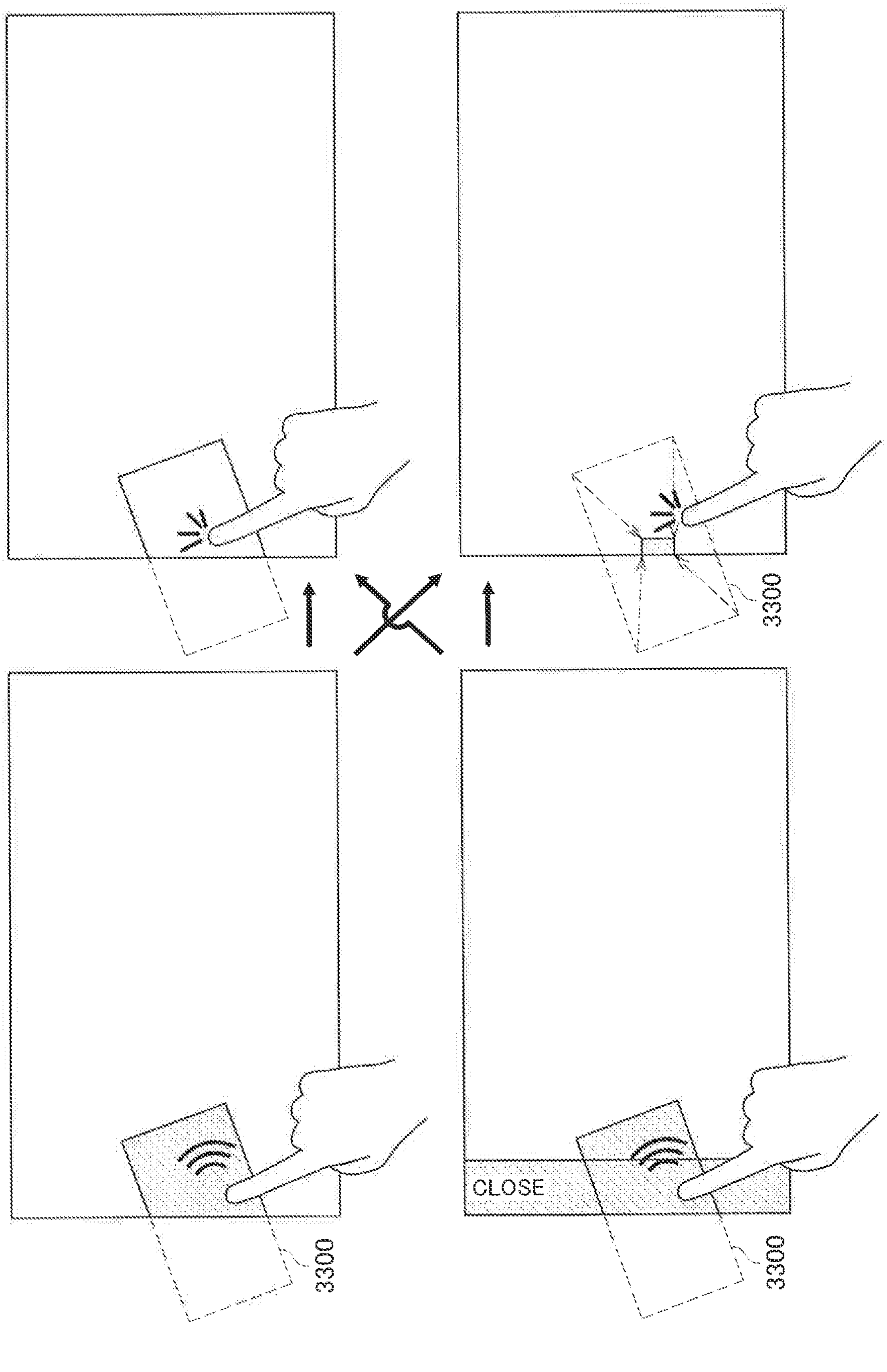

FIG. 208 is an explanatory diagram illustrating an example of a manipulation on a window by the user.

Figure 209:
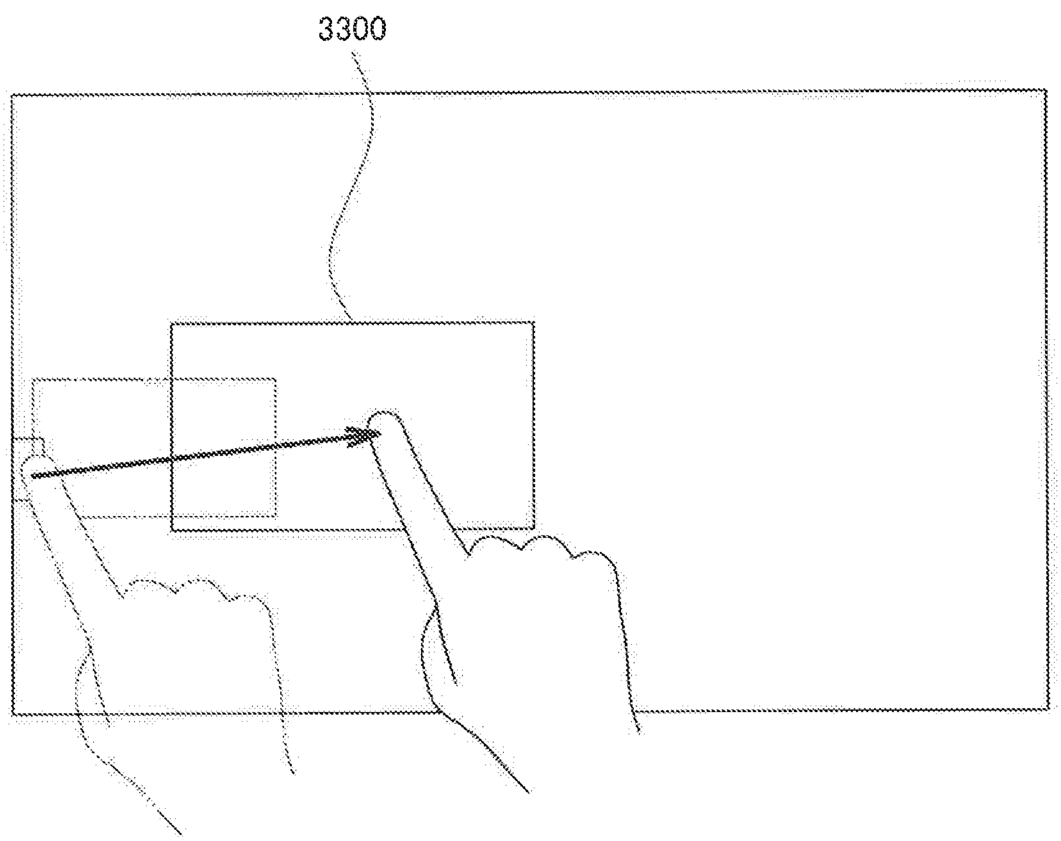

FIG. 209 is an explanatory diagram illustrating an example of a manipulation on a window by the user.

Figure 210:
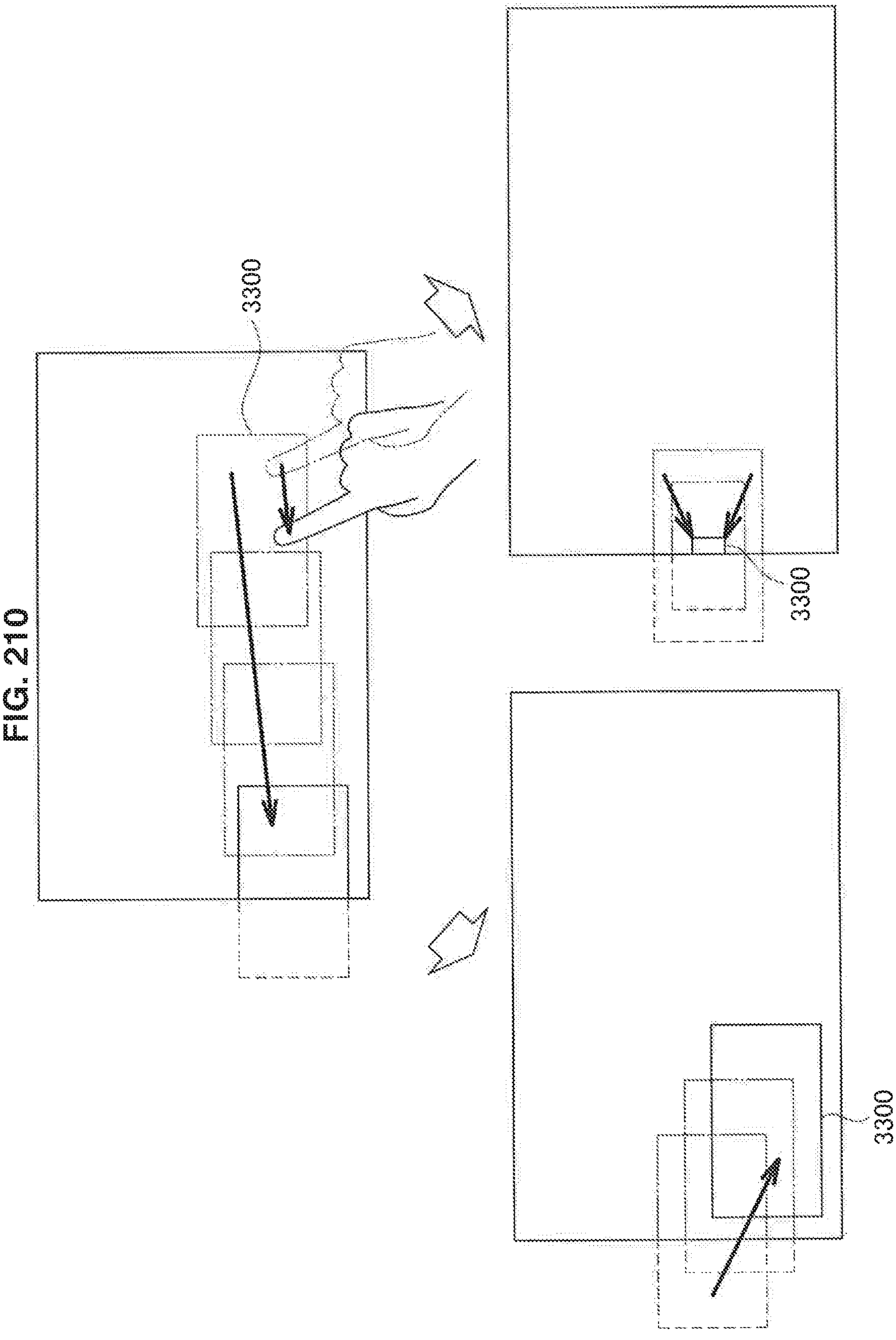

FIG. 210 is an explanatory diagram illustrating an example of a manipulation on a window by the user.

Figure 211:
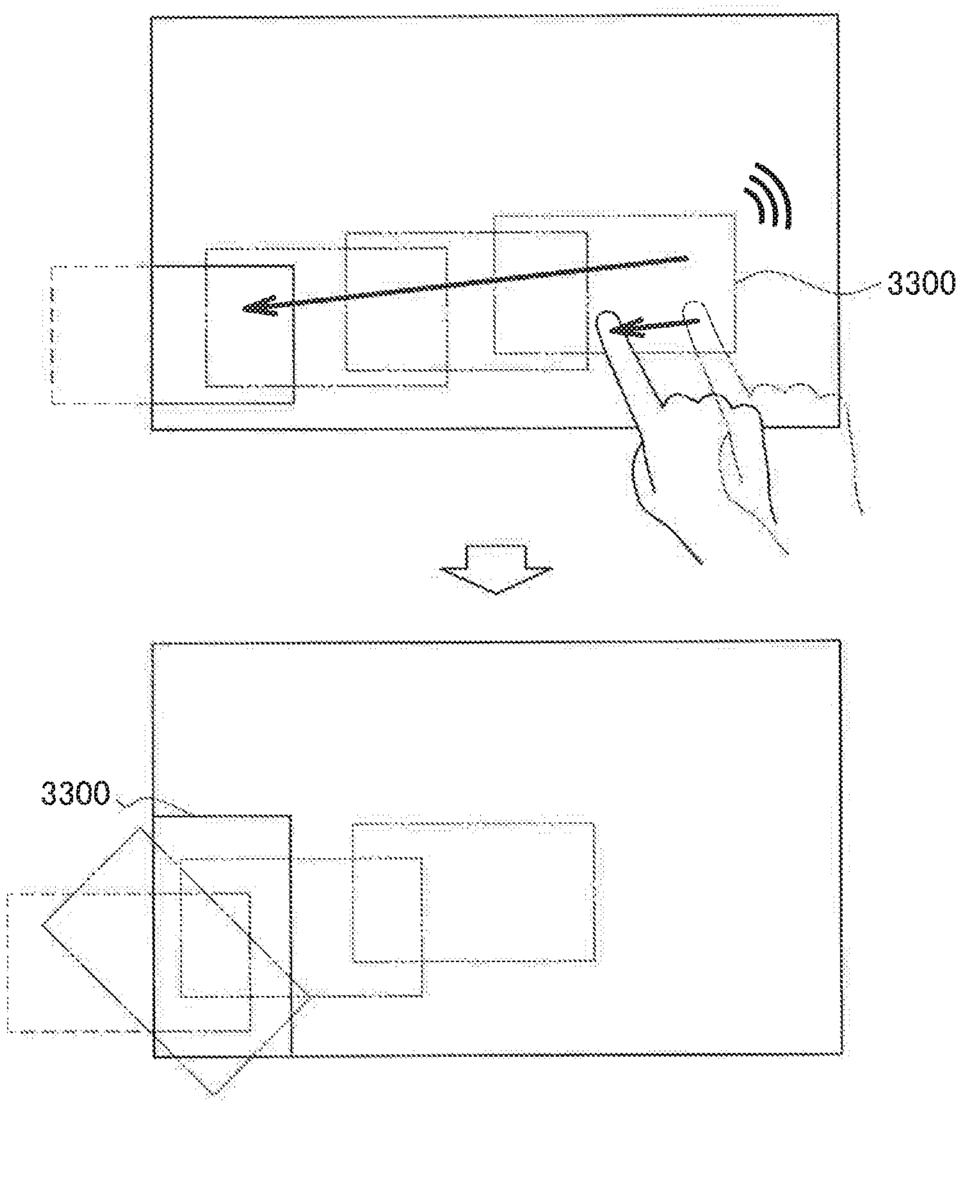

FIG. 211 is an explanatory diagram illustrating an example of a manipulation on a window by the user.

Figure 212:
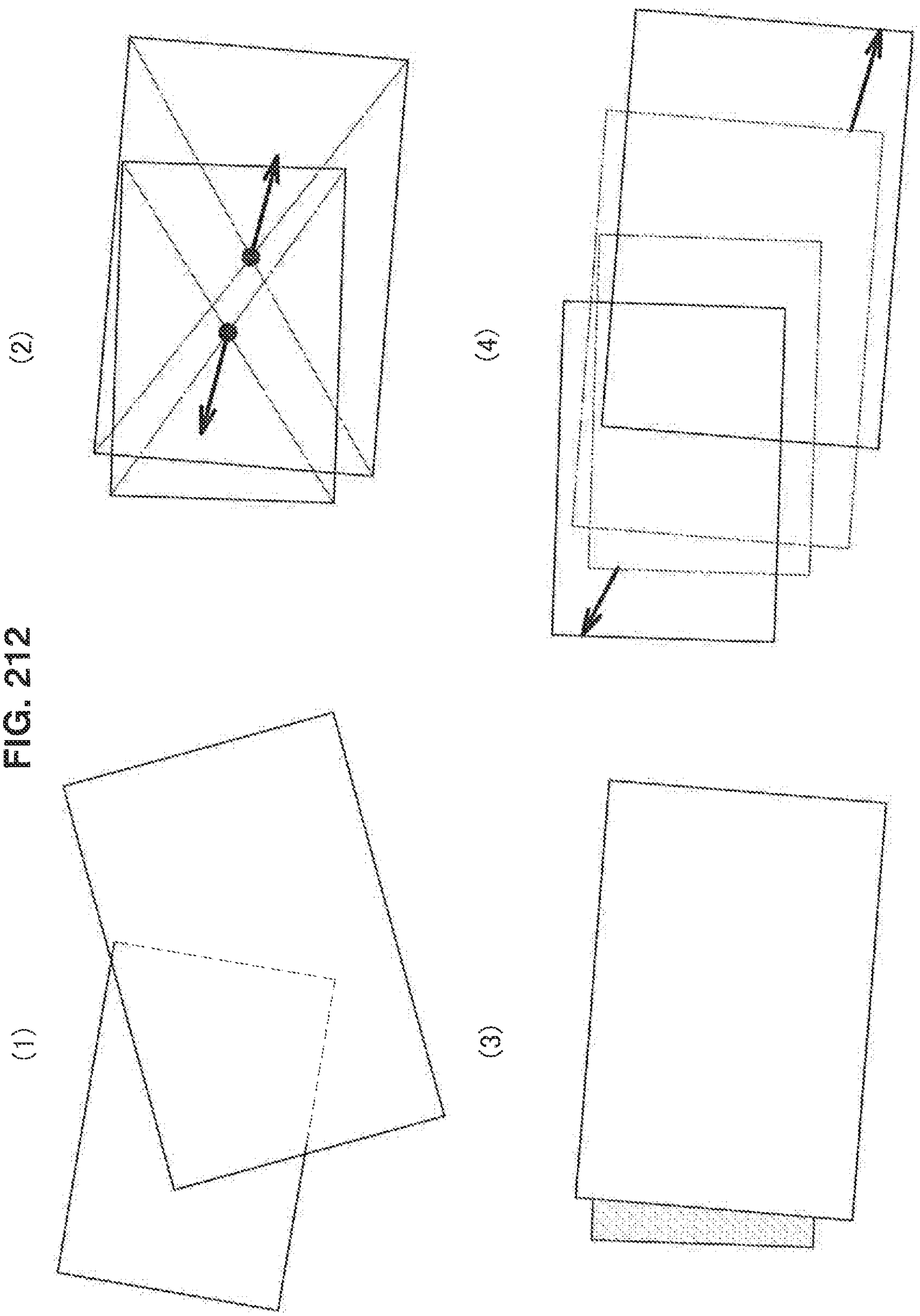

FIG. 212 is an explanatory diagram illustrating an example of a manipulation on a window by the user.

Figure 213:
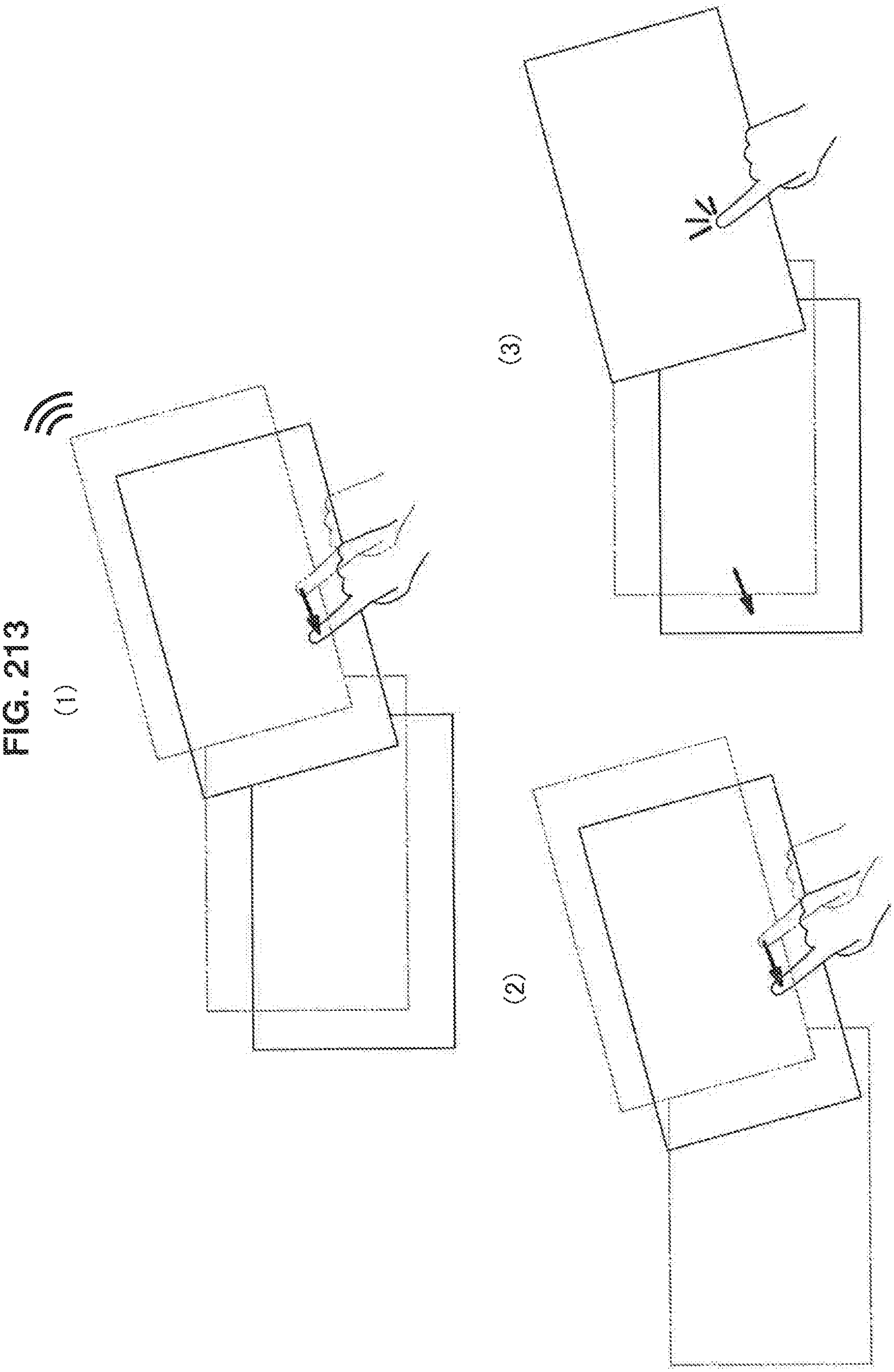

FIG. 213 is an explanatory diagram illustrating an example of a manipulation on a window by the user.

Figure 214:
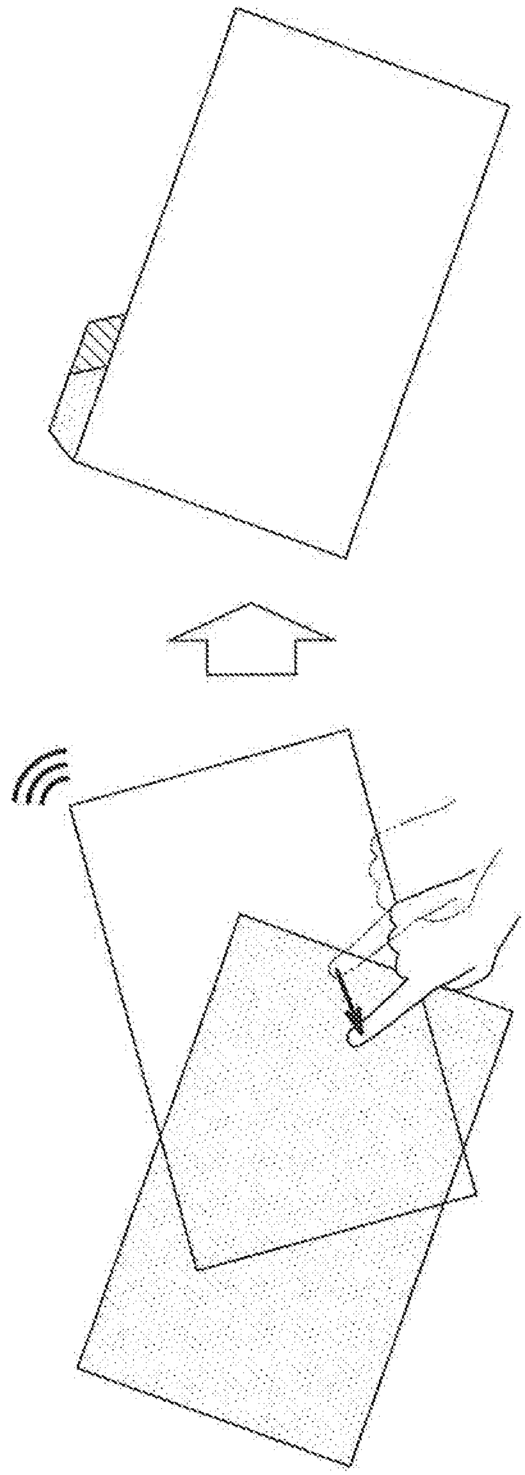

FIG. 214 is an explanatory diagram illustrating an example of a manipulation on a window by the user.

Figure 215:
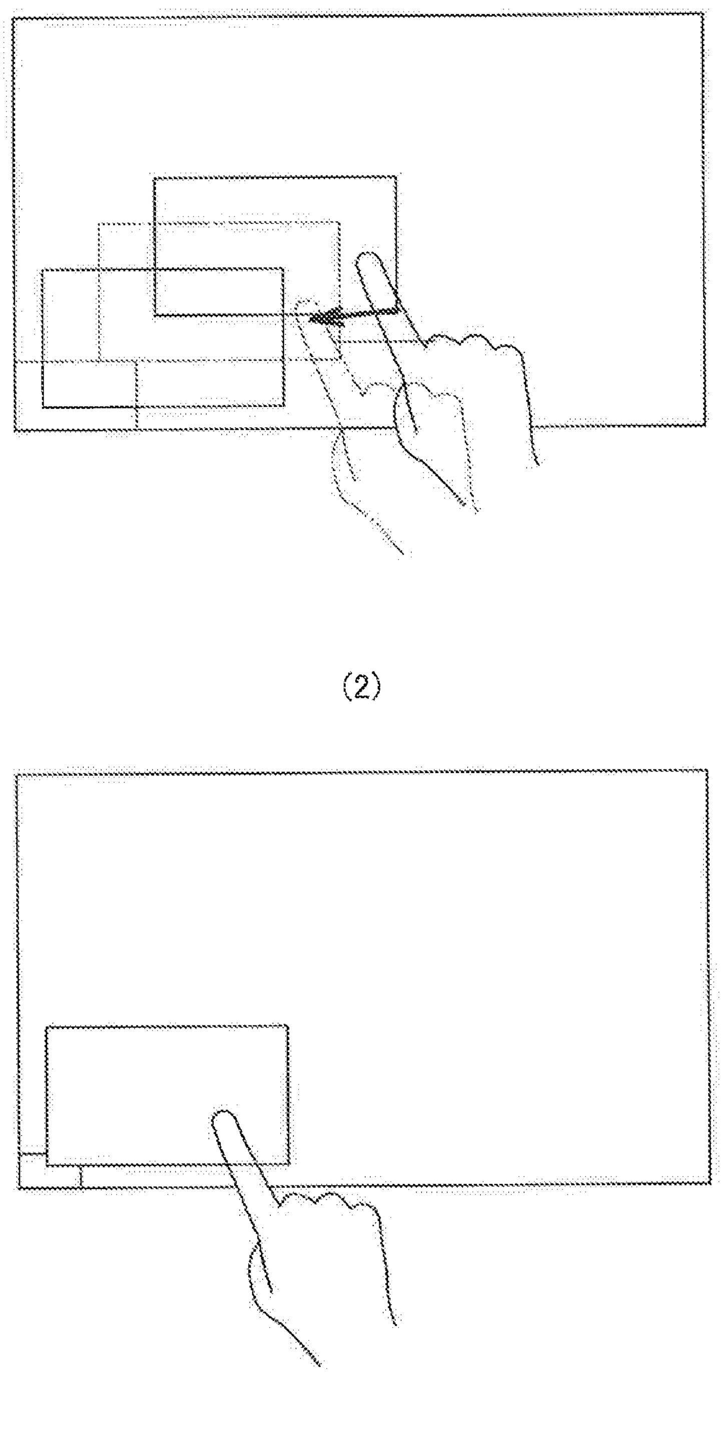

FIG. 215 is an explanatory diagram illustrating an example of a manipulation on a window by the user.

Figure 216:
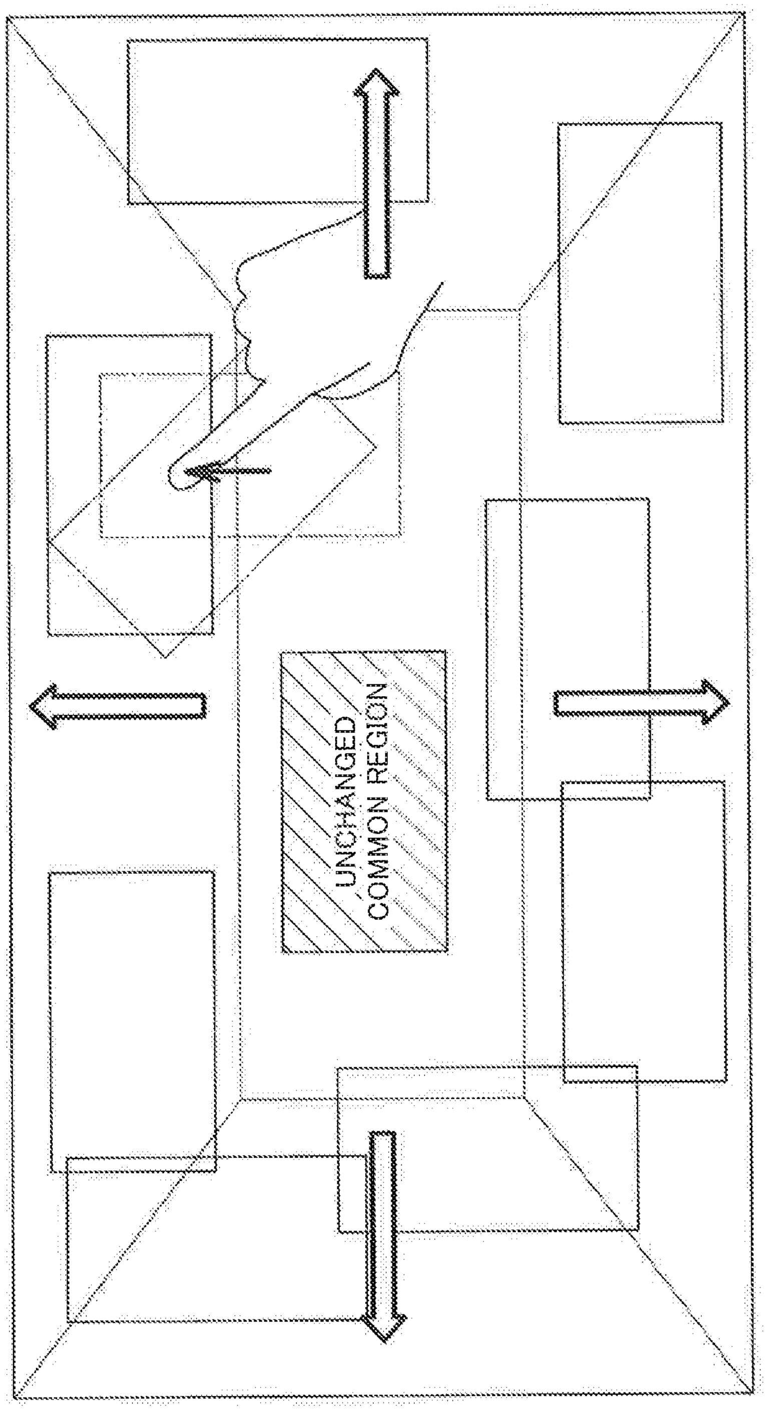

FIG. 216 is an explanatory diagram illustrating an example of a manipulation on a window by the user.

Figure 217:
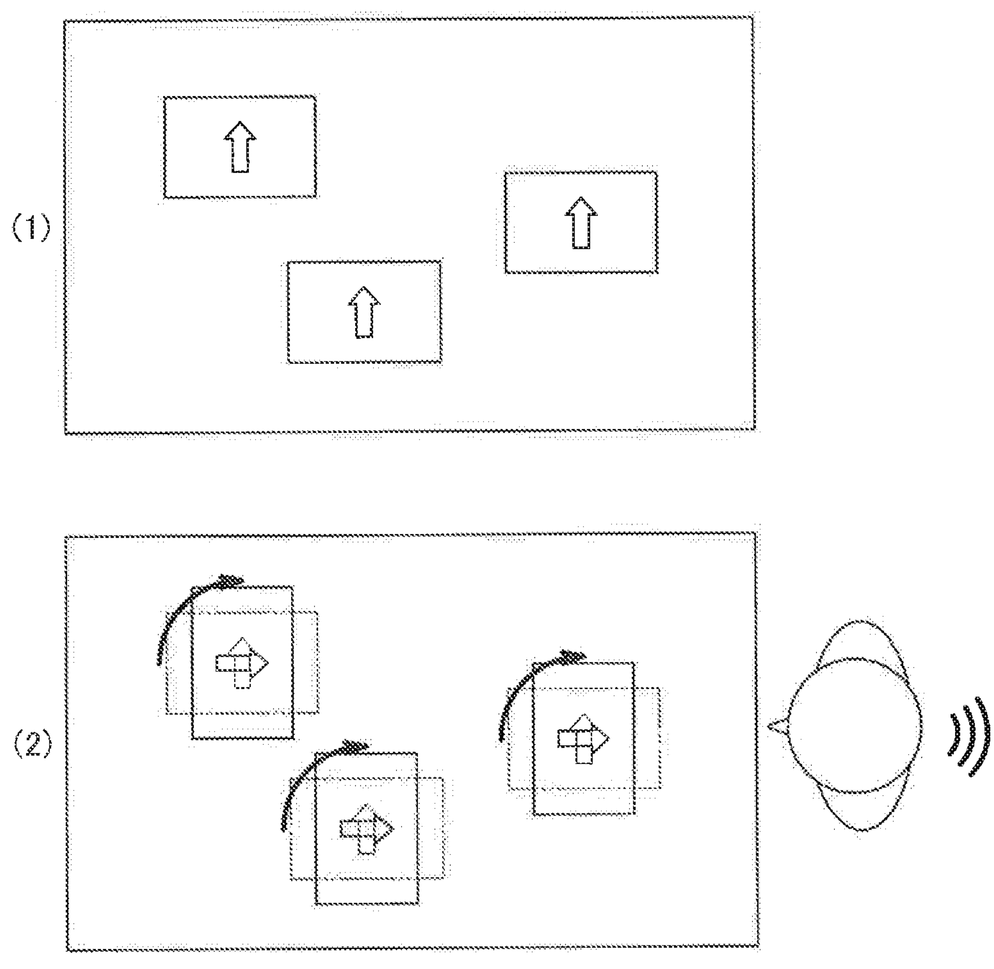

FIG. 217 is an explanatory diagram illustrating an example of a manipulation on a window by the user.

FIG. 218 is an explanatory diagram illustrating an example of a manipulation on a window by the user.

Figure 219:
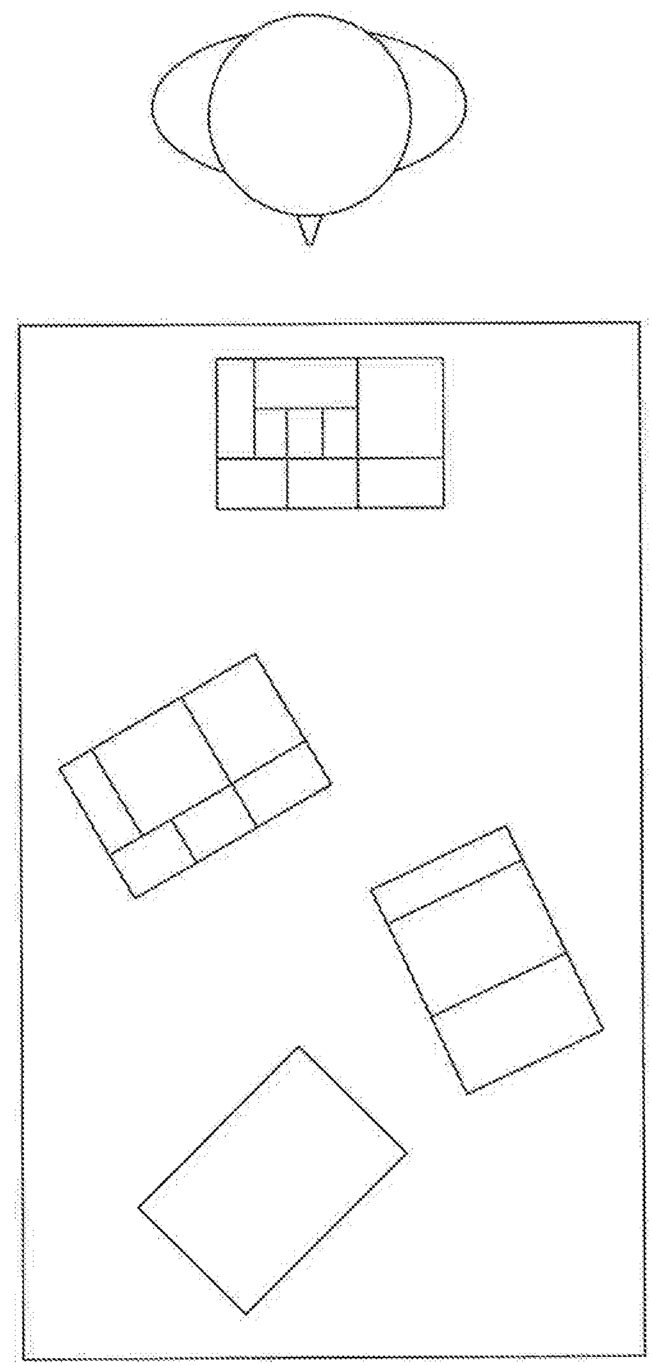

FIG. 219 is an explanatory diagram illustrating an example of a manipulation on a window by the user.

Figure 220:
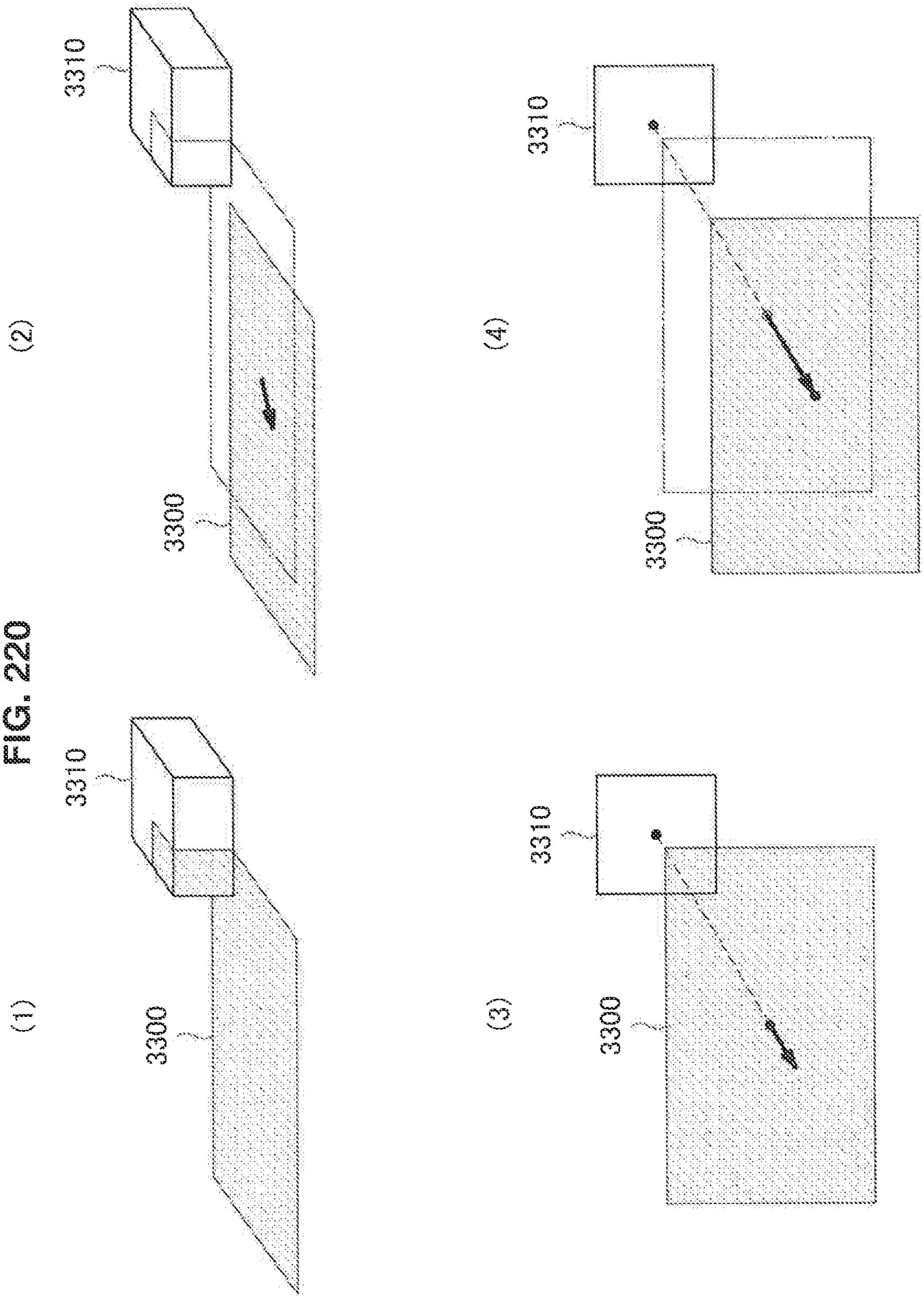

FIG. 220 is an explanatory diagram illustrating a display control example when a window interferes with a real object placed on a projection surface.

Figure 221:
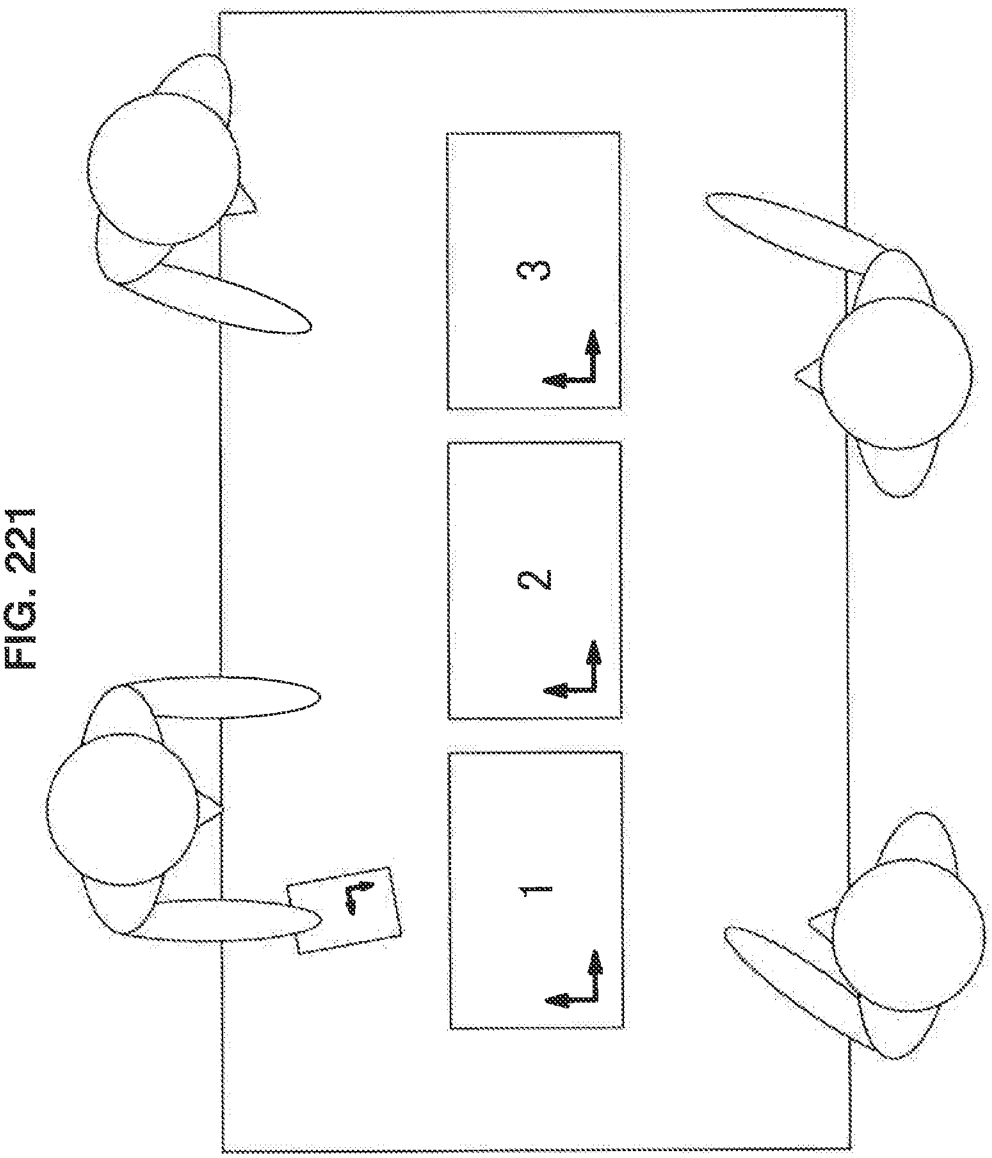

FIG. 221 is an explanatory diagram illustrating a display example of information.

Figure 222:
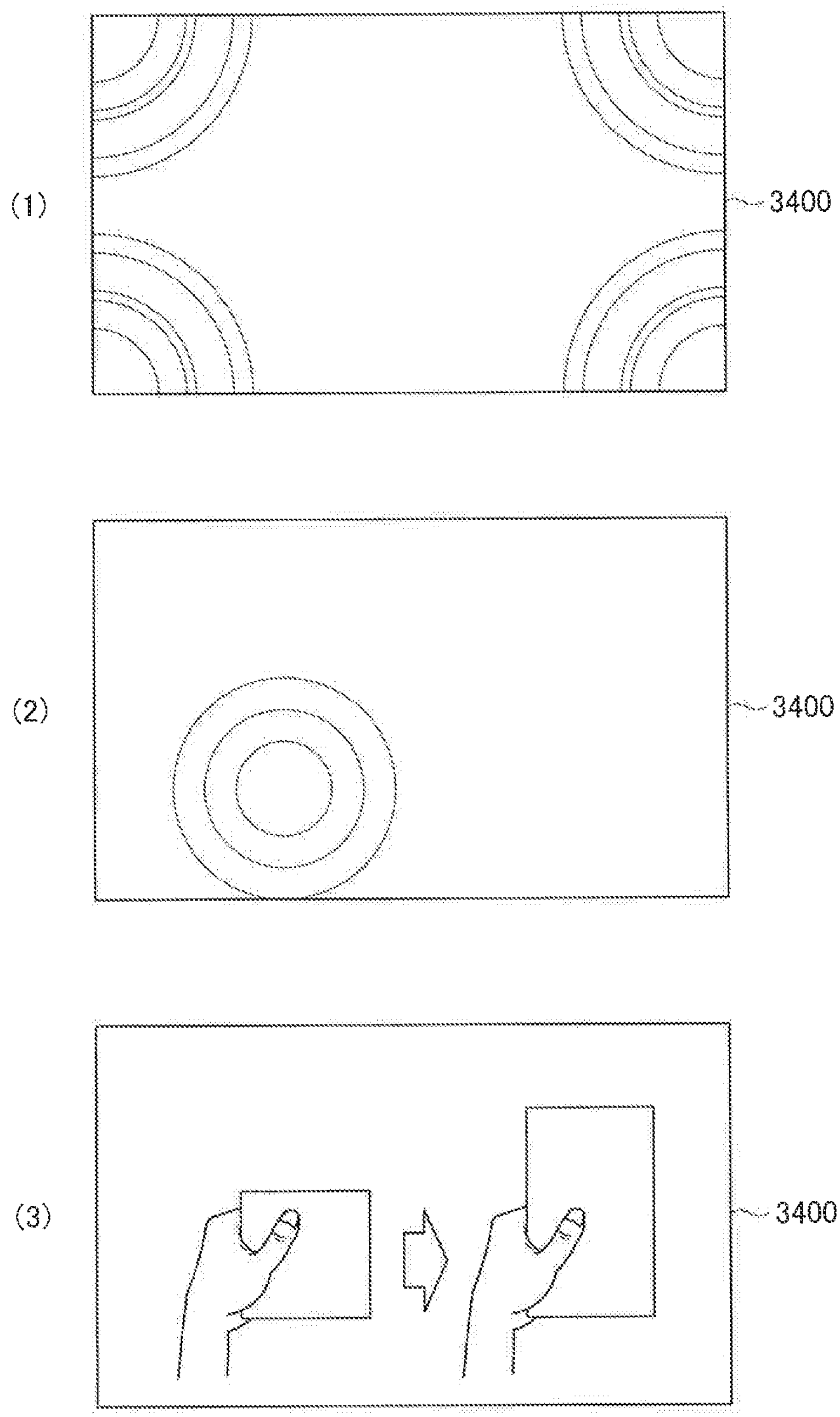

FIG. 222 is an explanatory diagram illustrating an example of a GUI.

Figure 223:
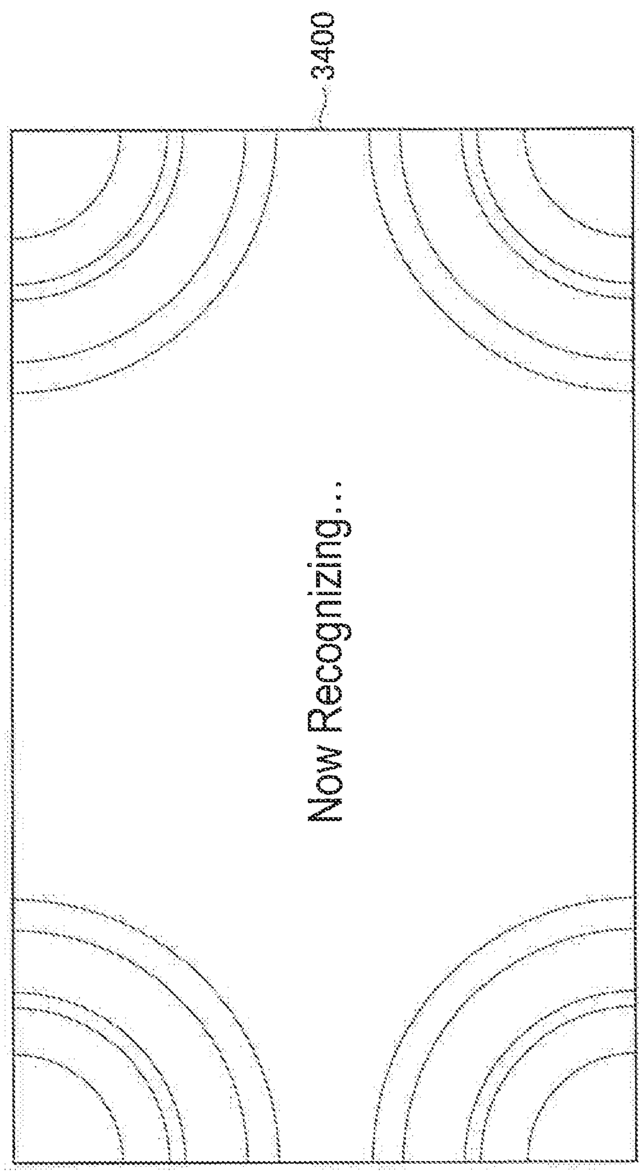

FIG. 223 is an explanatory diagram illustrating an example of a GUI.

Figure 224:
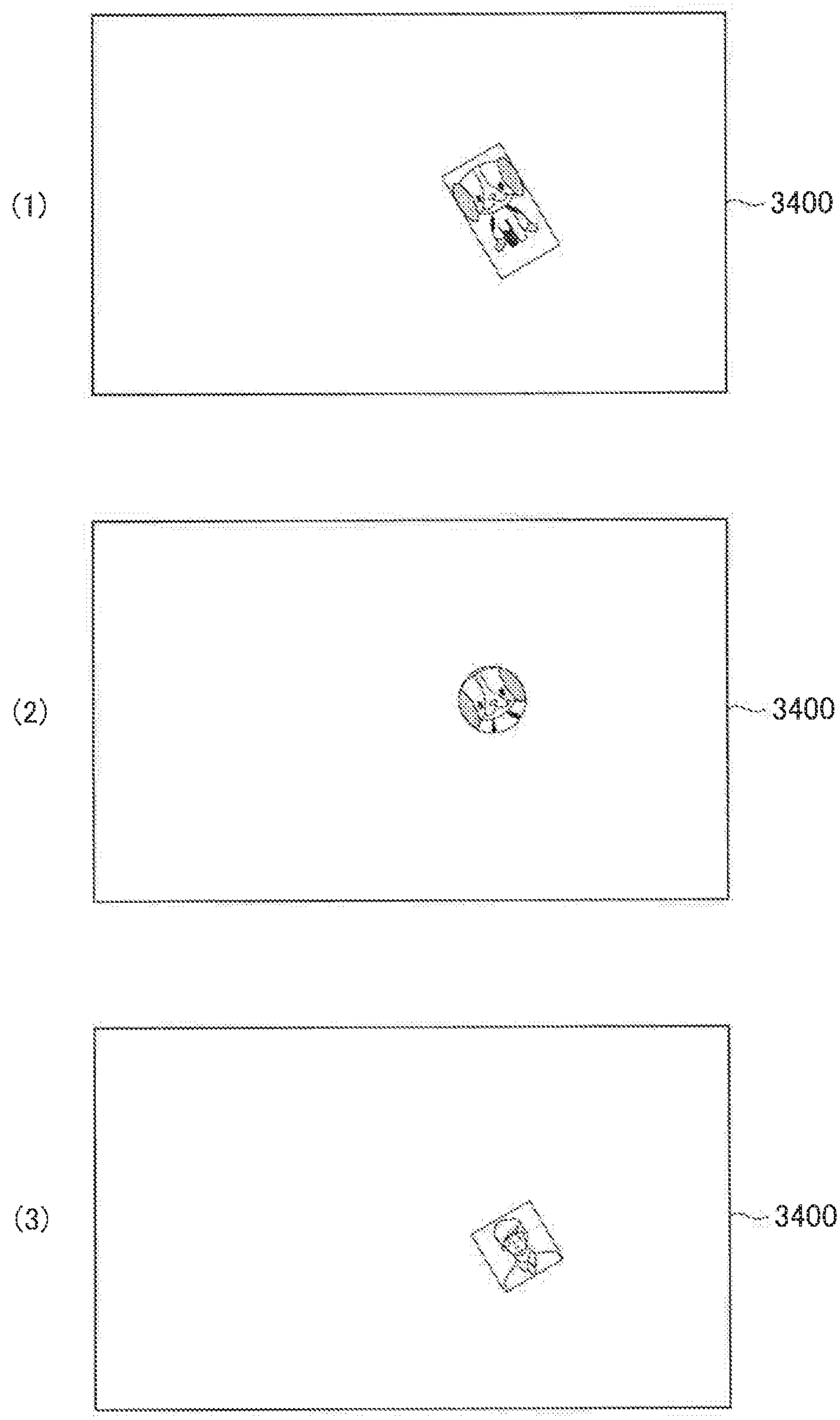

FIG. 224 is an explanatory diagram illustrating an example of a GUI.

Figure 225:
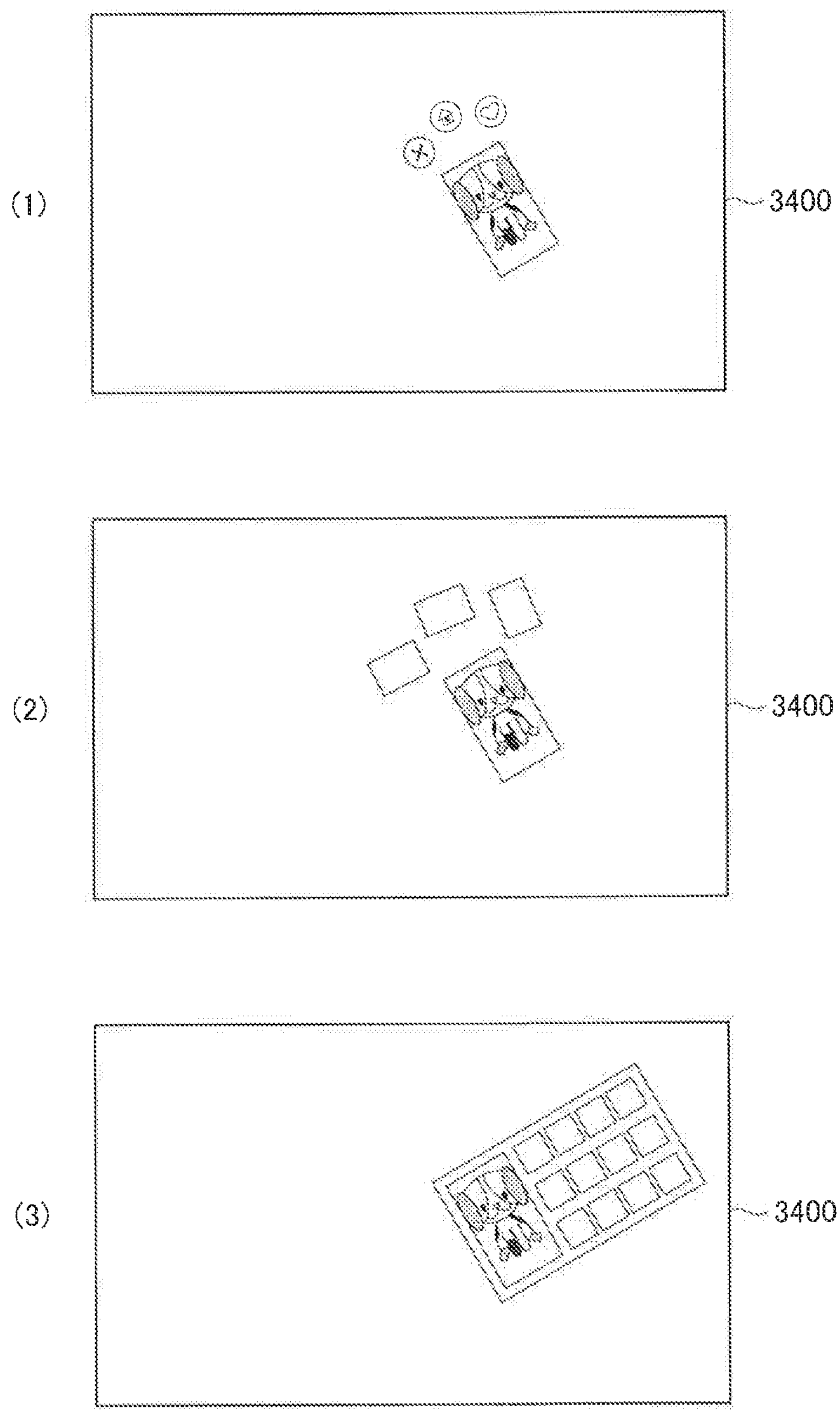

FIG. 225 is an explanatory diagram illustrating an example of a GUI.

FIG. 226 is an explanatory diagram illustrating an example of a GUI.

Figure 227:
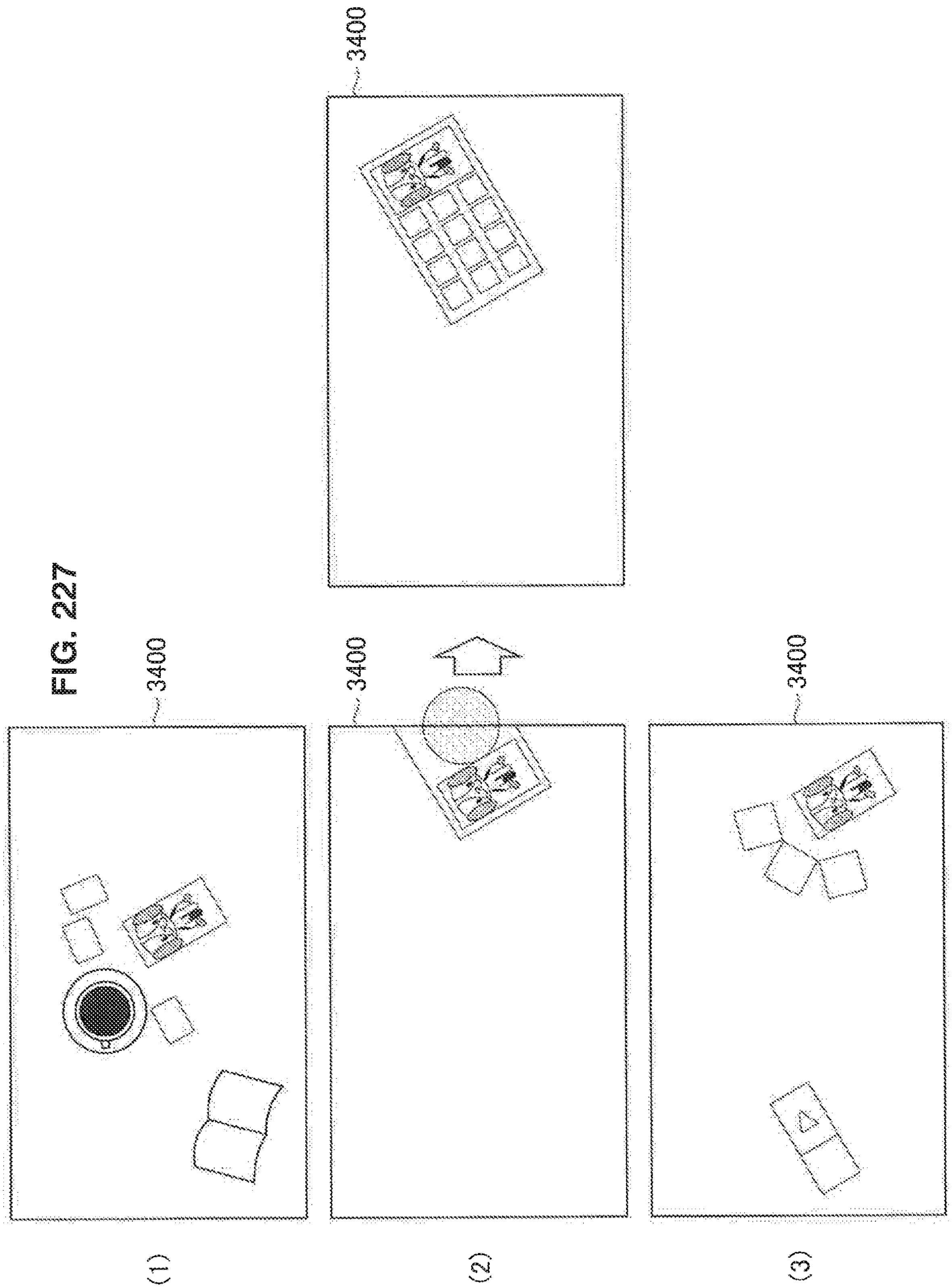

FIG. 227 is an explanatory diagram illustrating an example of a GUI.

Figure 228:
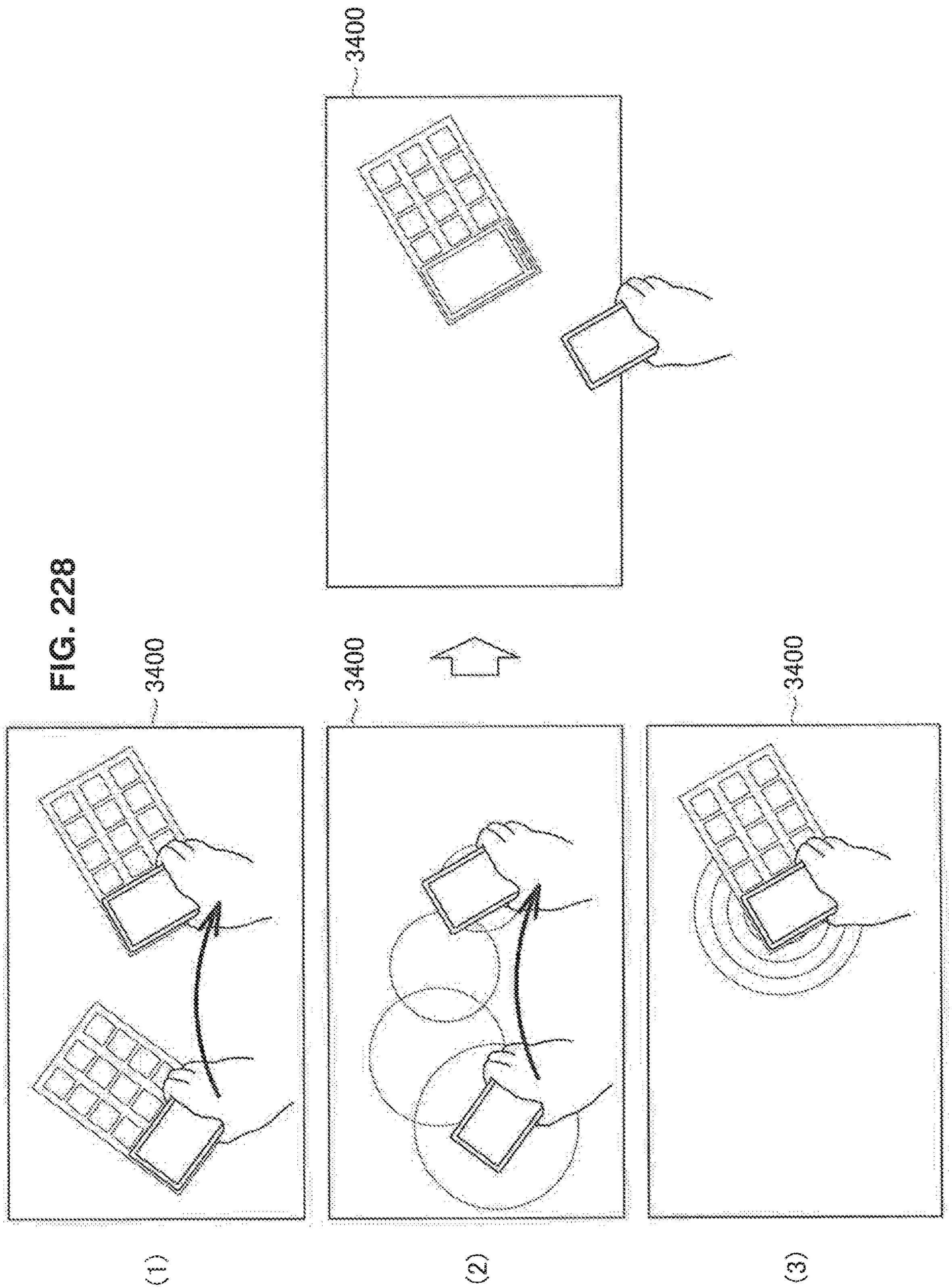

FIG. 228 is an explanatory diagram illustrating an example of a GUI.

Figure 229:
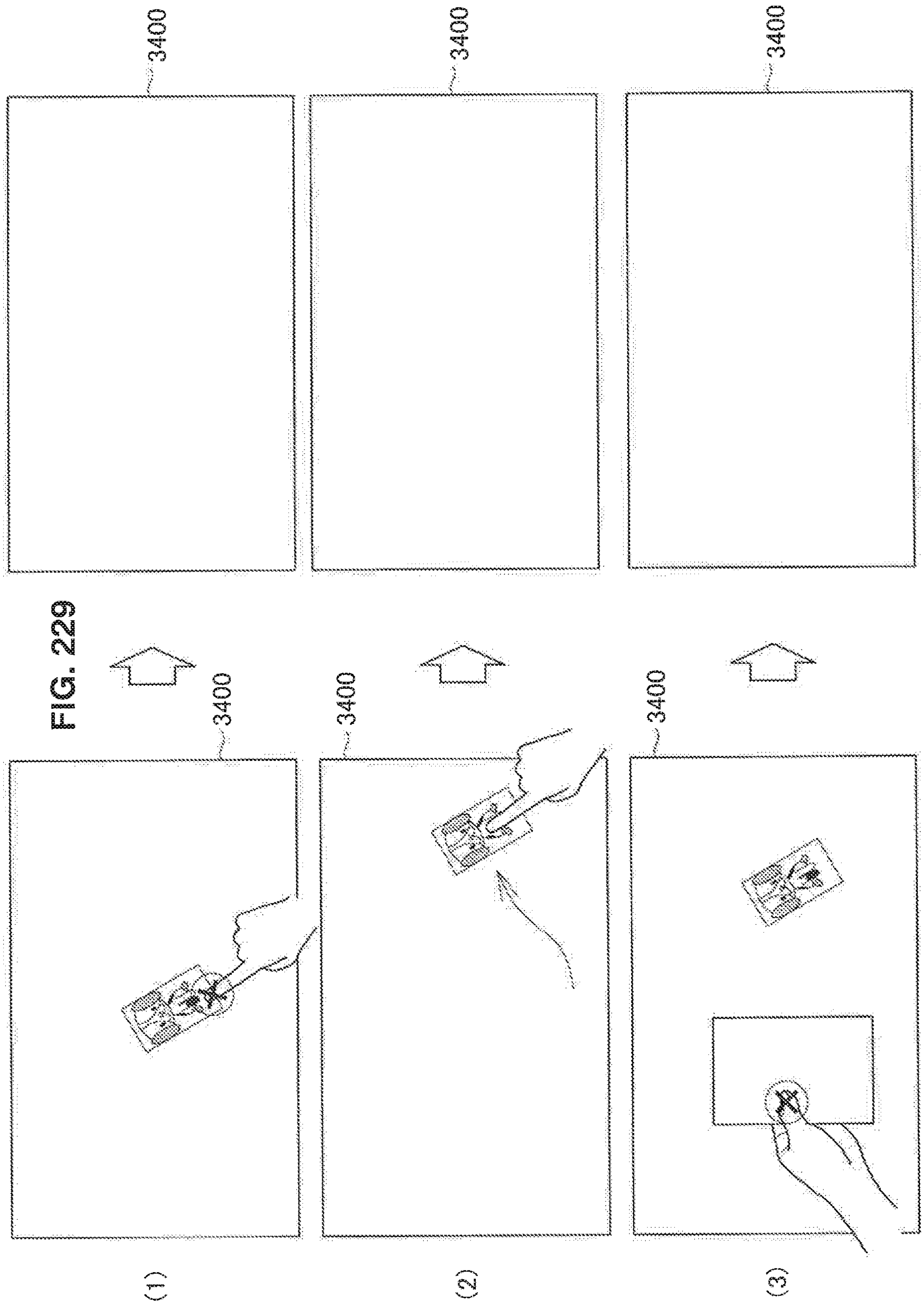

FIG. 229 is an explanatory diagram illustrating an example of a GUI.

Figure 230:
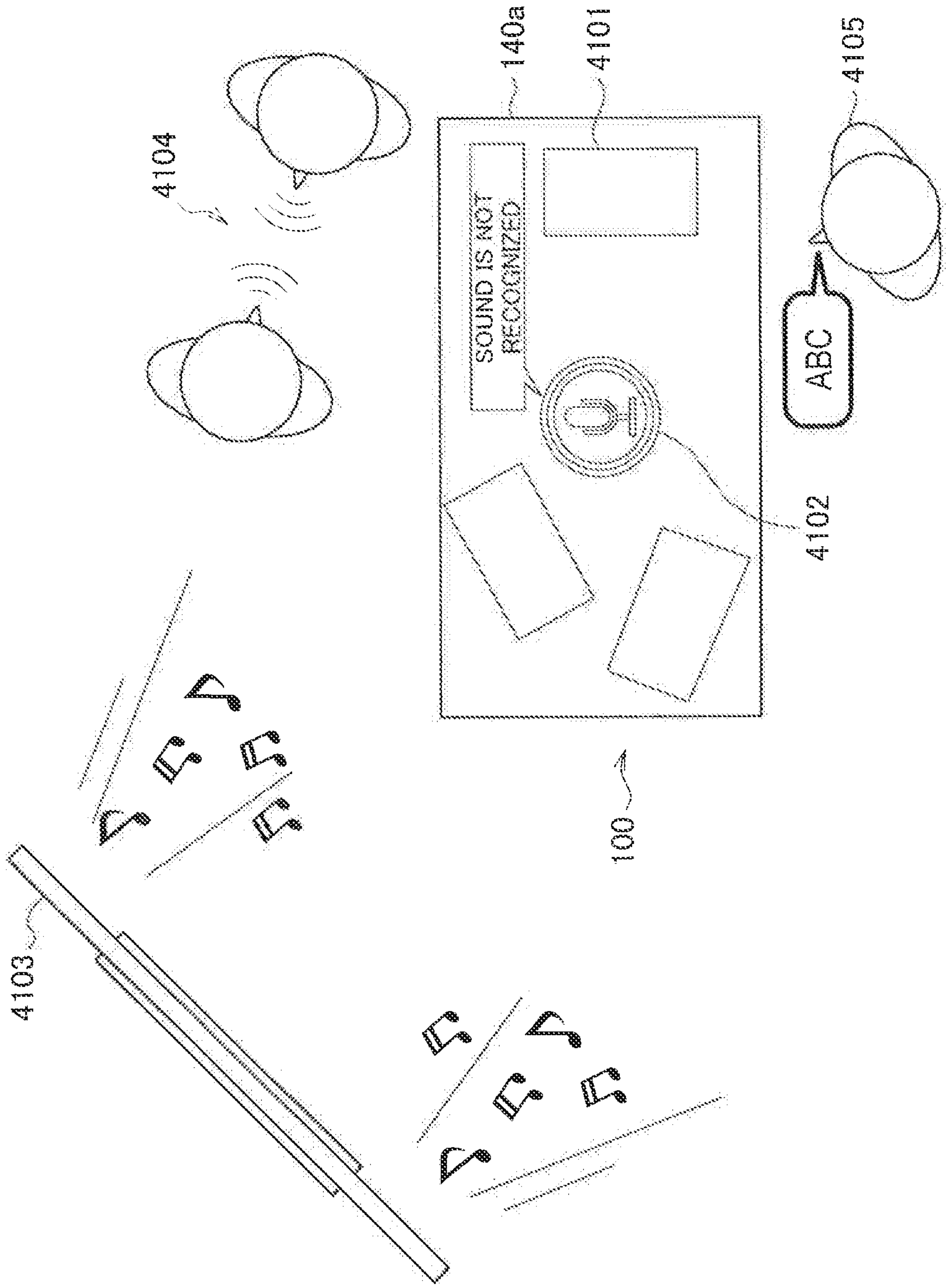

FIG. 230 is an explanatory diagram illustrating an overview of a user interface.

Figure 231:
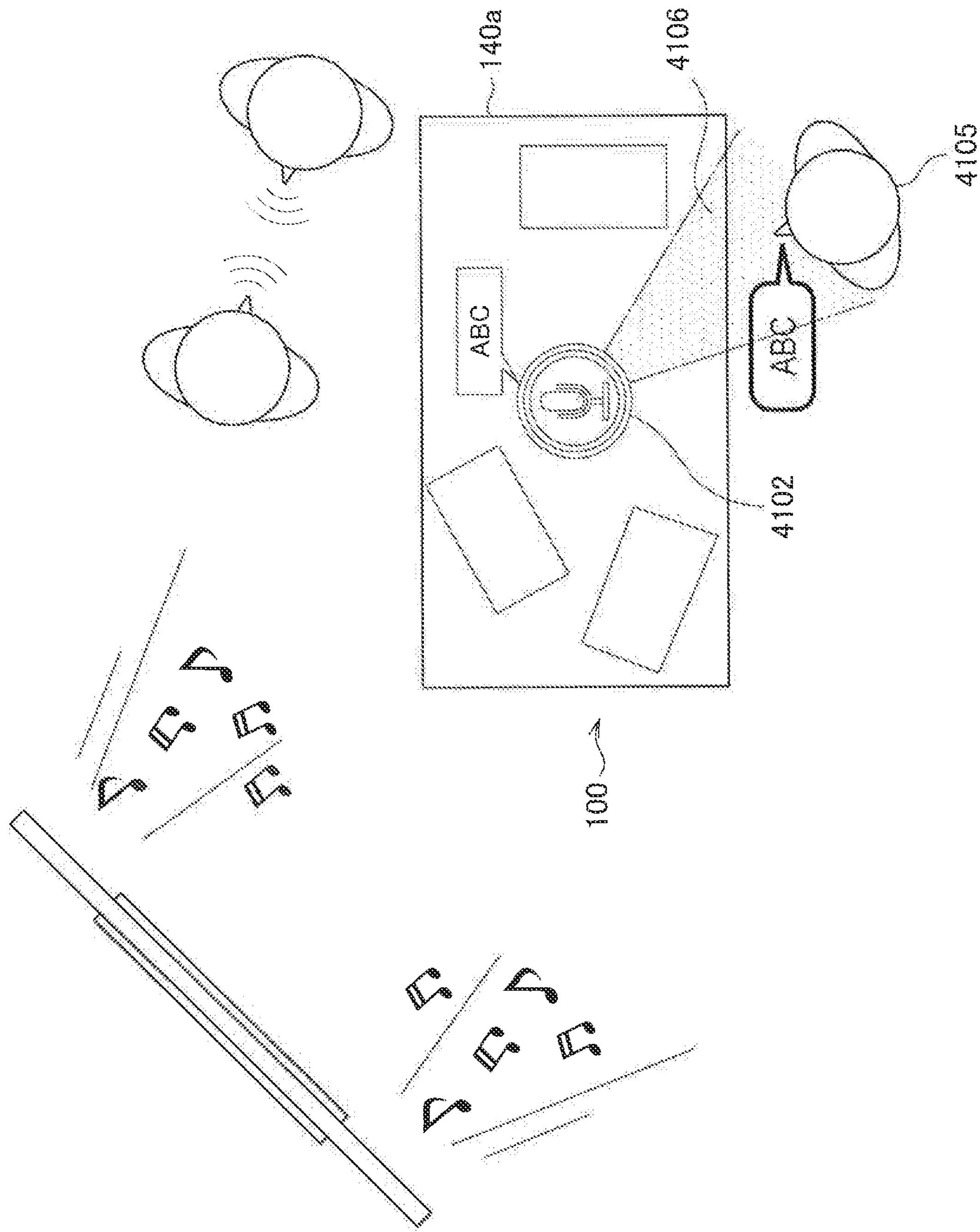

FIG. 231 is an explanatory diagram illustrating an overview of a user interface.

Figure 232:
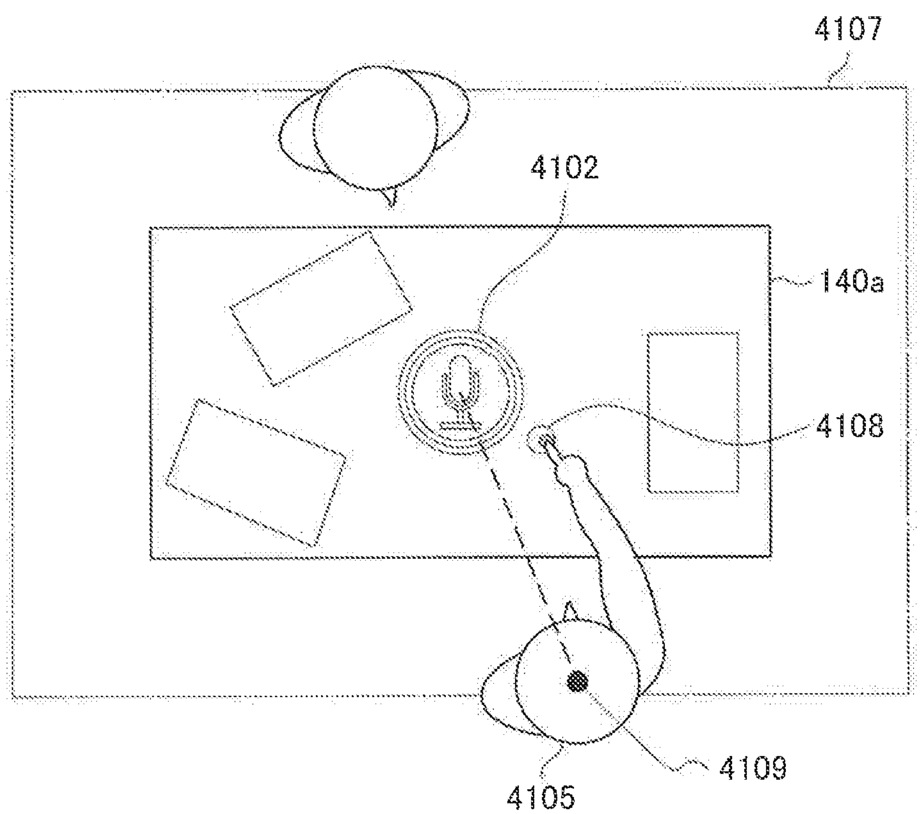

FIG. 232 is an explanatory diagram illustrating an example of a user position estimation function.

Figure 233:
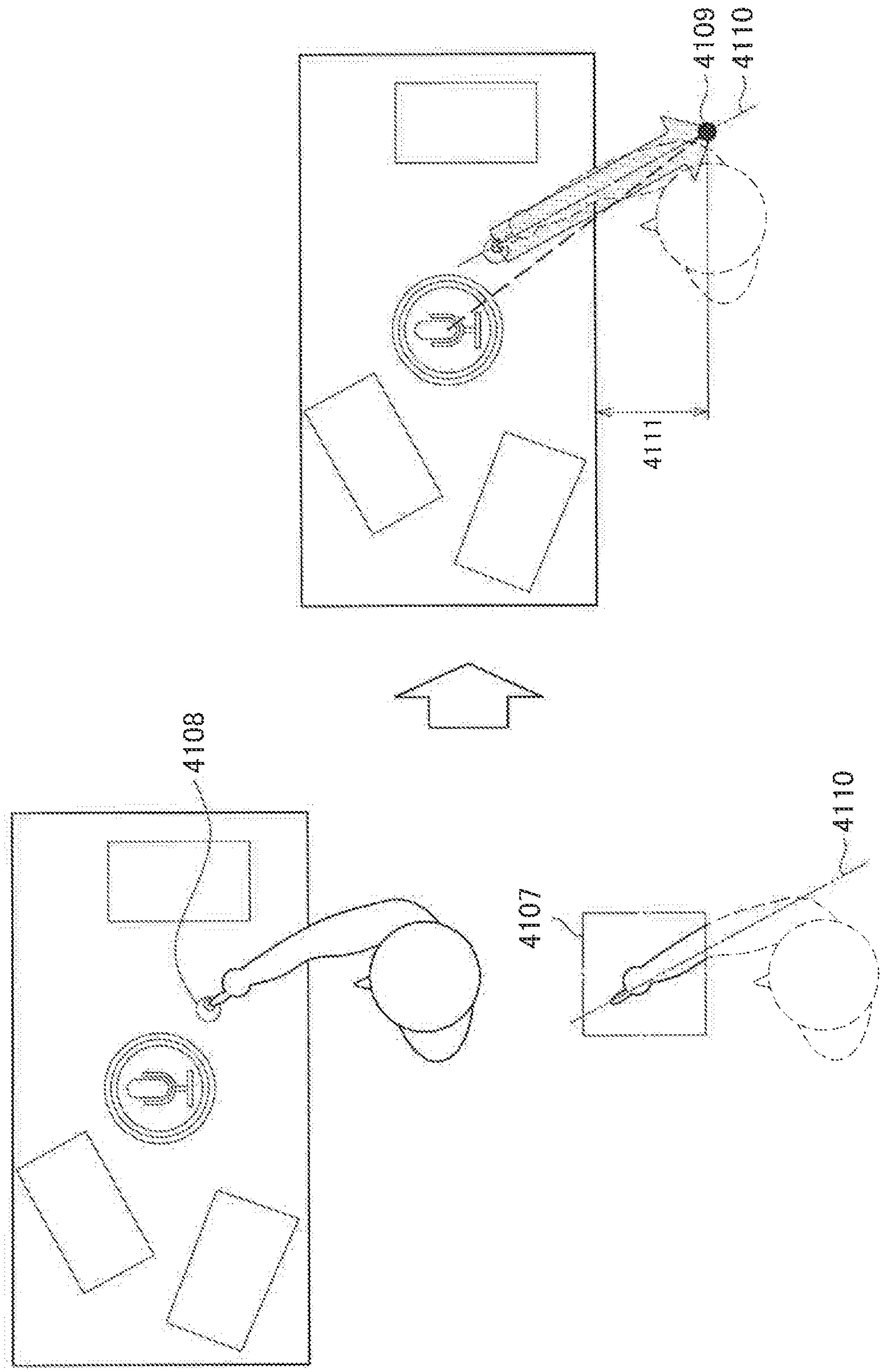

FIG. 233 is an explanatory diagram illustrating an example of a user position estimation function.

Figure 234:
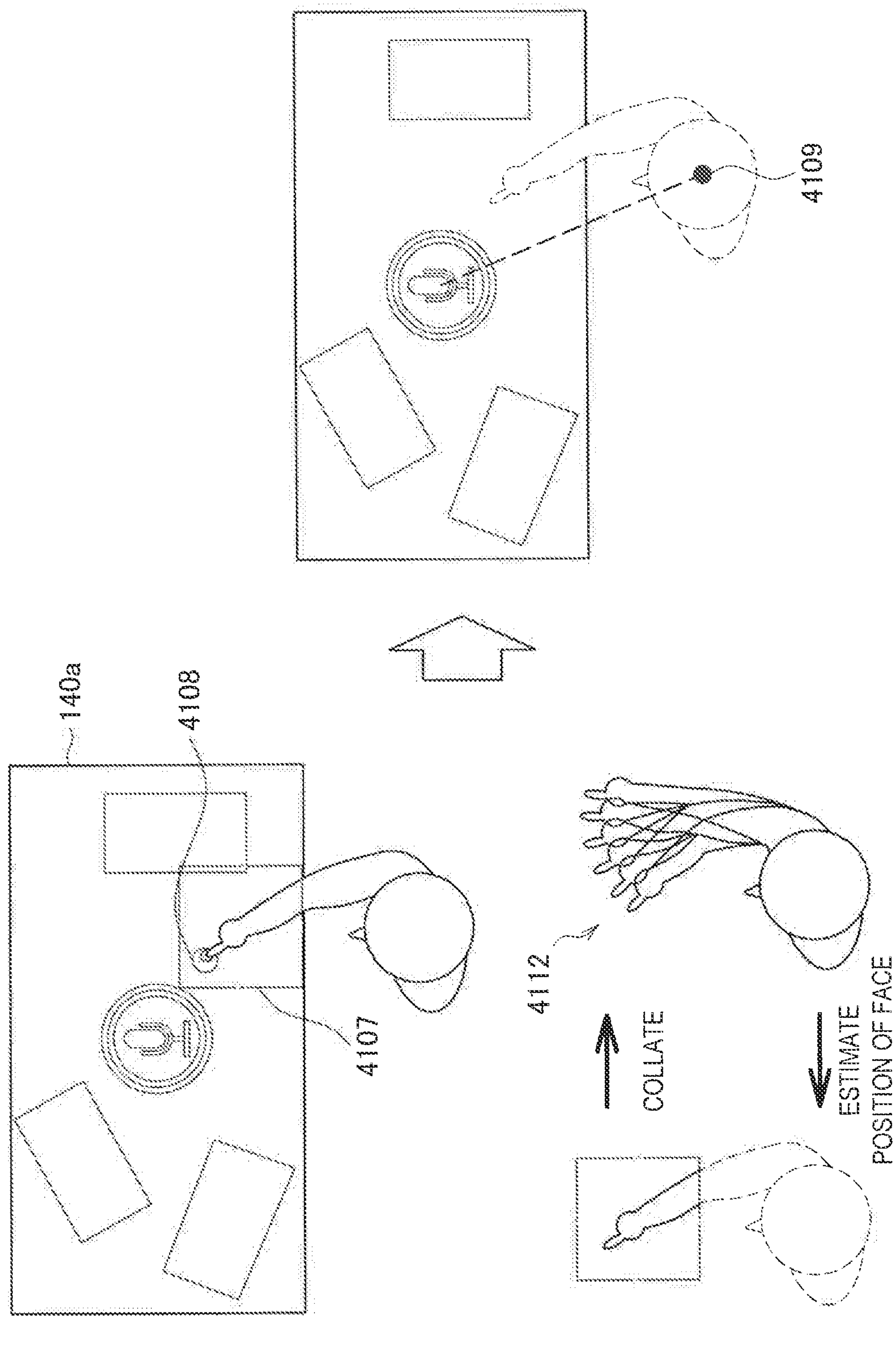

FIG. 234 is an explanatory diagram illustrating an example of a user position estimation function.

Figure 235:
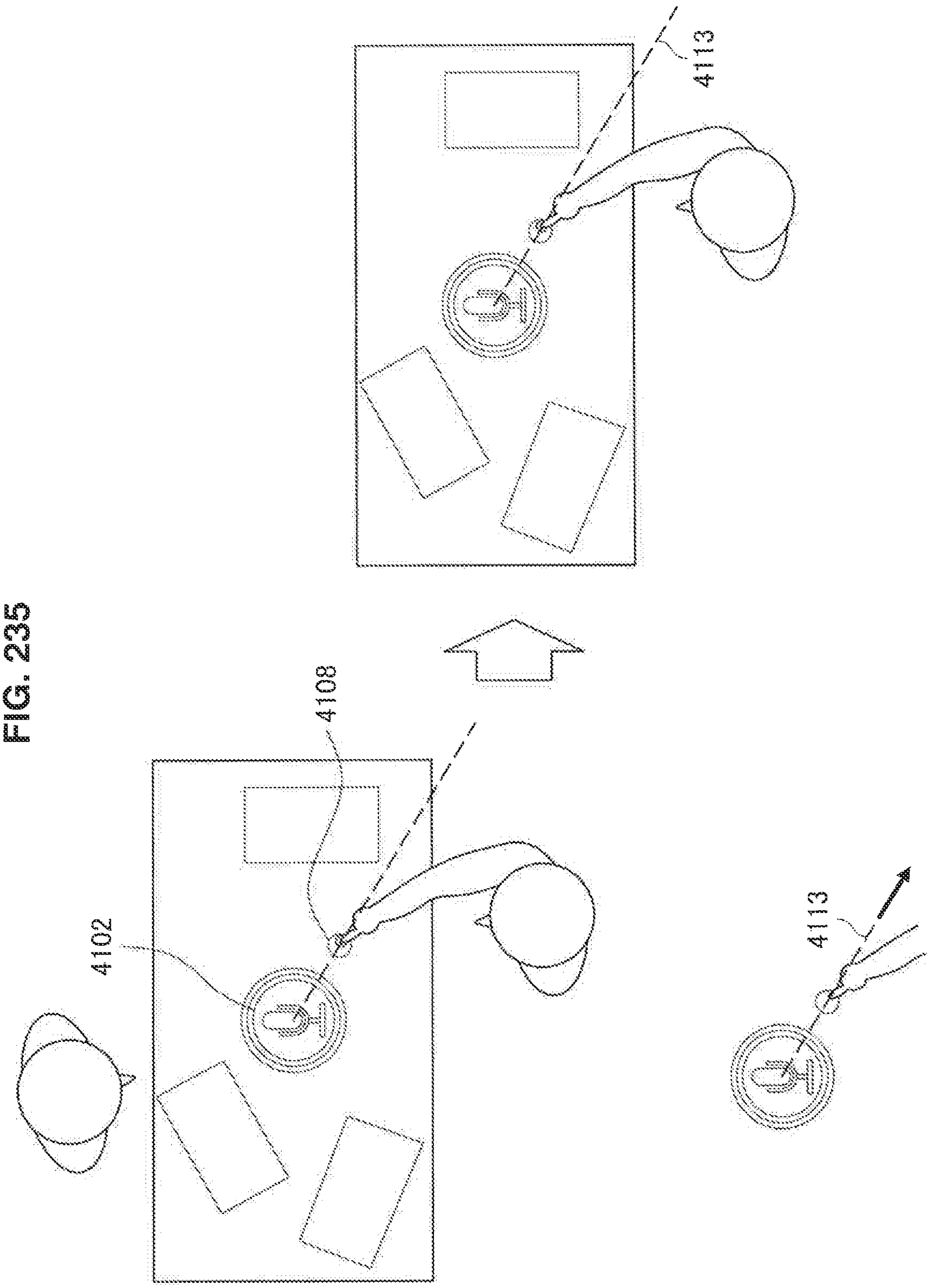

FIG. 235 is an explanatory diagram illustrating an example of a user position estimation function.

Figure 236:
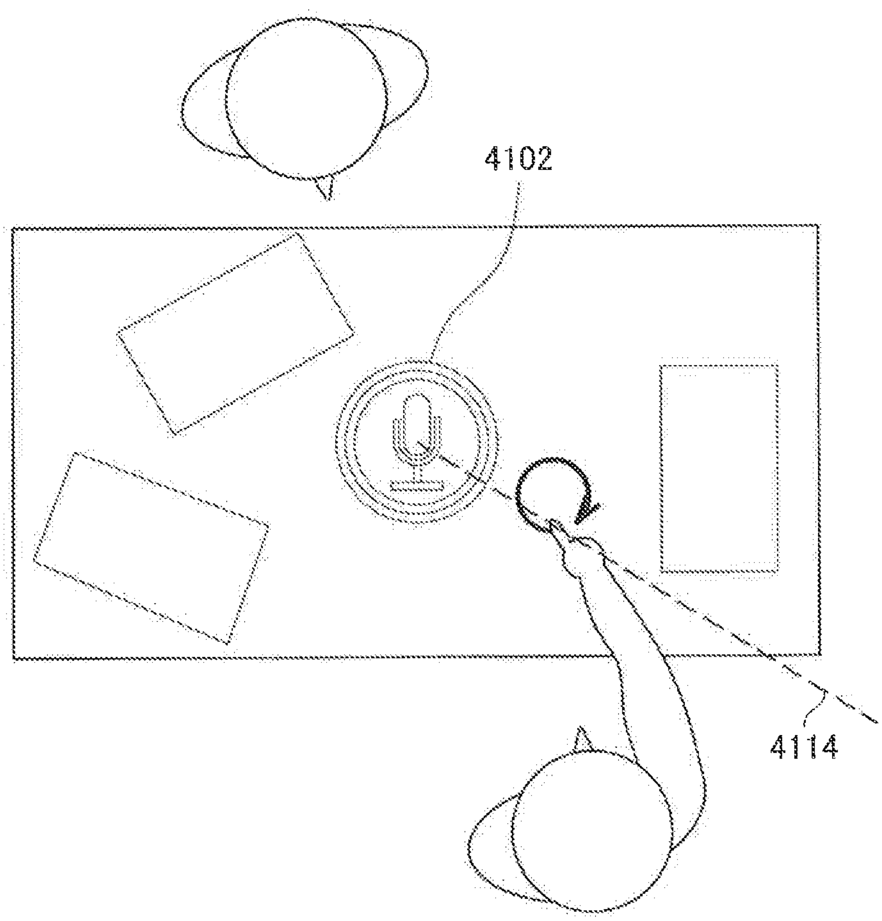

FIG. 236 is an explanatory diagram illustrating an example of a user position estimation function.

Figure 237:
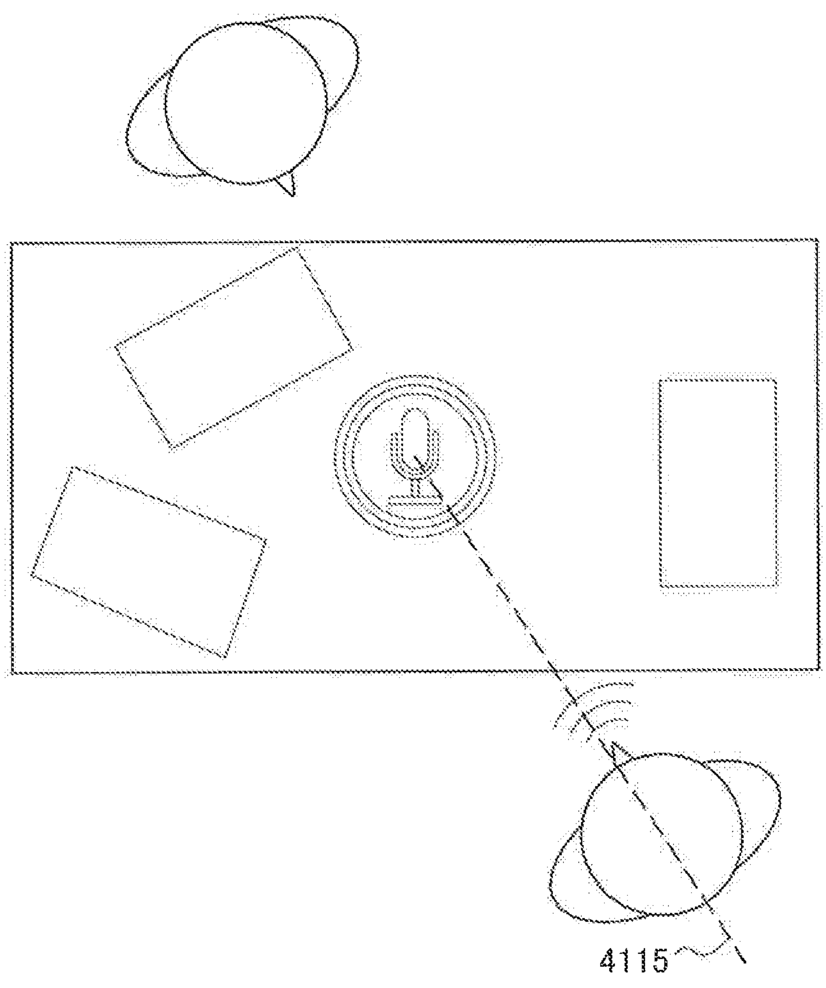

FIG. 237 is an explanatory diagram illustrating an example of a user position estimation function.

Figure 238:
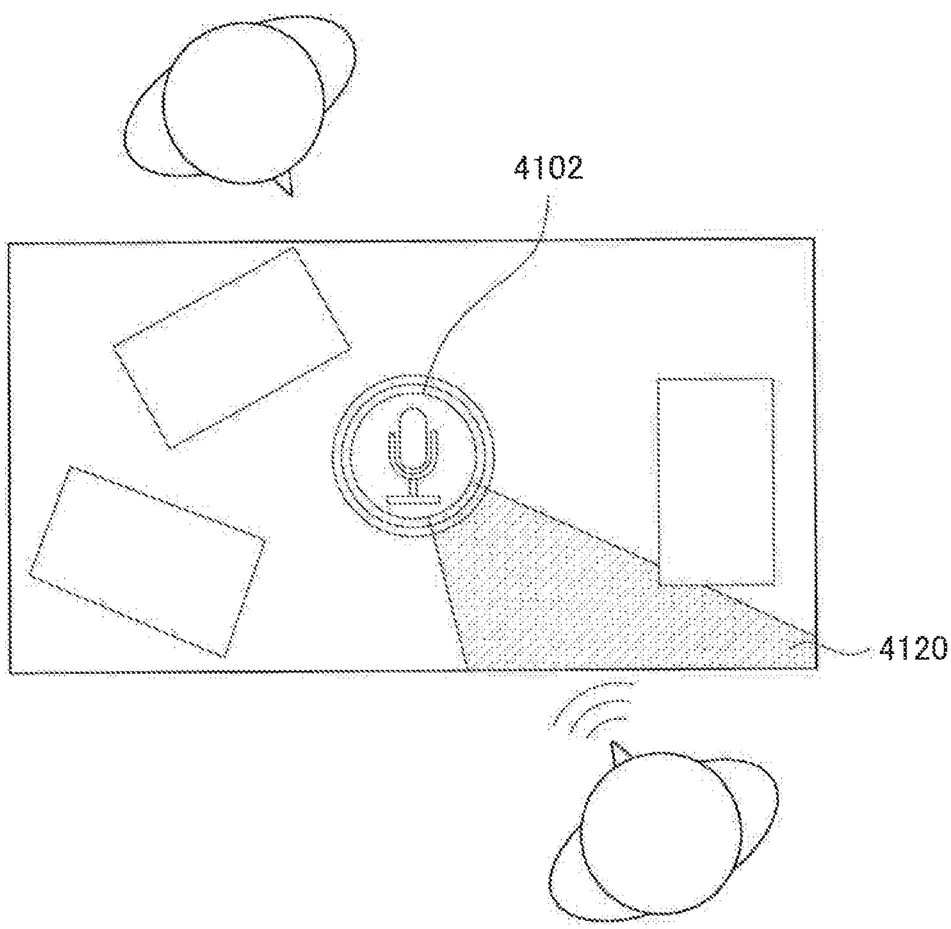

FIG. 238 is an explanatory diagram illustrating an example of a user interface.

Figure 239:
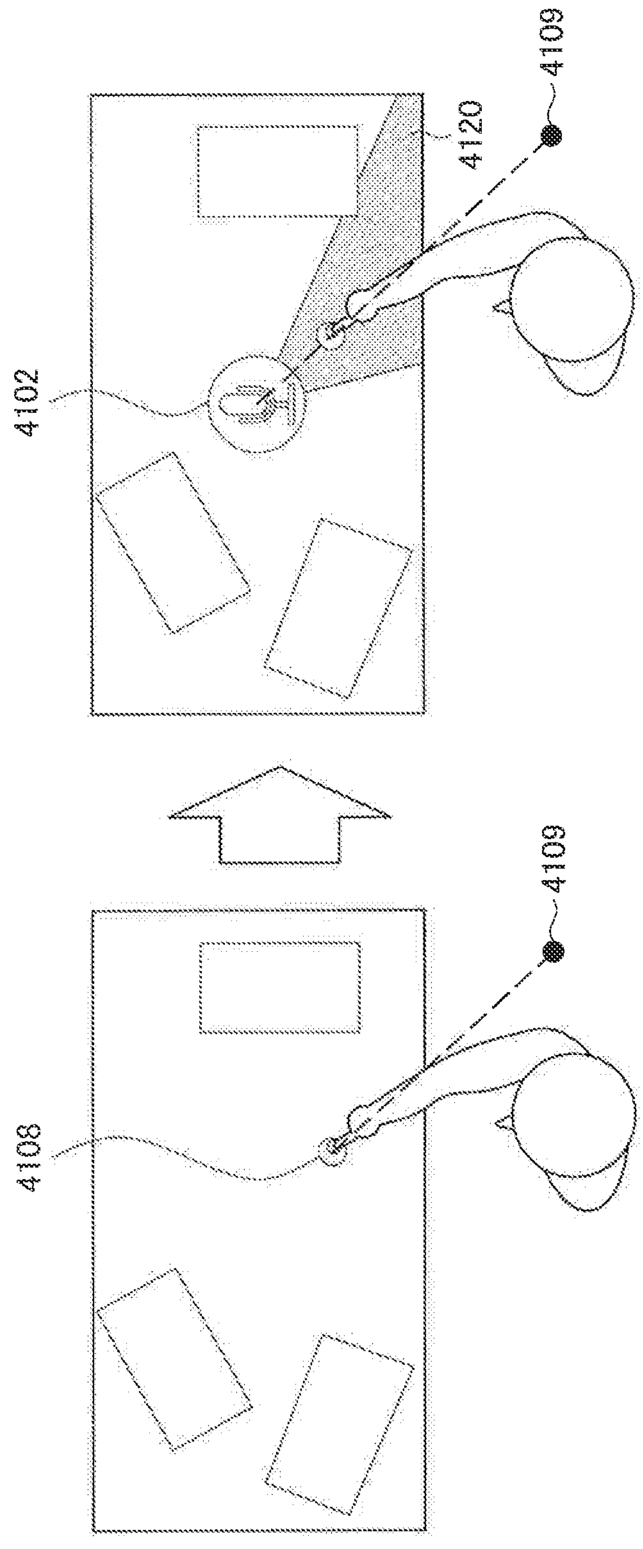

FIG. 239 is an explanatory diagram illustrating an example of a user interface.

Figure 240:
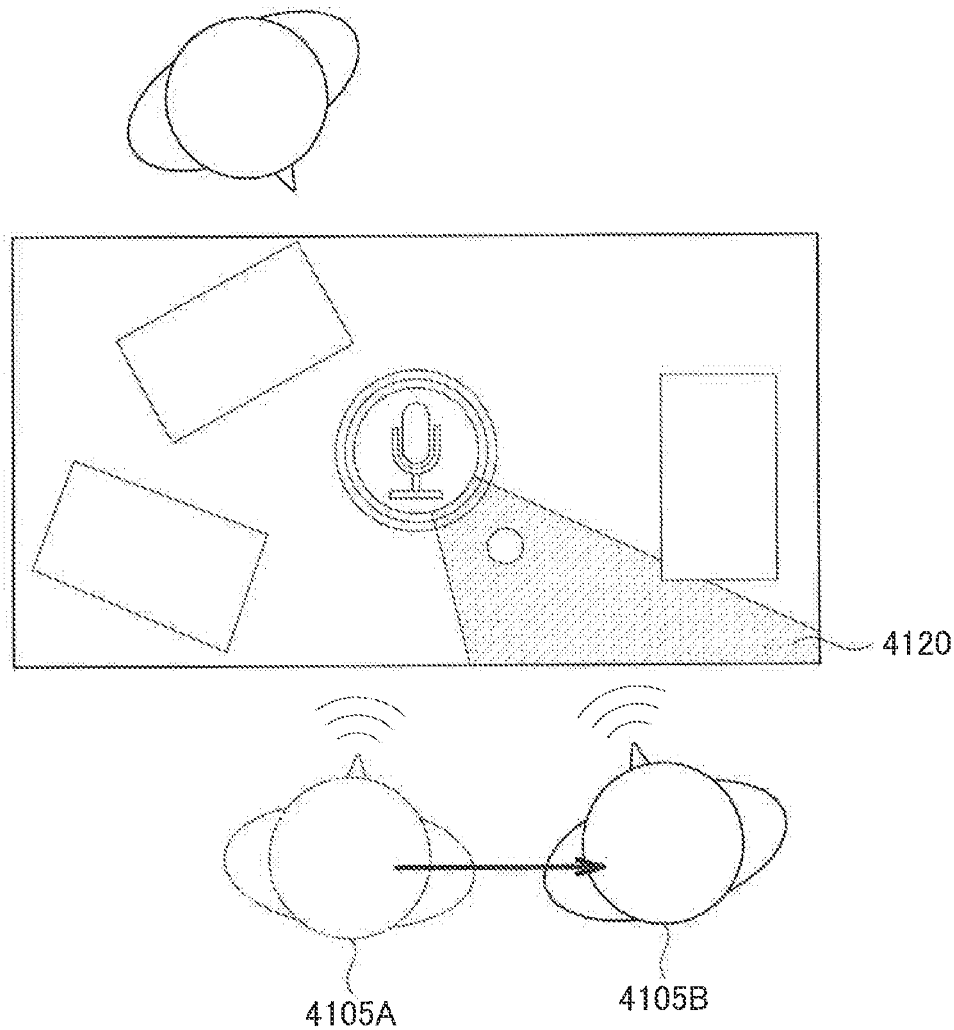

FIG. 240 is an explanatory diagram illustrating an example of a user interface.

Figure 241:
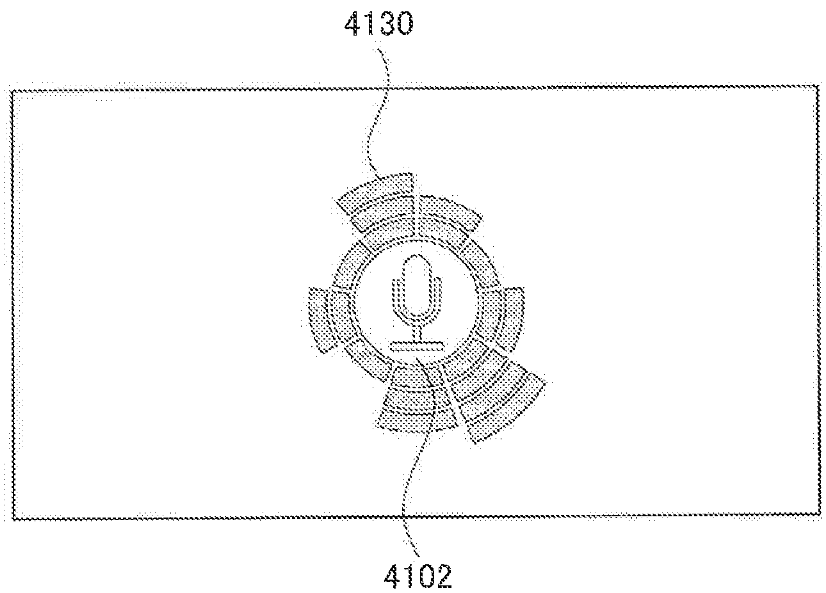

FIG. 241 is an explanatory diagram illustrating an example of a user interface.

Figure 242:
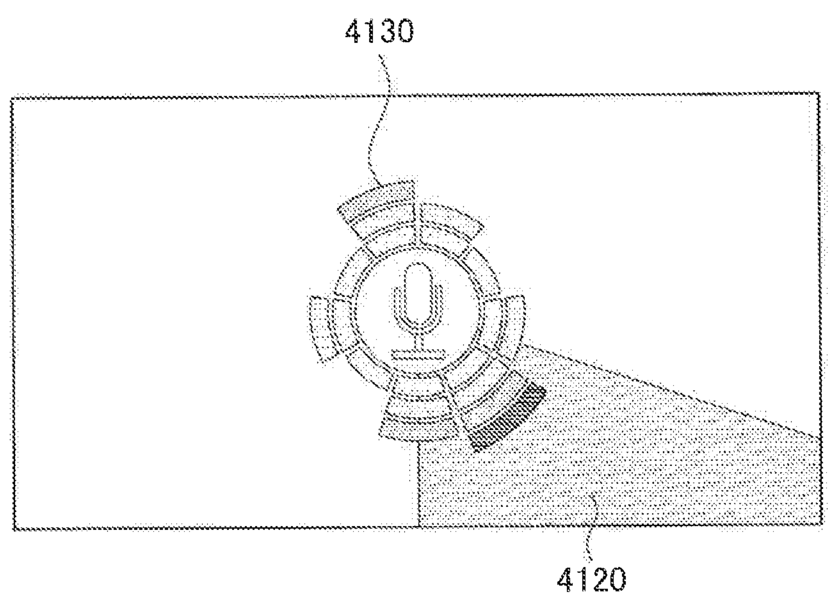

FIG. 242 is an explanatory diagram illustrating an example of a user interface.

Figure 243:
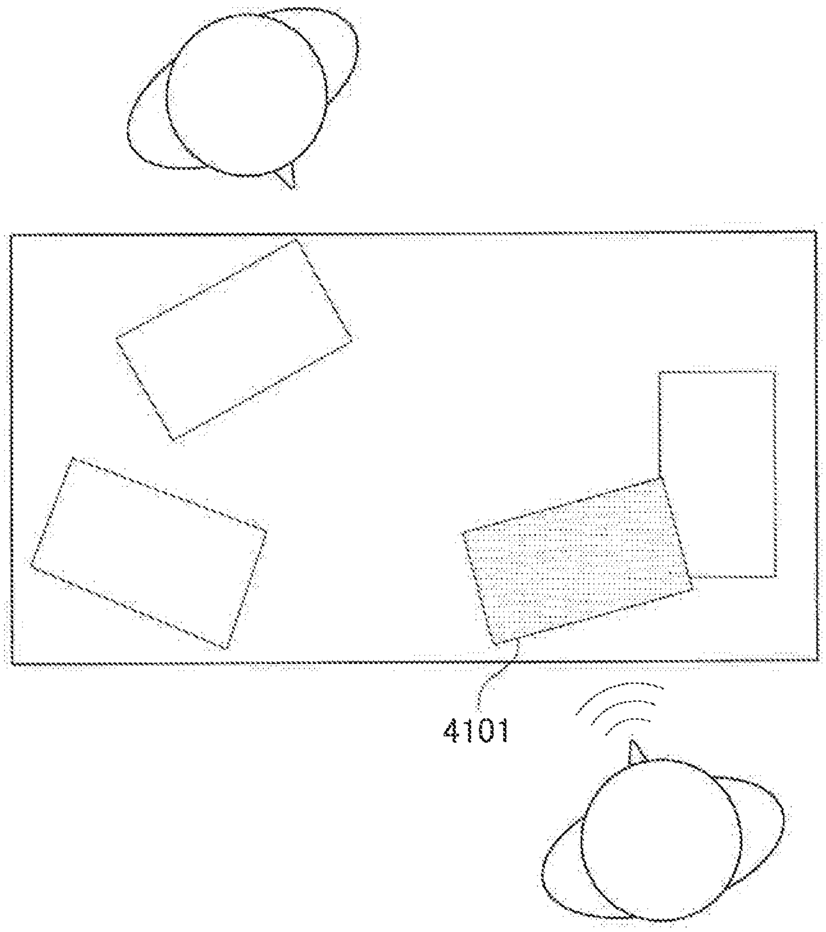

FIG. 243 is an explanatory diagram illustrating an example of a user interface.

Figure 244:
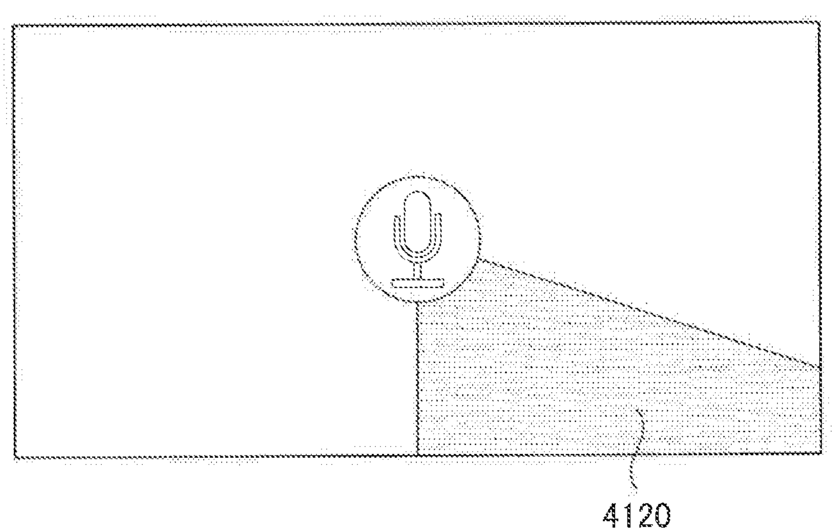

FIG. 244 is an explanatory diagram illustrating an example of a user interface.

Figure 245:
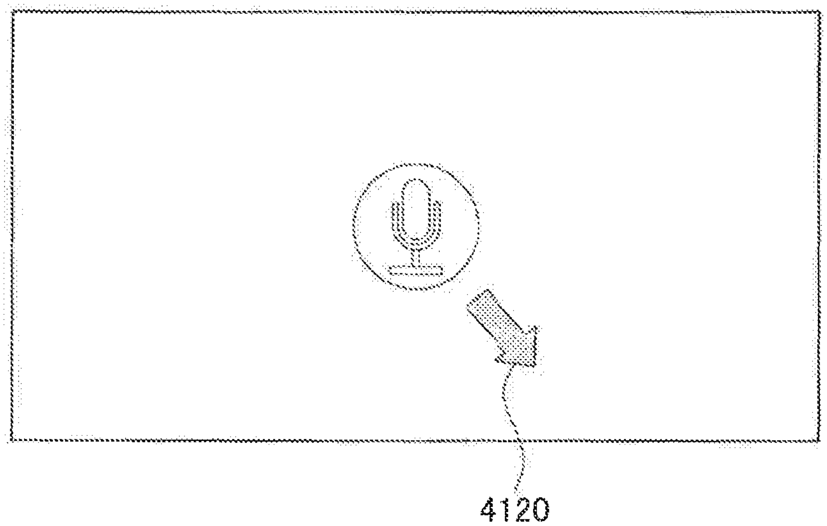

FIG. 245 is an explanatory diagram illustrating an example of a user interface.

Figure 246:
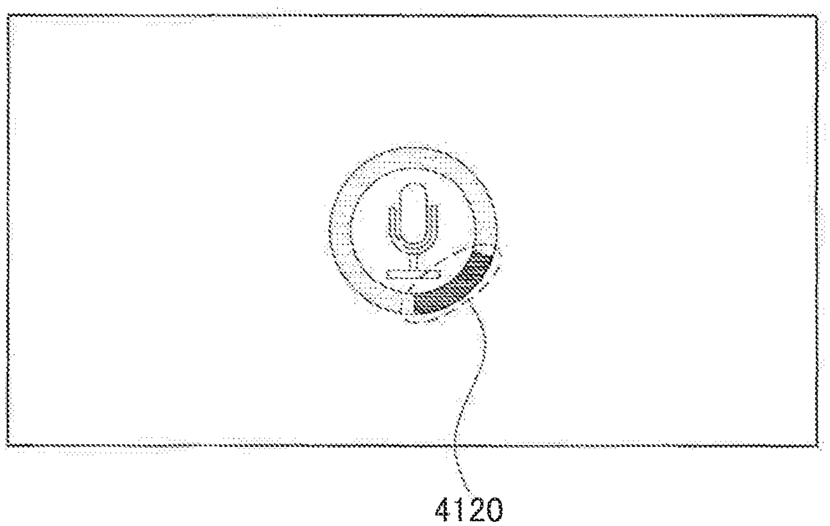

FIG. 246 is an explanatory diagram illustrating an example of a user interface.

Figure 247:
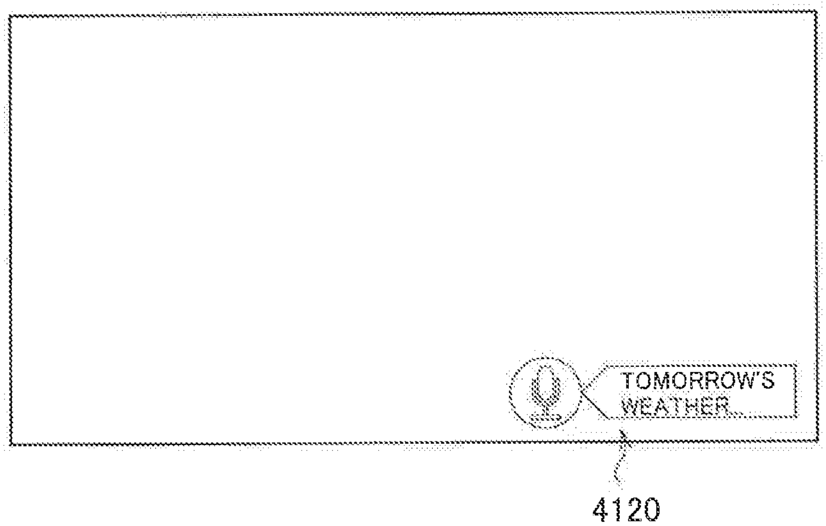

FIG. 247 is an explanatory diagram illustrating an example of a user interface.

Figure 248:
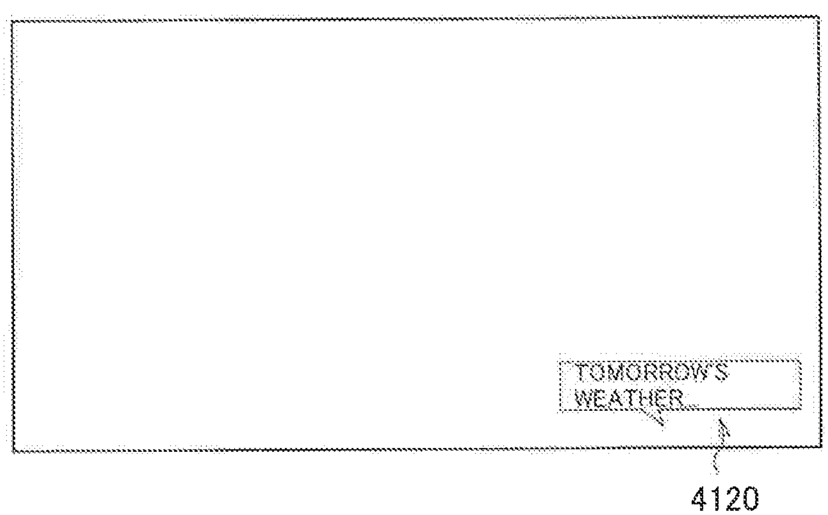

FIG. 248 is an explanatory diagram illustrating an example of a user interface.

Figure 249:
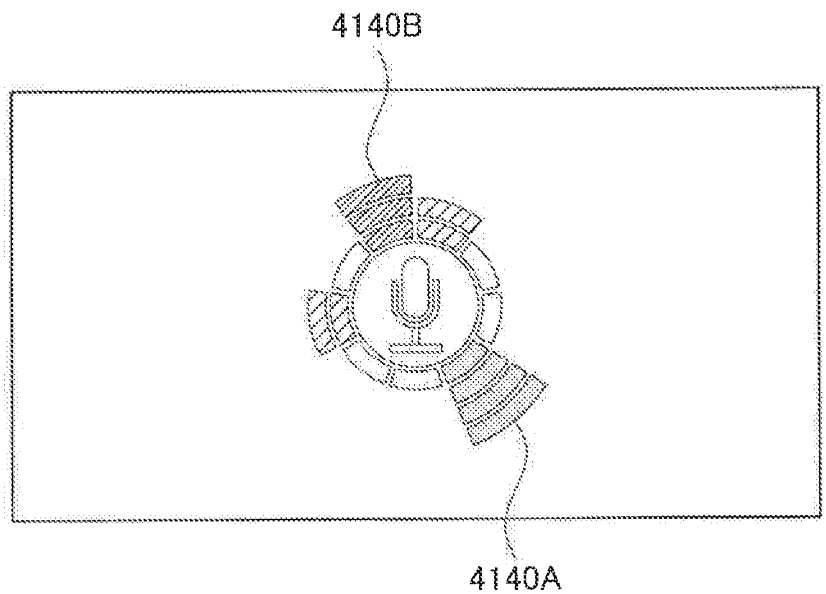

FIG. 249 is an explanatory diagram illustrating an example of a user interface.

Figure 250:
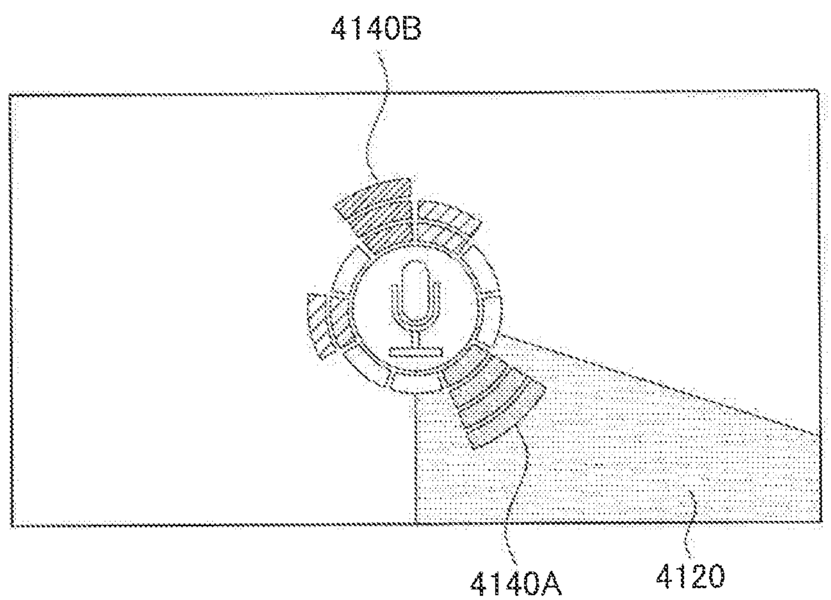

FIG. 250 is an explanatory diagram illustrating an example of a user interface.

Figure 251:
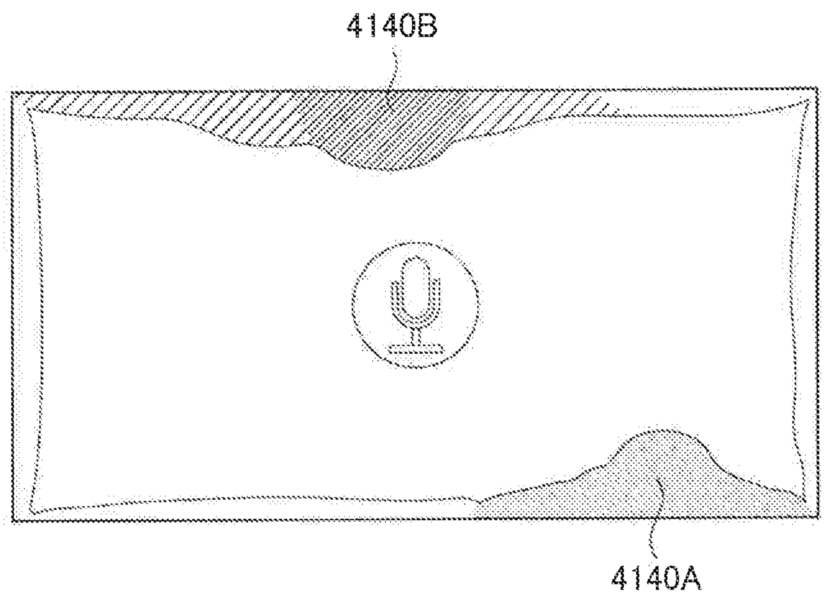

FIG. 251 is an explanatory diagram illustrating an example of a user interface.

Figure 252:
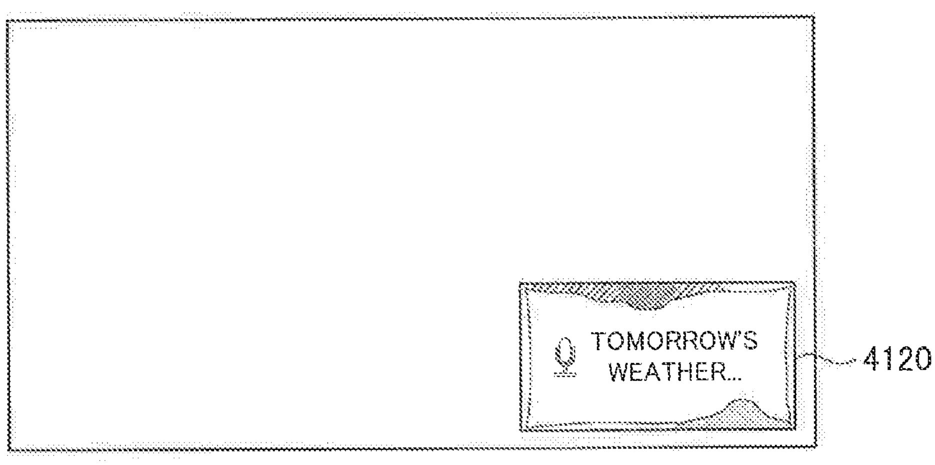

FIG. 252 is an explanatory diagram illustrating an example of a user interface.

Figure 253:
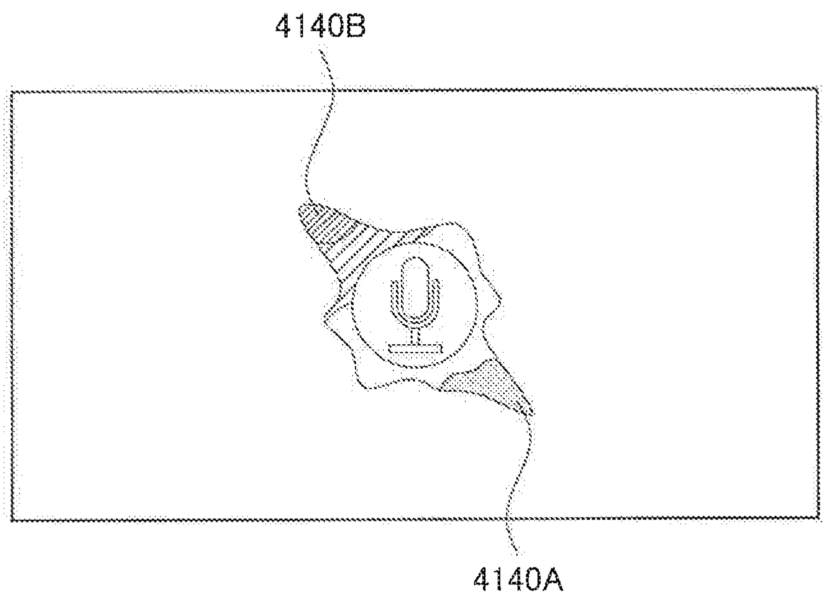

FIG. 253 is an explanatory diagram illustrating an example of a user interface.

Figure 254:
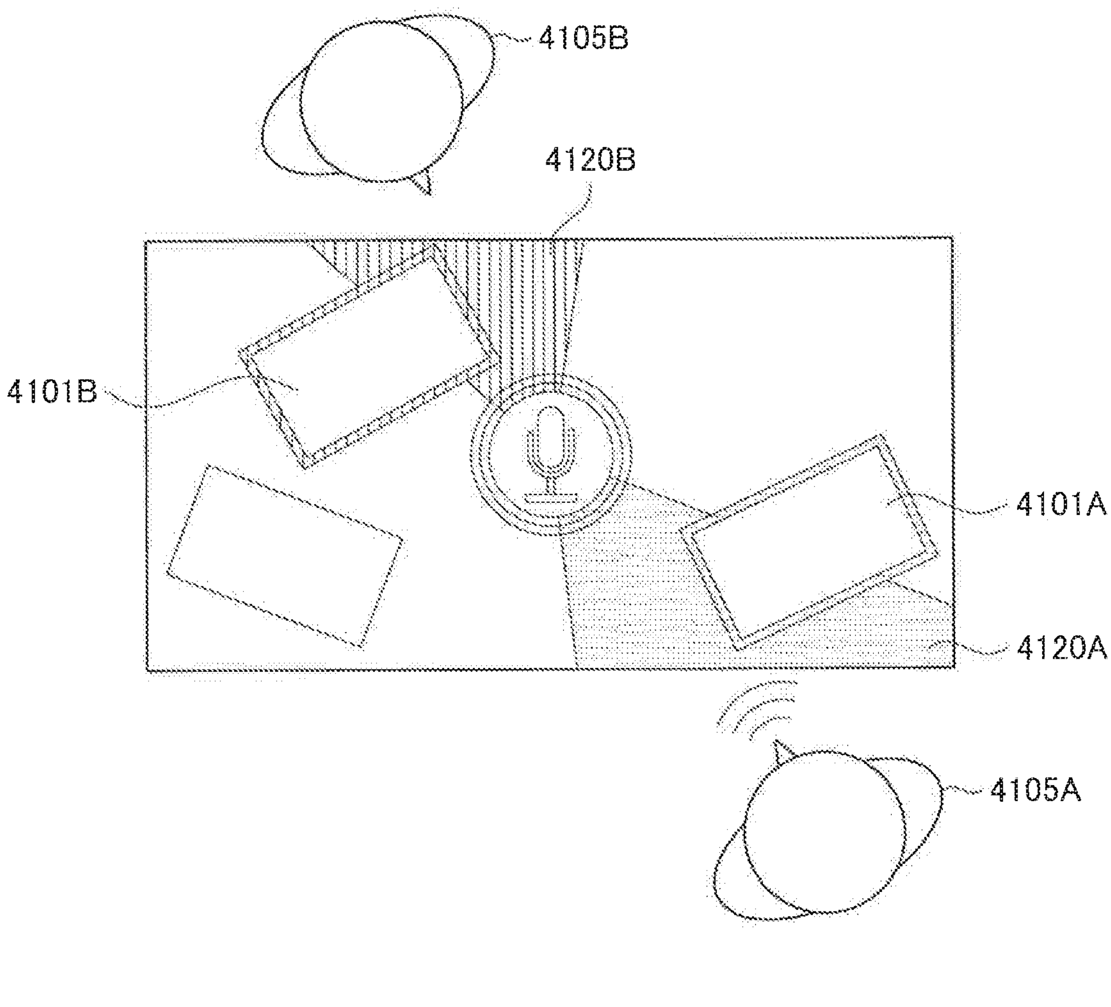

FIG. 254 is an explanatory diagram illustrating an example of a user interface.

Figure 255:
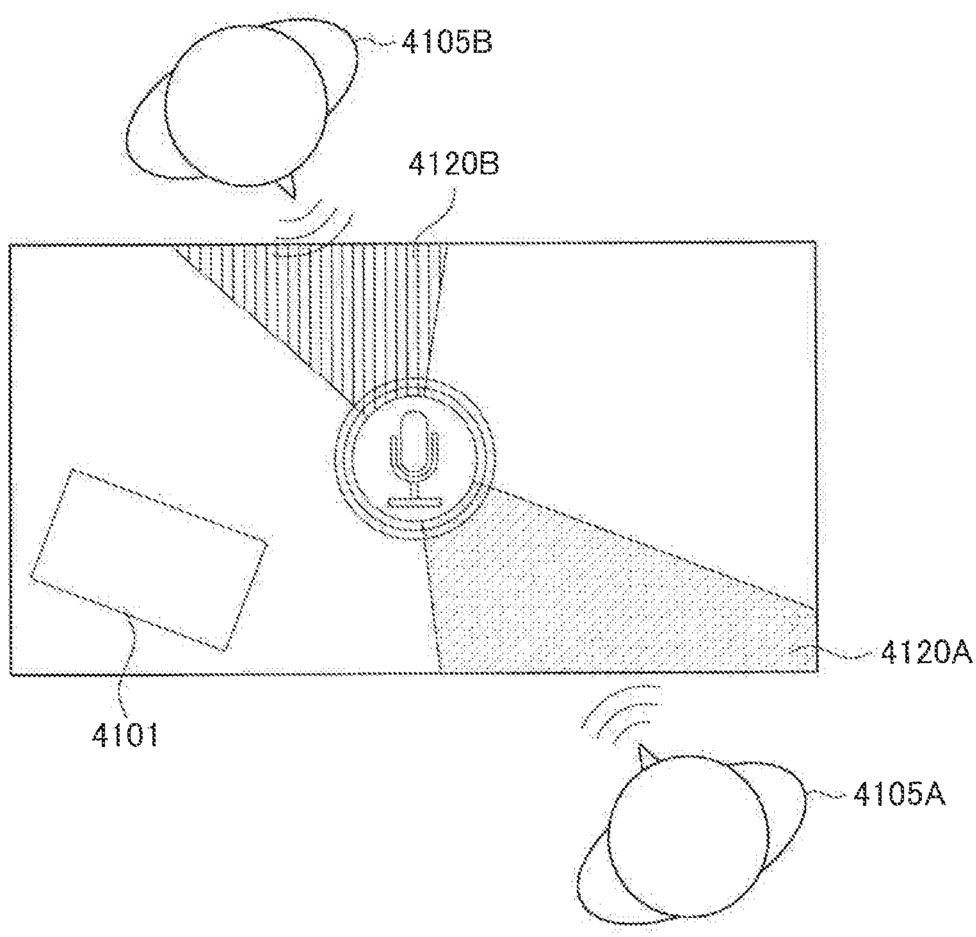

FIG. 255 is an explanatory diagram illustrating an example of a user interface.

Figure 256:
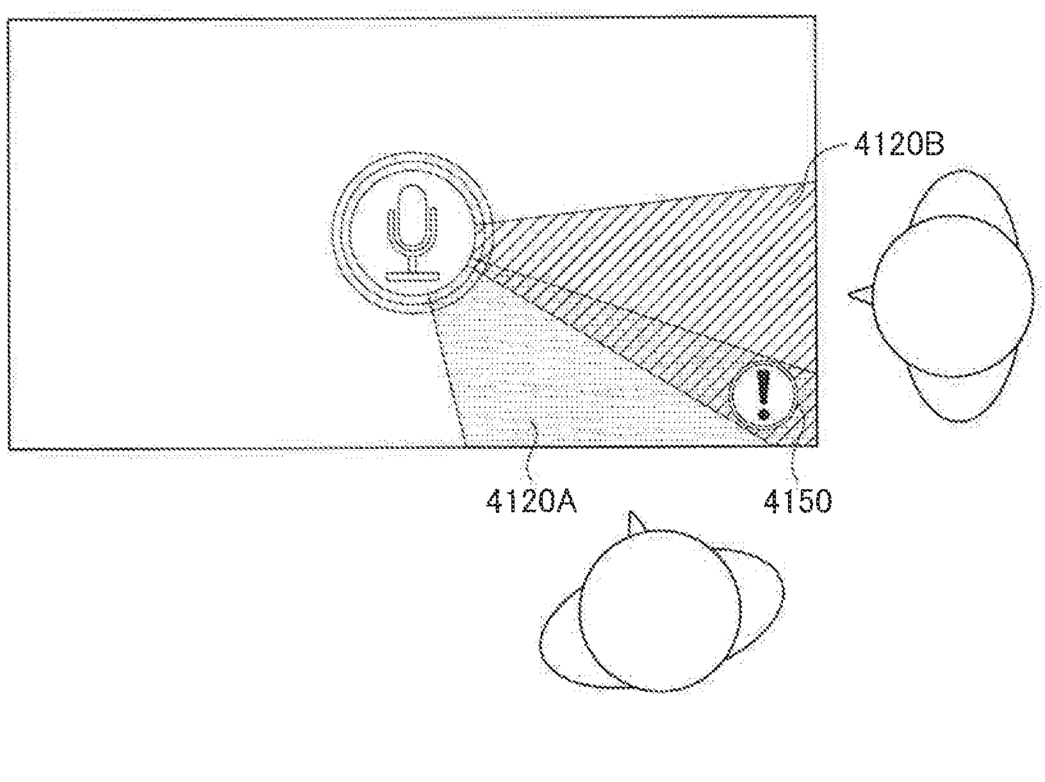

FIG. 256 is an explanatory diagram illustrating an example of a user interface.

Figure 257:
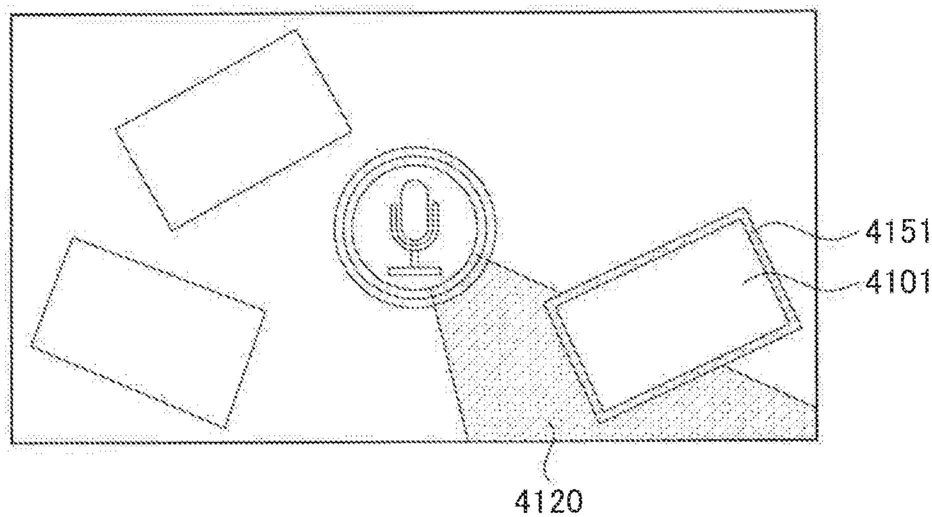

FIG. 257 is an explanatory diagram illustrating an example of a user interface.

Figure 258:
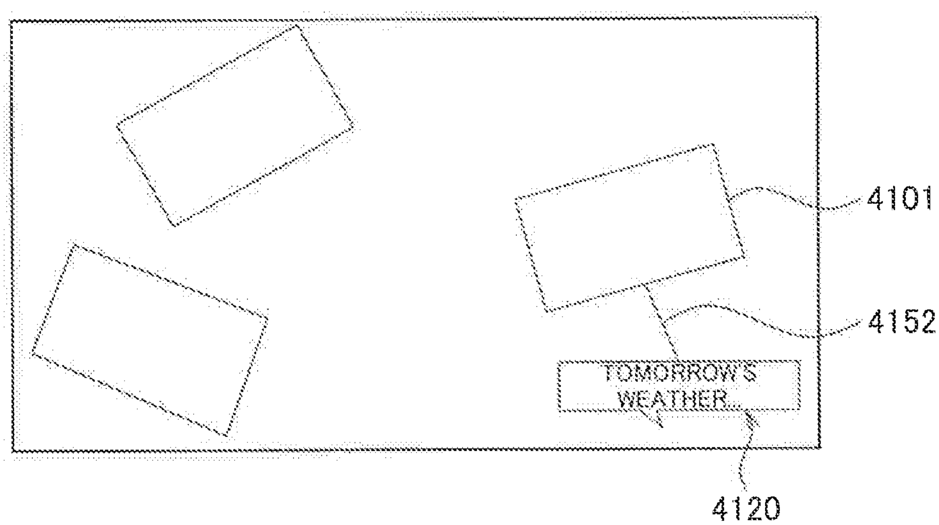

FIG. 258 is an explanatory diagram illustrating an example of a user interface.

Figure 259:
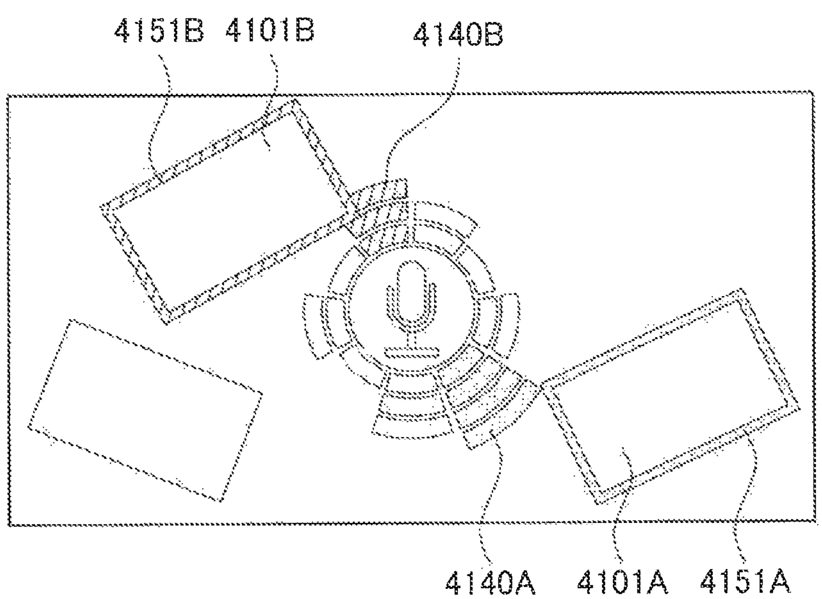

FIG. 259 is an explanatory diagram illustrating an example of a user interface.

Figure 260:
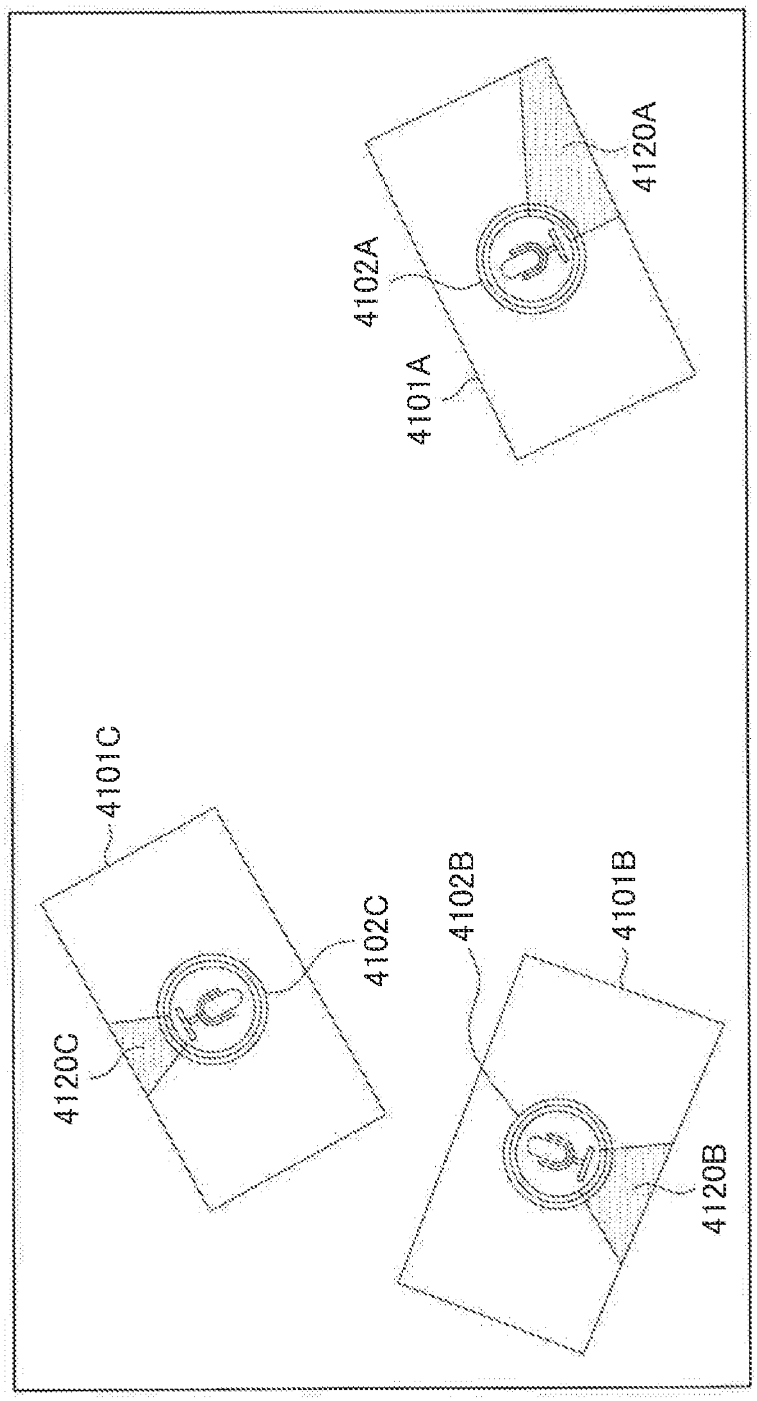

FIG. 260 is an explanatory diagram illustrating an example of a user interface.

Figure 261:
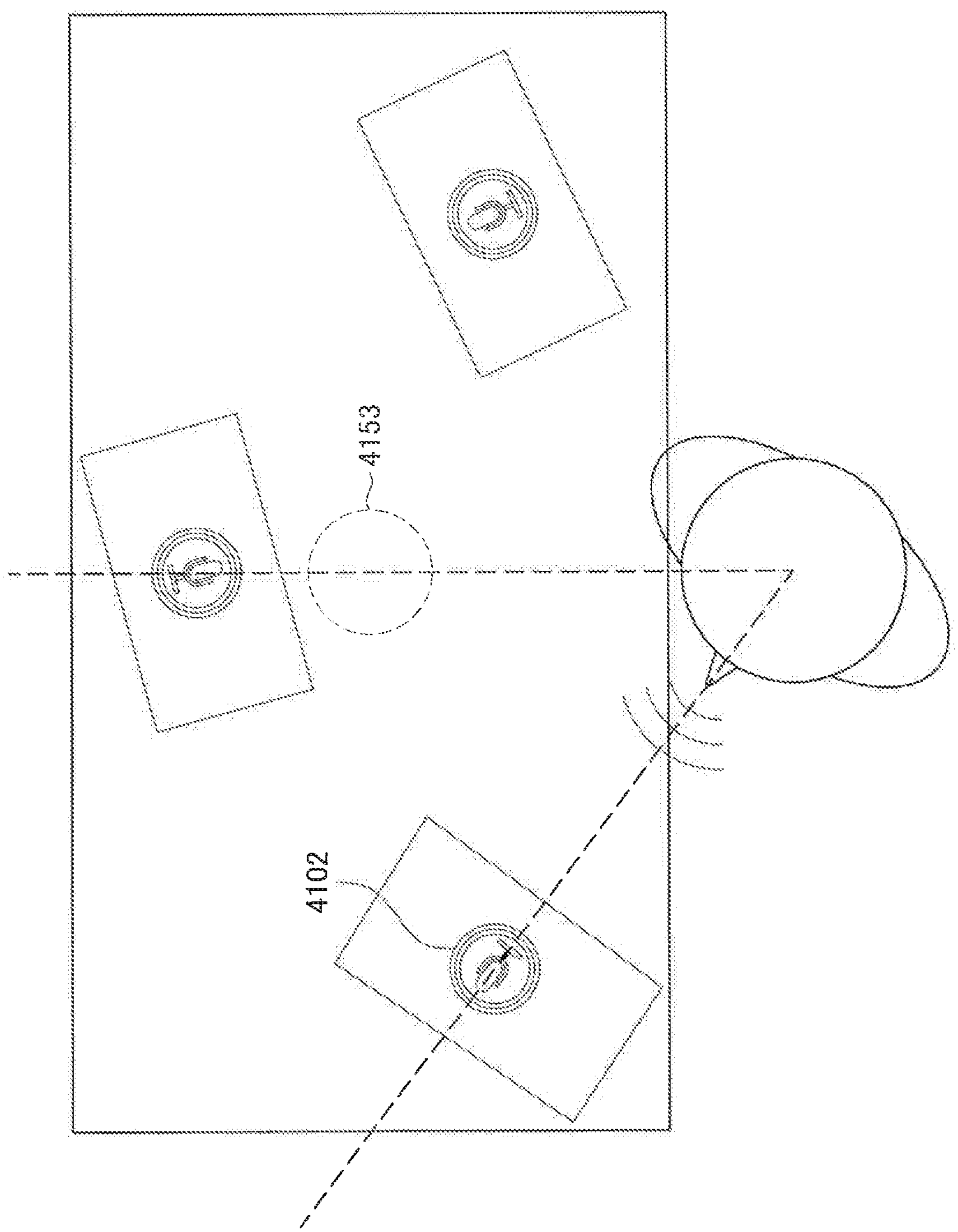

FIG. 261 is an explanatory diagram illustrating an example of a user interface.

Figure 262:
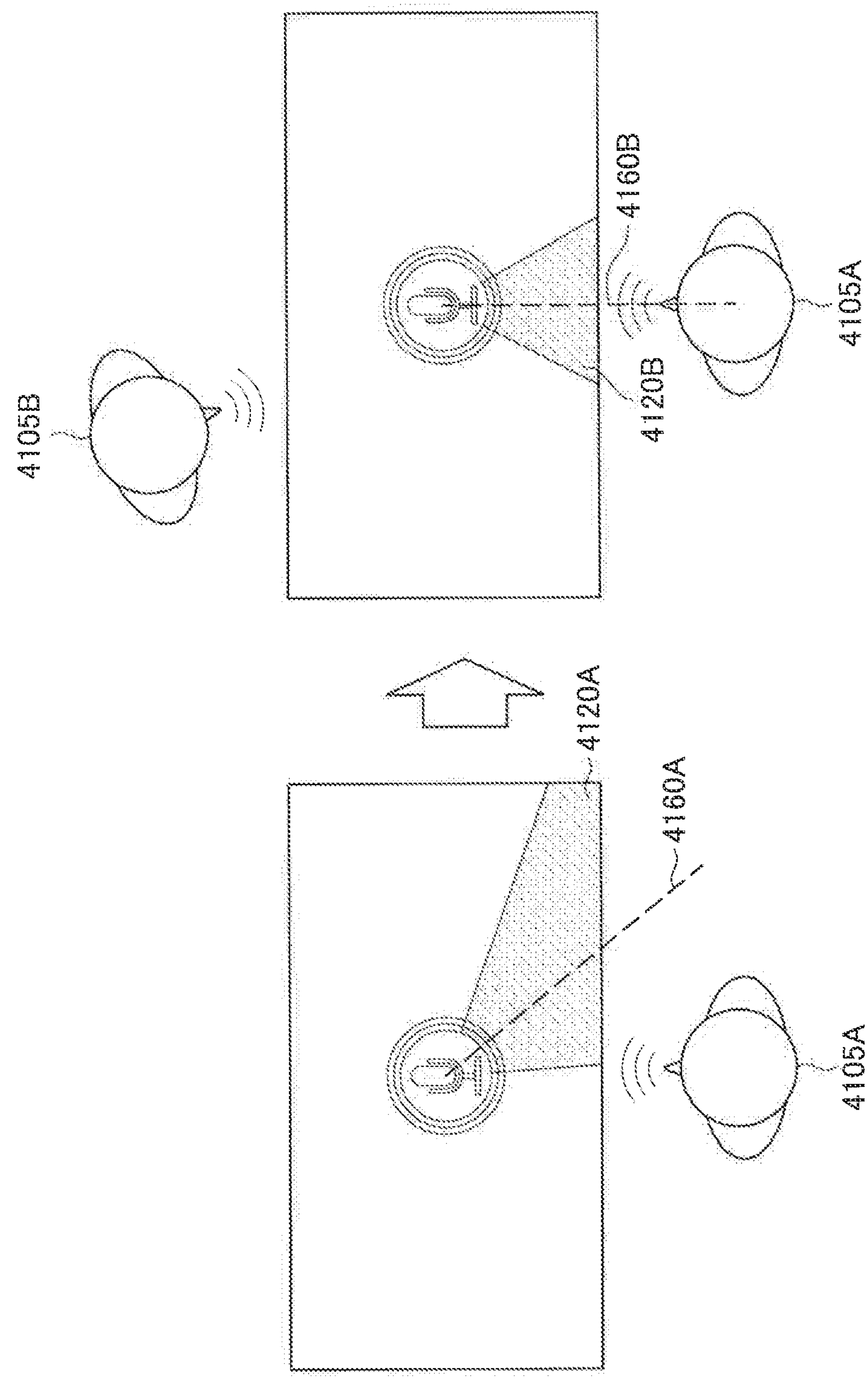

FIG. 262 is an explanatory diagram illustrating an example of a user interface.

Figure 263:
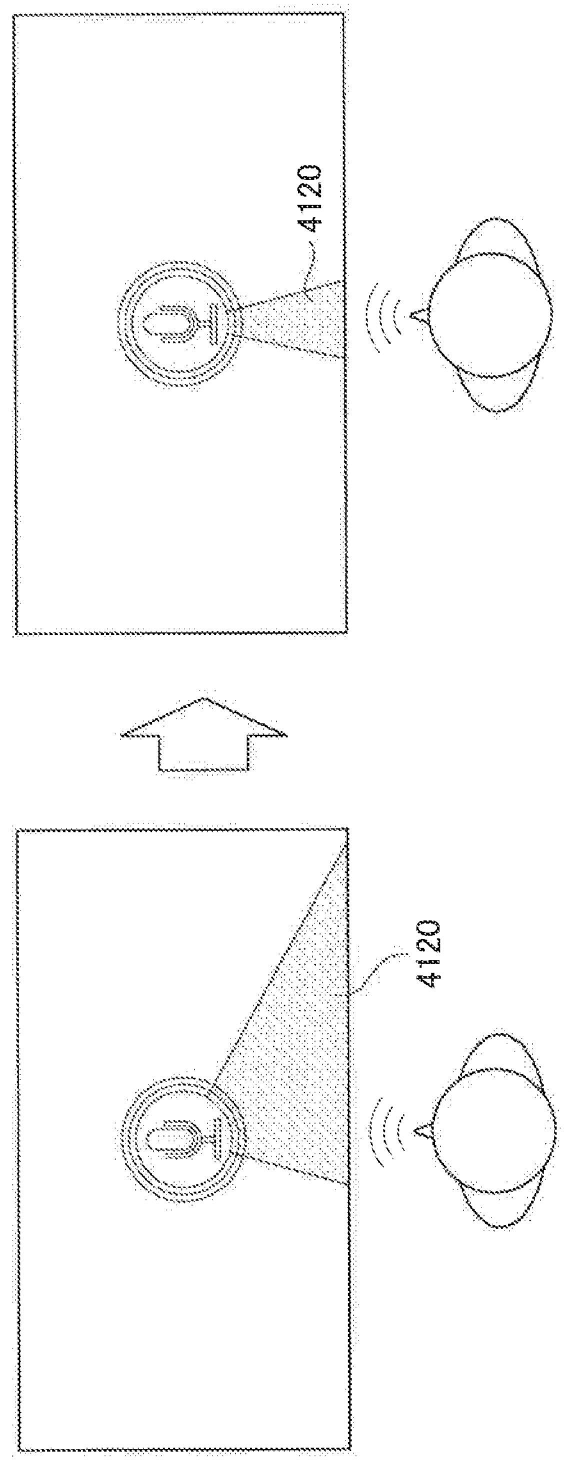

FIG. 263 is an explanatory diagram illustrating an example of a user interface.

Figure 264:
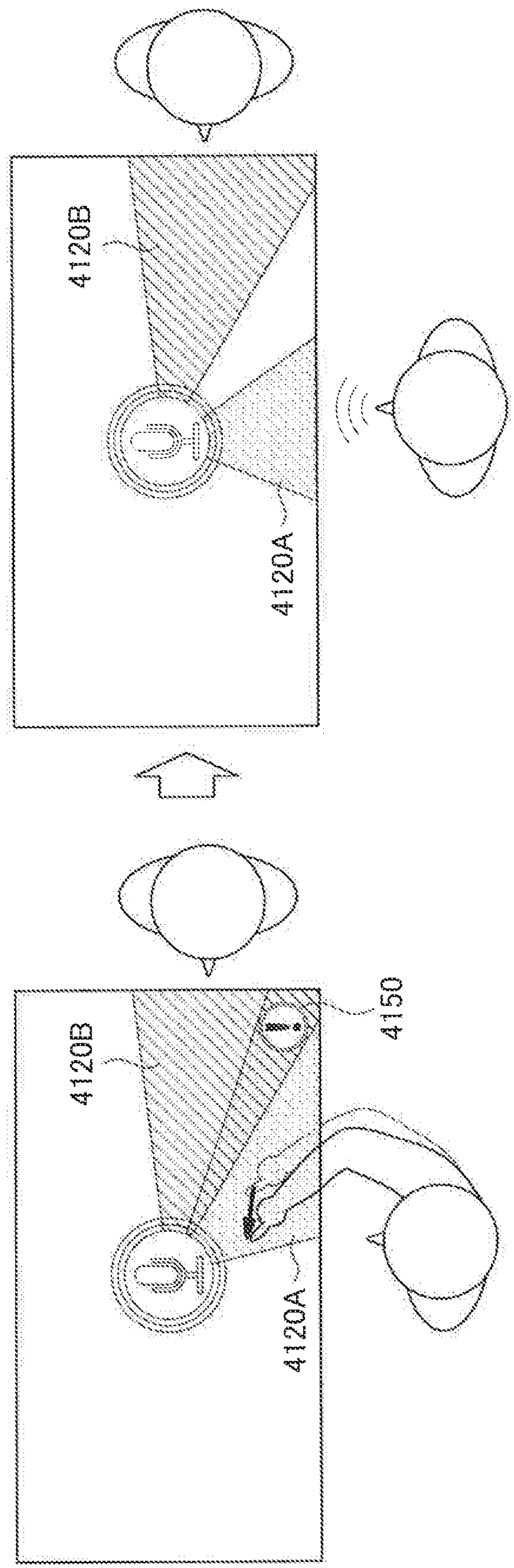

FIG. 264 is an explanatory diagram illustrating an example of a user interface.

Figure 265:
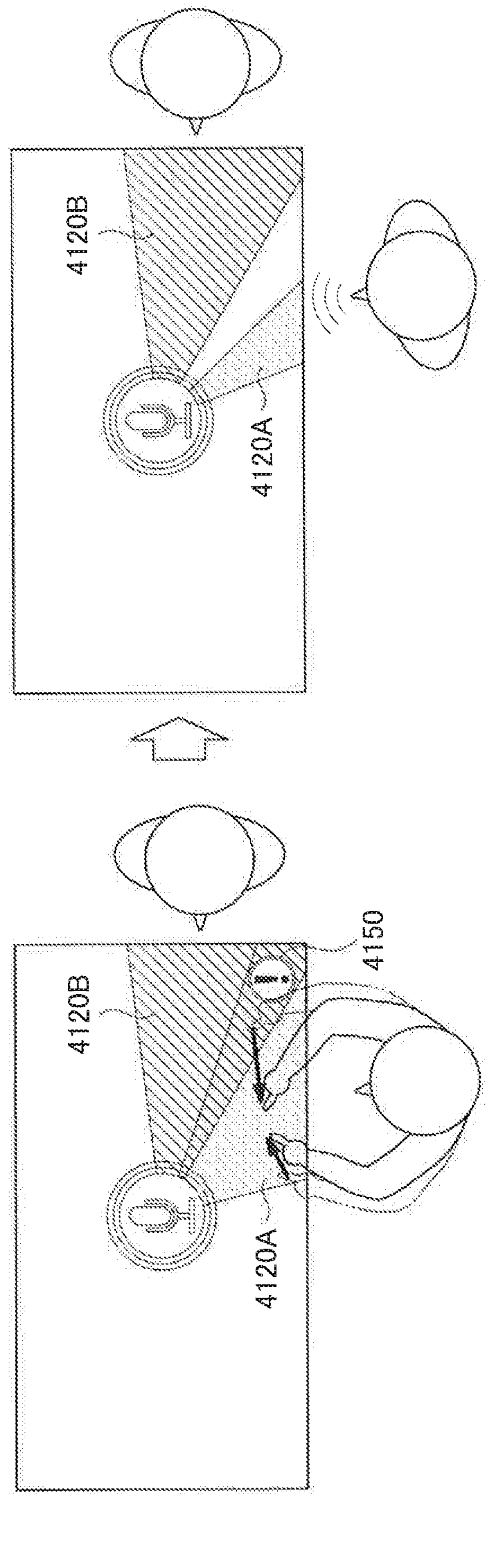

FIG. 265 is an explanatory diagram illustrating an example of a user interface.

Figure 266:
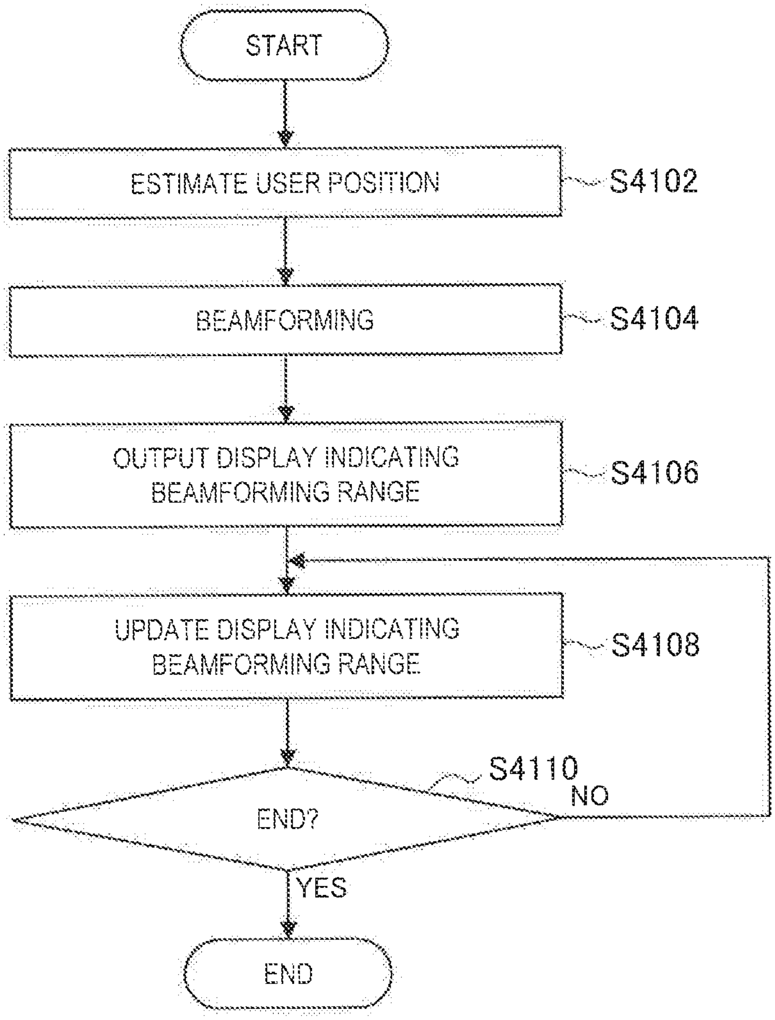

FIG. 266 is a flowchart illustrating an example of the flow of a display control process executed in the information processing system.

Figure 267:
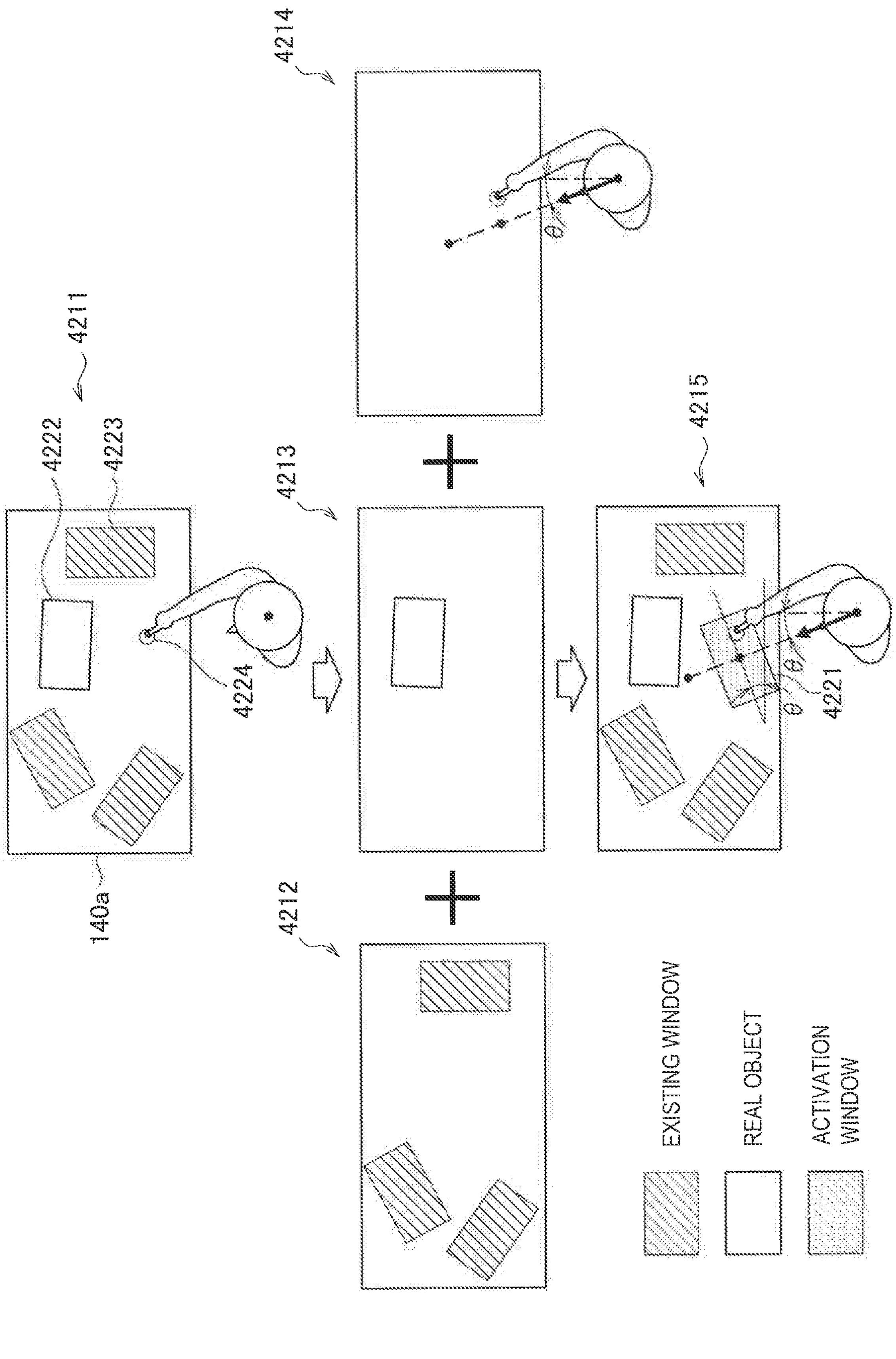

FIG. 267 is an explanatory diagram illustrating an overview of a user interface.

Figure 268:
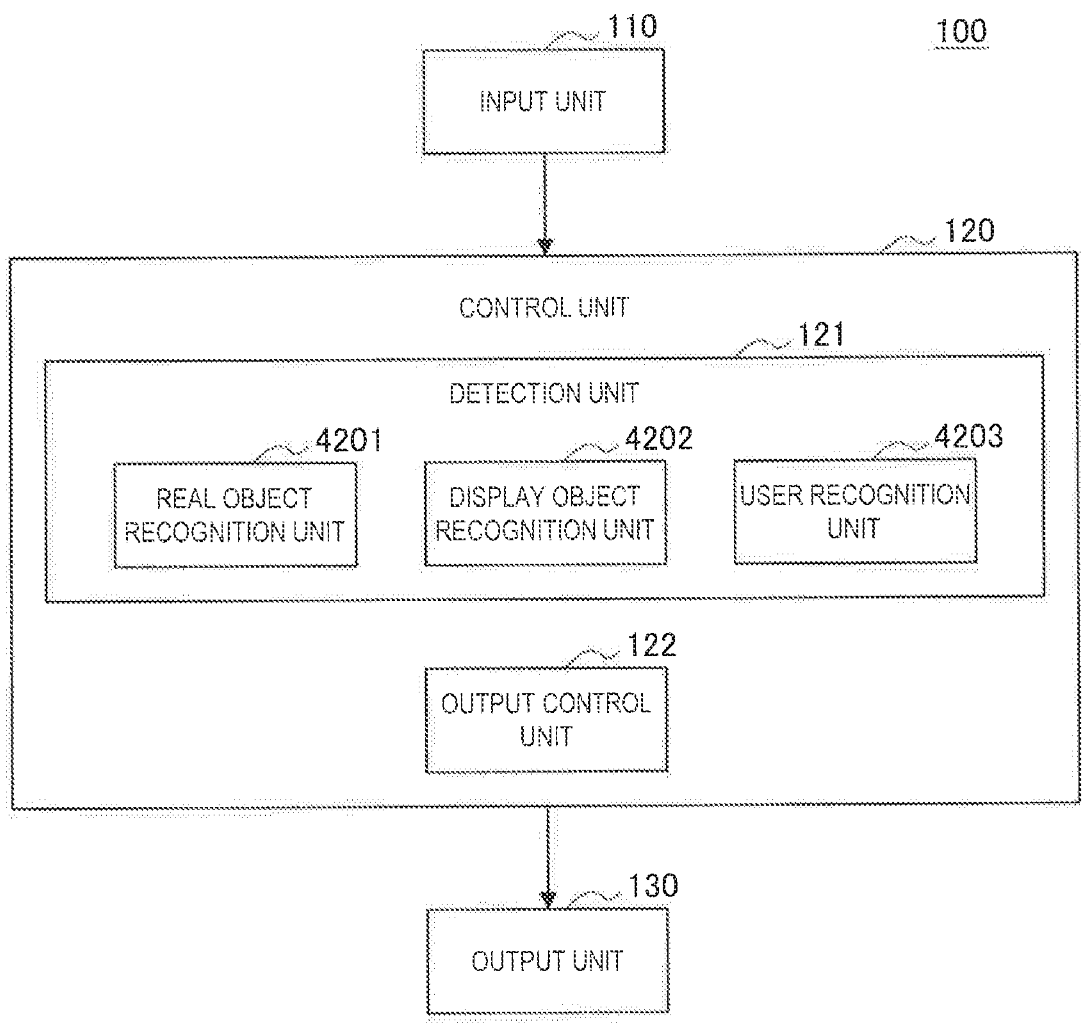

FIG. 268 is a block diagram illustrating an example of a logical configuration of the information processing system.

Figure 269:
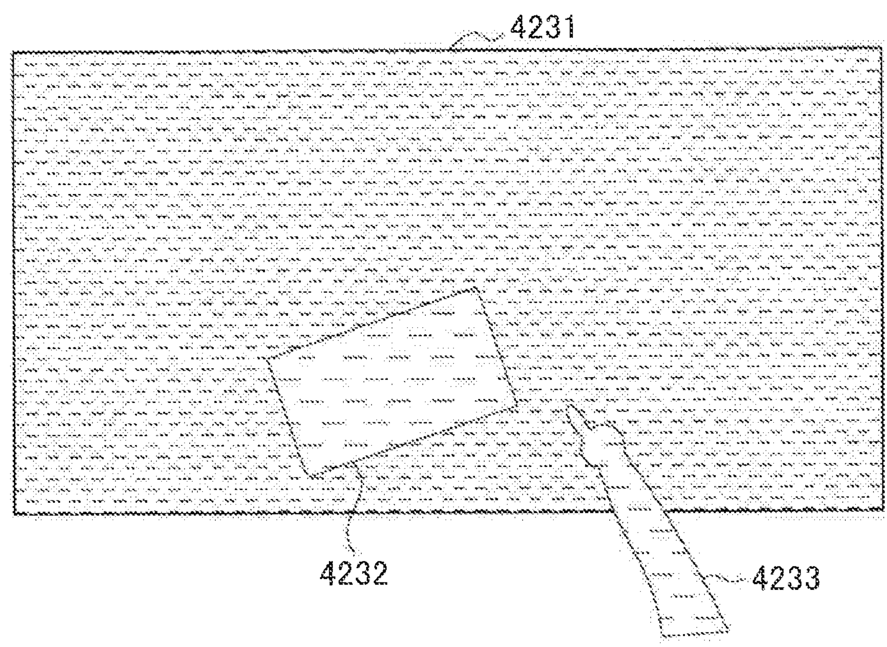

FIG. 269 is an explanatory diagram illustrating an example of a real object recognition function.

Figure 270:
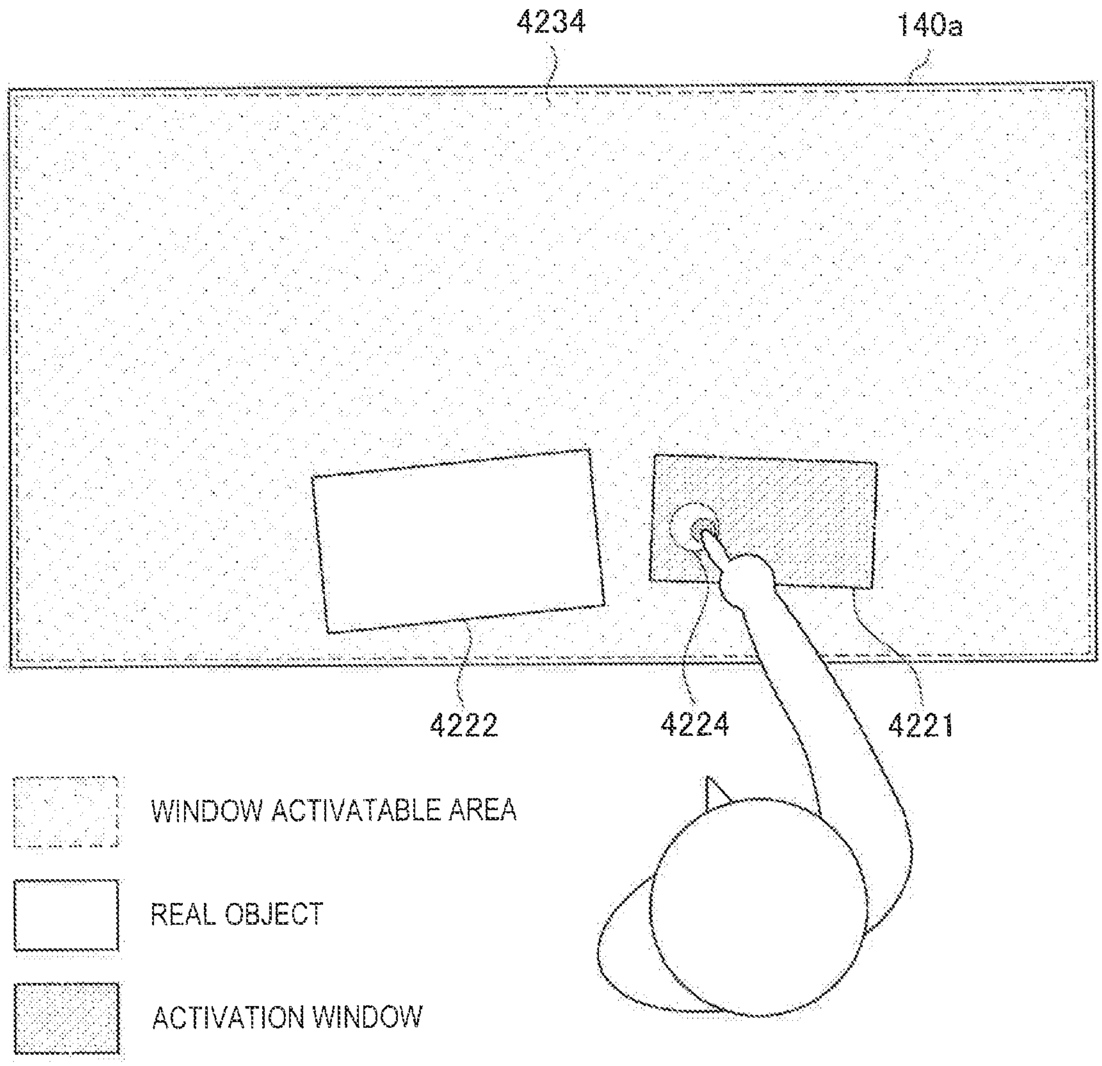

FIG. 270 is an explanatory diagram illustrating an example of a display region decision process.

Figure 271:
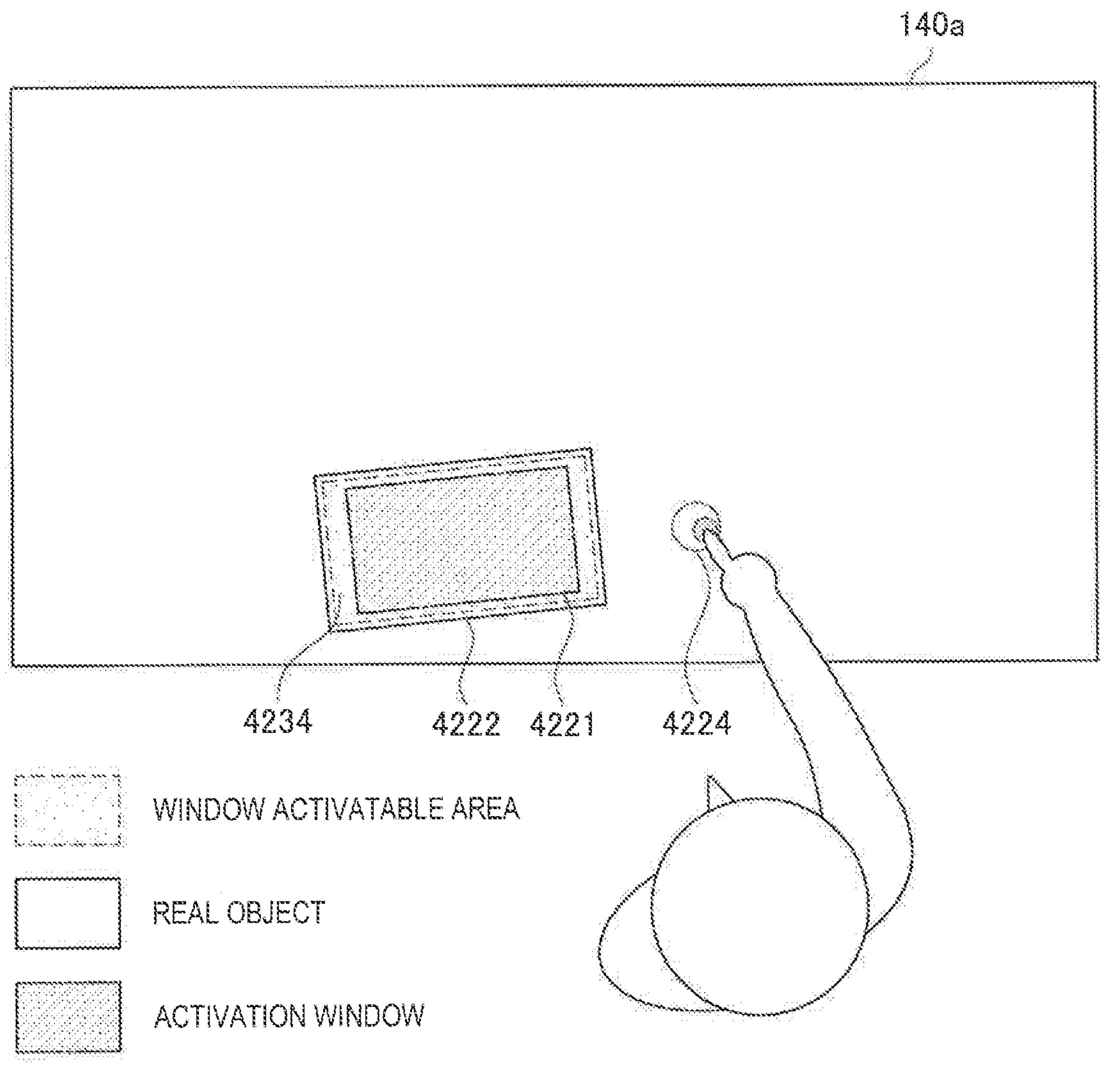

FIG. 271 is an explanatory diagram illustrating an example of a display region decision process.

Figure 272:
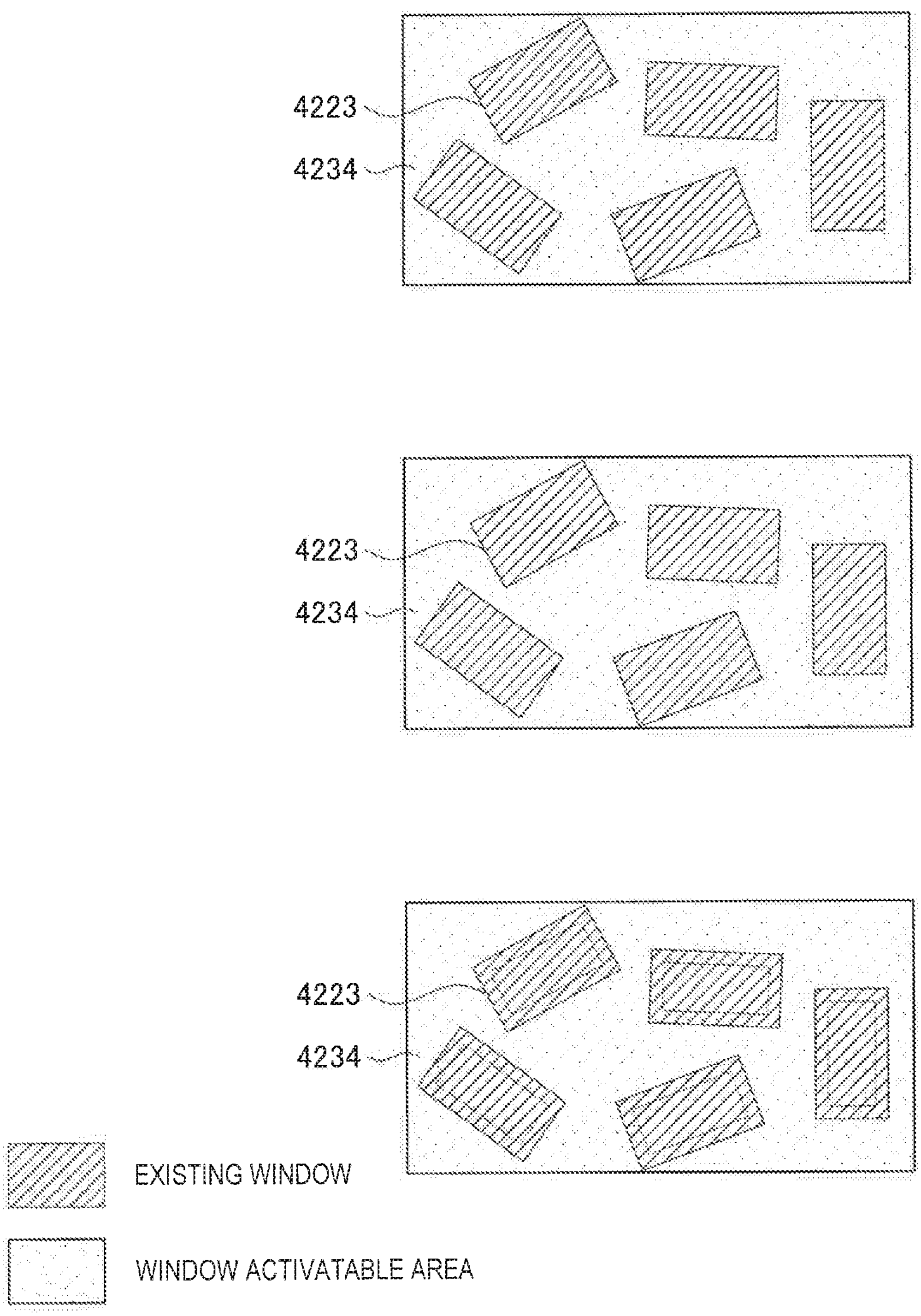

FIG. 272 is an explanatory diagram illustrating an example of a display region decision process.

Figure 273:
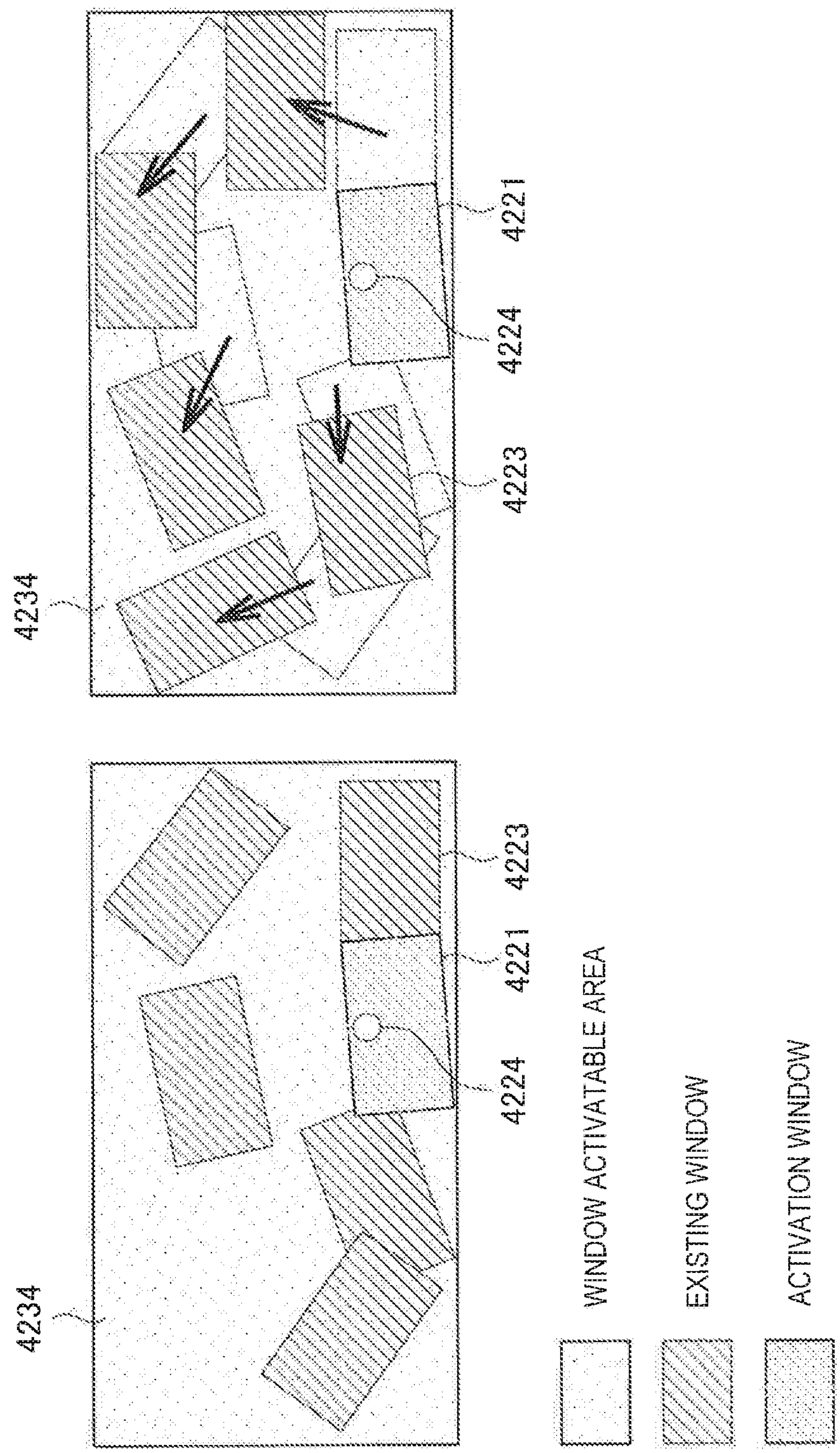

FIG. 273 is an explanatory diagram illustrating an example of a display region decision process.

Figure 274:
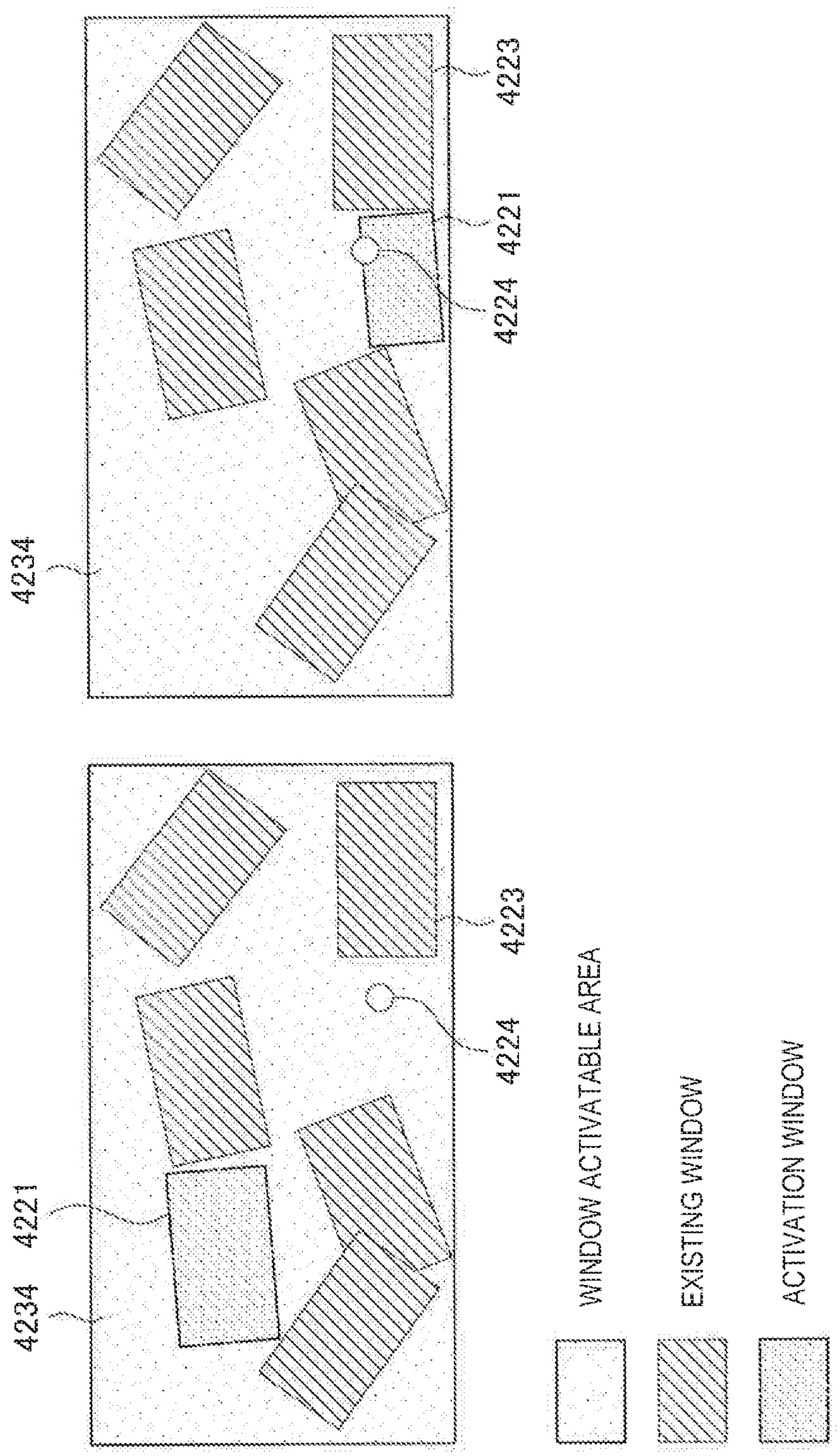

FIG. 274 is an explanatory diagram illustrating an example of a display region decision process.

Figure 275:
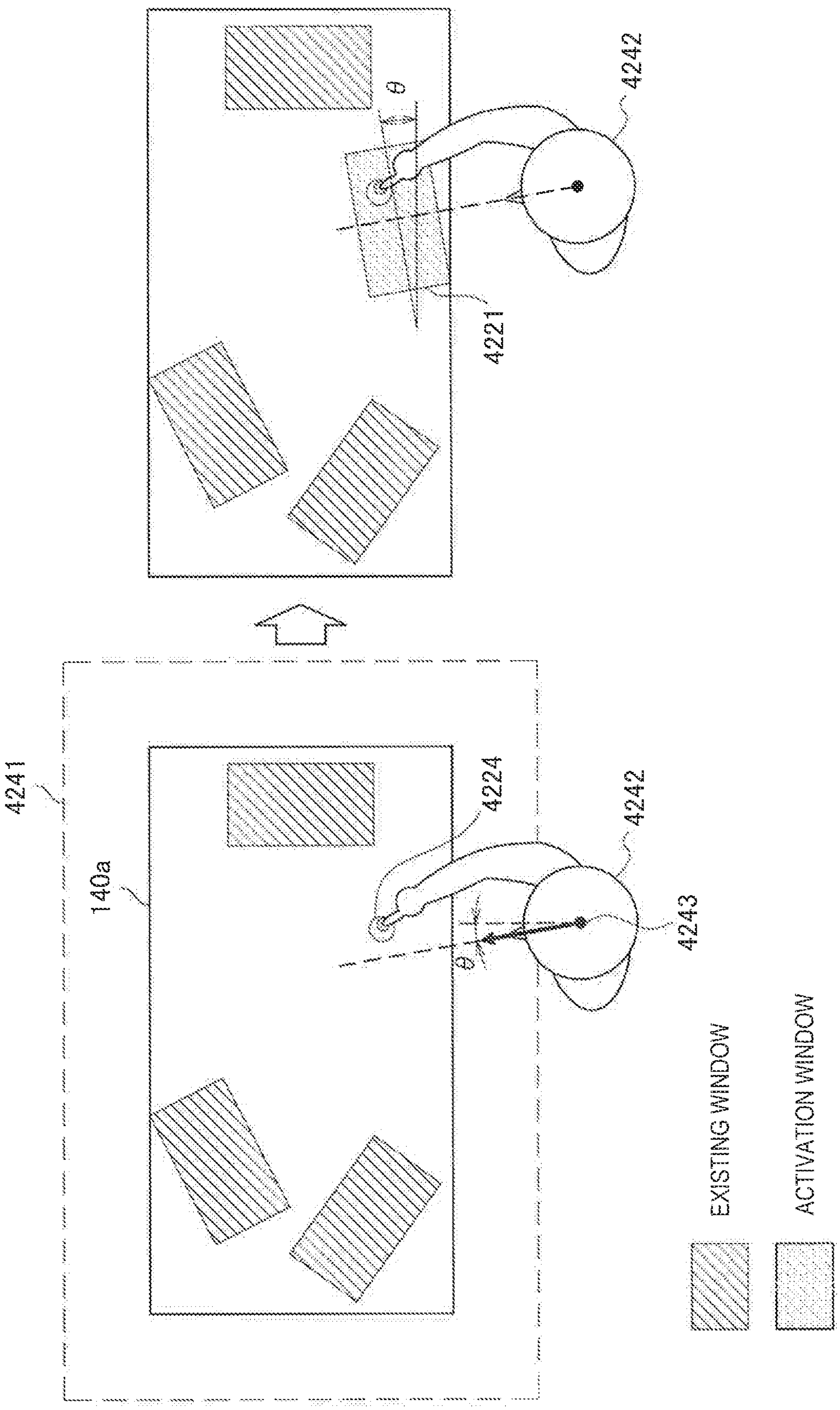

FIG. 275 is an explanatory diagram illustrating an example of a display region decision process.

Figure 276:
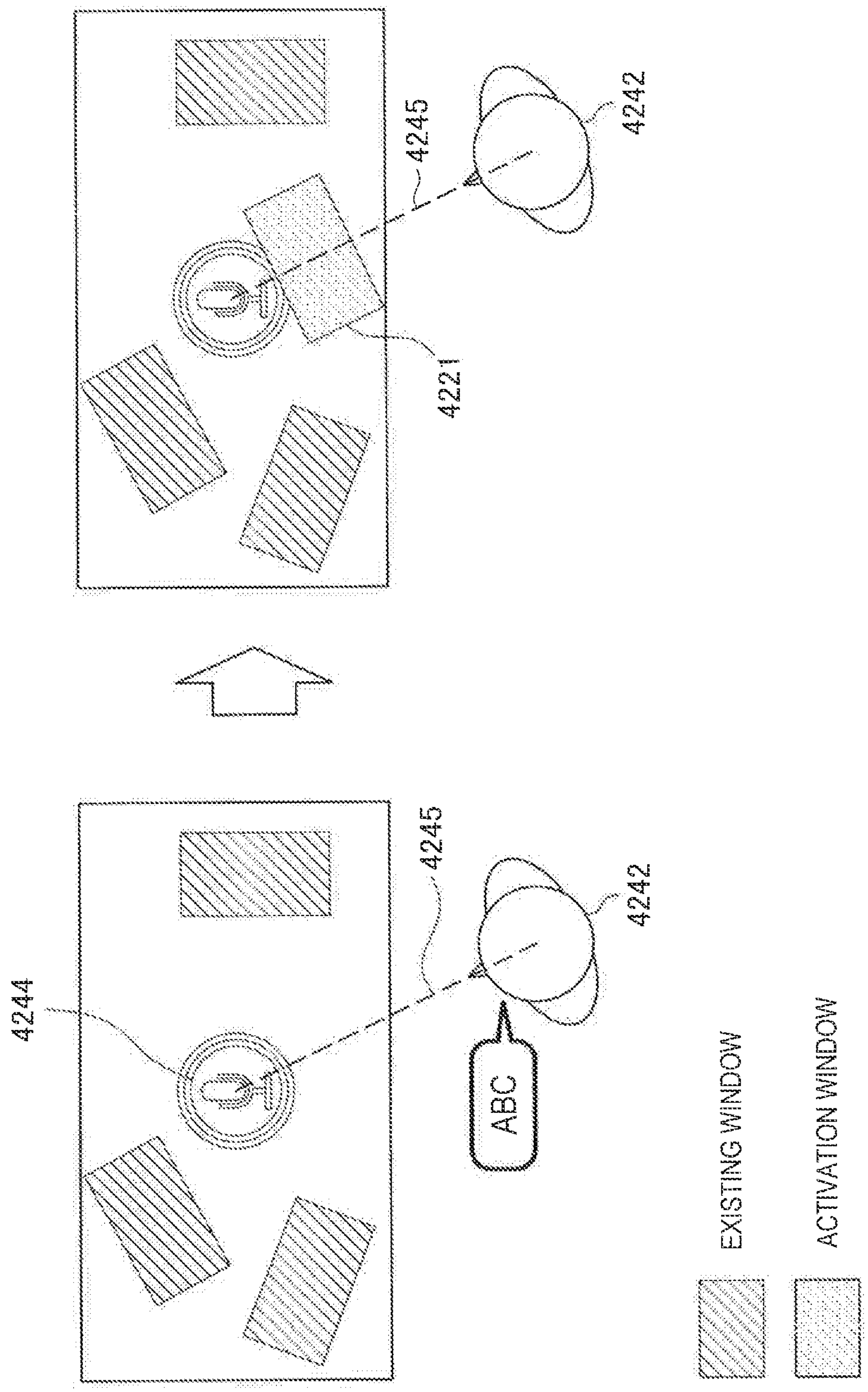

FIG. 276 is an explanatory diagram illustrating an example of a display region decision process.

Figure 277:
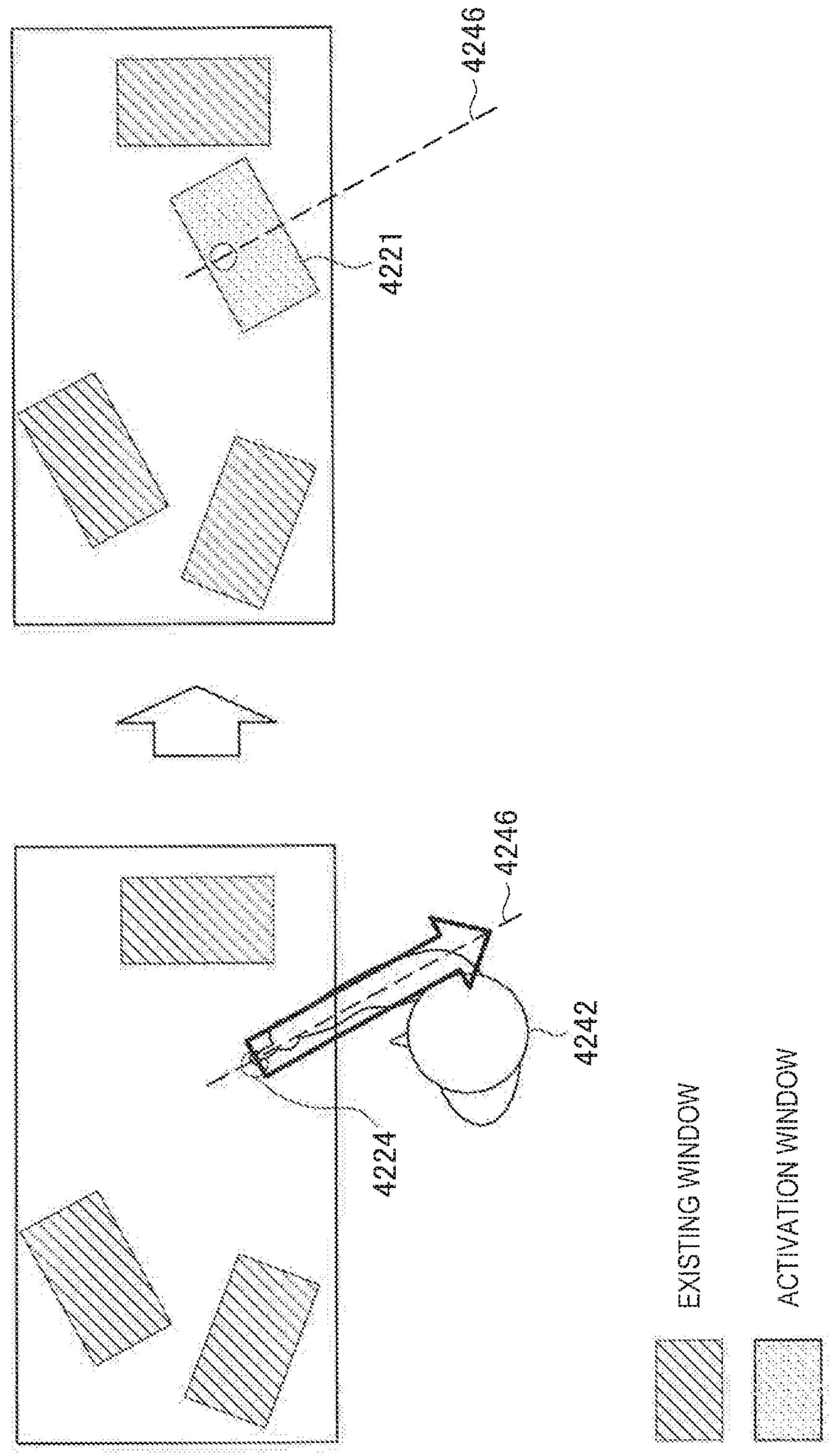

FIG. 277 is an explanatory diagram illustrating an example of a display region decision process.

Figure 278:
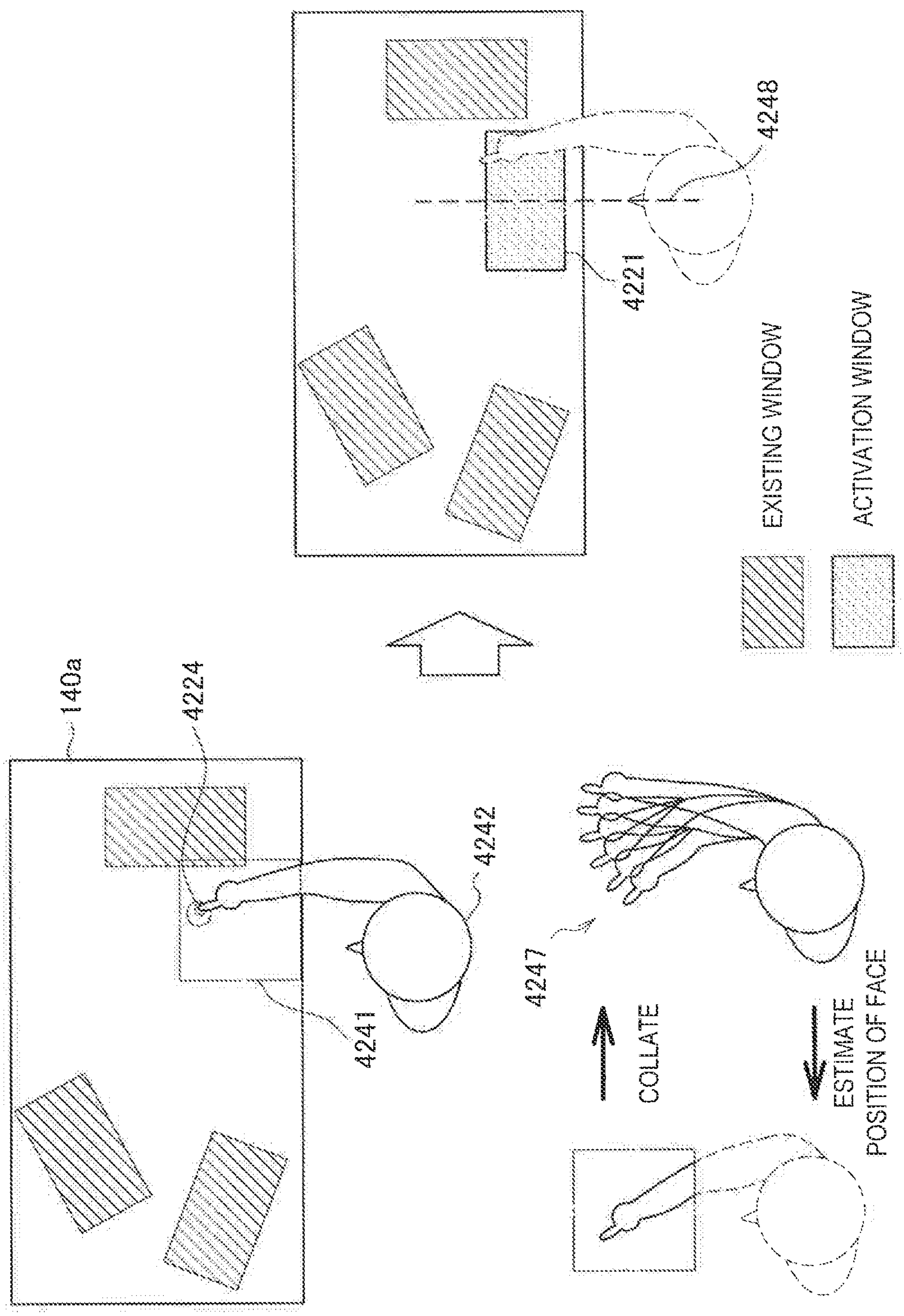

FIG. 278 is an explanatory diagram illustrating an example of a display region decision process.

Figure 279:
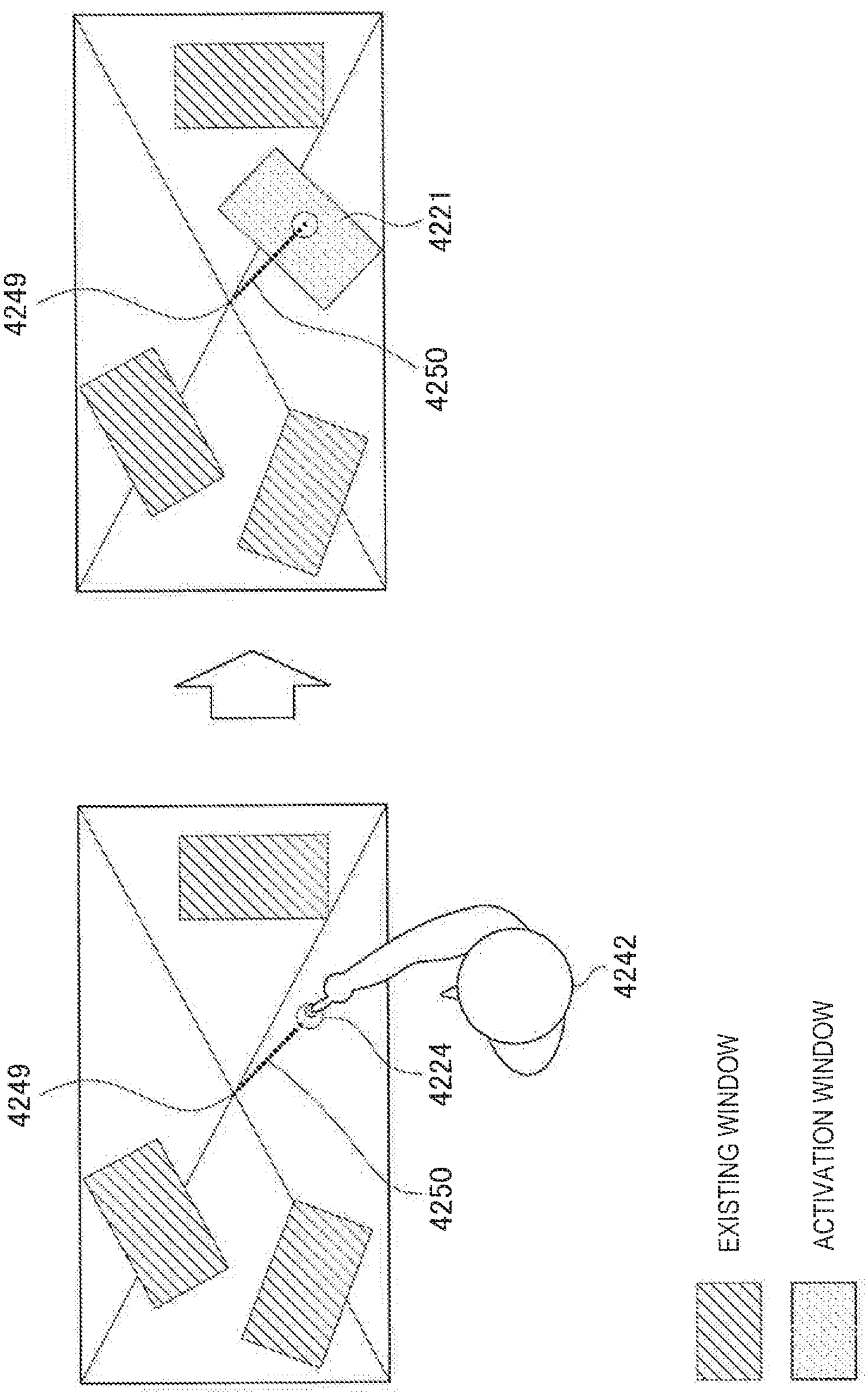

FIG. 279 is an explanatory diagram illustrating an example of a display region decision process.

Figure 280:
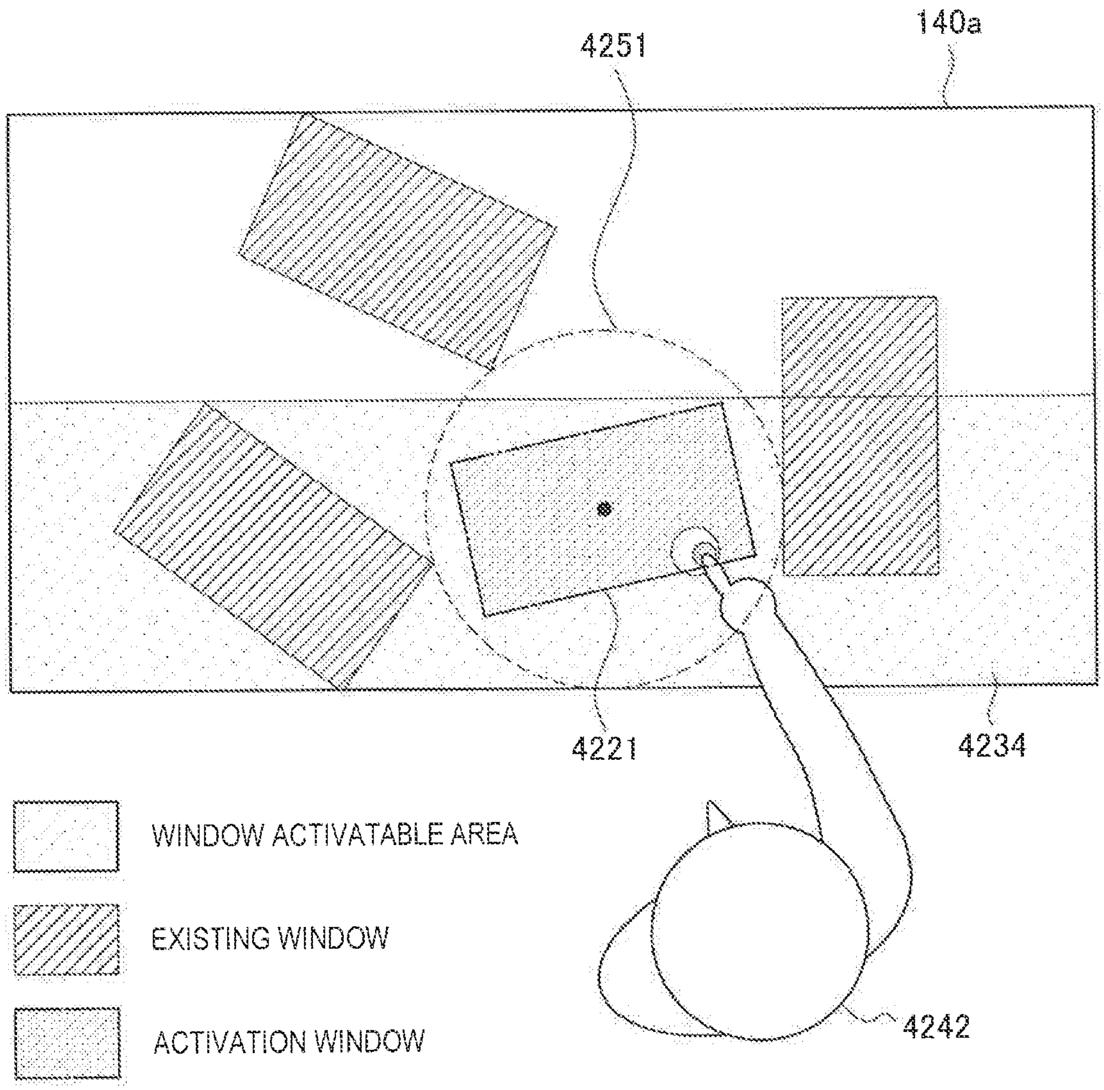

FIG. 280 is an explanatory diagram illustrating an example of a display region decision process.

Figure 281:
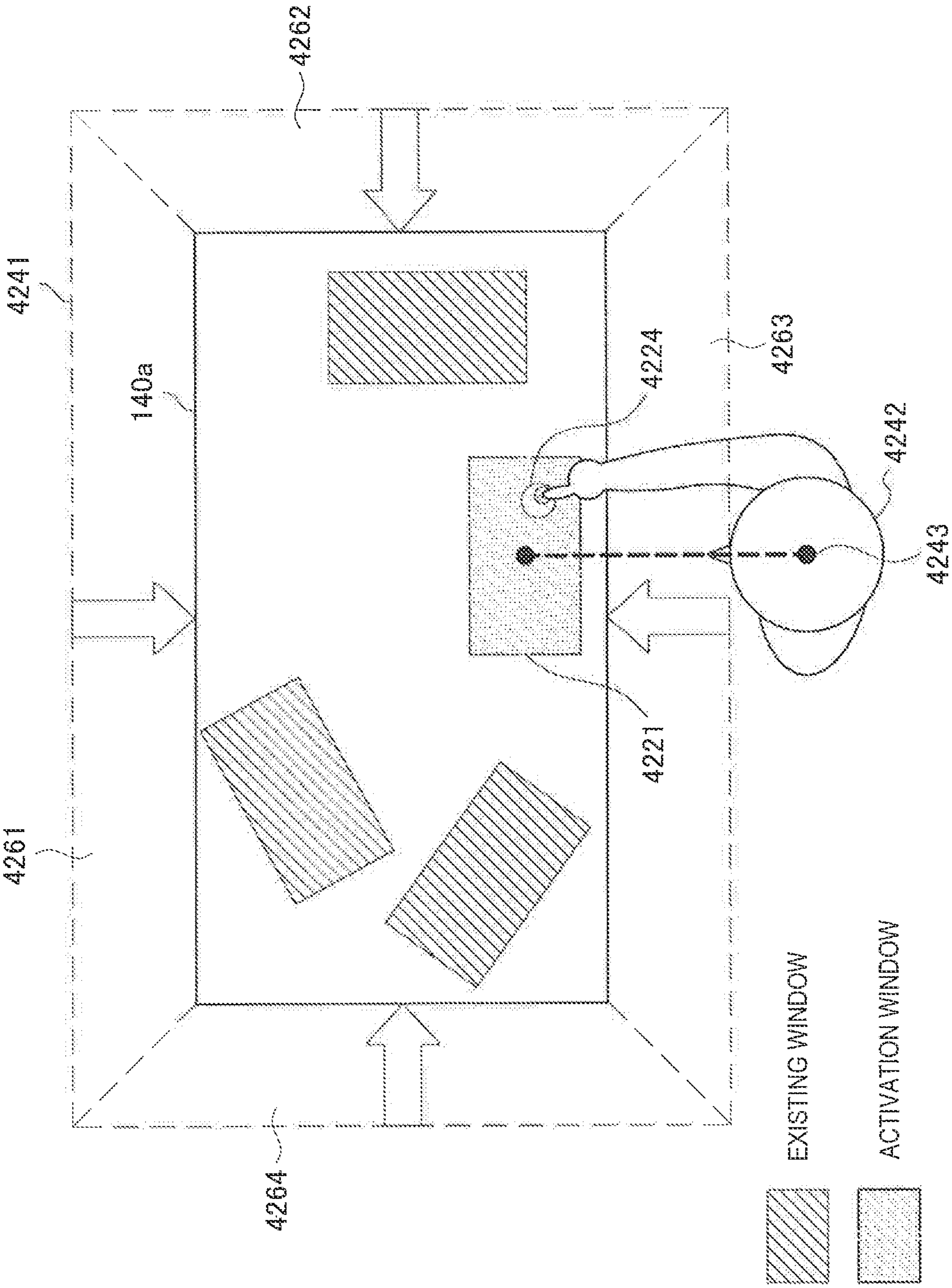

FIG. 281 is an explanatory diagram illustrating an example of a display region decision process.

Figure 282:
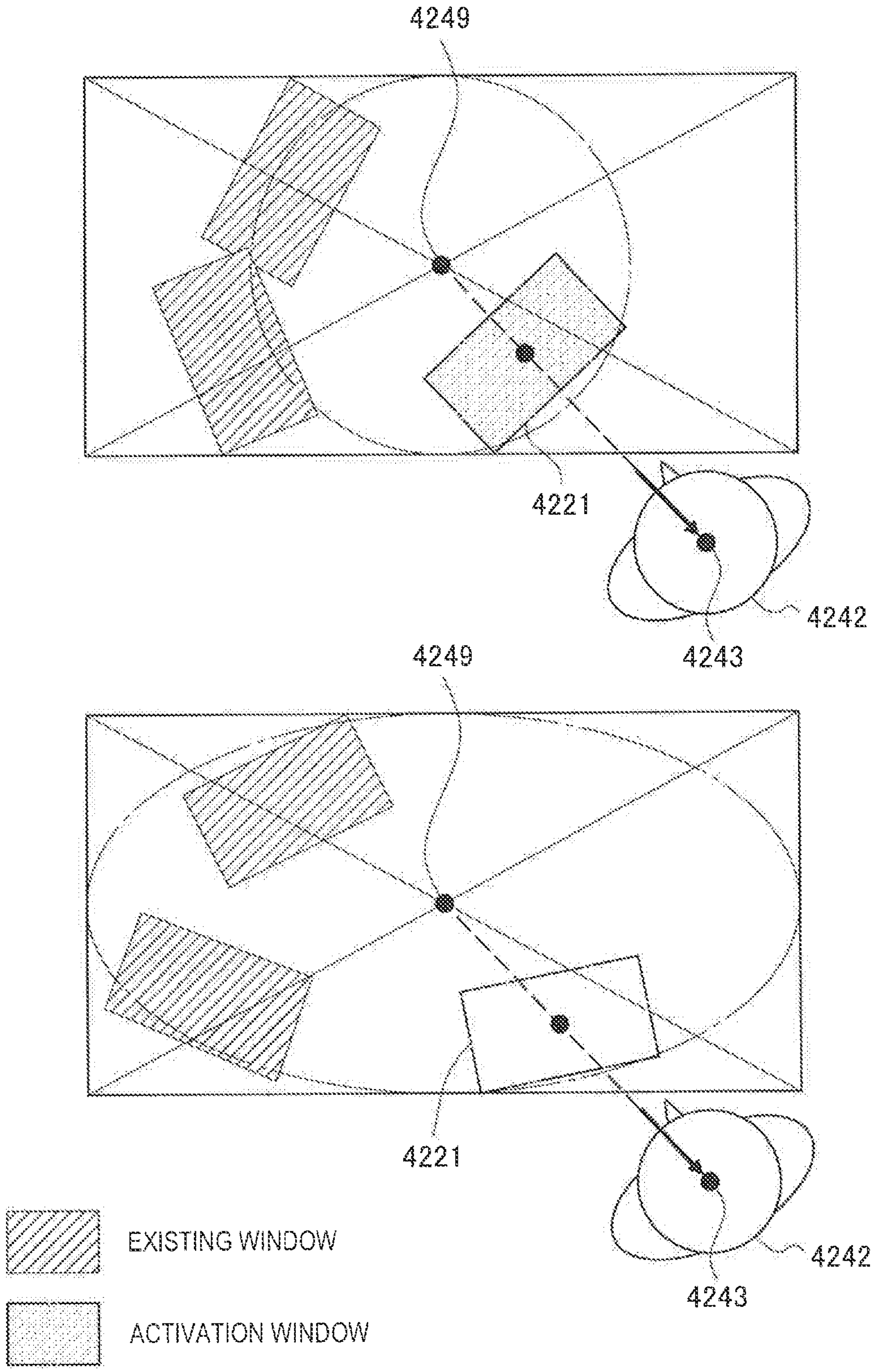

FIG. 282 is an explanatory diagram illustrating an example of a display region decision process.

Figure 283:
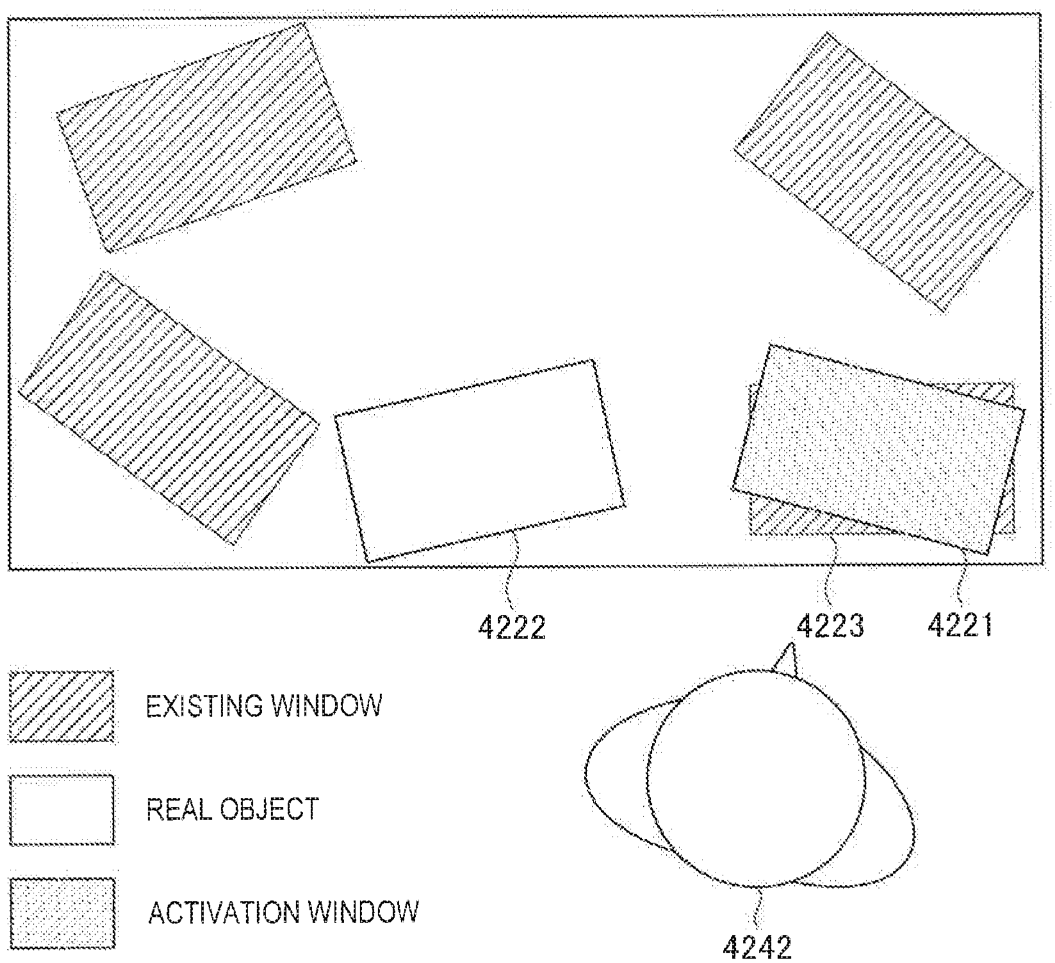

FIG. 283 is an explanatory diagram illustrating an example of a display region decision process.

Figure 284:
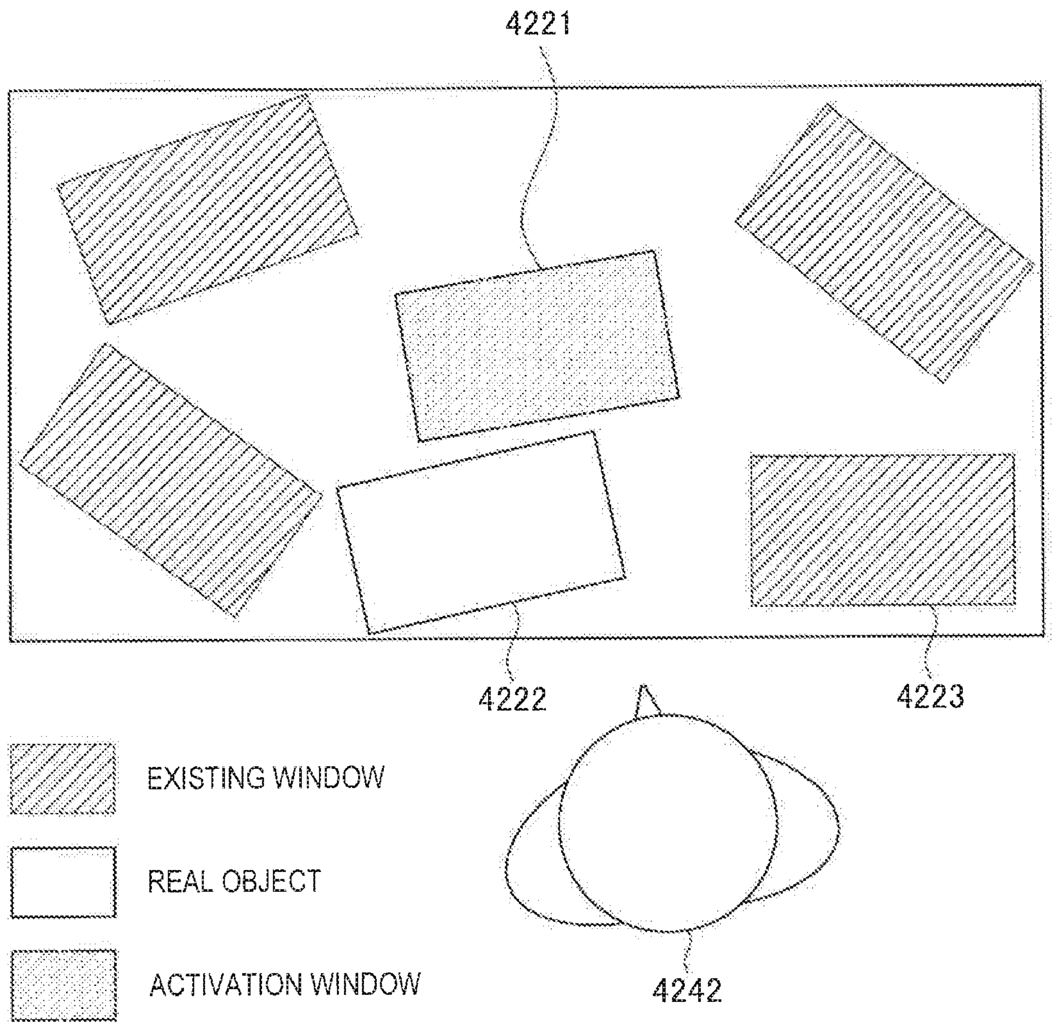

FIG. 284 is an explanatory diagram illustrating an example of a display region decision process.

Figure 285:
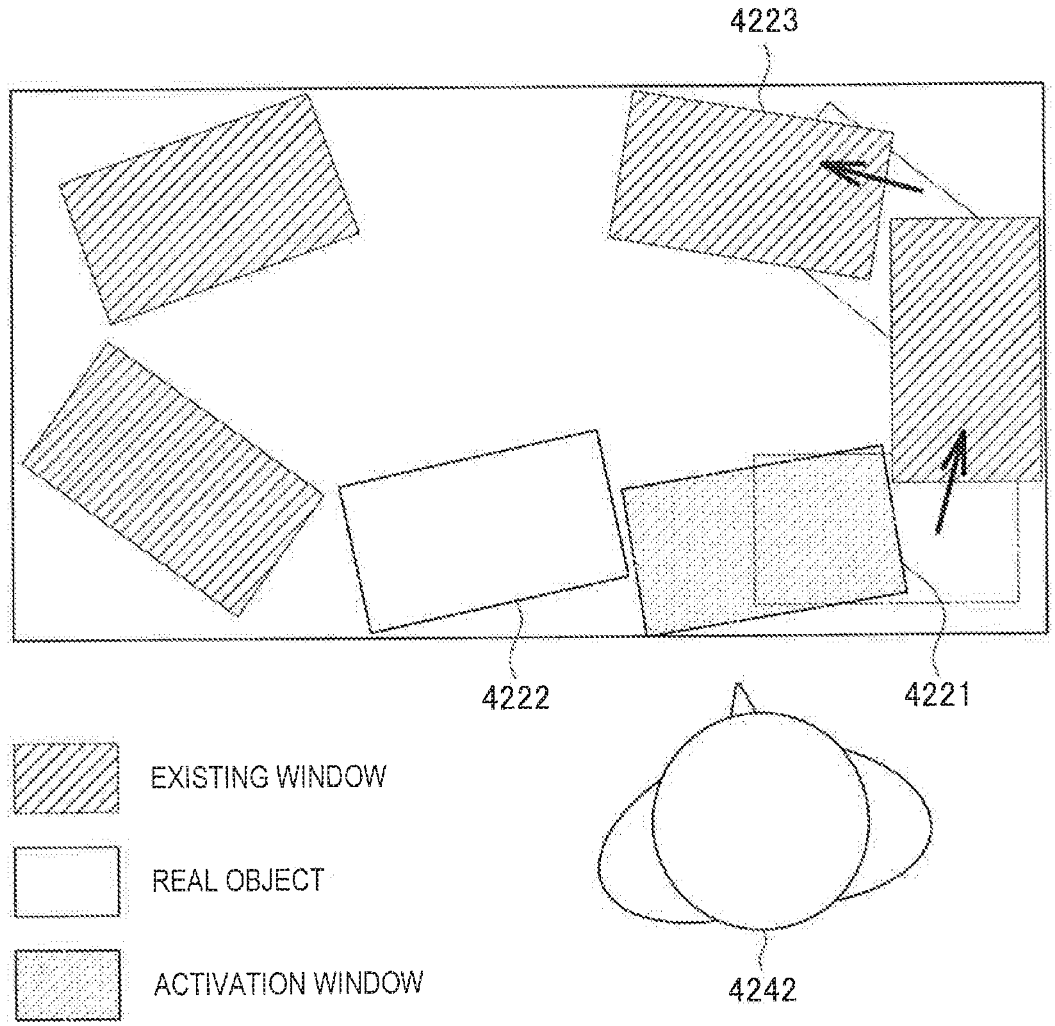

FIG. 285 is an explanatory diagram illustrating an example of a display region decision process.

Figure 286:
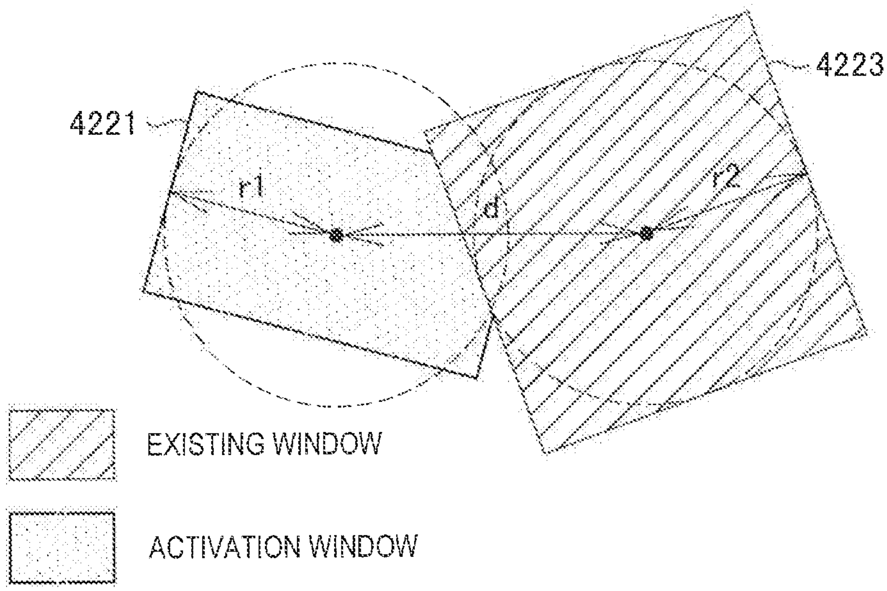

FIG. 286 is an explanatory diagram illustrating an example of a display region decision process.

Figure 287:
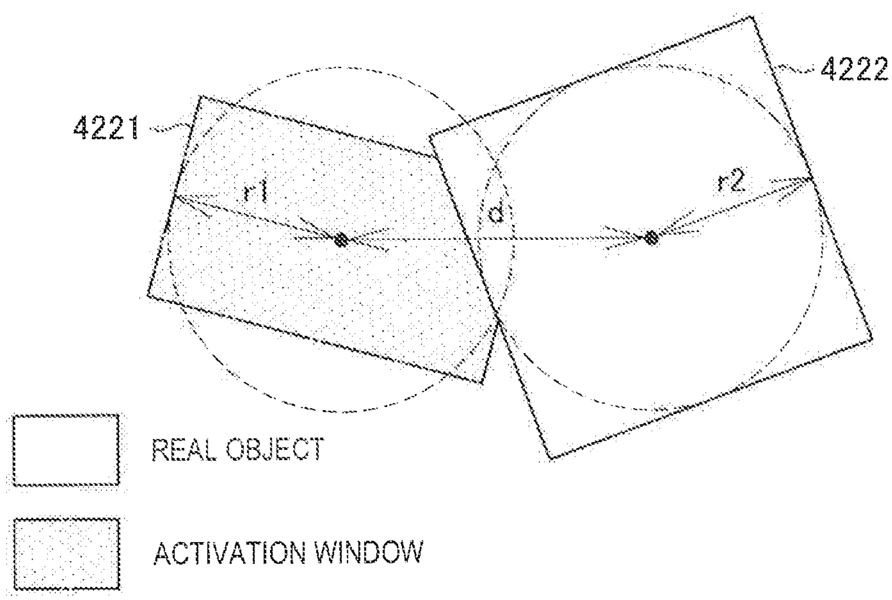

FIG. 287 is an explanatory diagram illustrating an example of a display region decision process.

Figure 288:
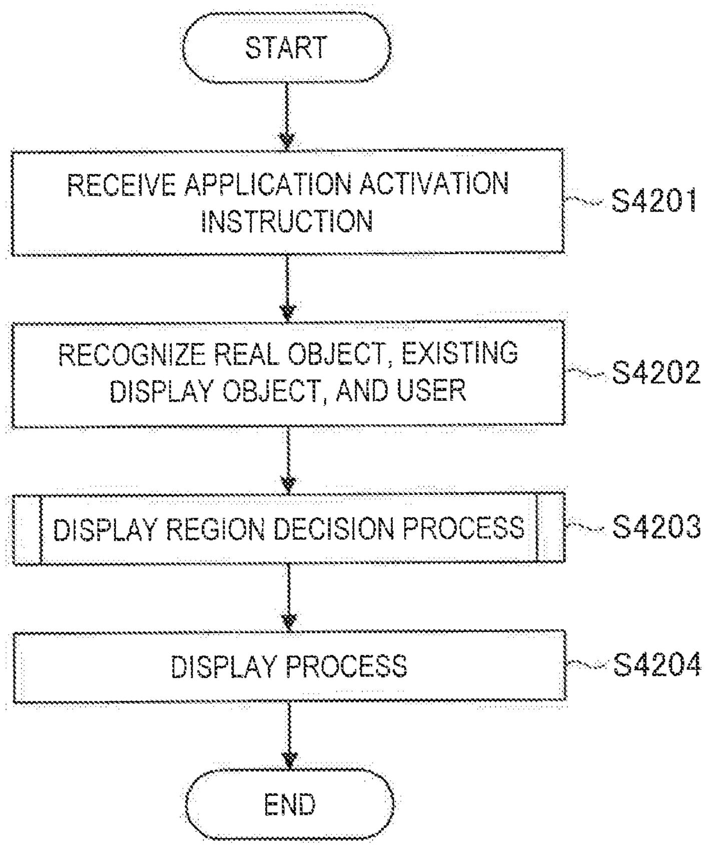

FIG. 288 is a flowchart illustrating an example of the flow of a display control process executed in the information processing system.

Figure 289:
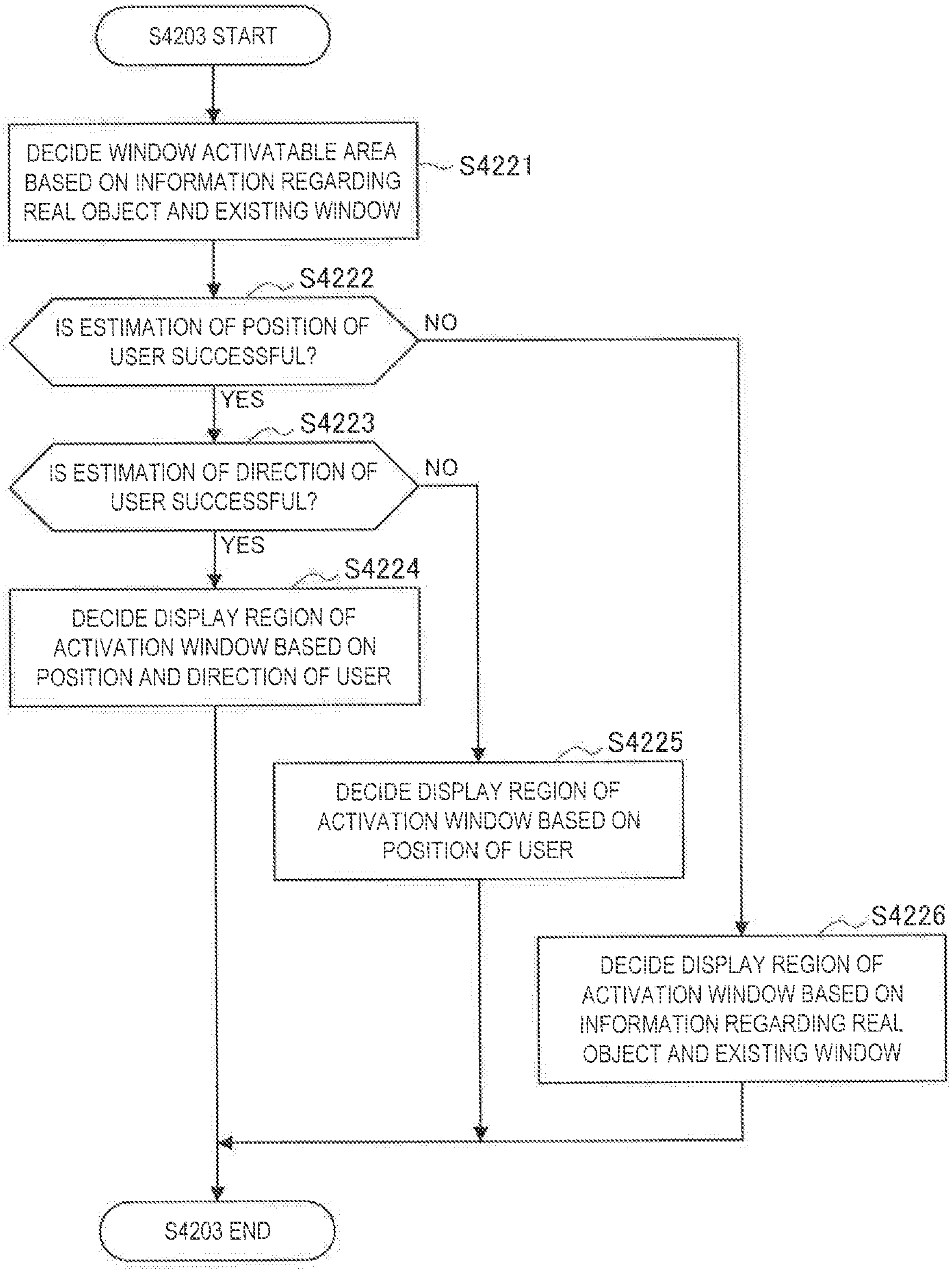

FIG. 289 is a flowchart illustrating an example of the flow of a display region decision process executed in the information processing system.

Figure 290:
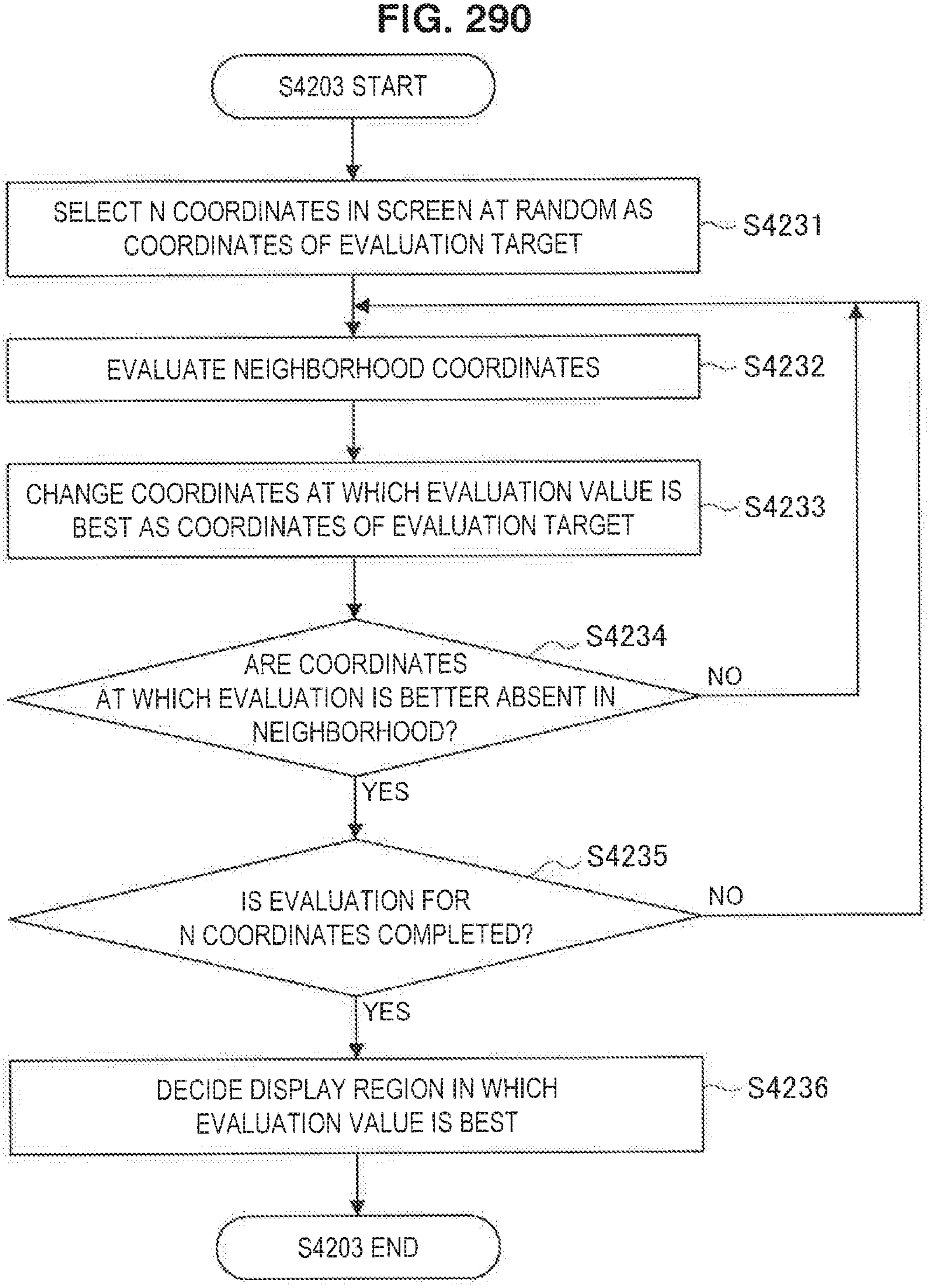

FIG. 290 is a flowchart illustrating an example of the flow of a display region decision process executed in the information processing system.

Figure 291:
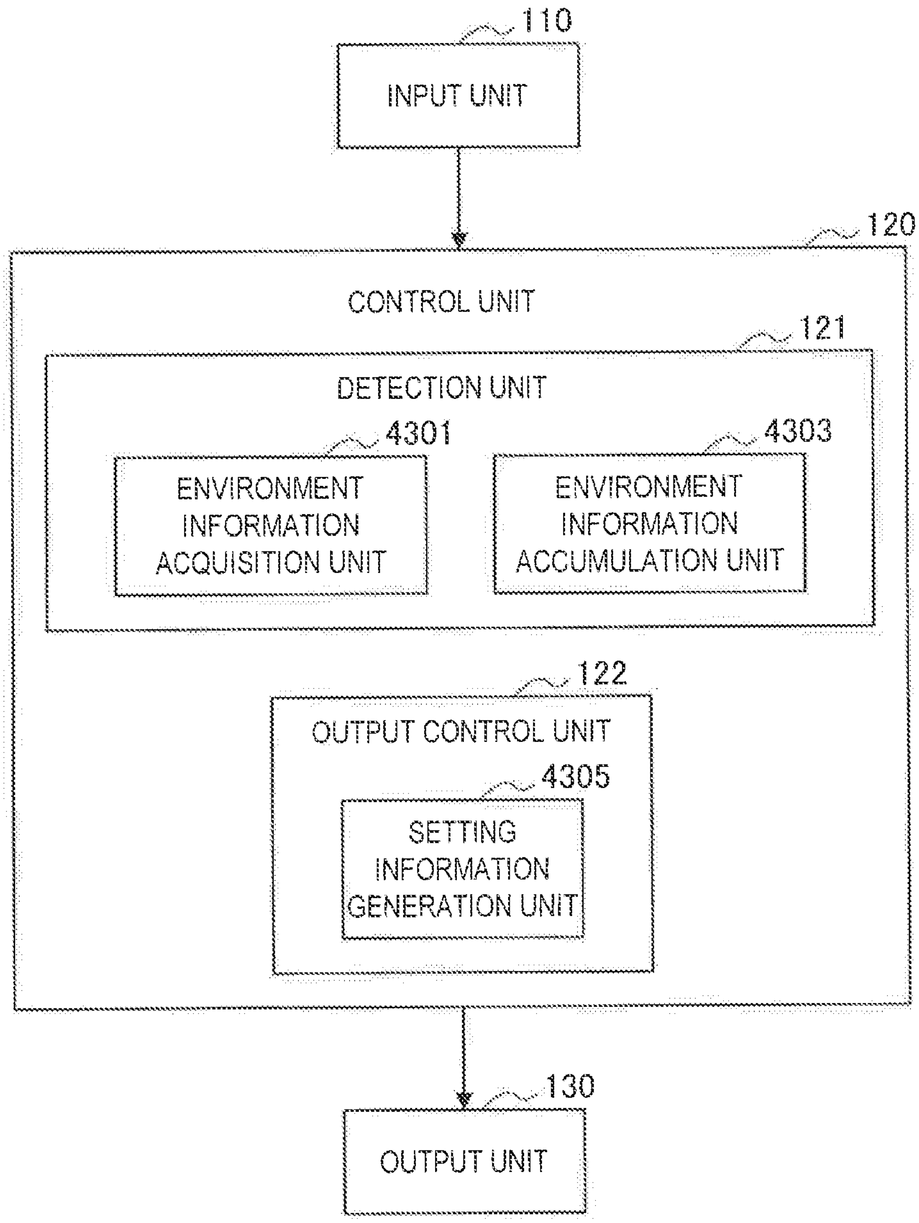

FIG. 291 is a block diagram illustrating an example of a logical configuration of the information processing system.

Figure 292:
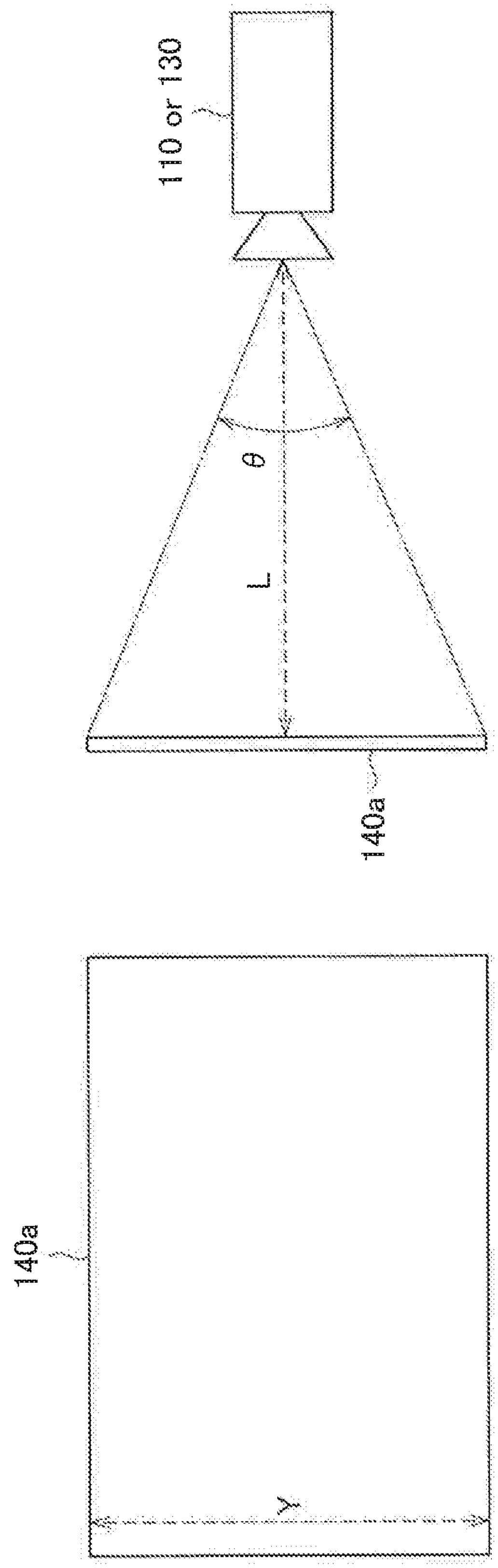

FIG. 292 is an explanatory diagram illustrating a process of calculating a projection magnification.

Figure 293:
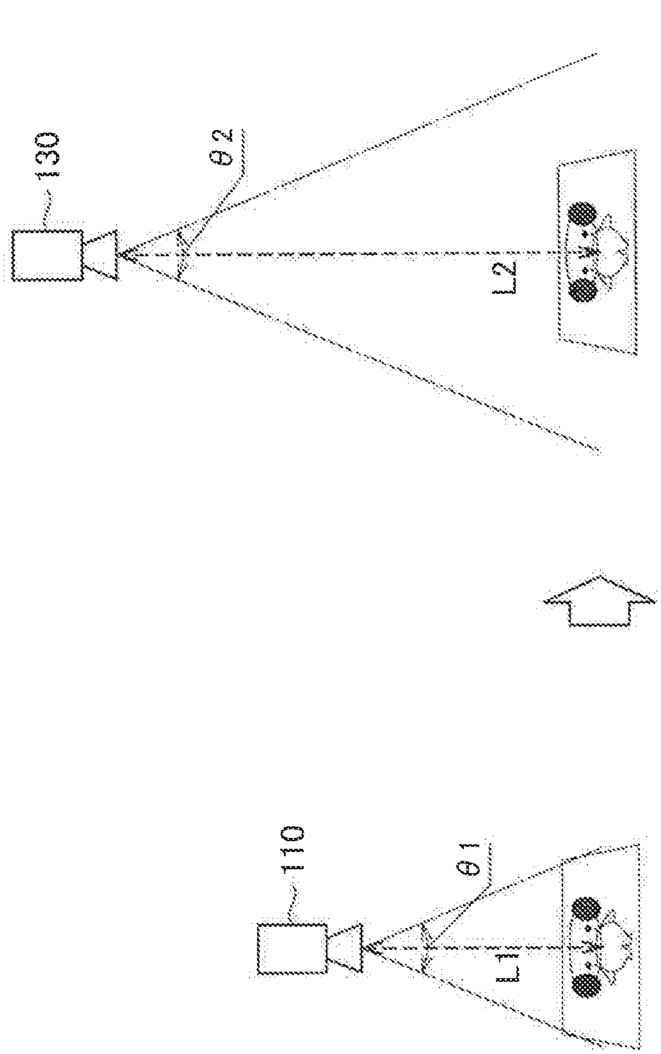

FIG. 293 is an explanatory diagram illustrating an example of a user interface.

Figure 294:
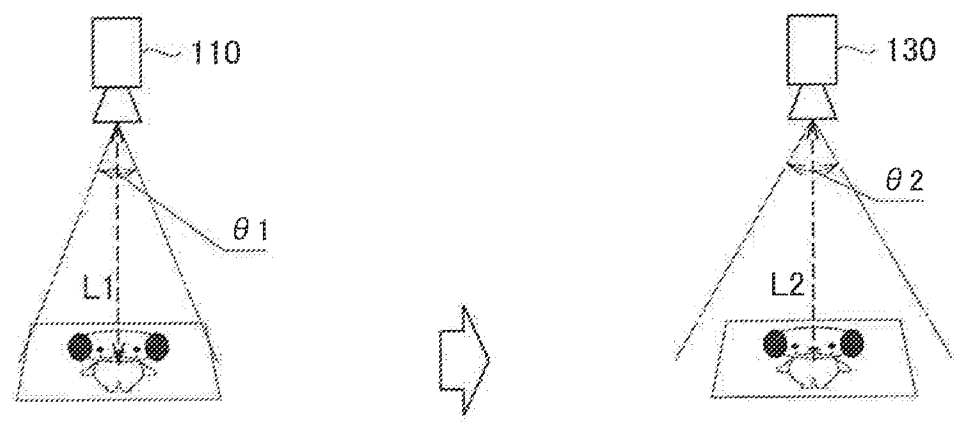

FIG. 294 is an explanatory diagram illustrating an example of a user interface.

FIG. 295 is an explanatory diagram illustrating an example of a user interface.

Figure 296:
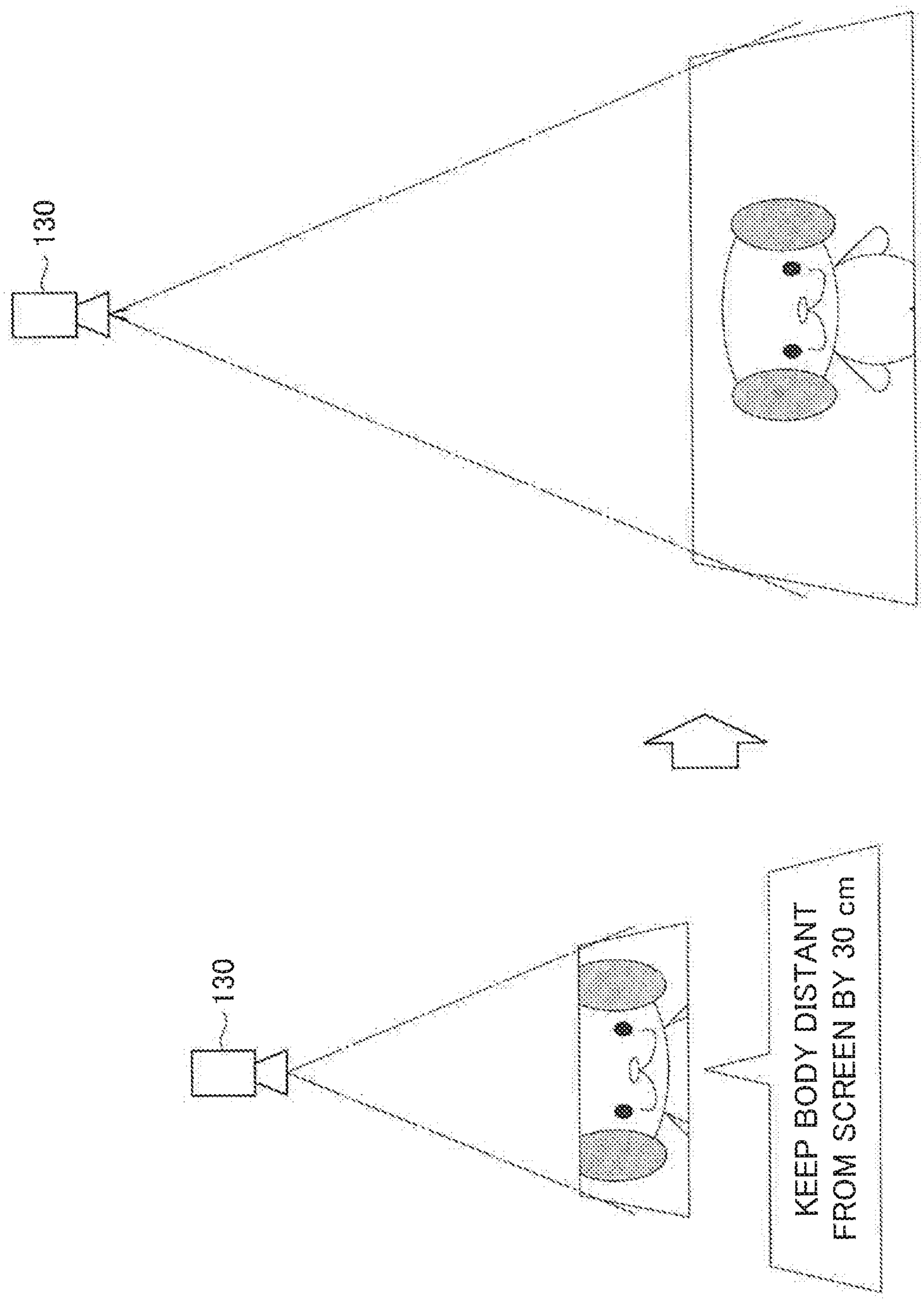

FIG. 296 is an explanatory diagram illustrating an example of a user interface.

Figure 297:
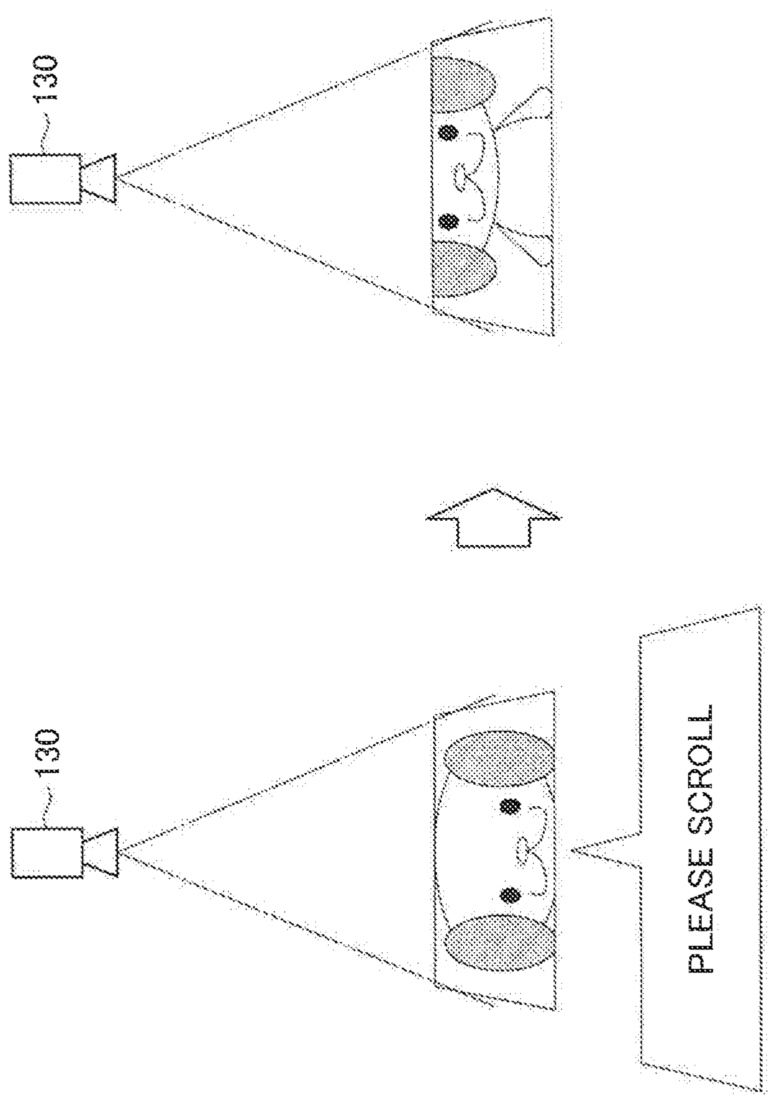

FIG. 297 is an explanatory diagram illustrating an example of a user interface.

Figure 298:
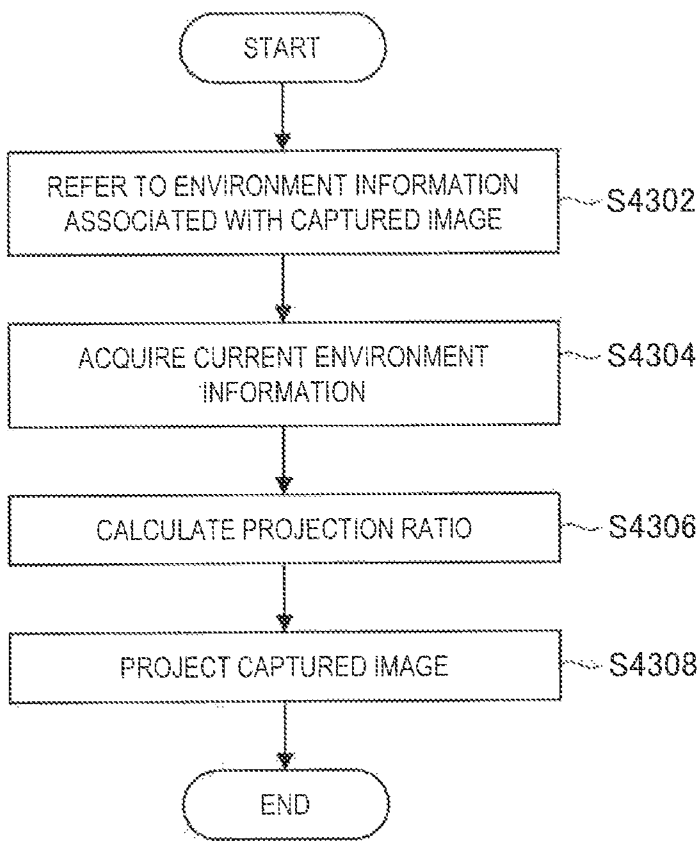

FIG. 298 is a flowchart illustrating an example of the flow of the display control process executed in the information processing system.

Figure 299:
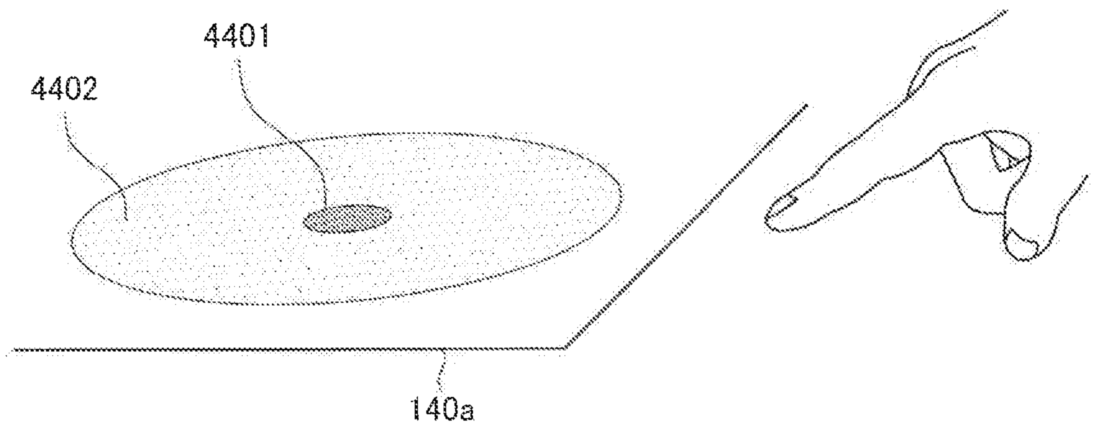

FIG. 299 is an explanatory diagram illustrating an example of a user interface.

Figure 300:
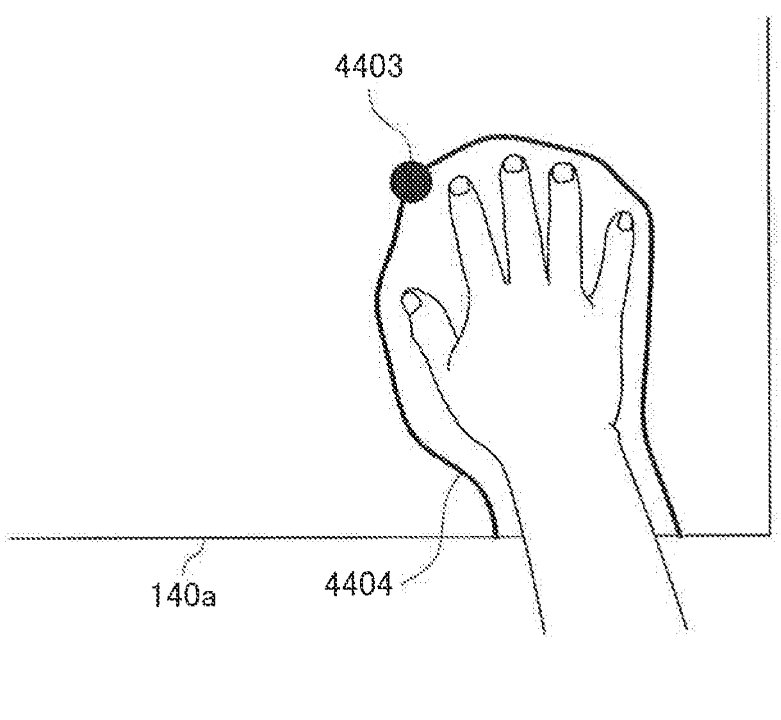

FIG. 300 is an explanatory diagram illustrating an example of a user interface.

Figure 301:
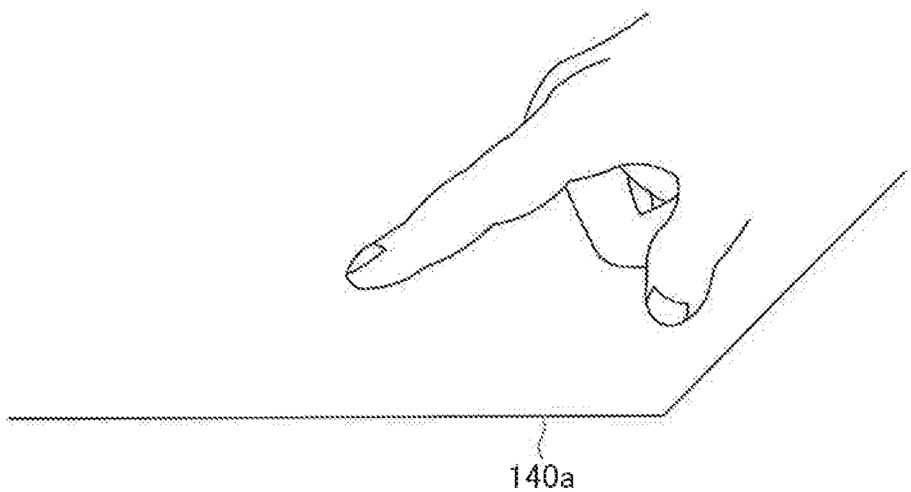

FIG. 301 is an explanatory diagram illustrating an example of a user interface.

Figure 302:
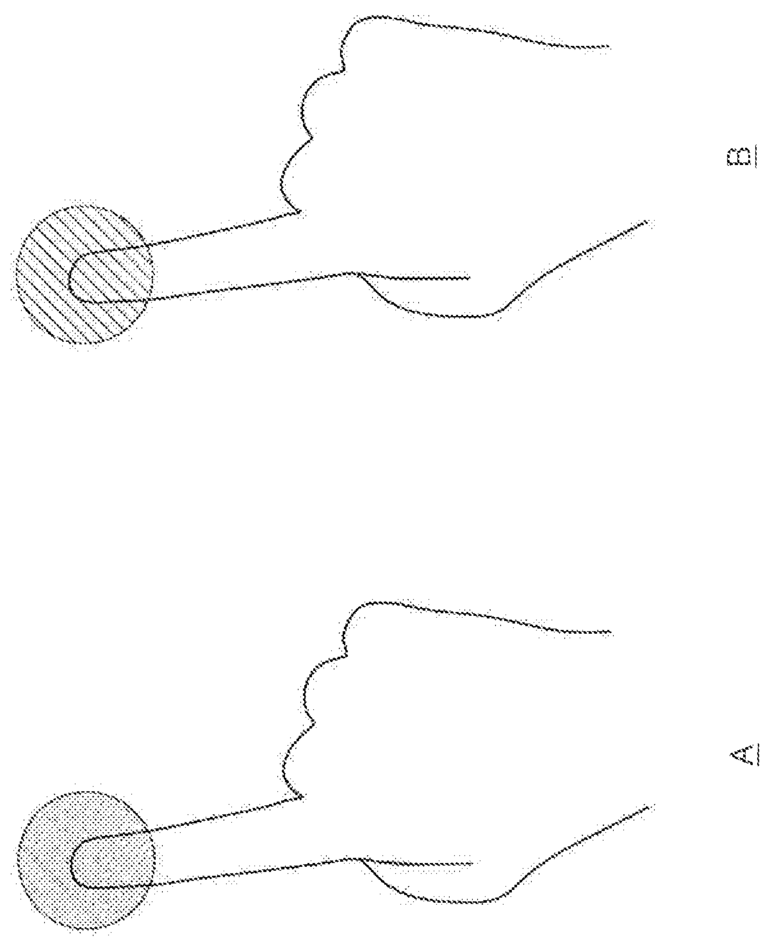

FIG. 302 is an explanatory diagram illustrating an example of a user interface.

Figure 303:
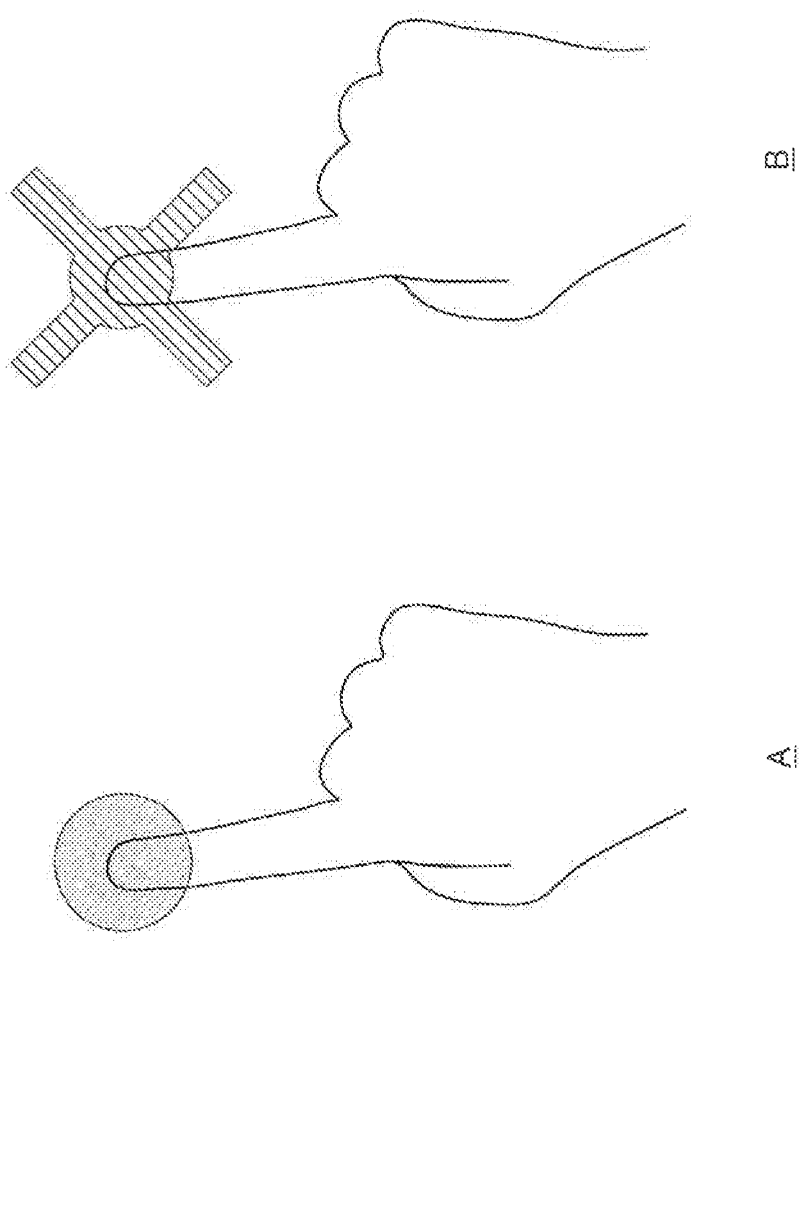

FIG. 303 is an explanatory diagram illustrating an example of a user interface.

Figure 304:
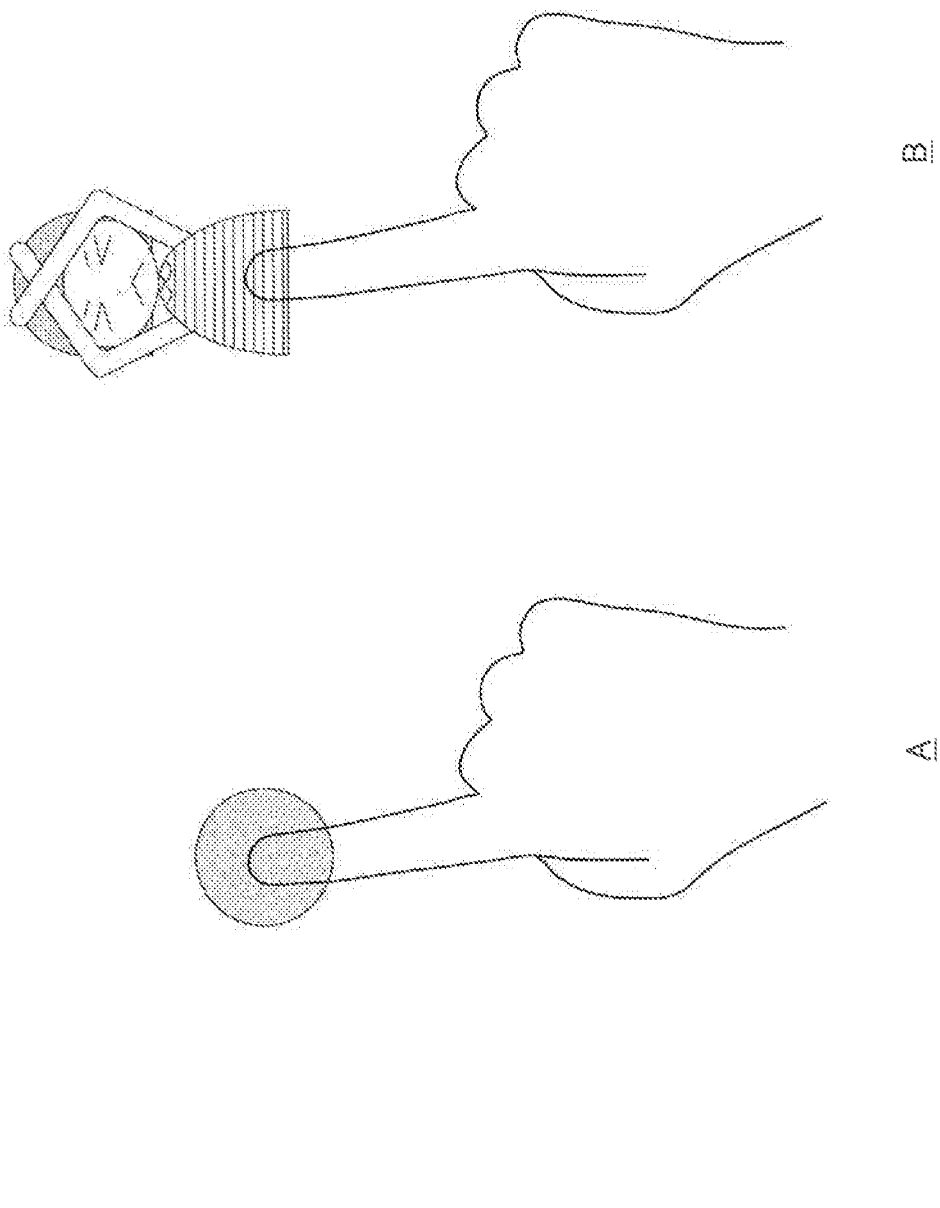

FIG. 304 is an explanatory diagram illustrating an example of a user interface.

Figure 305:
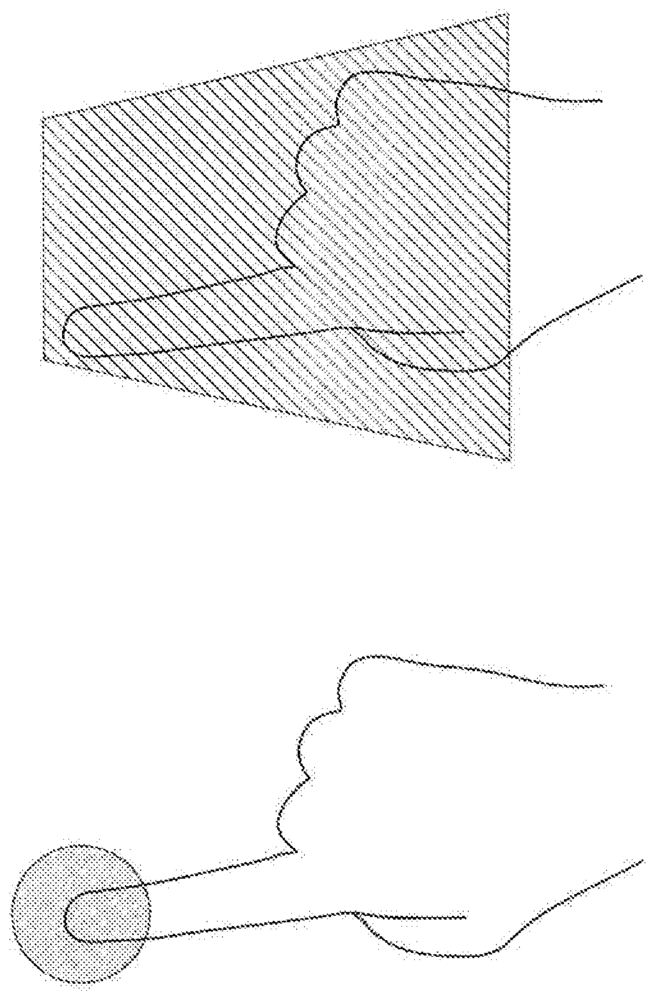

FIG. 305 is an explanatory diagram illustrating an example of a user interface.

Figure 306:
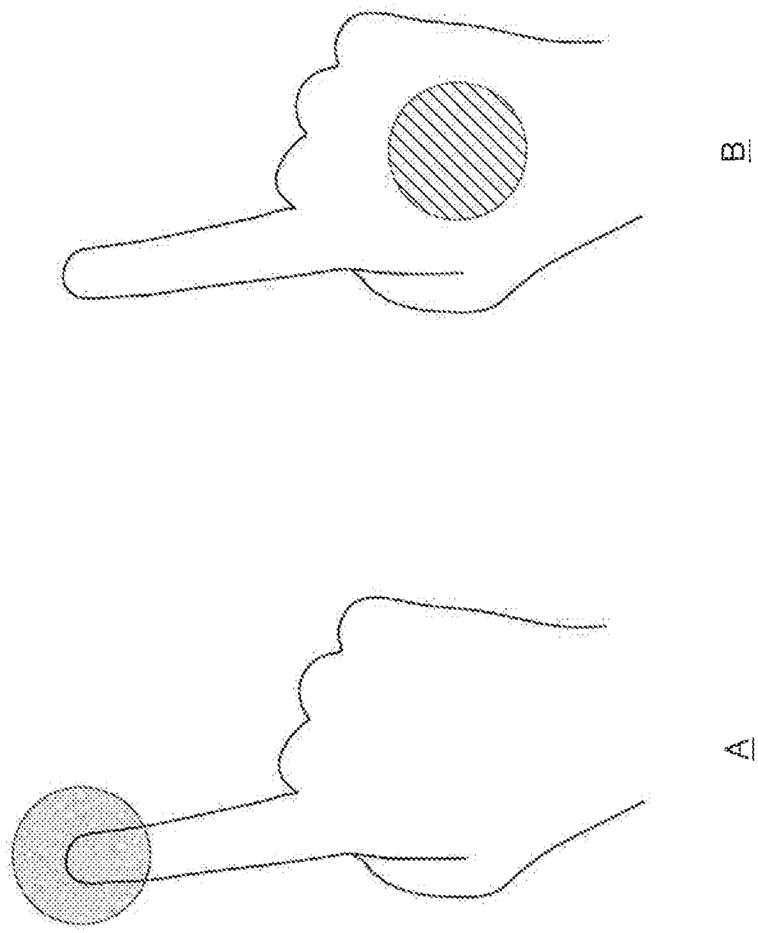

FIG. 306 is an explanatory diagram illustrating an example of a user interface.

Figure 307:
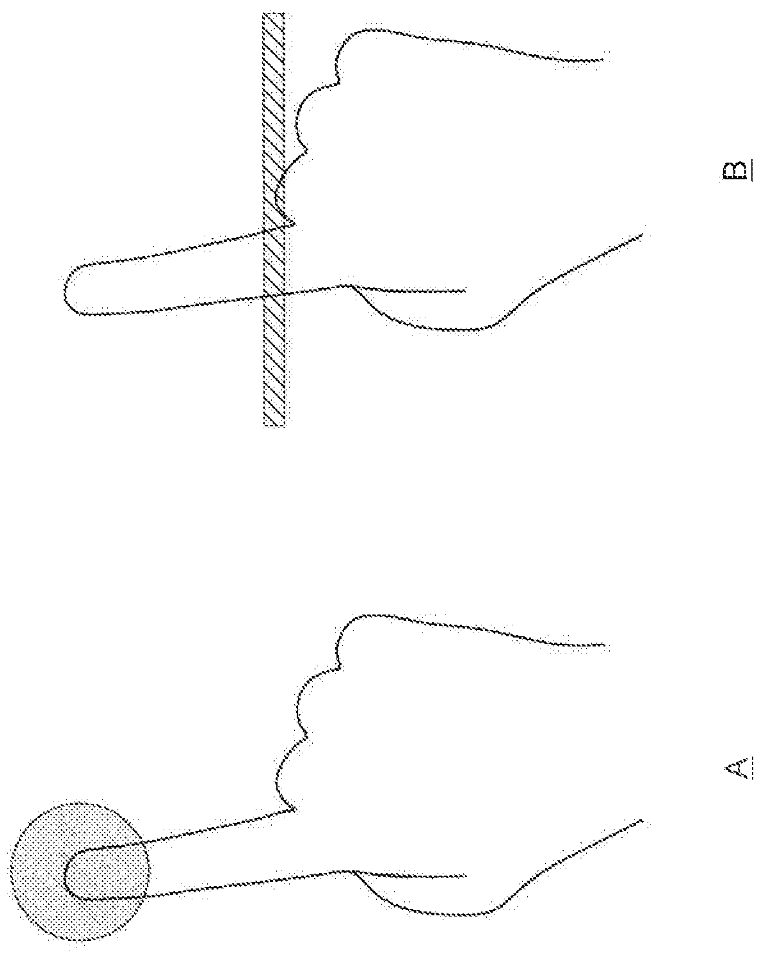

FIG. 307 is an explanatory diagram illustrating an example of a user interface.

FIG. 308 is an explanatory diagram illustrating an example of a user interface.

Figure 309:
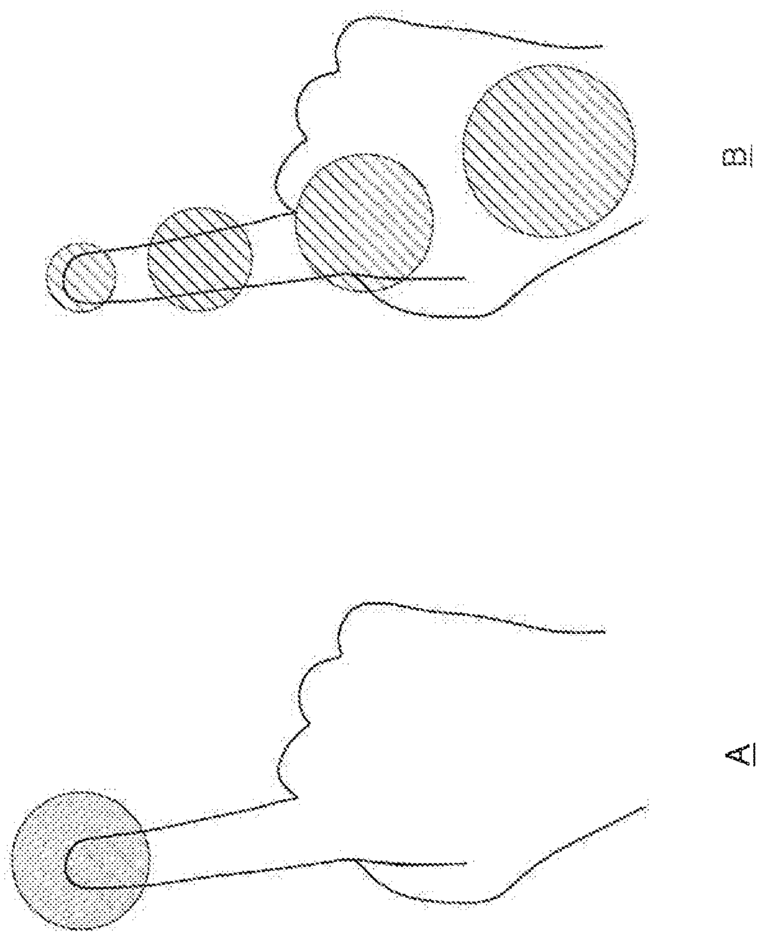

FIG. 309 is an explanatory diagram illustrating an example of a user interface.

Figure 310:
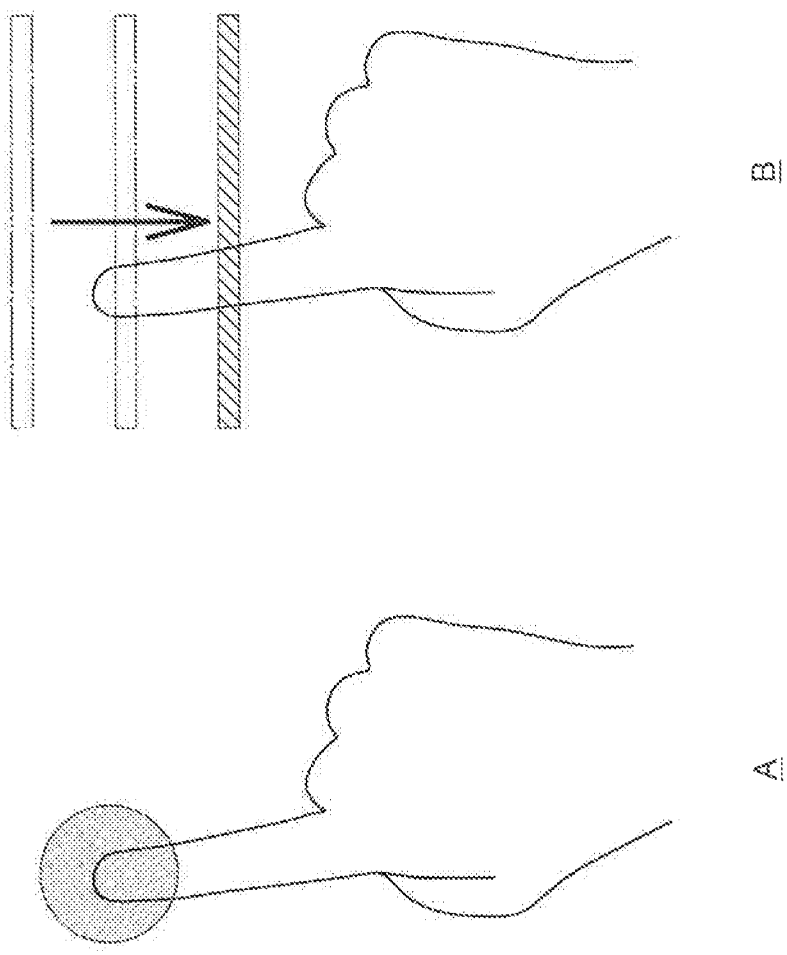

FIG. 310 is an explanatory diagram illustrating an example of a user interface.

Figure 311:
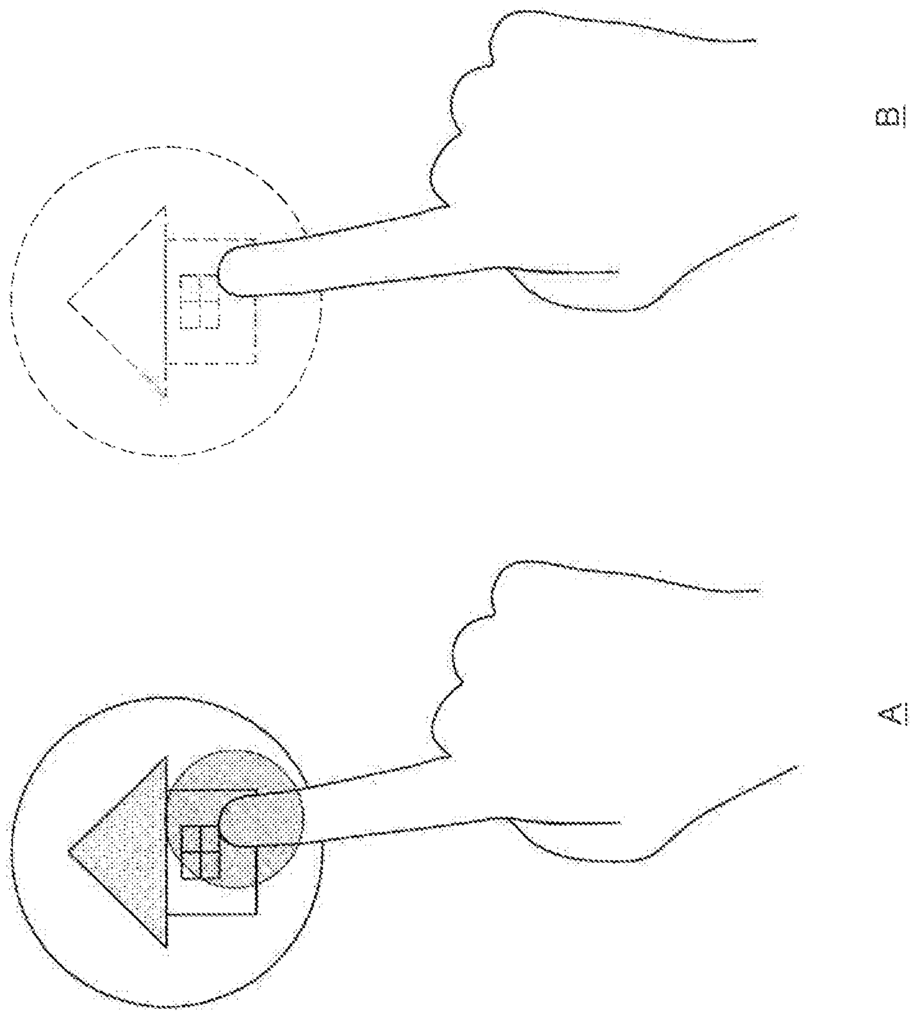

FIG. 311 is an explanatory diagram illustrating an example of a user interface.

Figure 312:
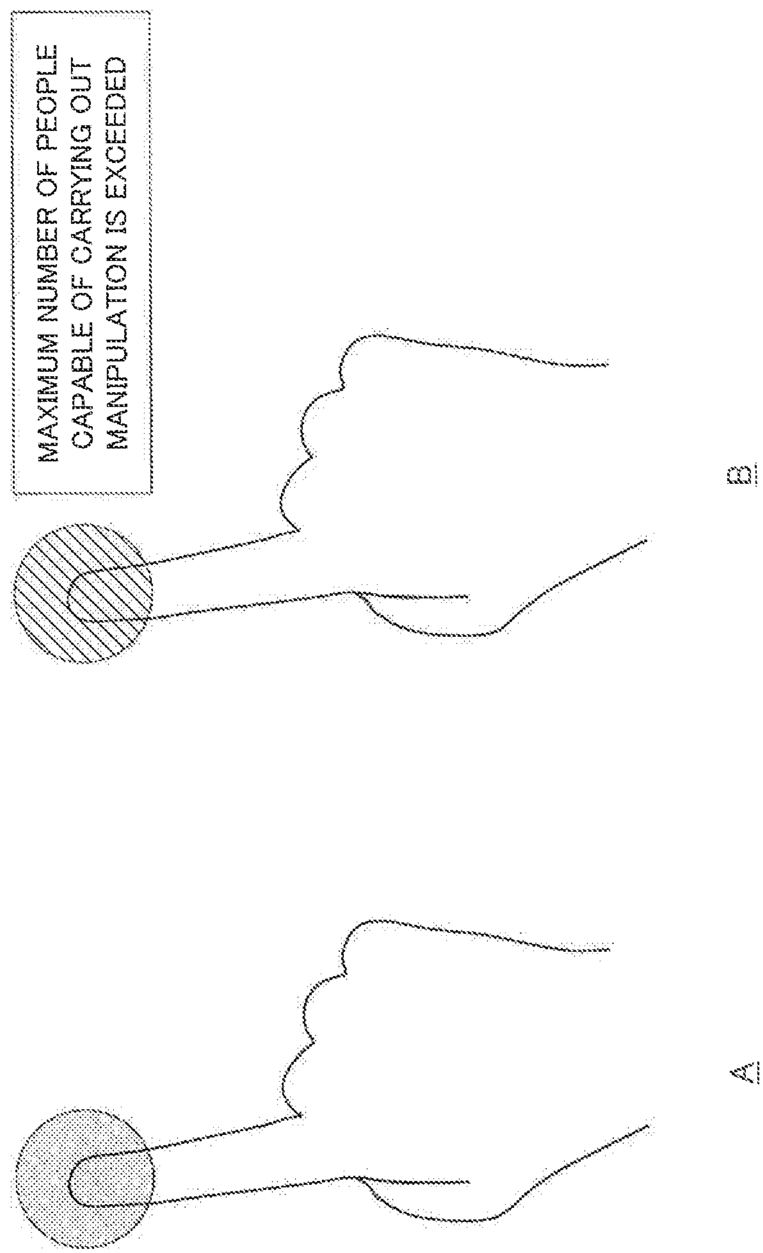

FIG. 312 is an explanatory diagram illustrating an example of a user interface.

Figure 313:
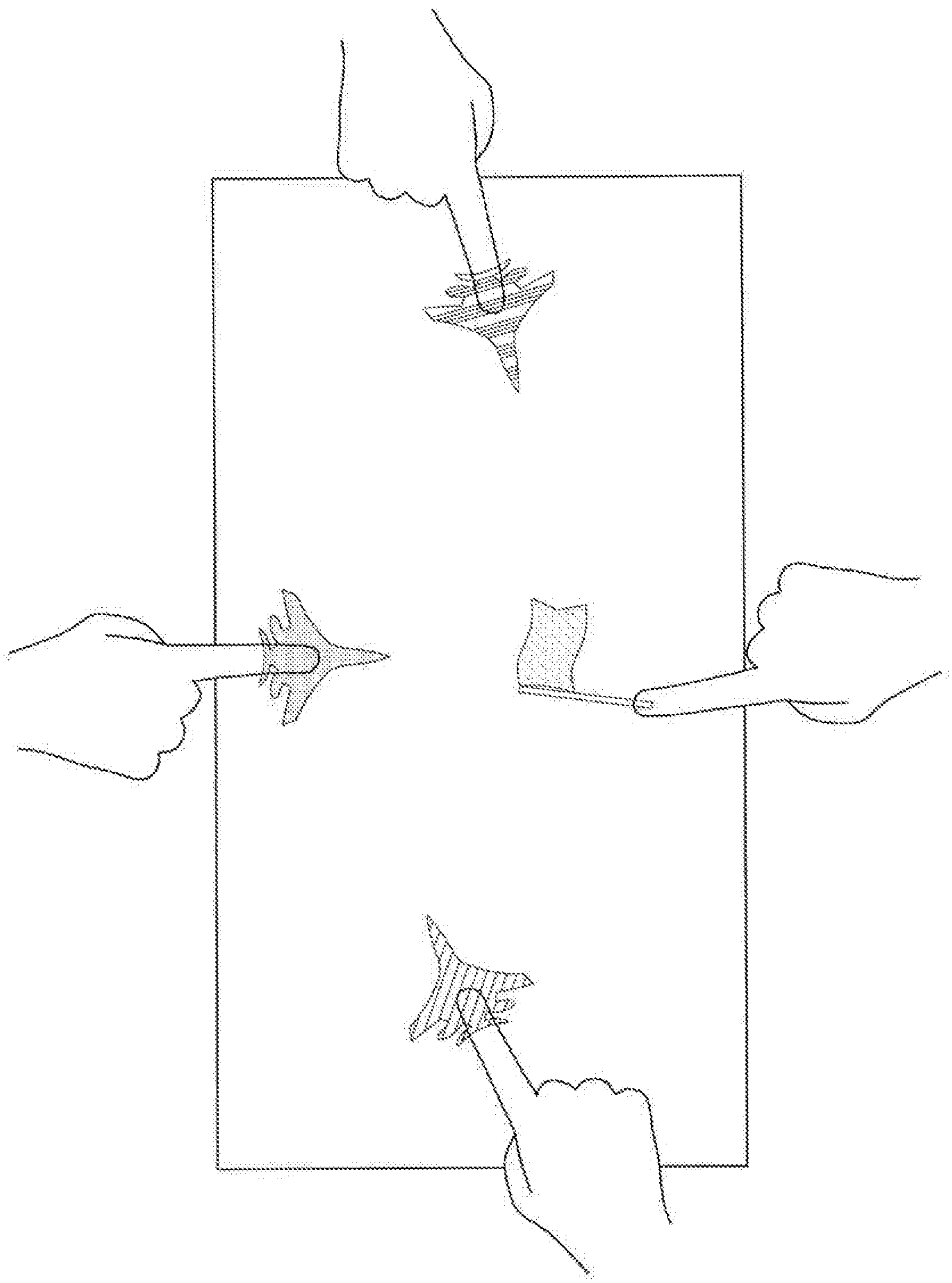

FIG. 313 is an explanatory diagram illustrating an example of a user interface.

Figure 314:
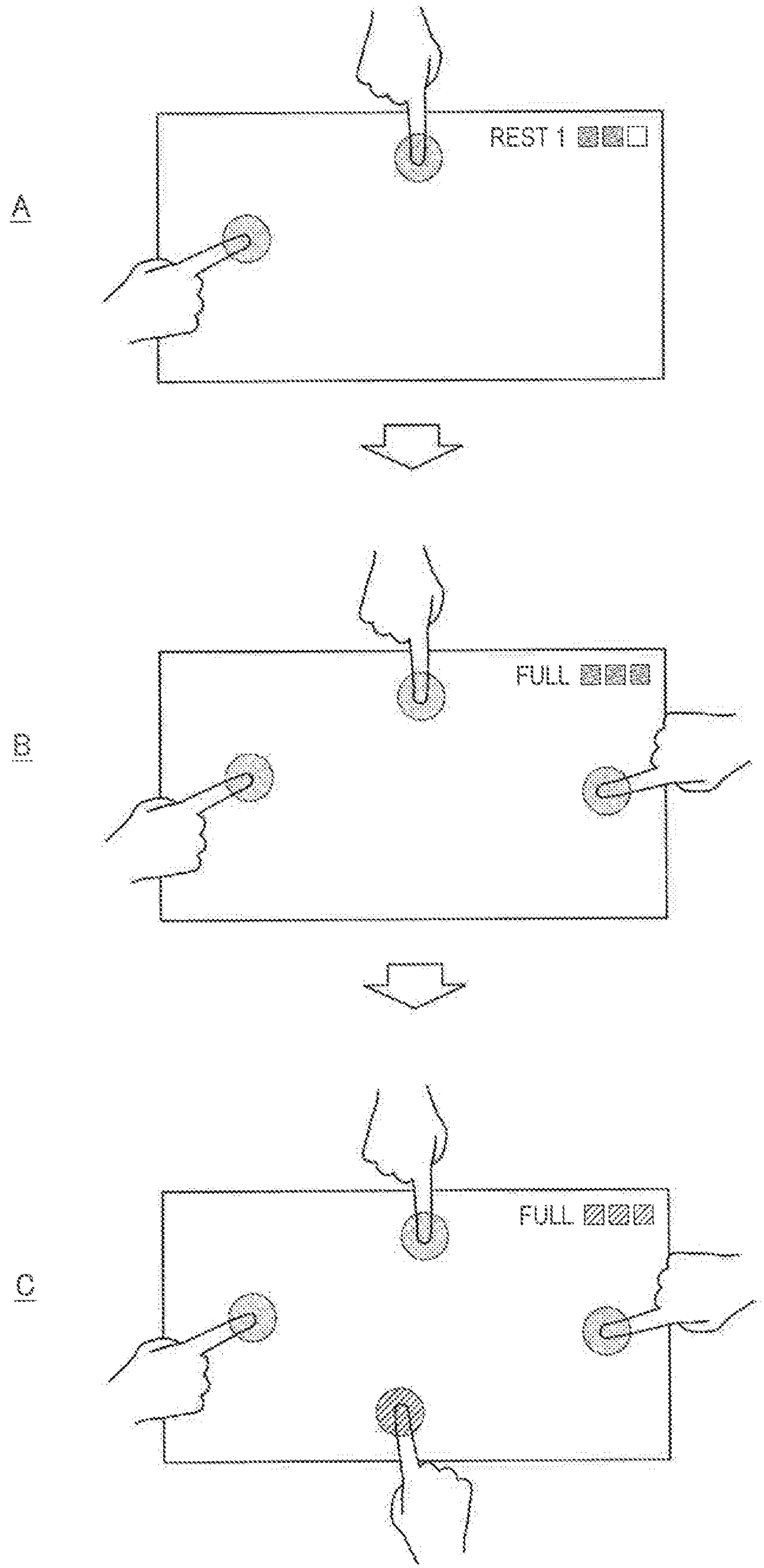

FIG. 314 is an explanatory diagram illustrating an example of a user interface.

Figure 315:
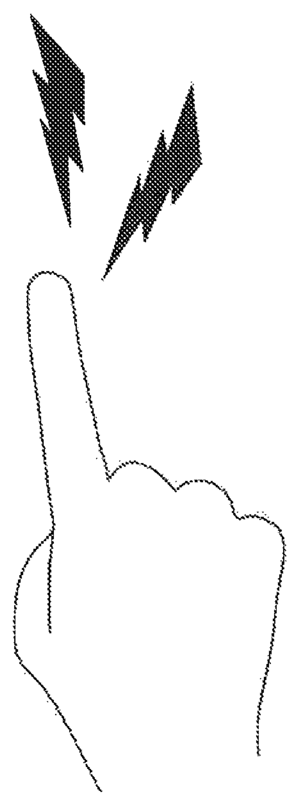

FIG. 315 is an explanatory diagram illustrating an example of a user interface.

Figure 316:
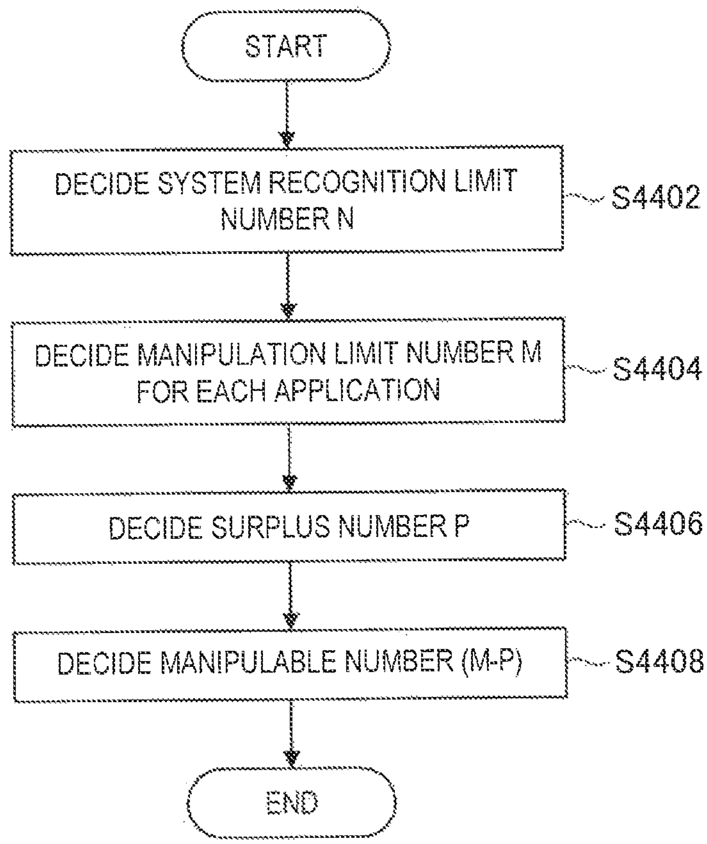

FIG. 316 is a flowchart illustrating an example of the flow of a display control process executed in the information processing system.

Figure 317:
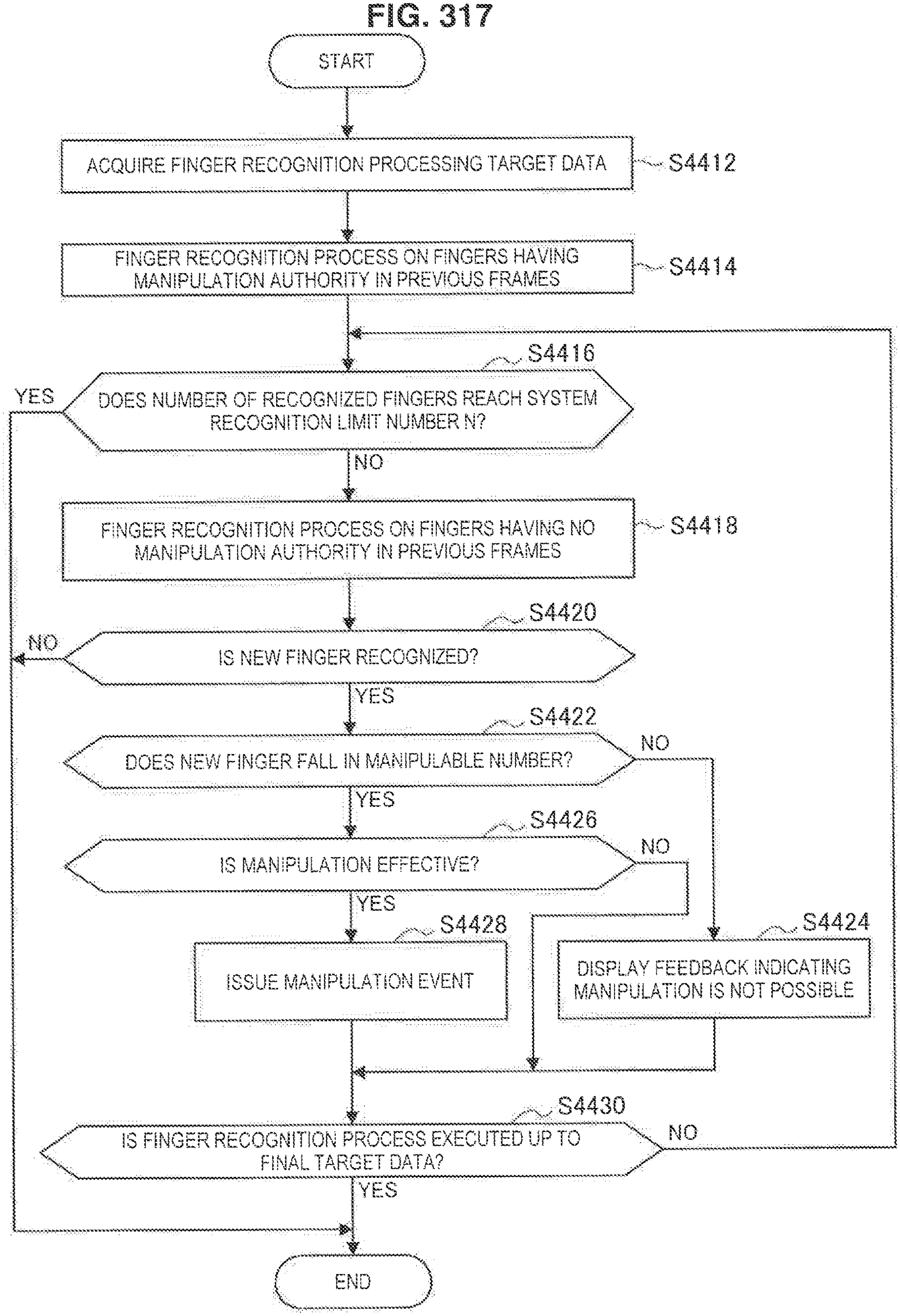

FIG. 317 is a flowchart illustrating an example of the flow of a display control process executed in the information processing system.

Figure 318:
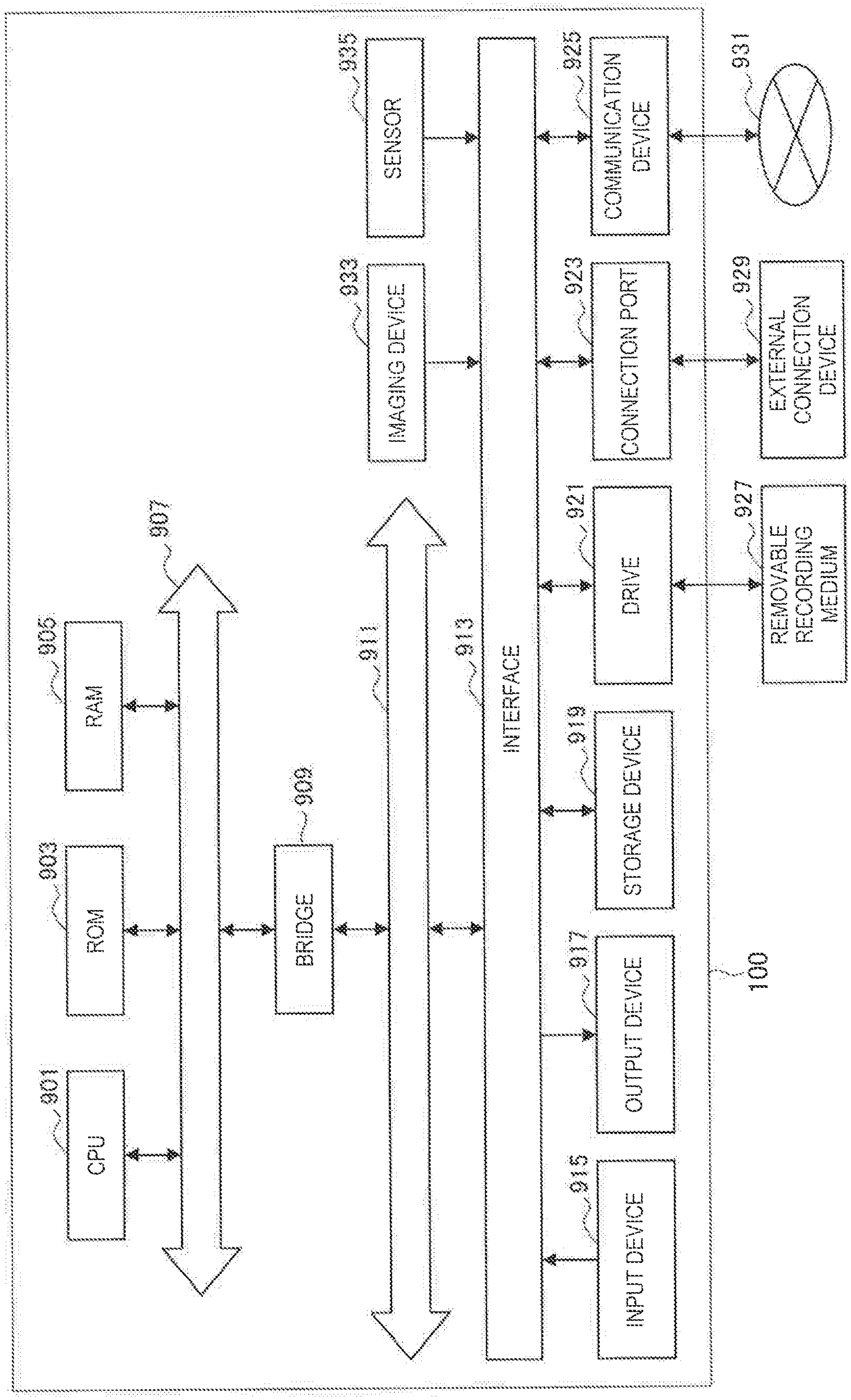

FIG. 318 is an explanatory diagram illustrating a hardware configuration example.

DESCRIPTION OF EMBODIMENTS

Hereinafter, preferred embodiments of the present disclosure will be described in detail with reference to the appended drawings. In this specification and the drawings, elements that have substantially the same function and structure are denoted with the same reference signs, and repeated explanation is omitted.

The description will be made in the following order.

<1. Embodiment of the present disclosure>

(1.1. System configuration example)

(1.2. Functional configuration example)

(1.3. Display control example)

<2. Specific examples of user interface>

<3. Hardware configuration example>

<4. Conclusion>

1. EMBODIMENT OF THE PRESENT DISCLOSURE

1.1. System Configuration Example

Figure 1:
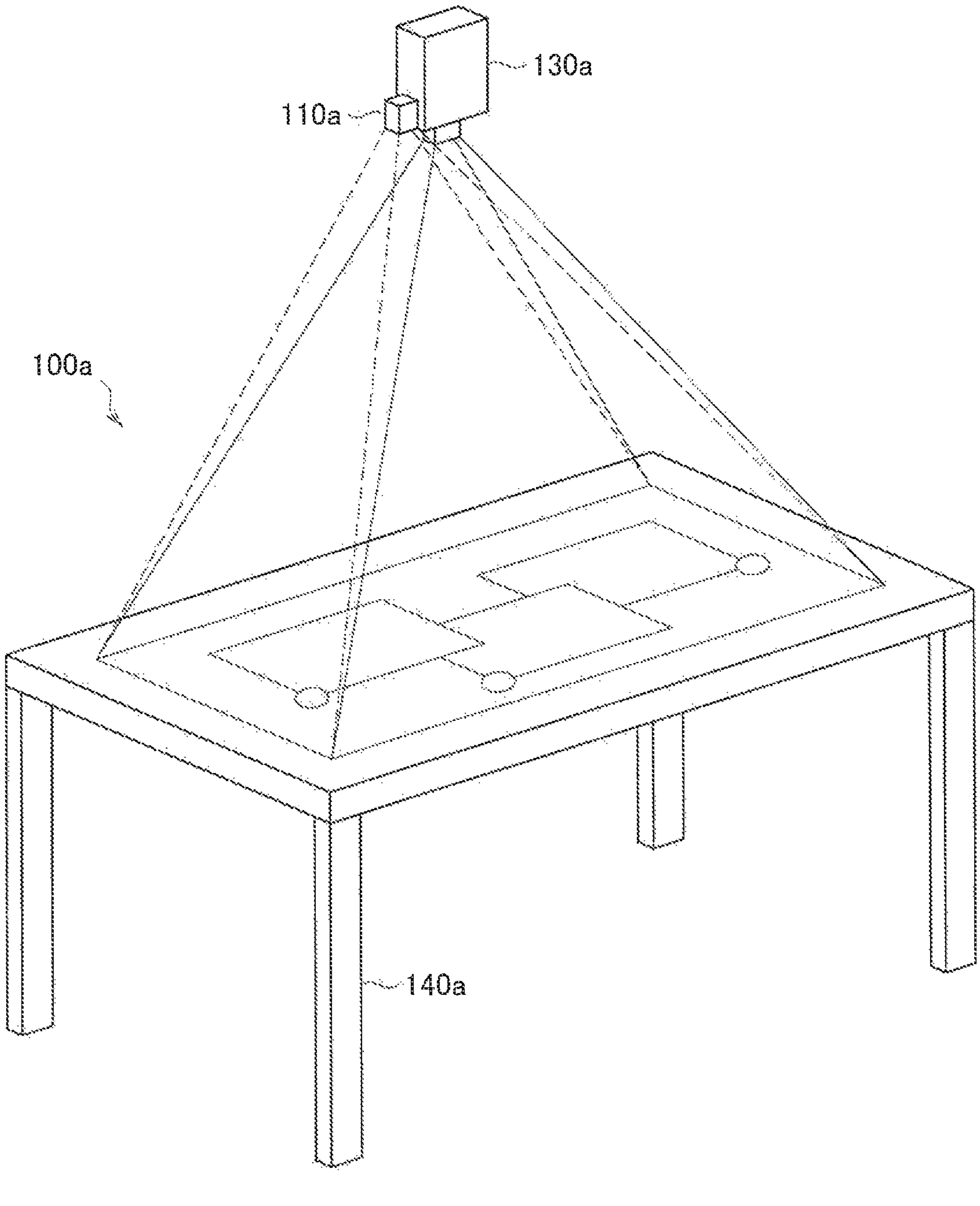
FIG. 1 is an explanatory diagram illustrating an example of the configuration of an information processing system according to an embodiment of the present disclosure.

First, an example of the configuration of an information processing system according to an embodiment of the present disclosure will be described with reference to the drawings. FIG. 1 is an explanatory diagram illustrating an example of the configuration of the information processing system according to the embodiment of the present disclosure. Hereinafter, an example of the configuration of the information processing system according to the embodiment of the present disclosure will be described with reference to FIG. 1.

As illustrated in FIG. 1, an information processing system 100*a* according to the embodiment of the present disclosure is configured to include an input unit 110*a* and an output unit 130*a*. The information processing system 100*a* according to the embodiment of the present disclosure illustrated in FIG. 1 is a system that displays information on the top surface of a table 140*a* and allows a user using the information processing system 100*a* to manipulate the information displayed on the table 140*a*. A scheme of displaying information on the top surface of the table 140*a* as in FIG. 1 is also referred to as a "projection type."

The input unit 110*a* is a device that inputs manipulation content of the user using the information processing system 100*a* or the shape or design of an object placed on the table 140*a*. In the example illustrated in FIG. 1, for example, the input unit 110*a* is provided above the table 140*a* to be suspended from a ceiling. That is, the input unit 110*a* is provided to be separated from the table 140*a* which is a target on which information is displayed. As the input unit 110*a*, for example, a camera that images the table 140*a* using one lens, a stereo camera that is capable of imaging the table 140*a* using two lenses and recording information in a depth direction, a microphone that collects a sound uttered by the user using the information processing system 100*a* or environmental sounds of an environment in which the information processing system 100*a* is placed can be used.

When the camera that images the table 140*a* using one lens is used as the input unit 110*a*, the information processing system 100*a* can detect an object placed on the table 140*a* by analyzing an image captured by the camera. When the stereo camera is used as the input unit 110*a*, for example, a visible light camera or an infrared camera can be used in the stereo camera. When the stereo camera is used as the input unit 110*a*, the input unit 110*a* can acquire depth information. When the input unit 110*a* acquires the depth information, the information processing system 100*a* can detect, for example, a hand or an object placed on the table 140*a*. When the input unit 110*a* acquires the depth information, the information processing system 100*a* can detect touch or approach of a hand of the user to the table 140*a* or can detect separation of the hand from the table 140*a*. In the following description, a user touching or approaching an information display surface with a manipulator such as a hand is also collectively referred to simply as "touch."

When the microphone is used as the input unit 110*a*, a microphone array collecting a sound in a specific direction can be used as the microphone. When the microphone array is used as the input unit 110*a*, the information processing system 100*a* may adjust a sound collection direction of the microphone array to any direction.

Hereinafter, a case in which a manipulation by the user is detected from an image captured by the input unit 110*a* will be mainly described. However, the present disclosure is not limited to the related example. A manipulation by the user may be detected by a touch panel that detects touch of a finger of the user. Additionally, examples of the user manipulation which can be acquired by the input unit 110*a* can include a stylus manipulation on an information display surface and a gesture manipulation on a camera.

The output unit 130*a* is a device that displays information on the table 140*a* according to information regarding manipulation content input through the input unit 110*a* by the user using the information processing system 100*a*, content of information output by the output unit 130*a*, or the shape or design of an object placed on the table 140*a* or that outputs a sound. For example, a projector or a speaker is used as the output unit 130*a*. In the example illustrated in FIG. 1, for example, the output unit 130*a* is provided above the table 140*a* to be suspended from a ceiling. When the output unit 130*a* is configured of a projector, the output unit 130*a* projects information to the top surface of the table 140*a*. When the output unit 130*a* is configured of a speaker, the output unit 130*a* outputs a sound based on a sound signal. When the output unit 130*a* is configured of a speaker, the number of speakers may be one or plural. When the output unit 130*a* is configured of a plurality of speakers, the information processing system 100*a* may limit the speakers outputting sounds or adjust a sound output direction.

When the information processing system 100*a* is of a projection type, as illustrated in FIG. 1, the output unit 130*a* may include an illumination device. When the output unit 130*a* includes an illumination device, the information processing system 100*a* may control an on or off state or the like of the illumination device based on content of information input through the input unit 110*a*.

The user using the information processing system 100*a* can place his or her finger or the like on the table 140*a* to manipulate information displayed on the table 140*a* by the output unit 130*a*. The user using the information processing system 100*a* can place the object on the table 140*a*, cause the input unit 110*a* to recognize an object, and execute various manipulations on the recognized object.

Although not illustrated in FIG. 1, another device may be connected to the information processing system 100*a*. For example, an illumination device illuminating the table 140*a* may be connected to the information processing system 100*a*. When the illumination device illuminating the table 140*a* is connected to the information processing system 100*a*, the information processing system 100*a* can control a lighting state of the illumination device according to a state of an information display surface.

Figure 2:
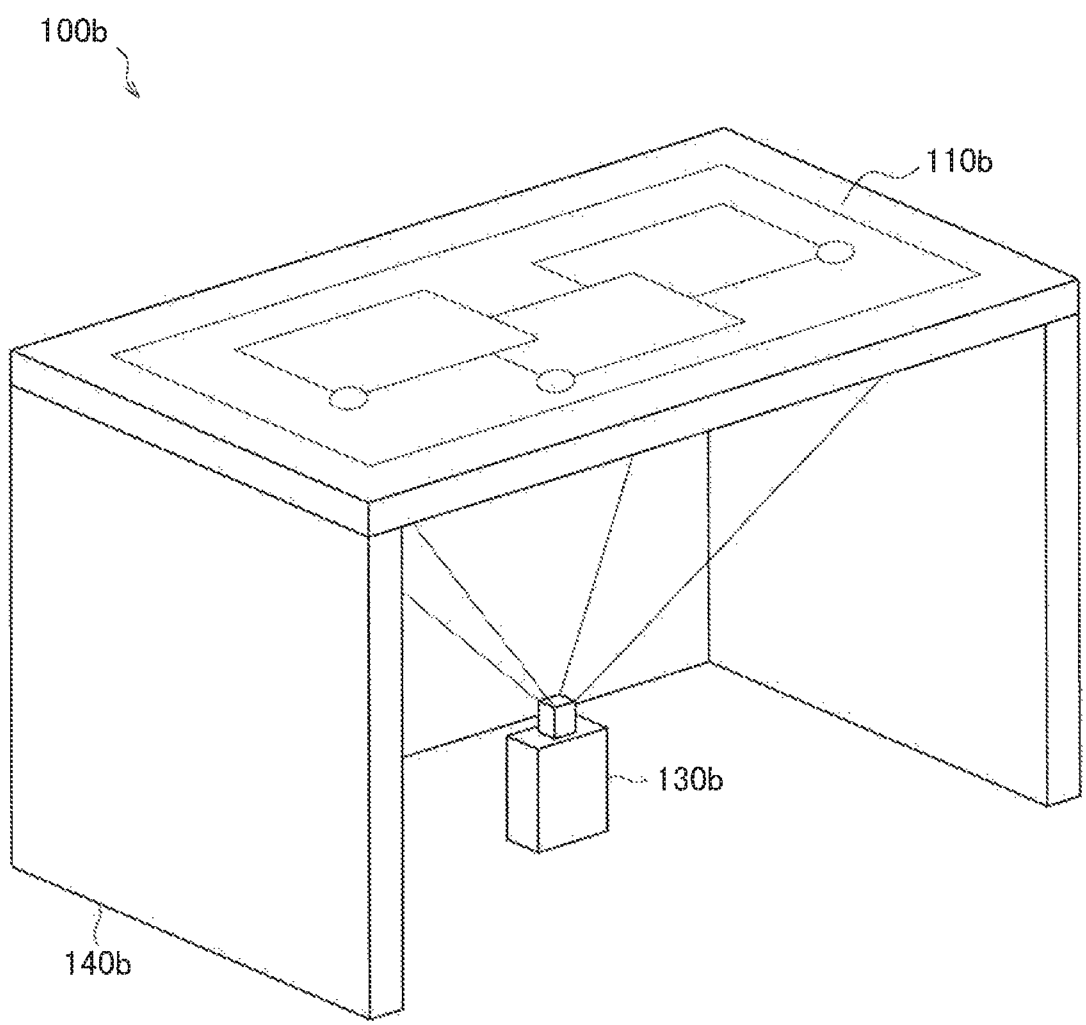
FIG. 2 is an explanatory diagram illustrating an example of the configuration of an information processing system according to an embodiment of the present disclosure.
Figure 3:
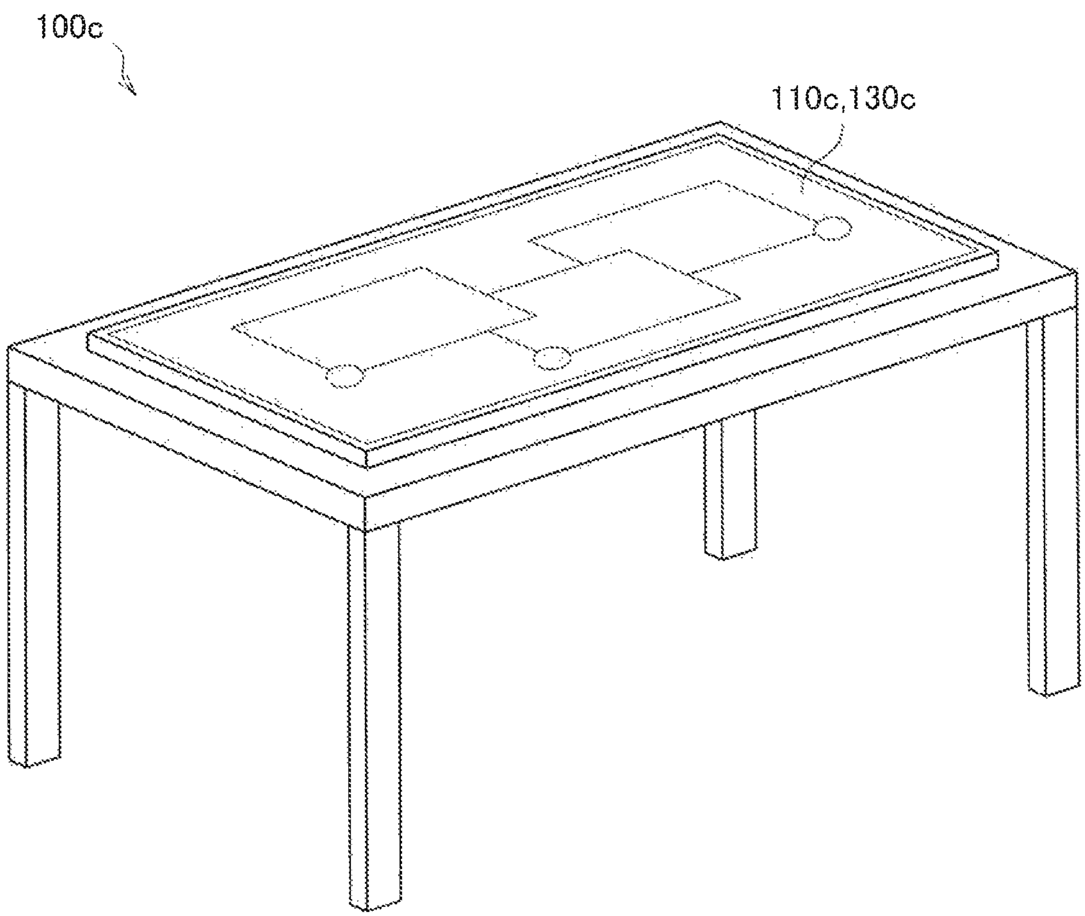
FIG. 3 is an explanatory diagram illustrating an example of the configuration of an information processing system according to an embodiment of the present disclosure.
Figure 4:
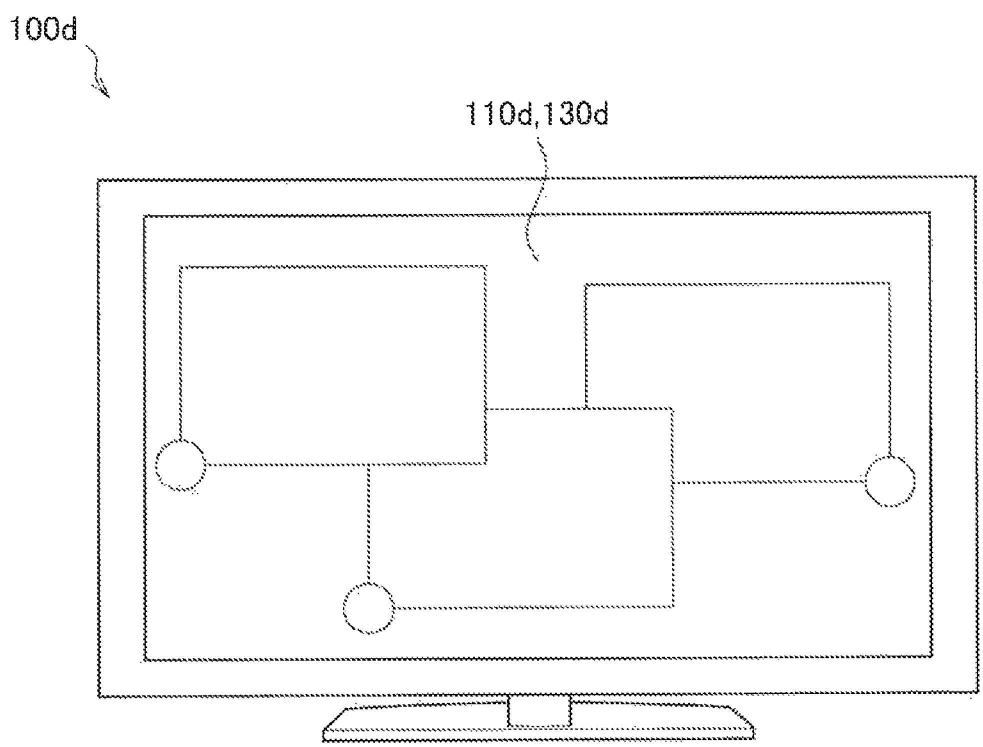
FIG. 4 is an explanatory diagram illustrating an example of the configuration of an information processing system according to an embodiment of the present disclosure.

In the present disclosure, the information processing system is not limited to the form illustrated in FIG. 1. FIGS. 2 to 4 are explanatory diagrams illustrating examples of other new forms of information processing systems according to embodiments of the present disclosure.

FIG. 2 is an explanatory diagram illustrating an example of the configuration of an information processing system 100*b* according to an embodiment of the present disclosure. The information processing system is configured to display the information on the front surface of the table 140*b* by causing the output unit 130*a* to radiate information from the lower side of a table 140*b*. That is, in the information processing system 100*b* illustrated in FIG. 2, the information display surface is the top surface of the table 140*b*. The surface of the table 140*b* is formed of a transparent material such as a glass plate or a transparent plastic plate. A scheme of causing the output unit 130*a* to radiate information from the lower side of the table 140*b* and displaying the information on the top surface of the table 140*b* as in FIG. 2 is also referred to as a "rear projection type." In the example illustrated in FIG. 2, a configuration in which an input unit 110*b* is provided on the front surface of the table 140*b* is illustrated. However, as in the information processing system 100*a* illustrated in FIG. 1, the input unit 110*b* may be provided below the table 140*b* to be separated from the table 140*b*.

FIG. 3 is an explanatory diagram illustrating an example of the configuration of an information processing system 100*c* according to an embodiment of the present disclosure. FIG. 3 illustrates a state in which a touch panel type display is placed on a table. In this way, in the case of the touch panel type display, an input unit 110*c* and an output unit 130*c* can be configured as a touch panel type display. That is, in the information processing system 100*c* illustrated in FIG. 3, an information display surface is the touch panel type display. In the information processing system 100*c* illustrated in FIG. 3, a camera detecting the position of a user may be provided above the touch panel type display, as in the information processing system 100*a* illustrated in FIG. 1.

FIG. 4 is an explanatory diagram illustrating an example of the configuration of an information processing system 100*d* according to an embodiment of the present disclosure. FIG. 4 illustrates a state in which a flat panel type display is placed on a table. That is, in the information processing system 100*d* illustrated in FIG. 4, an information display surface is a flat panel type display. In this way, in the case of the flat panel type display, an input unit 110*d* and an output unit 130*d* can be configured as a flat panel type display. In the flat panel type display illustrated in FIG. 4, a touch panel may be provided.

In the following description, the configuration of the information processing system 100*a*, as illustrated in FIG. 1, in which the input unit 110*a* and the output unit 130*a* are provided above the table 140*a*, that is, the configuration in which the input unit 110*a* and the output unit 130*a* are provided to be separated from the information display surface, will be described as an example. In the following description, the information processing system 100*a*, the input unit 110*a*, and the output unit 130*a* will also be described as an information processing system 100, an input unit 110, and an output unit 130.

1.2. Functional Configuration Example

Figure 5:
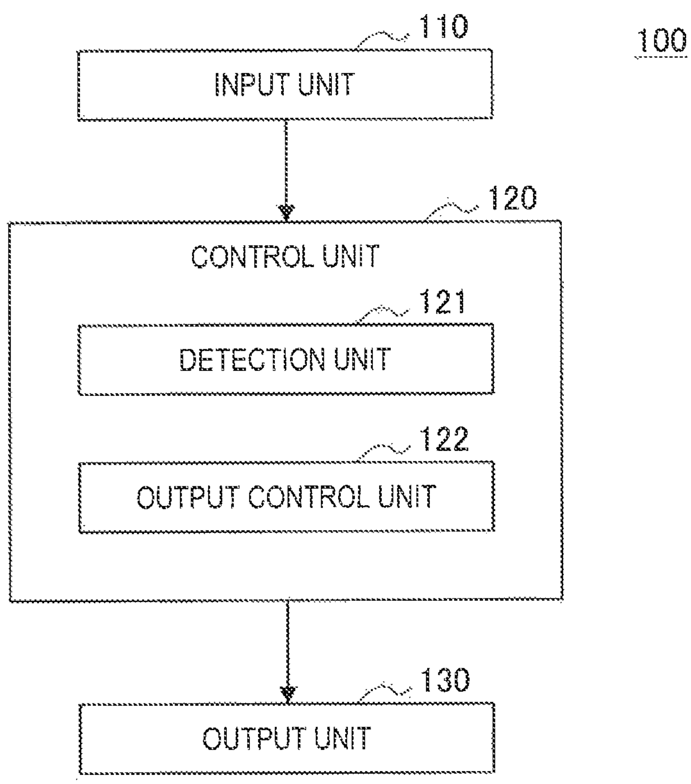
FIG. 5 is an explanatory diagram illustrating an example of a functional configuration of the information processing system according to an embodiment of the present disclosure.

Next, an example of a functional configuration of the information processing system according to an embodiment of the present disclosure will be described. FIG. 5 is an explanatory diagram illustrating an example of the functional configuration of the information processing system according to the embodiment of the present disclosure. Hereinafter, the example of the functional configuration of the information processing system according to the embodiment of the present disclosure will be described with reference to FIG. 5.

As illustrated in FIG. 5, the information processing system 100 according to the embodiment of the present disclosure is configured to include an input unit 110, a control unit 120, and an output unit 130.

The input unit 110 inputs manipulation content on the information processing system 100 from a user using the information processing system 100 or the shape or design of an object placed on a surface (for example, the table 140*a* illustrated in FIG. 1) through which information is output by the output unit 130. The manipulation content on the information processing system 100 from the user using the information processing system 100 includes manipulation content on a GUI output to an information display surface by the information processing system 100. Information regarding the shape or design of an object or the manipulation content on the information processing system 100 input by the input unit 110 is transmitted to the control unit 120.

When the information processing system 100 is of a projection type, the input unit 110 can be configured of, for example, a camera configured of one lens, a stereo camera configured of two lenses, or a microphone.

The control unit 120 executes control on each unit of the information processing system 100. For example, the control unit 120 generates information to be output from the output unit 130 using information input by the input unit 110. As illustrated in FIG. 5, the control unit 120 is configured to include a detection unit 121 and an output control unit 122. The detection unit 121 executes a process of detecting manipulation content on the information processing system 100 by the user using the information processing system 100, content of information output by the output unit 130, or the shape or design of an object placed on a surface (for example, the table 140*a* illustrated in FIG. 1) through which information is output by the output unit 130. The content detected by the detection unit 121 is transmitted to the output control unit 122. Based on the content detected by the detection unit 121, the output control unit 122 executes control such that the information output from the output unit 130 is generated. The information generated by the output control unit 122 is transmitted to the output unit 130.

For example, when the information processing system 100 is of a projection type illustrated in FIG. 1, coordinates on the information display surface are proofread in advance to match touch coordinates of a manipulator such as a hand of the user on the display surface, and thus the detection unit 121 can detect a portion of a GUI which is touched by the manipulator such as a hand of the user.

The control unit 120 may be configured of, for example, a central processing unit (CPU). When the control unit 120 is configured of a device such as a CPU, the device can be configured of an electronic circuit.

Although not illustrated in FIG. 5, the control unit 120 may have a communication function of executing wireless communication with another device or a function of controlling an operation of another device connected to the information processing system 100, for example, an illumination device.

The output unit 130 outputs information according to information regarding manipulation content input through the input unit 110 by the user using the information processing system 100, content of information output by the output unit 130, and the shape or design of an object placed on a surface (for example, the table 140*a* illustrated in FIG. 1) through which information is output by the output unit 130. The output unit 130 outputs information based on information generated by the output control unit 122. The information output by the output unit 130 includes information to be displayed on the information display surface, a sound to be output from a speaker (not illustrated), or the like.

The information processing system 100 illustrated in FIG. 5 may be configured as a single device or may be configured partially or entirely of another device. For example, in the example of the functional configuration of the information processing system 100 illustrated in FIG. 5, the control unit 120 may be included in a device such as a server connected to the input unit 110 and the output unit 130 via a network or the like. When the control unit 120 is included in a device such as a server, information from the input unit 110 is transmitted to the device such as a server via the network or the like, the control unit 120 executes a process on the information from the input unit 110, and information to be output by the output unit 130 is transmitted from the device such as a server to the output unit 130 via the network or the like.

The example of the functional configuration of the information processing system 100 according to the embodiment of the present disclosure has been described above with reference to FIG. 5. Next, a display control example of information by the information processing system 100 according to an embodiment of the present disclosure will be described.

1.3. Display Control Example

Figure 6:
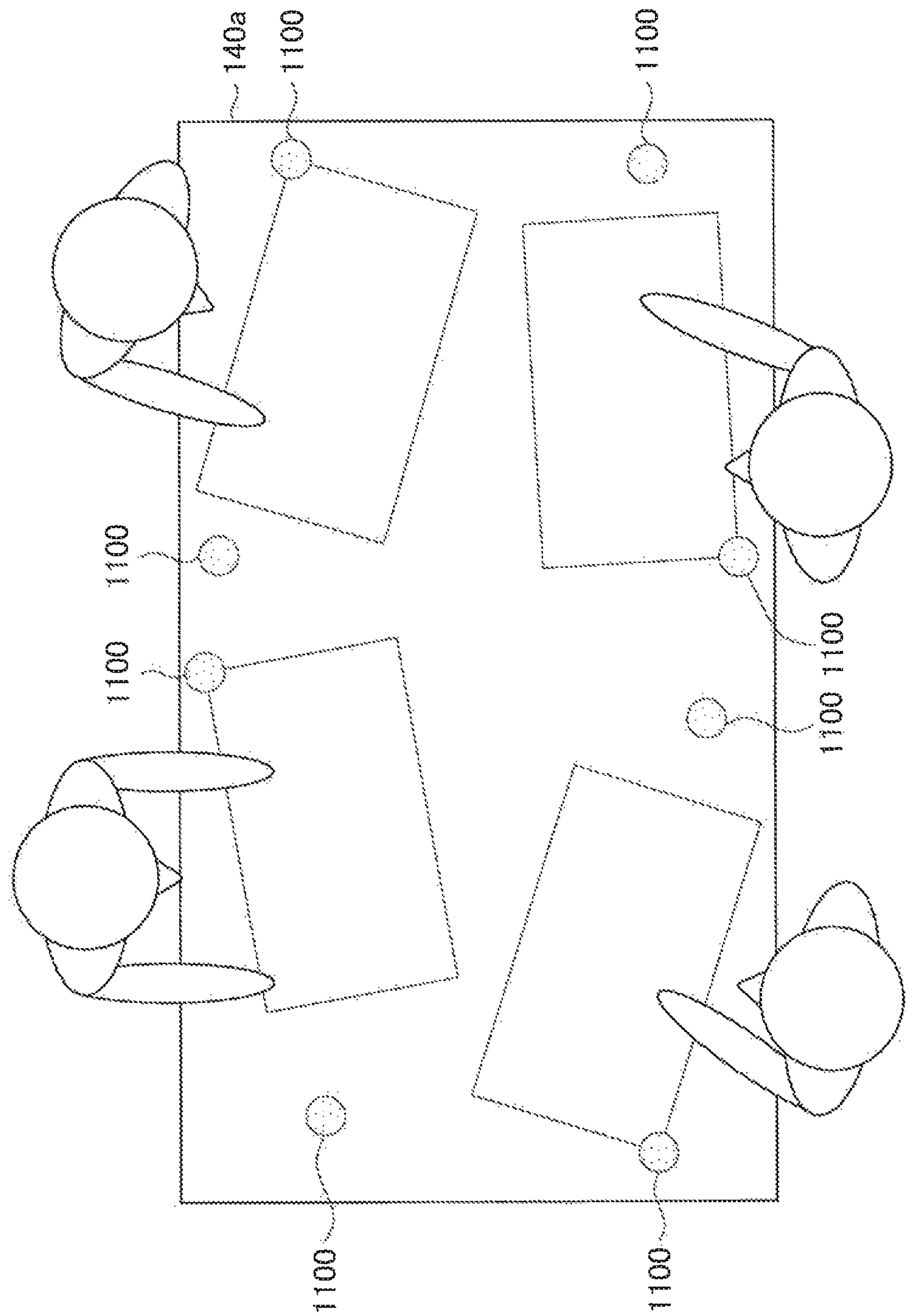
FIG. 6 is an explanatory diagram illustrating an example of a manipulation situation of the information processing system 100 according to an embodiment of the present disclosure.

FIG. 6 is an explanatory diagram illustrating an example of a manipulation situation of the information processing system 100 according to an embodiment of the present disclosure. As illustrated in FIG. 6, the information processing system 100 according to the embodiment of the present disclosure is, for example, a system configured for a plurality of users to independently execute applications on the same screen displayed on the table 140*a*. A graphical user interface (GUI) of an application illustrated in FIG. 6 is generated by the output control unit 122 and is output by the output unit 130. Reference numerals 1100 illustrated in FIG. 6 denote menu buttons used to manipulate an application.

The information processing system 100 according to the embodiment of the present disclosure acquires manipulation content from the user on the GUI of an application output to the information display surface by the output unit 130 using the input unit 110. The information processing system 100 allows a user to touch the display surface with a manipulator such as his or her hand or move the manipulator with which he or she is touching the display surface on the display surface and receives a manipulation on the GUI of the application output to the information display surface by the output unit 130.

Figure 7:
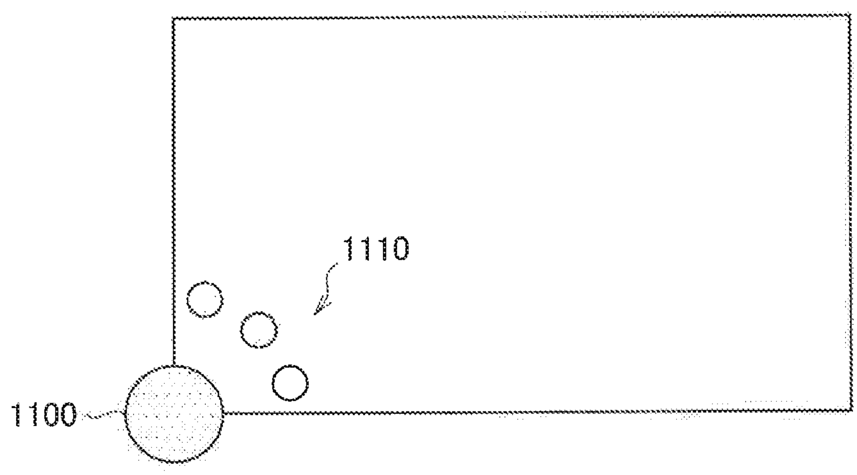
FIG. 7 is an explanatory diagram illustrating an example of a GUI of an application.
Figure 8:
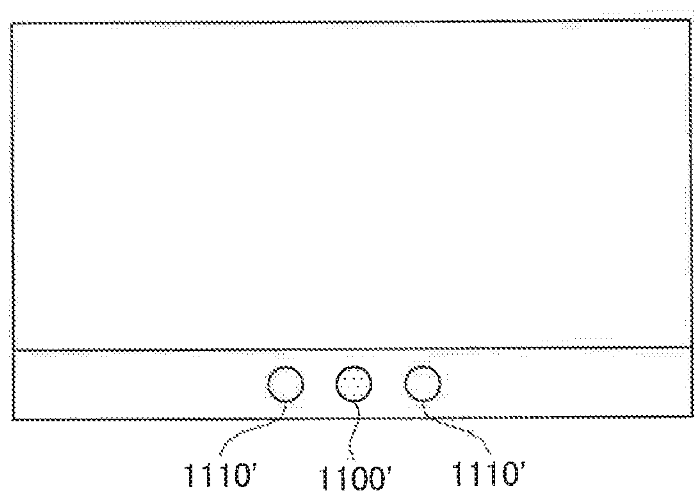
FIG. 8 is an explanatory diagram illustrating an example of a GUI of an application.

FIGS. 7 and 8 are explanatory diagrams illustrating examples of GUIs of applications displayed by the information processing system 100 according to an embodiment of the present disclosure. FIG. 7 illustrates an example of a GUI in which buttons are disposed in a fan form centering on a corner (a left corner in the example of FIG. 7) of a window of an application. FIG. 8 illustrates an example of a GUI in which buttons are disposed along one side (a lower side in the example of FIG. 8) of a window of an application. Reference numeral 1100 illustrated in FIG. 7 denotes a menu button used to manipulate the application. Reference numeral 1110 illustrated in FIG. 7 denotes a menu button group displayed when the user touches the menu button denoted by reference numeral 1100 or displayed initially and used to manipulate the application. Similarly, reference numeral 1100' illustrated in FIG. 8 is a menu button used to manipulate the application. Reference numeral 1110' illustrated in FIG. 8 denotes a menu button group displayed when the user touches the menu button denoted by reference numeral 1100' or displayed initially and used to manipulate the application.

When the user touches any menu button in the menu button group 1110 with his or her finger or the like and the user moves his or her finger or the like along a row of the menu button group 1110 on the information display surface in the touch state, the information processing system 100 tracks the manipulation from the user and displays the menu button group 1110 so that the menu button group 1110 is rotated about the menu button 1100.

Figure 9:
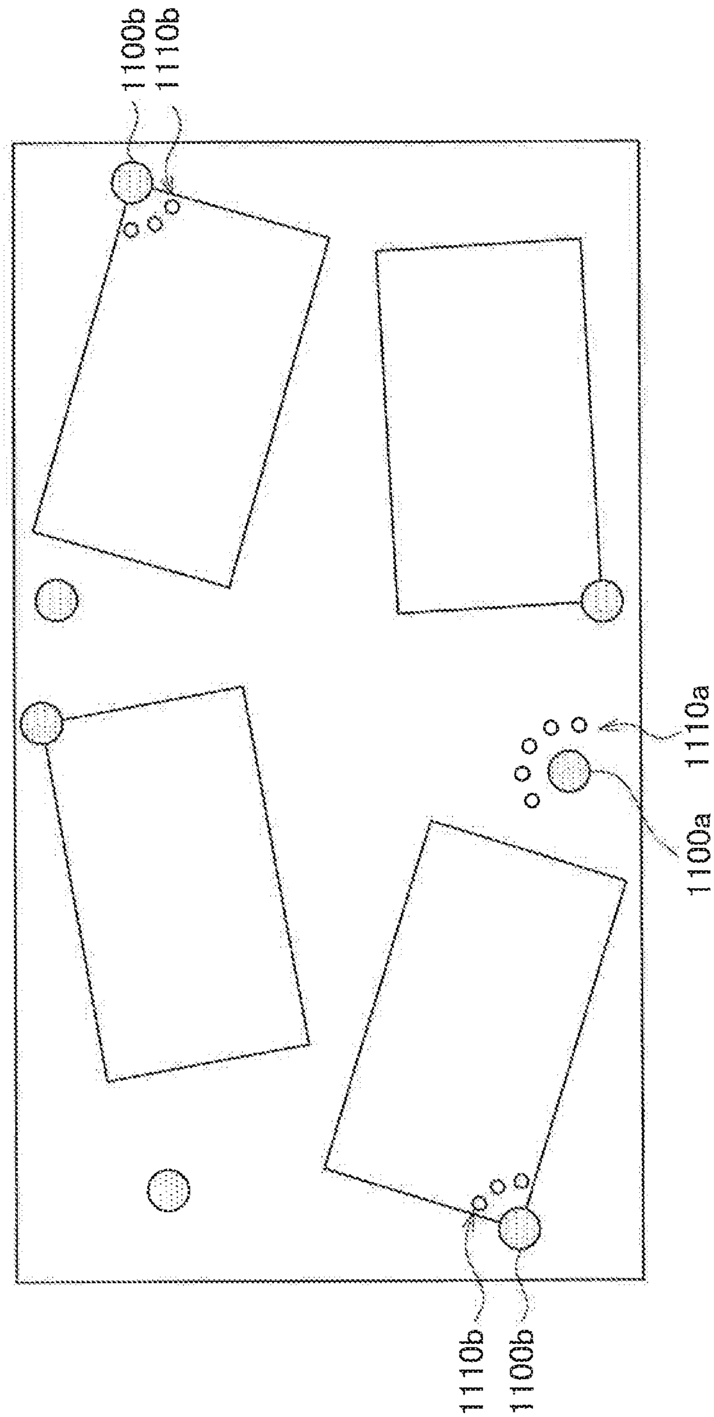
FIG. 9 is an explanatory diagram illustrating an example of a GUI of an application.
Figure 10:
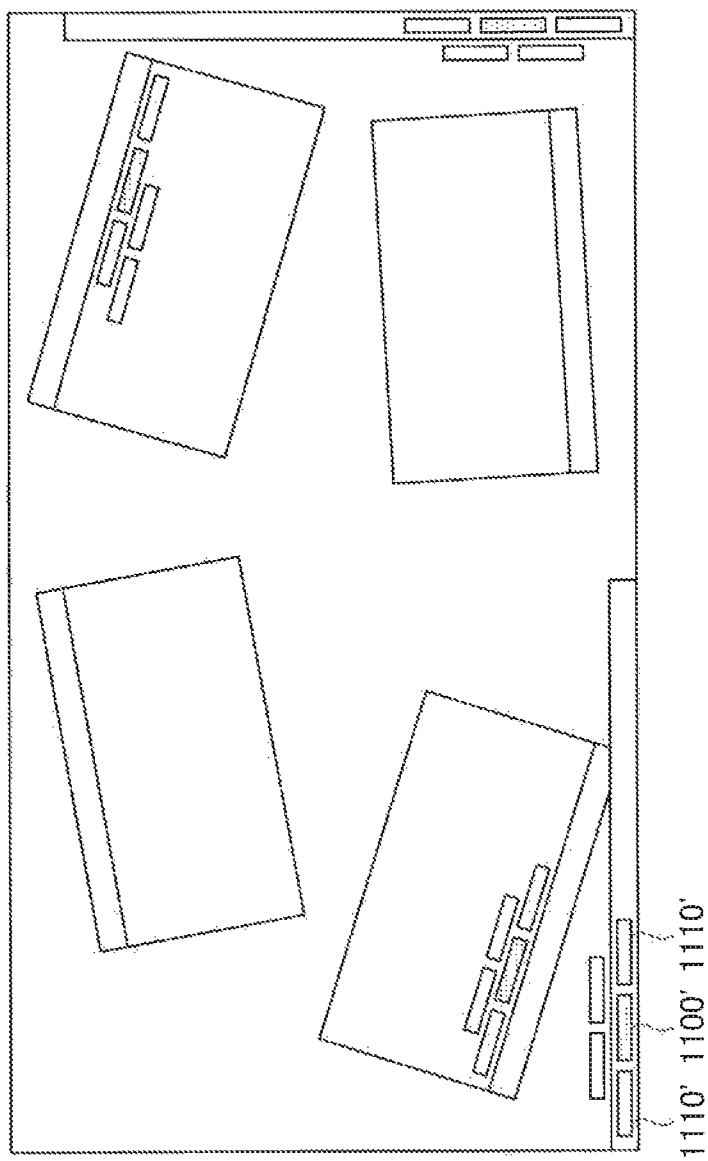
FIG. 10 is an explanatory diagram illustrating an example of a GUI of an application.

FIGS. 9 and 10 are explanatory diagrams illustrating examples of GUIs of applications displayed by the information processing system 100 according to an embodiment of the present disclosure and are explanatory diagrams illustrating states in which a plurality of windows are displayed. FIGS. 9 and 10 illustrate forms in which global menus which are menus used for users to activate applications executed by the information processing system 100 and local menus which are menus used for the users to manipulate the activated applications are displayed. FIG. 9 illustrates a display example of a button format in which the global menus and the local menus are displayed in fan forms. FIG. 10 illustrates a display example in which the global menus and the local menus are displayed in bar forms. In FIG. 9, the global menus are a menu button 1100*a* and a menu button group 1110*a* and the local menus are menu buttons 1100*b* and menu button groups 1110*b*. In FIG. 10, the global menus are a menu button 1100' and a menu button group 1110'.

Figure 11:
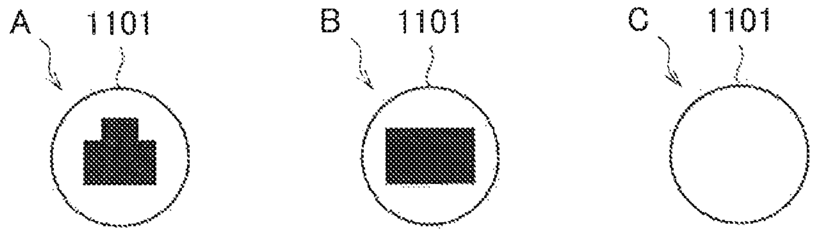
FIG. 11 is an explanatory diagram illustrating an example of a GUI of an application.
Figure 12:
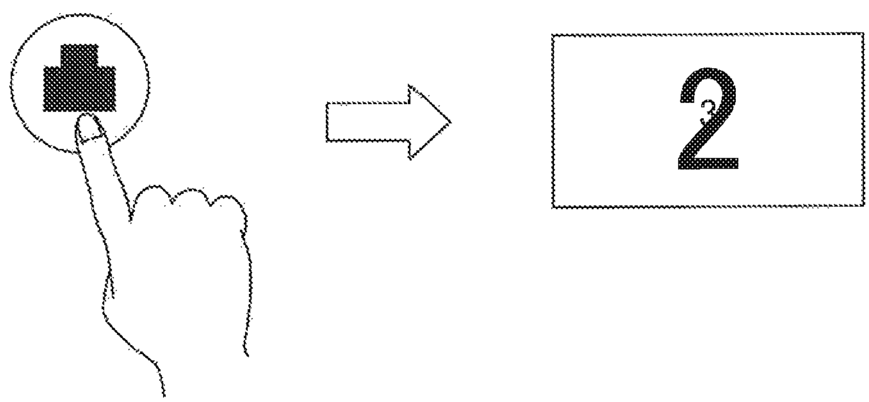
FIG. 12 is an explanatory diagram illustrating an example of a GUI of an application.
Figure 13:
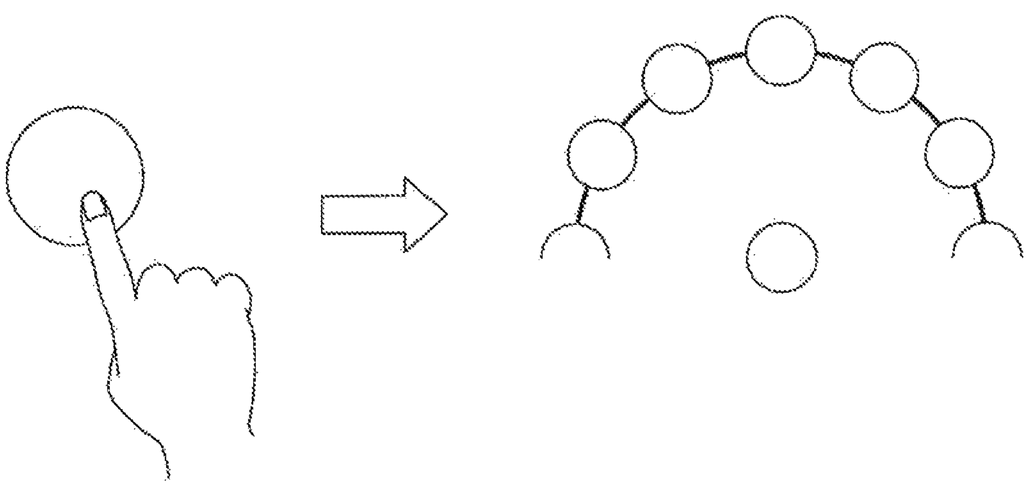
FIG. 13 is an explanatory diagram illustrating an example of a GUI of an application.

FIGS. 11 to 13 are explanatory diagrams illustrating examples of GUIs of applications displayed by the information processing system 100 according to an embodiment of the present disclosure. In FIG. 11, reference numeral A denotes an example of a button icon 1101 used to activate a camera application, reference numeral B denotes an example of a button icon 1101 used to read data managed by the information processing system 100, and reference numeral C denotes an example of a button icon 1101 representing a folder. When the user selects the button icon 1101 denoted by reference numeral B in FIG. 11 that is used to read data managed by the information processing system 100, the information processing system 100 reads the data and executes an operation according to the kind of data. When the data is image data, the information processing system 100 outputs the image data from the output unit 130. When the data is music data, the information processing system 100 reproduces the music data from the output unit 130.

FIG. 12 is an explanatory diagram illustrating a display example when the user of the information processing system 100 selects the button icon 1101 used to activate the camera application denoted by reference numeral A in FIG. 11. FIG. 13 is an explanatory diagram illustrating a display example when the user of the information processing system 100 selects the menu button 1100. In the example illustrated in FIG. 13, when the menu button 1100 is selected by the user, the menu button group 1110 used to execute a function belonging to the menu button 1100 is displayed.

When the information processing system 100 according to the embodiment of the present disclosure outputs such a GUI and displays menus in an initial state set in advance, various problems may occur according to the position of another window or a state of the information display surface, for example, a state of an object placed on the table 140*a* illustrated in FIG. 1. For example, when the position of a window protrudes outside a display region, there may be an unselectable menu. When a window is covered with another window and the user does not execute a manipulation of moving the window to the forefront, there may be an unselectable menu. In the information processing system 100 according to the embodiment of the present disclosure, as in FIG. 6, the user can manipulate the menu in various directions. Therefore, the user may be located away from the menu according to the position or direction of the user, and thus it may be hard for the user to touch the menu. When information is displayed on the table 140*a* from the output unit 130*a* as in FIG. 1, a menu may overlap a location in which an object is placed on the table 140*a*, and thus the user may not manipulate the menu.

Accordingly, the information processing system 100 according to the embodiment of the present disclosure detects the position of another window or the state of the information display surface and controls the position of a menu based on the detection result. Specifically, the information processing system 100 according to the embodiment of the present disclosure detects, for example, a state of an object placed on the table 140*a* illustrated in FIG. 1 or the table 140*b* illustrated in FIG. 2 and controls the position of a menu based on the detection result. By detecting the state of the information display surface and controlling the position of a menu based on the detection result, the information processing system 100 according to the embodiment of the present disclosure can display information appropriately and efficiently according to an environment in which information is displayed. Hereinafter, a method of controlling the position of a menu by the information processing system 100 according to the embodiment of the present disclosure will be described.

Figure 14:
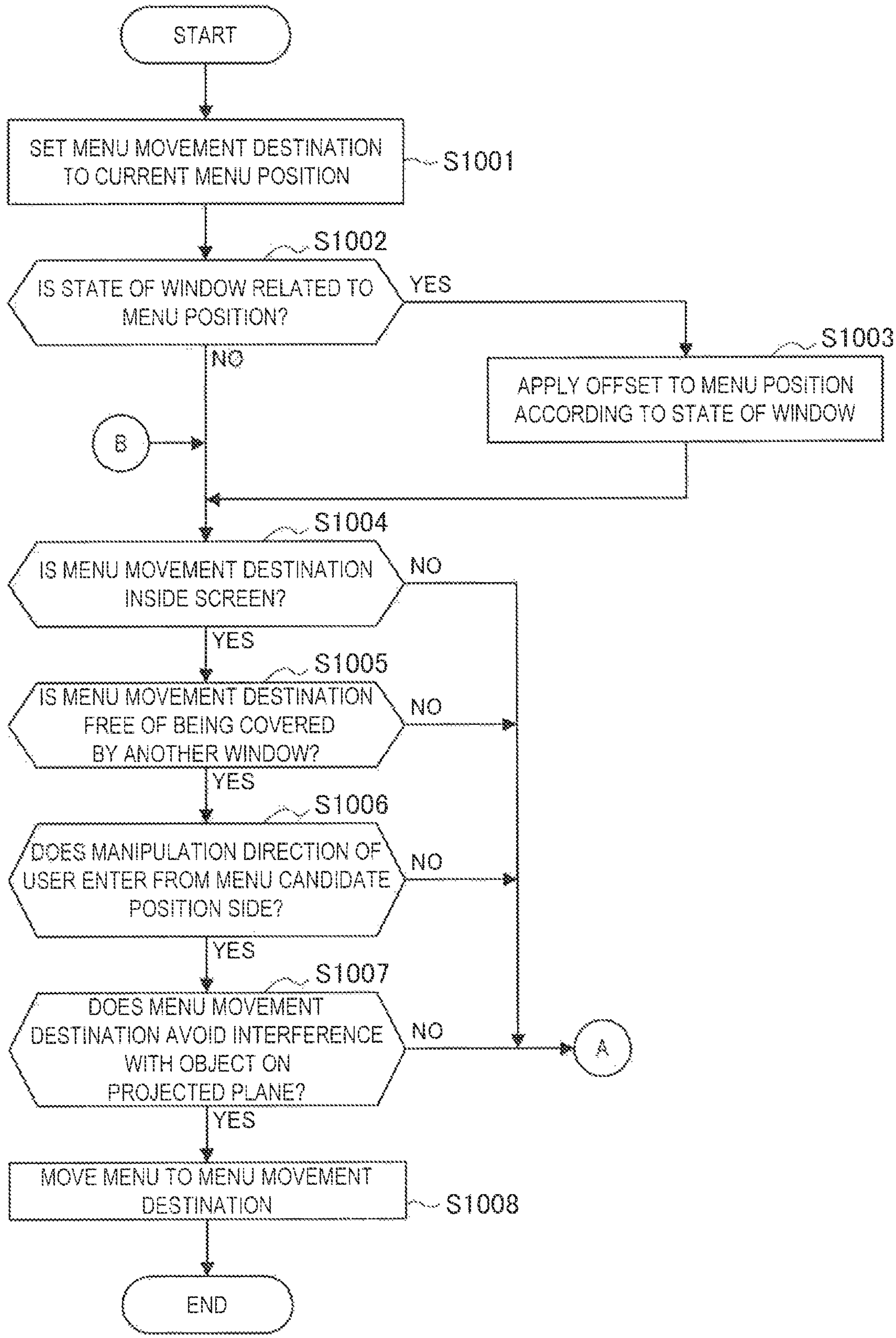
FIG. 14 is a flowchart illustrating an example of an operation of the information processing system 100 according to an embodiment of the present disclosure.
Figure 15:
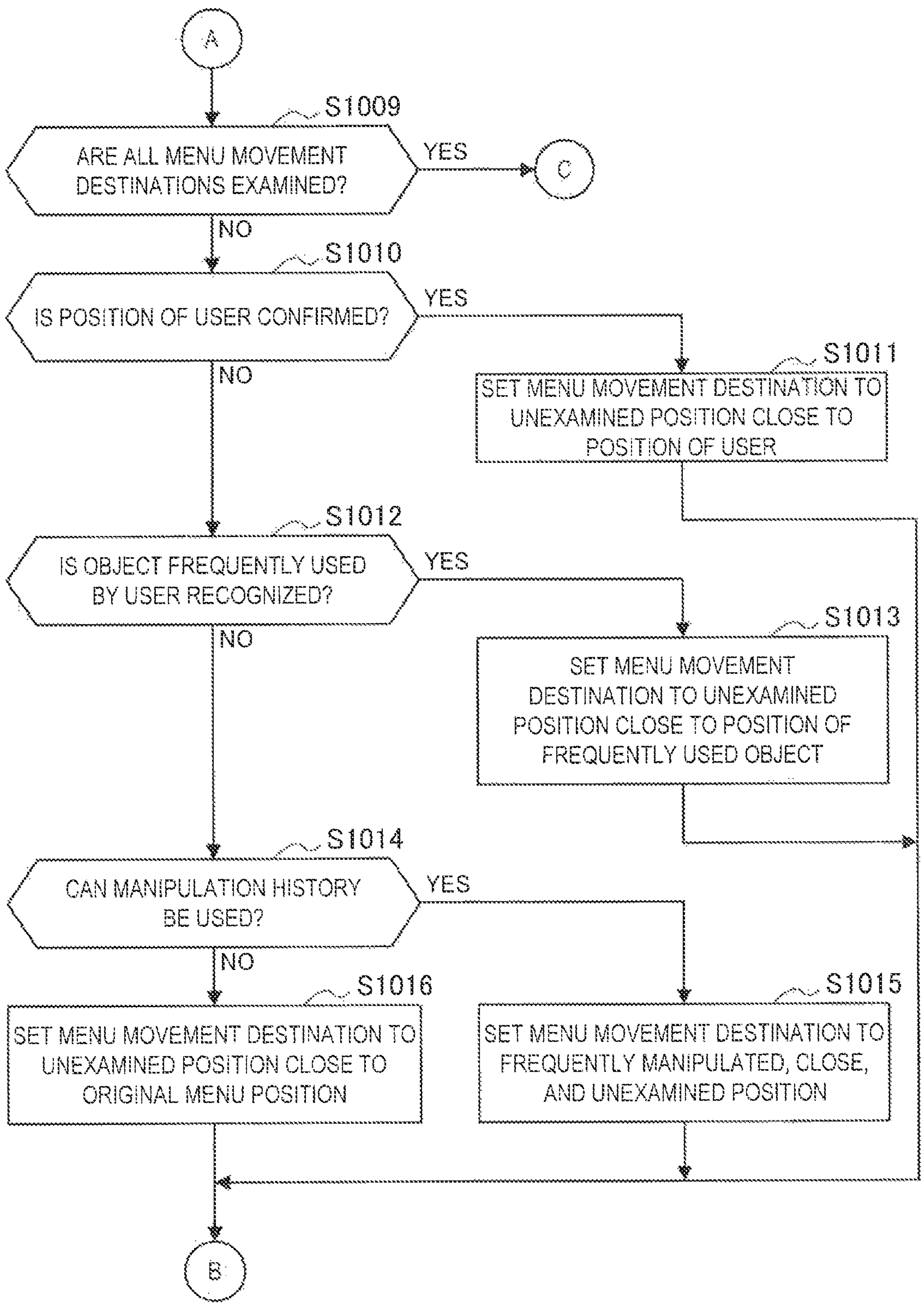
FIG. 15 is a flowchart illustrating an example of an operation of the information processing system 100 according to an embodiment of the present disclosure.
Figure 16:
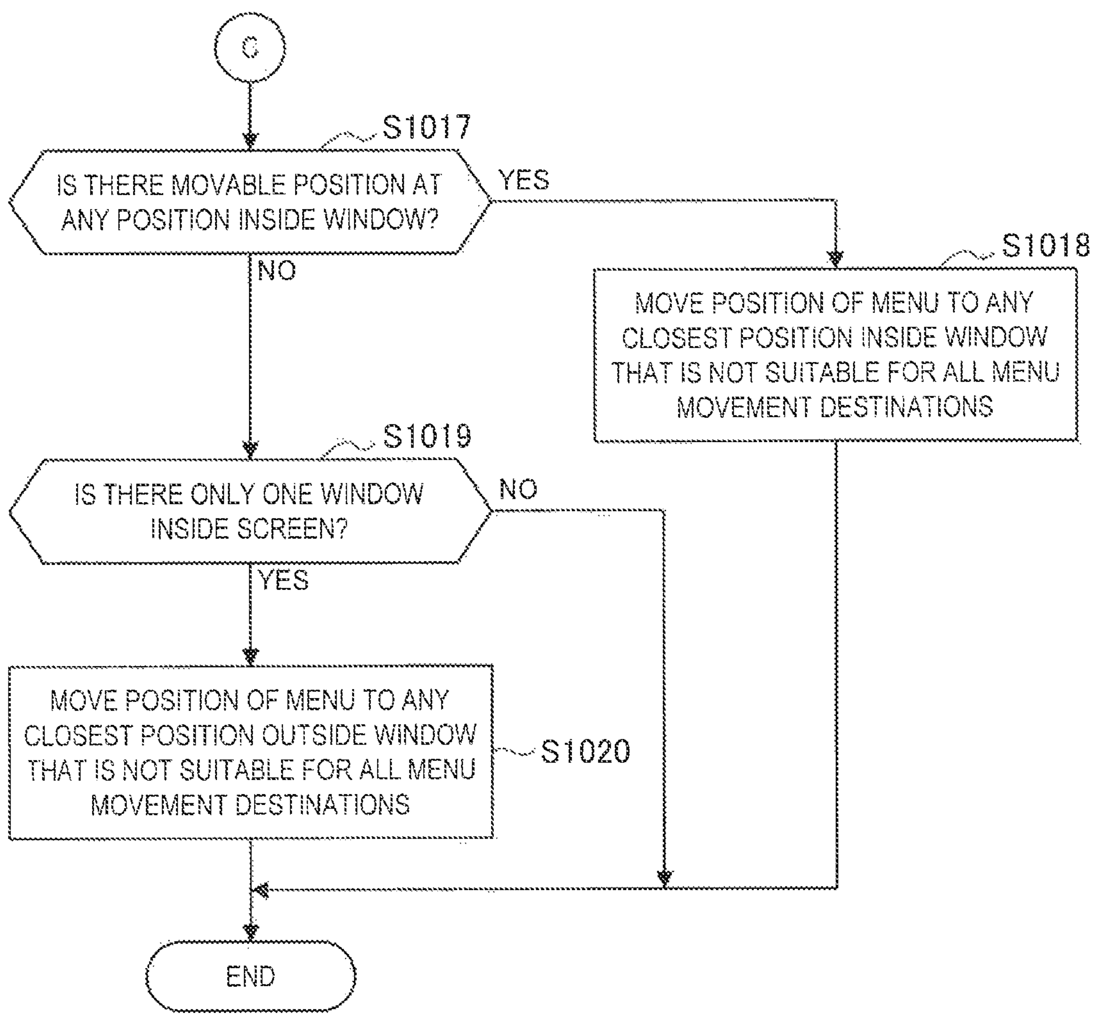
FIG. 16 is a flowchart illustrating an example of an operation of the information processing system 100 according to an embodiment of the present disclosure.

FIGS. 14 to 16 are flowcharts illustrating an example of an operation of the information processing system 100 according to an embodiment of the present disclosure. FIGS. 14 to 16 illustrate an example of an operation of the information processing system 100 when the information processing system 100 detects the position of another window or a state of the information display surface and controls the position of a menu based on the detection result. Hereinafter, the example of the operation of the information processing system 100 according to the embodiment of the present disclosure will be described with reference to FIGS. 14 to 16.

When the user of the information processing system 100 executes a predetermined manipulation to display a menu, the information processing system 100 sets a menu movement destination at which the menu is displayed to a current menu position (step S1001). The process of step S1001 is executed by, for example, the output control unit 122. Subsequently, the information processing system 100 determines whether the state of a window displayed according to the manipulation executed by the user is related to the menu position (step S1002). This determination is executed by, for example, the detection unit 121. Specifically, in step S1002, the information processing system 100 determines whether the window is maximized. When the window is maximized, the information processing system 100 determines that the state of the window is related to the menu position. The fact that the window is maximized means that the window is displayed in a maximum range which can be displayed by the output unit 130.

When it is determined in step S1002 that the state of the window displayed according to a manipulation executed by the user is related to the menu position (Yes in step S1002), that is, the window is maximized, the information processing system 100 subsequently executes a process of applying an offset to the menu position set in step S1001 according to the state of the window (step S1003). That is, the information processing system 100 assigns the offset to the menu position set in step S1001 so that the menu position comes near the inside of the window by a predetermined amount. The process of step S1003 is executed by, for example, the output control unit 122.

Figure 17:
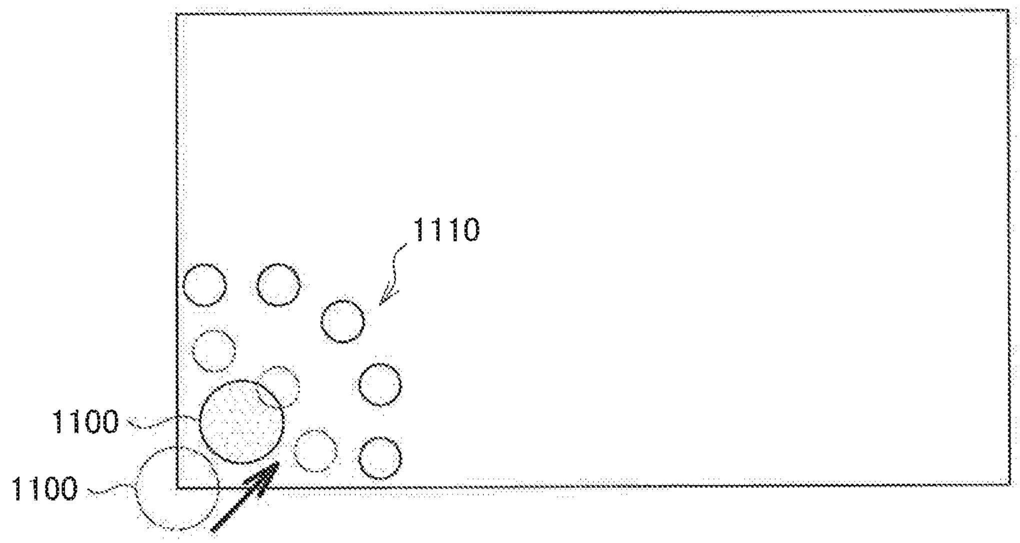
FIG. 17 is an explanatory diagram illustrating an example of a GUI of an application.

FIG. 17 is an explanatory diagram illustrating an example of a GUI of an application displayed on the information display surface by the information processing system 100 according to an embodiment of the present disclosure and illustrates a state in which a window of the application displayed by the information processing system 100 is maximized. Specifically, since the window is in a maximized state, the process of moving the position of the menu button 1100 to the inside of the window by a predetermined amount is executed in step S1003 by the information processing system 100, as illustrated in FIG. 17. Conversely, when it is determined in step S1002 that the state of the window displayed according to a manipulation executed by the user is not related to the menu position (No in step S1002), that is, the window is not maximized, the information processing system 100 skips the process of step S1003.

Subsequently, the information processing system 100 determines whether the menu movement destination set in step S1001 is inside a screen, that is, inside a screen which can be displayed by the output unit 130 (step S1004). This determination is executed by, for example, the detection unit 121.

Figure 18:
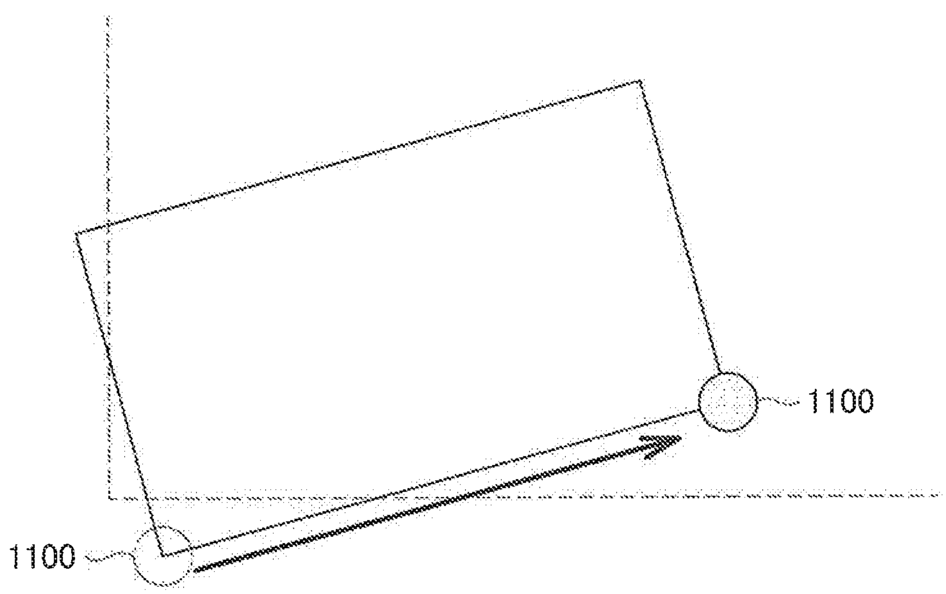
FIG. 18 is an explanatory diagram illustrating an example of a GUI of an application.

FIG. 18 is an explanatory diagram illustrating an example of a GUI of an application displayed on the information display surface by the information processing system 100 according to an embodiment of the present disclosure and is an explanatory diagram illustrating whether a menu is inside a screen. In FIG. 18, a circle indicated by a broken line is an example of the menu movement destination when the menu movement destination of the menu button 1100 is outside the screen, that is, outside the screen which can be displayed by the output unit 130. A circle indicated by a solid line is an example of the menu movement destination when the menu movement destination of the menu button 1100 is inside the screen, that is, inside the screen which can be displayed by the output unit 130.

When the menu movement destination set in step S1001 is inside the screen (Yes in step S1004), the information processing system 100 subsequently determines whether the menu movement destination set in step S1001 is covered with another window displayed by the information processing system 100 (step S1005). This determination is executed by, for example, the detection unit 121.

Figure 19:
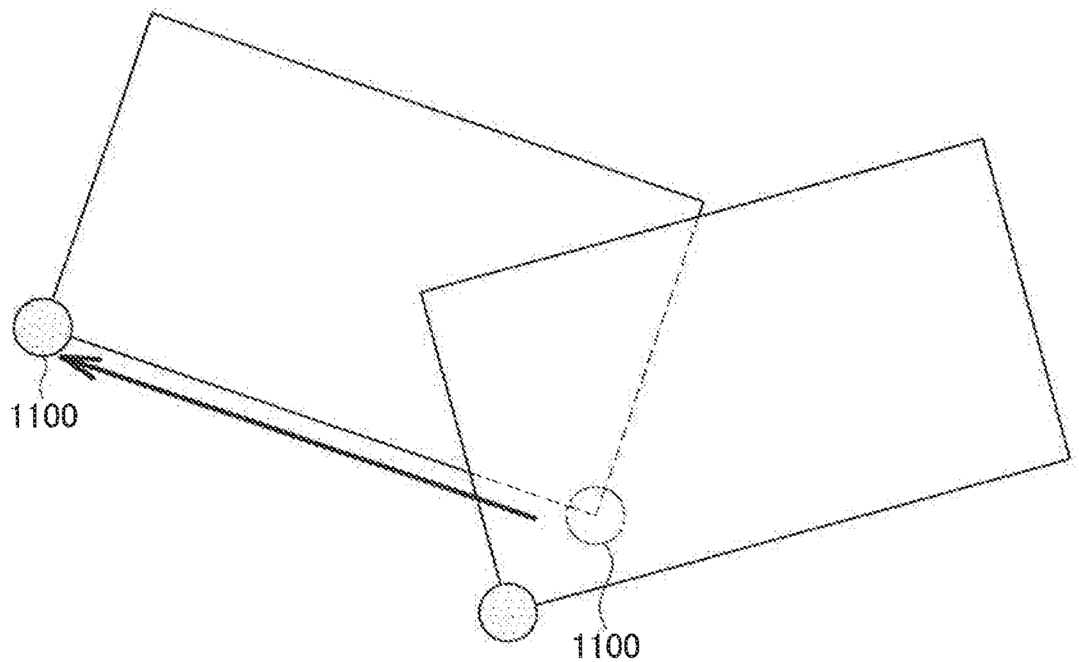
FIG. 19 is an explanatory diagram illustrating an example of a GUI of an application.

FIG. 19 is an explanatory diagram illustrating an example of a GUI of an application displayed on the information display surface by the information processing system 100 according to an embodiment of the present disclosure and is an explanatory diagram illustrating whether a menu button 1100 is covered with another window displayed by the information processing system 100. In FIG. 19, a circle indicated by a broken line is an example of the menu movement destination when the menu button 1100 is covered with the other window. A circle indicated by a solid line is an example of the menu movement destination when the menu button 1100 is not covered with the other window.

When the menu movement destination set in step S1001 is not covered with the other window displayed by the information processing system 100 (Yes in step S1005), the information processing system 100 subsequently determines whether the menu movement destination set in step S1001 is located at a proper position according to the position of the user or a manipulation direction of the user (step S1006). Specifically, the information processing system 100 determines whether the menu movement destination set in step S1001 is located at the proper position according to the position of the user or the manipulation direction of the user by comparing the menu movement destination set in step S1001 with the position of the user or the manipulation direction of the user. This determination is executed by, for example, the detection unit 121.

Figure 20:
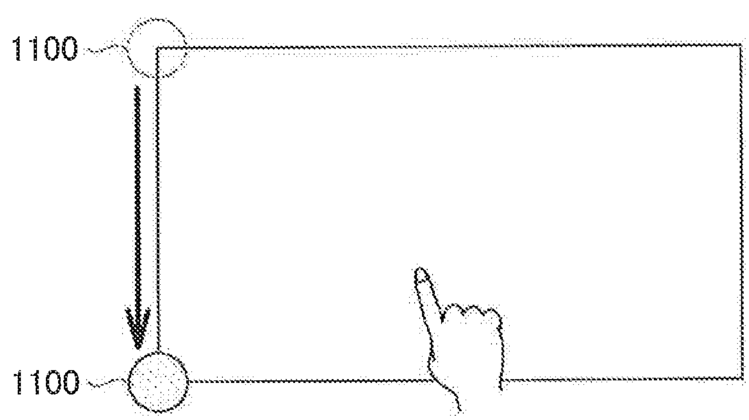
FIG. 20 is an explanatory diagram illustrating an example of a GUI of an application.

FIG. 20 is an explanatory diagram illustrating an example of a GUI of an application displayed on the information display surface by the information processing system 100 according to an embodiment of the present disclosure and is an explanatory diagram illustrating whether the menu movement destination set in step S1001 is located at a proper position according to the position of the user or the manipulation direction of the user. In FIG. 20, a circle indicated by a broken line is an example of a case in which the movement destination of the menu button 1100 is not located at the proper position according to the position of the user or the manipulation direction (a direction from the lower side to the upper side of a screen) of the user since the movement destination of the menu button 1100 is away from the position of the user. A circle indicated by a solid line is an example of a case in which the movement destination of the menu button 1100 is located at the proper position according to the position of the user or the manipulation direction (a direction from the lower side to the upper side of the screen) of the user since the movement destination of the menu button 1100 is close to the position of the user.

When it is determined in step S1006 that the menu movement destination set in step S1001 is located at the proper position according to the position of the user or the manipulation direction of the user (Yes in step S1006), the information processing system 100 subsequently determines whether the menu movement destination set in step S1001 interferes with an object placed on the information display surface displayed by the information processing system 100 (step S1007). This determination is executed by, for example, the detection unit 121. An example of the information display surface displayed by the information processing system 100 includes the top surface of the table 140*a* illustrated in FIG. 1. The fact that the menu movement destination interferes with the object means that the menu movement destination overlaps at least a part of the object.

Figure 21:
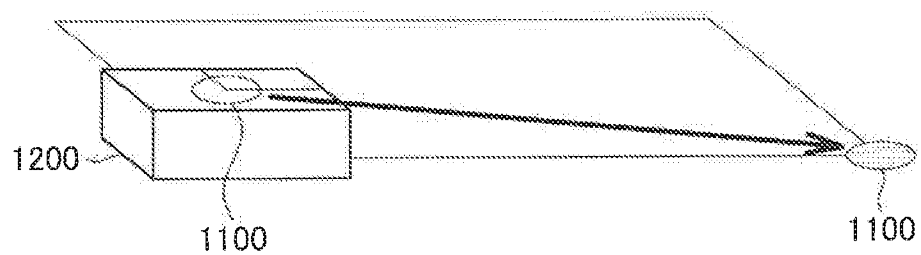
FIG. 21 is an explanatory diagram illustrating an example of a GUI of an application.

FIG. 21 is an explanatory diagram illustrating an example of a GUI of an application displayed on the information display surface by the information processing system 100 according to an embodiment of the present disclosure and is an explanatory diagram illustrating whether the movement destination of the menu button 1100 set in step S1001 interferes with the object 1200 placed on the information display surface. In FIG. 21, a circle indicated by a broken line is an example of a case in which the movement destination of the menu button 1100 interferes with the object 1200 placed on the information display surface. A circle indicated by a solid line is an example of a case in which the movement destination of the menu button 1100 does not interfere with the object 1200 placed on the information display surface. The detection unit 121 may determine that the movement destination of the menu button 1100 uniformly interferes with the object 1200 when the movement destination of the menu button 1100 overlaps the object 1200 placed on the information display surface as in the circle indicated by the broken line. The detection unit 121 may determine that the menu movement destination does not interfere with the object placed on the information display surface when the movement destination of the menu button 1100 overlaps the object 1200 placed on the information display surface and the movement destination of the menu button 1100 is located on the flat surface of the object 1200.

When the menu movement destination set in step S1001 does not interfere with the object placed on the information display surface (Yes in step S1007), the information processing system 100 moves a menu called by the user to the menu movement destination set in step S1001 (step S1008). The process of step S1008 is executed by, for example, the output control unit 122.

Conversely, when at least one of the conditions is not satisfied in the determination of the foregoing steps S1004 to S1007 (No in steps S1004 to S1007), the information processing system 100 subsequently determines whether all of the menu movement destinations are examined (step S1009). The determination of whether all of the menu movement destinations are examined is executed by, for example, the detection unit 121.

When it is determined in the foregoing step S1009 that not all of the menu movement destinations are examined (No in step S1009), the information processing system 100 executes the determinations of the foregoing steps S1004 to S1007 on other movement destinations. First, the information processing system 100 determines whether the position of the user is confirmed (step S1010). The determination of whether the position of the user is confirmed is executed by, for example, the detection unit 121. Specifically, in step S1010, it is determined whether the position of the user is confirmed through, for example, recognition of the body, face, head, or the like of the user by a camera or recognition of the direction of a sound by a microphone.

When it is determined in the foregoing step S1010 that the position of the user is confirmed (Yes in step S1010), the information processing system 100 subsequently sets the menu movement destination to an unexamined position closest to the position of the user (step S1011). The process of step S1011 is executed by, for example, the output control unit 122. When the menu movement destination is set to the unexamined position closest to the position of the user, the information processing system 100 subsequently executes the determinations of the foregoing steps S1004 to S1007 again. When the menu has the button format illustrated in FIG. 7, the menu movement destination is set to the unexamined position closest to the position of the user among the four corners of the window. When the menu has the bar format illustrated in FIG. 8, the menu movement destination is set to the unexamined position closest to the position of the user among the four sides of the window.

Figure 22:
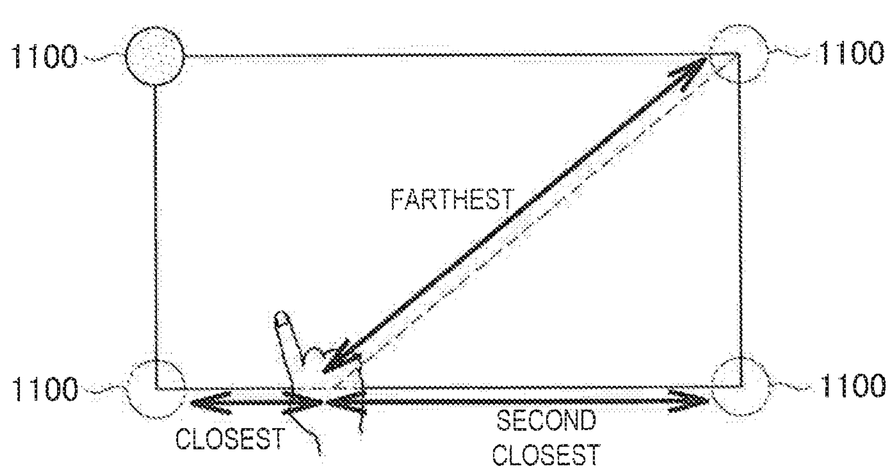
FIG. 22 is an explanatory diagram illustrating an example of a GUI of an application.

FIG. 22 is an explanatory diagram illustrating an example of a GUI of an application displayed on the information display surface by the information processing system 100 according to an embodiment of the present disclosure. In FIG. 22, a circle indicated by a solid line is an example of a movement destination (initial menu position) of the menu button 1100 set in the process of step S1001 and circles indicated by broken lines are examples of movement destination candidates of the menu button 1100. In the example illustrated in FIG. 22, the corner closest to the position of the user is the lower left corner of the window, the second closest corner is the lower right corner of the window, and the third closest corner (excluding the initial menu position) is the upper right corner of the window. Accordingly, in the example illustrated in FIG. 22, the information processing system 100 first sets the movement destination of the menu button 1100 to the lower left corner of the window closest to the position of the user as the unexamined position closest to the position of the user.

Conversely, when it is determined in the foregoing step S1010 that the position of the user is not confirmed (No in step S1010), the information processing system 100 subsequently determines whether an object frequently used by the user is recognized on the information display surface (step S1012). The recognition of the object frequently used by the user on the information display surface is executed by, for example, the detection unit 121. The object frequently used by the user may be any object such as a mobile phone, a smartphone, a tablet terminal, a key, a book, a newspaper, a magazine, tableware, or a toy. The information processing system 100 may determine whether there is an object frequently used by the user by recognizing an object placed on the information display surface and comparing the object recognized in advance to the object placed on the information display surface at a time point at which the menu is to be displayed.

The information processing system 100 can store a history of objects placed on the information display surface by maintaining information acquired by the input unit 110. It is needless to say that the history of the objects placed on the information display surface may be stored in another device connected to the information processing system 100 via a network or the like.

In the determination of whether an object placed on the information display surface is the object frequently used by the user, the information processing system 100 may determine, for example, whether the object is placed on the information display surface with more than a predetermined frequency or may determine, for example, whether the object is an object registered as the object frequently used by the user.

When it is determined in the foregoing step S1012 that the object frequently used by the user is recognized on the information display surface (Yes in step S1012), the information processing system 100 subsequently sets the menu movement destination to the position which is the closest to the position of the object frequently used by the user and is not examined (step S1013). The process of step S1013 is executed by, for example, the output control unit 122.

Figure 23:
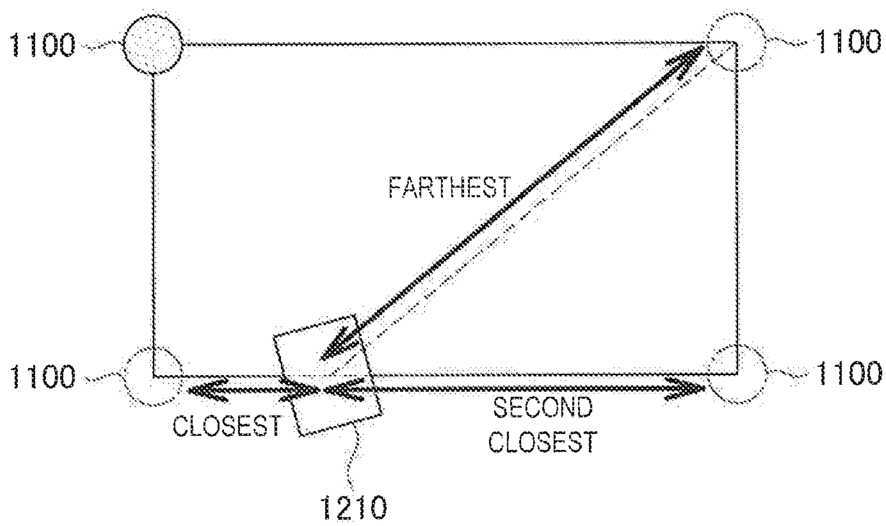
FIG. 23 is an explanatory diagram illustrating an example of a GUI of an application.

FIG. 23 is an explanatory diagram illustrating an example of a GUI of an application displayed on the information display surface by the information processing system 100 according to an embodiment of the present disclosure. In FIG. 23, a circle indicated by a solid line is an example of a movement destination (initial menu position) of the menu button 1100 set in the process of step S1001 and circles indicated by broken lines are examples of movement destination candidates of the menu button 1100. In the example illustrated in FIG. 23, the corner closest to the position of the object frequently used by the user is the lower left corner of the window, the second closest corner is the lower right corner of the window, and the third closest corner (excluding the initial menu position) is the upper right corner of the window. Accordingly, in the example illustrated in FIG. 23, the information processing system 100 first sets the movement destination of the menu button 1100 to the lower left corner of the window closest to the position of the object frequently used by the user as the unexamined position closest to the position of the object frequently used by the user.

Conversely, when it is determined in the foregoing step S1012 that the object frequently used by the user is not recognized on the information display surface (No in step S1012), the information processing system 100 subsequently determines whether the menu movement destination can be decided using a manipulation history of the user (step S1014). Whether the menu movement destination can be decided using the manipulation history of the user is determined by, for example, the detection unit 121. The information processing system 100 can store the manipulation history of the user by maintaining information regarding user manipulations acquired by the input unit 110. It is needless to say that the manipulation history of the user may be stored in another device connected to the information processing system 100 via a network or the like.

When it is determined in the foregoing step S1014 that the menu movement destination can be decided using the manipulation history of the user (Yes in step S1014), the information processing system 100 subsequently sets the menu movement destination to an unexamined position which is frequently manipulated by the user (step S1015). The process of step S1015 is executed by, for example, the output control unit 122.

Figure 24:
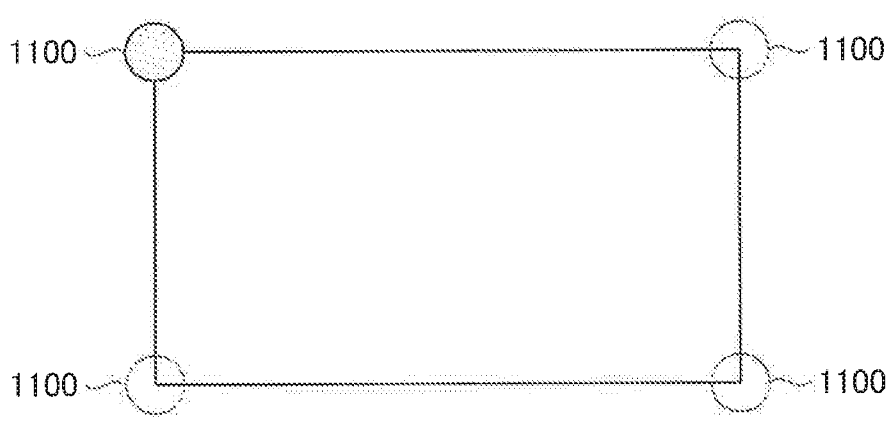
FIG. 24 is an explanatory diagram illustrating an example of a GUI of an application.

FIG. 24 is an explanatory diagram illustrating an example of a GUI of an application displayed on the information display surface by the information processing system 100 according to an embodiment of the present disclosure. In FIG. 24, a circle indicated by a solid line is an example of the movement destination (initial menu position) of the menu button 1100 set in the process of step S1001. Circles indicated by broken lines are examples of candidates of the movement destination of the menu button 1100. In the example illustrated in FIG. 24, a position most frequently manipulated by the user is the lower right corner of the window, a position second most frequently manipulated by the user is the lower left corner of the window, and a position third most frequently manipulated by the user (excluding the initial menu position) is the upper right corner of the window. Accordingly, in the example illustrated in FIG. 24, the information processing system 100 first sets the movement destination of the menu button 1100 to the lower right corner of the window as the unexamined position most frequently manipulated by the user.

Conversely, when it is determined in the foregoing step S1014 that the menu movement destination can be decided using the manipulation history of the user (No in step S1014), the information processing system 100 subsequently sets the menu movement destination to the unexamined position closest to the original menu position (step S1016). The process of step S1016 is executed by, for example, the output control unit 122.

Figure 25:
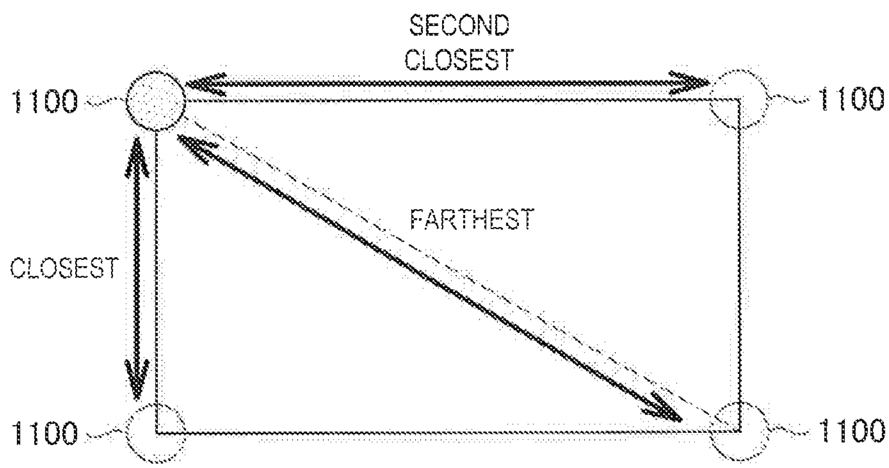
FIG. 25 is an explanatory diagram illustrating an example of a GUI of an application.

FIG. 25 is an explanatory diagram illustrating an example of a GUI of an application displayed on the information display surface by the information processing system 100 according to an embodiment of the present disclosure. In FIG. 25, a circle indicated by a solid line is an example of the movement destination (initial menu position) of the menu button 1100 set in the process of step S1001. Circles indicated by broken lines are examples of candidates of the menu movement destination. In the example illustrated in FIG. 25, a corner closest to the initial menu position is the lower left corner of the window, a second closest corner is the upper left corner of the window, and a third closest corner is a lower right corner of the window. Accordingly, in the example illustrated in FIG. 25, the information processing system 100 first sets the movement destination of the menu button 1100 to the lower right corner of the window as the unexamined position closest to the original menu position.

When it is determined in the foregoing step S1009 that all of the menu movement destinations are examined (Yes in step S1009), the information processing system 100 subsequently determines whether there is a position to which the menu can be moved at any position inside the window displayed by the information processing system 100 (step S1017). The process of step S1017 is executed by, for example, the detection unit 121.

When it is determined in the foregoing step S1017 that there is a position to which the menu can be moved at any position inside the window (Yes in step S1017), the information processing system 100 sets the menu movement destination to any position which is not suitable for the above-described processes that is closest to the initial position and inside the window displayed on the screen (step S1018). The process of step S1018 is executed by, for example, the output control unit 122.

Figure 26:
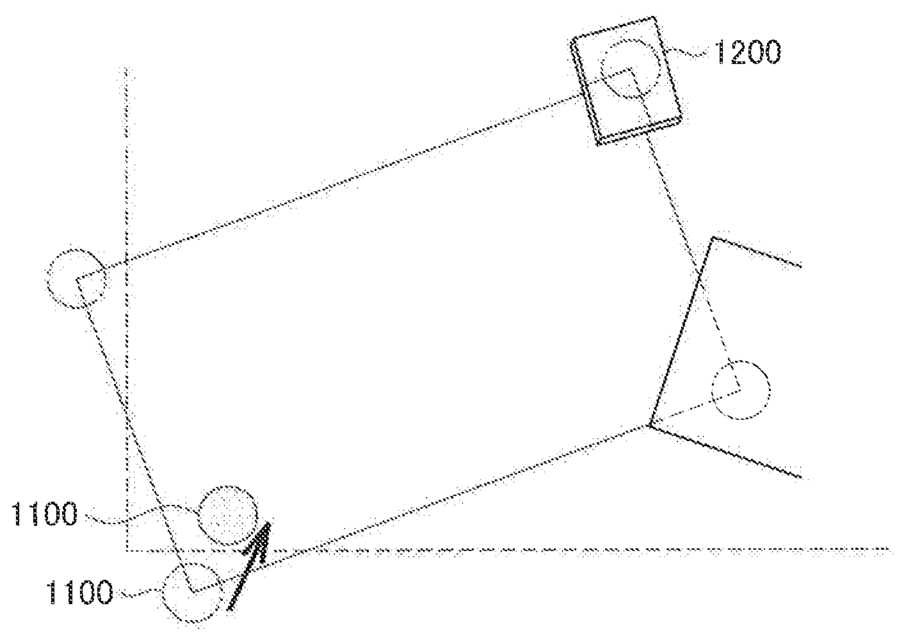
FIG. 26 is an explanatory diagram illustrating an example of a GUI of an application.

FIG. 26 is an explanatory diagram illustrating an example of a GUI of an application displayed on the information display surface by the information processing system 100 according to an embodiment of the present disclosure. FIG. 26 illustrates a setting example of the movement destination of the menu button 1100 when none of the four corners of the window is suitable for the menu movement destination. That is, FIG. 26 illustrates a state in which the upper left corner and the lower left corner of the window protrude outside the screen, the upper right corner interferes with an object placed on the information display surface, and the lower right corner is covered with another window. In this case, the information processing system 100 decides a certain position closest to the initial position (the lower left corner of the window in the example of FIG. 26) inside the window displayed on the screen as the movement destination of the menu button 1100 and sets the movement destination of the menu button 1100 to this position.

Conversely, when it is determined in the foregoing step S1017 that there is no position to which the menu can be moved at any position inside the window (No in step S1017), the information processing system 100 subsequently determines that there is only one window inside the screen (step S1019). The process of step S1019 is executed by, for example, the detection unit 121.

When it is determined in the foregoing step S1019 that there is only one window inside the screen (Yes in step S1019), the information processing system 100 sets the menu movement destination to any position which is not suitable for the above-described processes that is closest to the initial position and is outside the window displayed on the screen since there is no concern of confusion with a menu of another window (step S1020). The process of step S1020 is executed by, for example, the output control unit 122. Conversely, when it is determined in the foregoing step S1019 that there are a plurality of windows inside the screen, the information processing system 100 directly ends the process without changing the menu movement destination.

Figure 27:
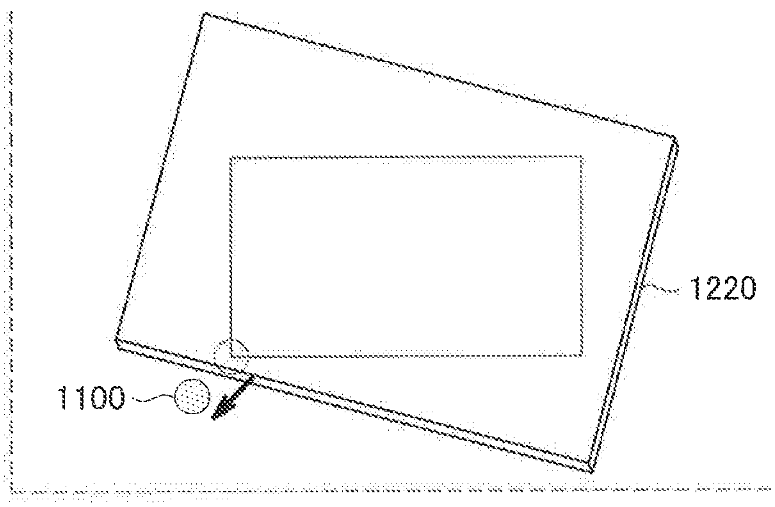
FIG. 27 is an explanatory diagram illustrating an example of a GUI of an application.

FIG. 27 is an explanatory diagram illustrating an example of a GUI of an application displayed on the information display surface by the information processing system 100 according to an embodiment of the present disclosure. FIG. 27 illustrates a setting example of the movement destination of the menu button 1100 when only one window is displayed on the screen and the entire window displayed by the information processing system 100 is put on an object 1220. When there is no position to which the menu can be moved at any position inside the window displayed by the information processing system 100 and only one window is displayed on the screen by the information processing system 100, the information processing system 100 decides a certain position closest to the initial position (the lower left corner of the window in the example of FIG. 27) outside the window displayed on the screen as the movement destination of the menu button 1100 and sets the movement destination of the menu button 1100 to this position.

Figure 28:
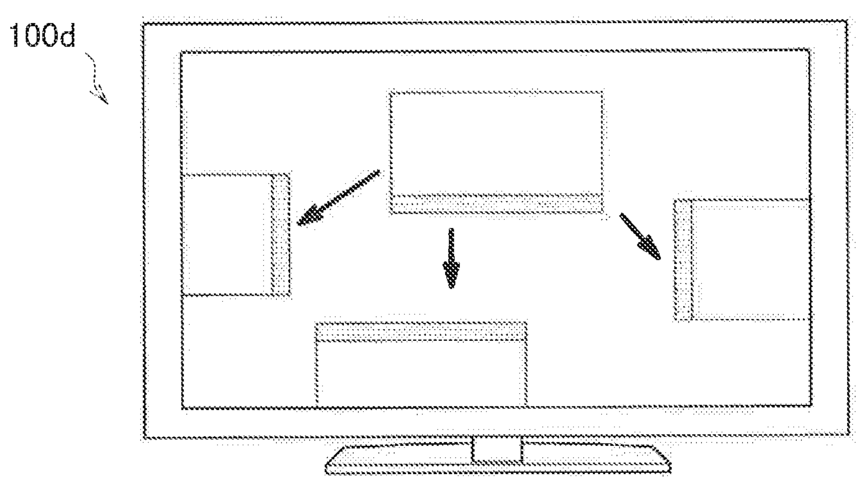
FIG. 28 is an explanatory diagram illustrating a menu display control example in an information processing system 100*d*.

By executing the above-described series of processes, the information processing system 100 can execute control such that the position of the menu is moved to a proper position in addition to the form of FIG. 6. FIG. 28 is an explanatory diagram illustrating a menu display control example in the information processing system 100*d* in which a screen is perpendicular to the ground. FIG. 28 illustrates a state in which four windows are displayed on the screen and the windows are displayed so that menu bars subordinate to all the windows do not overlap each other in both of the windows by executing the above-described series of processes.

Figure 29:
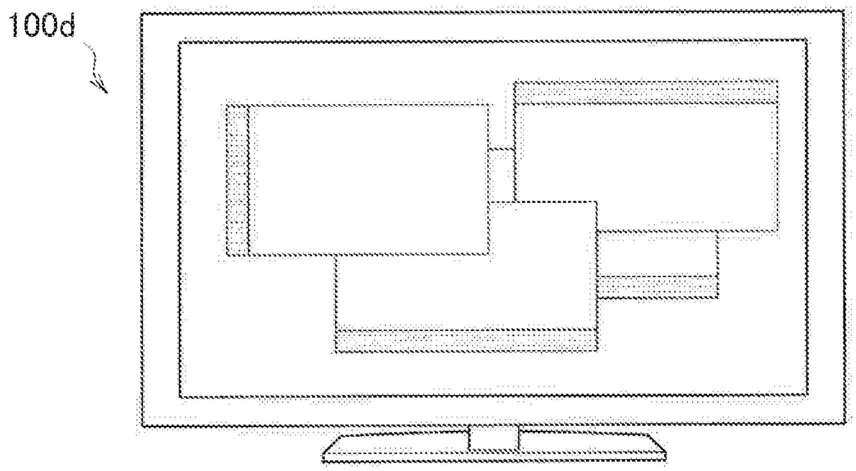
FIG. 29 is an explanatory diagram illustrating a menu display control example in an information processing system 100*d*.

FIG. 29 is an explanatory diagram illustrating a menu display control example in the information processing system 100*d* in which a screen is perpendicular to the ground, as in FIG. 28. FIG. 29 illustrates a state in which four windows are displayed on the screen and the windows are displayed so that menu bars subordinate to the windows do not overlap each other in both of the windows by the above-described series of processes.

Figure 30:
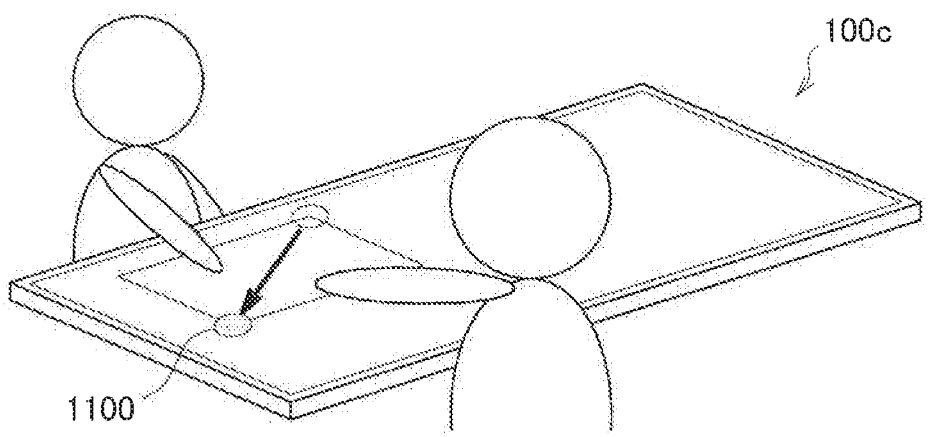
FIG. 30 is an explanatory diagram illustrating a menu display control example in an information processing system 100*c*.

FIG. 30 is an explanatory diagram illustrating a menu display control example in the information processing system 100*c* in which a display is placed on a table for a manipulation. FIG. 30 illustrates an example in which display control is executed such that the menu button 1100 is automatically moved to a position close to a user (assumed to be user Y) facing a certain user (assumed to be user X) so that user Y can easily manipulate the menu button 1100 when user Y stretches out his or her hand to manipulate a window manipulated by user X. When a camera, a microphone, or another sensor device capable of detecting the position of a user is provided in the information processing system 100*c*, the information processing system 100*c* can detect the position in which the user is located with respect to a screen and a direction in which the user executes a manipulation. Accordingly, by executing the above-described series of processes, the information processing system 100*c* can execute display control such that the menu button 1100 is automatically moved to a position close to user Y so that user Y can easily manipulate the menu button 1100.

Figure 31:
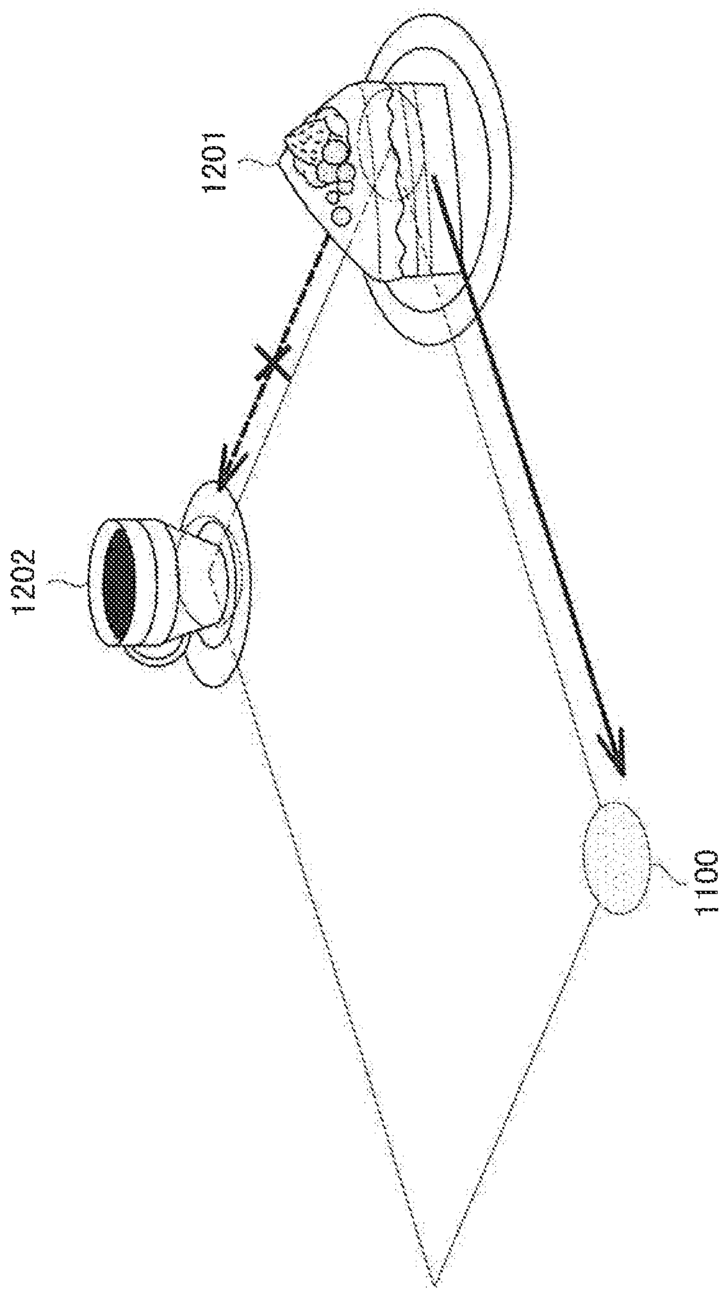
FIG. 31 is an explanatory diagram illustrating a menu display control example in an information processing system 100*a*.

FIG. 31 is an explanatory diagram illustrating a menu display control example in the information processing system 100*a* which projects a menu or a window to a table and allows the projected menu or window to be manipulated. FIG. 31 exemplifies a case in which the information processing system 100*a* is used on a dining table. In a location such as a dining table on which objects are likely to be placed, a case in which a menu is projected to a real object is likely to increase. Thus, a case in which a user does not directly touch a menu or a case in which a psychological burden on a user touching a menu is large easily occurs. For example, FIG. 31 illustrates a state in which a piece of cake 1201 or a cup of coffee 1202 is placed on a surface on which information is displayed by the information processing system 100*a*.

When the user moves a real object on the dining table to which a menu is projected to a location to which the menu is not projected, the user can manipulate the projected menu. When the user executes a manipulation of moving the projected window to a position at which the menu is not projected to a real object, the user can manipulate the projected menu. However, when the user is forced to execute such a manipulation, a burden on the user is large.

Accordingly, by executing the above-described series of processes, the information processing system 100*a* automatically changes the display position of the menu button 1100 so that the display position does not overlap the position of a real object (the piece of cake 1201 or the cup of coffee 1202) on the dining table, as in FIG. 31. The information processing system 100*a* can reduce the manipulation burden on the user by automatically changing the display position of the menu button 1100 so that the display position does not overlap the position of the real object on the dining table.

By executing the above-described series of processes, the information processing system 100 according to the embodiment of the present disclosure can detect the position of another window or the state of the information display surface, for example, the state of an object placed on the table 140*a* illustrated in FIG. 1, and can execute control such that the position of the menu is moved to a proper position based on the detection result.

The information processing system 100 according to the embodiment of the present disclosure executes the above-described series of processes so that the user can manipulate the menu without necessarily executing a step of moving the position of the window or moving the real object placed on the information display surface. Accordingly, the information processing system 100 according to the embodiment of the present disclosure executes the above-described series of processes, and thus the number of steps and a time until the user executes an intended manipulation are reduced.

The information processing system 100 according to the embodiment of the present disclosure executes the above-described series of processes, and thus it is possible to reduce effort in the user manipulation on a window pushed outside the screen in a GUI in which there is a possibility of the window frequently moving outside the screen and which includes the window which can be omnidirectionally manipulated. Since the effort of the user manipulation on the window pushed outside the screen is reduced, the information processing system 100 according to the embodiment of the present disclosure enables the user to use the screen broadly.

Even when a plurality of windows are displayed on a screen by the users, the information processing system 100 according to the embodiment of the present disclosure controls the display position of the menu such that the menu can be viewed normally, and thus it is possible to obtain the advantage that the user can easily specify an intended application.

In the case of a form in which the information processing system 100 according to the embodiment of the present disclosure projects a screen, as illustrated in FIG. 1, a manipulation is not hindered due to a real object. Accordingly, it is possible to obtain the advantage that the information processing system 100 according to the embodiment of the present disclosure can reduce a burden on the user who is caused to move the position of a real object or move the position of a window and is caused not to place a real object in a projected location for a manipulation.

For example, when a form in which the information processing system 100 according to the embodiment of the present disclosure projects information to a table and causes a user to manipulate the information is adopted, as illustrated in FIG. 1, the information processing system 100 can be linked to a portable terminal such as a smartphone on the table. For example, when a user places a portable terminal such as a smartphone on a table and causes the input unit 110 to recognize the portable terminal, the information processing system 100 according to the embodiment of the present disclosure can identify the portable terminal to be linked to the identified portable terminal.

However, when a plurality of users own substantially portable terminals that are substantially the same, place the portable terminals on a table simultaneously and individually, and cause the information processing system 100 to recognize the portable terminals, the information processing system 100 may not be able to determine which portable terminal it is better to link to the information processing system 100.

Accordingly, in an embodiment of the present disclosure, the information processing system 100 capable of easily specifying a portable terminal to be linked even when a plurality of users own portable terminals that are substantially the same and place the portable terminals on a table simultaneously and individually will be described.

In the information processing system 100 according to the embodiment of the present disclosure, the detection unit 121 identifies a portable terminal to be linked using an image recognition technology and detects the position and posture of the identified portable terminal and a distance from the input unit 110. Accordingly, the information processing system 100 according to the embodiment of the present disclosure has feature amount data necessary to identify the portable terminals. The portable terminals to be recognized in the information processing system 100 have image data discovered in the information processing system 100.

In linking of the information processing system 100 and the portable terminals, the following techniques are considered. For example, there is a method in which the owner of each portable terminal selects a preference image and the information processing system 100 is caused to recognize this image in advance. After the image is recognized, the owner of the portable terminal causes his or her portable terminal to display the image recognized in advance and causes the information processing system 100 to recognize the image. In this way, the information processing system 100 and the portable terminal can be linked.

There is a method in which the owner of the portable terminal installs a recognition-dedicated application including image data to be recognized in the information processing system 100 in advance in the portable terminal. When the information processing system 100 has feature amount data of the image data included in the related application in advance, it is possible to suppress a detection process burden on the information processing system 100.

There is a method in which the information processing system 100 is caused to recognize a screen, such as a lock screen or a home screen, generated by a system of the portable terminal as a recognition target image. When the information processing system 100 is caused to recognize the screen generated by the system of the portable terminal, the screen may be recognized through a dedicated application or the user may capture a screen by himself or herself and may cause the information processing system 100 to recognize the captured image.

Figure 32:
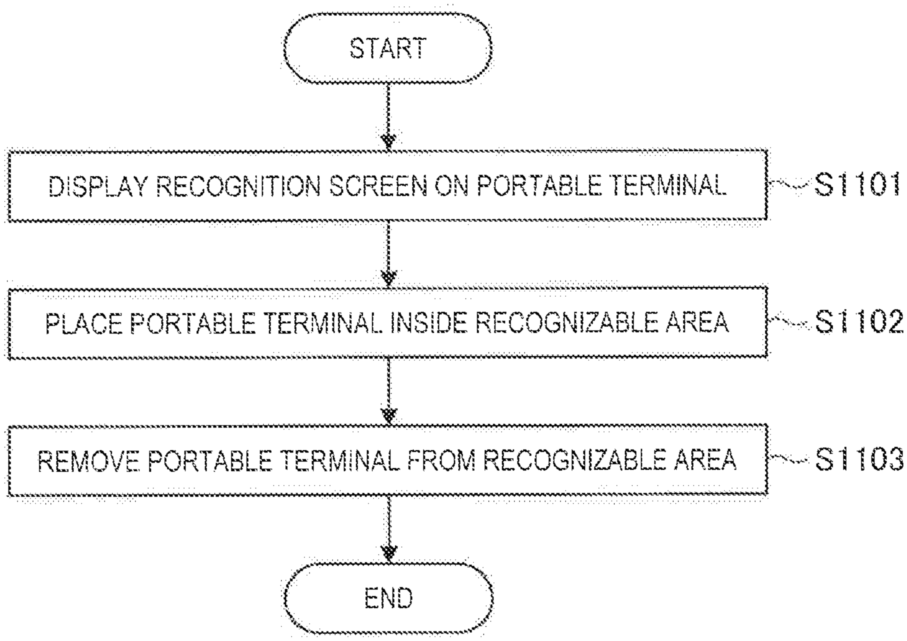
FIG. 32 is a flowchart illustrating an example of an operation of a portable terminal linked to the information processing system 100 according to an embodiment of the present disclosure.
Figure 33:
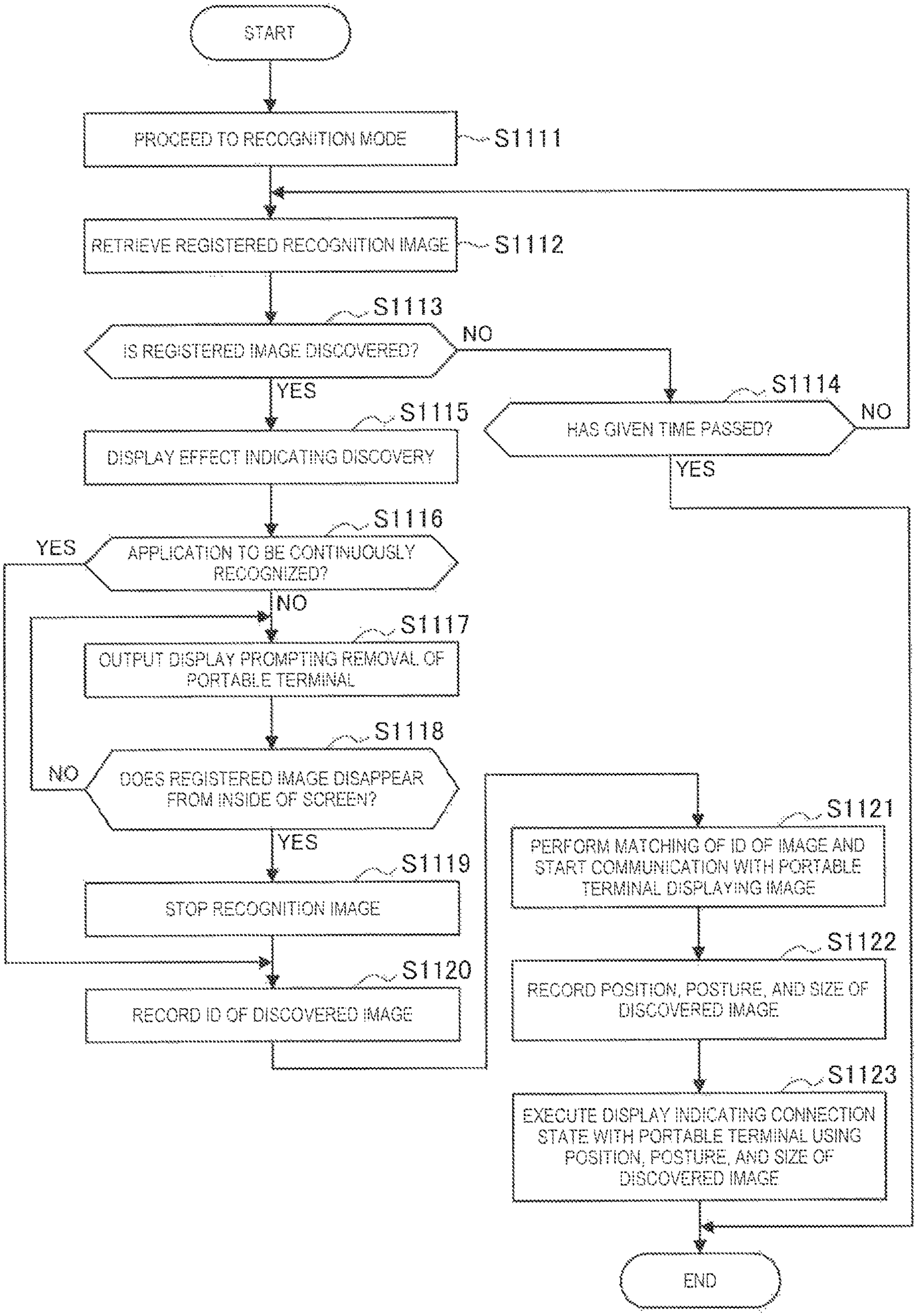
FIG. 33 is a flowchart illustrating an example of an operation of the information processing system 100 according to an embodiment of the present disclosure.

FIGS. 32 and 33 are flowcharts illustrating examples of operations of the information processing system 100 according to an embodiment of the present disclosure and a portable terminal linked to the information processing system 100. FIG. 32 illustrates the example of the operation of the portable terminal linked to the information processing system 100 and FIG. 33 illustrates the example of the operation of the information processing system 100. Before the operations illustrated in FIGS. 32 and 33 are executed, the portable terminal is assumed to register any image in the information processing system 100 in advance. Hereinafter, the examples of the operations of the information processing system 100 according to the embodiment of the present disclosure and the portable terminal linked to the information processing system 100 will be described with reference to FIGS. 32 and 33.

The portable terminal linked to the information processing system 100 displays a recognition screen for causing the information processing system 100 to recognize the portable terminal according to a predetermined manipulation from the user (step S1101). The information processing system 100 causes a mode to proceed to a mode of recognizing the portable terminal according to a predetermined manipulation from the user (hereinafter also referred to as a "recognition mode") (step S1111).

The user places the portable terminal displaying the recognition screen for causing the information processing system 100 to recognize the portable terminal in the foregoing step S1101 inside a recognizable area for causing the information processing system 100 to recognize the portable terminal (step S1102). As the recognizable area, any region can be set by the information processing system 100. For example, in the case of a system projecting information to a table, the entire area to which the information is projected to the table may be the recognizable area or a predetermined partial region may be the recognizable area. When the predetermined partial region is set as the recognizable area, the information processing system 100 may output display as if the information processing system 100 understands the recognizable area from the output unit 130.

When the mode proceeds to the recognition mode in the foregoing step S111, the information processing system 100 subsequently retrieves a recognition image registered in the information processing system 100 (step S1112). The process of retrieving the recognition image is executed by, for example, the detection unit 121. The information processing system 100 may start the retrieval process of step S1112 when the portable terminal displaying an image recognition screen is placed in the recognizable area, or may start the retrieval process before the portable terminal is placed in the recognizable area.

When the retrieval process of the foregoing step S1112 starts, the information processing system 100 determines whether the registered image is discovered through the retrieval process of the foregoing step S1112 (step S1113). This determination process is executed by, for example, the detection unit 121. When it is determined in step S1113 that the registered image is not discovered (No in step S1113), the information processing system 100 subsequently determines whether a given time has passed after the retrieval process starts (step S1114). The determination process is executed by, for example, the detection unit 121. When it is determined in step S114 that the given time has passed and the registered image is not discovered (Yes in step S1114), the information processing system 100 ends the process and exits the recognition mode. Conversely, when it is determined in step S1114 that the given time has not passed (No in step S1114), the retrieval process of step S1112 is executed again.

When it is determined in the foregoing step S1113 that the registered image is discovered (Yes in step S1113), the information processing system 100 subsequently displays an effect indicating that the registered image is discovered (step S1115). The display process of step S1115 is executed by, for example, the output control unit 122. Any effect may be used as the effect indicating that the registered image is discovered. For example, the information processing system 100 executes, for example, display showing ripples spreading from the location in which the portable terminal is placed. When the effect indicating that the registered image is discovered overlaps an image displayed by the portable terminal, the recognition process in the information processing system 100 may be affected. Therefore, the information processing system 100 preferably outputs the effect indicating that the registered image is discovered so that the effect does not overlap the portable terminal.

Figure 34:
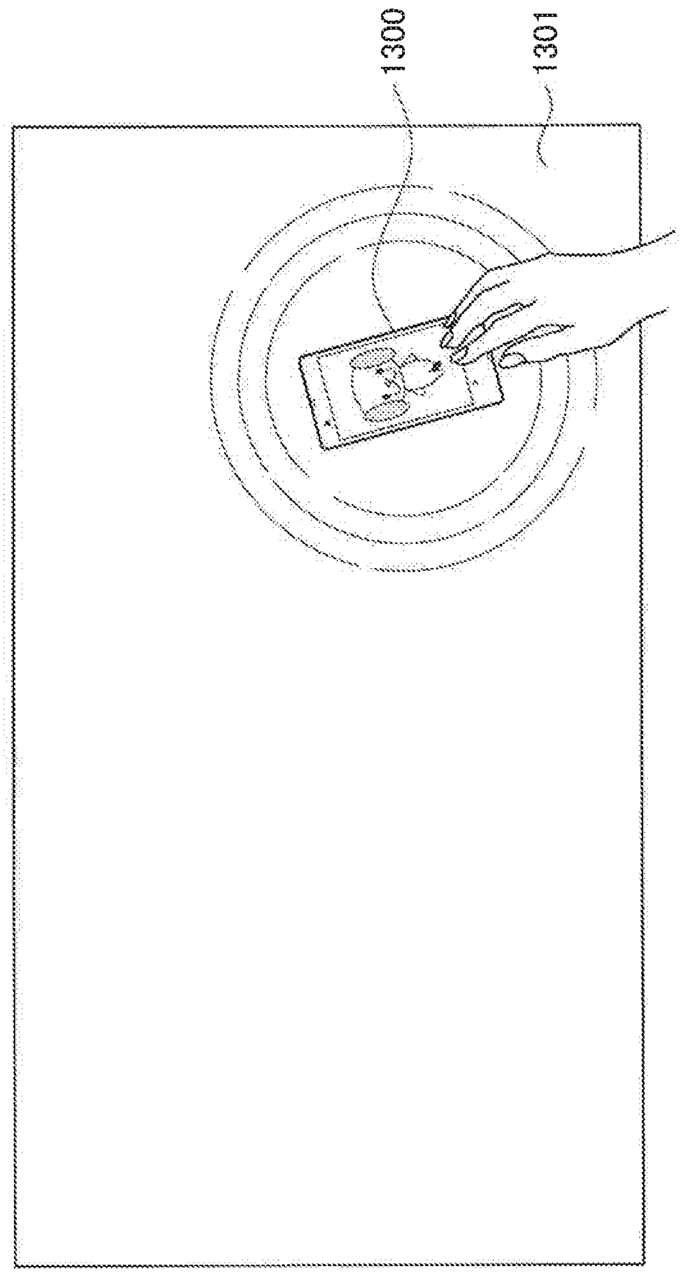
FIG. 34 is an explanatory diagram illustrating an example of a GUI of an application.

FIG. 34 is an explanatory diagram illustrating an example of a GUI of an application displayed on the information display surface by the information processing system 100 according to an embodiment of the present disclosure. FIG. 34 illustrates an example of the effect indicating that the registered image is discovered and displayed by the information processing system 100. When a portable terminal 1300 displaying the image recognition screen is placed on the recognizable area and the detection unit 121 recognizes that the image displayed by the portable terminal 1300 is the image registered in the information processing system 100, the information processing system 100 may execute display showing ripples indicated by reference numeral 1301 spreading from the location in which the portable terminal 1300 is placed.

When the information processing system 100 recognizes an image of the portable terminal and the luminance of a display of the portable terminal is too bright or too dark, the recognition in the information processing system 100 is affected. When the information processing system 100 is in the recognition mode, for example, the user of the portable terminal may adjust the luminance of the display of the portable terminal so that an image can be easily recognized by the information processing system 100.

When the effect indicating that the registered image is discovered in the foregoing step S1115 is displayed, the information processing system 100 subsequently determines whether an application currently executed in the information processing system 100 is an application for which it is necessary to continuously recognize the image (step S1116). This determination process is executed by, for example, the detection unit 121. An example of the application for which it is necessary to continuously recognize the image includes an application for which it is necessary to continuously display information by tracking the recognized image.

When it is determined in the foregoing step S1116 that the application currently executed in the information processing system 100 is not the application for which it is necessary to continuously recognize the image (No in step S1116), it is not necessary for the portable terminal to remain in the recognizable area. Therefore, the information processing system 100 subsequently displays information prompting the user to remove the recognized portable terminal from the recognizable area (step S1117). The display process of step S1115 is executed by, for example, the output control unit 122. Any information may be used as the information prompting the user to remove the portable terminal. However, when the information prompting the user to remove the portable terminal overlaps an image displayed by the portable terminal, the recognition process in the information processing system 100 is affected. Therefore, the information processing system 100 preferably outputs the information prompting the user to remove the portable terminal so that the information does not overlap the portable terminal.

Figure 35:
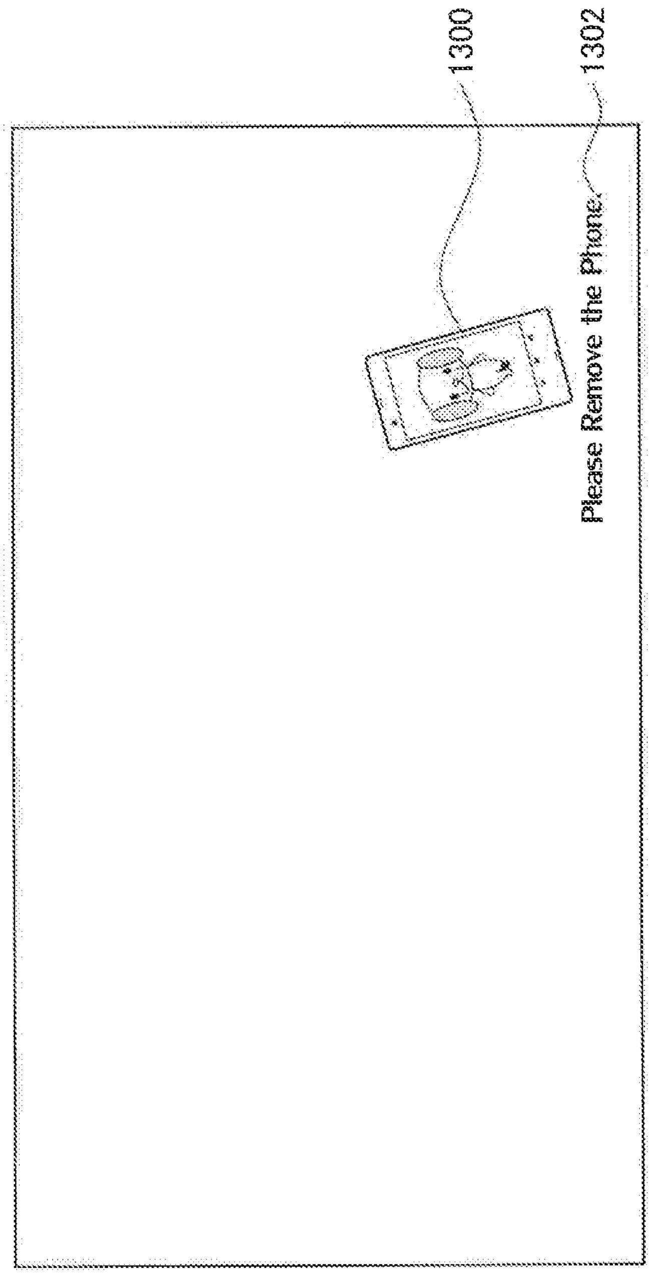
FIG. 35 is an explanatory diagram illustrating an example of a GUI of an application.

FIG. 35 is an explanatory diagram illustrating an example of a GUI of an application displayed on the information display surface by the information processing system 100 according to an embodiment of the present disclosure. FIG. 35 illustrates an example of information displayed by the information processing system 100 after an image displayed by the portable terminal is recognized. When the application currently executed by the information processing system 100 is not the application for which it is necessary to continuously recognize the image, the information processing system 100 displays the information prompting the user to remove the portable terminal 1300, for example, as indicated by reference numeral 1302 in FIG. 35. The information processing system 100 can cause the user of the portable terminal 1300 to be aware of the necessity to remove the portable terminal 1300 from the recognizable area by displaying the information illustrated in FIG. 35. When the information prompting the user to remove the portable terminal overlaps an image displayed by the portable terminal, the recognition process in the information processing system 100 is affected. Therefore, as illustrated in FIG. 35, the information processing system 100 preferably outputs the information prompting the user to remove the portable terminal so that the information does not overlap the portable terminal.

After the information is displayed in the foregoing step S1117, the information processing system 100 determines whether the image registered in the information processing system 100 disappears from the inside of the screen (the inside of the recognizable area) (step S1118). The determination process is executed by, for example, the detection unit 121. When it is determined in step S1118 that the image registered in the information processing system 100 does not disappear from the inside of the screen (inside of the recognizable area) (No in step S1118), the information processing system 100 continuously displays the information displayed in step S1117. Conversely, when it is determined that the user removes the portable terminal from the recognizable area in step S1103 of FIG. 32 and the image registered in the information processing system 100 disappears from the inside of the screen (inside of the recognizable area) (Yes in step S1118), the information processing system 100 stops the image recognition process (step S1119).

Conversely, when it is determined in the foregoing step S1116 that the currently executed application is the application for which it is necessary to continuously recognize the image (Yes in step S1116), the information processing system 100 skips the processes of the foregoing steps S1117 to S1119.

When the image recognition process stops in the foregoing step S1119, the information processing system 100 subsequently records the ID of the image discovered in the foregoing step S1113 (step S1120). The process of step S1120 is executed by, for example, the detection unit 121. Then, the information processing system 100 performs matching of the ID of the image and starts a communication process with the portable terminal displaying the image (step S1121). The communication between the information processing system 100 and the portable terminal is executed through, for example, the Internet, Wi-Fi, or Bluetooth (registered trademark). The information processing system 100 records the position, the posture, and the size of the image discovered in the foregoing step S1113 (step S1122). The process of step S122 is executed by, for example, the detection unit 121.

Then, the information processing system 100 executes display indicating a connection state with the portable terminal on the information display surface using information regarding the position, the posture, and the size of the image discovered in the foregoing step S1113 (step S1123). The display process of step S1123 is executed by, for example, the output control unit 122. The display indicating the connection state with the portable terminal in step S1123 is also referred to as a "connection mark" below. The information processing system 100 may display, for example, the same image as the recognition screen displayed by the recognized portable terminal as the connection mark. By displaying the same image as the recognition screen displayed by the recognized portable terminal as the connection mark, the information processing system 100 can easily allow the user to comprehend which connection mark corresponds to which portable terminal.

Figure 36:
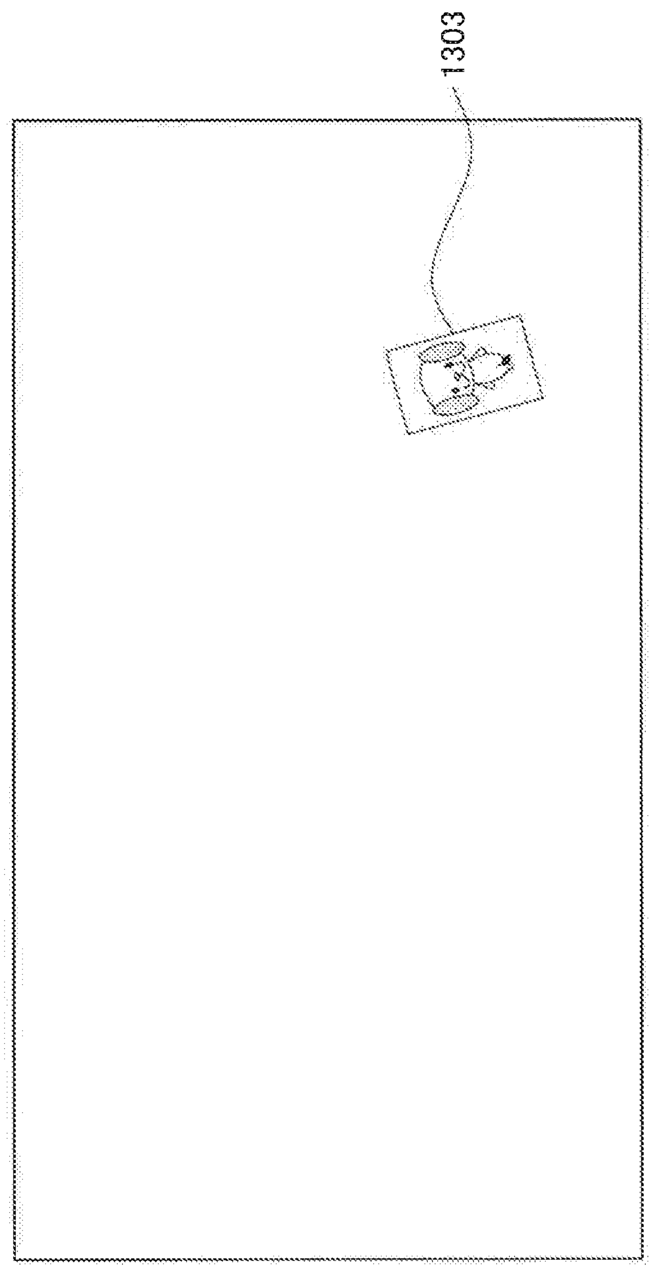
FIG. 36 is an explanatory diagram illustrating an example of a GUI of an application.

FIG. 36 is an explanatory diagram illustrating an example of a GUI of an application displayed on the information display surface by the information processing system 100 according to an embodiment of the present disclosure. FIG. 36 illustrates an example of a state in which the information processing system 100 displays the connection mark on the display surface. Reference numeral 1303 in FIG. 36 denotes an example of a connection mark and a connection state of the information processing system 100 with the portable terminal 1300 illustrated in FIGS. 34 and 35. The information processing system 100 according to the embodiment of the present disclosure can present the linking to the portable terminal owned by the user to the user and the connection mark displayed on the screen as a data exchange interface by displaying the connection mark on the display surface. As will be described below, the connection mark 1303 illustrated in FIG. 36 can be used as an interface for extracting data from the portable terminal and copying data to the portable terminal.

As illustrated in FIG. 36, the connection mark 1303 is displayed on the display surface based on the position, the posture, and the size when the image displayed on the display of the portable terminal is recognized. Accordingly, the connection mark 1303 is naturally displayed in a direction in which the user can easily touch it at the hand of the user placing the portable terminal, and thus an effect of improving convenience of the device linkage for a plurality of users or a plurality of terminals is obtained.

The connection state between the information processing system 100 and the portable terminal may be released through an active connection releasing manipulation from the user or may be automatically released when no operation is executed on the portable terminal or the connection mark for a given time. When the connection state between the information processing system 100 and the portable terminal is released, the information processing system 100 may eliminate the connection mark displayed in the foregoing step S1123. The information processing system 100 can present end of the connection state to the user by eliminating the connection mark displayed in the foregoing step S1123.

The information processing system 100 according to the embodiment of the present disclosure can offer the user various experiences by executing the above-described series of processes and displaying the connection mark on the information display surface. Hereinafter, examples of the experiences offered to the user through the display of the connection mark by the information processing system 100 will be described.

Figure 37:
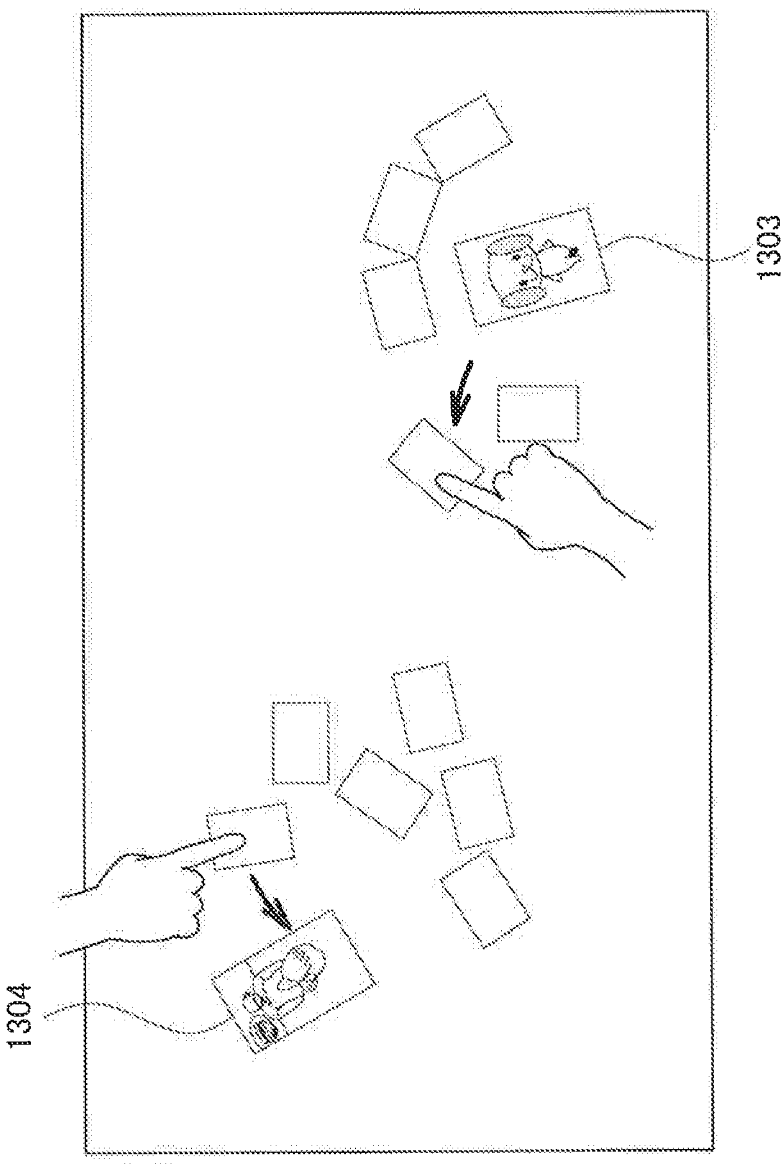
FIG. 37 is an explanatory diagram illustrating an example of a GUI of an application.

The information processing system 100 enables sharing of image data stored in the portable terminal by displaying the connection mark on the information display surface. FIG. 37 is an explanatory diagram illustrating an example of a GUI of an application displayed on the information display surface by the information processing system 100 according to an embodiment of the present disclosure. FIG. 37 illustrates an example of a GUI of an application executed by the information processing system 100 when image data stored in the portable terminal is shared by displaying connection marks.

FIG. 37 illustrates a state in which connection marks 1303 and 1304 are displayed on the information display surface by the information processing system 100. For example, when users are allowed to manipulate predetermined menu buttons and an application for sharing photos is executed, as illustrated in FIG. 37, the information processing system 100 acquires image data from image folders or the like of the portable terminals corresponding to the connection marks 1303 and 1304 and displays images acquired from the image folders around the connection marks 1303 and 1304. The images displayed around the connection marks 1303 and 1304 are displayed just such that the users can execute drag manipulations. The information processing system 100 outputs icons or other information indicating copying to the information processing system 100 and allows the users to drag the display image data to the information, and thus the image data maintained in the portable terminals can be copied to the information processing system 100 through a simple user manipulation.

When the connection marks 1303 and 1304 are displayed on the information display surface, as illustrated in FIG. 37, for example, the user is allowed to drag the image data stored in the portable terminal corresponding to the connection mark 1303 to the connection mark 1304, so that the image data can be copied between the portable terminals via the information processing system 100. Accordingly, the information processing system 100 can copy the image data maintained by the portable terminal to another portable terminal through a simple user manipulation.

Figure 38:
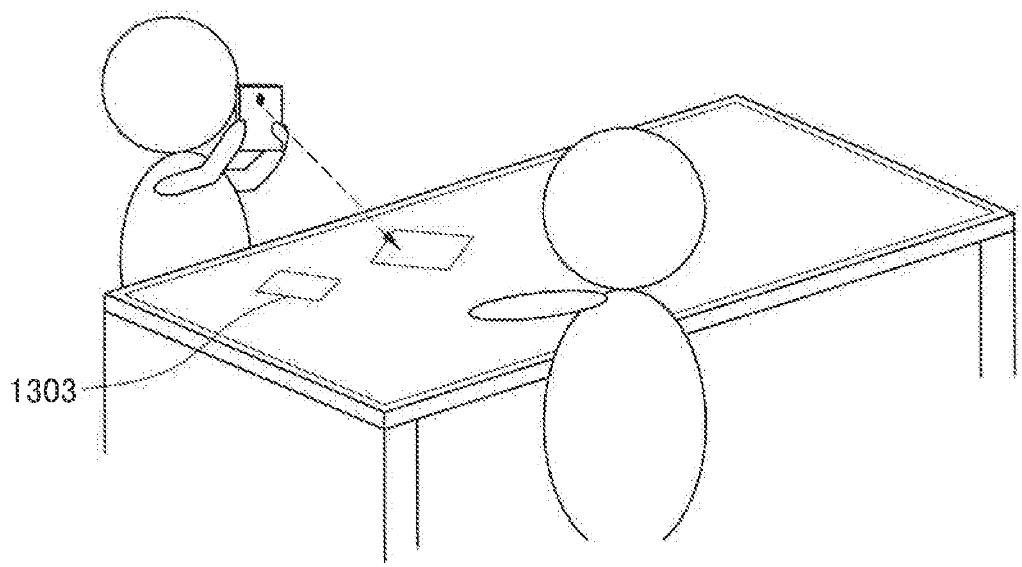
FIG. 38 is a flowchart illustrating a use example of the information processing system 100 according to an embodiment of the present disclosure.

After the information processing system 100 displays the connection mark by executing the above-described series of processes, the user can freely carry the portable terminal. Accordingly, an application that displays an imaged photo in the information processing system 100 when the photo is imaged by the portable terminal linked to the information processing system 100 is also possible. FIG. 38 is an explanatory diagram illustrating a use example of the information processing system 100 and illustrates a form in which the user images a photo using a portable terminal linked to the information processing system 100. When the user images a photo using a portable terminal linked to the information processing system 100, the information processing system 100 can also realize an application by which the photo imaged by the portable terminal is displayed around the connection mark 1303. When the photo imaged by the portable terminal is displayed around the connection mark 1303, the information processing system 100 may display the photo in association with, for example, an effect in which the photo appears from the connection mark 1303. The information processing system 100 can clearly express which portable terminal images the photo by displaying the photo imaged by the portable terminal and such an effect in association therewith.

Figure 39:
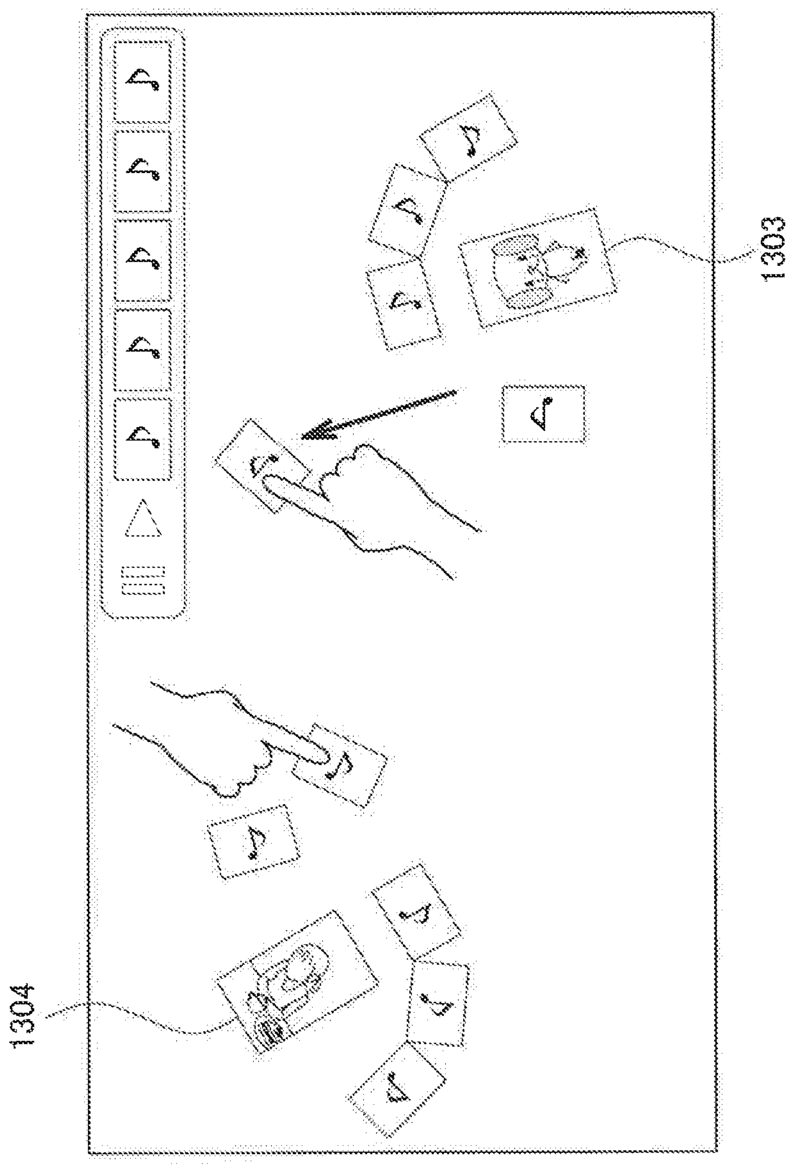
FIG. 39 is an explanatory diagram illustrating an example of a GUI of an application.

The information processing system 100 enables sharing of music data stored in the portable terminal by displaying the connection mark on the information display surface. FIG. 39 is an explanatory diagram illustrating an example of a GUI of an application displayed on the information display surface by the information processing system 100 according to an embodiment of the present disclosure. FIG. 39 illustrates an example of a GUI of an application executed by the information processing system 100 when music data stored in the portable terminal is shared by displaying connection marks.

FIG. 39 illustrates a state in which connection marks 1303 and 1304 are displayed by the information processing system 100. For example, when users are allowed to manipulate predetermined menu buttons and an application for sharing music data is executed, as illustrated in FIG. 39, the information processing system 100 acquires music data from music folders or the like of the portable terminals corresponding to the connection marks 1303 and 1304 and displays jacket images of the music data acquired from the music folders around the connection marks 1303 and 1304. The jacket images displayed around the connection marks 1303 and 1304 are displayed just such that the users can execute drag manipulations. The information processing system 100 outputs icons or other information indicating copying to the information processing system 100 and allows the users to drag the displayed jacket image to the information, and thus the music data maintained in the portable terminals can be copied to the information processing system 100 through a simple user manipulation.

When the connection marks 1303 and 1304 are displayed, as illustrated in FIG. 39, for example, the user is allowed to drag the jacket image of the music data stored in the portable terminal corresponding to the connection mark 1303 to the connection mark 1304, so that the music data can be copied between the portable terminals via the information processing system 100. Accordingly, the information processing system 100 can copy the music data maintained by the portable terminal to another portable terminal through a simple user manipulation.

FIG. 39 illustrates a state in which the information processing system 100 displays an interface for reproducing the music data. By allowing the user to drag the jacket image to the interface for reproducing the music data, the information processing system 100 can execute a process of reproducing the music data corresponding to the jacket image or generating a playlist.

The information processing system 100 can share various kinds of data with the portable terminal linked to the information processing system 100 in addition to the image data or the music data. The information processing system 100 can enable, for example, websites or bookmarks of browsers displayed by the portable terminal linked to the information processing system 100 to be shared, as in the above-described GUI. For the portable terminal linked to the information processing system 100 to continuously display a website displayed by the information processing system 100, the information processing system 100 can also offer a manipulation of dragging a predetermined menu button of a browser executed by the information processing system 100 to the connection mark.

Figure 40:
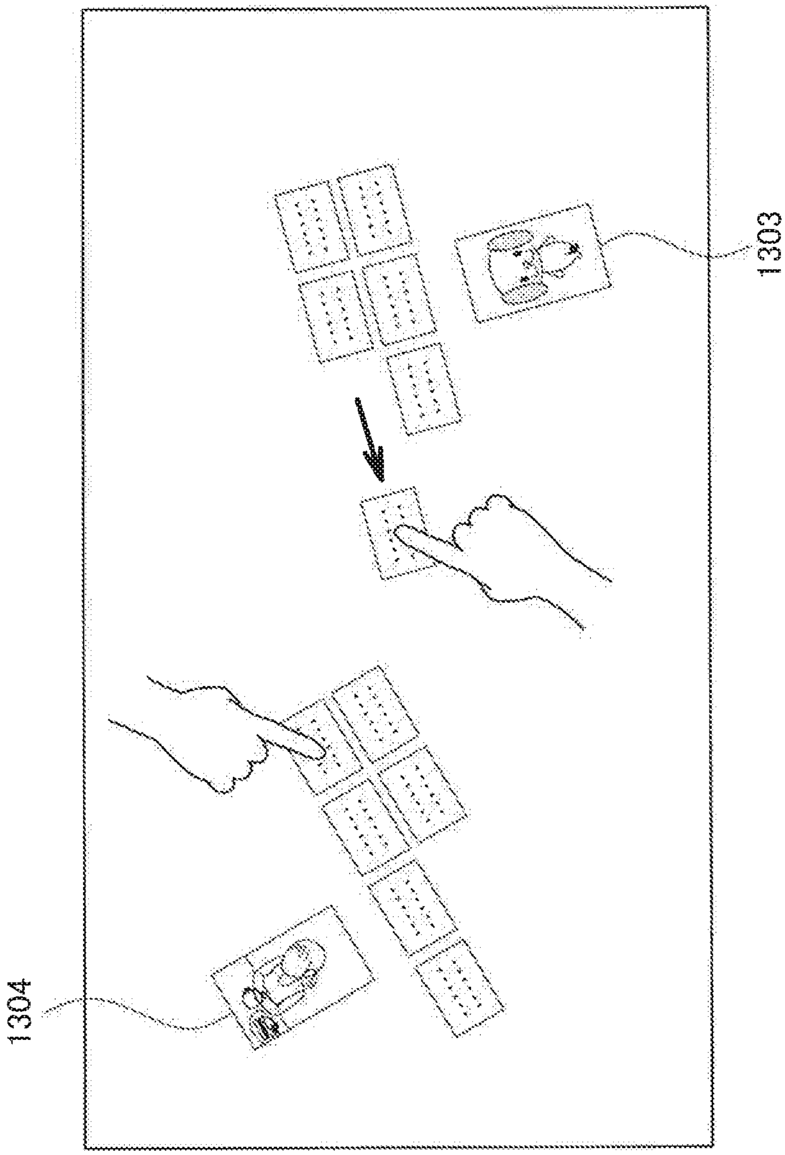
FIG. 40 is an explanatory diagram illustrating an example of a GUI of an application.

The information processing system 100 enables sharing of contact address data stored in the portable terminal by displaying the connection mark on the information display surface. FIG. 40 is an explanatory diagram illustrating an example of a GUI of an application displayed on the information display surface by the information processing system 100 according to an embodiment of the present disclosure. FIG. 40 illustrates an example of a GUI of an application executed by the information processing system 100 when contact address data stored in the portable terminal is shared by displaying connection marks.

FIG. 40 illustrates a state in which connection marks 1303 and 1304 are displayed on the information display surface by the information processing system 100. For example, when users are allowed to manipulate predetermined menu buttons and an application for sharing music data is executed, as illustrated in FIG. 40, the information processing system 100 acquires contact address data from the portable terminals corresponding to the connection marks 1303 and 1304 displayed on the information display surface and displays images that means the contact address data acquired from the portable terminals around the connection marks 1303 and 1304. The images displayed around the connection marks 1303 and 1304 are displayed just such that the users can execute drag manipulations. The information processing system 100 outputs icons or other information indicating copying to the information processing system 100 and allows the users to drag the displayed image to the information, and thus the contact address data maintained in the portable terminals can be copied to the information processing system 100 through a simple user manipulation.

When the information processing system 100 displays the connection marks 1303 and 1304 on the information display surface, as illustrated in FIG. 40, for example, the user is allowed to drag the contact address data stored in the portable terminal corresponding to the connection mark 1303 to the connection mark 1304, so that the contact address data can be copied between the portable terminals via the information processing system 100. Accordingly, the information processing system 100 can copy the contact address data maintained by the portable terminal to another portable terminal through a simple user manipulation.

The portable terminal linked to the information processing system 100 can add functions by installing various applications. The information processing system 100 can also realize a GUI in which an application can be given and received between the portable terminals by displaying the connection marks through the above-described processes.

Figure 41:
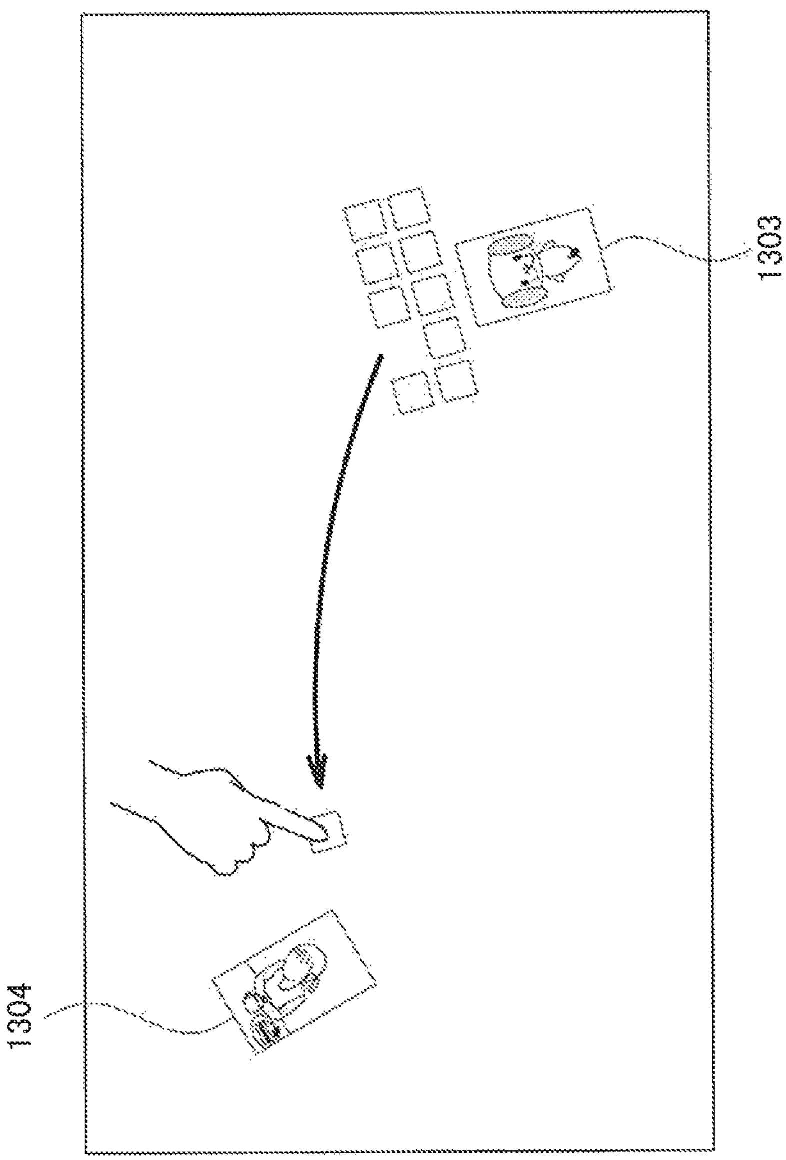
FIG. 41 is an explanatory diagram illustrating an example of a GUI of an application.

FIG. 41 is an explanatory diagram illustrating an example of a GUI of an application displayed on the information display surface by the information processing system 100 according to an embodiment of the present disclosure. FIG. 41 illustrates an example of a GUI of an application executed by the information processing system 100 when an application stored in the portable terminal is displayed by displaying connection marks.

FIG. 41 illustrates a state in which the connection marks 1303 and 1304 are displayed on the information display surface by the information processing system 100. For example, when an application for displaying a list of applications installed in the portable terminal is executed by allowing the user to manipulate a predetermined menu button, the information processing system 100 acquires information regarding the applications installed in the portable terminal from the portable terminals corresponding to the connection marks 1303 and 1304 and displays the information as icons or other information around the connection marks 1303 and 1304, as illustrated in FIG. 41. FIG. 41 illustrates a state in which a plurality of applications are installed in the portable terminal corresponding to the connection mark 1303, but no application is installed in the portable terminal corresponding to the connection mark 1304. Here, the user of the portable terminal corresponding to the connection mark 1304 finds a preferred application among the applications installed in the portable terminal corresponding to the connection mark 1303, and drags an icon of the application to the connection mark 1304. Through the drag manipulation, a process of downloading and installing the application is automatically executed in the portable terminal corresponding to the connection mark 1304.

The information processing system 100 according to the embodiment of the present disclosure can acquire the position, the posture, the size, and the like of the portable terminal and then can be linked to execute communication with the portable terminal by recognizing the image displayed by the portable terminal even when a dedicated application is not activated by the portable terminal.

The information processing system 100 according to the embodiment of the present disclosure causes the portable terminal to display any image and registers the displayed image before the device linkage with the portable terminal. The information processing system 100 according to the embodiment of the present disclosure can make image selection more fun for the user through such an image registration process. When the information processing system 100 according to the embodiment of the present disclosure completes the recognition of the image displayed by the portable terminal, the information processing system 100 can allow the user to easily recognize the user of the connection mark by continuously displaying the image as the connection mark on the screen.

The information processing system 100 according to the embodiment of the present disclosure causes the portable terminal to display any image and registers the displayed image before the device linkage with the portable terminal. Therefore, even when there are a plurality of substantially the same kind of portable terminals, the portable terminals can be uniquely identified by proper use of recognition images. There is a possibility of each user incidentally selecting substantially the same image as the recognition image when the plurality of users have the same kind of devices. Accordingly, the information processing system 100 according to the embodiment of the present disclosure may not be linked to the portable terminal when the portable terminal is not caused to register the selected recognition image in the information processing system 100. The information processing system 100 can determine whether the image selected by the portable terminal is superimposed by causing the portable terminal to register the selected recognition image in the information processing system 100.

When substantially the same image is selected as the recognition image, a problem may occur if the plurality of users have the same kind of device. When the exteriors of the devices are similar despite being different kinds of devices, the similar problem may occur at the time of selection of substantially the same image as the recognition image. Accordingly, the information processing system 100 may cause the portable terminals to be linked to select the recognition images and register recognition images in the information processing system 100 so that all of the portable terminals are unique.

The information processing system 100 according to the embodiment of the present disclosure can receive manipulations on a menu in various directions from a plurality of users, for example, as illustrated in FIG. 6. However, when one menu is handled by a plurality of users, the other users may not use the menu while somebody else is using the menu. It is difficult to customize the menu since the manipulations of the plurality of users on the menu in various directions are received. That is, the menu customized to be easily used by a certain user may not necessarily said to be easy for the other users to use.

In a state in which the manipulations of the plurality of users on the menu in various directions are received and a plurality of windows are displayed, it is hard to determine the window displayed by oneself. When an application is activated from one menu, login is necessary for each user at the time of start of the application. Thus, inconvenience may increase as the number of users increases.

Accordingly, the information processing system 100 according to the embodiment of the present disclosure is configured to receive manipulations of users, as will be described below, so that an improvement in operability and convenience is achieved at the time of reception of the manipulations of the plurality of users on the menu in various directions.

Figure 42:
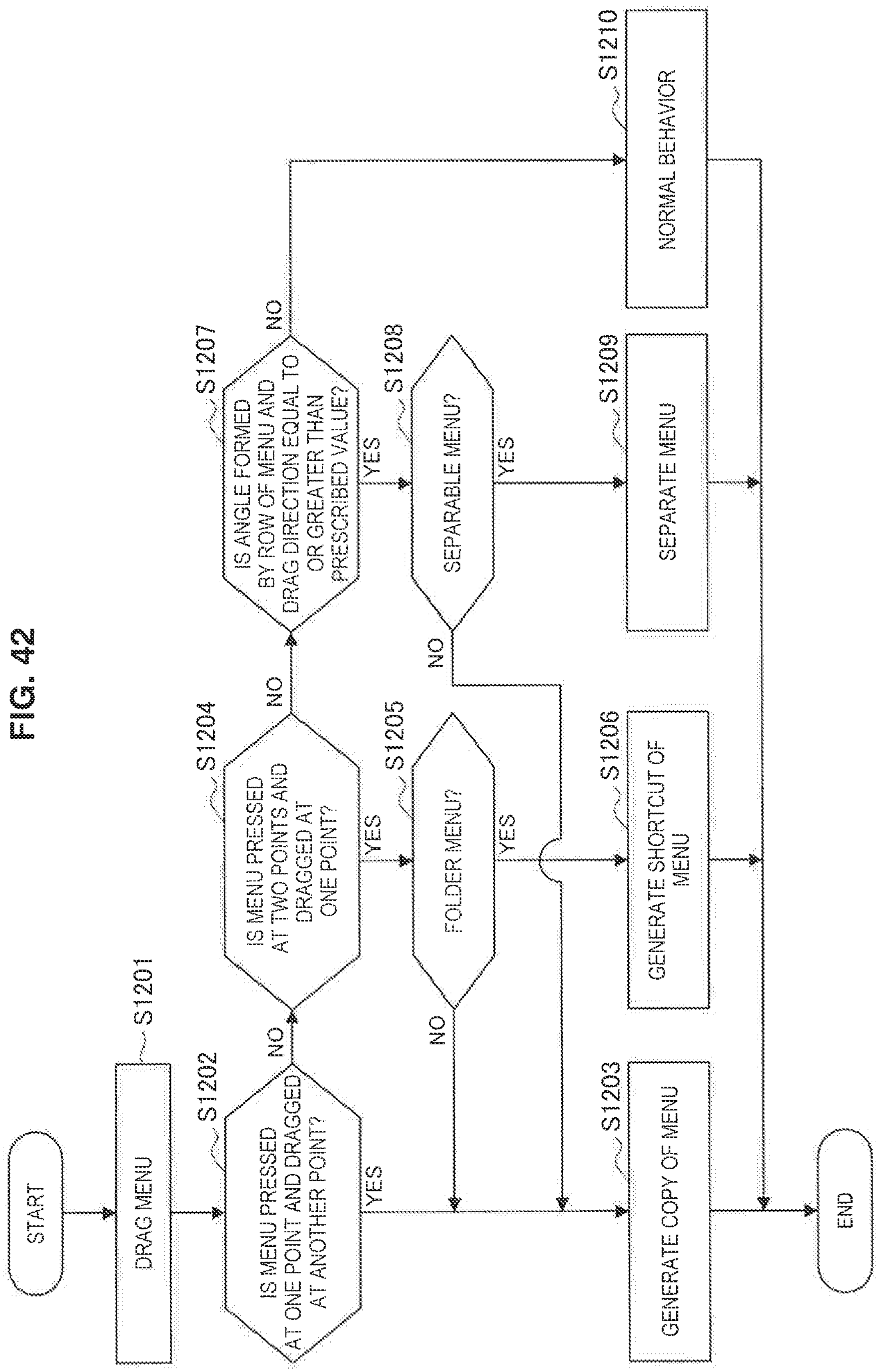
FIG. 42 is a flowchart illustrating an example of an operation of the information processing system 100 according to an embodiment of the present disclosure.

An example of an operation of the information processing system 100 when an improvement in operability and convenience is achieved at the time of reception of the manipulations of a plurality of users on a menu in various directions will be described. FIG. 42 is a flowchart illustrating an example of an operation of the information processing system 100 according to an embodiment of the present disclosure. FIG. 42 illustrates the example of the operation of the information processing system 100 according to the embodiment of the present disclosure when the users execute drag manipulations on the menu button group 1110 or the menu button 1100 illustrated in FIG. 6 and the like. Hereinafter, the example of the operation of the information processing system 100 according to the embodiment of the present disclosure will be described with reference to FIG. 42.

Hereinafter, the drag manipulation on the menu button 1100 or the menu button group 1110 is also simply referred to as a drag manipulation (on the menu) in some cases.

When the information processing system 100 detects that the user executes the drag manipulation on the menu displayed by the information processing system 100 (step S1201), the information processing system 100 determines whether the menu is pressed at one point and the menu is dragged at another point in the drag manipulation (step S1202). The processes of the foregoing steps S1201 and 1202 are executed by, for example, the detection unit 121.

When it is determined in the foregoing step S1202 that the manipulation of pressing the menu at one point and further dragging the menu dragged at one point is executed (Yes in step S1202), the information processing system 100 generates a copy of the dragged menu (step S1203). The generation of the copy of the menu in step S1203 is executed by, for example, the output control unit 122.

Figure 45:
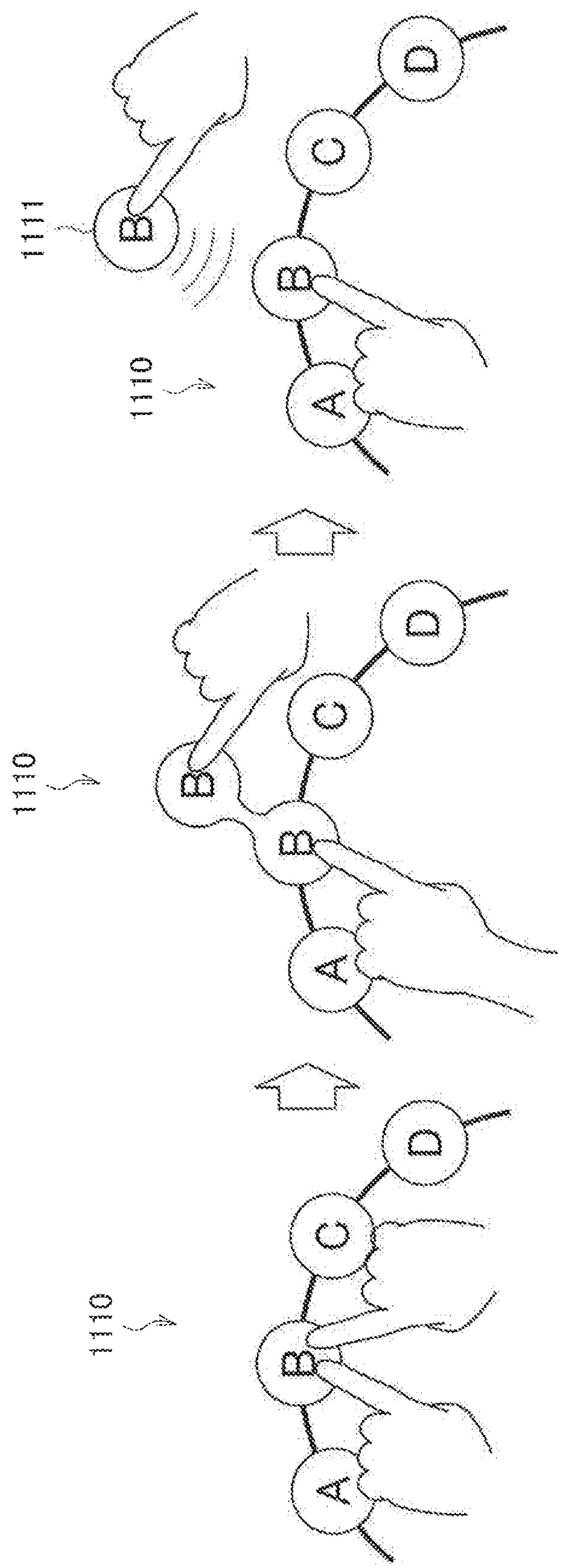
FIG. 45 is an explanatory diagram illustrating an example of a GUI of an application.

FIG. 45 is an explanatory diagram illustrating an example of a GUI of an application displayed on the information display surface by the information processing system 100 according to an embodiment of the present disclosure. FIG. 45 illustrates an example of the generation of the copy of the menu in the foregoing step S1203. For example, as in FIG. 45, a drag manipulation is assumed to be executed by the user pressing one menu button (B) in the menu button group 1110 displayed on the information display surface with his or her left forefinger and dragging the same menu button (B) with his or her right forefinger. The information processing system 100 executes a process of generating a copy menu button 1111 of the menu button (B) according to the manipulation executed by the user.

Conversely, when it is determined in the foregoing step S1202 that the manipulation of pressing the menu at one point and further dragging the menu at one point is not executed (No in step S1202), the information processing system 100 subsequently determines whether the menu is pressed at two points and the menu is dragged at one point in the drag manipulation detected in the foregoing step S1201 (step S1204). The process of step S1204 is executed by, for example, the detection unit 121.

When it is determined in the foregoing step S1204 that the manipulation of pressing the menu at two points and dragging the menu at one point is executed (Yes in step S1204), the information processing system 100 subsequently determines whether the menu is a folder menu indicating a folder (step S1205). The process of step S1205 is executed by, for example, the detection unit 121. When it is determined in step S1205 that the dragged menu is not the folder menu (No in step S1205), the information processing system 100 generates a copy of the dragged menu, as in the case of the manipulation of pressing the menu one point and dragging the menu at one point (step S1203). Conversely, when it is determined in step S1205 that the dragged menu is the folder menu (Yes in step S1205), the information processing system 100 generates a shortcut to the menu (the folder menu) (step S1206). The generation of the shortcut to the menu in step S1206 is executed by, for example, the output control unit 122. The shortcut is assumed to refer to a menu which functions as a reference to another menu and has no substance.

Figure 46:
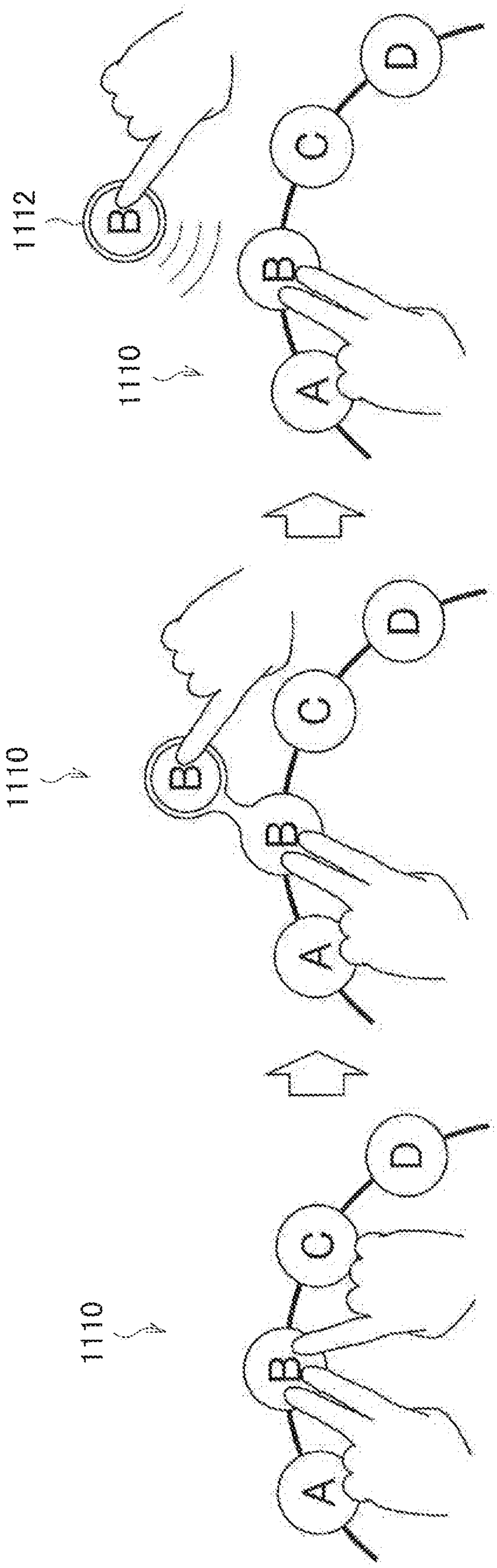
FIG. 46 is an explanatory diagram illustrating an example of a GUI of an application.

FIG. 46 is an explanatory diagram illustrating an example of a GUI of an application displayed on the information display surface by the information processing system 100 according to an embodiment of the present disclosure. FIG. 46 illustrates an example of the generation of the shortcut of the menu in the foregoing step S1206. For example, as in FIG. 46, a drag manipulation is assumed to be executed by the user pressing one menu button (B) in the menu button group 1110 with his or her left forefinger and middle finger at two points and dragging the same menu button (B) with his or her right forefinger. The information processing system 100 executes a process of generating a shortcut button 1112 of the menu button (B) according to the manipulation executed by the user.

The information processing system 100 may generate the copy menu button 1111 of the menu button (B) illustrated in FIG. 45 and the shortcut button 1112 illustrated in FIG. 46 so that the appearances of the copy menu button and the shortcut button are different. In the embodiment, the menu button 1111 is a simple circle and the shortcut button 1112 is a double circle. Of course, the shapes of the copy menu button 1111 and the shortcut button 1112 are not limited to the related examples, but the information processing system 100 may set different appearances through different colors as well as the different shapes.

A difference between generation of a copy of the menu and generation of a shortcut of the menu will be described. When a copy of a menu is generated based on a manipulation from a user and another menu is added to one side menu (for example, a menu of a copy source), the information processing system 100 does not add the added menu to the other side menu (for example, a menu of a copy destination). On the other hand, when a shortcut of a menu is generated based on a manipulation from a user and another menu is added to one side menu (for example, a menu of a shortcut source), the information processing system 100 also adds the added menu to the other side menu (for example, a menu of a shortcut destination).

Figure 47:
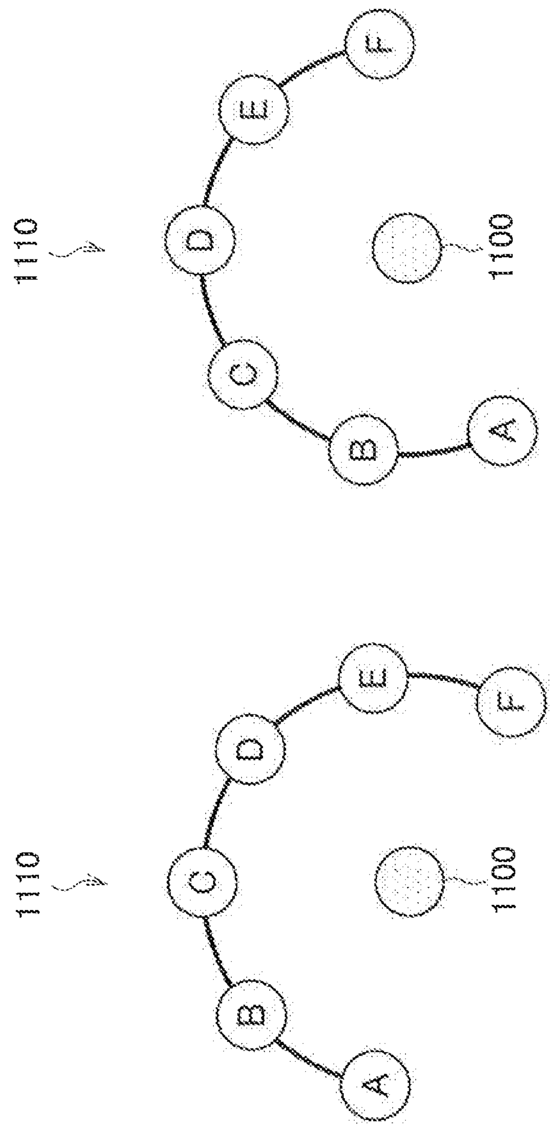
FIG. 47 is an explanatory diagram illustrating an example of a GUI of an application.
Figure 48:
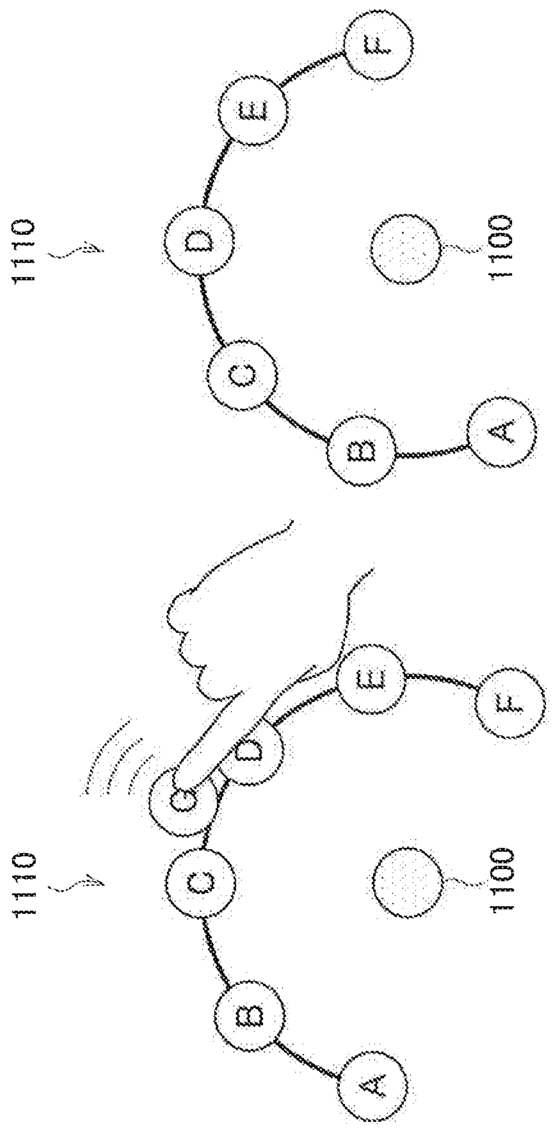
FIG. 48 is an explanatory diagram illustrating an example of a GUI of an application.

FIGS. 47 and 48 are explanatory diagrams illustrating an example of a GUI of an application displayed on the information display surface by the information processing system 100 according to an embodiment of the present disclosure and an example of the GUI when a copy of a menu is generated based on a manipulation from the user. Even when a menu is generated through a manipulation from the user as in FIG. 47 and a new menu (G) is subsequently added to one side menu as in FIG. 48, the menu (G) is not added to the other side menu.

Figure 49:
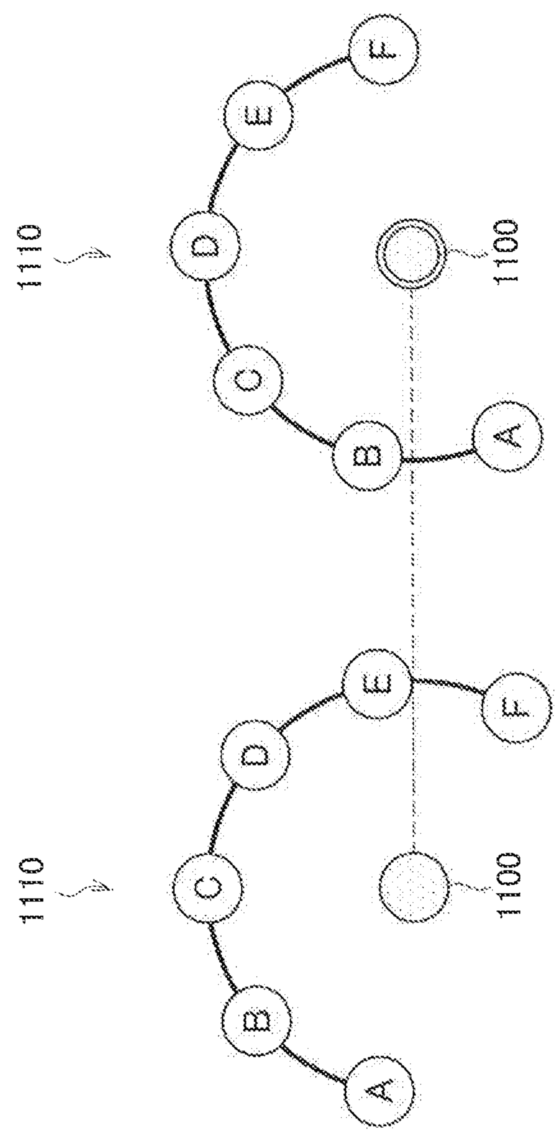
FIG. 49 is an explanatory diagram illustrating an example of a GUI of an application.
Figure 50:
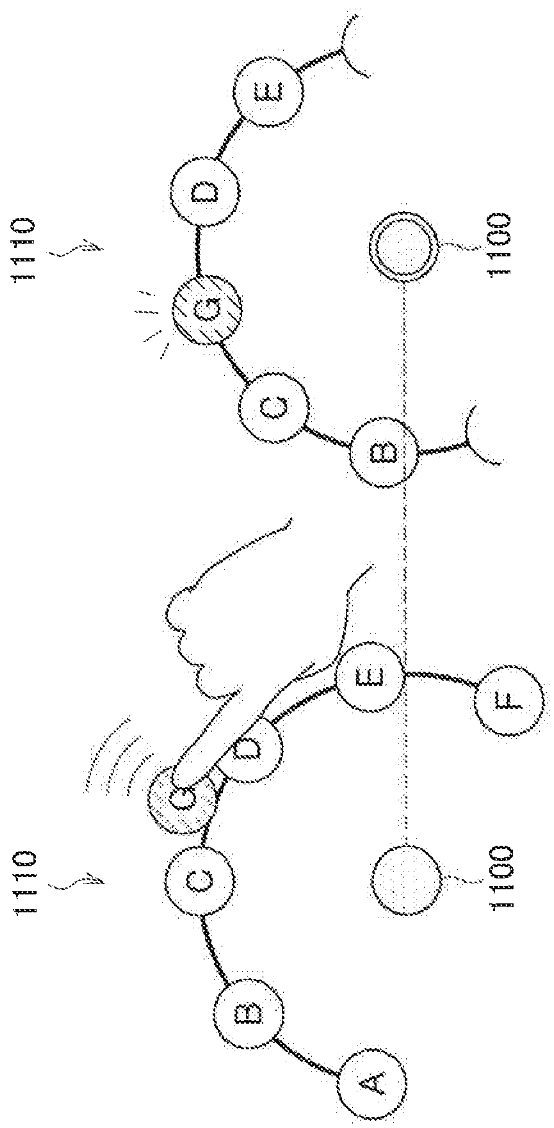
FIG. 50 is an explanatory diagram illustrating an example of a GUI of an application.

FIGS. 49 and 50 are explanatory diagrams illustrating an example of a GUI of an application displayed on the information display surface by the information processing system 100 according to an embodiment of the present disclosure and an example of the GUI when a shortcut of a menu is generated based on a manipulation from the user. In FIGS. 49 and 50, when a shortcut of a menu is generated based on a manipulation from the user in accordance with a broken line as in FIG. 49, and a new menu (G) is subsequently added to one side menu as in FIG. 50, the new menu (G) is also added to the other side menu.

Conversely, when it is determined in the foregoing step S1204 that the manipulation of pressing the menu at two points and dragging the menu at one point is not executed (No in step S1204), the information processing system 100 subsequently determines whether an angle formed by a row of the menu and a drag direction of the menu is equal to or greater than a prescribed value (step S1207). The process of step S1207 is executed by, for example, the detection unit 121.

When it is determined in the foregoing step S1207 that the angle formed by the row of the menu and the drag direction is equal to or greater than the prescribed value (Yes in step S1207), the information processing system 100 subsequently determines whether the dragged menu is a menu separable from the menu button group (step S1208). The process of step S1208 is executed by, for example, the detection unit 121. When it is determined in step S1208 that the dragged menu is not the menu separable from the menu button group (No in step S1208), the information processing system 100 generates a copy of the dragged menu (step S1203). Conversely, when it is determined in step S1208 that the dragged menu is the separable menu (Yes in step S1208), the information processing system 100 separates the menu from the menu button group (step S1209). The process of separating the menu from the menu button group in step S1209 is executed by, for example, the output control unit 122.

Figure 51:
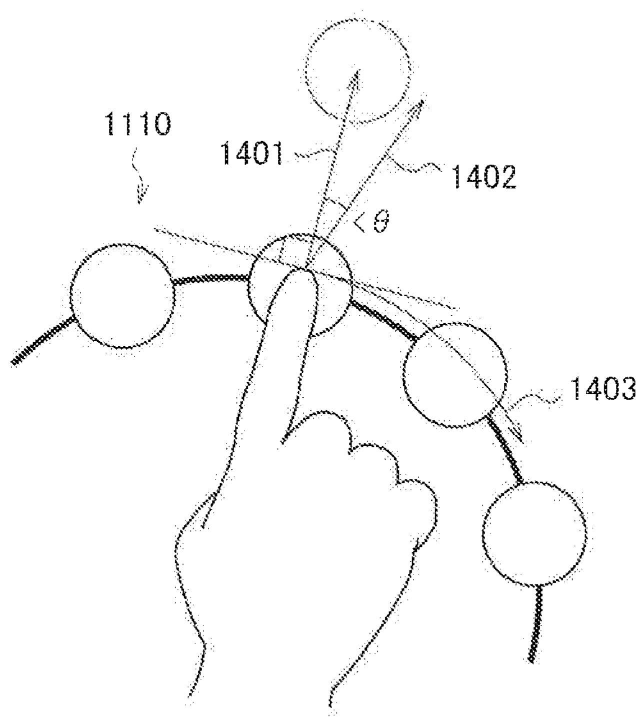
FIG. 51 is an explanatory diagram illustrating an example of a GUI of an application.

FIG. 51 is an explanatory diagram illustrating an example of a GUI of an application displayed on the information display surface by the information processing system 100 according to an embodiment of the present disclosure. FIG. 51 illustrates an example of a drag manipulation on the menu by the user. Reference numeral 1401 denotes a radial direction of the menu button group 1110 disposed in an arc shape, reference numeral 1402 denotes a direction in which the menu button is to be dragged by the user, and reference numeral 1403 denotes a circumferential direction of the menu button group 1110 disposed in an arc shape. When an angle formed by the row of the menu and the direction which is denoted by reference numeral 1402 and in which the menu button is to be dragged by the user is equal to or greater than the prescribed value and the menu button is separable from the menu button group 1110, the information processing system 100 separates the dragged menu button from the menu button group 1110.

Figure 52:
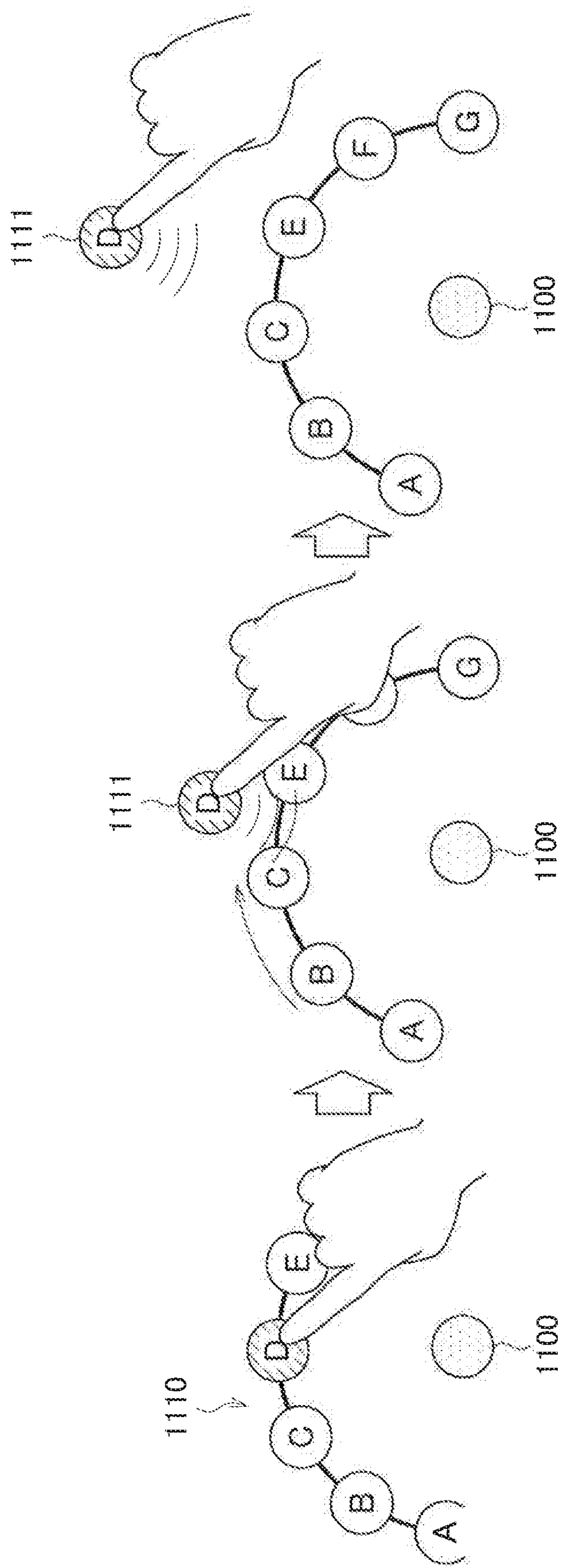
FIG. 52 is an explanatory diagram illustrating an example of a GUI of an application.

FIG. 52 is an explanatory diagram illustrating an example of a GUI of an application displayed on the information display surface by the information processing system 100 according to an embodiment of the present disclosure. FIG. 52 illustrates an example of a drag manipulation on the menu by the user. When the user touches one menu button in the menu button group 1110 with his or her finger and executes a drag manipulation on the menu button, the information processing system 100 separates the dragged menu button from the menu button group 1110 so that the menu button is independent as a menu button 1111.

Conversely, when it is determined in the foregoing step S1207 that the angle formed by the row of the menu and the drag direction is not equal to or greater than the prescribed value (No in step S1207), the information processing system 100 executes a drag manipulation from the user as a normal behavior (step S1210). The process of step S1210 is executed by, for example, the output control unit 122. The normal behavior is, for example, a behavior in which the menu button 1100 is moved to track a manipulation from the user or a behavior in which the menu button group 1110 tracks a manipulation from the user and is rotated about the menu button 1100.

The information processing system 100 according to the embodiment of the present disclosure can allow the user to copy the menu, generate the shortcut of the menu, or separate the menu through a simple manipulation by executing the above-described operation according to content of a drag manipulation on the menu button by the user.

Figure 43:
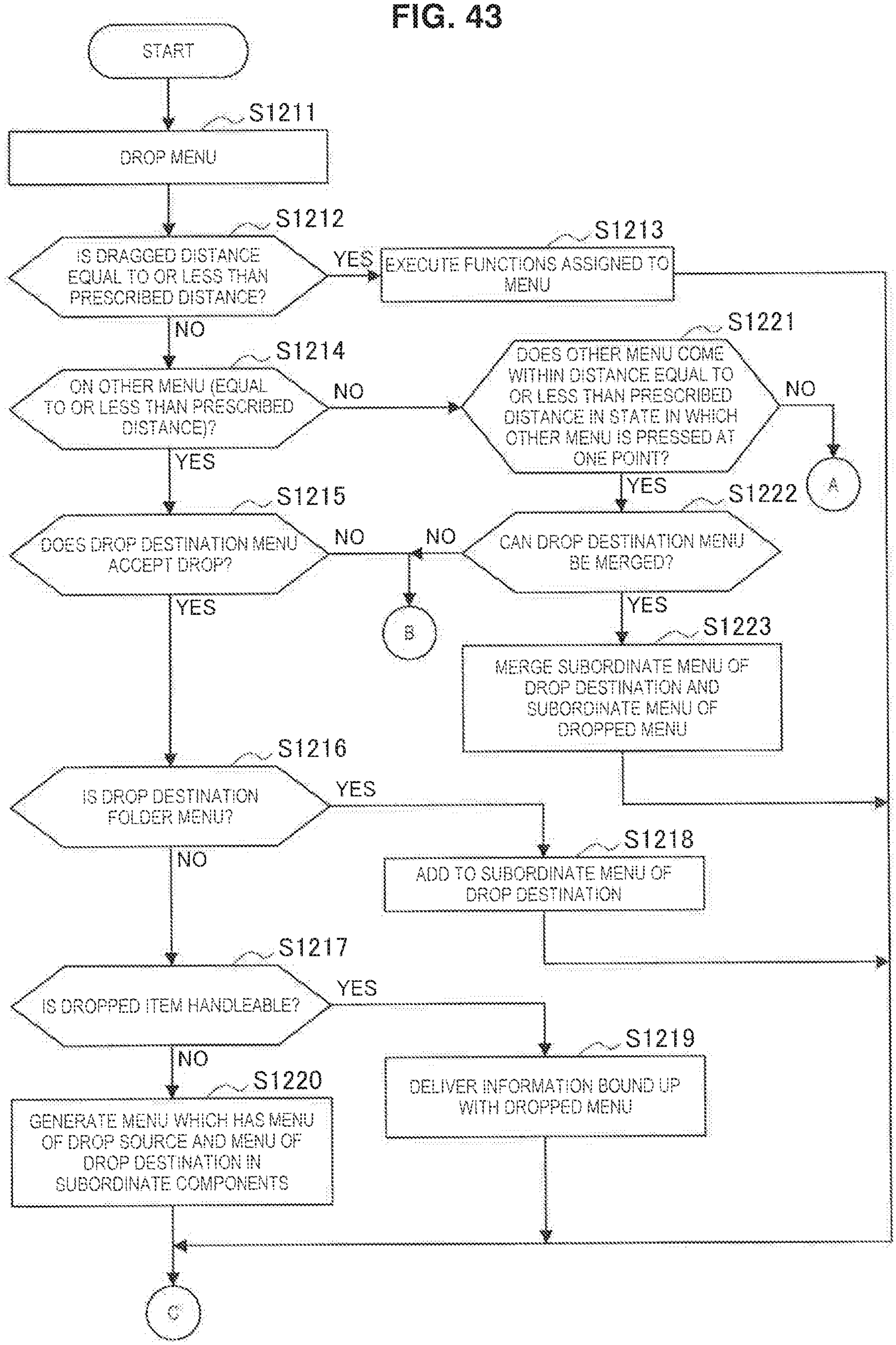
FIG. 43 is a flowchart illustrating an example of an operation of the information processing system 100 according to an embodiment of the present disclosure.
Figure 44:
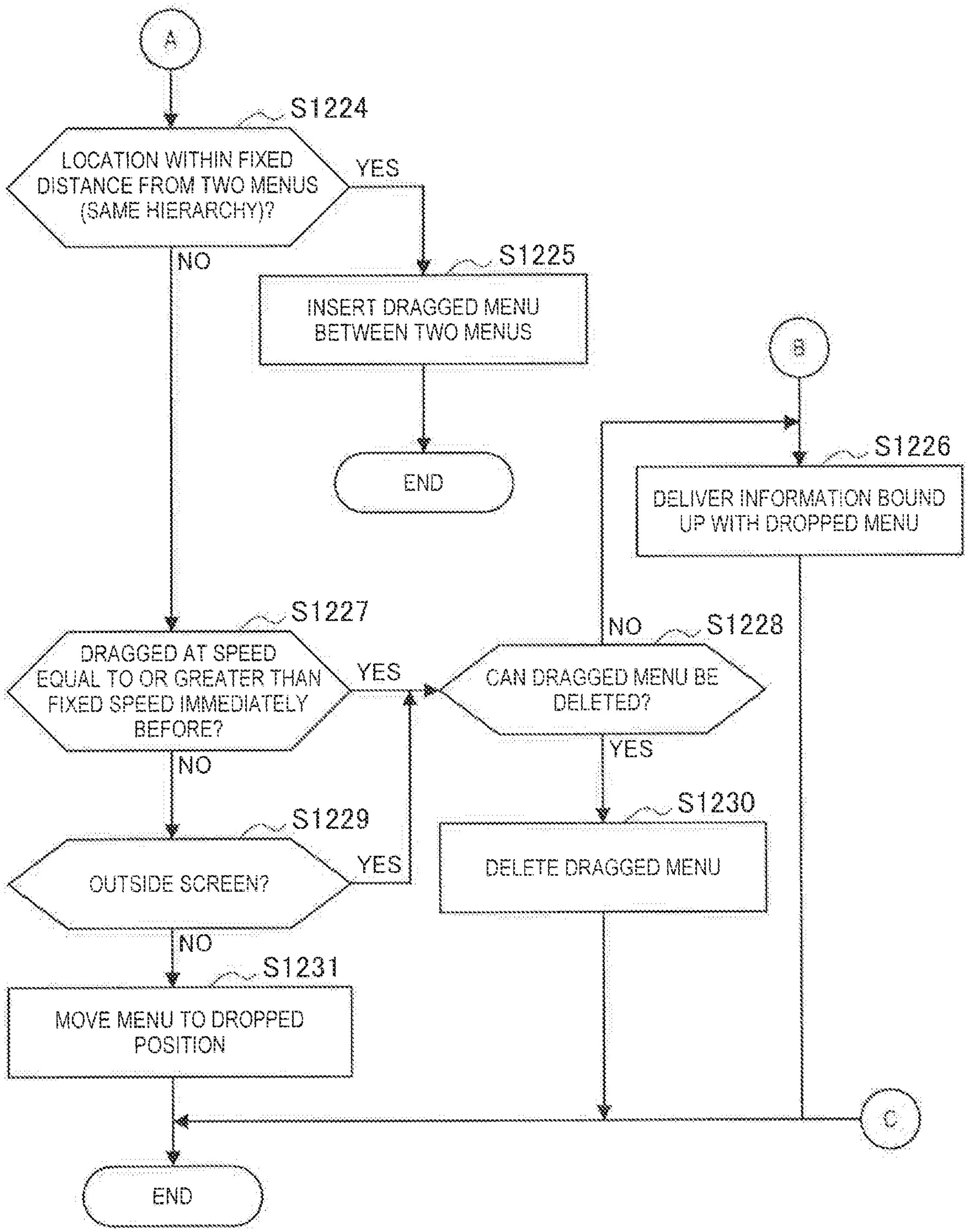
FIG. 44 is a flowchart illustrating an example of an operation of the information processing system 100 according to an embodiment of the present disclosure.

Next, an example of an operation of the information processing system 100 according to content of a drop manipulation on the menu button by the user will be described. FIGS. 43 and 44 are flowcharts illustrating an example of an operation of the information processing system 100 according to an embodiment of the present disclosure. FIGS. 43 and 44 illustrate the example of the operation of the information processing system 100 according to the embodiment of the present disclosure when the user executes a drag manipulation on the menu button 1100 or the menu button group 1110 illustrated in FIG. 6 and the like and the user subsequently executes a drop manipulation. Hereinafter, the example of the operation of the information processing system 100 according to the embodiment of the present disclosure will be described with reference to FIGS. 43 and 44.

Hereinafter, the drop manipulation on the menu button 1100 or the menu button group 1110 is also simply referred to as a drop manipulation (on the menu) in some cases.

When the information processing system 100 detects that the user executes a drop manipulation on a menu displayed by the information processing system 100 (step S1211), the information processing system 100 determines whether a distance dragged by the user is equal to or less than a prescribed distance (step S1212). The processes of the foregoing steps S1211 and 1212 are executed by, for example, the detection unit 121.

When it is determined in the foregoing step S1212 that the distance dragged by the user is equal to or less than the prescribed distance (Yes in step S1212), the information processing system 100 executes functions assigned to the dropped menu (step S1213). The functions assigned to the menu are, for example, various functions such as activation of an application, display of a website, display of image data, and reproduction of music data and are not limited to specific functions.

Conversely, when it is determined in the foregoing step S1212 that the distance dragged by the user exceeds the prescribed distance (No in step S1212), the information processing system 100 determines whether the menu is dropped on a menu which is another menu and in which a dragged distance is equal to or less than the prescribed distance (step S1214). The determination of step S1214 is executed by, for example, the detection unit 121.

When it is determined in the foregoing step S1214 that the menu is dropped on the menu which is the other menu other than the dropped menu and in which the dragged distance is equal to or less than the prescribed distance (Yes in step S1214), the information processing system 100 subsequently determines whether the dropped menu is a menu which accepts the drop (step S1215). The determination of step S1214 is executed by, for example, the detection unit 121.

When it is determined in the foregoing step S1215 that the dropped menu is the menu that accepts the drop (Yes in step S1215), the information processing system 100 subsequently determines whether the dropped menu is a folder menu (step S1216). The determination of step S1215 is executed by, for example, the detection unit 121.

When it is determined in the foregoing step S1216 that the dropped menu is the folder menu (Yes in step S1216), the information processing system 100 subsequently adds the dropped menu to a menu (subordinate menu) in a lower hierarchy of the drop destination (step S1218). The addition process of step S1218 is executed by, for example, the output control unit 122.

Conversely, when it is determined in the foregoing step S1216 that the dropped menu is not the folder menu (No in step S1216), the information processing system 100 subsequently determines whether an item corresponding to the menu dropped by the user is handleable in the dropped menu (step S1217). The determination of step S1217 is executed by, for example, the detection unit 121.

When it is determined in the foregoing step S1217 that the item dropped by the user is handleable in the dropped menu (Yes in step S1217), the information processing system 100 subsequently delivers information linked to the menu dropped by the user to the menu receiving the drop (step S1219). The process of step S1219 is executed by, for example, the output control unit 122.

Conversely, when it is determined in step S1217 that the item dropped by the user is not handleable in the dropped menu (No in step S1217), the information processing system 100 subsequently executes a process of generating a new menu having a menu of the drop source and a menu of the drop destination in subordinate components (step S1220). The process of step S1220 is executed by, for example, the output control unit 122.

When it is determined in the foregoing step S1214 that the menu is not dropped on the menu which is the other menu other than the dropped menu and in which the dragged distance is equal to or less than the prescribed distance (No in step S1214), the information processing system 100 subsequently determines whether a menu other than the dropped menu approaches the menu on which the menu is dropped by a distance equal to or less than the prescribed distance in a state in which the other menu is pressed at one point (step S1221). The determination of step S1221 is executed by, for example, the detection unit 121.

When it is determined in the foregoing step S1221 that the menu other than the dropped menu approaches the dropped menu by the distance equal to or less than the prescribed distance in the state in which the other menu is pressed at one point (Yes in step S1221), the information processing system 100 subsequently determines whether the dropped menu and the other menu can be merged (step S1222). The determination of step S1222 is executed by, for example, the detection unit 121.

When it is determined in the foregoing step S1222 that the dropped menu and the other menu can be merged (Yes in step S1222), the information processing system 100 subsequently executes a process of merging a subordinate menu of the dropped menu and a subordinate menu of the other menu (step S1223). The process of step S1223 is executed by, for example, the output control unit 122. When it is determined in the foregoing step S1222 that the dropped menu and the other menu may not be merged (No in step S1222), the information processing system 100 subsequently executes a process of returning the dropped menu to the position before the drag (step S1226). The process of step S1226 is executed by, for example, the output control unit 122.

When it is determined in the foregoing step S1221 that the menu other than the dropped menu does not approach the dropped menu by the distance equal to or less than the prescribed distance in the state in which the other menu is pressed at one point (No in step S1221), the information processing system 100 subsequently determines whether the dropped menu is dropped on a location within a fixed distance from each of two menus of the same hierarchy (step S1224). The determination of step S1224 is executed by, for example, the detection unit 121.

When it is determined in the foregoing step S224 that the dropped menu is dropped on the location within the fixed distance from each of the two menus of the same hierarchy (Yes in step S1224), the information processing system 100 subsequently executes a process of inserting the dragged and dropped menu between the two menus (step S1225). The process of step S1225 is executed by, for example, the output control unit 122.

Conversely, when it is determined in the foregoing step S1224 that the dropped menu is not dropped on the location within the fixed distance from each of the two menus of the same hierarchy (No in step S1224), the information processing system 100 subsequently determines whether the menu is dragged at a speed equal to or greater than a fixed speed until the menu is dropped (step S1227). The determination of step S1227 is executed by, for example, the detection unit 121.

When it is determined in the foregoing step S1227 that the menu is dragged at a speed equal to or greater than the fixed speed until the menu is dropped (Yes in step S1227), the information processing system 100 subsequently determines whether the dropped menu can be deleted (step S1228). The determination of step S1228 is executed by, for example, the detection unit 121.

When it is determined in the foregoing step S1228 that the dropped menu can be deleted (Yes in step S1228), the information processing system 100 subsequently executes a process of deleting the dragged menu (step S1230). The process of step S1230 is executed by, for example, the output control unit 122. Conversely, when it is determined in the foregoing step S1228 that the dropped menu may not be deleted (No in step S1228), the process of returning the dropped menu to the position before the drag is executed (step S1226). The process of step S1226 is executed by, for example, the output control unit 122.

When it is determined in the foregoing step S1227 that the menu is dragged at a speed less than the fixed speed until the menu is dropped (No in step S1227), the information processing system 100 subsequently determines whether the drop location is outside the screen (step S1229). The determination of step S1229 is executed by, for example, the detection unit 121.

When it is determined in the foregoing step S1229 that the drop location is outside the screen (Yes in step S1229), the information processing system 100 subsequently determines whether the dropped menu can be deleted in the foregoing step S1228. Conversely, when it is determined in the foregoing step S1229 that the drop location is not outside the screen (No in step S1229), the information processing system 100 subsequently executes a process of moving the menu to the drop location (step S1231). The process of step S1231 is executed by, for example, the output control unit 122.

The information processing system 100 can change the state of the menu dropped by the user according to the drop location, the speed of the drag, and the like by executing the above-described series of processes.

Figure 53:
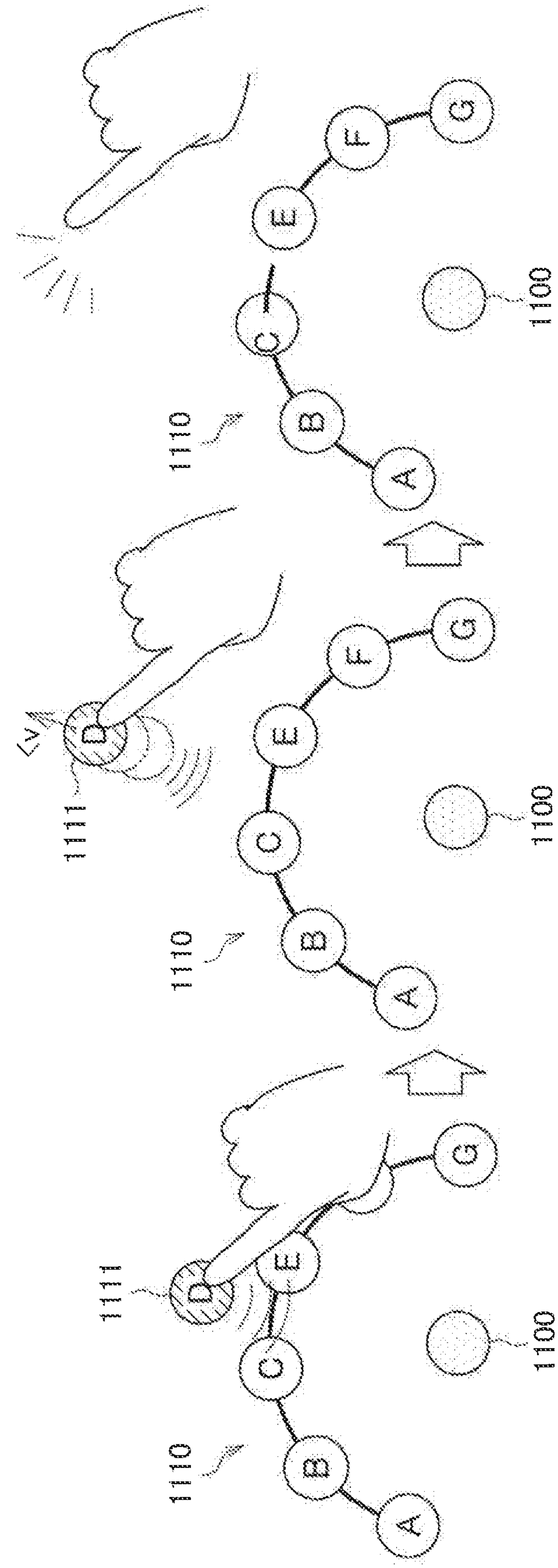
FIG. 53 is an explanatory diagram illustrating an example of a GUI of an application.

The above-described examples of the operations will be further described giving examples of specific GUIs. First, an example of a GUI in which the menu button is deleted will be described. FIG. 53 is an explanatory diagram illustrating an example of a GUI of an application displayed on the information display surface by the information processing system 100 according to an embodiment of the present disclosure. FIG. 53 illustrates an example of a drop manipulation on the menu by the user and the example of the GUI when the menu is dragged at a speed equal to or greater than a fixed speed. When the user drags one menu button 1111 in the menu button group 1110 at a speed equal to or greater than a fixed speed v and subsequently drops the menu button 1111 inside the screen (that is, an operation of flicking the menu button 1111), the information processing system 100 executes a process of deleting the menu button 1111. By detecting the operation of flicking the menu button and executing the process of deleting the menu button in this way, the information processing system 100 can supply the user with the GUI which is easy for the user to intuitively understand.

Figure 54:
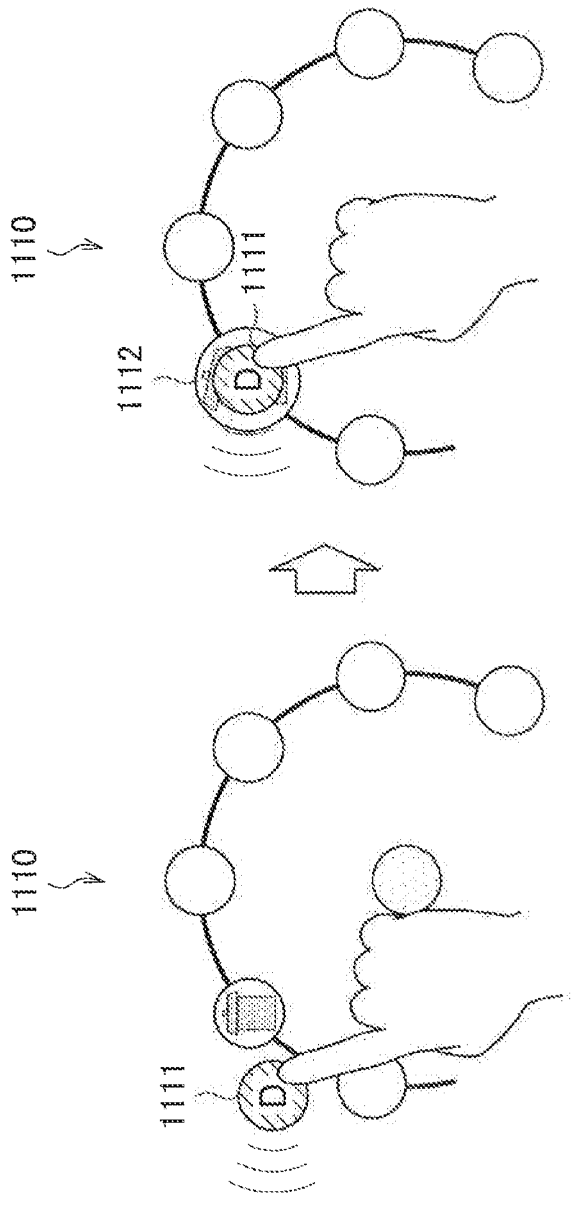
FIG. 54 is an explanatory diagram illustrating an example of a GUI of an application.

The deletion of the menu button is not limited to the related example. FIG. 54 is an explanatory diagram illustrating an example of a GUI of an application displayed on the information display surface by the information processing system 100 according to an embodiment of the present disclosure. FIG. 54 illustrates an example of a drop manipulation on the menu by the user and a state in which the user executes a manipulation of dropping the menu button 1111 into a trash menu 1112. When the user drops the menu button 1111 into the trash menu 1112 in this way, the information processing system 100 executes a process of deleting the menu button 1111.

Figure 55:
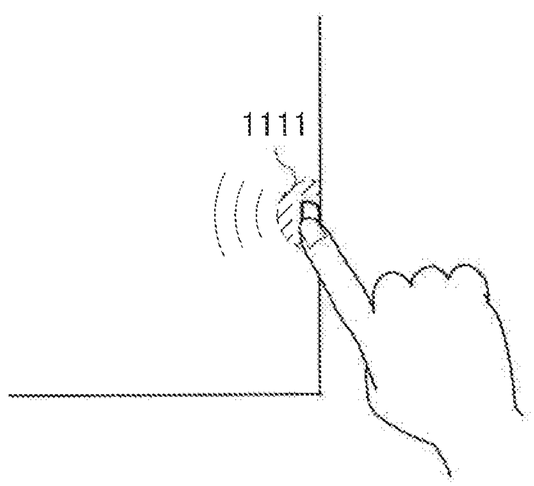
FIG. 55 is an explanatory diagram illustrating an example of a GUI of an application.

FIG. 55 is an explanatory diagram illustrating an example of a GUI of an application displayed on the information display surface by the information processing system 100 according to an embodiment of the present disclosure. FIG. 55 illustrates an example of a drop manipulation on the menu by the user and a state in which the user executes a manipulation of moving and dropping the menu button 1111 outside the screen. When the information processing system 100 detects that the user executes the manipulation of moving and dropping the menu button 1111 outside the screen, the information processing system 100 executes the process of deleting the menu button 1111.

The examples of the GUIs in which the menu button is deleted have been described above. Next, an example of a GUI in which the menu button is added to the menu button group will be described.

Figure 56:
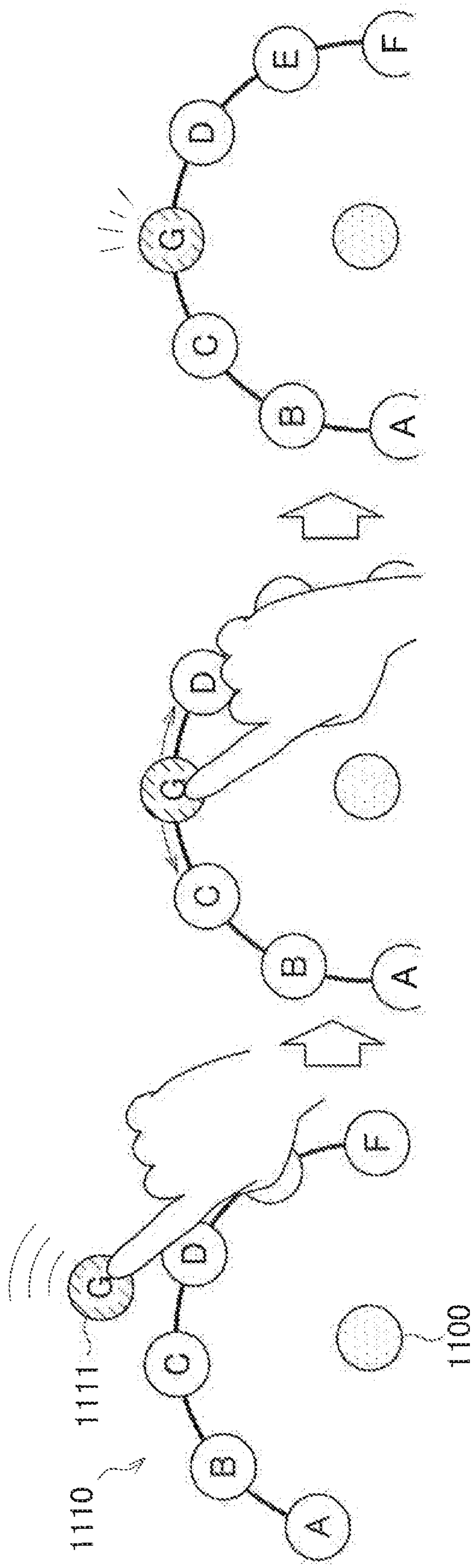
FIG. 56 is an explanatory diagram illustrating an example of a GUI of an application.

FIG. 56 is an explanatory diagram illustrating an example of a GUI of an application displayed on the information display surface by the information processing system 100 according to an embodiment of the present disclosure. FIG. 56 illustrates an example of a drop manipulation on the menu by the user and a state in which the user executes a manipulation of inserting the menu button into the menu button group 1110. When the user drags the menu button 1111 in an are shape displayed in the menu button group 1110, the information processing system 100 generates a gap for inserting the menu button 1111 into the arc shape in which the menu button group 1110 is displayed. Then, when the user drops the menu button 1111 in the gap in the arc shape, the information processing system 100 displays the menu button 1111 dropped on the arc shape. By detecting the operation of dropping the menu button and executing the process of adding the menu button to the menu button group, the information processing system 100 can supply the GUI which is easy for the user to intuitively understand.

The example of the GUI in which the menu button is added to the menu button group has been described above. Next, examples of GUIs in which the menu is added to a subordinate item of a drop destination menu will be described.

Figure 57:
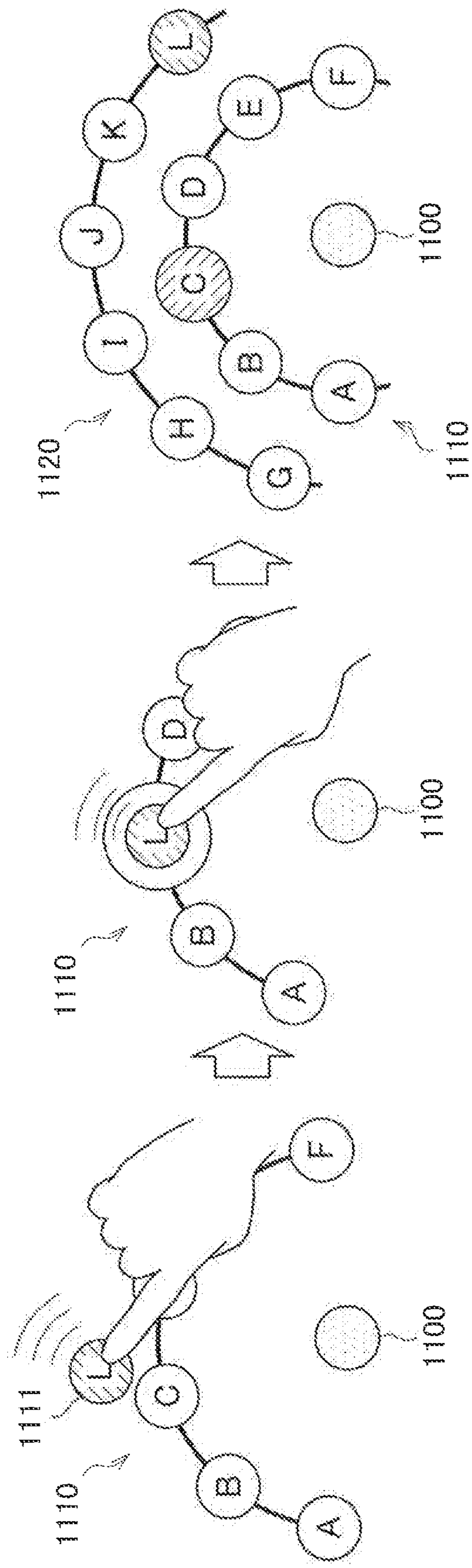
FIG. 57 is an explanatory diagram illustrating an example of a GUI of an application.

FIG. 57 is an explanatory diagram illustrating an example of a GUI of an application displayed on the information display surface by the information processing system 100 according to an embodiment of the present disclosure. FIG. 57 illustrates an example of a drop manipulation on the menu by the user and illustrates a state in which the user executes a manipulation of dropping the menu button on a menu button in the menu button group 1110. When the drop destination menu is a folder menu and the user first drags the menu button to a location of the menu button on which the user intends to drop the menu button, the information processing system 100 broadly displays the menu button on which the user intends to drop the menu button, as illustrated in FIG. 57. Then, when the user drops the menu button on the location, the information processing system 100 displays the dropped menu button so that the dropped button is added to a subordinate menu of the drop destination, as illustrated in FIG. 57. The information processing system 100 may display the dropped menu button to be added to the end of the subordinate menu of the drop destination menu or may display the dropped menu button to be added to the closest position of the drop destination menu.

Figure 58:
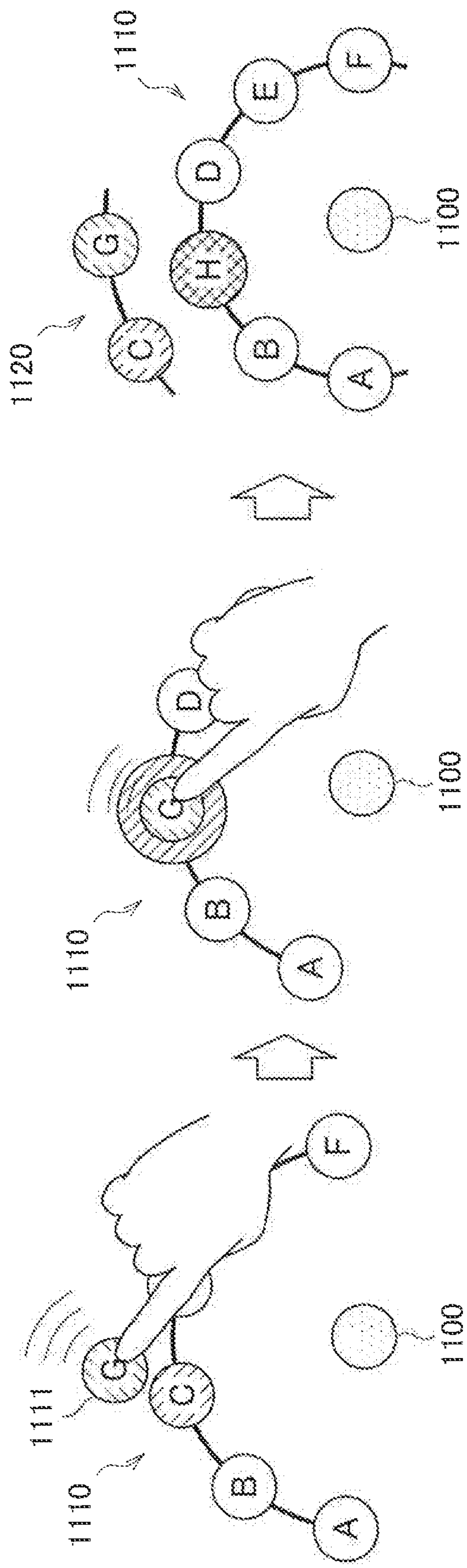
FIG. 58 is an explanatory diagram illustrating an example of a GUI of an application.

FIG. 58 is an explanatory diagram illustrating an example of a GUI of an application displayed on the information display surface by the information processing system 100 according to an embodiment of the present disclosure. FIG. 58 illustrates an example of a drop manipulation on the menu by the user and illustrates a state in which the user executes a manipulation of dropping the menu button on a menu button in the menu button group 1110. When the drop destination menu is an application or data and the user first drags the menu button to the location of the menu button on which the user intends to drop the menu button, the information processing system 100 broadly displays the menu button on which the user intends to drop the menu button, as illustrated in FIG. 58. Then, when the user drops the menu button on the location, the information processing system 100 newly displays a menu button of the folder menu in the location in which the menu button of the drop destination has been displayed until then and displays the dropped menu button and the menu button of the drop destination as a subordinate menu of the folder menu, as illustrated in FIG. 58. That is, the information processing system 100 executes a process of merging the dropped menu button and the menu button of the drop destination.

The examples of the GUIs in which the menu is added to the subordinate item of the drop destination menu have been described above. The examples of the case in which the menu button of the drop destination is not pressed with a finger of the user have been described above. Examples of cases in which a menu button of a drop destination is pressed with a finger of the user will be described below.

Figure 59:
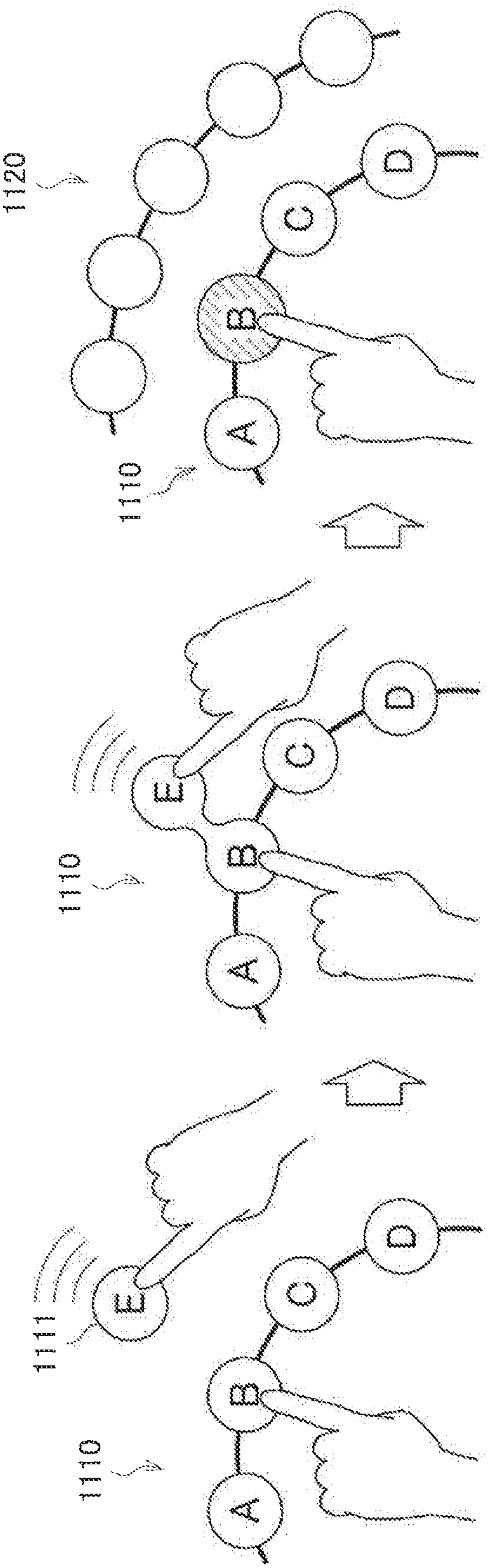
FIG. 59 is an explanatory diagram illustrating an example of a GUI of an application.

FIG. 59 is an explanatory diagram illustrating an example of a GUI of an application displayed on the information display surface by the information processing system 100 according to an embodiment of the present disclosure. FIG. 59 illustrates an example of a drop manipulation on the menu by the user and a state in which the user executes a manipulation of dropping another menu button 1111 on a certain menu button while pressing the menu button in the menu button group 1110 with his or her finger. When the user brings the other menu button 1111 within a distance equal to or less than a prescribed distance from the certain menu button while pressing the certain menu button in the menu button group 1110 with his or her finger, the information processing system 100 displays the menu buttons so that the menu buttons are joined, as illustrated in FIG. 59. Then, when the user drops the dragged menu button 1111 while pressing the certain menu button in the menu button group 1110 with his or her finger, a process of merging the subordinate menus of the two menu buttons is executed. When the subordinate menus are merged, the information processing system 100 may display the menu buttons displaced in the menu button group 1110 without change or may display the other menu buttons in an are shape of the menu button group 1110.

Figure 60:
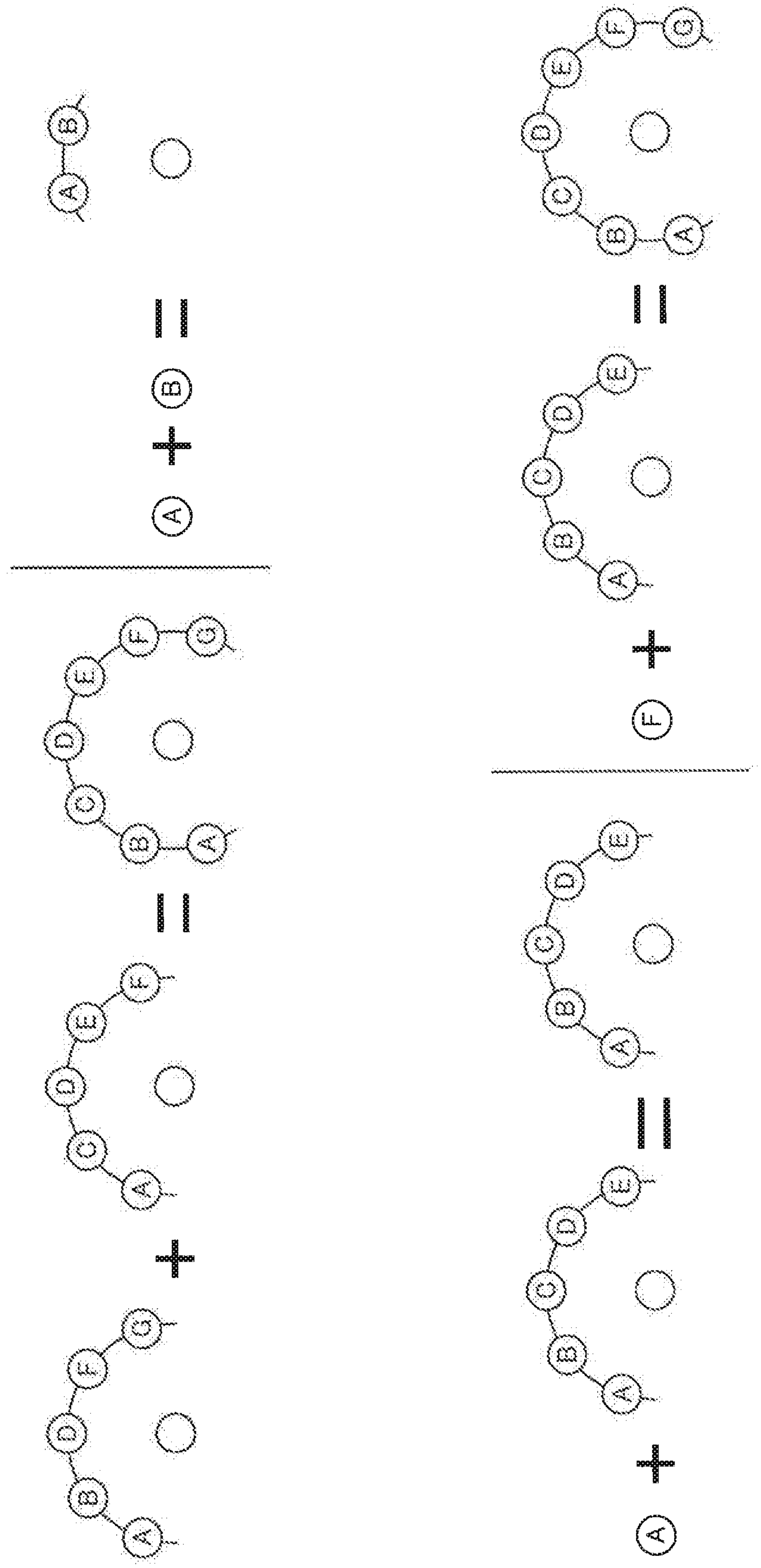
FIG. 60 is an explanatory diagram illustrating an example of a GUI of an application.

In this way, the information processing system 100 merges the menus when the user drops another menu button on a certain menu button while pressing the menu button with his or her finger. FIG. 60 is an explanatory diagram illustrating an example of a GUI of an application displayed on the information display surface by the information processing system 100 according to an embodiment of the present disclosure. The merging example of the menus has been described. FIG. 60 illustrates a merging example of the menus when the user drops another menu button on a certain menu button while pressing the menu button with his or her finger. When the same subordinate menu is included at the time of the merging, the information processing system 100 may generate only one subordinate menu rather than two subordinate menus. For example, FIG. 60 illustrates an example in which, when menus including subordinate menus A, B, D, F, and G and subordinate menus A, C, D, E, and F are merged, the subordinate menus A, D, and F common to both menus are included as single menus.

The examples of the cases in which the menu button of the drop destination is pressed with a finger of the user have been described above. Next, examples of manipulations on menus in the information processing system 100 according to an embodiment of the present disclosure will be further described giving specific examples.

Figure 61:
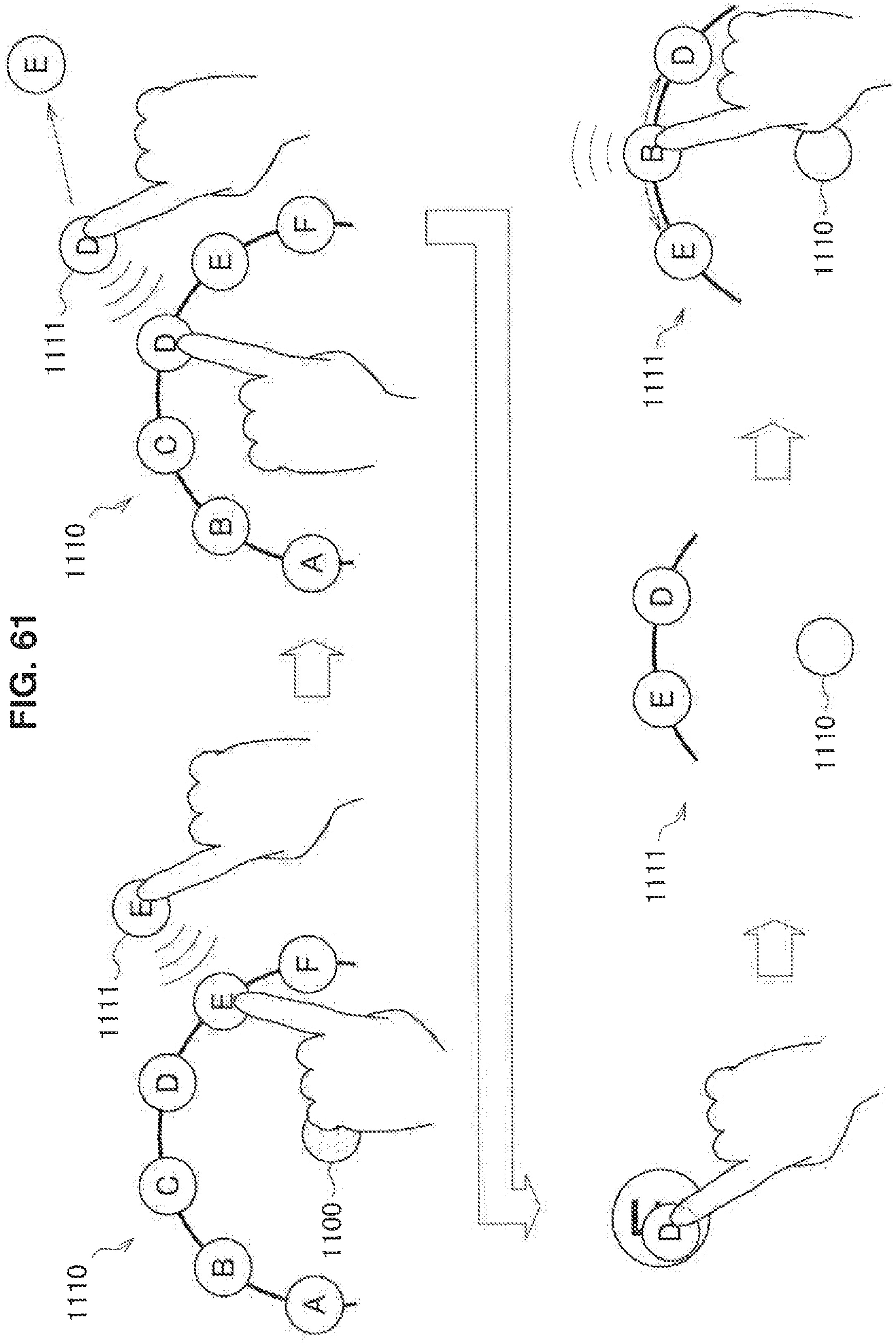
FIG. 61 is an explanatory diagram illustrating an example of a GUI of an application.

FIG. 61 is an explanatory diagram illustrating an example of a GUI of an application displayed on the information display surface by the information processing system 100 according to an embodiment of the present disclosure. FIG. 61 illustrates a generation example of a new menu according to a drag manipulation and a drop manipulation from the user in an application displayed by the information processing system 100. In a state in which the menu button 1100 and the menu button group 1110 are displayed as in FIG. 61, the information processing system 100 generates a copy of the menu button 1111 according to a user manipulation of dragging the certain menu button 1111 in the menu button group 1110 with one finger while pressing the menu button 1111 with another finger.

FIG. 61 illustrates an example in which copies of menus D and E in the menu button group 1110 are generated based on a user manipulation. The information processing system 100 generates a new menu button 1100 and a menu button group 1110 according to a user manipulation of merging copies of the menus D and E.

When another menu button 1111 is dropped toward the newly generated menu button group 1110, the information processing system 100 adds the dropped menu button 1111 to the newly generated menu button group 1110, as illustrated in FIG. 61.

By receiving the drag manipulation or the drop manipulation by the user, the information processing system 100 according to the embodiment of the present disclosure can ensure ease of customization of the menu. By receiving the drag manipulation or the drop manipulation by the user, the information processing system 100 according to the embodiment of the present disclosure can allow a plurality of users to simultaneously use the same menu.

Figure 62:
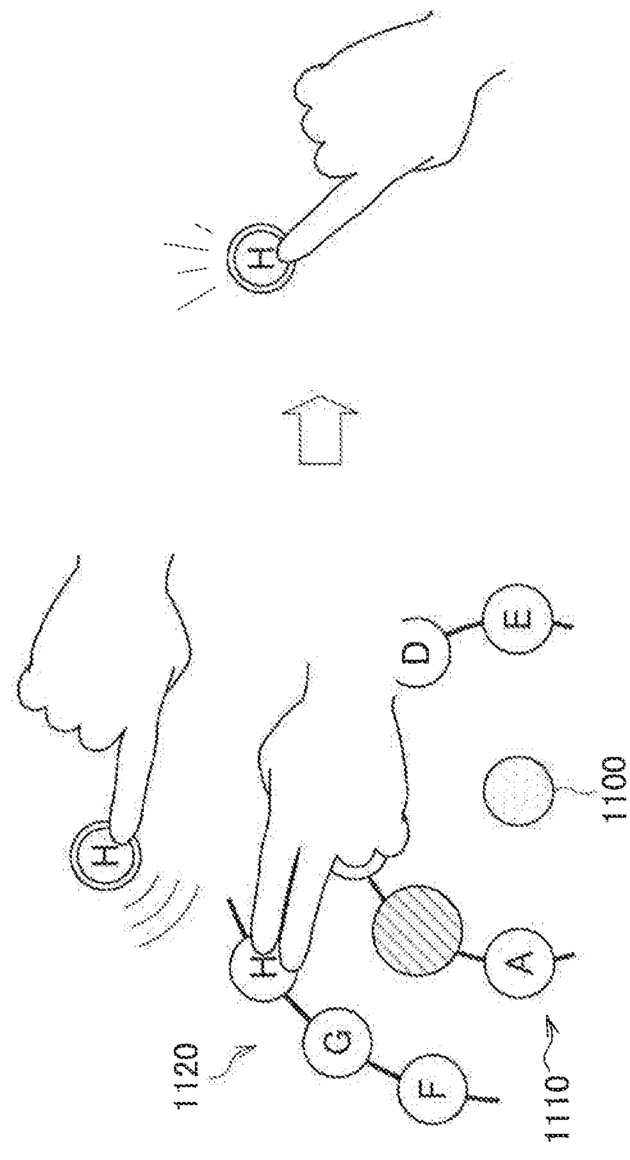
FIG. 62 is an explanatory diagram illustrating an example of a GUI of an application.

Another embodiment will be described. FIG. 62 is an explanatory diagram illustrating an example of a GUI of an application displayed on the information display surface by the information processing system 100 according to an embodiment of the present disclosure. FIG. 62 illustrates a generation example of a shortcut button according to a drag manipulation and a drop manipulation from a user in an application displayed by the information processing system 100. For example, in a normal case, the user has to select menu buttons in sequence in the order of a menu button 1100, a menu button group 1110, and a menu button group 1120 through three manipulations to reach the menu button in the menu button group 1120 in the second hierarchy counted from the menu button 1100. However, the information processing system 100 generates a shortcut button based on the user manipulation, as described above, so that the user can reach the menu button in the menu button group 1120 through one manipulation.

For example, by generating shortcut buttons of menus frequently used by a plurality of users according to the number of users, the information processing system 100 can allow any user to reach the menu through one manipulation.

By generating the copy or the shortcut of the menu, as described above, the information processing system 100 can allow, for example, family members to generate a common menu or can allow the family members to generate separate menus.

Figure 63:
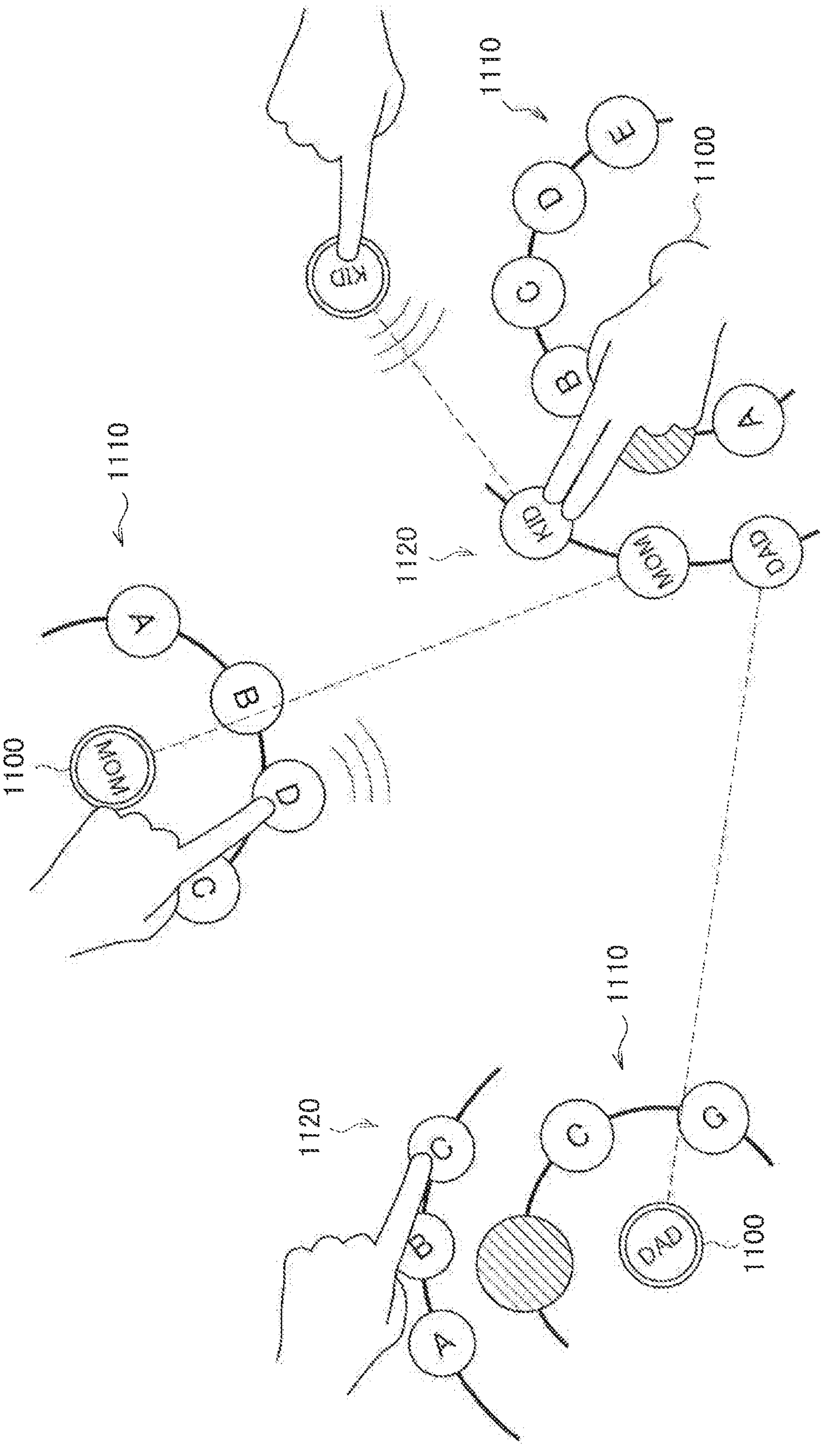
FIG. 63 is an explanatory diagram illustrating an example of a GUI of an application.

FIG. 63 is an explanatory diagram illustrating an example of a GUI of an application displayed on the information display surface by the information processing system 100 according to an embodiment of the present disclosure. FIG. 63 illustrates a generation example of menus for family members according to a drag manipulation and a drop manipulation from the user in the application displayed by the information processing system 100.

In the lower right of FIG. 63, the menu button 1100 and the menu button groups 1110 and 1120 are illustrated. FIG. 63 illustrates a state in which a father menu button, a mother menu button, and a child menu button are included in the menu button group 1120. When the menu button group 1120 is displayed in this way and the user executes a manipulation of generating shortcut buttons of the father menu button, the mother menu button, and the child menu button, the information processing system 100 generates shortcut buttons to the menu buttons. When the shortcut buttons to the menu buttons are generated, a father, a mother, and a child can use their own menus and customize the menus so that they can easily use the menus by merely touching the shortcut buttons with manipulators such as their fingers. The customization of the menus displayed through manipulations on the shortcut buttons is also reflected in the original menus.

The information processing system 100 can allow the users to generate, for example, bookmarks of websites easily and intuitively by generating the copies of the menus, as described above.

Figure 64:
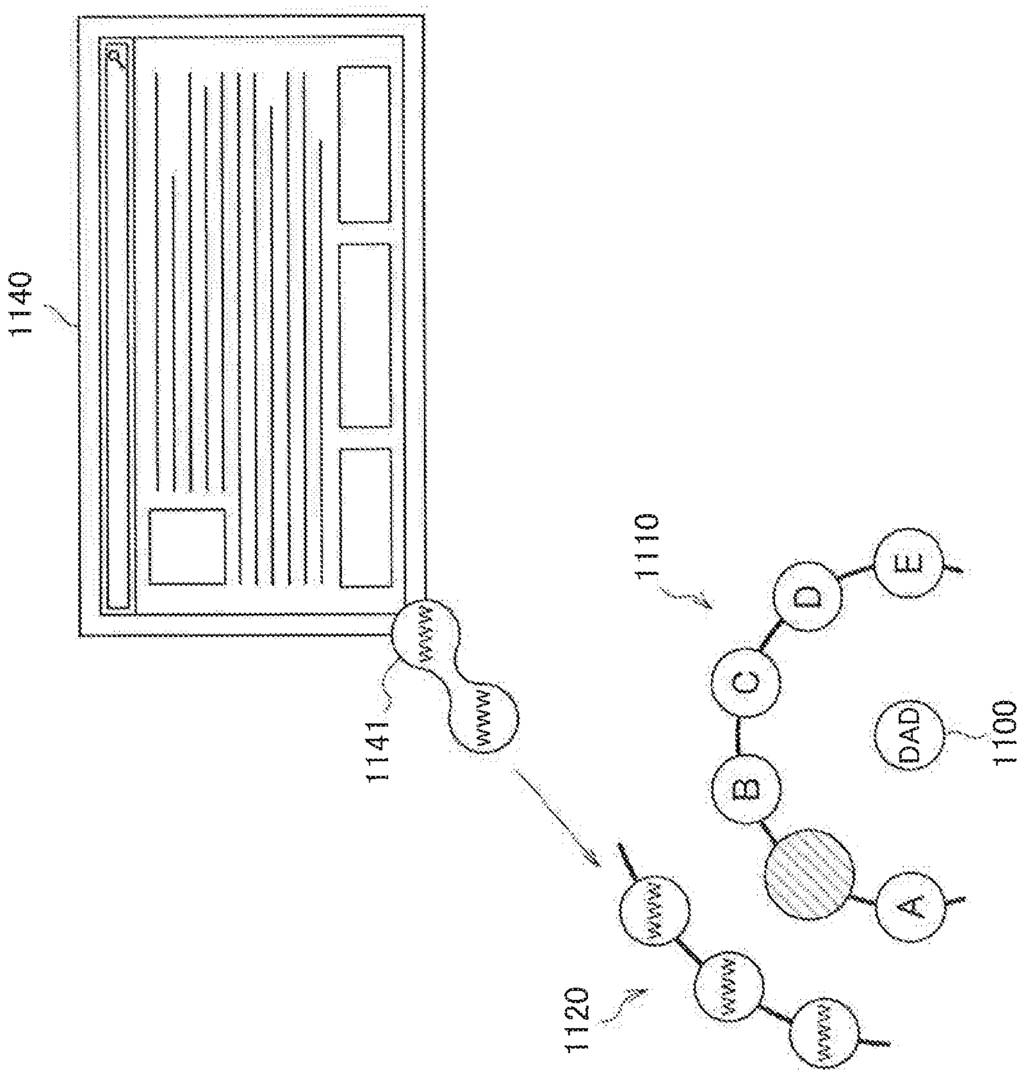
FIG. 64 is an explanatory diagram illustrating an example of a GUI of an application.

FIG. 64 is an explanatory diagram illustrating an example of a GUI of an application displayed on the information display surface by the information processing system 100 according to an embodiment of the present disclosure. FIG. 64 illustrates a generation example of a bookmark menu according to a drag manipulation and a drop manipulation from the user in an application displayed by the information processing system 100.

FIG. 64 illustrates a state in which the menu button 1100 and the menu button groups 1110 and 1120 are displayed by the information processing system 100. FIG. 64 illustrates a state in which a web browser 1140 displaying a web site on the Internet is displayed as an example of an application by the information processing system 100. FIG. 64 illustrates a state in which a menu button 1141 for connection to a currently displayed web page is displayed in the bottom left of the web browser 1140 by the information processing system 100. When the information processing system 100 detects that the user executes a manipulation of generating a copy on the menu button 1141, the information processing system 100 generates a copy of the menu button 1141 according to the user manipulation. The copy of the menu button 1141 can function as a bookmark of the web page. The generated copy of the menu button 1141 is added to the menu button group 1120 through, for example, a manipulation from the user. The information processing system 100 according to the embodiment of the present disclosure can allow the user to generate, for example, a bookmark of a web page intuitively and easily by offering such a manipulation to the user. The information processing system 100 according to the embodiment of the present disclosure can collect bookmarks of a plurality of web pages in one menu button group through a simple manipulation by offering such a manipulation to the user.

The information processing system 100 according to the embodiment of the present disclosure is configured to receive menu manipulations from a plurality of users, and thus a situation in which the same application or similar applications are activated by a plurality of users and are executed simultaneously can occur. When the same application or similar applications are executed simultaneously by a plurality of users, a situation in which it is difficult to comprehend who activates which application may occur. Accordingly, the information processing system 100 according to the embodiment of the present disclosure supplies a structure capable of binding menus with applications and releasing the binding through a simple user manipulation.

Figure 65:
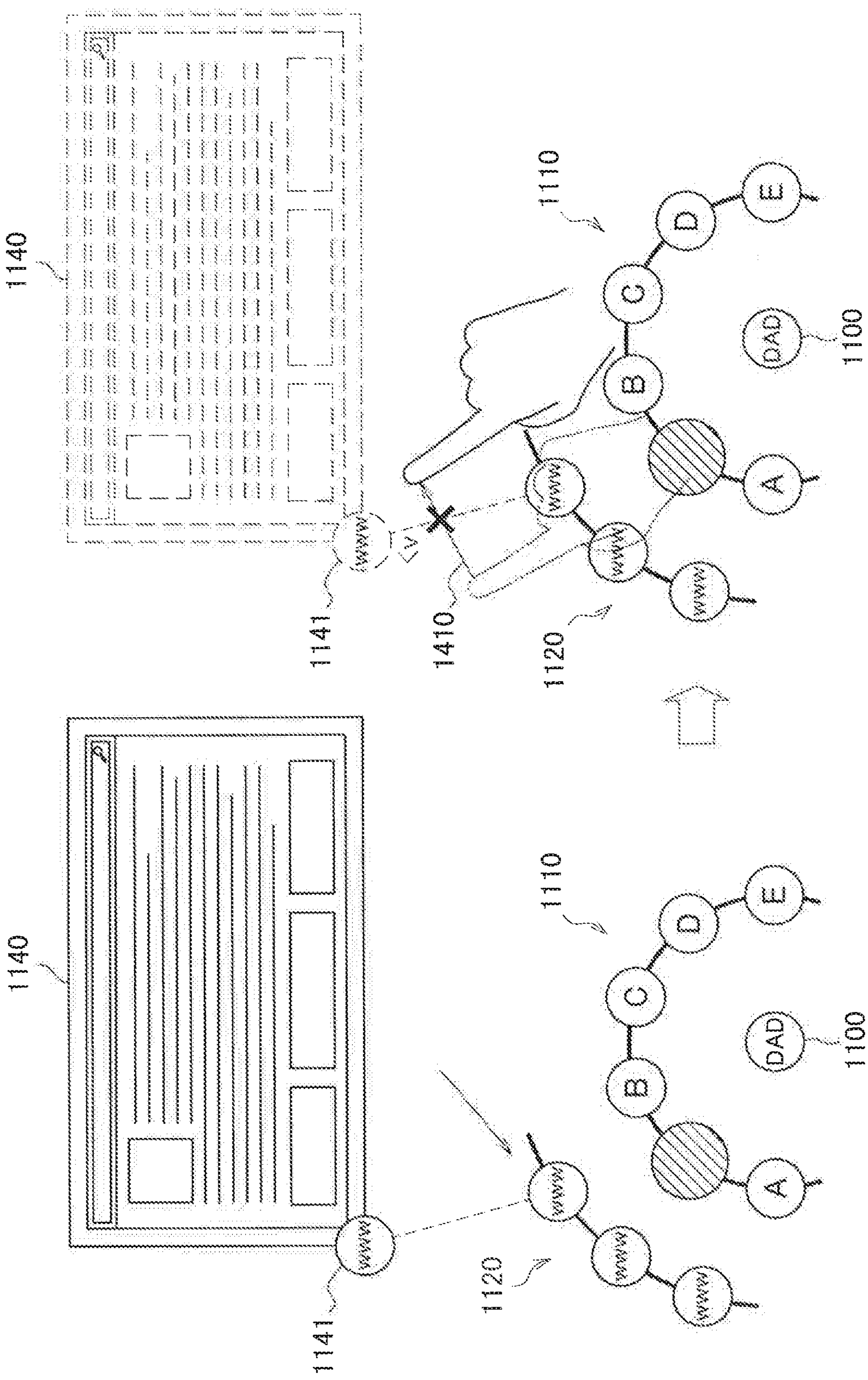
FIG. 65 is an explanatory diagram illustrating an example of a GUI of an application.

FIG. 65 is an explanatory diagram illustrating an example of a GUI of an application displayed on the information display surface by the information processing system 100 according to an embodiment of the present disclosure. FIG. 65 illustrates an example of a GUI when binding of a menu and an application displayed by the information processing system 100 is released through a manipulation from the user.

For example, in a state in which the menu button 1100, the menu button groups 1110 and 1120, and the web browser 1140 which is an example of an application are displayed by the information processing system 100, as illustrated on the left side of FIG. 65, the information processing system 100 may display one menu button in the menu button group 1120 and the menu button 1141 of the web browser 1140 by binding the menu buttons. In the example of FIG. 65, the binding of the one menu button in the menu button group 1120 and the menu button 1141 of the web browser 1140 is indicated by a broken line, but the display of the binding in the present disclosure is not limited to the related example.

When the information processing system 100 detects that the user executes a predetermined manipulation, for example, the user executes a manipulation of cutting the binding at a speed equal to or greater than a predetermined speed in the display of the binding, the information processing system 100 executes a process of releasing the binding of the one menu button in the menu button group 1120 and the menu button 1141 of the web browser 1140. When the binding is released, the information processing system 100 executes a process of closing the web browser 1140. When the process of closing the web browser 1140 is executed, the information processing system 100 may execute a display process of gradually thinning the web browser 1140 and finally removing the display, as illustrated in FIG. 65.

The information processing system 100 according to the embodiment of the present disclosure can bind the menu with the application and can release the binding through a simple user manipulation.

By binding the menu with the application, as illustrated in FIG. 64, the information processing system 100 according to the embodiment of the present disclosure can offer various other manipulations to the user. For example, the projection type information processing system 100*a* illustrated in FIG. 1 displays information on a display surface with a large area as in the table 140*a*, and thus the user may wish to bring an application located away from him or her close to his or her hand. Accordingly, by allowing the user to execute a manipulation of bringing the display close to him or her in the display of the binding of the menu and the application, the information processing system 100 may execute a display process of moving a window of the application according to the user manipulation.

Figure 66:
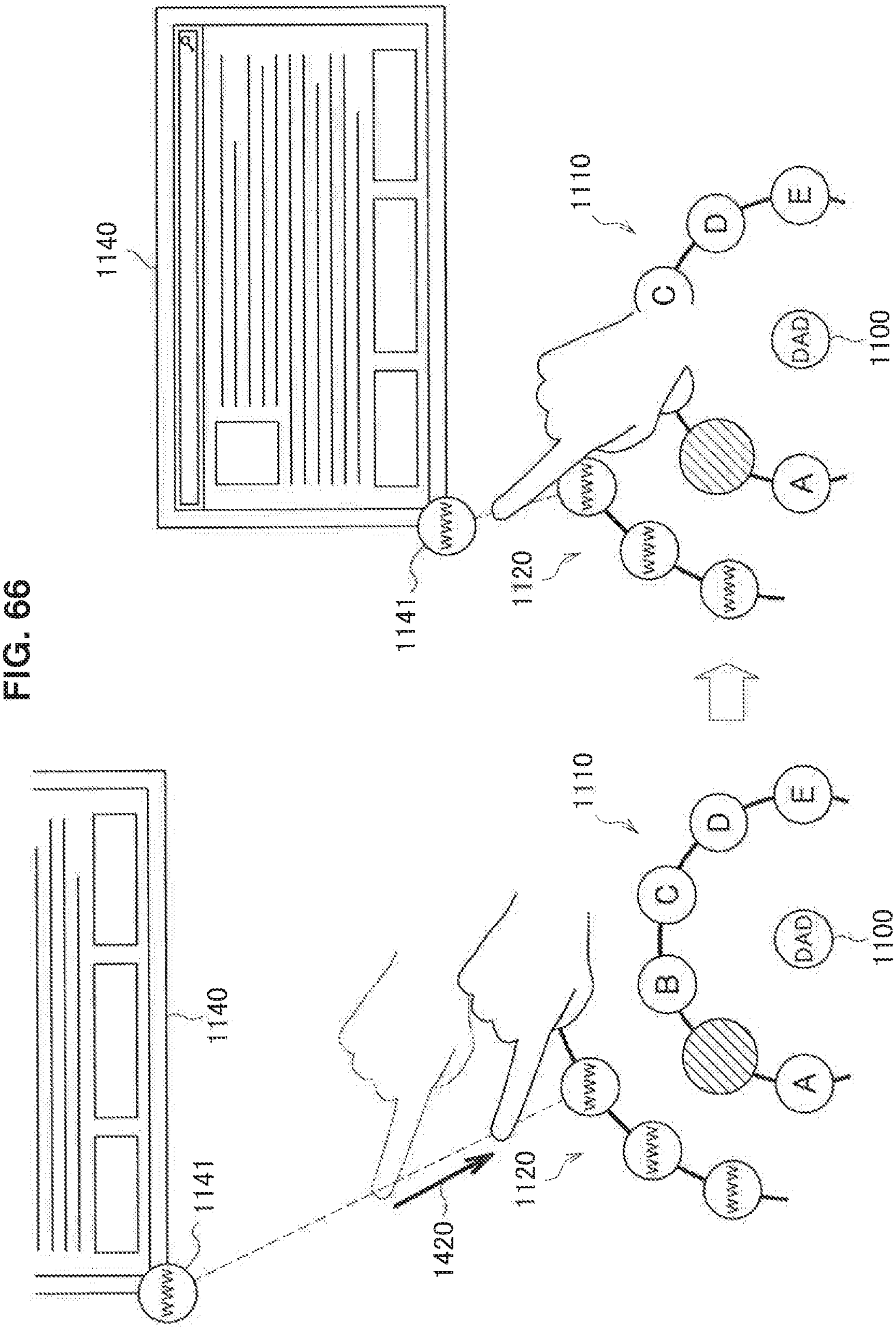
FIG. 66 is an explanatory diagram illustrating an example of a GUI of an application.

FIG. 66 is an explanatory diagram illustrating an example of a GUI of an application displayed on the information display surface by the information processing system 100 according to an embodiment of the present disclosure. FIG. 66 illustrates an example of a GUI when the user manipulates the binding of the menu and the application displayed by the information processing system 100.

In FIG. 66, the menu button 1100, the menu button groups 1110 and 1120, and the web browser 1140 which is the example of the application are displayed by the information processing system 100. FIG. 66 illustrates a state displayed by the information processing system 100 so that one menu button in the menu button group 1120 is bound up with the menu button 1141 of the web browser 1140. When the menu button and the window are displayed by the information processing system 100 in this way and the user executes a manipulation of bringing a line of the binding close to his or her hand (in the direction of the menu button group 1120), the information processing system 100 executes a display process of causing the web browser 1140 to be close to the menu button group 1120 according to the detection of the manipulation.

By executing the display process of moving the window of the application according to the execution of the user manipulation of bringing the display of the binding close to the user's hand, the information processing system 100 can improve convenience of the user manipulation. In FIG. 65, the example of the case in which the user executes the manipulation of bringing the window of the application close to his or her hand is illustrated. However, in contrast, when the user executes a manipulation of keeping a window of an application away from his or her hand, the information processing system 100 executes a display process of keeping the window of the application away from the menu button.

By binding the menu with the application, as illustrated in FIG. 64, the information processing system 100 according to the embodiment of the present disclosure can allow the user to manipulate an application at a location away from the window of the application.

Figure 67:
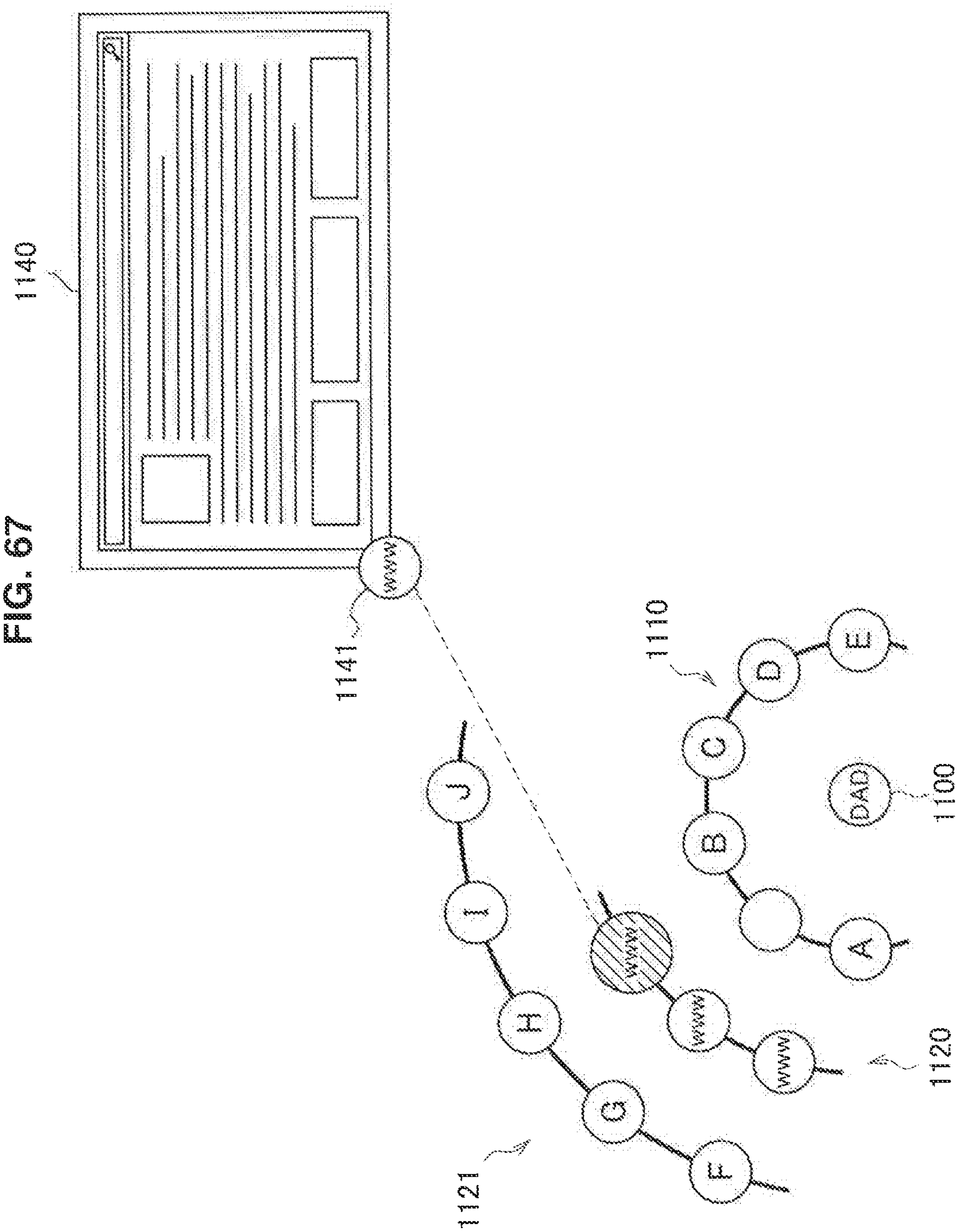
FIG. 67 is an explanatory diagram illustrating an example of a GUI of an application.

FIG. 67 is an explanatory diagram illustrating an example of a GUI of an application displayed on the information display surface by the information processing system 100 according to an embodiment of the present disclosure. FIG. 67 illustrates an example of a GUI when the user executes a manipulation in the state in which the menu and the application displayed by the information processing system 100 are bound up together.

In FIG. 67, the menu button 1100, the menu button groups 1110, 1120, and 1121 and the web browser 1140 which is the example of the application are displayed by the information processing system 100. FIG. 67 illustrates a state displayed by the information processing system 100 so that one menu button in the menu button group 1120 is bound up with the menu button 1141 of the web browser 1140. In the menu button group 1121, menus for manipulating the web browser 1140 are assumed to be arranged. When the menu button and the window are displayed by the information processing system 100 in this way and the user manipulates the menu button group 1121, the information processing system 100 executes a process (for example, a process of opening a web page with a bookmark, returning to a previous page, moving to a next page, or closing the web browser) on the web browser 1140 according to the manipulation.

By manipulating the application at the location away from the window of the application in this way, the information processing system 100 can improve the convenience of the user manipulation. For example, the projection type information processing system 100*a* illustrated in FIG. 1 displays information on a display surface with a large area as in the table 140*a*. Therefore, even when the application is displayed at a position far from the user, a remote manipulation is possible due to the binding, and thus it is possible to improve the convenience of the user manipulation.

In the example of FIG. 67, the web browser 1140 is illustrated as the application, but the application which can be remotely manipulated is not limited to the related example. For example, when the application is music reproduction software, adjustment of a volume, skip, fast-forwarding, or rewinding of music, or the like can be remotely manipulated by binding the menu button with the application. For example, when the application is moving-image reproduction software, adjustment of a volume, skip, fast-forwarding, or rewinding of a moving image, or the like can be remotely manipulated by binding the menu button with the application.

In the above-described examples, the information processing system 100 displaying the GUI for displaying the menu button groups 1110 and 1120 using the menu button 1100 as a starting point has been described. However, the starting point of the menu button group 1110 and 1120 is not limited to the menu button 1100. For example, the information processing system 100 may display the menu button groups 1110 and 1120 using a mobile phone, a smartphone, or another portable terminal owned by the user as a starting point. In the above-described examples, the examples in which the information processing system 100 and the portable terminal are linked have been described. The information processing system 100 can also display the menu button groups 1110 and 1120 using the portable terminal linked to the information processing system 100 as a starting point.

Figure 68:
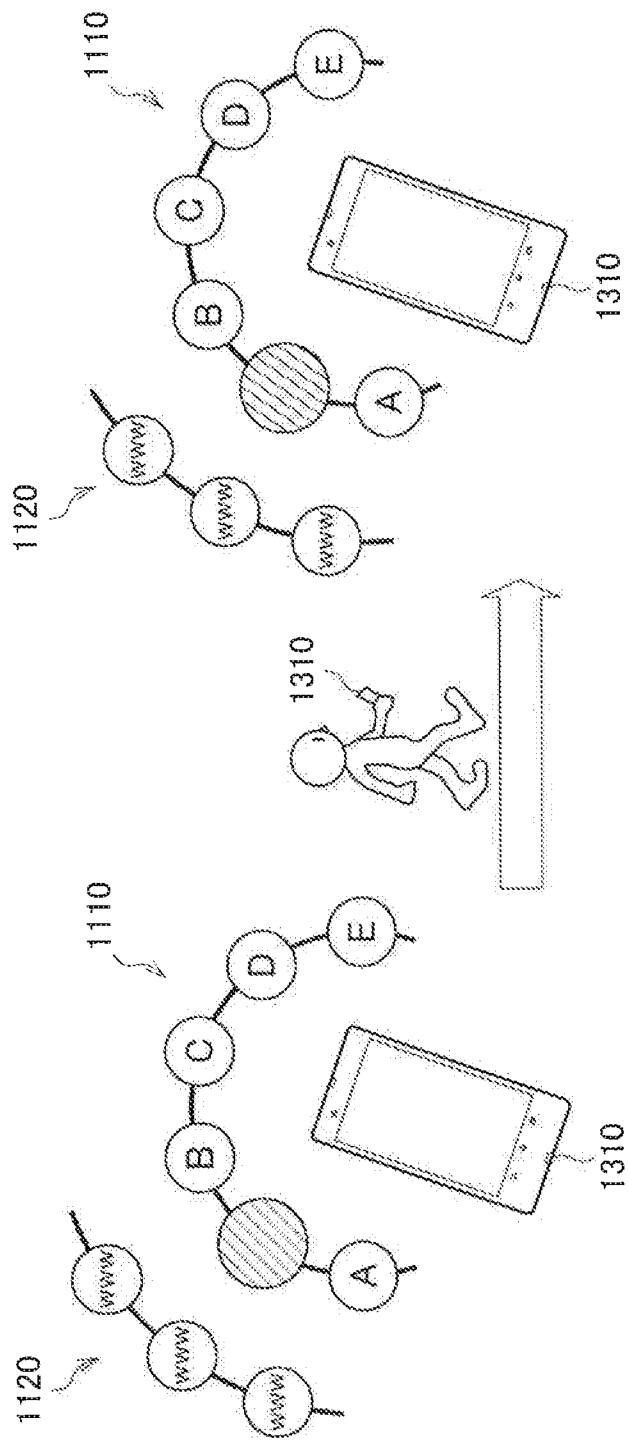
FIG. 68 is an explanatory diagram illustrating an example of a GUI of an application.

FIG. 68 is an explanatory diagram illustrating an example of a GUI of an application displayed on the information display surface by the information processing system 100 according to an embodiment of the present disclosure. FIG. 68 illustrates an example of a GUI when the portable terminal 1310 linked to the information processing system 100 is used as the starting point of the display of the menu button groups 1110 and 1120. When the information processing system 100 is linked to the portable terminal 1310 and the user executes a predetermined manipulation, the information processing system 100 may display the menu button group 1110 and 1120 around the portable terminal 1310, as illustrated in FIG. 68.

By storing information regarding the menu button groups 1110 and 1120 in the portable terminal 1310, it is possible to display the menu button groups 1110 and 1120 in substantially the same layout even when the portable terminal 1310 is linked to another information processing system 100. For example, the user can edit the layout of the menu button groups 1110 and 1120 at home, store the layout in the portable terminal 1310, bring the portable terminal 1310 to his or her friend's home, and display the menu button groups 1110 and 1120 that he or she edited at home using the information processing system 100 at his or her friend's home.

The information processing system 100 according to the embodiment of the present disclosure can allow each user, for example, each family member, to generate each different menu by generating the shortcut button, as illustrated in FIG. 63. The information processing system 100 according to the embodiment of the present disclosure may bind an account of each user with the menu that he or she generated in this way.

Figure 69:
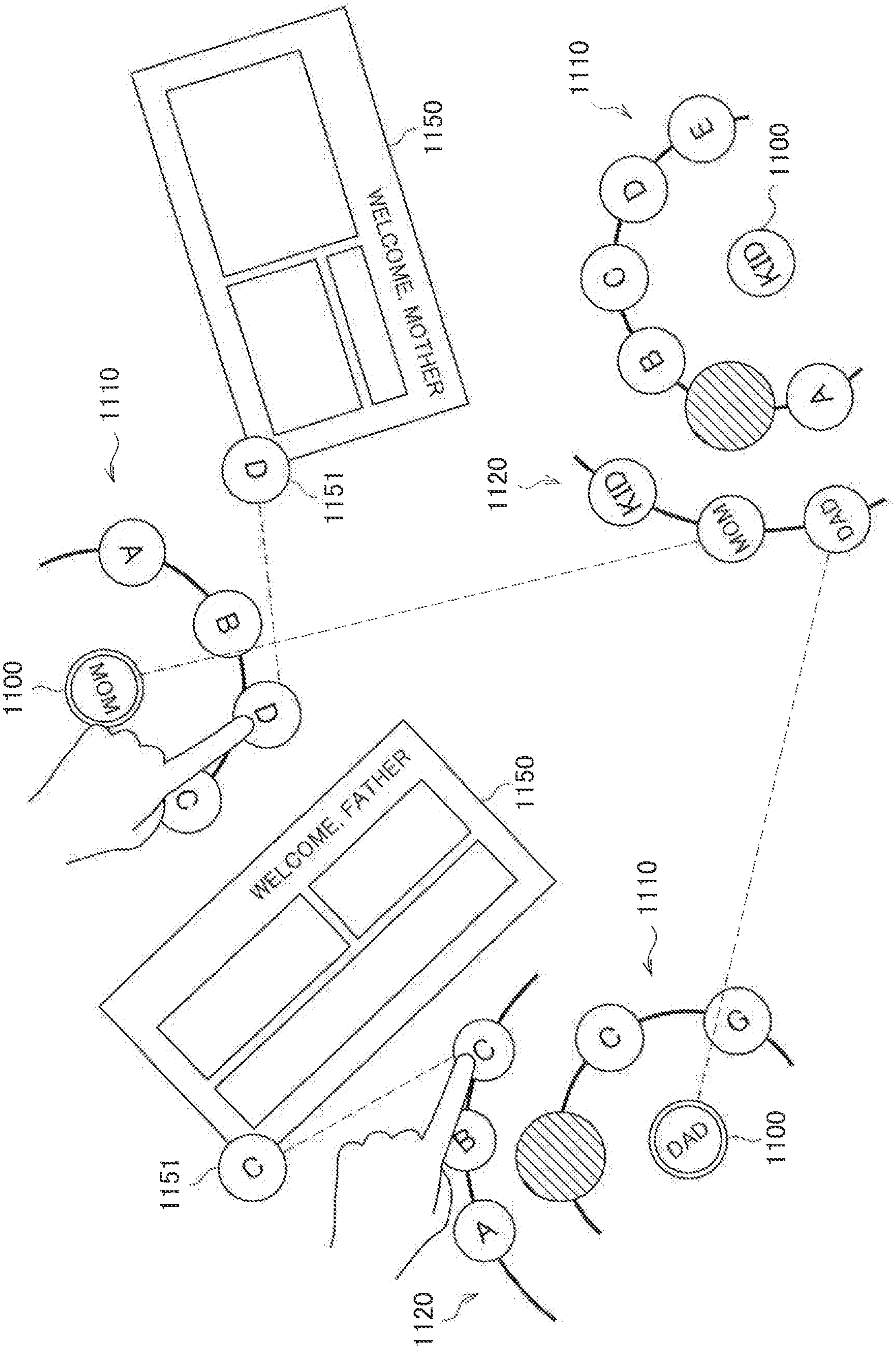
FIG. 69 is an explanatory diagram illustrating an example of a GUI of an application.

FIG. 69 is an explanatory diagram illustrating an example of a GUI of an application displayed on the information display surface by the information processing system 100 according to an embodiment of the present disclosure. FIG. 69 illustrates a state in which the account of each user is bound up with the menu that he or she generated. FIG. 69 illustrates windows 1150 of applications used by a father and a mother and menu buttons 1151 for manipulating the applications. For example, the information processing system 100 can store cookies of a web browser, record login information of a web page, or manage an access history of a web page for each user by binding the account of each user with the menu that he or she generated.

A form in which the information processing system 100 according to the embodiment of the present disclosure is simultaneously used by a plurality of users can be assumed. Accordingly, when the menu customized for each user is generated, as described above, a situation in which a certain user uses the menu of another user can occur. When the menu of the user is not locked, anyone can simply use the menu of the user.

Accordingly, the information processing system 100 according to the embodiment of the present disclosure supplies a structure in which the menu is not usable when authentication is not gained. An authentication scheme may be a password scheme or may be a device authentication scheme using the portable terminal used by the user. In the following example, a structure in which access to the menu is authenticated in accordance with the device authentication scheme will be described.

Figure 70:
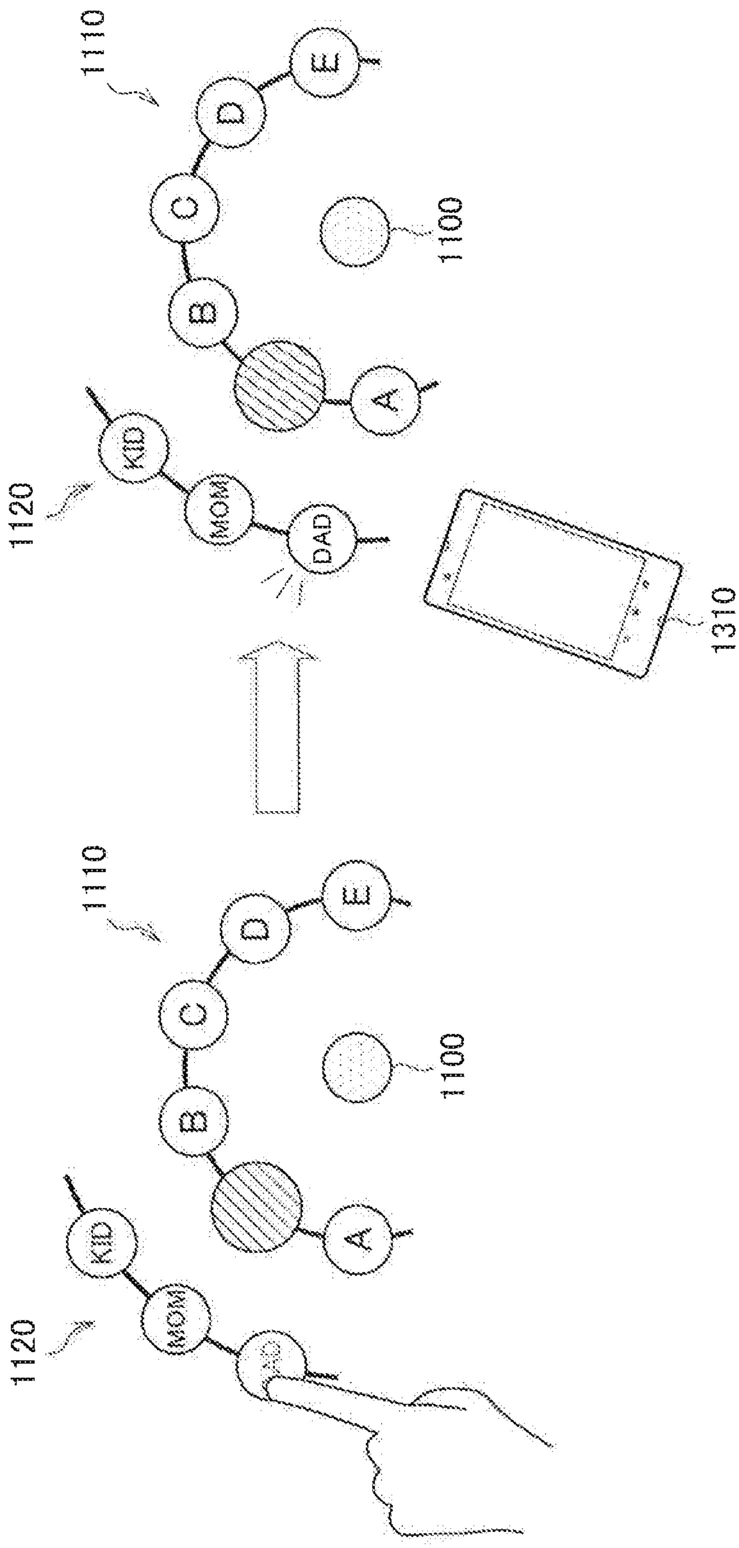
FIG. 70 is an explanatory diagram illustrating an example of a GUI of an application.

FIG. 70 is an explanatory diagram illustrating an example of a GUI of an application displayed on the information display surface by the information processing system 100 according to an embodiment of the present disclosure. FIG. 70 illustrates an example of a GUI when access to the menu is authenticated in accordance with the device authentication scheme using the portable terminal used by the user. For example, the information processing system 100 allows the menu to be locked with a key so that access to the menu used by a father is not permitted when authentication is not gained using the portable terminal used by the father. The information processing system 100 executes control such that no response is made in the state in which the menu used by the father is locked with the key even when the user selects the menu (for example, even when the user selecting the menu is the father himself).

Then, when the information processing system 100 detects that the portable terminal used by the father is placed near the menu used by the father, the information processing system 100 recognizes the portable terminal. When the information processing system 100 recognizes that the portable terminal is the portable terminal of the father, the key to the menu used by the father is released. The information processing system 100 may recognize the portable terminal through the above-described image recognition or may recognize the portable terminal through near field communication (NFC), Wi-Fi communication, Bluetooth (registered trademark) communication, or the like. When the authentication is completed, the information processing system 100 releases the key to the menu locked with the key and executes control such that the user can access the menu.

In this way, using the structure in which the access to the menu is authenticated using the device authentication scheme, the information processing system 100 according to the embodiment of the present disclosure can restrict the access to the menu by an unauthenticated user.

The information processing system 100 according to the embodiment of the present disclosure can display the menu button using the portable terminal as the starting point, as described above. Here, the information processing system 100 according to the embodiment of the present disclosure supplies the structure controlling authority over the portable terminal in accordance with the menu button displayed using the portable terminal as the starting point.

Figure 71:
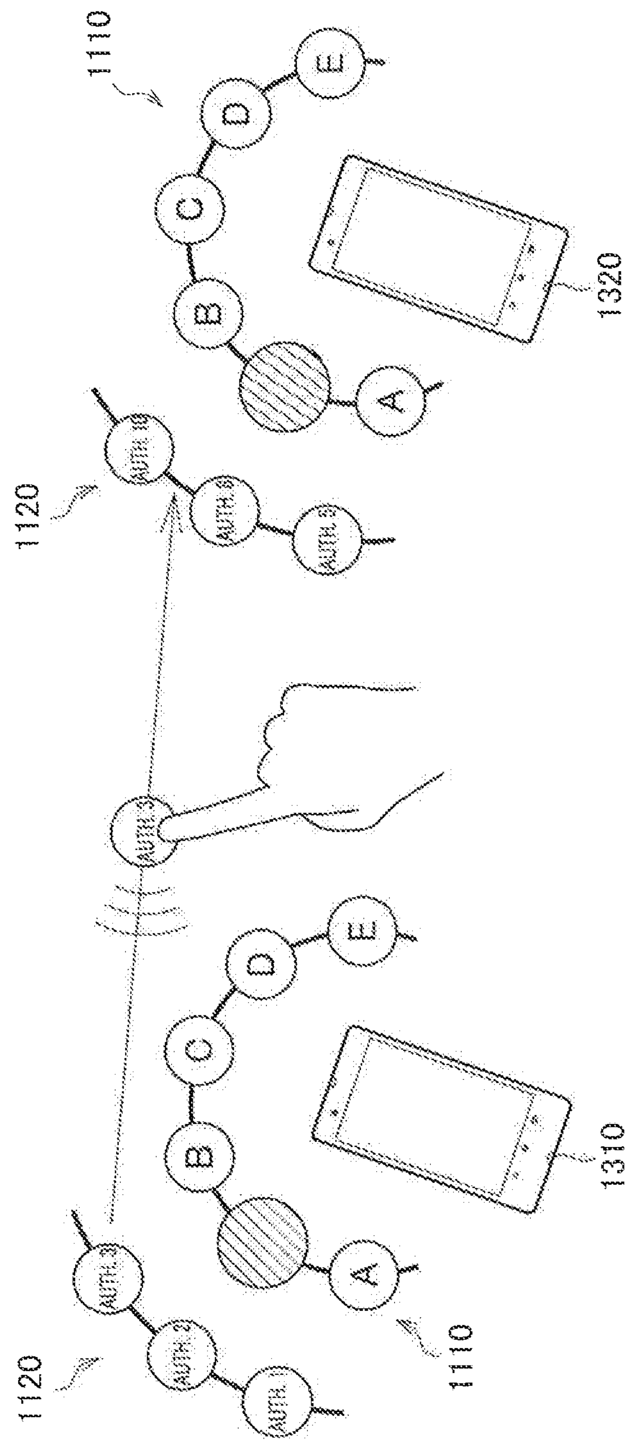
FIG. 71 is an explanatory diagram illustrating an example of a GUI of an application.

FIG. 71 is an explanatory diagram illustrating an example of a GUI of an application displayed on the information display surface by the information processing system 100 according to an embodiment of the present disclosure. FIG. 71 illustrates an example of a GUI when authority over the portable terminal is controlled in accordance with the menu button at the time of display of the menu button using the portable terminal as the starting point.

FIG. 71 illustrates a state in which the menu button groups 1110 and 1120 are displayed using portable terminals 1310 and 1320 as starting points. FIG. 71 illustrates a state in which authority over each of the portable terminals 1310 and 1320 is displayed in the menu button group 1120. The authority over the portable terminals 1310 and 1320 is, for example, manipulation authority for an application, manipulation authority for a device remotely manipulated from the portable terminal, and payment authority at the time of payment of a price using the portable terminal.

For example, it is assumed that the user executes a manipulation of copying certain authority (for example, payment authority for a price corresponding to 1000 yen) from the menu button group 1120 displayed using the portable terminal 1310 as the starting point to the menu button group 1120 displayed using the portable terminal 1320 as the starting point. The information processing system 100 executes a process of copying the authority maintained in the portable terminal 1310 to the portable terminal 1320 according to the user manipulation.

By allowing the authority to be copied between the portable terminals through the manipulation on the menu button in this way, the information processing system 100 according to the embodiment of the present disclosure can transfer the authority in the portable terminal through a simple manipulation.

The information processing system 100 according to the embodiment of the present disclosure supplies a function of delivering data to an application based on the drag and drop manipulations on the menu button to the window of the application.

Figure 72:
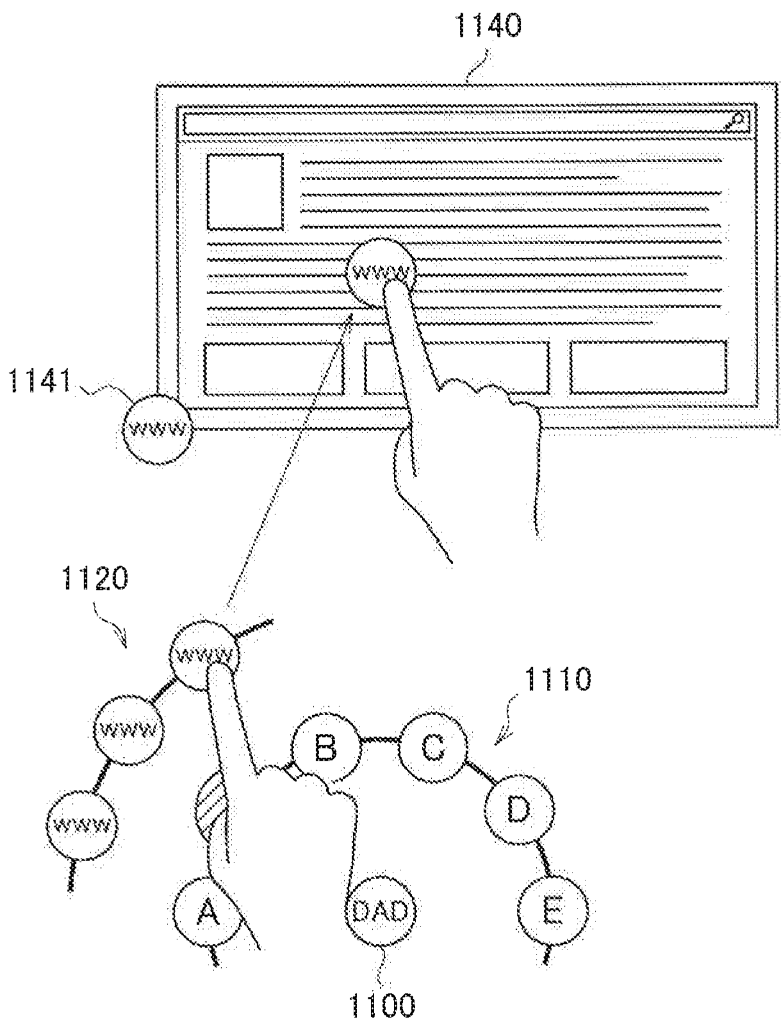
FIG. 72 is an explanatory diagram illustrating an example of a GUI of an application.

FIG. 72 is an explanatory diagram illustrating an example of a GUI of an application displayed on the information display surface by the information processing system 100 according to an embodiment of the present disclosure. FIG. 72 illustrates an example of a GUI when the data is delivered to the application based on the drag and drop manipulations on the menu button to the window of the application.

FIG. 72 illustrates a state in which there is a menu button corresponding to a bookmark for access to a web page in the menu button group 1120. When the user executes a manipulation of dragging and dropping the menu button in the menu button group 1120 to the web browser 1140, the information processing system 100 according to the embodiment of the present disclosure controls an operation of the web browser 1140 so that the access to the web page corresponding to the dropped menu button is gained according to the user manipulation. In this way, by transferring data to the application according to the drag and drop manipulations by the user, the information processing system 100 according to the embodiment of the present disclosure can provide an intuitive manipulation to the user.

FIG. 72 illustrates an example in which the application is a web browser, but the application which is the data transfer target is not limited to the related example. For example, when the application is an image display application and the user drops a menu button indicating image data on the image display application, the information processing system 100 executes a process of displaying the image data with the image display application. As another example, when the application is a music reproduction application and the user drops a menu button indicating music data on the music reproduction application, the information processing system 100 executes a process of reproducing the music data with the music reproduction application. As another example, when the application is a moving-image reproduction application and the user drops a menu button indicating moving-image data on the moving-image reproduction application, the information processing system 100 executes a process of reproducing the moving-image data with the moving-image reproduction application.

In FIG. 72, the example in which the information processing system 100 transfers the data to the application according to the drop of the menu button on the window of the application has been described. Next, an example in which the information processing system 100 executes a function corresponding to a dropped menu button according to drop of the other menu button on a menu button supplying any function will be described.

Figure 73:
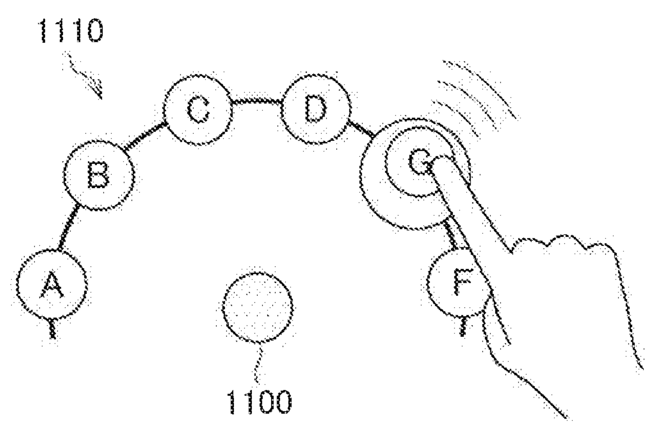
FIG. 73 is an explanatory diagram illustrating an example of a GUI of an application.

FIG. 73 is an explanatory diagram illustrating an example of a GUI of an application displayed on the information display surface by the information processing system 100 according to an embodiment of the present disclosure. FIG. 73 illustrates an example of a GUI when the function corresponding to the dropped menu button is executed based on manipulations of dragging and dropping the other menu button on the menu button supplying any function.

FIG. 73 illustrates a state in which there is a menu button for posting to, for example, a social networking service (SNS) in the menu button group 1120. The user is assumed to drop a menu button indicating, for example, image data on a menu button in the menu button group 1120. The information processing system 100 executes a process of posting the image data to the SNS according to the drop manipulation from the user.

In this way, by executing the function corresponding to the dropped menu button according to the drag and drop manipulations by the user, the information processing system 100 according to the embodiment of the present disclosure can offer an intuitive manipulation to the user.

The function executed by each menu button of the menu button group 1120 in FIG. 73 is not limited to the posting to the SNS. For example, various functions such as transmission of data to a partner with a registered contact address and transmission of data to a linked device can be considered as the function executed by each menu button of the menu button group 1120.

2. SPECIFIC EXAMPLES OF USER INTERFACES

Hereinafter, specific examples of user interfaces (UIs) which can be realized by the above-described information processing system 100 will be described. Hereinafter, the projection type information processing system 100*a* will be assumed for description. However, the UIs related to the specific examples to be described below can also be realized in any type of information processing system described with reference to FIGS. 1 to 4. In the projection type information processing system 100*a*, a casing in which the projector and camera are provided above the table 140*a* is also referred to as a body. The table 140*a* is also referred to as a projection surface (display surface) to which an image is projected by the projector.

Specific Example 1

Figure 74:
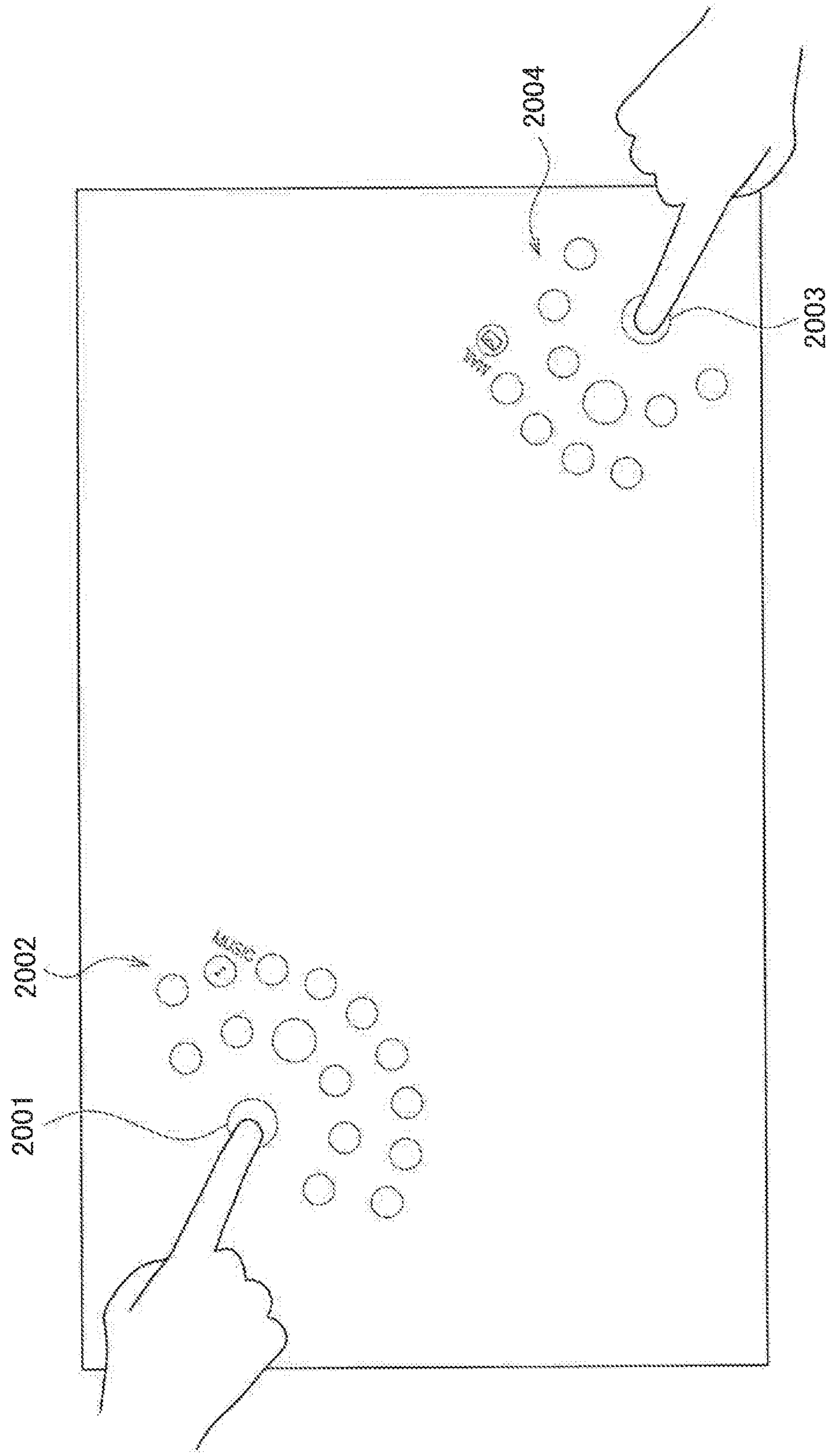
FIG. 74 is an explanatory diagram illustrating a user interface according to specific example 1.
Figure 75:
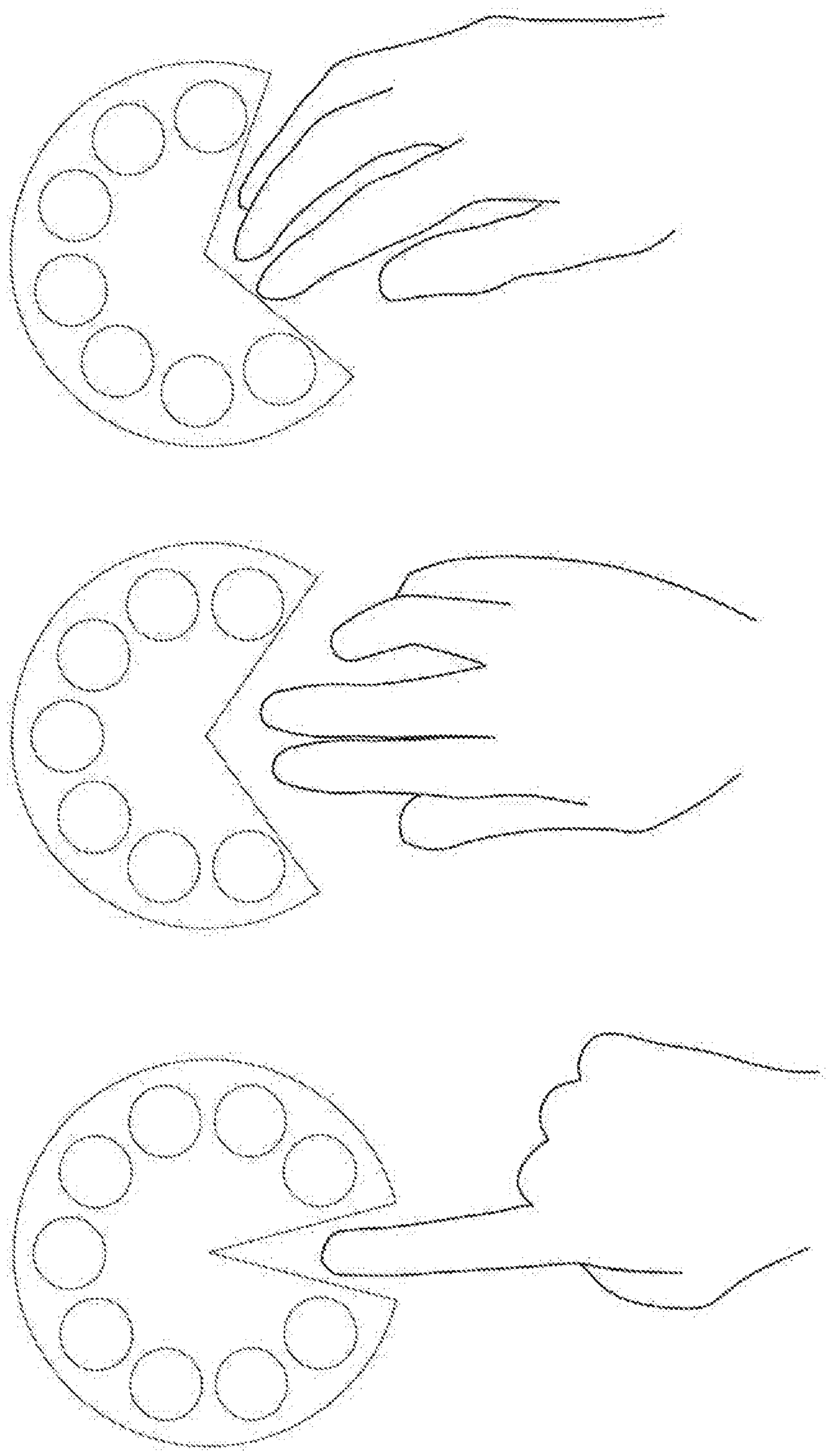
FIG. 75 is an explanatory diagram illustrating a user interface according to specific example 1.
Figure 76:
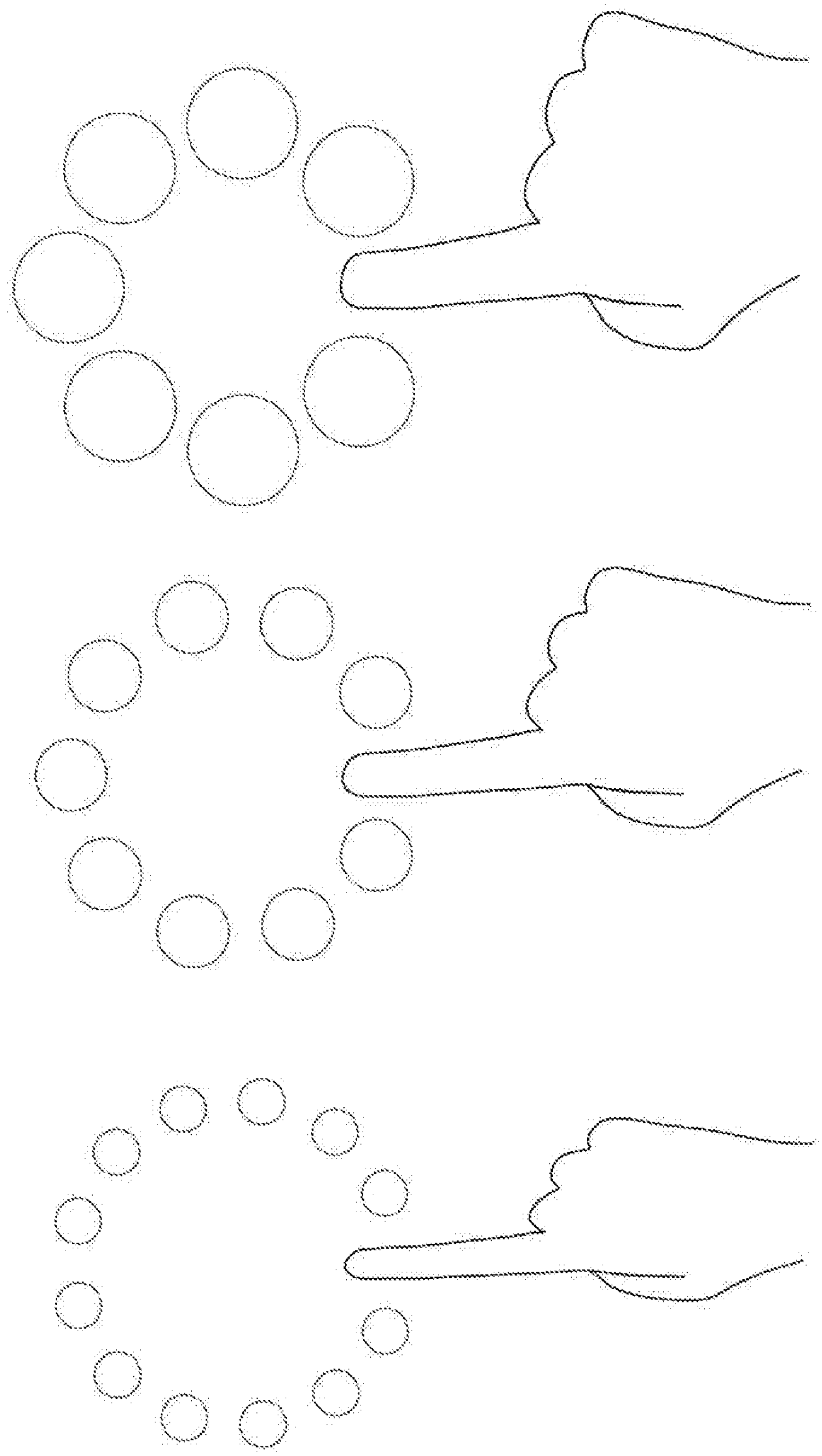
FIG. 76 is an explanatory diagram illustrating a user interface according to specific example 1.

The information processing system 100 according to the present specific example supplies a semicircular menu rotated according to the shape of a manipulation object. When a menu is displayed regardless of the shape of a manipulation object, for example, display of the menu may overlap a hand, and thus visibility deteriorates in some cases. Accordingly, the information processing system 100 according to the present specific example displays a menu in a region other than a region in which it would overlap a manipulation object. Hereinafter, the specific example will be described in detail with reference to FIGS. 74 to 76. FIGS. 74 to 76 are explanatory diagrams for describing a user interface according to specific example 1.

As illustrated in FIG. 74, the information processing system 100 according to the present specific example displays a menu 2002 in which icons (menu items) are disposed in a semicircular shape according to the shape of a finger with which the user touches a menu button 2001 displayed on the table 140*a* functioning as a display surface. Specifically, the information processing system 100 displays the semicircular menu 2002 spreading right and left centering on a direction of the finger so that the icons do no overlap the finger. The information processing system 100 causes the text display of an icon to directly face the user according to the direction of the finger. A menu button 2003 in which items are disposed in a semicircular shape according to the shape of a finger is similarly displayed.

To execute such a display process, the detection unit 121 first detects a manipulation object overlapping the display surface. The manipulation object may be a part of the body of the user such as a finger or a hand, may be any object such as a manipulation stick to be manipulated by the user, or may be a robot arm or the like. The detection unit 121 detects the shape, an orientation of a longer side, an orientation of a shorter side, and a height of the manipulation object overlapping the display surface based on depth information obtained by a stereo camera. When the manipulation object is a finger, the detection unit 121 may detect a direction in which the finger points. In the example illustrated in FIG. 74, the detection unit 121 detects a finger or a hand touching the menu button 2001 or 2003 overlapping the table 140*a* as a manipulation object and detects a direction in which the finger points.

Then, the output control unit 122 controls the output unit 130 such that a menu with a circular shape in which a region overlapping the manipulation object detected by the detection unit 121 is omitted (a semicircular shape) is displayed on the display surface. For example, in the example illustrated in FIG. 74, the output control unit 122 displays the menu 2002 in which no item is disposed in the region overlapping the finger touching the menu 2001.

As means for generating the menu with the circular shape in which the region overlapping the manipulation object is omitted, the output control unit 122 may increase or decrease at least one of the number of icons displayed or the display sizes of the icons according to the size of the region in which the manipulation object overlaps the display surface. For example, the output control unit 122 controls the output unit 130 such that the number of displayed icons increases or decreases according to the size of the hand touching the menu. Specifically, as illustrated in FIG. 75, the output control unit 122 displays 9 icons when the user extends one finger and touches the menu button, and displays 7 icons when the user spreads his or her fingers without bending any fingers and touches the menu button.

As illustrated in FIG. 76, the output control unit 122 may adjust the icon display up to the upper limit of the size and the number of icons which the user can touch without difficulty according to the thicknesses of the fingers. Specifically, when the fingers are slim, the output control unit 122 decreases the sizes of the icons and displays more icons. The output control unit 122 increases the sizes of the icons and reduces the number of icons when the fingers are thicker. The output control unit 122 may increase or decrease the radius of the circle in which the icons are disposed. For example, when the display sizes are fixed, the number of icons displayed increases or decreases according to an increase or decrease in the radius. When the number of icons displayed is fixed, the display sizes of the icons increase or decrease according to the increase or decrease in the radius.

Since the output control unit 122 executes such display control such that the icons do not overlap the finger of the user, the user can easily comprehend the entire menu. Further, an erroneous operation caused due to an icon of which display overlaps a finger being unintentionally touched with the finger can be avoided. The output control unit 122 can display the icons utilizing the available area as much as possible by controlling the menu display in accordance with the size of the hand. The adjustment of the number of icons displayed can be particularly effective when the total number of icons exceeds the number displayed, that is, not all of the icons may be displayed.

The output control unit 122 may control the direction of the menu to be displayed according to the direction of the manipulation object. Specifically, the output control unit 122 may control the output unit such that the menu in which the items are disposed based on the orientation of the longer side of the manipulation object detected by the detection unit 121 is displayed on the display surface. For example, in the example illustrated in FIG. 74, the output control unit 122 displays the semicircular menu 2002 spreading right and left centering the direction of the finger based on the direction of the finger touching the menu button 2001. Further, the output control unit 122 estimates the direction of the user to whom the finger belongs based on the direction of the finger touching the menu button 2001 and displays the menu 2002 so that the text display and the menu disposition directly face the user. The output control unit 122 can supply the menu directly facing the user when the user touches the table 140*a* in any direction by executing such display control.

The information processing system 100 can also identify an individual according to the detection result by the detection unit 121 and execute an individualized output according to a manipulation history of the identified individual or the like. For example, the information processing system 100 can specify the individual according to the thicknesses of fingers. Therefore, for example, even in a state in which the user logs in to the information processing system 100 used at home with a family sharing account, the individualized output can be output to the logged-in family members without orienting a camera toward the face of the user and identifying the user through face recognition. For example, when the information processing system 100 is of a projection type, the user can be supplied with an individualized output even without looking up. The information processing system 100 can output the individualized output even in an environment in which an unspecified large number of users in a bar or the like touch. However, for example, when the user executes a touch while wearing gloves on a snowy mountain, a case in which the thicknesses of the fingers change even for the same individual is considered.

Specific Example 2

The present specific example is a form in which input and output are optimized for the user by estimating a direction in which the user is located from a direction in which a hand or a finger is observed when a camera, a microphone, a projector, and a speaker are known. When the position of the user is not considered in sound acquisition by the microphone, it is difficult to acquire a clear sound in some cases. When the position of the user is not considered in a sound output from the speaker, it is difficult to output a sound with a sense of presence in some cases. Accordingly, the information processing system 100 according to the present specific example estimates the position of the user and executes optimized input and output at the position of the user. Hereinafter, the present specific example will be described in detail with reference to FIGS. 77 to 85. FIGS. 77 to 85 are explanatory diagrams for describing a user interface according to specific example 2.

For example, an example in which the microphone functioning as the input unit 110 is optimized for the user will be described here. The detection unit 121 according to the present specific example controls directivity of the microphone functioning as the input unit 110 and orients the directivity of the microphone toward the mouth of the user. The detection unit 121 controls the directivity using a microphone array in which a plurality of microphones are combined.

Figure 77:
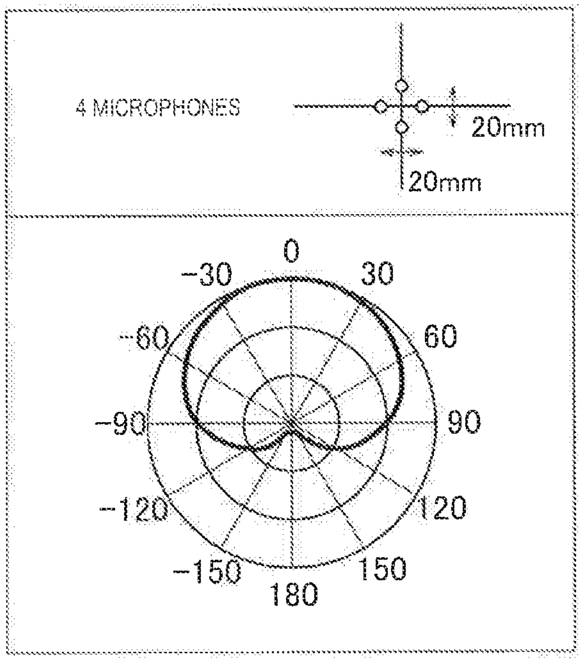
FIG. 77 is an explanatory diagram illustrating a user interface according to specific example 2.

FIG. 77 illustrates an example of directivity formed by a microphone array including four microphones. By causing the microphones to have directivity (executing beamforming) using a time difference occurring when sounds reach the microphones the detection unit 121 can exclude everyday noise from directions outside of the directivity. When the number of microphones increases, the microphones can be caused to have more narrowed directivity.

Figure 78:
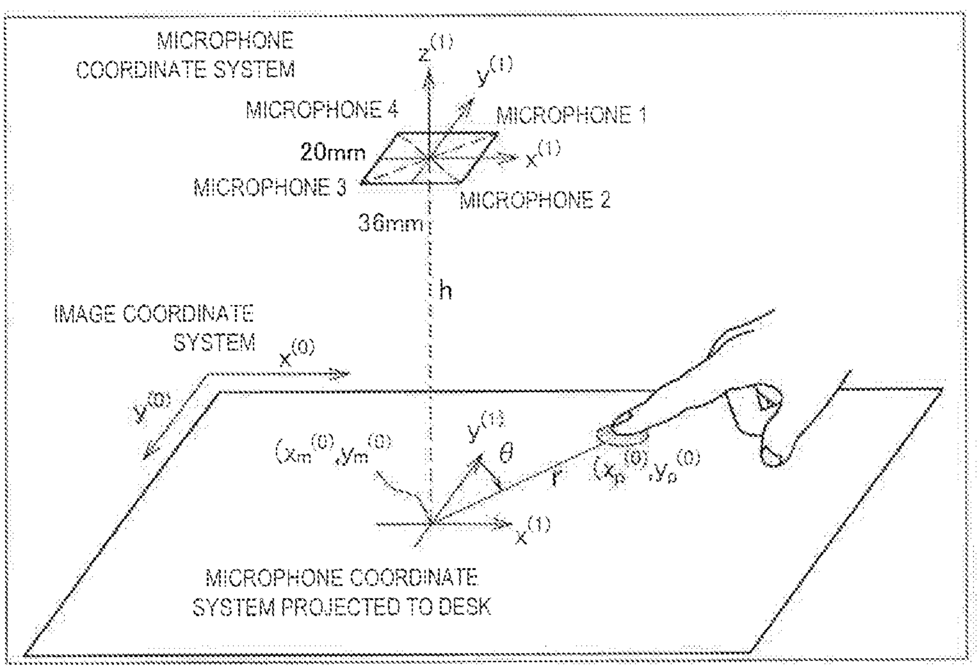
FIG. 78 is an explanatory diagram illustrating a user interface according to specific example 2.
Figure 79:
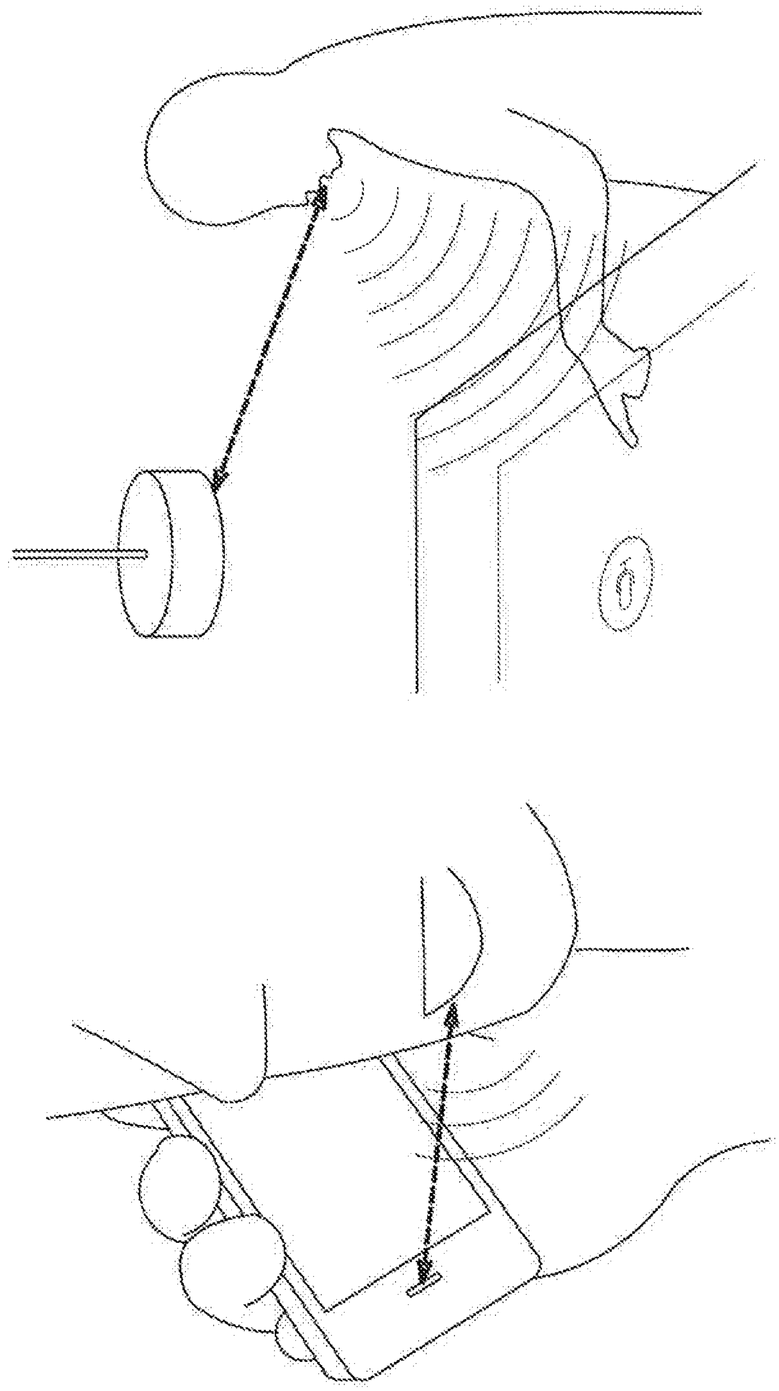
FIG. 79 is an explanatory diagram illustrating a user interface according to specific example 2.

FIG. 78 illustrates a control example of the directivity according to the position of a finger touching the display surface. The detection unit 121 estimates the position of the user according to the position of the finger of the user touching the display surface and orients the directivity of the microphone toward the estimated position of the user. Even when the user is far from the microphone, the detection unit 121 can acquire a clear user sound from which everyday noise is excluded by controlling the directivity of the microphone in this way, and thus executes sound recognition, for example. As illustrated in FIG. 79, for example, when a distance between the microphone and the mouth is necessarily about 10 centimeters (cm) as in the case of a smartphone, the information processing system 100 according to the present specific example can acquire a clear user sound from which everyday noise is excluded even at a distance of about 100 cm.

To execute such directivity control, the detection unit 121 first detects the manipulation object. The detection unit 121 detects the shape, the direction of the longer side, the direction of the shorter side, and the height of the manipulated object overlapping the display surface. When the manipulation object is a finger, the detection unit 121 may detect a direction pointed by the finger. Then, the detection unit 121 functions as an estimation unit that estimates a direction in which the user manipulating the manipulation object is located based on the detected manipulated object. For example, the detection unit 121 detects a hand or a finger of the user as a manipulation object and estimates the direction in which the user is located based on the position and direction of the hand or the finger. Hereinafter, a specific estimation method will be described.

Figure 80:
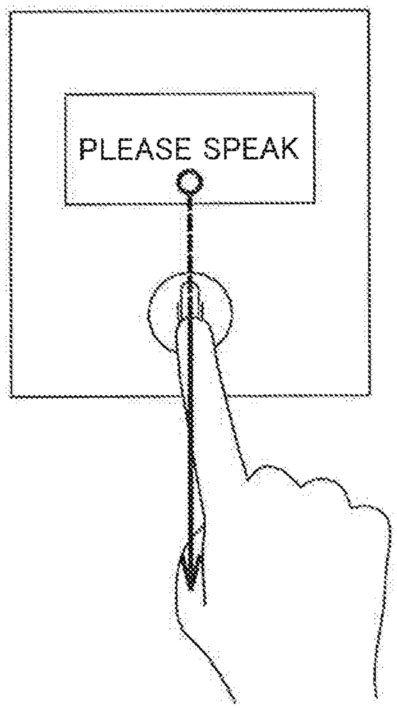
FIG. 80 is an explanatory diagram illustrating a user interface according to specific example 2.

For example, in the example illustrated in FIG. 80, the detection unit 121 estimates that the user is located in an arrow direction on a straight line connecting the position of an icon projected to the projection surface and the position of an icon touched with a finger. This scheme is effective when a premise that the icon to be manipulated is near a hand of the user is established. For example, when the user can press and hold an icon and subsequently drag the icon to freely move the icon near his or her hand, this premise is considered to be established. According to this scheme, the detection unit 121 can estimate the direction of the user even when the detection of the direction of the finger fails.

Figure 81:
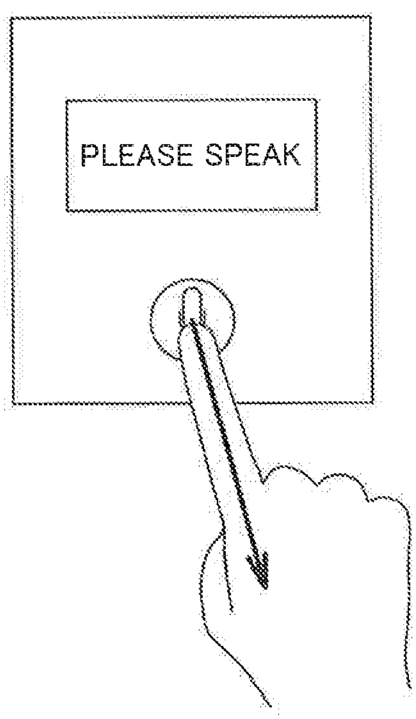
FIG. 81 is an explanatory diagram illustrating a user interface according to specific example 2.

For example, in the example illustrated in FIG. 81, the detection unit 121 estimates that the user is located in the arrow direction which is opposite to the direction of the finger touching the icon. This scheme is effective when the detection unit 121 successfully detects the direction of the finger.

Figure 82:
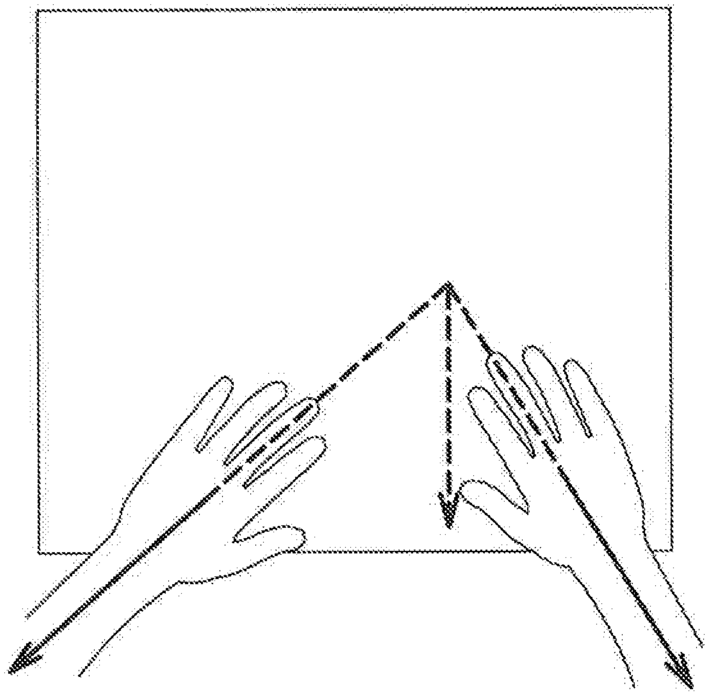
FIG. 82 is an explanatory diagram illustrating a user interface according to specific example 2.

For example, in the example illustrated in FIG. 82, the detection unit 121 estimates that the user is located between the right and left hands based on the positions and the directions of the hands placed on the table 140*a* functioning as the projection surface and the user is located in the arrow direction. Specifically, the detection unit 121 estimates that an average direction of directions of two hands detected from the same side is the direction in which the user is located. This scheme is effective when the detection unit 121 successfully detects the directions of the hands.

Figure 83:
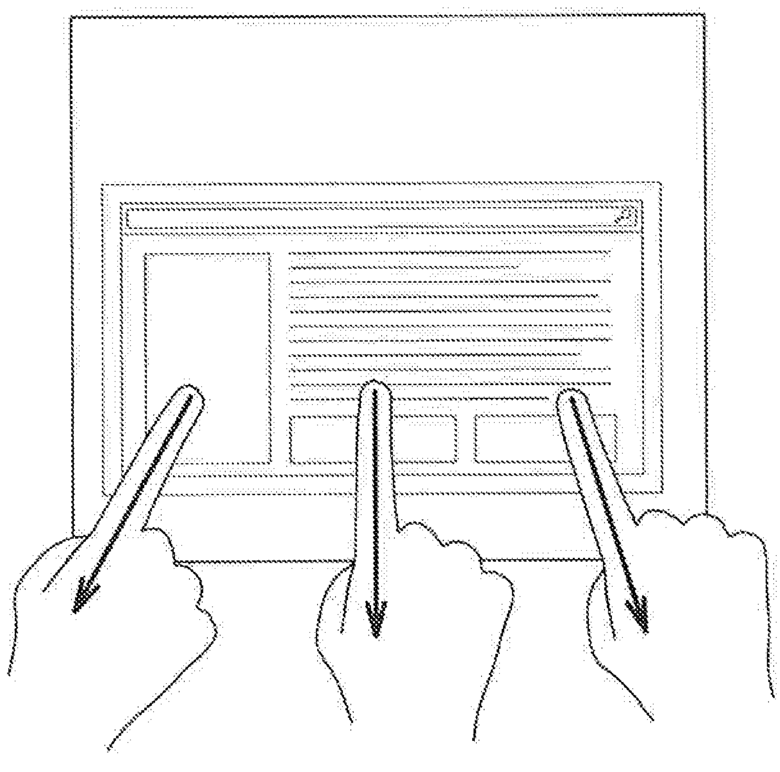
FIG. 83 is an explanatory diagram illustrating a user interface according to specific example 2.

For example, in the example illustrated in FIG. 83, the detection unit 121 estimates the direction in which the user is located from the directions of the fingers manipulating an application. The detection unit 121 may estimate the current direction in which the user is located by estimating and storing the directions of the fingers manipulating a plurality of applications from the time of driving and integrating the stored directions of the fingers. The detection unit 121 may estimate the direction in which the user is located by integrating and calculating the directions of the fingers manipulating another application in the directions of the fingers manipulating a certain application.

In this way, the detection unit 121 estimates the direction in which the user is located. Then, the detection unit 121 controls the input unit 110 such that an input having directivity in the estimated direction in which the user is located is executed. For example, in the example described above with reference to FIGS. 79 to 83, the detection unit 121 controls the microphone such that the beamforming is executed to acquire a sound in the estimated direction in which the user is located. The detection unit 121 may execute the beamforming process on a sound output from each microphone. Accordingly, the detection unit 121 can acquire a clear user sound from which everyday noise is excluded. Additionally, the detection unit 121 may control the direction of a camera functioning as the input unit 110 to acquire an image in the estimated direction in which the user is located.

The output control unit 122 controls the output unit 130 such that an output having directivity in the direction which is estimated by the detection unit 121 and in which the user is located is executed. For example, the output control unit 122 controls a speaker functioning as the output unit 130 such that a channel is configured to output a sound in the direction in which the user is located. In addition to the sound, the output control unit 122 may control the output unit 130 such that an image is output, for example, in the estimated direction in which the user is located so that the image directly faces the user.

Figure 84:
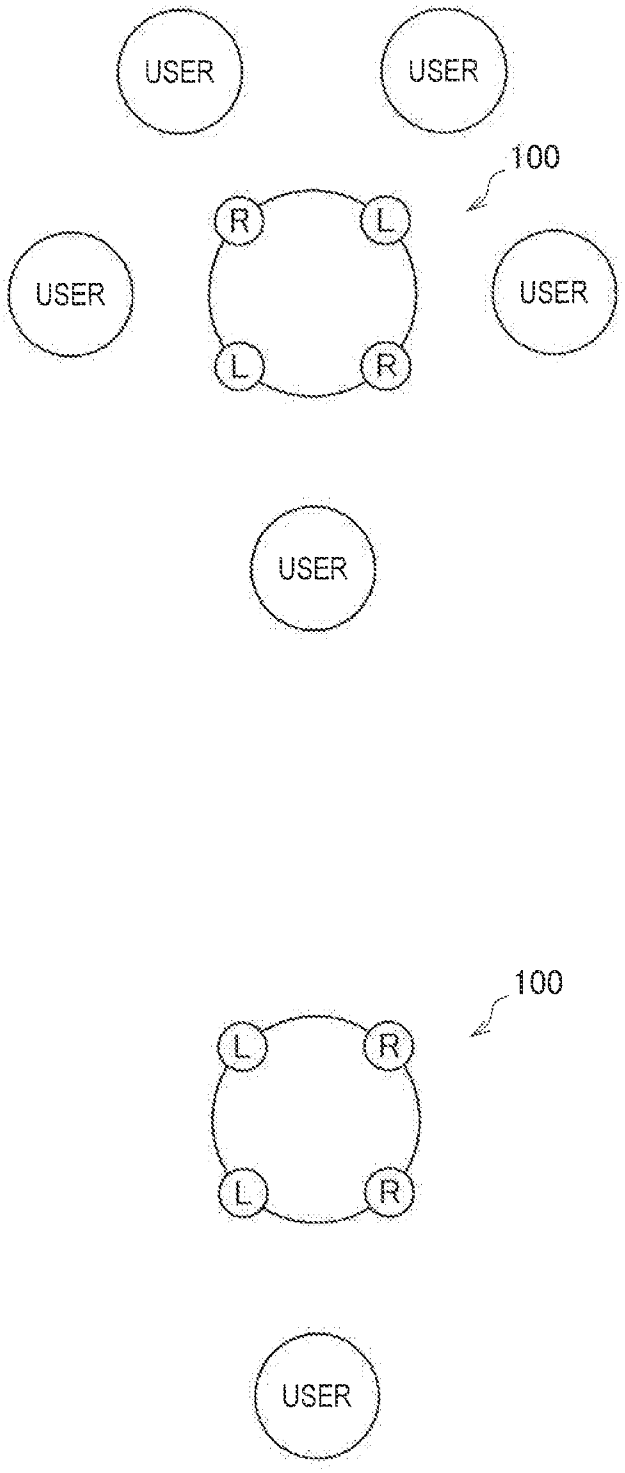
FIG. 84 is an explanatory diagram illustrating a user interface according to specific example 2.

FIG. 84 is a diagram illustrating a positional relation between the body and a user and a simple configuration example when the body of the projection type information processing system 100 is viewed from below. As illustrated in FIG. 84, speakers are formed in four corners of the body. In the drawing, "R" indicates a right channel and "L" indicates a left channel. As illustrated in the upper drawing of FIG. 84, when there are a plurality of users surrounding the information processing system 100, the output control unit 122 controls the speakers such that sounds are output with a normal channel configuration. On the other hand, as illustrated in the lower drawing of FIG. 84, when there is a single user, the output control unit 122 controls the speakers such that sounds are output in a channel configuration specialized for an estimated user position.

As described above, according to the present specific example, by having the directivity of the microphones according to the position of the user, for example, a success ratio of sound recognition or a sound command can be improved, for example, even in an environment in which there is noise such as everyday noise and the microphone is far from the position of the user. According to the present specific example, by changing the channel configuration of the speakers according to the position of the user, it is possible to realize an acoustic space with a better sense of presence. For example, the information processing system 100 according to the present specific example can reproduce content for which a channel configuration is designed on the assumption of use of a home television according to an intention of a content generator. Additionally, according to the present specific example, the information processing system 100 can also display the application such as a web browser so that the application directly faces the user after the sound recognition is completed.

(Photo Application)

Figure 85:
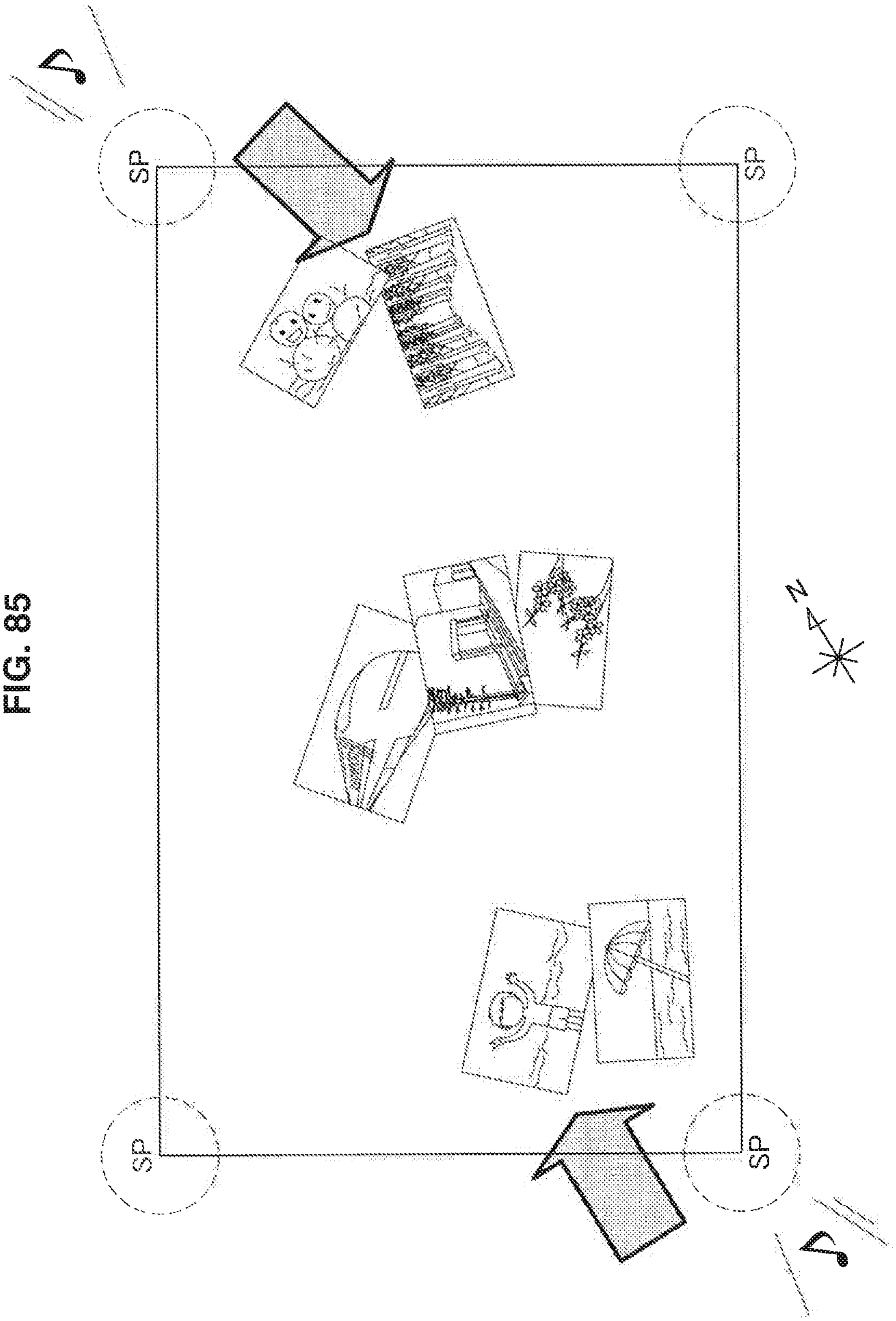
FIG. 85 is an explanatory diagram illustrating a user interface according to specific example 2.

Here, referring to FIG. 85, a photo application will be described as an example of an application in which the information processing system 100 according to the present specific example is used. The application outputs various visual effects and sound effects using position information and installation azimuth information regarding the body and the table 140*a* when the positions of the speakers and the table 140*a* viewed from the body are known. The position information can be acquired by, for example, the Global Positioning System (GPS) and the installation azimuth information can be acquired by, for example, a geomagnetic sensor.

For example, the application acquires a photographing position from exchangeable image file format (Exif) information incidental to a photo and estimates an azimuth of the photographing position viewed from the table 140*a*. As illustrated in FIG. 85, the application displays an animation in which photos slide onto a projection surface in the estimated azimuth or produces a sound effect from a speaker at a corresponding position. For the sound effect, a sound image may be localized at the corresponding position. The application may be applied to, for example, conference rooms so that conference documents are mirrored to be shared on the table 140*a* installed in a plurality of conference rooms at remote locations or dialogs may be realized between the conference rooms.

The photos displayed on the projection surface 140*a* by the photo application can be manipulated and browsed simultaneously by many people in many directions. For example, the users at four sides of the projection surface 140*a* can simultaneously select photos in many directions and move their positions while changing the directions, edit the photos, or add new photos.

Specific Example 3

The present specific example is a form in which the state of the projection surface and the state of an application during activation are managed and an illuminator (a light) is controlled as necessary. In general, when a projector and an illuminator are used, a projected image may become unclear due to brightness of the illuminator. For this reason, a person executes an action of turning off illuminator in a room or turning off illuminator in only the vicinity of a projection surface. When a projector and an illuminator are used, the information processing system 100 according to the present specific example controls the illuminator such that an image projected by the projector is clearly displayed, and thus such effort by the person can be reduced. The information processing system 100 according to the present specific example is of a projection type and it is assumed that a controllable illumination unit is integrated with the body or a separated illumination unit can be remotely adjusted. The illumination unit is assumed to change a radiation range and a radiation direction. Hereinafter, the present specific example will be described specifically with reference to FIGS. 86 to 93. FIGS. 86 to 93 are explanatory diagrams illustrating user interfaces according to specific example 3.

Figure 86:
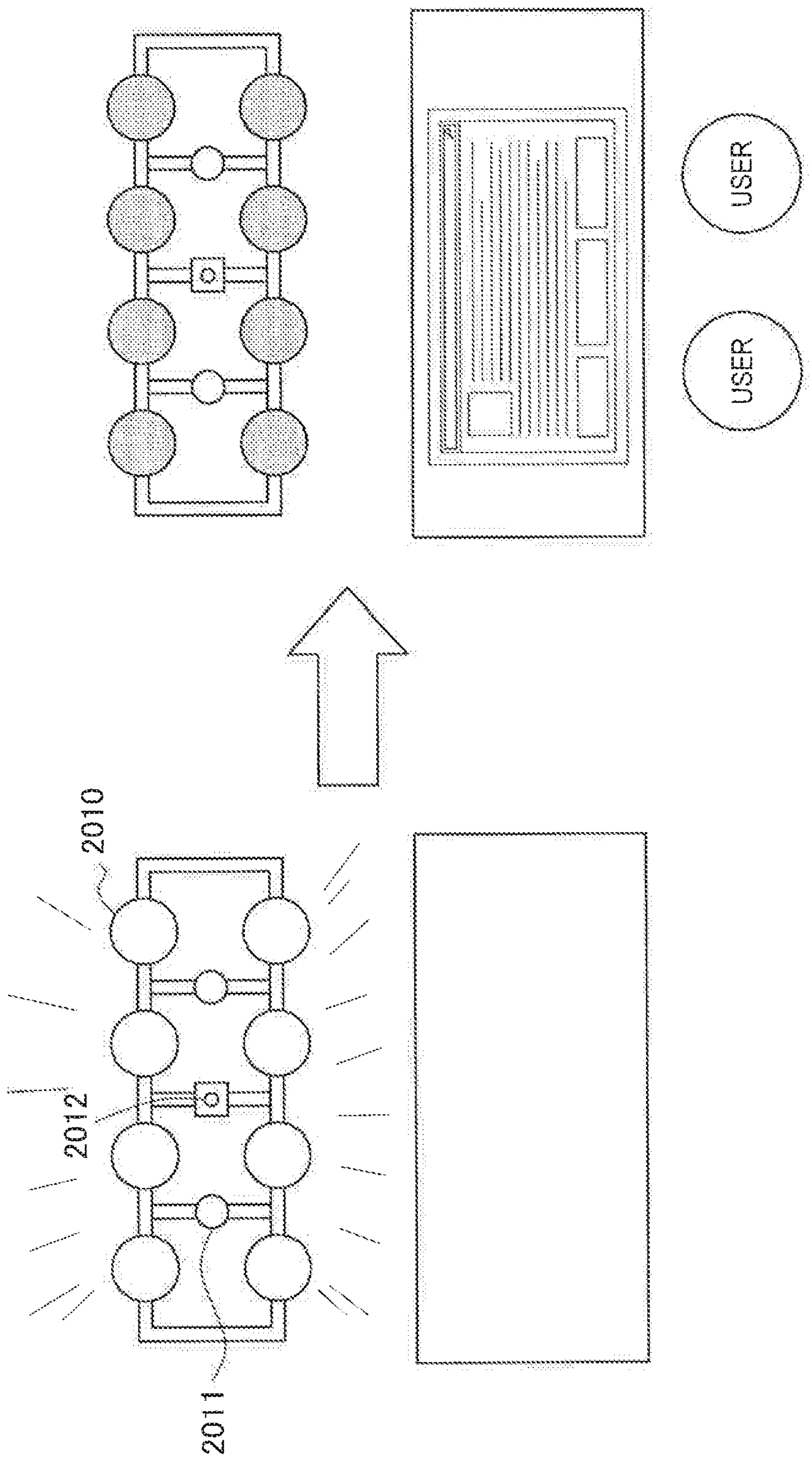
FIG. 86 is an explanatory diagram illustrating a user interface according to specific example 3.

As illustrated in FIG. 86, the information processing system 100 according to the present specific example includes a camera 2011, a projector 2012 that functions as a projection unit, and a plurality of illumination units 2010 arrayed in a matrix form. The detection unit 121 detects the state of a projection surface based on an image captured by the camera 2011 orientated toward the projection surface and acquires state information obtained by detecting the state of the projection surface. The state of the projection surface includes, for example, the brightness of the projection surface, a contrast ratio of an image projected to the projection surface, presence or absence of an object on the projection surface, and the kind, disposition, and size of the object on the projection surface, and a combination of objects. The output control unit 122 controls the illumination units 2010 such that the projection surface is irradiated with an amount of light (illumination intensity) according to the state detected by the detection unit 121 and an image projected to the projection surface by the projector 2012.

For example, when the projector 2012 projects nothing to the projection surface of the table 140*a* as in FIG. 86, the output control unit 122 controls the illumination unit 2010 such that the projection surface is irradiated with a large amount of light (brightly). When the projector 2012 projects an image, the output control unit 122 controls the illumination unit 2010 such that the projection surface is irradiated with a small amount of light (darkly). Of course, the illuminator may be turned off so that an amount of light is zero. The output control unit 122 may control the illumination unit 2010 such that the projection surface is irradiated with an amount of light by which a contrast ratio of the projected image is equal to or greater than a threshold value by increasing or decreasing an amount of light with reference to a detection result of the contrast ratio of the projected image by the detection unit 121. By setting the contrast ratio of the projected image to be equal to or greater than an easily visible value, the output control unit 122 can cause brightness and visibility to be compatible.

Figure 87:
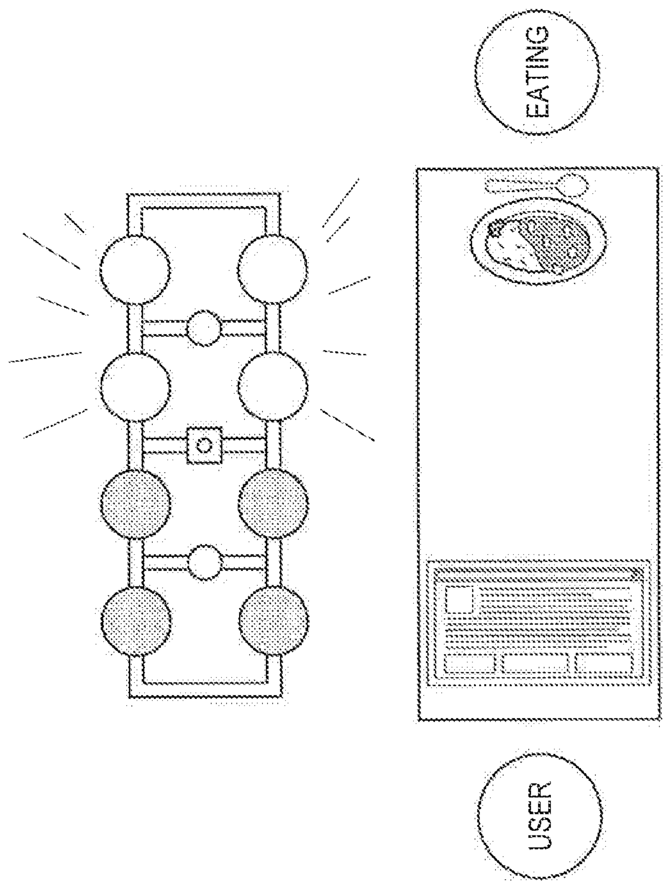
FIG. 87 is an explanatory diagram illustrating a user interface according to specific example 3.

As in FIG. 87, a case in which an object is placed on a partial portion of the table 140*a* and partial portions are not used as the projection surface can also be considered. In this case, the detection unit 121 detects the placed object as the state of the projection surface and the output control unit 122 controls the illumination units 2010 such that the vicinity of the detected object is irradiated with a large amount of light and another portion used as the projection surface is radiated with a small amount of light.

The output control unit 122 can control the illumination units 2010 based on a kind of object placed on the table 140*a*. For example, when the object placed on the projection surface is detected by the detection unit 121, the output control unit 122 may control the illumination units 2010 such that the projection surface is irradiated with an amount of light according to whether the detected object is an illuminant that emits light or a reflector (which does not emit light) reflecting light. Specifically, the output control unit 122 controls the illumination units 2010 such that the projection surface is irradiated with a small amount of light when the object is an illuminant and such that the projection surface is irradiated with a large amount of light when the object is a reflector. Hereinafter, illumination control when a smartphone is placed as an illuminant and a plate is placed as a reflector on the table 140*a* will be described with reference to FIGS. 88 and 89.

Figure 88:
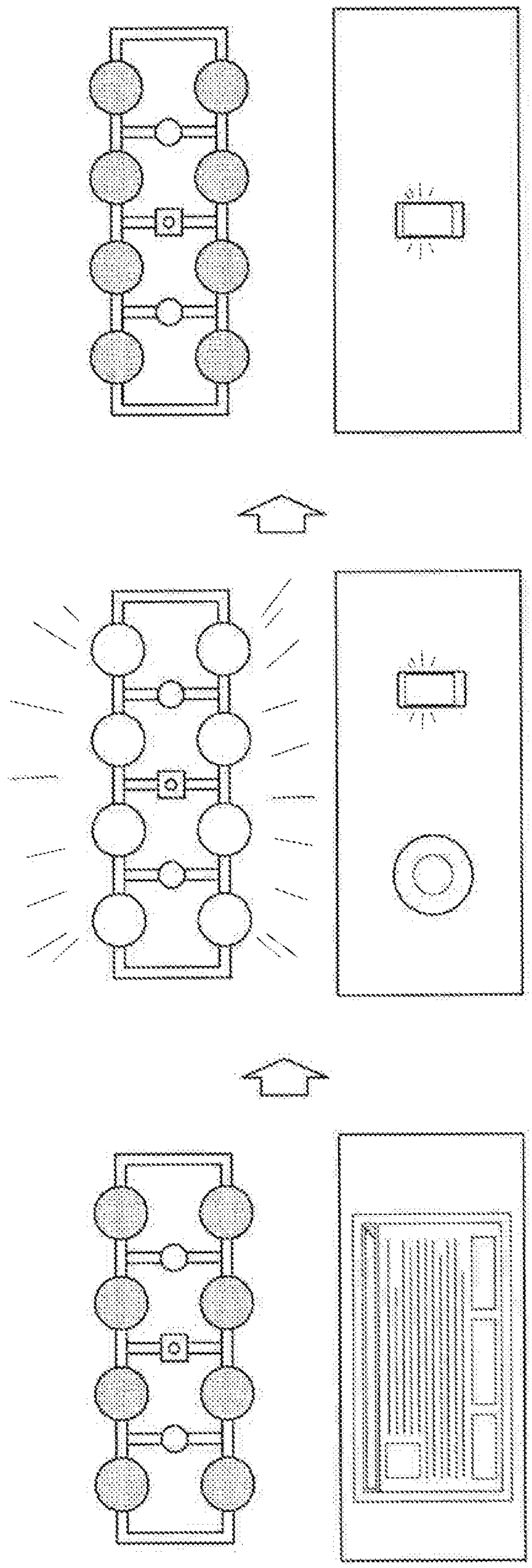
FIG. 88 is an explanatory diagram illustrating a user interface according to specific example 3.

As illustrated in the left drawing of FIG. 88, when the projector 2012 projects an image, the output control unit 122 first controls the illumination units 2010 such that the projection surface is irradiated with a small amount of light. As illustrated in the middle drawing of FIG. 88, when an object is placed on the table 140*a*, the detection unit 121 detects the object. In this case, in order for the detection unit to recognize the object, the output control unit 122 controls the illumination units 2010 such that the projection surface is irradiated with a large amount of light regardless of whether the object is an illuminant or a reflector. Subsequently, the detection unit 121 recognizes the object placed on the table 140*a*, for example, by inquiring of a server about an image obtained by imaging the projection surface.

For example, when the object is registered as a smartphone in the server, the output control unit 122 controls the illumination units 2010 such that the projection surface is irradiated with an original small amount of light, as illustrated in the right drawing of FIG. 88 since a display unit of the smartphone is a light-emitting illuminant. Since the smartphone is an illuminant, the detection unit 121 can continuously detect and track the smartphone even when the projection surface is darkened. Since the amount of light is small, the light radiated from the illumination units 2010 is prevented from being reflected (highlighted) to the display unit of the smartphone. Accordingly, the detection unit 121 can easily detect the smartphone.

Figure 89:
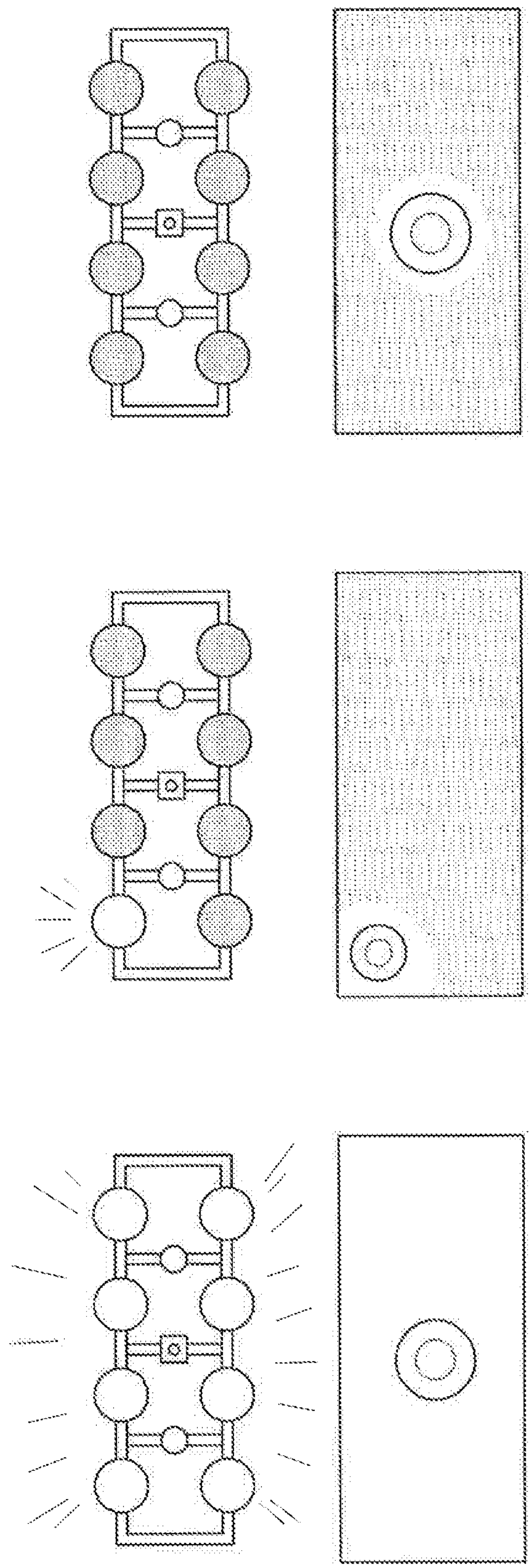
FIG. 89 is an explanatory diagram illustrating a user interface according to specific example 3.
Figure 90:
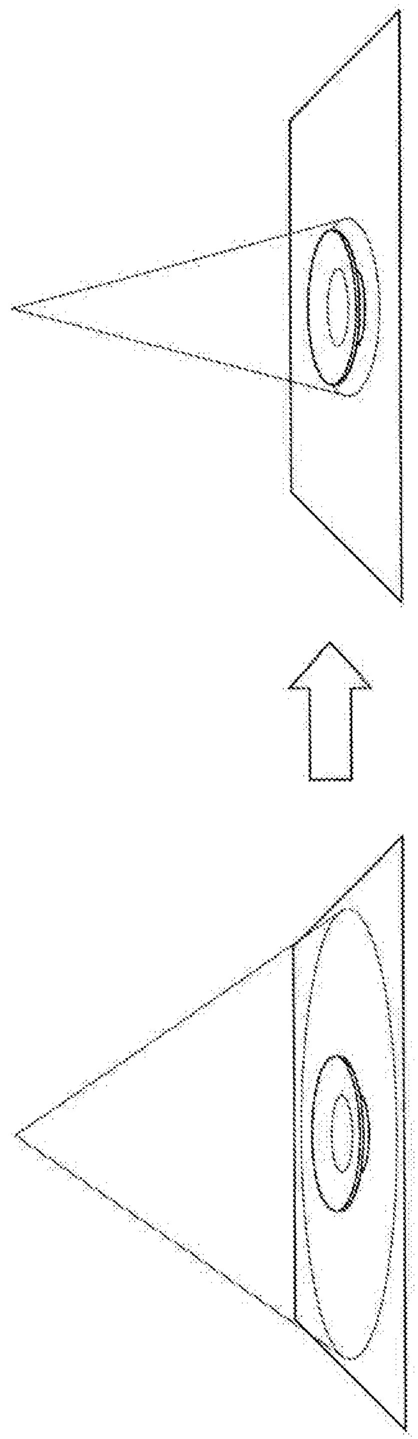
FIG. 90 is an explanatory diagram illustrating a user interface according to specific example 3.
Figure 91:
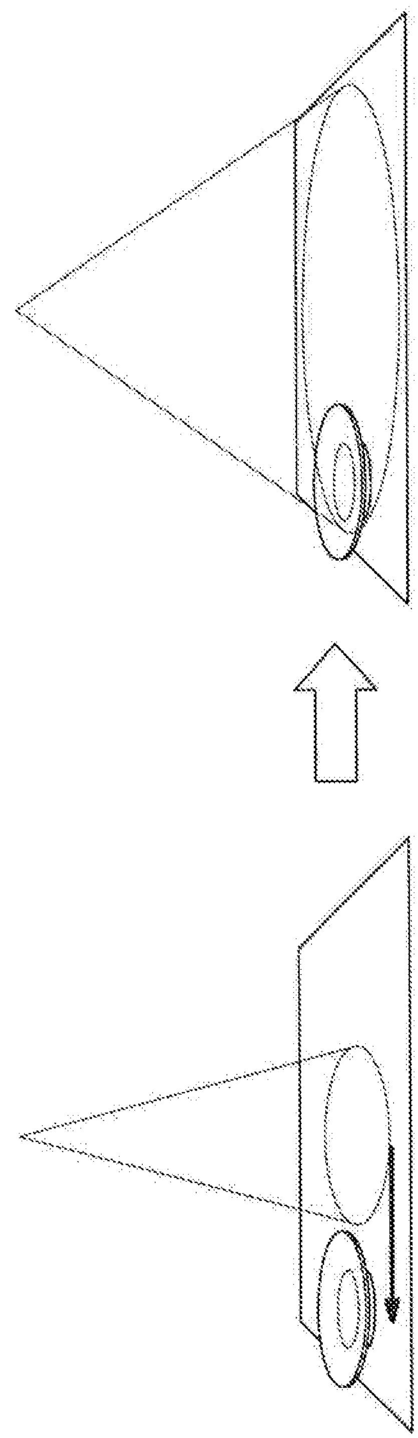
FIG. 91 is an explanatory diagram illustrating a user interface according to specific example 3.

On the other hand, when the object is registered as a plate in the server, the output control unit 122 controls the illumination units 2010 such that the projection surface is irradiated with a large amount of light, as illustrated in the left drawing of FIG. 89 since the plate is a reflector with no illuminant. Accordingly, the detection unit 121 can continuously detect and track the plate. The output control unit 122 may control the illumination units 2010 such that only a region in which the plate is located is bright and other regions are dark, as illustrated in the middle drawing of FIG. 89. Accordingly, for example, the projected image is projected to be visible in the other region. As illustrated in the right drawing of FIG. 89, the output control unit 122 may control the projector 2012 such that the illumination units 2010 are turned off and then a spotlight slightly larger than the shape of the object is shone. The spotlight from the projector can be realized, for example, by projecting a bright white image to a predetermined region. Accordingly, the detection unit 121 can easily detect the plate and can continuously detect and track the plate when the plate is moved within the range of the spotlight.

The detection unit 121 may detect whether the object is an illuminant or a reflector with reference to an image captured by the camera 2011 while adjusting the amount of light by the illumination units 2010. For example, the detection unit 121 may recognize that the object is an illuminant when the object can be detected even in a dark state, and may recognize that the object is a reflector when the object can first be detected in a bright state. According to such a scheme, the detection unit 121 can identify even an object unregistered in the server as an illuminant or a reflector without inquiring of the server.

The information processing system 100 can improve search precision (detection precision) of the object through control of an illumination area. For example, as illustrated in the left drawing of FIG. 90, the detection unit 121 controls the illumination units 2010 such that the entire table 140*a* is illuminated immediately after the search start of the object (marker). Here, the marker is assumed to be a reflector. When the marker is detected, as illustrated in the right drawing of FIG. 90, the detection unit 121 controls the illumination units 2010 such that an illumination range is gradually narrowed to a region occupied by the marker. Accordingly, the information processing system 100 can explicitly give the user feedback on whether the marker placed on the table 140*a* is recognized and how much a presence range of the marker is narrowed. Further, when the illumination range is being narrowed down, the marker is illuminated and reflects despite the fact that the user moves the object. Therefore, the detection unit 121 can detect and track the marker. At this time, the detection unit 121 may control the illumination units 2010 such that the illumination range is broadened and then narrowed again. As illustrated in the left drawing of FIG. 91, when the marker deviates from the illumination range, the detection unit 121 can fail to detect the marker. In this case, as shown in the right drawing of FIG. 91, the detection unit 121 may broaden the illumination range and search for the marker again.

Figure 92:
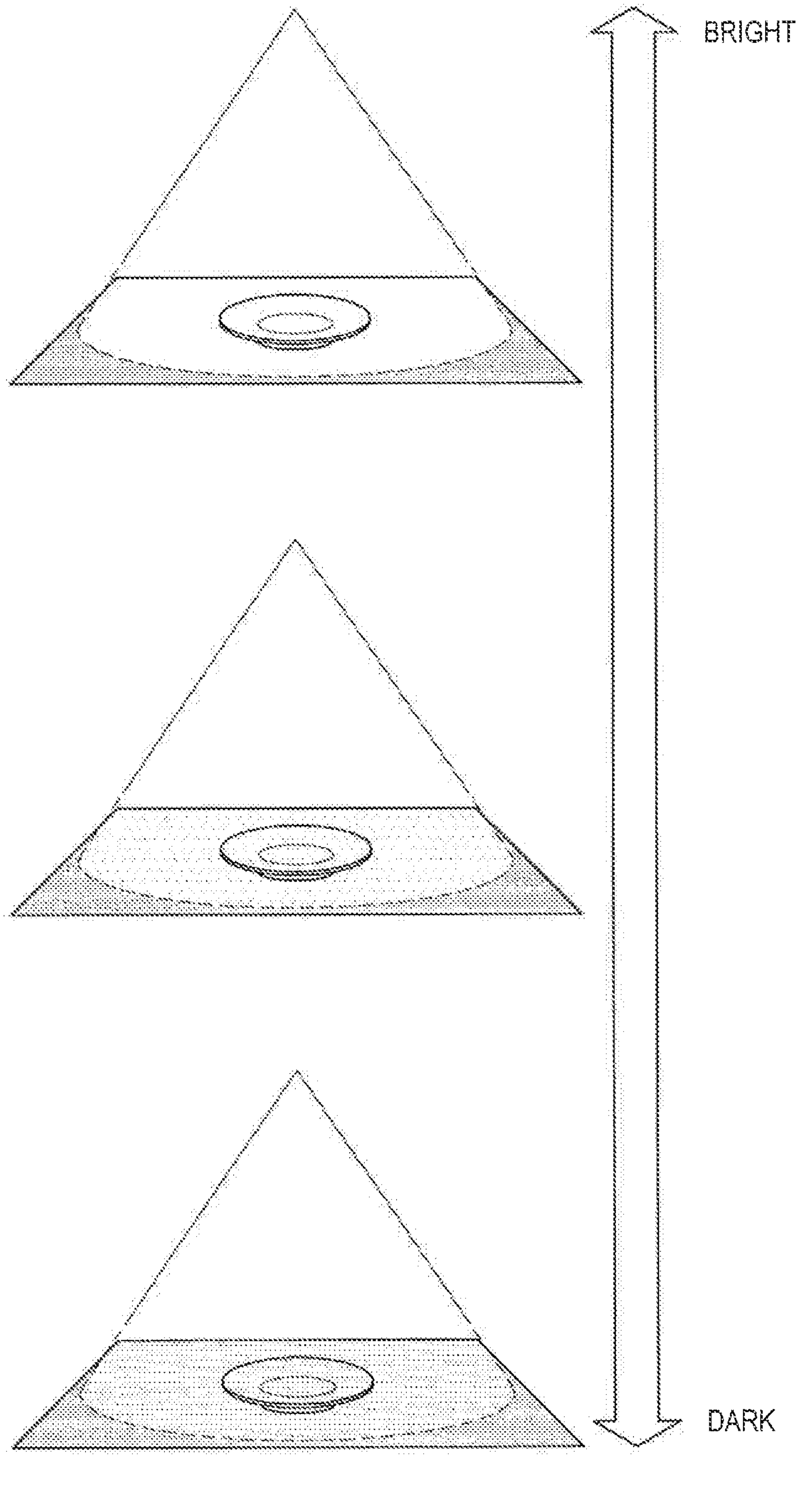
FIG. 92 is an explanatory diagram illustrating a user interface according to specific example 3.

The information processing system 100 can improve the search precision of the object through control of the amount of light. Specifically, the detection unit 121 adjusts the amount of light of the illumination units 2010 according to a material of the marker. For example, when the marker is formed of a glossy material such as glass or plastic and a highlight occurs, it may be difficult to detect the marker from the image captured by the camera 2011. Therefore, the detection unit 121 controls the illumination units 2010 such that the projection surface is irradiated with a small amount of light by which the marker can be detected. On the other hand, for example, when the marker is formed of a glossless (matte) material such as cloth, paper, or wood, the marker can be easily detected when an environment is bright. Therefore, the detection unit 121 controls the illumination units 2010 such that the projection surface is irradiated with as large an amount of light as possible. The detection unit 121 can determine the material of the marker, for example, with reference to information indicating the material of the marker registered in the server. As illustrated in FIG. 92, the detection unit 121 can search for the marker while repeatedly changing the strength of illumination. In this case, the detection unit 121 can detect the marker of any of various materials under an illumination environment proper for the material without inquiring of the server.

Figure 93:
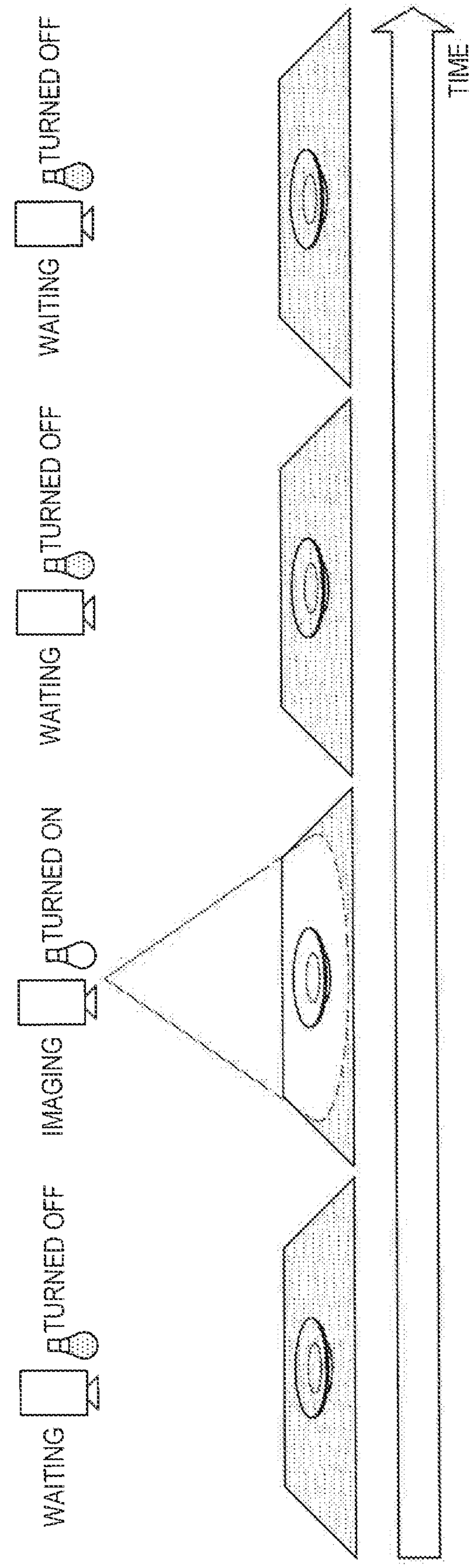
FIG. 93 is an explanatory diagram illustrating a user interface according to specific example 3.

As illustrated in FIG. 93, the information processing system 100 can improve search precision of the object by linking the illumination units 2010 and the camera 2011. FIG. 93 illustrates an example in which the object is detected under a dim environment and time flows from the left side to the right side. The detection unit 121 controls the illumination units 2010 such that the illumination units 2010 emit light in synchronization with a photographing interval of the camera 2011. That is, the detection unit 121 causes the illumination units 2010 to function as a strobe light (electronic flash) attached to a general camera. The camera 2011 can image reflected light of light emitted from the illumination units 2010 even in a dim environment, and thus the detection precision of the detection unit 121 is improved. For example, when a power frequency is 50 Hz, imaging and light emitting can be executed at intervals of 20 milliseconds. Since light is emitted at intervals which may not be recognized by a person, the object can be detected by the detection unit 121 even while the environment remains dim despite the momentary brightness.

As described above, according to the present specific example, the information processing system 100 can project a clear image to the projection surface by adjusting the illumination intensity and the illumination range by the illumination units according to the state of the projection surface. The information processing system 100 can suppress an influence on an environment in which an entire room unintentionally becomes dark or bright by adjusting the illumination range so that a necessary spot is irradiated. The information processing system 100 can improve recognition precision of the object placed on the table **140*a*** by adjusting the illumination intensity and the illumination range of the illumination units.

Specific Example 4

The present specific example is a form in which an excess of the number of recognizable manipulation objects is fed back. For example, when there is no feedback even when the table **140*a* is touched with a finger, the user may not discern whether the touch has failed to be recognized, whether a UI has failed to respond despite the touch being recognized, or whether he or she has failed to execute a manipulation. Here, when a recognizable number is exceeded, the information processing system 100** fails to detect a touch corresponding to the excess, and thus it is difficult to give the user feedback.

Figure 94:
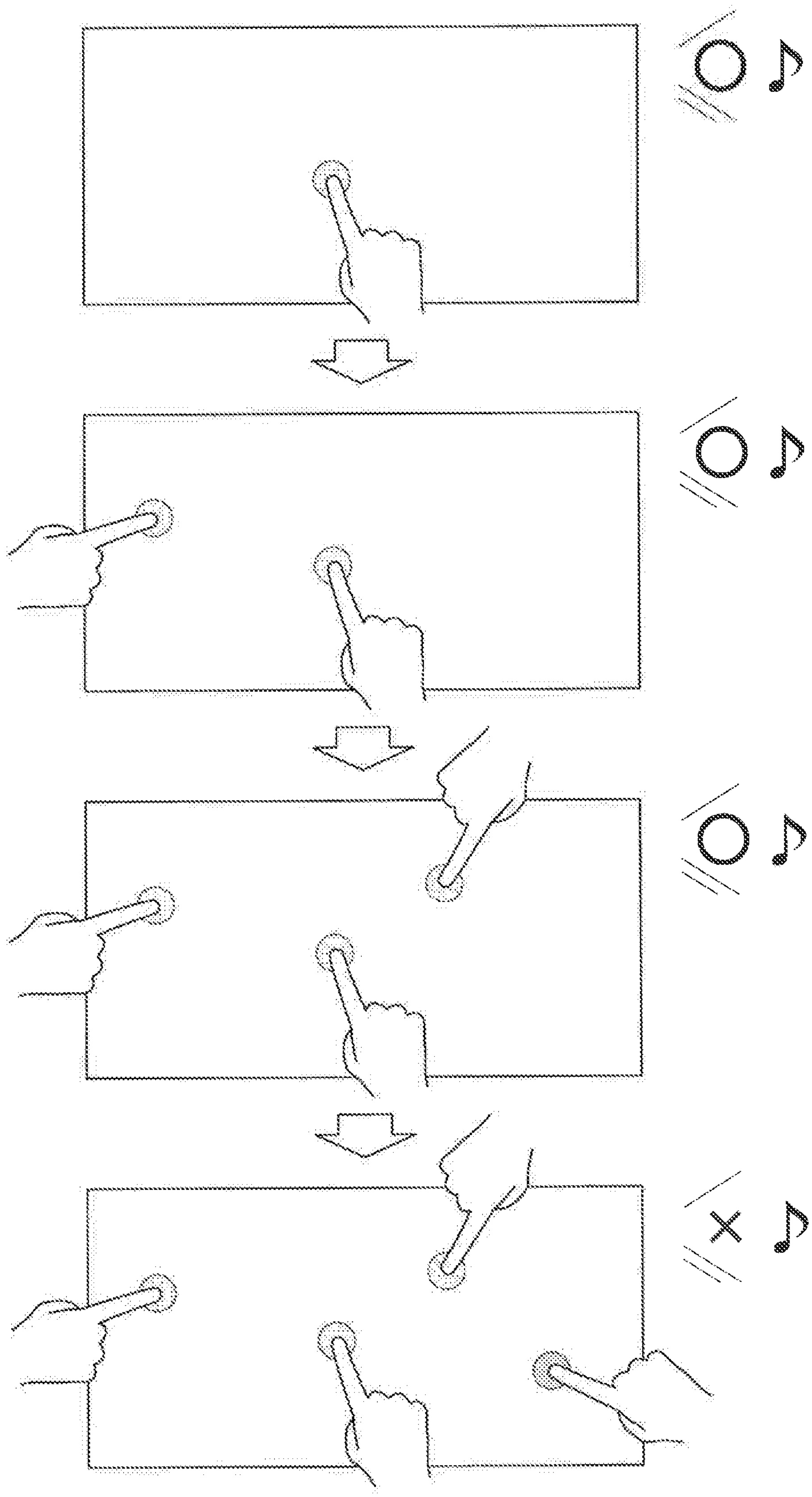
FIG. 94 is an explanatory diagram illustrating a user interface according to specific example 4.

Accordingly, the information processing system 100 according to the present specific example defines a number obtained by subtracting 1 from a computationally recognizable upper limit of the manipulation object as a recognizable upper limit based on specifications. The computationally recognizable upper limit means an upper limit of manipulation objects which can be detected by the detection unit 121. That is, one buffer is provided and the recognizable upper limit based on specifications is defined. Of course, the number of buffers may be any number other than 1. When the recognizable upper limit based on specifications is exceeded by 1, that is, when the number reaches the computationally recognizable upper limit, the information processing system 100 gives the user the feedback indicating that the manipulation object is unrecognizable. Specifically, the detection unit 121 detects a touched manipulation object on the table **140*a*. When the number of manipulation objects detected by the detection unit 121 is the computationally recognizable upper limit, the output control unit 122 controls the output unit 130 such that a warning is output. Hereinafter, the description will be made specifically with reference to FIG. 94. FIG. 94** is an explanatory diagram illustrating a user interface according to specific example 4.

FIG. 94 illustrates a feedback example given by the information processing system 100 when the computationally recognizable upper limit of the manipulation objects is 4. In this example, the recognizable upper limit based on specifications is 3 obtained by subtracting 4 from 1. Therefore, as illustrated in FIG. 94, when the number of fingers executing a touch manipulation is 1 to 3, the output control unit 122 controls the output unit 130 such that a sound effect indicating that touch detection is successful is output. As illustrated in FIG. 94, when the number of fingers executing a touch manipulation becomes 4, 4 exceeds 3 which is the recognizable upper limit based on specifications. Therefore, the output control unit 122 controls the output unit 130 such that a sound effect indicating that the touch detection has failed is output.

When the number of fingers touching the table **140*a* has already reached the recognizable upper limit based on specifications, the output control unit 122 may give feedback indicating that a finger is recognizable or unrecognizable, for example, at a timing at which the finger enters a view angle of the camera before the finger touches the table. Further, the output control unit 122 may give, for example, feedback indicating that a touch may not be detected when hands are clasped and the touch may not be available. In addition to the recognizable upper limit of the detection unit 121, the output control unit 122** may give, for example, feedback according to a recognizable upper limit defined in an application in which fingers are used one by one in a two-player game. For example, when the recognizable upper limit is 4, the number of fingers touching the table is 6, and thus two fingers are unrecognizable, feedback is given in preference for the top left side for scanning convenience.

When the recognizable upper limit is null, the recognizable upper limit can be available in preference for the top left side. Of course, the preferential position is not limited to the top left side, but any position may be preferred according to product design.

According to the present specific example, it is possible to explicitly give the user feedback indicating that the recognizable upper limit of manipulation objects is exceeded. Accordingly, it is possible to prevent a situation from deteriorating into the user misunderstanding that the UI is not responding and repeatedly hitting the table 140*a*.

Specific Example 5

The present specific example is a form in which a manipulation mode is changed according to a hand with which no manipulation is executed. The user can manipulate an image, text, an application, or the like projected to the table 140*a* with his or her finger. When the user temporarily stops what he or she is doing to change a manipulation mode, opens a menu, and selects the manipulation mode, it is difficult for him or her to continue without interruption. Accordingly, the information processing system 100 according to the present specific example changes the manipulation mode based on a recognition result of a hand with which no manipulation is executed.

Figure 95:
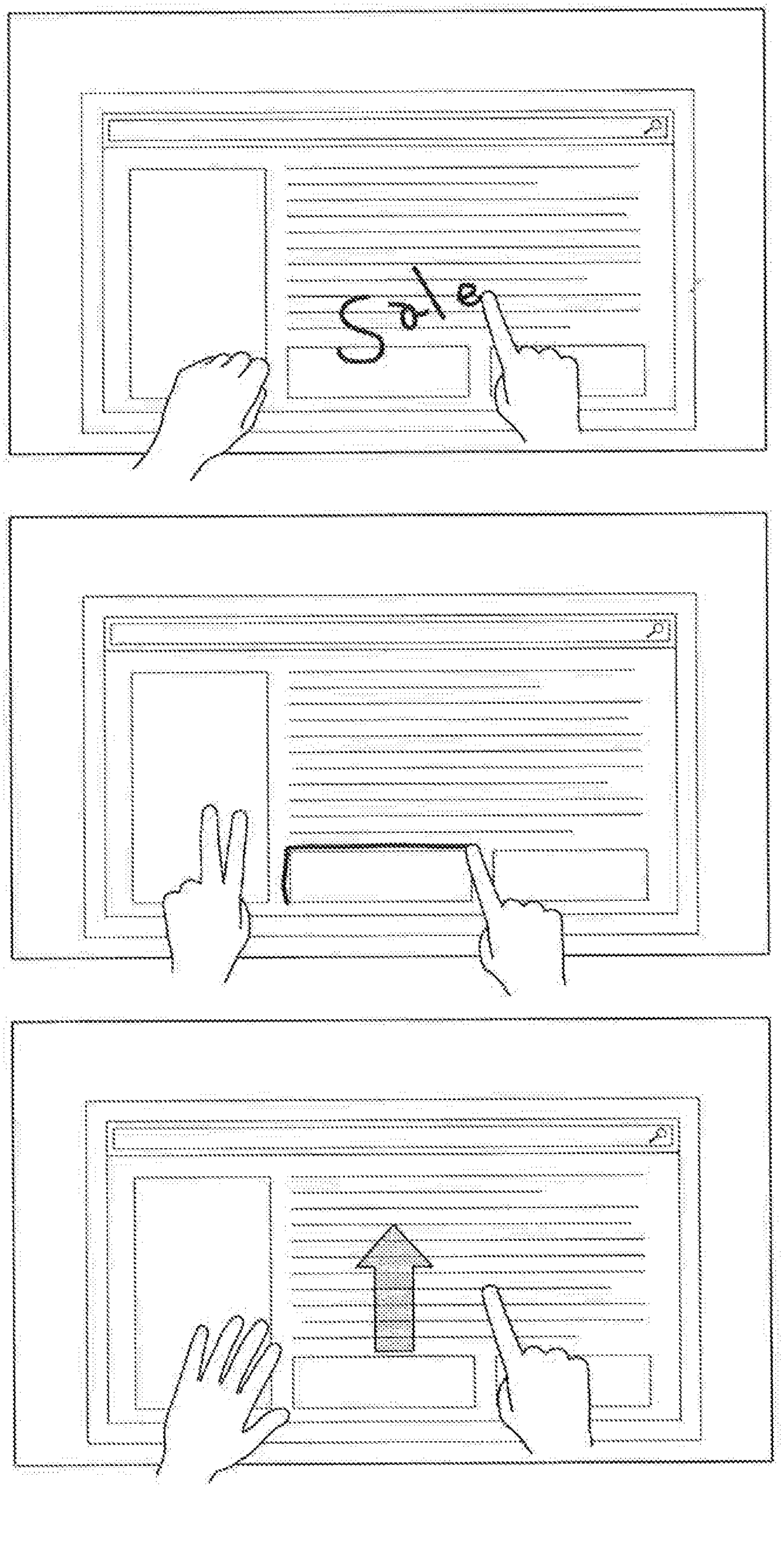
FIG. 95 is an explanatory diagram illustrating a user interface according to specific example 5.
Figure 96:
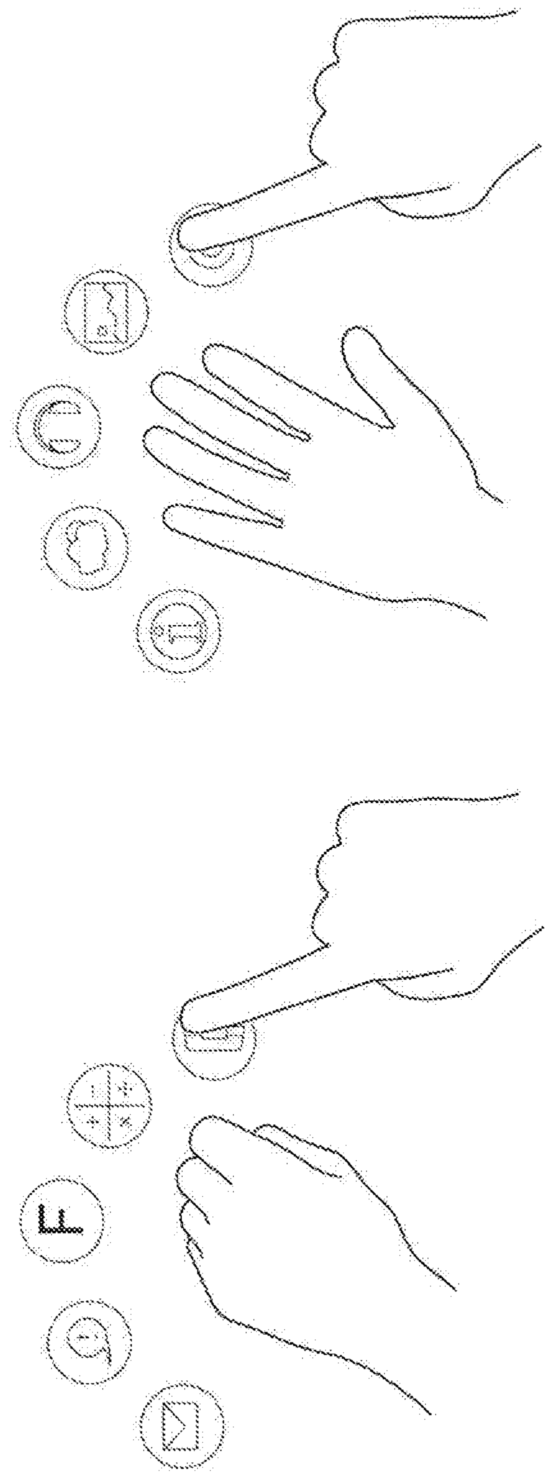
FIG. 96 is an explanatory diagram illustrating a user interface according to specific example 5.
Figure 97:
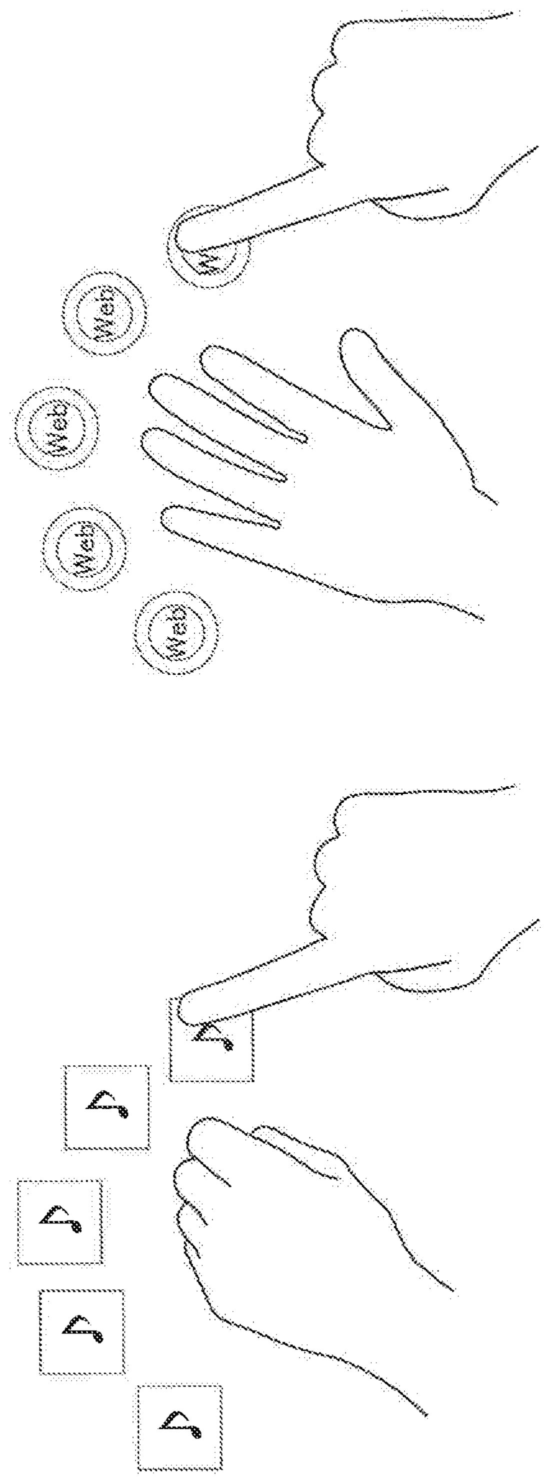
FIG. 97 is an explanatory diagram illustrating a user interface according to specific example 5.

Specifically, the detection unit 121 detects one pair of hands of the user. For example, two hands detected on the same side are detected as the one pair of hands by the detection unit 121. The output control unit 122 controls the output unit 130 such that an output is executed to cause one hand belonging to the one pair of hands detected by the detection unit 121 to function as an action point. For example, the output control unit 122 expresses an interaction of a scroll or the like according to a touched position by causing the right hand touching the table 140*a* with a finger to function as an action point to manipulate an application projected to the table 140*a*. The output control unit 122 controls the output unit 130 such that an output is executed to cause the other hand to function as a switcher which switches classification of an action at the action point according to the shape of the one hand. For example, the output control unit 122 switches the manipulation mode of a manipulation by the right hand according to the shape of the left hand. Of course, the functions of the right and left hands may be reversed. Hereinafter, the description will be made specifically with reference to FIGS. 95 to 97. FIGS. 95 to 97 are explanatory diagrams illustrating a user interface according to specific example 5.

For example, when the left hand is in the shape of a rock of the rock-paper-scissors game, the detection unit 121 recognizes the shape of the left hand based on a captured image and the output control unit 122 switches the manipulation mode to "paperweight mode." In the "paperweight mode," as illustrated in the upper drawing of FIG. 95, the output control unit 122 controls the output unit 130 such that text is drawn at a point touched by the right hand. When the left hand is in the shape of scissors of the rock-paper-scissors game, the detection unit 121 recognizes the shape of the left hand based on a captured image and the output control unit 122 switches the manipulation mode to "scissors mode." In the "scissors mode," as illustrated in the middle drawing of FIG. 95, the output control unit 122 controls the output unit 130 such that an expression in which a projected image is cut out is executed at a point touched by the right hand. When the left hand is in the shape of paper of the rock-paper-scissors game, the detection unit 121 recognizes the shape of the left hand based on a captured image and the output control unit 122 switches the manipulation mode to "normal mode." In the "normal mode," as illustrated in the lower drawing of FIG. 95, the output control unit 122 controls the output unit 130 such that a normal manipulation such as tapping or dragging is executed at a point touched by the right hand. As illustrated in FIG. 96, the output control unit 122 may control the output unit 130 so that a different menu is output according to the shape of the hand detected by the detection unit 121. As illustrated in FIG. 97, the output control unit 122 may control the output unit 130 such that a file list of different media is output according to the shape of the hand detected by the detection unit 121. In the example illustrated in FIG. 97, when the left hand is in the shape of the rock of the rock-paper-scissors game, a list of music files is output. When the left hand is in the shape of the paper of the rock-paper-scissors game, a list of web files is output.

The output control unit 122 may explicitly give the user a feedback of the manipulation mode by projecting display indicating the current manipulation mode to one of the right hand functioning as the action point and the left hand functioning as the switcher. For example, the output control unit 122 controls the output unit 130 such that a scissors mark is projected to a fingernail or the back of the hand when the manipulation mode is the scissors mode. The output control unit 122 may switch the classification of the action at the action point according to the shape of the right hand functioning as the action point. For example, the output control unit 122 may control the output unit 130 such that a fine line is drawn when one finger of the right hand is spread and a thick line is drawn when two fingers of the right hand are spread. The output control unit 122 may maintain the manipulation mode even when the left hand functioning as the switcher is off the table 140*a* and the recognition of the detection unit 121 fails. For example, even when the left hand of the user is in the scissors shape, and the manipulation mode is switched to the scissors mode, and if the user subsequently pulls back his or her left hand, the output control unit 122 may maintain the scissors mode.

As described above, according to the present specific example, the user can switch the manipulation mode with the hand with which no manipulation is executed. Therefore, the user can seamlessly switch the manipulation mode without interruption of his or her current task, and thus continuous work is possible. Since the user can intuitively switch the manipulation mode, a learning cost related to the switching of the manipulation mode is low.

Specific Example 6

The present specific example is a form in which constituent elements such as a camera and a projector are formed in units of modules and replacement is possible for each module according to necessity by enabling connection by a standardized interface. When the information processing system 100 is formed as an integrated product, methods of extending functions other than replacing the information processing system 100 may become difficult. Accordingly, in the information processing system 100 according to the present specific example, constituent elements can be modularized and module units can be exchanged.

Figure 98:
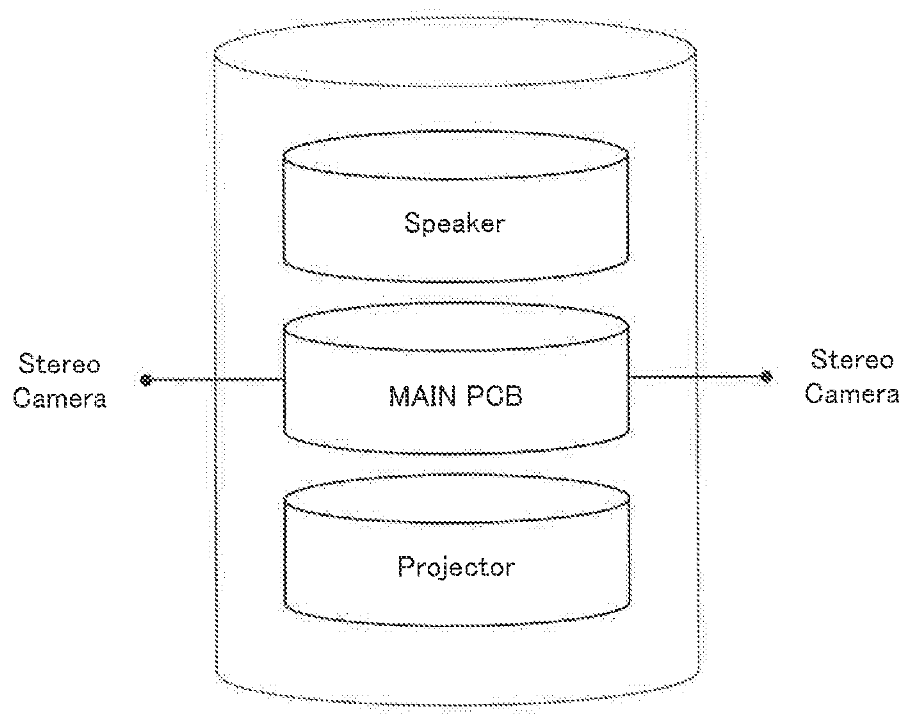
FIG. 98 is an explanatory diagram illustrating a user interface according to specific example 6.
Figure 99:
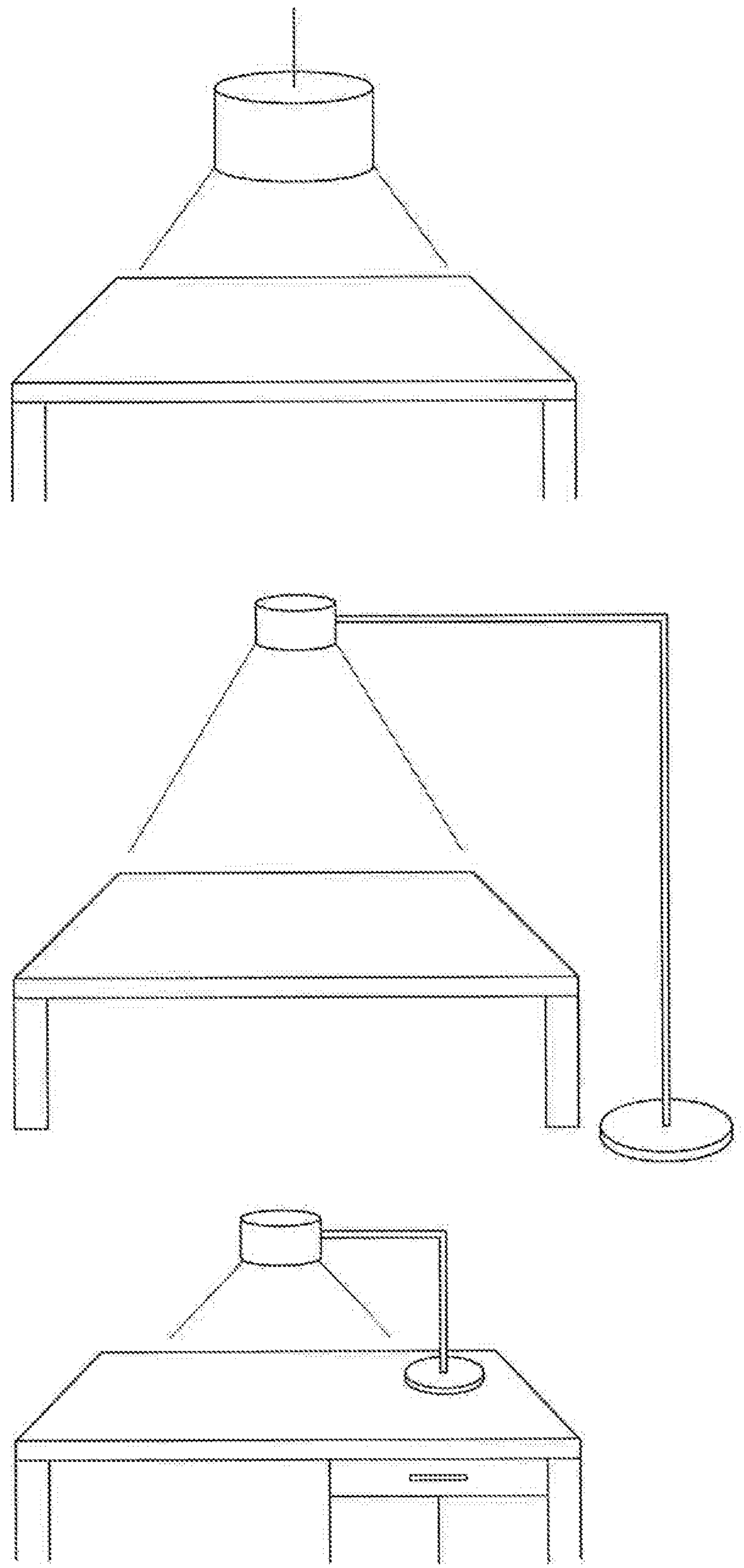
FIG. 99 is an explanatory diagram illustrating a user interface according to specific example 6.

Specifically, a CPU, a camera, a projector, an LED light, a microphone, a speaker, and the like included in the information processing system 100 are stored in standardized modules. Such constituent elements may be individually stored or a plurality of constituent elements may be combined and stored in one module. For example, a module storing the CPU, the projector, and the camera may be comprehended as a core module and a module storing the other constituent elements may be comprehended as a sub-module. Mutual communication and power feeding can be achieved by connecting the modules via a common interface and all of the connected modules can function as the information processing system 100. It is also possible for only the core module to function as the information processing system 100. The interface may be realized through wireless communication, may be realized through wired communication, or may be connected physically by terminals. Hereinafter, the present specific example will be made specifically with reference to FIGS. 98 and 99. FIGS. 98 and 99 are explanatory diagrams illustrating user interfaces according to specific example 6.

FIG. 98 illustrates a simple configuration example of the body of the information processing system 100 according to the present specific example. In the configuration example illustrated in FIG. 98, a module storing the projector (Projector) is disposed in the lowest layer, a module storing a control substrate (MAIN PCB) on which the CPU is mounted is disposed in the middle layer, and a module storing a speaker (Speaker) is disposed in the highest layer in a cylindrical container. Further, stereo cameras (Stereo Camera) connected to the control substrate are disposed on the right and left sides of the cylindrical container. Such modules may be connected by, for example, common terminals. When there is a gap between the module storing the speaker and the module storing the control substrate, an improvement in sound quality and a heat radiation effect are expected. It is possible to realize the projection type information processing system 100 by connecting the speaker side to a ceiling and orienting the projector side to the floor side. The modules may be disposed to overlap in the vertical direction, as illustrated in FIG. 98, may be arranged in a straight line in the horizontal direction, may be arranged on a flat surface, or may be disposed to be individually separated at any position. In addition to the modules illustrated in FIG. 98, sub-modules of an illuminator and a speaker may be connected arbitrarily. As illustrated in FIG. 99, the information processing system 100 may be formed as an illumination device with a shape suspended from a ceiling, may be formed as a floor lamp type illumination device, or may be formed as a desk lamp type illumination device.

When illuminators are provided away from the core module, the core module may recognize a positional relation between the core module and the illuminators by specifying light-emitting positions through image recognition while causing the illuminators to sequentially emit light. Accordingly, the core module can cause the illuminator provided at proper positions to selectively emit light according to the state of the projection surface or the like. Additionally, the core module may notify the user to that an expiration date is approaching by recording an installation date of the illuminators and projecting a message, "These lights will soon expire," for example. When a speaker with a broad range is fitted, the core module may output a sound mainly using this speaker and may use another speaker for balance adjustment.

According to the present specific example, since each module can be replaced partially rather than the entire product, the replacement cost of the product is suppressed and resources are saved. According to the present specific example, it is possible to easily realize the extension of the function by replacing the module. For example, the user can improve performance such as the processing capability of the CPU, the resolution of the camera, and the recognition precision by substituting the core module. The user can enjoy a design variation of the abundantly developed speakers and illuminators, for example, by substituting the sub-module.

Specific Example 7

The present specific example is a form in which display of screens is synchronized when a plurality of screens of the same application are displayed. Generally, applications are displayed in a single direction. However, when it is assumed that a plurality of users surround the table 140*a* and use one application, for example, it is hard for the users standing in reverse directions to both view the application. Accordingly, the information processing system 100 according to the present specific example displays a plurality of screens of the same application and switches between synchronization (mirroring) and non-synchronization (releasing of the mirroring) of the screens as necessary.

Specifically, the detection unit 121 detects a manipulation object. The output control unit 122 controls the output unit 130 such that at least two screens are displayed on the display surface according to the manipulation object detected by the detection unit 121. For example, the output control unit 122 displays the screens of the same application based on the directions of fingers detected by the detection unit 121 so that the screens directly face the plurality of users surrounding the table 140*a*. When the screens are synchronized, the output control unit 122 controls the output unit 130 such that display is executed to similarly reflect a manipulation on one screen with the manipulation object detected by the detection unit 121 on the other screen. For example, when one user scrolls the screen with his or her finger, the screen displayed for the other user is scrolled similarly. Hereinafter, the description will be made specifically with reference to FIGS. 100 to 103. FIGS. 100 to 103 are explanatory diagrams illustrating user interfaces according to specific example 7.

Figure 100:
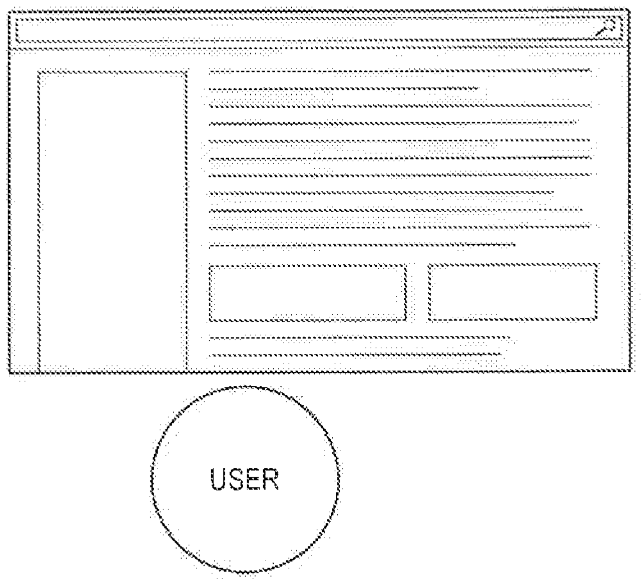
FIG. 100 is an explanatory diagram illustrating a user interface according to specific example 7.
Figure 101:
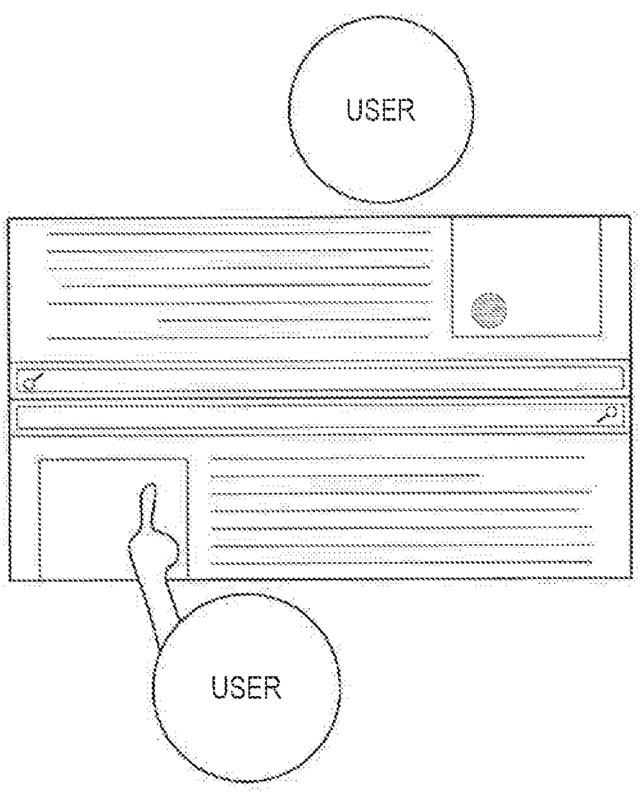
FIG. 101 is an explanatory diagram illustrating a user interface according to specific example 7.
Figure 102:
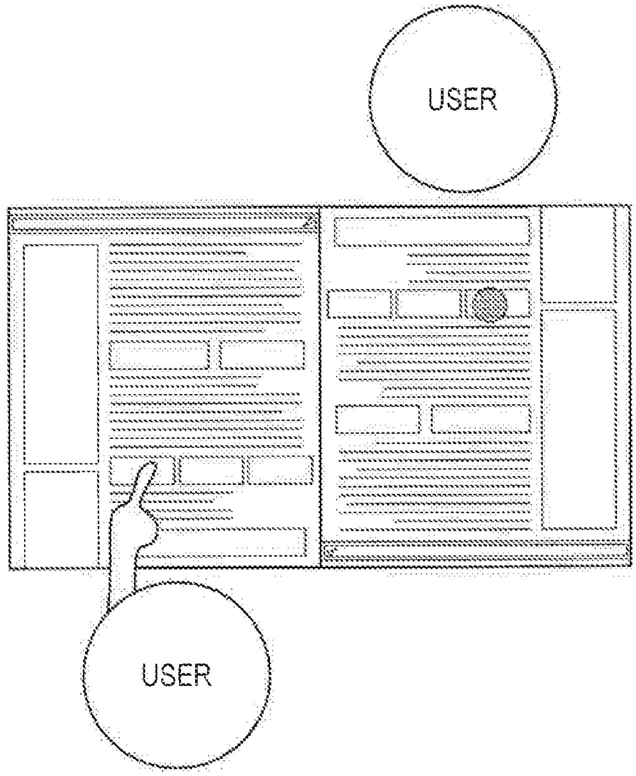
FIG. 102 is an explanatory diagram illustrating a user interface according to specific example 7.
Figure 103:
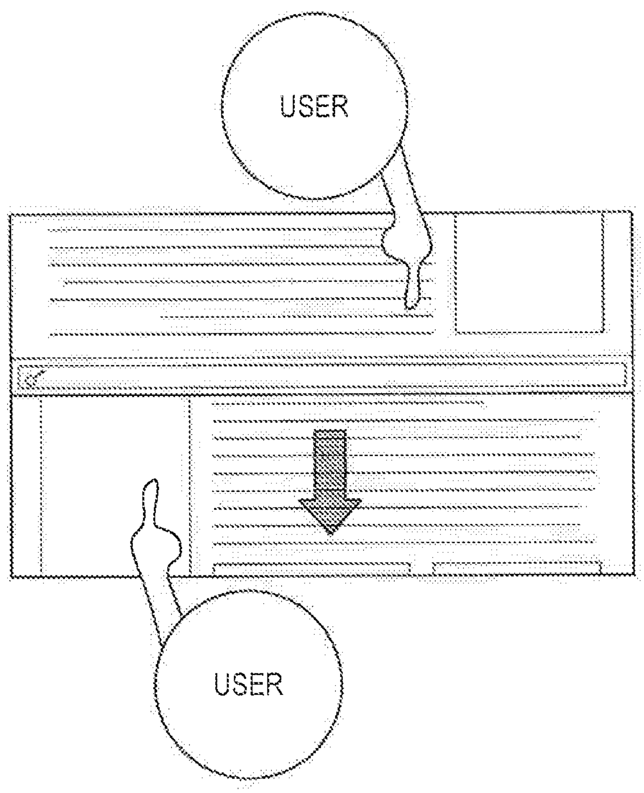
FIG. 103 is an explanatory diagram illustrating a user interface according to specific example 7.

FIG. 100 illustrates a normal state in which a web browser is displayed on one screen. FIG. 101 illustrates a synchronous display state in which web browsers are synchronously displayed on two screens. The output control unit 122 reflects a manipulation on one screen on the other screen while the screens are synchronized. For example, as illustrated in FIG. 101, when one user clicks the screen to transition the screen, the output control unit 122 controls the output unit 130 such that the screen transitions similarly so that the same spot is clicked on the other screen. FIG. 101 illustrates an example in which a display surface is divided into two upper and lower surfaces for synchronous display. As illustrated in FIG. 102, the output control unit 122 may control the output unit 130 such that the display surface is divided into two right and left surfaces that are synchronously displayed. When the synchronization is released, as illustrated in FIG. 103, the output control unit 122 may control the output unit 130 such that display in which each user individually executes a scroll manipulation on his or her screen is executed. When the synchronization is executed again, the output control unit 122 unifies the displays of another screen (slave) in accordance with the display of one of the screens serving as a master.

In addition to the scroll, the output control unit 122 can, for example, synchronously display text entry, input of a marker in a map application, etc. on all screens. Additionally, for example, when a plurality of users browse a certain entire web page, the output control unit 122 may display the positions of regions displayed by other users in rectangular forms or may display the directions of the regions with arrows. FIGS. 100 to 103 illustrate examples in which the screens are displayed in contact states, but the screens may each be separated.

The output control unit 122 may divide (branch) one screen into two screens or may unify (join) two screens into one screen. The output control unit 122 may display the plurality of branched screens synchronously or asynchronously. The output control unit 122 may rejoin the plurality of branched screens. In this case, the output control unit 122 displays one screen serving as a master as the joined screen.

Various methods of deciding the screen serving as the master at the time of joining are considered. For example, the output control unit 122 may set the screen first selected to be joined as a master and set the other screen as a slave. At this time, the output control unit 122 may display a dialog "Would you like to join?" on another screen and set a screen on which the user agrees to join as a slave. When the joined screens are branched again, the output control unit 122 may display a screen displayed originally by a slave as the screen of the slave. For example, an example in which the output control unit 122 synchronizes a master displaying web page "A" with a slave displaying web page "B" to display one web page "A" is assumed. Thereafter, when the web pages are branched again, the output control unit 122 may cause the master to display web page "A" and cause the slave to display web page "B."

Various opportunities to execute branching and joining are considered. For example, the output control unit 122 may control the output unit 130 such that the branching and the joining are executed by a user's selection of a menu item detected by the detection unit 121. Additionally, the output control unit 122 may execute the branching when the detection unit 121 detects an operation of dragging and moving fingers touching the one screen right and left. Additionally, the output control unit 122 may execute the branching when the detection unit 12 detects an operation of two users touching the screen and drawing one screen right and left to cut the screen. In contrast, the output control unit 122 may execute the joining when the detection unit 121 detects an operation of moving fingers touching two screens so that the fingers overlap. The detection unit 121 may distinguish a manipulation indicating the branching and the joining from manipulations such as pinch-in and pinch-out according to the number of fingers or the like. The output control unit 122 may permit only the master to decide the joining or non-joining, may permit only the slave to decide the joining, or may permit all of the screens including the slave to decide the joining.

As described above, according to the present specific example, since a plurality of screens can be displayed in the directions according to the positions of the users, it is possible to realize high visibility from different directions. According to the present specific example, since the plurality of screens can be switched synchronously or asynchronously as necessary, it is possible to realize extemporaneous display and manipulations according to the state of an application. According to the present specific example, when the screens are synchronized, a manipulation from another person is fed back. The user can easily recognize which manipulation the other person executes and how an application operates.

Specific Example 8

The present specific example is a form in which a subject on the table 140*a* is recorded and is reproduced with an original size. The subject on the table 140*a* is, for example, an object such as a picture or a photo placed on the table 140*a*, or an image projected to the table 140*a*. The information processing system 100 according to the present specific example images a subject on the table 140*a* at a certain time point and causes a projector (projection unit) to project the captured image so that the subject is subsequently displayed with a real size on the table 140*a*. Here, when an environment of a projection distance, a projection view angle, or the like is changed before a state is reproduced after recording of the state, it may be difficult for the information processing system 100 to reproduce the state with the original size in some cases. Accordingly, the information processing system 100 according to the present specific example stores a projection distance between the projector and the table 140*a* and a projection view angle of the projector at a recording time point and changes (calibrates) a projection size according to the projection distance and the projection view angle at a reproduction time point.

As a prerequisite process for such calibration, the control unit 120 executes an adjustment process of matching an imaged size by the camera and a projected sized by the projector. Specifically, the control unit 120 functions as an adjustment unit executing adjustment so that the projected size of the subject matches the real size of the subject when an image obtained by imaging the subject on the table 140*a* by the camera is projected to the table 140*a* by the projector. The control unit 120 executes, for example, position alignment of 4 points on the table 140*a* and executes homography conversion as the adjustment process. In an environment in which such an adjustment process is executed and which is realized by the projector, the camera, and the table 140*a*, for example, the information processing system 100 can capture a picture placed on the table 140*a* and project the picture with the same size at a later date. However, when the settings of the projector such as the projection distance or the projection view angle are changed, the projected size of the image projected by the projector is also changed. Accordingly, the information processing system 100 realizes projection of the subject with the original size by storing the captured image and the setting information in association therewith and adjusting the projected size according to a change in the setting information.

Specifically, in an environment (first environment) at a certain time point at which the adjustment process is executed, the control unit 120 first stores a captured image obtained by the camera (first imaging unit) imaging the subject on the table 140*a* (first projection surface) and the setting information of the projector. The control unit 120 may function as a storage unit that stores the setting information. The setting information is information that includes information indicating a projection distance which is a distance between the projector and the projection surface. The projection distance may be information indicating a distance between the projector and the subject. The setting information may further include information indicating a projection view angle which is a view angle of the projector.

When the projection distance or the projection view angle is changed, the control unit 120 first executes the adjustment process. Subsequently, in the environment subjected to the adjustment process (second environment), the information processing system 100 compares the setting information of the projector after the change (second projection unit) to the stored setting information before the change. Based on the comparison result, the information processing system 100 controls the projector such that the subject of the stored captured image is projected with the real size. Hereinafter, the description will be made specifically with reference to FIGS. 104 to 110. FIGS. 104 to 110 are explanatory diagrams illustrating user interfaces according to specific example 8.

Figure 104:
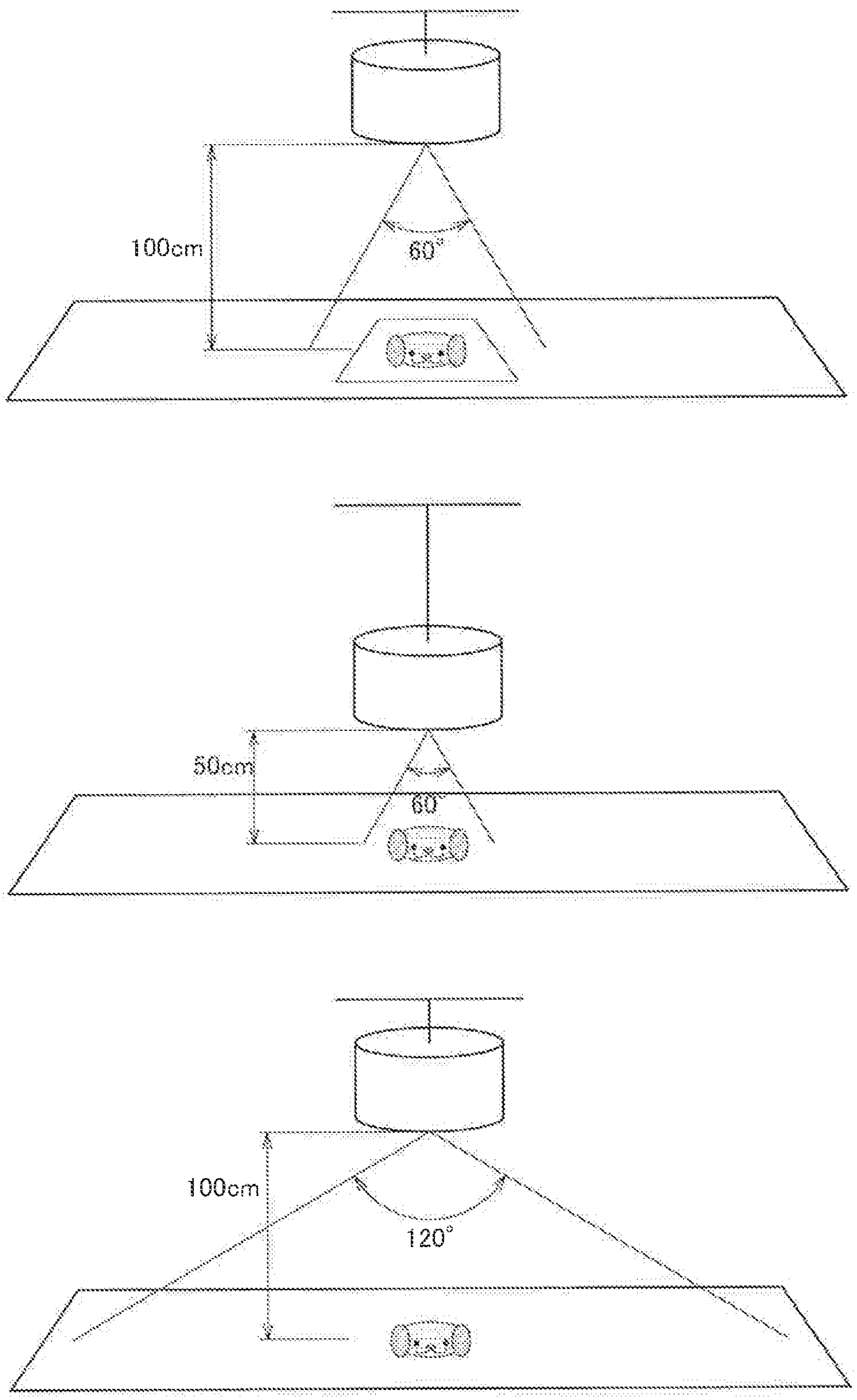
FIG. 104 is an explanatory diagram illustrating a user interface according to specific example 8.

As illustrated in the upper drawing of FIG. 104, an example in which a picture is placed on the table 140*a* is assumed. First, the detection unit 121 controls the input unit 110 such that the placed picture is captured to acquire a captured image. Subsequently, the control unit 120 stores a projection distance of 100 cm and a projection view angle of 60° as setting information in addition to the acquired captured image. At this time point, the picture is projected with the same size as the real size when the projector projects the captured image.

When the projection distance is changed, for example, when the table 140*a* is replaced, the output control unit 122 compares the stored setting information to the setting information after the change and controls the projector such that the expansion or reduction display is executed. For example, as illustrated in the middle drawing of FIG. 104, when the projection distance is changed from 100 cm to 50 cm, the output control unit 122 controls the projector such that the picture is expanded to twice the size of the normal size to be projected. Accordingly, the picture is reproduced with the real size.

When the projection view angle is changed, for example, when the projector is replaced, the output control unit 122 compares the stored setting information to the setting information after the change and controls the projector such that expansion or reduction display is executed. For example, as illustrated in the lower drawing of FIG. 104, when the projection view angle is changed from 60° to 120°, the output control unit 122 controls the projector such that the picture is reduced to 0.5 times the normal size to be projected. Accordingly, the picture is reproduced with the real size. In FIG. 104, the example in which the setting of the projector is changed at the same home (the same information processing system 100) has been described. However, even when an image is transmitted to a different home, the same calibration may be executed. The change in the environment can be absorbed through the calibration.

Figure 105:
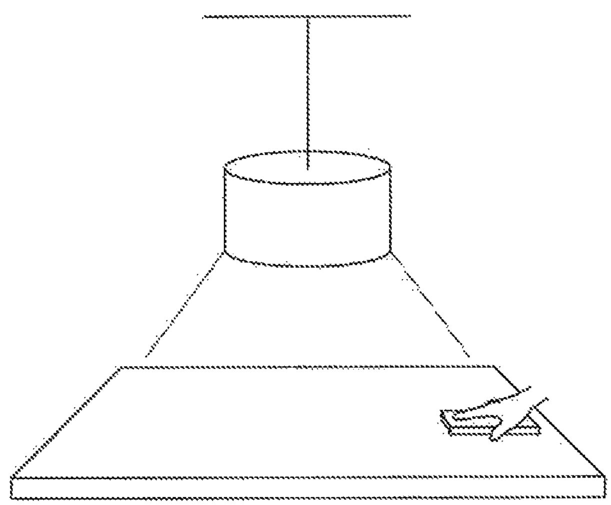
FIG. 105 is an explanatory diagram illustrating a user interface according to specific example 8.
Figure 106:
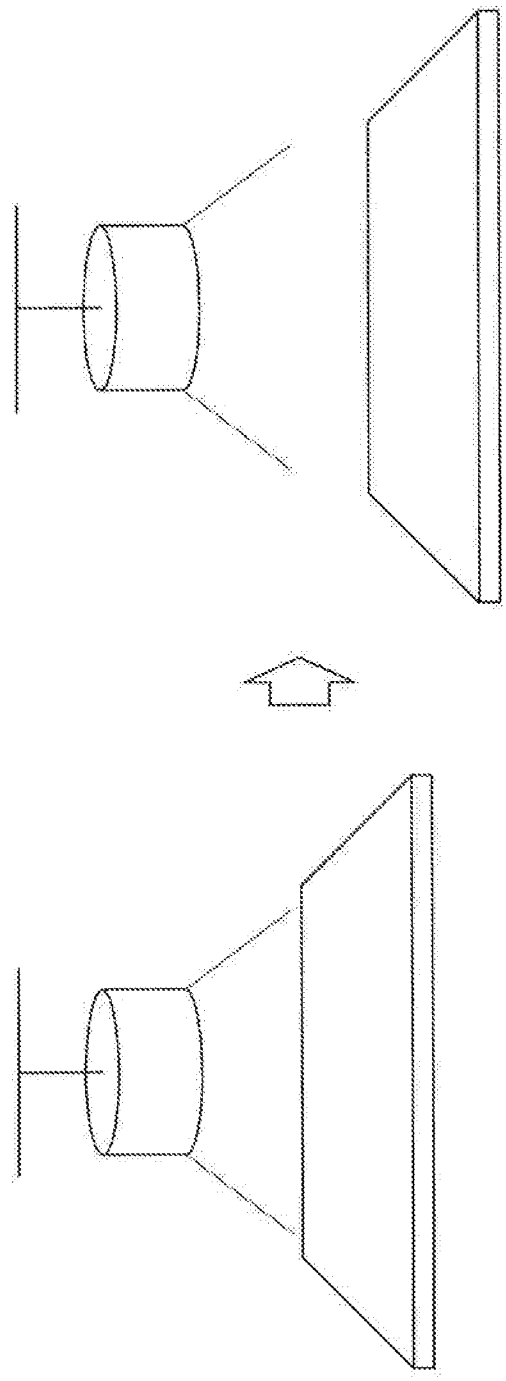
FIG. 106 is an explanatory diagram illustrating a user interface according to specific example 8.
Figure 107:
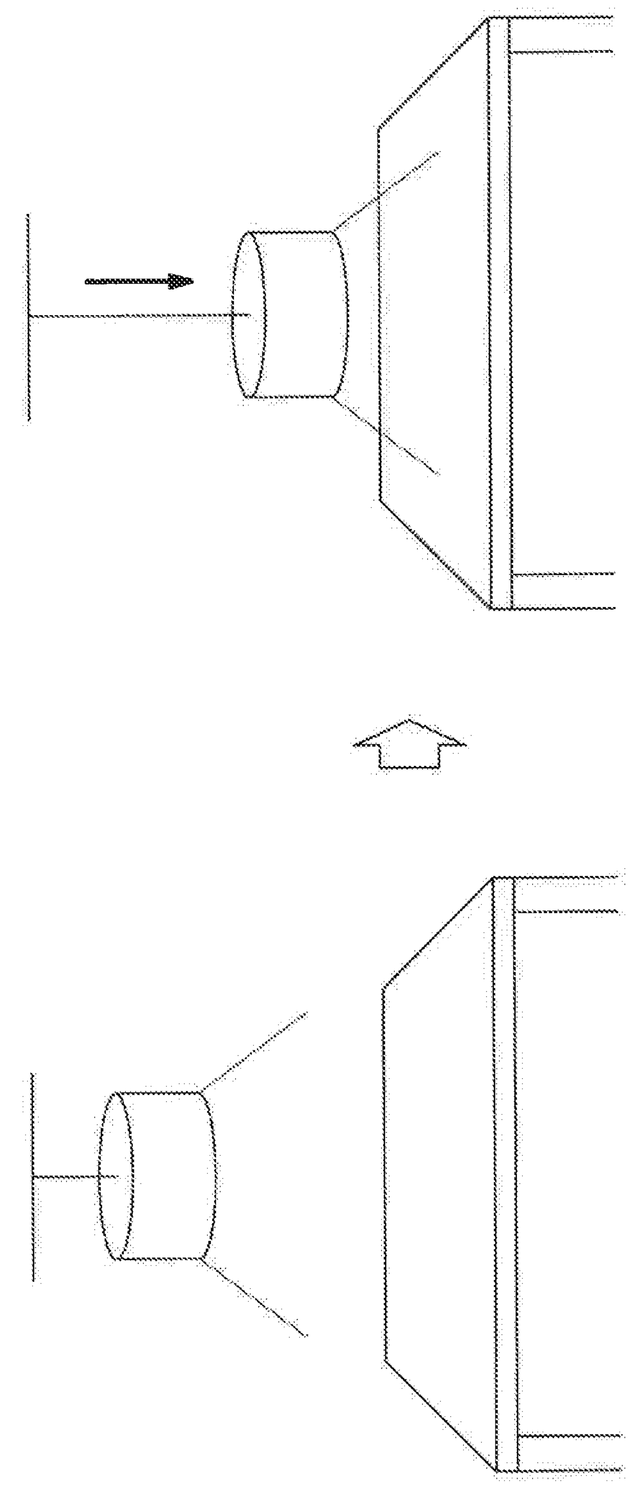
FIG. 107 is an explanatory diagram illustrating a user interface according to specific example 8.
Figure 108:
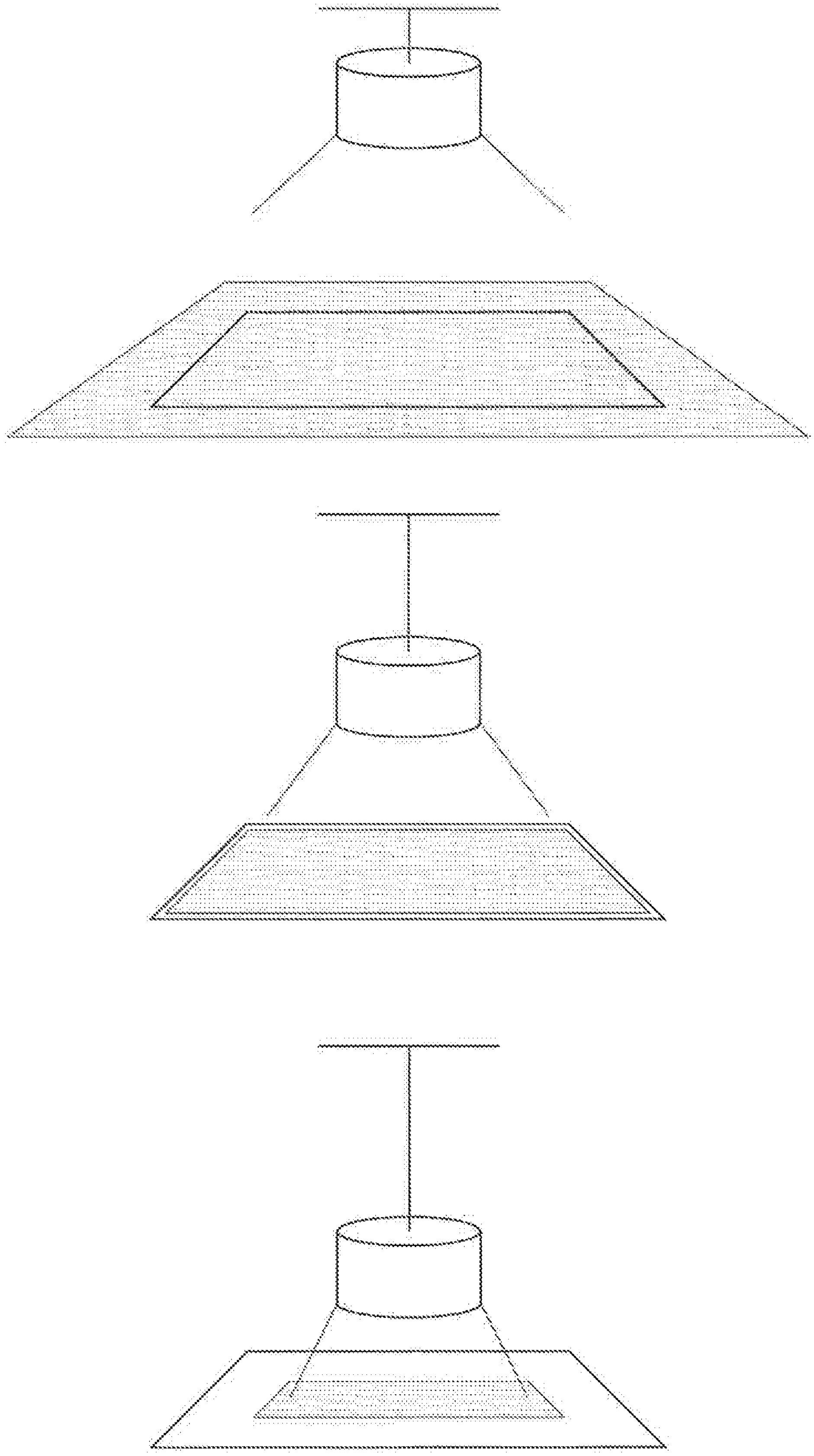
FIG. 108 is an explanatory diagram illustrating a user interface according to specific example 8.
Figure 109:
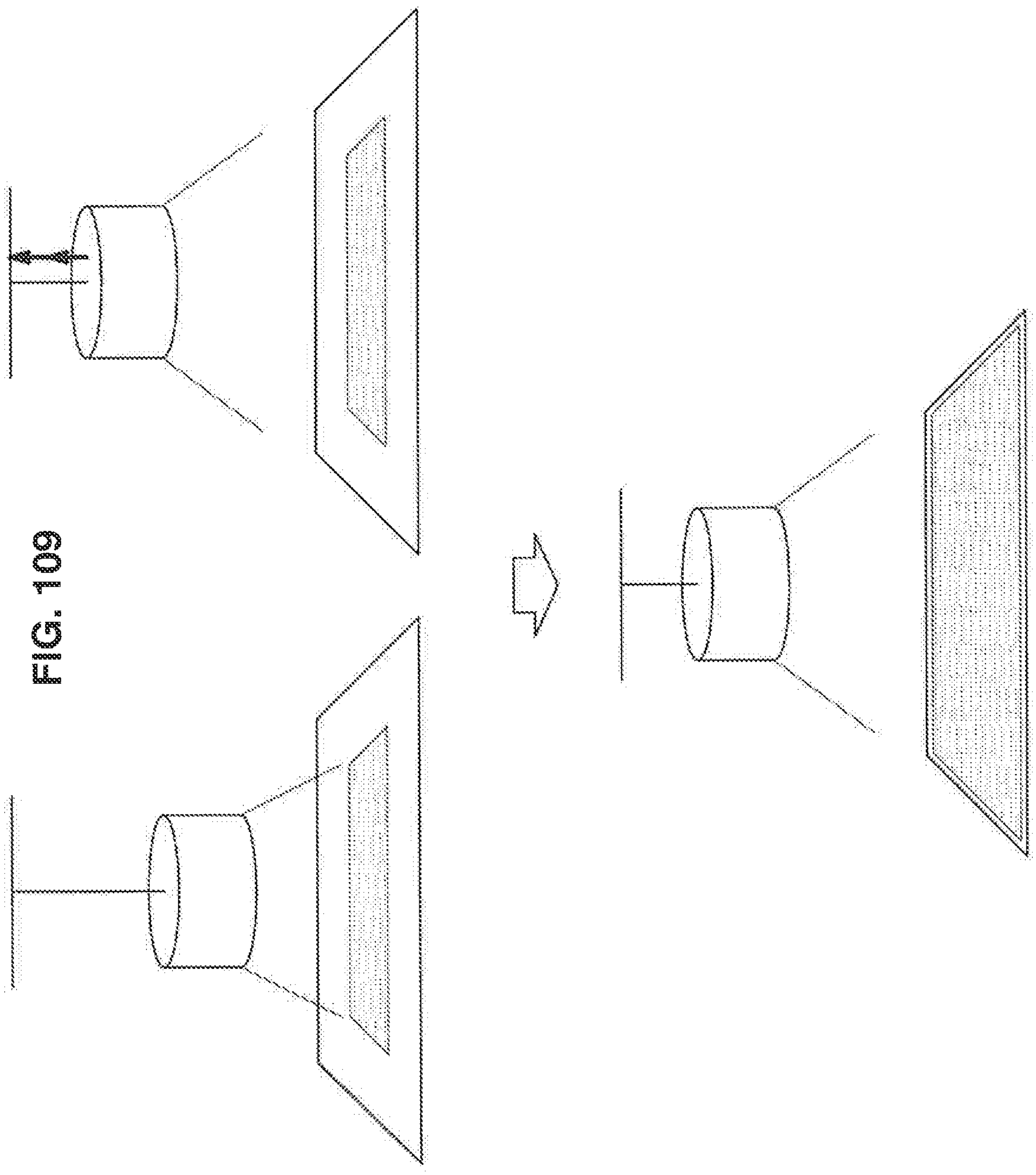
FIG. 109 is an explanatory diagram illustrating a user interface according to specific example 8.

Various timings at which such a calibration function is provoked are considered. For example, as illustrated in FIG. 105, the information processing system 100 may provoke the calibration function at a timing at which the user presses a switch on the table. As illustrated in FIG. 106, the information processing system 100 may provoke the calibration function at a timing at which the table 140*a* is changed due to cleaning, rearrangement, or the like. For example, when a change in the distance (projection distance) to a maximum flat surface is detected by the detection unit 121, the information processing system 100 may automatically provoke the calibration function. As illustrated in FIG. 107, the information processing system 100 may provoke the calibration function at a timing at which a height (projection distance) is changed by an elevation function. The elevation function is realized by, for example, an elevation device operated by a motor.

The information processing system 100 may automatically adjust the height using the elevation function so that the distance in which the projection surface is used as broadly as possible is set. Specifically, the output control unit 122 controls the projector such that a predetermined pattern is projected and the detection unit 121 controls the camera such that a projected image is captured. Then, the control unit 120 adjusts the height using the elevation function so that the height for an image in which the projected predetermined pattern entirely falls on the table 140*a* is captured is achieved. For example, in an example illustrated in the upper drawing of FIG. 108, the distance to the projection surface is far since the projected pattern protrudes from the table 140*a*. On the other hand, in an example illustrated in the lower drawing of FIG. 108, the distance to the projection surface is close since the projected pattern is pictured small on the table 140*a*. Accordingly, as illustrated in the middle drawing of FIG. 108, the control unit 120 adjusts the height so that an optimum distance in which the projected pattern is pictured across the entire area of the table 140*a* is set. The control unit 120 may realize more highly reliable adjustment by measuring a distance from the size of the pattern included in the captured image in conjunction with a projection distance acquired from a depth sensor (stereo camera).

The information processing system 100 may execute the calibration during elevation of the elevation function. For example, as illustrated in the upper drawing of FIG. 109, the control unit 120 may control the projector such that a projection size is constant during elevation. As illustrated in the lower drawing of FIG. 109, the control unit 120 may control the projector such that an image is projected with the original projection size after completion of the elevation. The information processing system 100 can execute the elevation while adjusting the projection size based on a change in the projection distance during the elevation, so that the user can execute a manipulation and browsing even during the elevation.

According to the present specific example, as described above, it is possible to maintain the display of the original size even when a change in an environment, such as replacement of the table, a change in an installation location, or a change in the projector occurs. Accordingly, it is possible to record and reproduce, for example, a memorable work without change.

In the case of the projection type illustrated in FIG. 1, the device such as the stereo camera or the projector included in the information processing system 100 is suspended from a ceiling. The device included in the information processing system 100 can be moved to any location by the user. Here, according to a material used to suspend each device, vibration occurs due to movement, and thus a time necessary for the vibration to converge largely depends on the material.

Figure 110:
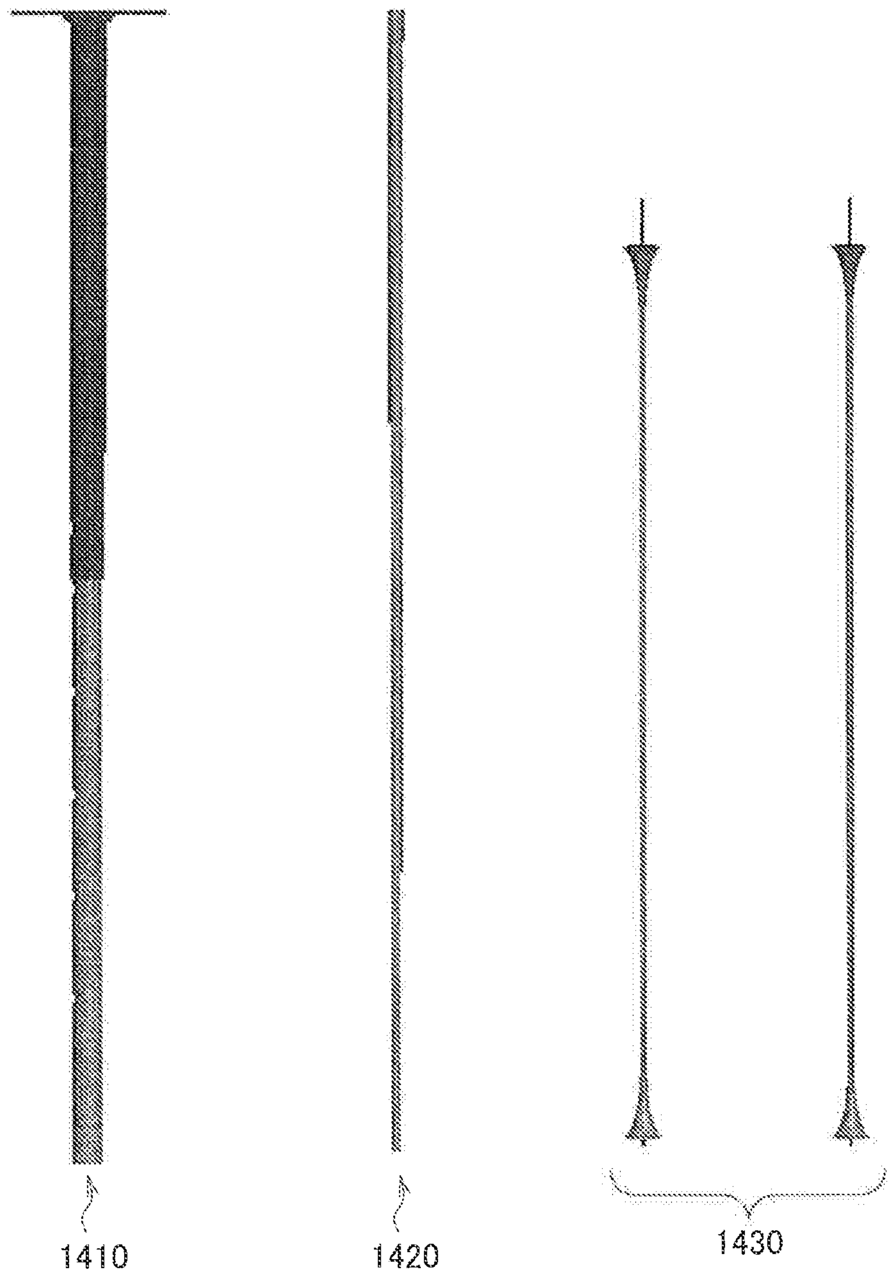
FIG. 110 is an explanatory diagram illustrating a user interface according to specific example 8.

Here, convergence times were measured by suspending the device included in the information processing system 100 using the following four materials. Exterior examples of a steel shaft made of steel, carbon fiber reinforced plastics (FRP) shaft, and carbon shafts containing power lines viewed in a side direction are illustrated in FIG. 110. In FIG. 110, reference numeral 1410 denotes the exterior example of the steel shaft, reference numeral 1420 denotes the exterior example of the carbon FRP shaft, and reference numeral 1430 denote the exterior examples of the carbon shafts containing power lines. Two carbon shafts containing power lines can be configured as one pair of carbon shafts.

TABLE 1

(relation between material and convergence time)

| Material | Outer diameter (mm) | Weight (g) | Convergence time (s) |
|---|---|---|---|
| Harness wire | 8 | 120 | >1200 |
| Steel shaft | 30 | 2000 | 41 |
| Carbon shaft | 9 to 16 | 62 | 91 |
| Carbon shaft containing power line | 4.5 × 2 | 49.5 | 94 |

As shown in Table 1, the convergence time in which there was no problem in actual use was confirmed when the device included in the information processing system 100 was suspended using the carbon shaft. Further, by using two carbon shafts containing power lines, the convergence time in which there was no problem in actual use was confirmed even in a material with a small outer diameter. As a fiber used for the material of the shafts, for example, glass, aramid, boron, bamboo, hemp, polyethylene terephthalate (PET), polyethylene (PE), or polypropylene (PP) can be used in addition to carbon.

Specific Example 9

The present specific example is a form in which an application activation location is automatically selected. When an application is normally activated at a predetermined location, for example, an object placed on the table 140*a* may be an obstacle, and thus it may be difficult to display the entire application screen. Even when the application screen is intended to be moved, an object placed on the table 140*a* may be an obstacle, and thus it may be difficult to move the application screen. Accordingly, the information processing system 100 according to the present specific example recognizes an object on the table 140*a* at the time of activation of an application, searches for a position satisfying constraint conditions (display conditions) set for each application, and displays an application screen. When an object is moved or a new object is placed and a state on the table 140*a* is thus changed, the information processing system 100 moves the application screen to automatically avoid the object after the change.

Specifically, the detection unit 121 first detects an object on the table 140*a* by acquiring depth information. Then, the output control unit 122 controls the output unit 130 such that an image is displayed in a region other than a region overlapping the object detected by the detection unit 121. Accordingly, an application screen is displayed in a region in which there is no object. Hereinafter, the description will be described specifically with reference to FIGS. 111 to 114. FIGS. 111 to 114 are explanatory diagrams illustrating user interfaces according to specific example 9.

Figure 111:
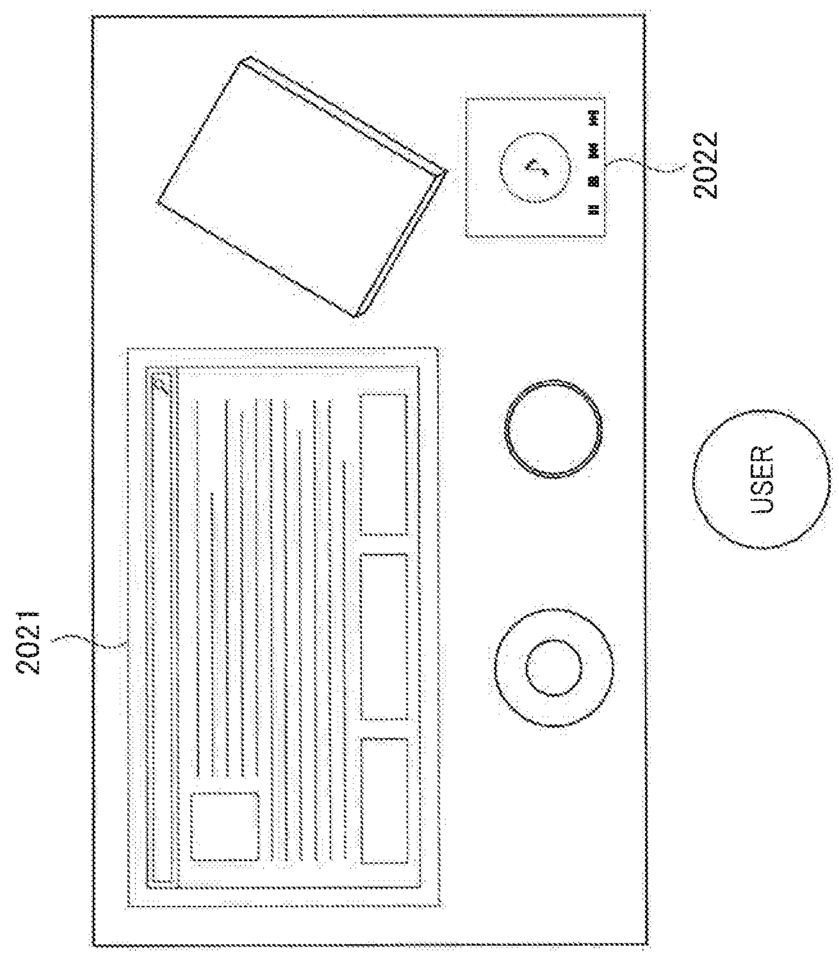
FIG. 111 is an explanatory diagram illustrating a user interface according to specific example 9.

For example, in an example illustrated in FIG. 111, a web browser 2021 and a music player 2022 are displayed in regions other than regions overlapping objects on the table 140*a*. The output control unit 122 controls the output unit 130 such that the applications are displayed on a flat surface on which a minimum size defined for each application is satisfied.

The detection unit 121 functions as an estimation unit that estimates the position of the user based on the position and the direction of a hand or a finger. The output control unit 122 controls the output unit 130 such that an image is displayed at a position corresponding to the estimated position of the user according to display conditions set as a relation with the user. For example, when displaying the image near the position of the user is set as a display condition, the output control unit 122 controls the output unit 130 such that the application screen is displayed near the position of the user. The display conditions regarding the display position may be comprehended as setting of the weight working on the application screen. For example, the display conditions of the application illustrated in FIG. 111 are assumed to be as follows. The size of the projection surface is assumed to be 1920×1080.

Web Browser 2021
Minimum size: 800×600
Weight: near user
Music Player 2022
Minimum size: 400×400
Weight: near user According to the display conditions, the output control unit 122 displays the web browser 2021 and the music player 2022 are displayed at positions close to the user and on the flat surface satisfying the minimum sizes, as illustrated in FIG. 111.

When movement of an object is detected by the detection unit 121, the output control unit 122 may display an image according to the positional relation of the moved object on the table 140*a* at a position at which the display conditions are more matched. For example, in the example illustrated in FIG. 11*l*, when the object on the table 140*a* is moved, the output control unit 122 may search for a position closer to the user and move the application screen.

The output control unit 122 may control the output unit 130 such that an image is displayed at a position according to the display conditions set as a relation with an object on the table 140*a*. For example, when the image is set such that the image is displayed adjacent to an end (edge) of the object on the table 140*a*, the output control unit 122 controls the output unit 130 such that an application screen is displayed adjacent to an object detected by the detection unit 121. For example, the display conditions of the application illustrated in FIG. 112 are assumed to be as follows.

Figure 112:
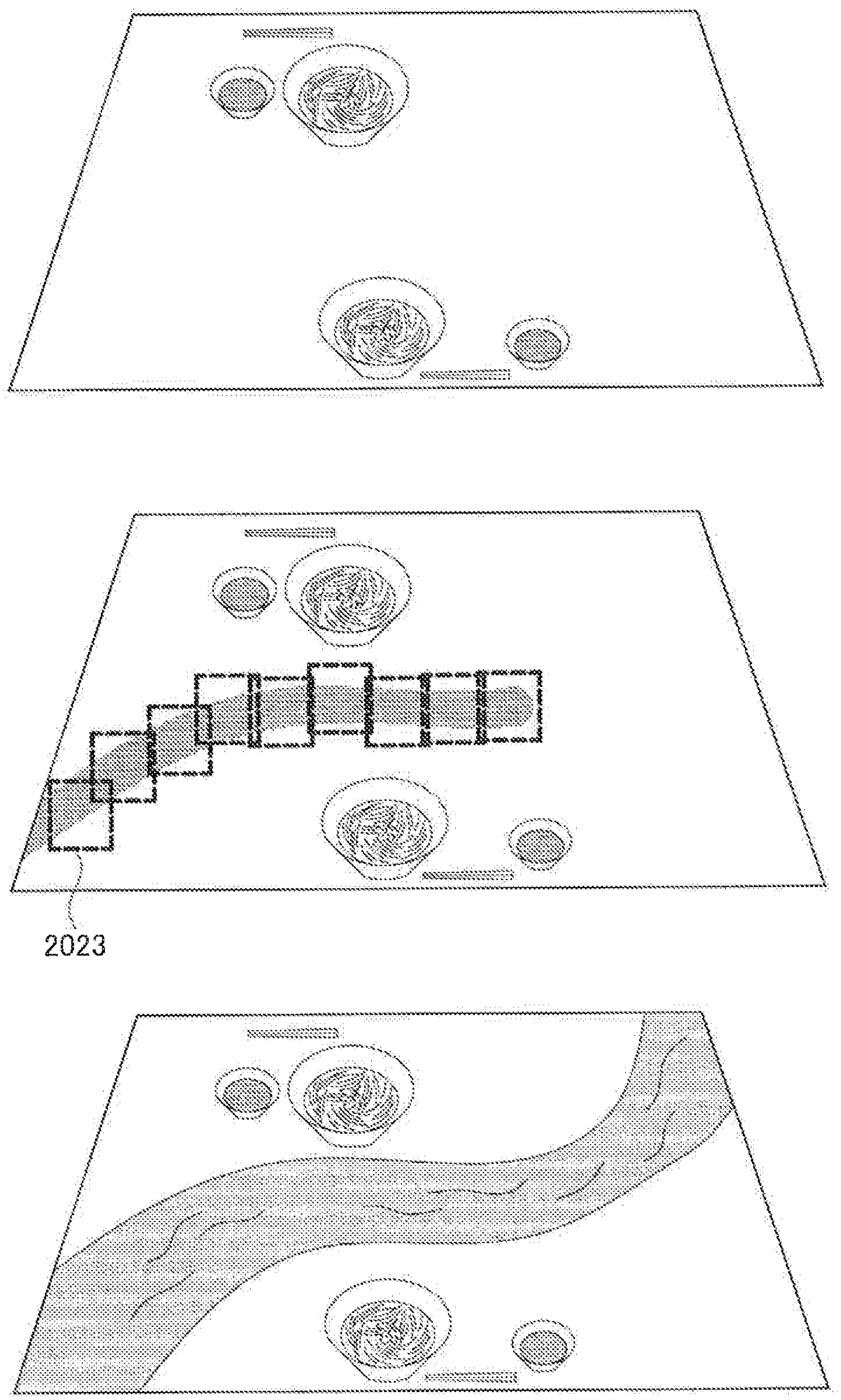
FIG. 112 is an explanatory diagram illustrating a user interface according to specific example 9.

Brook Application 2023
Minimum size: 100×100×continuous
Weight: adjacent to edge According to the display conditions, as illustrated in FIG. 112, the output control unit 122 can express a stream flow by arranging and displaying the brook application 2023 along the edge to weave between objects on the table 140*a*.

The output control unit 122 may control the output unit 130 such that an image is displayed according to display conditions set as a relation with the table 140*a* (projection surface). For example, the display conditions of an application illustrated in FIG. 113 are assumed to be as follows.

Figure 113:
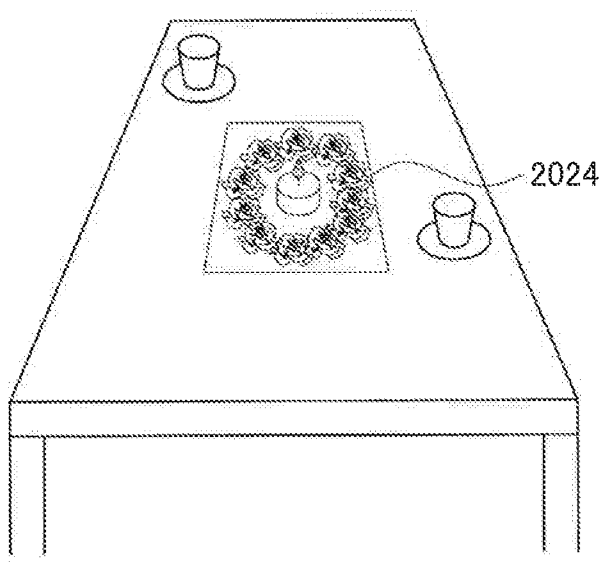
FIG. 113 is an explanatory diagram illustrating a user interface according to specific example 9.
Figure 114:
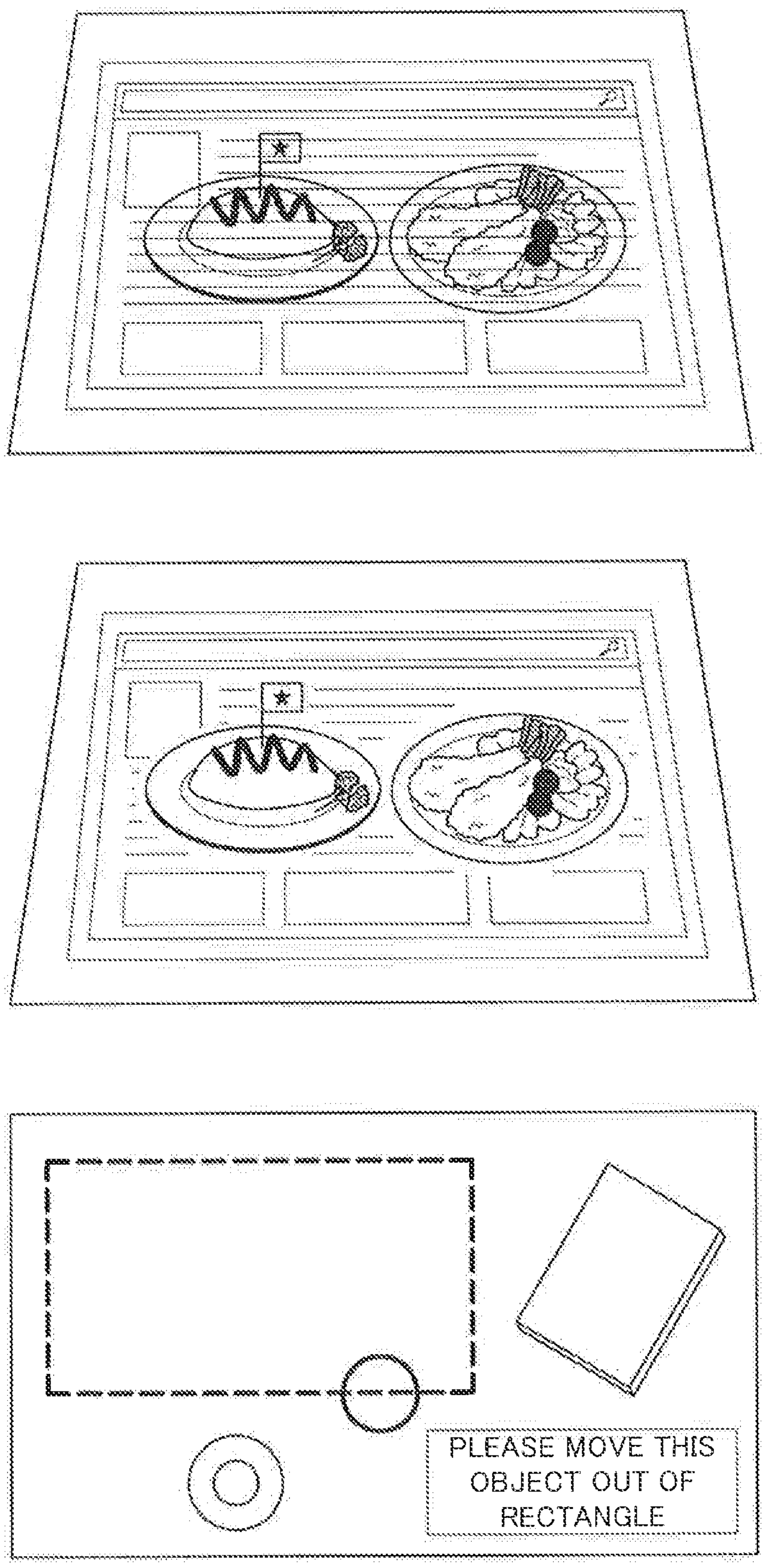
FIG. 114 is an explanatory diagram illustrating a user interface according to specific example 9.

Candle Application 2024
Minimum size: 200×200
Weight: middle of projection surface According to the display conditions, as illustrated in FIG. 113, the output control unit 122 displays the candle application 2024 in the middle of the table 140*a*.

Various processes when searching for a proper projection surface fails are considered. For example, as illustrated in the upper drawing of FIG. 114, the output control unit 122 may directly project an image at a default position without avoiding objects. As illustrated in the middle drawing of FIG. 114, the output control unit 122 may transmit regions overlapping the objects while directly projecting images at the default positions. As illustrated in the lower drawing of FIG. 114, the output control unit 122 may execute warning display indicating an obstructive object. The warning display may be, for example, a message prompting the user to move the object. Additionally, the detection unit 121 may detect that the user has finished eating according a comparison result obtained by comparing a captured image at the time of food supply to a current captured image. Then, the output control unit 122 may display a message prompting the user to preferentially remove finished plates as warning display.

According to the present specific example, by automatically detecting and displaying a flat surface that is a proper display region for each application, it is possible to execute optimum display so that it is not necessary for the user to execute a manipulation. According to the present specific example, by dynamically searching for the display regions satisfying the display conditions such as the minimum size and the weight defined for each application, it is possible to automatically execute the optimum display.

Specific Example 10

The present specific example is a form in which control of sound output is executed so that a sound is audible from a sound source displayed on the table 140*a*. In the projection type information processing system 100, a video is projected to the projection surface (the table 140*a*) located therebelow and a sound is produced from the body located thereabove. Therefore, a sense of unity between the video and the sound is lost when a distance between the body and the table 140*a* is far. Accordingly, the information processing system 100 according to the present specific example causes a sound to be reflected from the projection surface by a directional speaker so that the sound is oriented toward the user. In particular, the information processing system 100 yields the sense of unity between the video and the sound by changing a position from which the sound is reflected in conformity with a manipulation and the position of the user according to the characteristics of an application.

Figure 115:
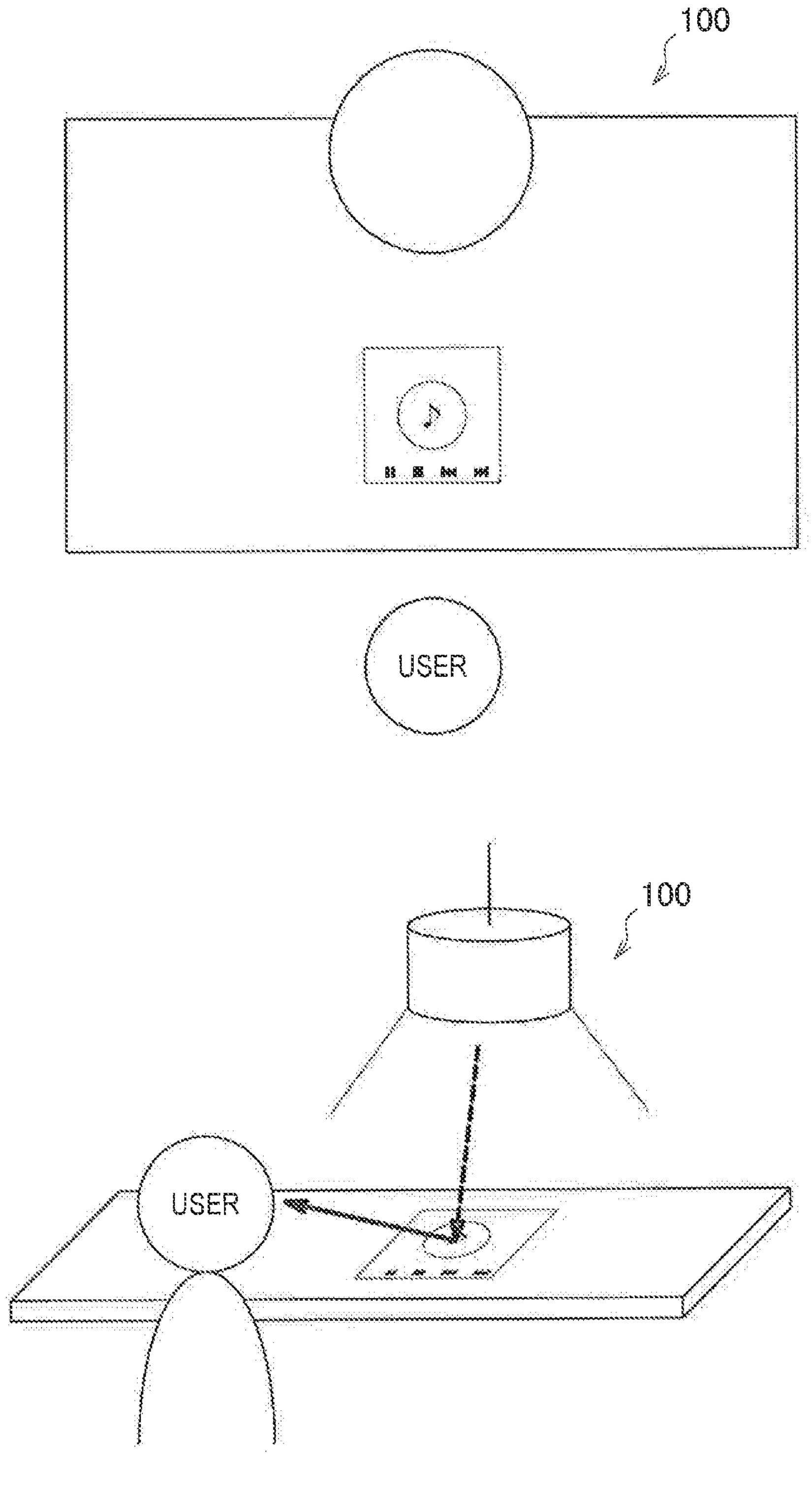
FIG. 115 is an explanatory diagram illustrating a user interface according to specific example 10.
Figure 117:
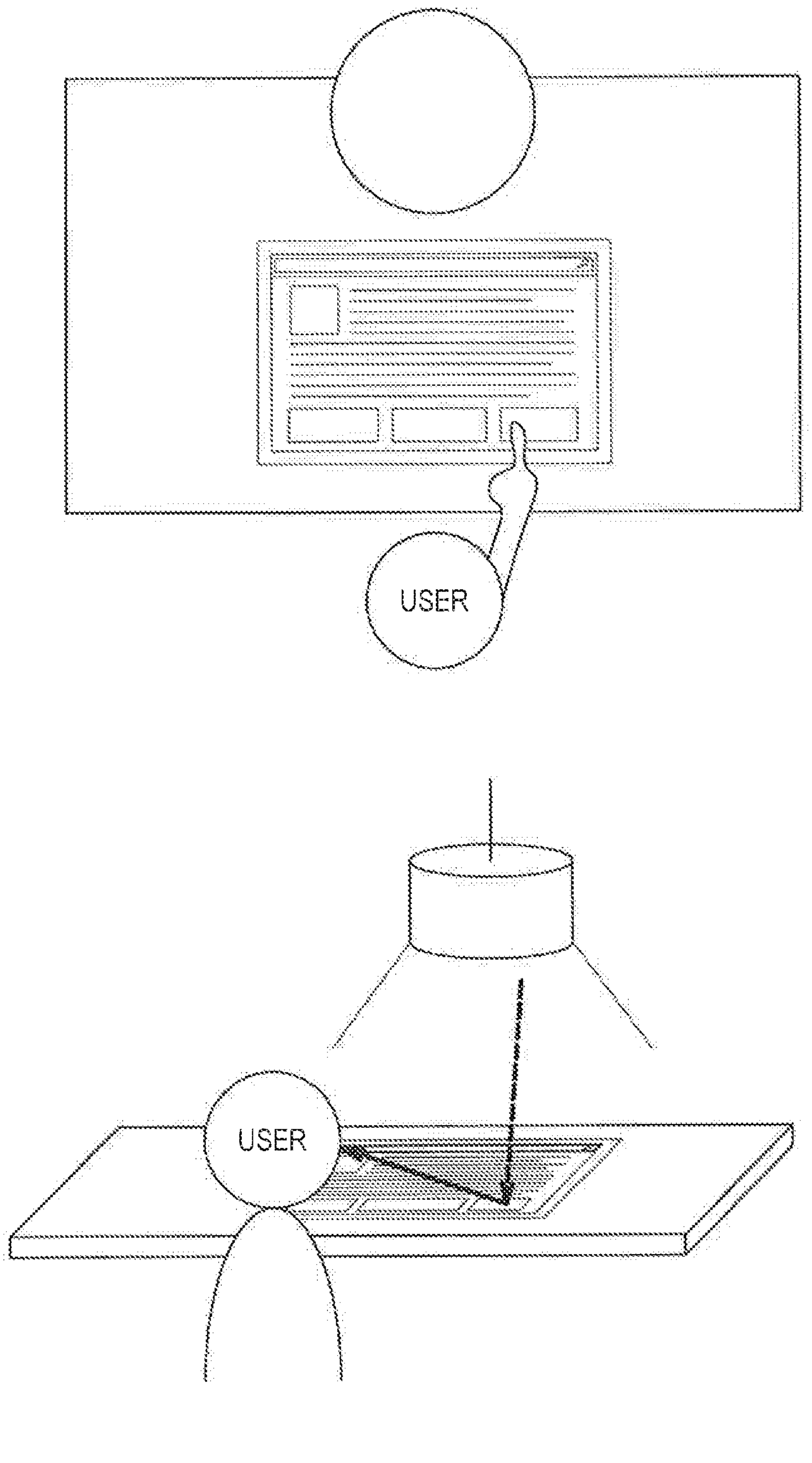
FIG. 117 is an explanatory diagram illustrating a user interface according to specific example 10.

The detection unit 121 functions as an estimation unit that estimates the position of the user based on the position and the direction of a hand or a finger. The output control unit 122 controls the speaker such that a sound output for an image displayed on the display surface is reflected to reach the position of the user estimated by the estimation unit. The information processing system 100 according to the present specific example includes a plurality of directional speakers and is assumed to be able to control direction and a directional range of each speaker. The output control unit 122 selects the speaker installed at a position at which a reflected sound can reach the user at the time of production of the sound toward the application screen based on a positional relation between the position of the user and an application display position and controls the speaker such that the sound is produced. Hereinafter, the description will be made specifically with reference to FIGS. 115 to 117. FIGS. 115 to 117 are explanatory diagrams illustrating a user interface according to specific example 10.

For example, when the application is an application in which a sound source is clear, such as a music player, as illustrated in FIG. 115, the output control unit 122 may control the speaker such that the sound is reflected toward the middle of the application screen and the sound can reach the user. When the application is an application with a channel configuration of LR (left and right) such as a moving image player, as illustrated in FIG. 116, the output control unit 122 may control the speaker such that sounds of the corresponding channels are reflected to the left and right sides of the application screen to reach the left and right ears of the user. When the application is an application in which a sound generation source is not clear, such as a web browser, as illustrated in FIG. 117, the output control unit 122 may control the speaker such that a sound is reflected to, for example, a position (for example, a link) clicked by the user and the sound reaches the user.

Various methods of yielding the sense of unity between a video and a sound are considered in addition to the cases in which the sound is reflected from the projection surface by the directional speaker. For example, the output control unit 122 may control the speaker such that a sound image is localized to the position of an application to be displayed. When a plurality of applications are used by a plurality of users, the information processing system 100 may emit only a sound of the application used by each user to the user. Additionally, when a plurality of users view the same moving image, the information processing system 100 may reproduce a sound in the native language of each user for that user. The information processing system 100 may emit a sound to the front side of the application screen, that is, in a direction in which a user executing the manipulation is normally located.

As described above, according to the present specific example, by controlling the position of the sound source according to the display position of the application, it is possible to provide the user with a sense of sound similar to the sound produced from the application screen itself. According to the present specific example, by controlling the position of the reflection according to a manipulation from the user, the sense of unity between a video and a sound can be yielded even when there is no prior information regarding a sound source such as a web browser. According to the present specific example, by controlling the channel configuration of LR according to the position of the user, it is possible to yield the sense of presence as if the user is viewing a home television.

Specific Example 11

The present specific example is a form in which a pre-set function is provoked when a specific condition is satisfied on the table 140*a*. A condition in which a function of an application is provoked can normally be set only by a vendor supplying the application. Depending on a use environment, a function is not provoked in a behavior defined in an application in some cases. Accordingly, the information processing system 100 according to the present specific example is configured such that a function to be provoked and a provoking condition can be freely set by the user.

The user generates a program in which a condition regarding the state on a display surface is associated with an output instruction. The information processing system 100 receiving the program executes an output based on a corresponding output instruction when the state on the display surface satisfies a condition defined by the program. Examples of the condition regarding the state on the display surface include placement of a specific object on the table 140*a*, a temperature on the table 140*a*, and a change in depth information. Hereinafter, the condition regarding the state on the display surface is also referred to as an output condition.

Figure 118:
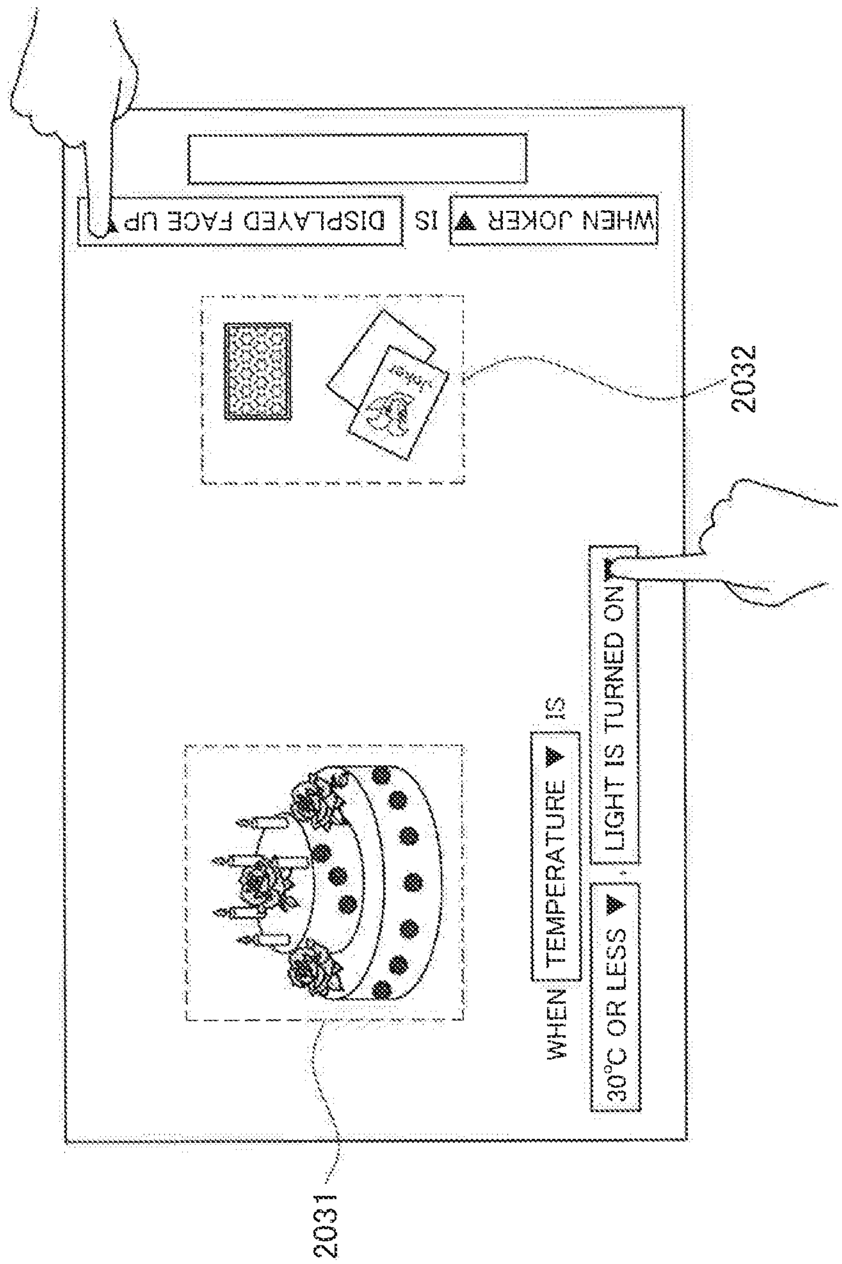
FIG. 118 is an explanatory diagram illustrating a user interface according to specific example 11.

First, the detection unit 121 recognizes a manipulation object such as a finger touching the table 140*a* and detects programming by the user. Then, the control unit 120 stores a program in which an output instruction is associated with the output condition based on a detection result of the programming obtained by the detection unit 121. The control unit 120 may function as a storage unit that stores the program. Hereinafter, the description will be made specifically with reference to FIG. 118. FIG. 118 is an explanatory diagram illustrating a user interface according to specific example 11.

As an example of the program, a program by which a temperature on the table 140*a* is set as an output condition is considered, for example. In the program, a region in which the condition determination is executed is can be set. For example, as illustrated in FIG. 118, a program by which a region in which a cake is placed is set as a condition determination region 2031, the temperature equal to or less than 30 degrees is set as an output condition, and an instruction to turn on an illuminator is set as an output instruction is considered. As another example of the program, for example, a program by which a pattern on the table 140*a* is set as an output condition is considered. For example, as illustrated in FIG. 118, a program by which a condition in which a joker card is placed face up in a condition determination region 2032 is set as an output condition and an instruction to display a predetermined effect is set as an output instruction is considered. The information processing system 100 may receive programming through a manipulation of touching the projection surface or may receive a program from an external device through wired or wireless communication.

Thereafter, the detection unit 121 detects, for example, an object on the table 140*a* and the pattern, temperature, humidity, or the like of the surface of the object as the state on the table 140*a*. When the state on the table 140*a* detected by the detection unit 121 satisfies the stored output condition, the output control unit 122 controls the output unit 130 such that an output according to the output instruction stored in association with the output condition is executed. For example, in regard to the program illustrated in FIG. 118, the output control unit 122 controls the illuminator such that the illuminator is turned on when a temperature sensor acquires the fact that the temperature of the condition determination region 2031 is equal to or less than 30 degrees. Accordingly, for example, when candles put on a birthday cake are blown out, the illuminator is automatically turned on. In regard to the program illustrated in FIG. 118, the output control unit 122 controls the projector such that a programmed video effect is displayed when the fact that a card placed in the condition determination region 2032 is a joker card is detected from the pattern shown in a captured image.

The program will be further exemplified. For example, a program notifying the user of a temperature when the temperature is displayed around milk for a baby and becomes a temperature of human skin, such as 36 degrees to 37 degrees, is considered. Further, a program automatically turning on an illuminator and taking photos when a birthday cake is monitored, candles are blown out, and a temperature sharply drops is considered. Furthermore, a program displaying news when a black drink (assumed to be a cup of coffee) is placed in front of the user at a morning hour is considered. The output control unit 122 may execute display, such as rectangular display indicated by a broken line, indicating that some program is executed in a programmed region, that is, a condition determination region. Of course, such display can be set not to be executed when presence of a program is desired to be concealed for the purpose of surprise.

In addition to the above-described temperatures and patterns, for example, a change in depth can be set as an output condition. The detection unit 121 detects an object located on the table 140*a* based on depth information, and the output control unit 122 controls the output unit 130 such that an output is executed according to an output instruction stored in association when the detected state of the object satisfies the output condition. For example, the fact that a player's has a losing hand in mah-jong can be detected based on a change in the depth information. Accordingly, for example, a program recognizing a role which is a state of a player's hand based on a captured image and automatically calculating scores when the player's has a losing hand in mah-jong is considered. The fact that the cover of a cake is removed and the content of the cake appears can also be detected based on a change in depth information. Accordingly, a program reproducing a birthday song, for example, when the cover of the box of a birthday cake placed in the middle of the table 140*a* is removed is considered. In a board game, the fact that a piece of a real object is stopped in a specific frame can also be detected based on a change in depth information. Accordingly, a program displaying an effect, for example, when the piece of the real object is stopped in the specific frame is considered.

According to the present specific example, not only a program by a vendor supplying an application but also a free and simple program by the user can be set. Accordingly, the provoking of the functions suitable for detailed circumstances on the table 140*a* is realized.

Specific Example 12

The present specific example is a form in which it is determined to whom an object placed on the table 140*a* belongs. According to use of an application, it may be necessary to be able to determine to whom the object placed on the table 140*a* belongs. Accordingly, in the present specific example, a hand placing an object on the table 140*a* is detected and it is determined to whom the object belongs by associating the detected hand with the object. It can also be comprehended that the user owns the object which belongs to the user.

First, the detection unit 121 detects that a manipulation object and an object entering a predetermined region in a contact state are separated. For example, based on depth information, the detection unit 121 detects that a hand holding an object enters the table 140*a* and the hand is separated from the object. Hereinafter, the description will be made specifically with reference to FIGS. 119 to 123. FIGS. 119 to 123 are explanatory diagrams illustrating user interfaces according to specific example 12.

Figure 119:
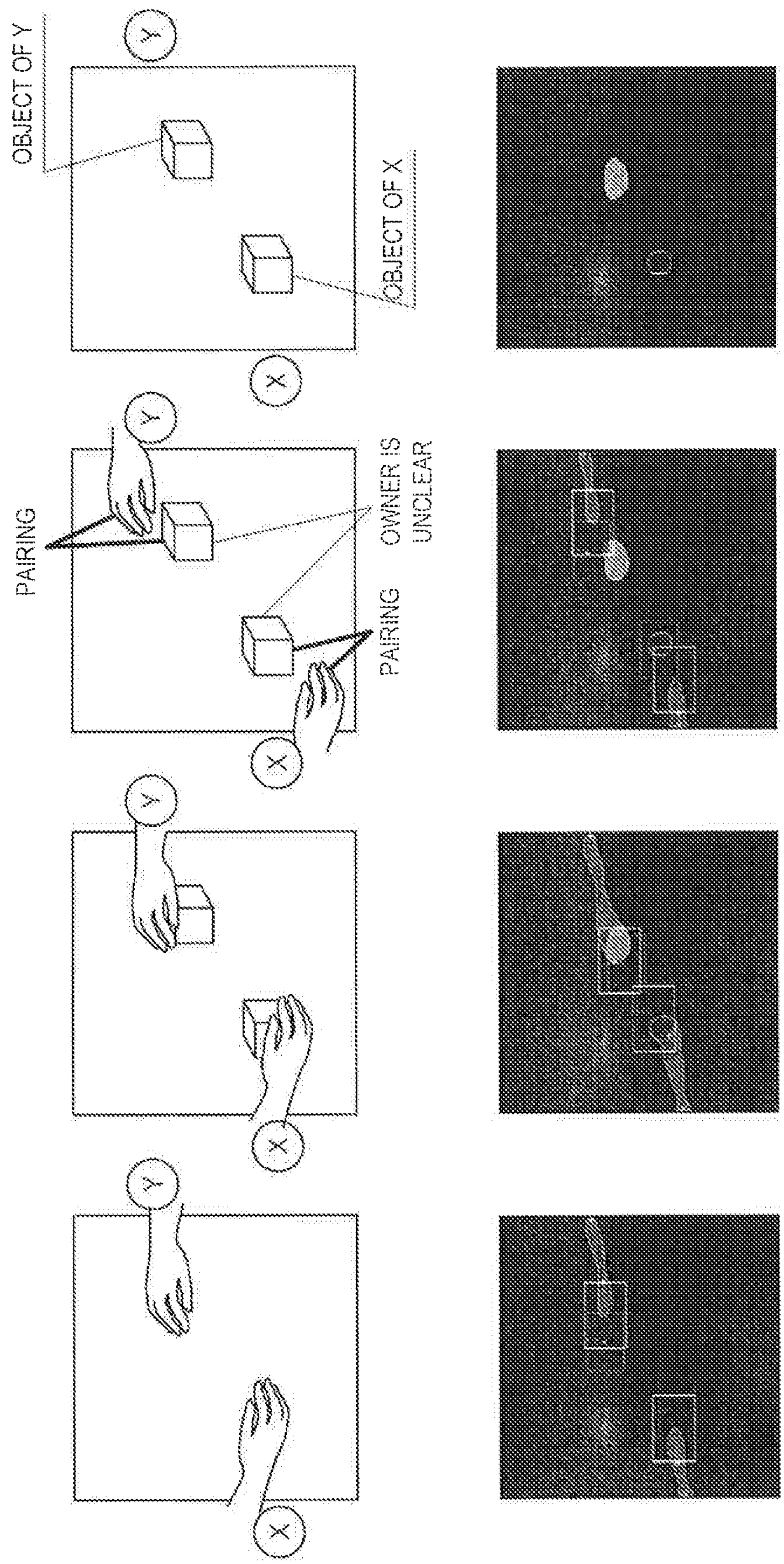
FIG. 119 is an explanatory diagram illustrating a user interface according to specific example 12.
Figure 120:
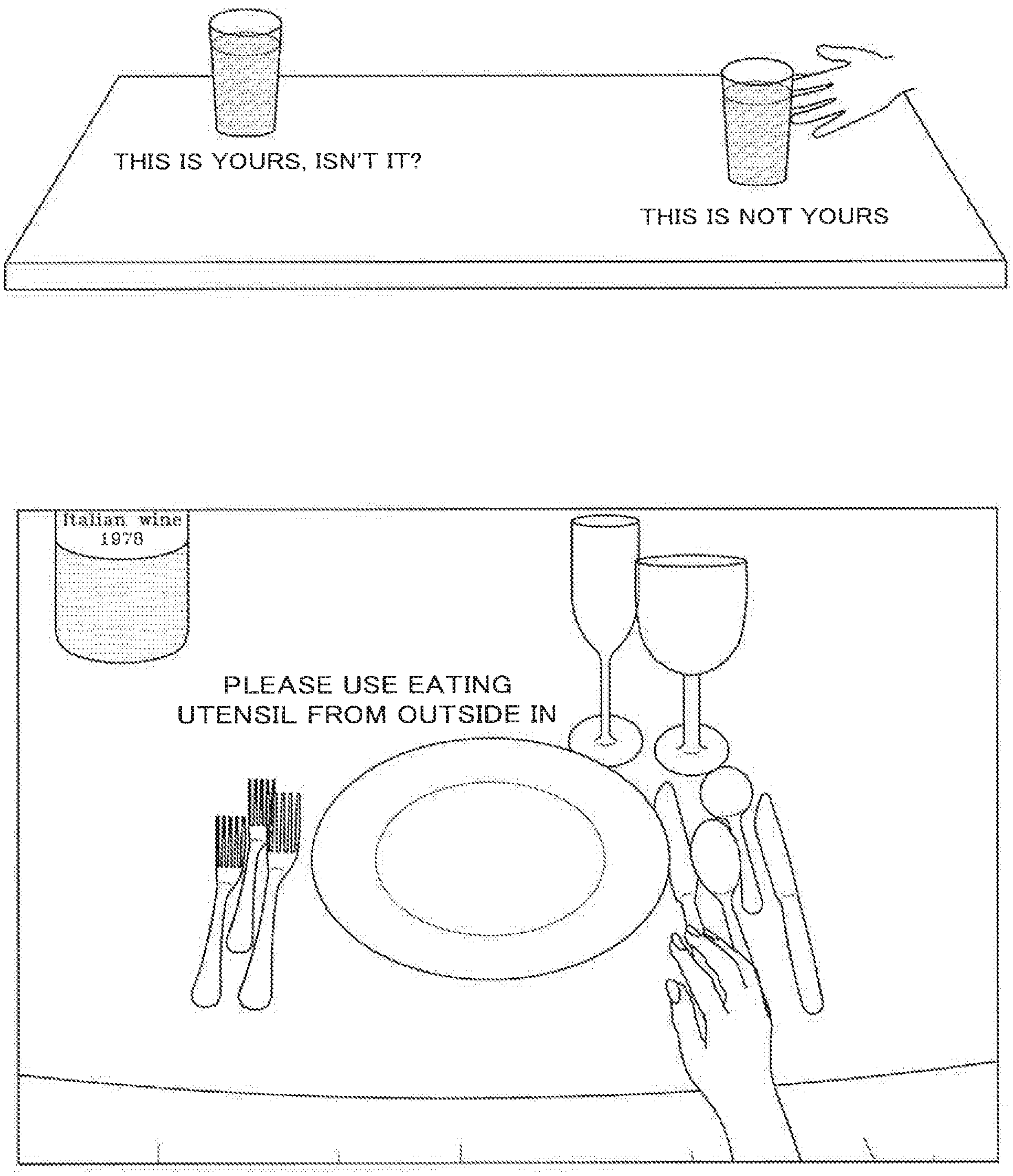

As illustrated in FIG. 119, when only hands enter the table 140*a*, the detection unit 121 detects a closed curve adjoined to a side of the table 140*a* as a hand based on depth information. As illustrated in FIG. 119, when the hands holding objects enter the table 140*a* and the objects are placed on the table 140*a*, the detection unit 121 detects that the hands are separated from the objects. Specifically, based on the depth information, the detection unit 121 detects that closed curves not adjoined to sides of the table 140*a* appear. At this time, the detection unit 121 detects the closed curves not adjoined to the sides of the table 140*a* as objects separated from the hands.

Subsequently, the detection unit 121 functions as a recognition unit that recognizes the detected manipulation objects and the objects separated from the manipulation objects in association therewith. Specifically, based on the depth information, the detection unit 121 recognizes the hands indicated by the closed curves adjoined to the sides of the table 140*a* and the objects indicated by the curved lines which are separated from the closed curves and are not adjoined to the sides of the table 140*a* in association therewith. When the objects are separated, the detection unit 121 may recognize hands located at positions closest to the objects in association with the objects. The detection unit 121 recognizes the hands associated with the objects as destinations to which the objects belong. For example, as illustrated in FIG. 119, the detection unit 121 pairs the objects placed on the table 140*a* and the hands holding the objects. The detection unit 121 may recognize the destinations to which the objects belong using the sides of the table 140*a* to which the closed curves indicating the hands are adjoined, that is, the directions in which the hands extend.

Accordingly, as illustrated in FIG. 119, even when only the objects are detected on the table 140*a*, the detection unit 121 can recognize to whom the objects belong.

The present specific example can be applied to, for example, a roulette game. The detection unit 121 detects the values of chips placed on the table 140*a* using a pattern recognized from a captured image and a height recognized from the depth information and detect users betting with the chips. Then, the output control unit 122 controls the output unit 130 such that an obtainable amount of chips is displayed at a hand of the user having won the bet. Accordingly, the user can bring the chips from a pool in person with reference to the displayed amount of chips. Since a dealer is not necessary, all members can participate in the game.

The present specific example can also be applied to, for example, a board game. The detection unit 121 detects a user spinning a roulette wheel on the table 140*a* based on the direction in which the hand extends. Then, the output control unit 122 controls the output unit 130 such that display of a move of the user spinning the roulette wheel is executed automatically according to a roulette number. The output control unit 122 may execute warning display when the user attempts to spin the roulette wheel out of turn.

The output control unit 122 may execute a warning when the user has an object which the user should not have. For example, as illustrated in the upper drawing of FIG. 120, the output control unit 122 may execute warning display when the user attempts to take a cup which does not belong to him or her and may execute display to guide the user to a cup which belongs to him or her. As illustrated in the lower drawing of FIG. 120, when the user attempts to take an eating utensil from the inside, the output control unit 122 may execute display to guide the user to use an eating utensil on the outside. Additionally, for example, when grilling meat, the detection unit 121 may recognize who puts the meat down and the output control unit 122 may execute warning display for a user reaching for meat that another person is grilling.

Figure 121:
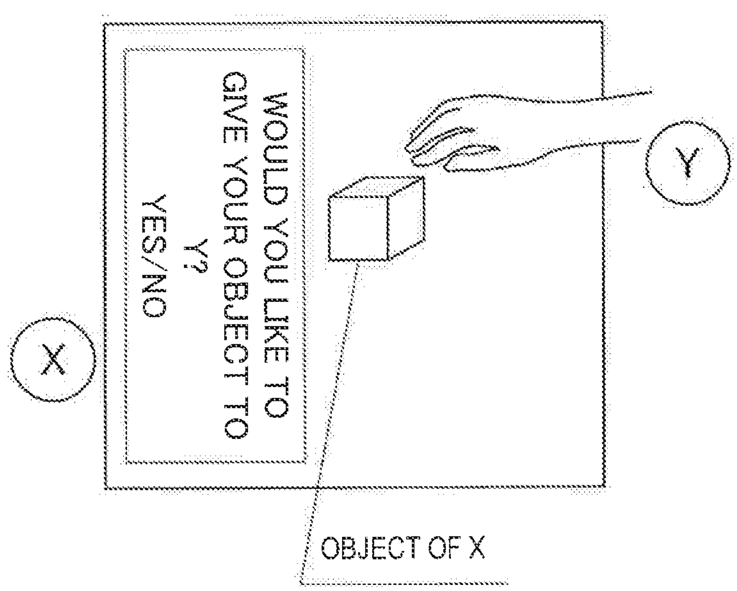
Figure 122:
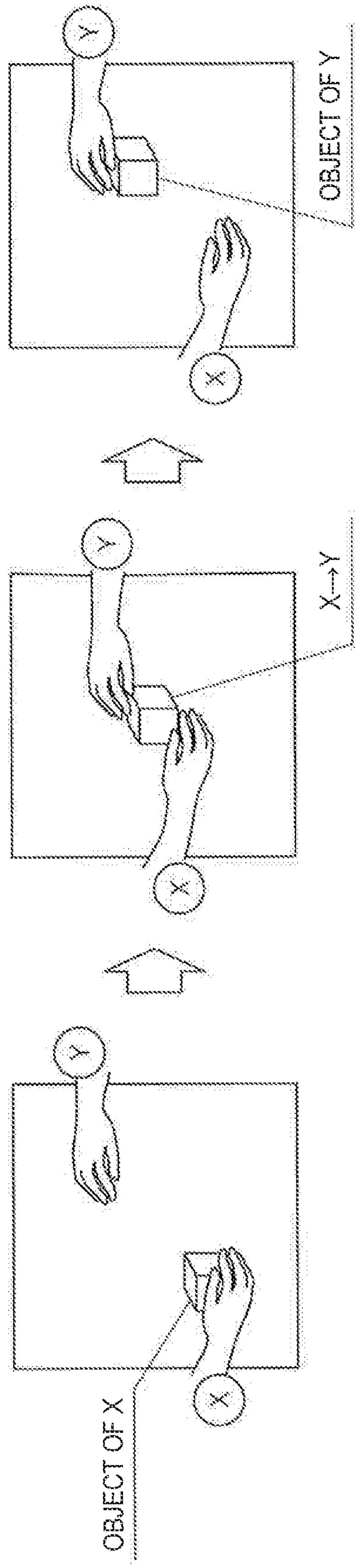

The detection unit 121 may detect transition in ownership (belonging destination). As a rule of the transition, for example, "first victory" in which the ownership is fixed to a person who first touches an object and "final victory" in which the ownership transitions directly to a person who touches an object are considered. Additionally, as a rule of the transition, "user selection" in which the ownership transitions according to selection of a user is considered. For example, as illustrated in FIG. 121, when it is detected that user B attempts to touch an object of that user A has first touched and has ownership of, the output control unit 122 may execute display in which the user is allowed to select transition or non-transition of the ownership at the hand of user A who is the owner. As a rule of the transition, "handover" in which the ownership transitions when an object is handed is considered. For example, as illustrated in FIG. 122, when user X hands an object he or she is holding in his or her hand to user Y, the detection unit 121 may transition the ownership from user X to user Y.

Figure 123:
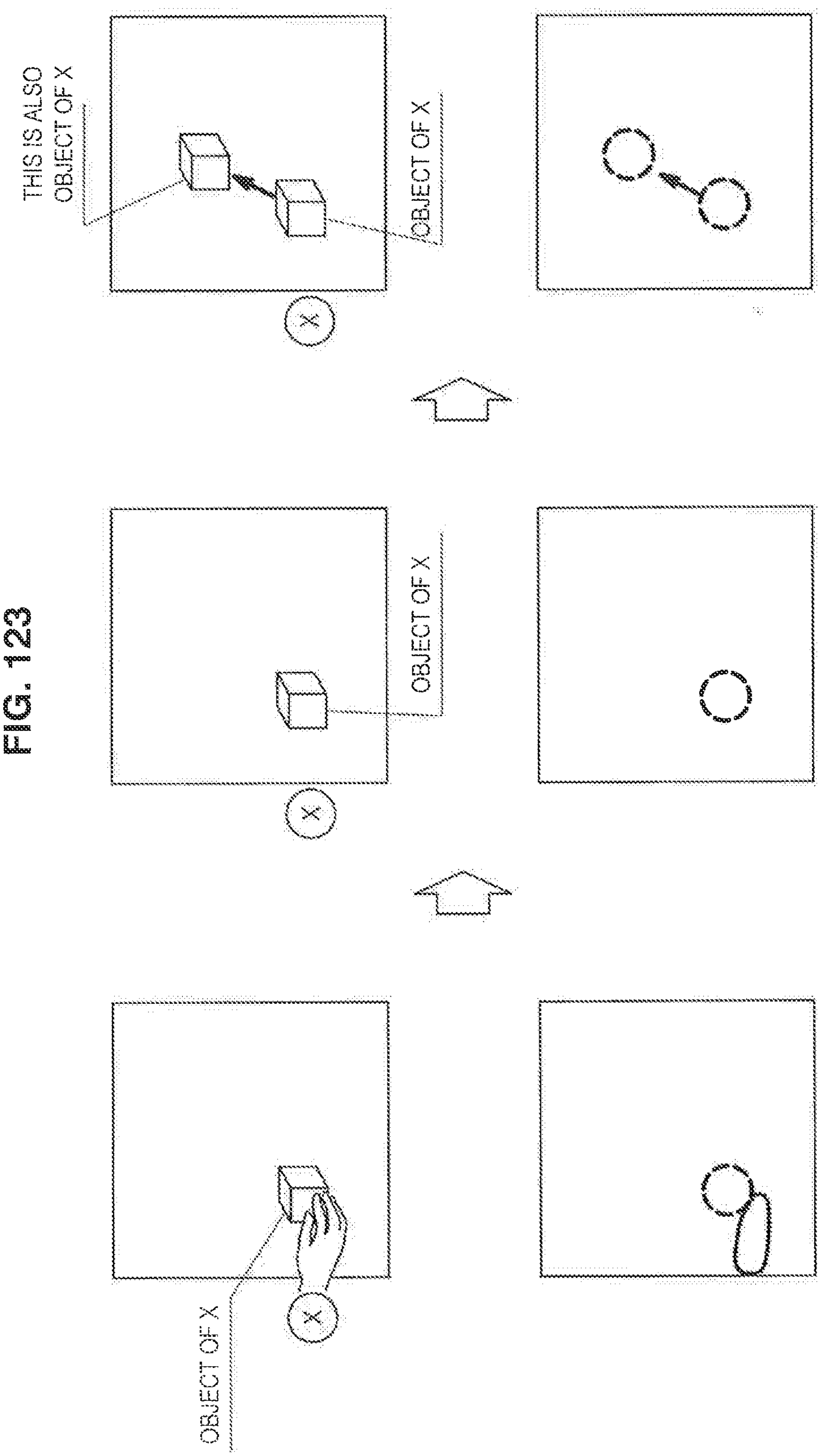

The detection unit 121 may set the ownership according to division of an object. The detection unit 121 detects one closed curve as one object and detects division of an object when it is detected that two or more closed curves appear from the one closed curve. For example, the detection unit 121 detects division of an object when coins stacked in a plurality of layers for betting collapse. For example, as illustrated in FIG. 123, the detection unit 121 may set the ownership of an object after division to an owner before the division when the object in which the owner has already been decided is divided into a plurality of portions.

As described above, according to the present specific example, the belonging of the object placed on the table 140*a* can be identified and can be treated as attribute information in an application, a game, or the like. Accordingly, for example, the output control unit 122 can execute an output to support game progress according to the ownership of the object. The output control unit 122 can visualize belonging information in the real world by suggesting information indicating the ownership by the user.

Specific Example 13

The present specific example is a form in which a window projected to the table 140*a* can freely be manipulated. When a plurality of people surround the table 140*a* and the positions of the users are moved, the window projected to the table 140*a* is preferably moved, rotated, expanded, or reduced according to intentions of the users. Accordingly, in the present specific example, user interfaces for receiving manipulations on the window, such as movement of the window, are supplied. Hereinafter, the description will be made more specifically with reference to FIGS. 124 to 127. FIGS. 124 to 127 are explanatory diagrams illustrating user interfaces according to specific example 13.

Figure 124:
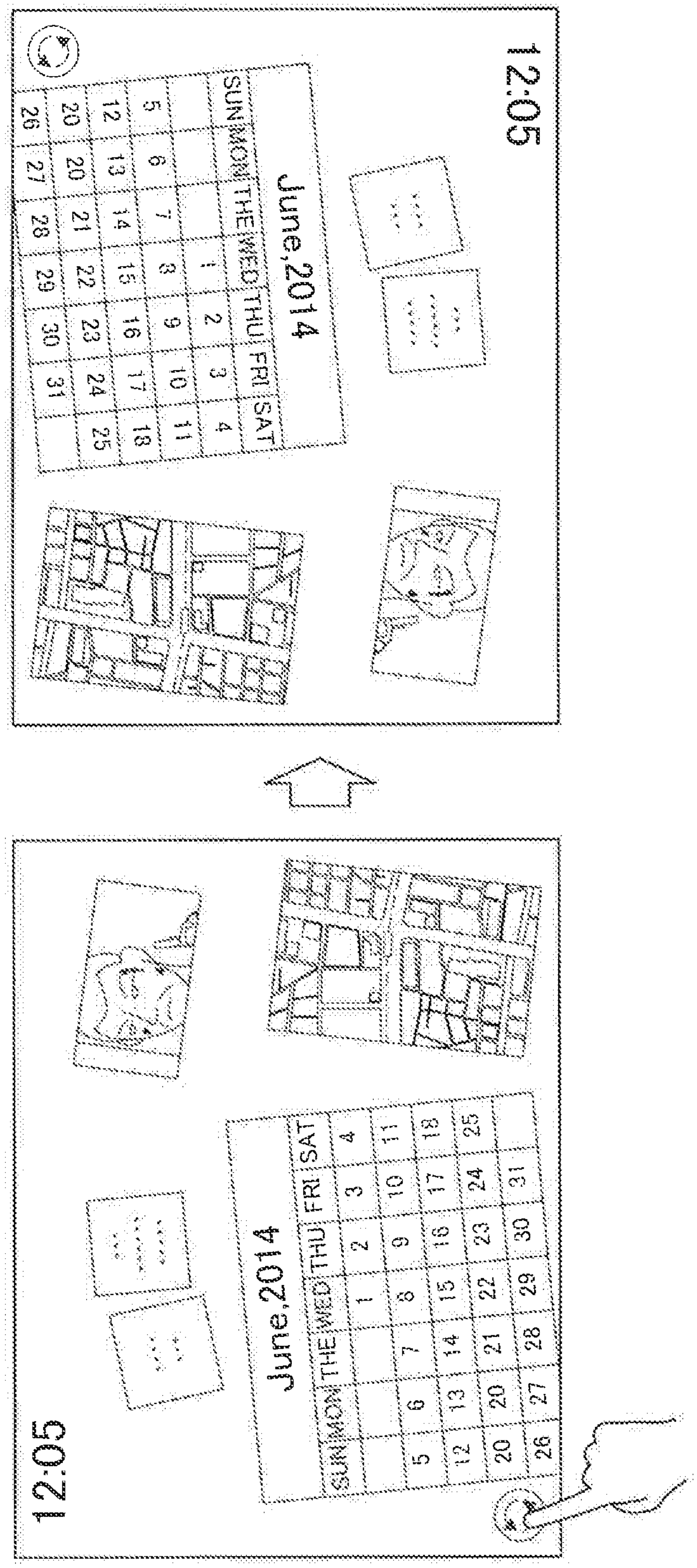

In an example illustrated in FIG. 124, the information processing system 100 projects a window indicating a plurality of different application screens, such as a calendar, a moving image, and a map, to the table 140*a*. Any of the projected applications can be selected by the user. When the plurality of different application screens are projected simultaneously, the user can simultaneously check various kinds of information freely using the table 140*a*, for example, during a busy morning. Here, for example, when the detection unit 121 detects that the user touches a rotation button from a menu illustrated in the left drawing of FIG. 124, the output control unit 122 controls the output unit 130 such that the entire window is rotated in a facing direction of the table 140*a*, as illustrated in the right drawing of FIG. 124.

The detection unit 121 may comprehend the outer circumference of the window as a handle for a window manipulation and detect a user manipulation on the handle to realize the window manipulation. For example, when the detection unit 121 detects that the handle is touched, the information processing system 100 switches the manipulation mode to a window manipulation mode. The window manipulation mode is a manipulation mode in which a user manipulation is detected as a window manipulation. A manipulation mode in which a user manipulation is detected as a manipulation on an application of a scroll or the like is also referred to as a normal mode.

Figure 125:
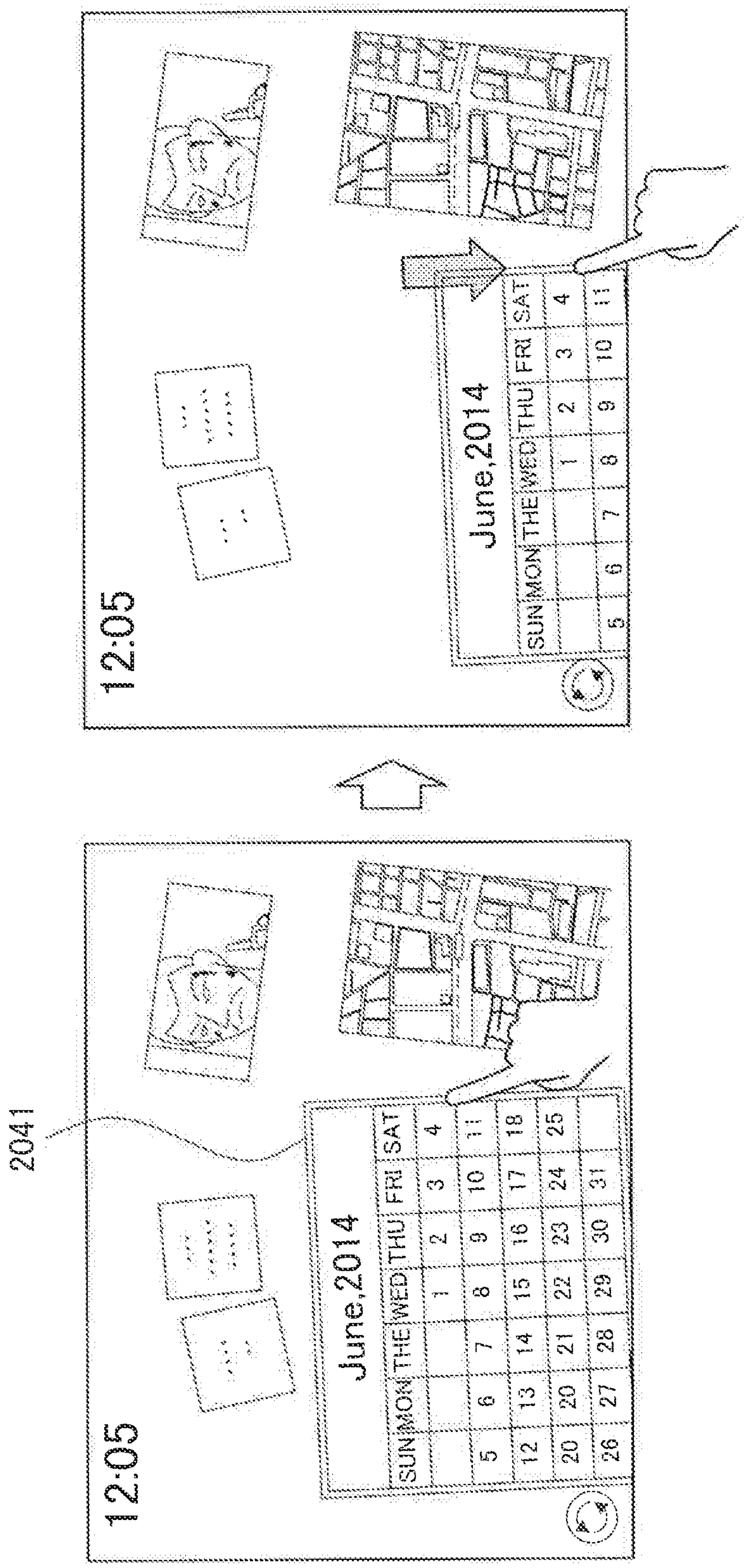
Figure 126:
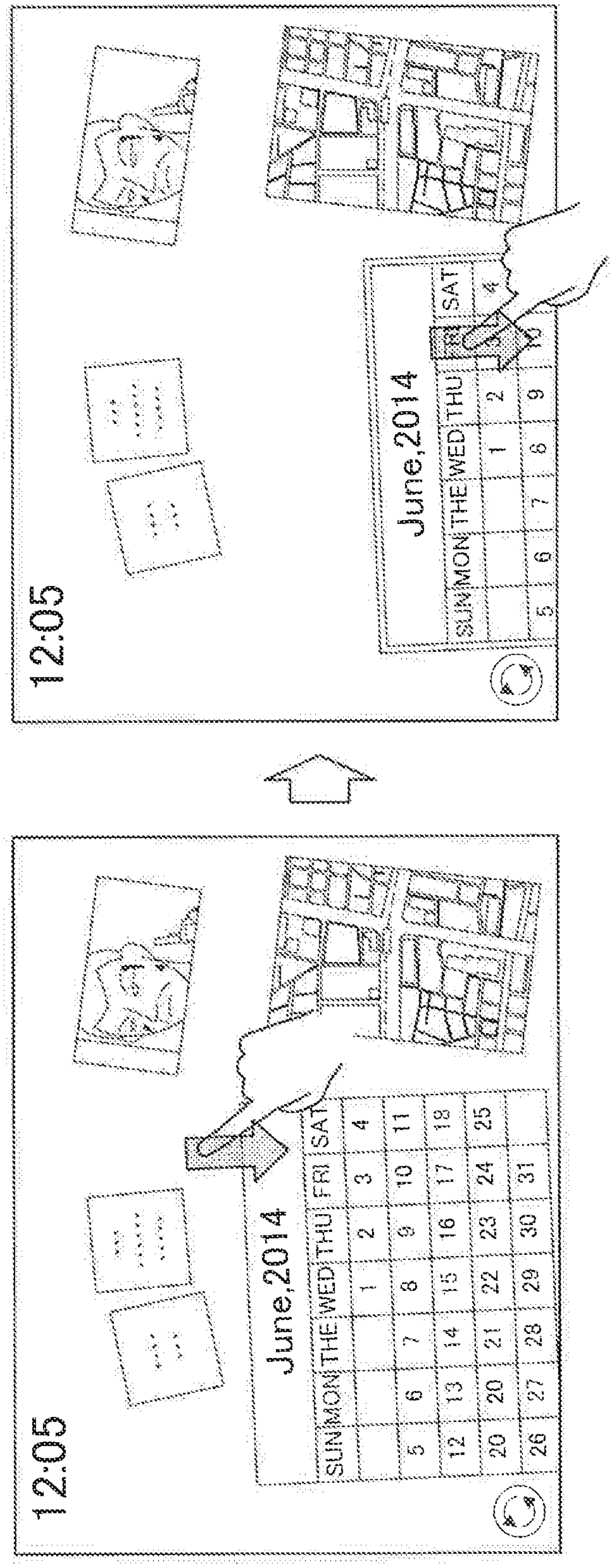

When the manipulation mode is switched to the window manipulation mode, the output control unit 122 controls the output unit 130 such that a handle 2041 is displayed as display indicating that the manipulation mode is the window manipulation mode, as illustrated in the left drawing of FIG. 125. For example, the user can move the window with his or her finger by dragging, pinching, or rotating the handle 2041 while touching the handle 2041. For example, when the detection unit 121 detects that the user drags the handle 2041 while touching the handle 2041, the output control unit 122 moves the window in a direction in which the handle 2041 is dragged, as illustrated in the right drawing of FIG. 125. When the user removes his or her finger from the handle, the information processing system 100 may switch the manipulation mode from the window manipulation mode to the normal mode.

When the detection unit 121 detects that dragging is executed from the outside of the window to the inside of the window, the detection unit 121 may switch the manipulation mode from the normal mode to the window manipulation mode. For example, as illustrated in the left drawing of FIG. 126, when the detection unit 121 detects that the finger is dragged from the outside of the window to the inside of the window, the output control unit 122 switches the manipulation mode to the window manipulation mode. Therefore, as illustrated in the right drawing of FIG. 126, the output control unit 122 moves the window in a direction in which the dragging is executed.

Figure 127:
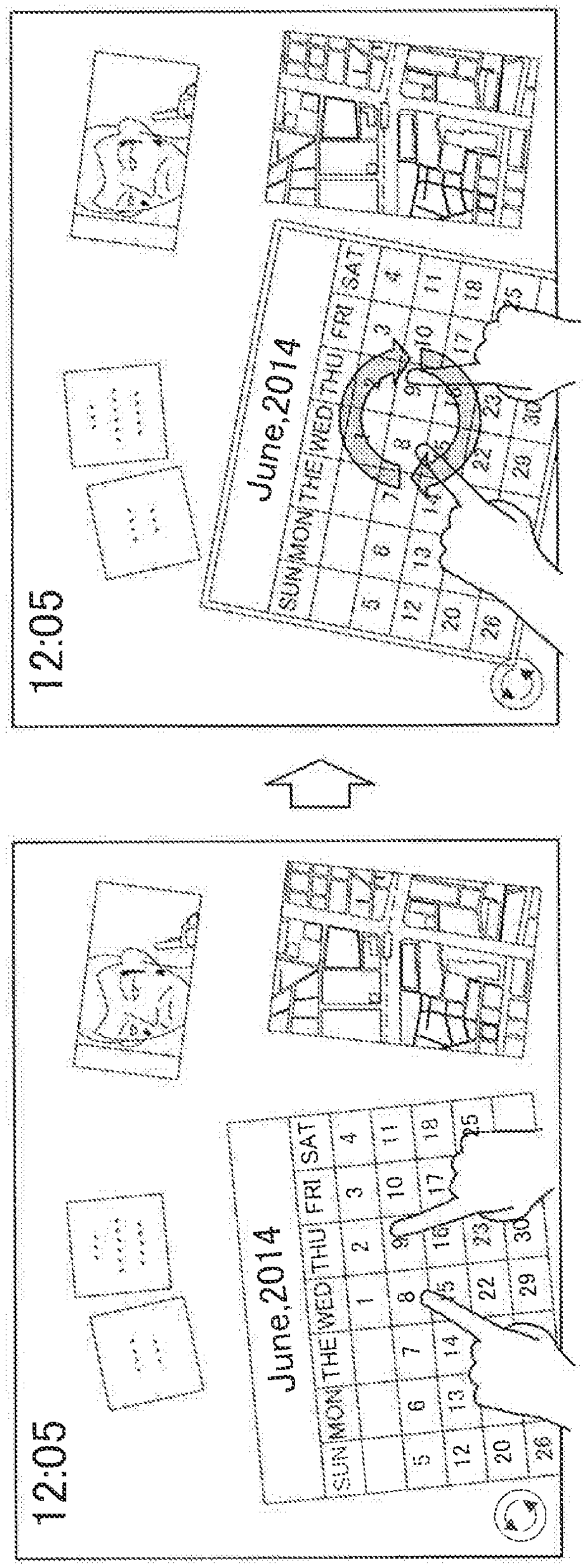

The detection unit 121 may switch the manipulation mode from the normal mode to the window manipulation mode in accordance with the number of fingers touching the window. For example, when the detection unit 121 detects that two fingers are touching the window, the manipulation mode may be switched to the window manipulation mode. Specifically, as illustrated in FIG. 127, when the detection unit 121 detects that the handle is rotated with two fingers, the output control unit 122 rotates the display of the window. When the detection unit 121 detects that dragging is executed with two fingers, the output control unit 122 may move the window in a direction in which the dragging is executed. Additionally, when the detection unit 121 detects that two fingers spread out, the output control unit 122 may expand and display the window.

According to the present specific example, the user can freely manipulate the window, and thus usability is improved.

Specific Example 14

Hereinafter, specific examples of applications which can be executed by the control unit 120 of the above-described information processing system 100 will be described.

(A: Karuta Card Assistance Application)

Figure 128:
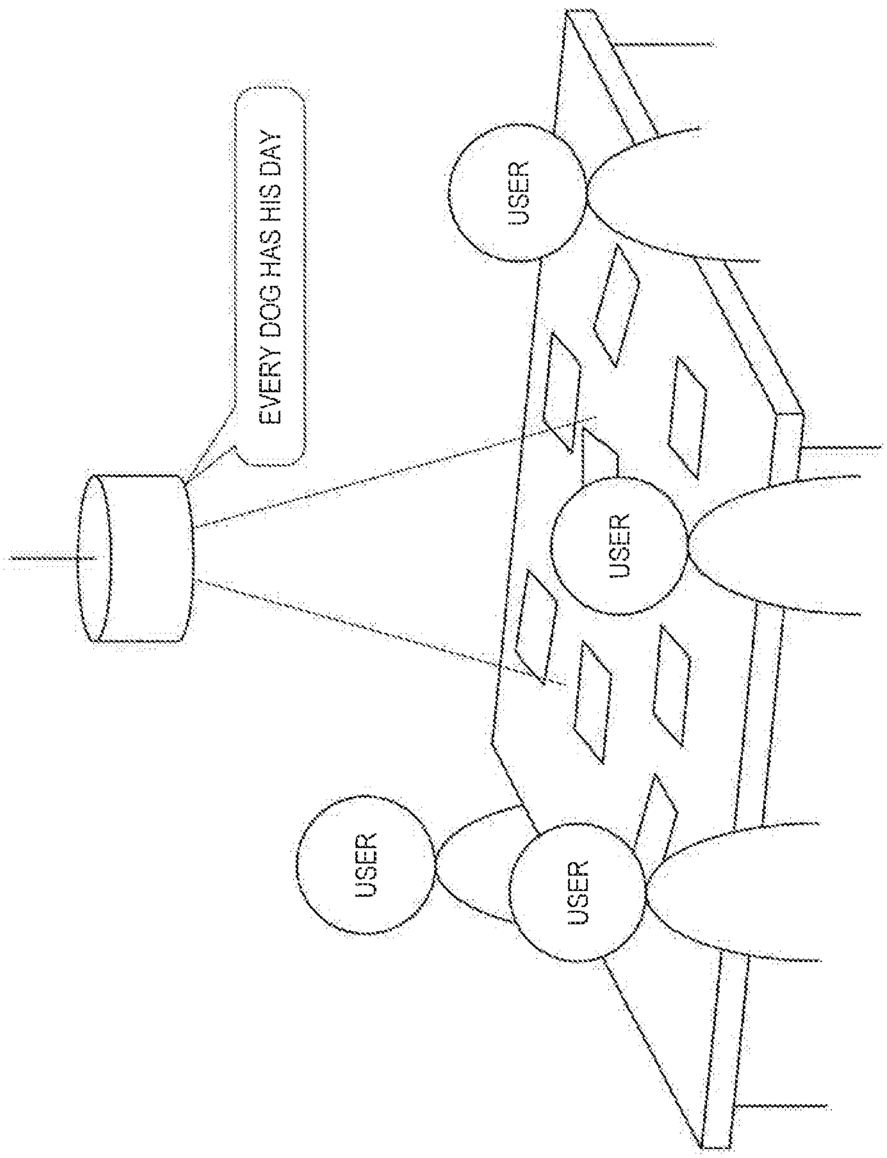

A karuta card assistance application is an application that assists in a karuta card game in which karuta cards arranged on the table 140*a* are used. The karuta card assistance application has a reading-phrase automatic read-aloud function, an answer display function, and a hint supply function. The reading-phrase automatic read-aloud function is a function of causing the output unit 130 to sequentially sound and output reading phrases registered in advance. The answer display function is a function of recognizing each karuta card from a captured image and generating effect display when the karuta card of an answer overlaps a hand of the user. In the hint supply function, when an answer is not presented despite elapse of a predetermined time from the read-aloud of the reading phrase, display indicating a hint range including a karuta card of the answer may be caused to be projected by the output unit 130 and the hint range may be further narrowed according to elapse of time, as illustrated in FIG. 128. In such a configuration, a reader is not necessary in the karuta card game and smooth progress can be supported.

(B: Conversation Assistance Application)

A conversation assistance application is an application that supports an excitement atmosphere during conversation of users. For example, the conversation assistance application can execute sound recognition on conversation of the users, extract keywords through syntax analysis on text from the conversation, and cause the output unit 130 to project an image corresponding to the keywords. Hereinafter, the description will be made more specifically with reference to FIG. 129.

Figure 129:
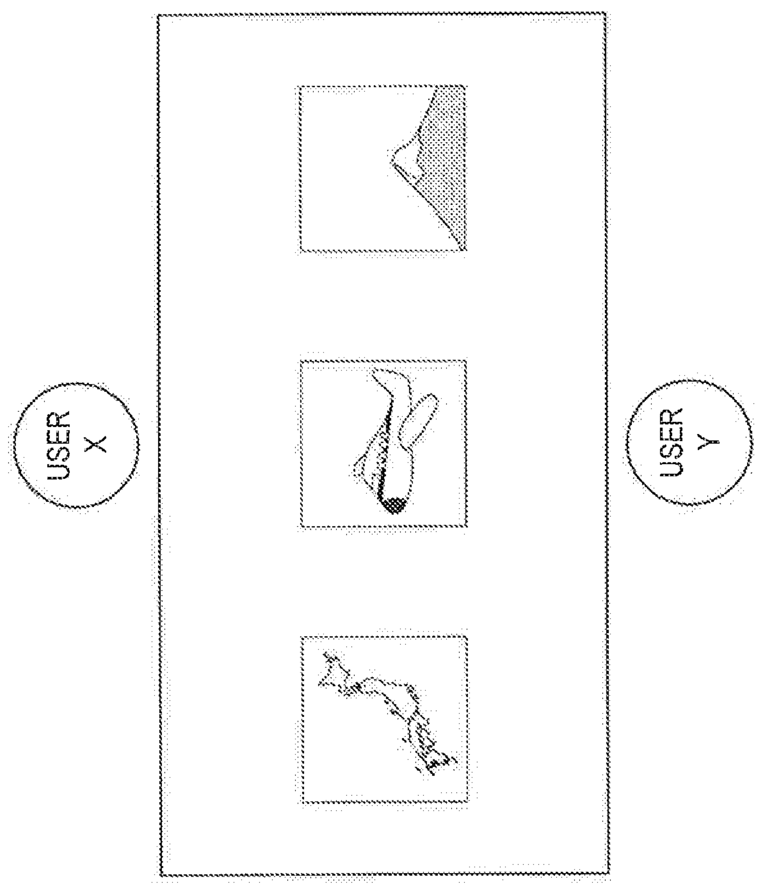

FIG. 129 is an explanatory diagram illustrating a specific example of the conversation assistance application. For example, a case in which two users X and Y have a conversation as follows will be assumed.

X: "I took a trip to Japan recently."

Y: "How long by airplane?"

X: "About 5 hours. Surprisingly, a city."

Y: "Did you see Mt. Fuji?"

X: "Mt. Fuji was lovely. I also saw the sunrise."

In this case, the conversation assistance application extracts, for example, "Japan," "airplane," and "Mt. Fuji" as keywords from the conversation of the two users and causes the output unit 130 to project a map of Japan, an airplane, and Mt. Fuji, as illustrated in FIG. 129. In such a configuration, the sense of presence of the users can be improved and the users are excited with the atmosphere of the conversation.

(C: Projection Surface Tracking Application)

A projection surface tracking application is an application that executes proper projection according to a state of the projection surface. For example, the projection surface tracking application corrects and projects a projected image so that the projected image is displayed to directly face the user according to a state of the projection surface, such as inclination of the projection surface or unevenness on the projection surface. Hereinafter, the description will be made more specifically with reference to FIGS. 130 to 133.

Figure 130:
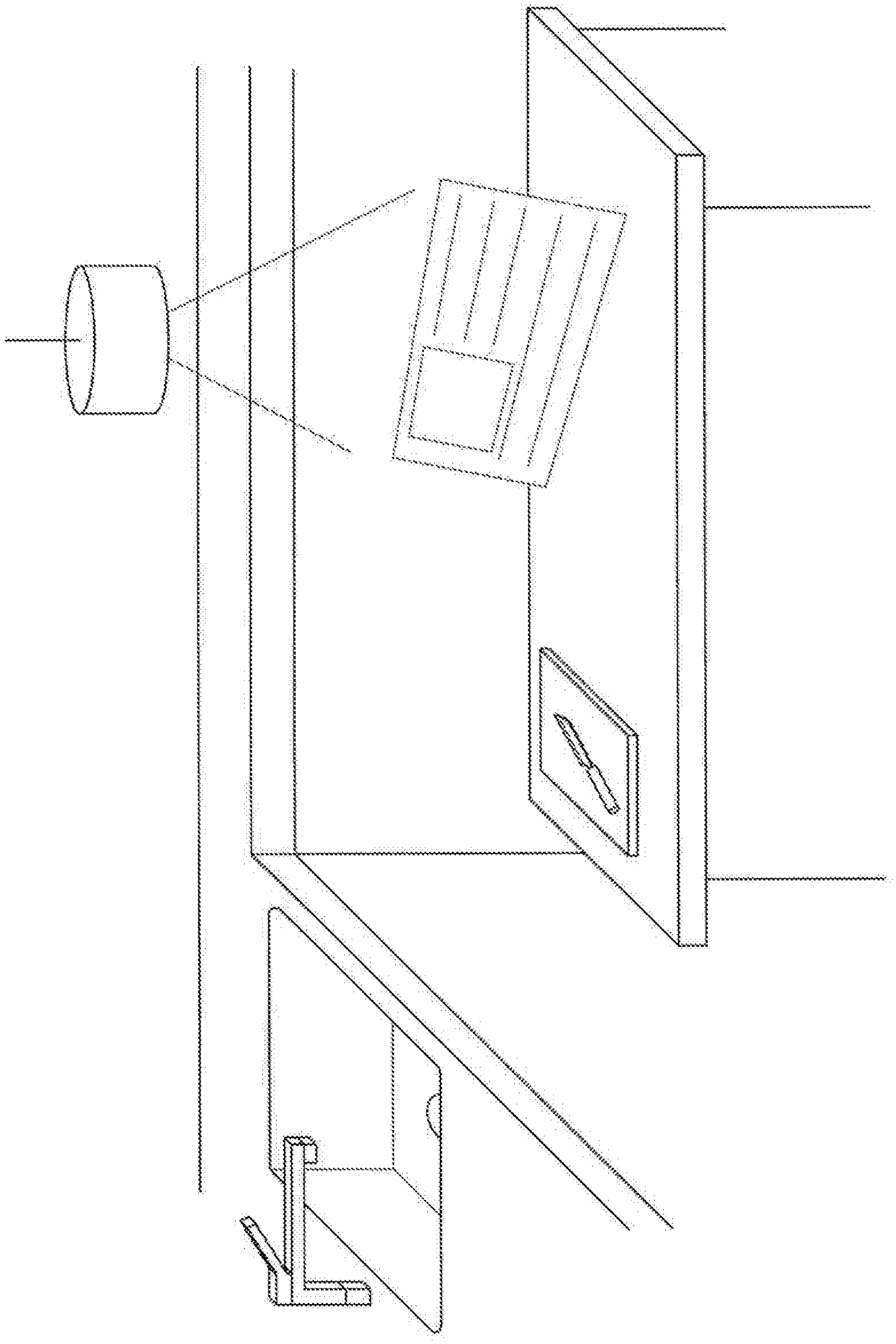

FIGS. 130 to 133 are explanatory diagrams illustrating specific examples of the projection surface tracking application. As illustrated in FIG. 130, the projection surface tracking application projects a recipe to the projection surface obliquely erected on a work table so that the recipe can be viewed to directly face the user. For example, the user can search for a recipe from a web browser projected to the flat surface on the work table and obliquely erect the projection surface on the work table when the user makes food, so that the user can stand at a sink and view the recipe while making the food. In such a configuration, since an image can be projected to the projection surface at any angle, the user can view the projected image from a free position.

Figure 131:
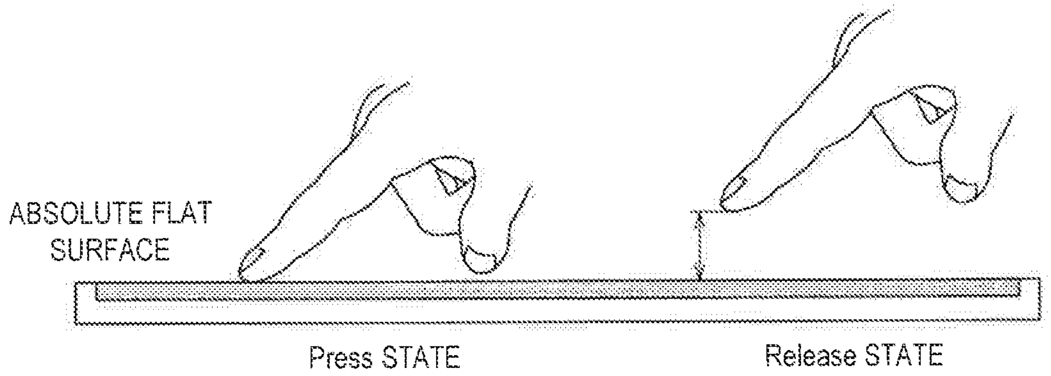

The projection surface tracking application can also detect a user manipulation according to the state of the projection surface. In general, the projection surface tracking application detects a maximum flat surface as the projection surface at a specific timing such as the time of calibration and activation of a product and detects a user manipulation based on a difference in a height between the projection surface and the finger. For example as illustrated in FIG. 131, when the projection surface is a flat surface, the projection surface tracking application detects a user manipulation by detecting whether a finger is touching the projection surface according to a distance between the finger of the user and the flat surface. When a solid object is placed on the projection surface, the projection surface tracking application may detect a user manipulation by detecting a local difference between the finger of the user and the solid object. For example, as illustrated in FIG. 132, when a hemispherical solid object is placed on the flat surface, the projection surface tracking application detects a user manipulation based on a distance between a hemispherical local flat surface and a finger of the user. As illustrated in FIG. 130, when the projection surface is inclined, the projection surface tracking application may detect a user manipulation according to a distance between the finger of the user and the inclined projection surface.

The projection surface tracking application can realize individual display using a mirror. In the individual display, a peripheral device including a mirror and a screen illustrated in FIG. 133 is used. In general, an image projected to the flat surface may be viewed by neighboring people. Accordingly, the projection surface tracking application can execute display in which only a user directly facing the screen is set as a target by reflecting projected light from the mirror and forming an image on the screen installed in front of the user. The projection surface tracking application can also simultaneously realize display dedicated for all the users and individual display such as a hand and cards on the table in a card game. As illustrated in FIG. 133, the projection surface tracking application can detect a user manipulation using a distance between the screen and a finger acquired in the X axis direction and the Y axis direction rather than the Z axis direction.

(D: Meal Assistance Application)

A meal assistance application is an application that supports progress of a meal of the user. For example, the meal assistance application recognizes how much food remains on a dish, i.e., a progress status of a meal, by storing an empty state of the dish on which the food is put in advance and comparing the empty dish and a current dish. The meal assistance application can cause the output unit 130 to project a pattern, a message, or the like according to the progress status of the meal. Hereinafter, the description will be made more specifically with reference to FIGS. 134 and 135.

FIG. 134 is an explanatory diagram illustrating a specific example of the meal assistance application. As illustrated in the upper drawing of FIG. 134, the meal assistance application may cause the output unit 130 to project display such as running of a train around a dish after the meal is finished. Alternatively, as illustrated in the lower drawing of FIG. 134, the meal assistance application may cause the output unit 130 to project display of producing a design of a luncheon mat as the meal progresses.

FIG. 135 is an explanatory diagram illustrating another specific example of the meal assistance application. As illustrated in FIG. 135, the meal assistance application recognizes a progress status of a meal by detecting that the form of the bottom surface of a plate concealed by food is exposed according to the progress of the meal. At this time, the meal assistance application may cause the output unit 130 to project a message according to the progress status of the meal. For example, when the progress of the meal is less than 20%, a message "Put your hands together and eat!" can be output. When the progress of the meal is equal to or greater than 20% and less than 40%, a message "Chew well" can be output. When the progress of the meal is equal to or greater than 40% and less than 70%, a message "Just a little left! Do your best" can be output. When the progress of the meal is 100%, a message "Great! You ate everything" can be output.

As described above, the meal assistance application can support the progress of the meal of the user by causing the output unit 130 to project a pattern, a message, or the like according to the progress status of the meal and improving motivation for the meal of the user.

(E: Motion Effect Application)

A motion effect application can cause the output unit 130 to project an animation as if a picture were moving based on the picture placed on the table 140*a*. For example, as illustrated in FIG. 136, when the user draws a picture on a piece of paper and puts the paper on the table 140*a*, the motion effect application causes the output unit 130 to project an animation and a sound as if the picture drawn by the user were moving. The motion effect application may cause the output unit 130 to output a different sound whenever the user puts a picture on the table 140*a*. Here, a method of generating an animation will be described specifically with reference to FIG. 137.

FIG. 137 is an explanatory diagram illustrating a specific example of the motion effect application. As illustrated in FIG. 137, the motion effect application visually erases a picture placed on the table 140*a* by recognizing the shape and color of the picture from a captured image of the picture placed on the table 140*a* and causing the output unit 130 to project light with the same color as the picture. Then, the motion effect application generates an animation based on the recognized shape of the picture and causes the output unit 130 to project the animation. In such a configuration, it is possible to offer the user a sense as if a picture such as a simple scribble were starting to move.

(F: Lunch Box Preparation Supporting Application)

A lunch box preparation supporting application is an application that supports the user in expressing various patterns with food ingredients. For example, when a target image is designated by the user, the lunch box preparation supporting application analyzes a color structure of the target image and specifies food ingredients, amounts, and an arrangement to express the target image as a pattern based on the analysis result. The lunch box preparation supporting application causes the output unit 130 to project guide display for guiding specified food ingredients, amounts, and arrangement. The user can generate a lunch box expressing a pattern imitating the target image by arranging the food ingredients according to the guide display. Hereinafter, the description will be made more specifically with reference to FIG. 138.

FIG. 138 is an explanatory diagram illustrating a specific example of the lunch box preparation supporting application. As illustrated in the left drawing of FIG. 138, when the user places a package on which a character image is formed on the table 140*a*, the package is imaged by the input unit 110. Then, when the user designates a range in which the character image is formed as a target range, the lunch box preparation supporting application recognizes the character image as a target image and specifies the food ingredients, amounts, and arrangement for expressing the character image as a pattern. The lunch box preparation supporting application causes the output unit 130 to project guide display illustrated in two drawings of FIG. 138 based on the specified food ingredients, amounts, and arrangement. The user can generate a lunch box expressing the pattern of the character as illustrated in the right drawing of FIG. 138 by disposing the food ingredients according to the guide display.

The example in which the package on which the target image is formed is placed on the table 140*a* has been described above as the method of designating the target image. However, the method of designating the target image is not limited to the example. For example, the user can also designate an image included in a website output to the table 140*a* by the output unit 130 as a target image. The character image has been described above as an example of the target image. However, the target image may be an image of a vehicle, a landscape, a map, a toy, or the like.

(G: Daily Assistance Application)

A daily assistance application is an application that supports a behavior, such as learning, a hobby, and work, done every day by the user. For example, the daily assistance application can support a behavior done by the user by causing the output unit 130 to project useful information display for the user to an object in the real space. Hereinafter, the description will be made more specifically with reference to FIGS. 139 to 143.

FIGS. 139 to 143 are explanatory diagrams illustrating specific examples of user assistance by the daily assistance application. As illustrated in FIG. 139, the daily assistance application can cause the output unit 130 to project sample text to an envelope. The user can write text neatly by following the projected text with, for example, a brush pen. The sample text can be freely designated by the user. As illustrated in FIG. 140, the daily assistance application can cause the output unit 130 to project information display indicating how to use knives or forks on the table 140*a* on which knives or forks are arranged and display indicating food on a plate. The user can acquire table manners by using the knives and forks according to the projected information display.

As illustrated in FIG. 141, the daily assistance application can cause the output unit 130 to project information display indicating a sample picture, a drawing method, and the like to the table 140*a* on which a sketch book, paints, a brush, and the like are prepared. The user can complete a good picture by drawing a picture with the brush and the drawing tool according to the projected information display. As illustrated in FIG. 142, the daily assistance application can cause the output unit 130 to project auxiliary lines for equally dividing a whole cake. The user can obtain pieces of cake with the same size by cutting the whole cake along the projected auxiliary lines. The daily assistance application may specify proper auxiliary lines based on the number of equal divisions designated by the user and the shape and size of the whole cake.

As illustrated in FIG. 143, the daily assistance application can execute automatic answer marking from a captured image of a medium such as a print or a book on which answers to problems are written by the user and cause the output unit 130 to project a marking result. The user can confirm correct and incorrect answers, scores, and the like based on the projected marking result. The daily assistance application may execute automatic marking by recognizing identification information formed on the medium and comparing solutions stored in association with the identification information to the answers of the user.

(H: Dining Table Representation Application)

A dining table representation application is an application that executes colorizing for dining table representation. For example, the dining table representation application can recognize an object on a dining table from a captured image of the dining table and cause the output unit 130 to project display according to the object to the object. Hereinafter, the description will be made specifically with reference to FIG. 144.

FIG. 144 is an explanatory diagram illustrating a specific example of the dining table representation application. The dining table representation application may recognize an object on a dining table based on, for example, a distance image of the dining table, cause the output unit 130 to project, for example, display of "Happy Birthday!" to a plate, and cause the output unit 130 to project star display to the table, as illustrated in FIG. 144. In such a configuration, it is possible to improve coloring of the dining table and support the bright dining table.

(I: Food Recommendation Application)

The food recommendation application is an application that recommends food to the user. For example, the food recommendation application can recognize food on a dining table from a captured image of the dining table, calculate nutrient balance of the food based on a recognition result, and recommend food supplementing deficient nutrients. For example, as illustrated in FIG. 145, when vegetables are deficient in the food on the dining table, the food recommendation application may recognize that vitamins, dietary fiber, and the like are deficient and cause the output unit 130 to project display recommending Caesar salad which can supplement nutrients such as vitamins, dietary fiber, and the like and an image of the Caesar salad. The food recommendation application may recommend additional food according to progress of a meal by recognizing an amount of remaining beverage contained in a cup, an amount of remaining food, or the like using depth information. In such a configuration, a well balanced meal for the user is supported and improvements in sales due to additional orders in a restaurant or the like are expected.

(J: Mood Representation Application)

A mood representation application is an application that causes the output unit 130 to project a presentation according to food. For example, the mood representation application can recognize food on a dining table from a captured image of a dining table and cause the output unit 130 to project an image of an object having affinity for food. As a specific example, when food on the dining table is Osechiryori, the mood representation application may cause the output unit 130 to project images of pine, bamboo, and plum. When the food on the dining table is thin wheat noodles, the mood representation application may cause the output unit 130 to project an image of a riverbed or a brook. In such a configuration, it is possible to improve the mood of the dining table according to food.

(K: Tableware Effect Application)

A tableware effect application is an application that generates an effect according to placement of tableware on a dining table. For example, the tableware effect application may recognize classification of tableware placed on a dining table and cause the output unit 130 to output a display effect and a sound according to the classification. Hereinafter, the description will be described more specifically with reference to FIG. 146.

FIG. 146 is an explanatory diagram illustrating a specific example of the tableware effect application. As illustrated in FIG. 146, when the user places a cup on the dining table, the tableware effect application may cause the output unit 130 to project display of ripples spreading from the cup and cause the output unit 130 to output a sound according to the cup. As described above, a sound to be output differs according to a type of tableware. When a plurality of pieces of tableware are close, as illustrated in FIG. 146, a sound to be output by the output unit 130 may be changed by the tableware effect application. When display of a swimming fish is projected by the output unit 130 and the user executes an action of comprehending the display of the fish, the tableware effect application may cause the output unit 130 to output a predetermined sound.

As described above, the tableware effect application can provide a new type of enjoyment on the dining table by generating an effect according to the placement of the tableware on the dining table.

(L: Inter-Room Linking Application)

An inter-room linking application is an application that shares and links an application used by the user between rooms when the information processing systems 100 are installed in the plurality of rooms. For example, the information processing system 100 installed in a user's room acquires information regarding the application used in a living room by the user and enables the user to use the application continuously from the use in the living room after the user moves to the user's room. Hereinafter, the description will be made more specifically with reference to FIG. 147.

FIG. 147 is an explanatory diagram illustrating a specific example of the inter-room linking application. As illustrated in FIG. 147, the inter-room linking application stores history information of use times and use locations (projection locations) of each application and suggests the stored history information to the user. In "All Apps" illustrated in FIG. 147, all of the applications installed in the information processing system 100 projecting a screen are listed. In "Your Apps," applications that the user is currently frequently using on the projection surface are listed. In "Recent Apps," applications recently used by the user including the information processing systems 100 installed in the other rooms are listed. The user can activate a desired application by selecting an icon from the screen illustrated in FIG. 147. The inter-room linking application can support selection of the application by the user by projecting such a screen.

The inter-room linking application can share the history information of the user between the rooms. The inter-room linking application continuously supplies an application used in another room with reference to the history information stored in the other room even after the user moves from the room. For example, when the user selects a cooking recipe with the information processing system 100 installed in a living room and the user moves to a kitchen, the selected cooking recipe is projected by the information processing system 100 installed in the kitchen. Accordingly the user can continuously use the same application even after moving to another room.

Example 1

Here, an example of an illumination control process according to a state of an application or a projection surface will be described.

When a video is projected to a projection surface such as a desk or a screen using a projector, the video of the projector becomes unclear due to environmental factors such as brightness of an illuminator or outside light in some cases. When the video of the projector becomes unclear, the user is forced to execute a task of darkening the entire room or turning off only an illuminator near the projection surface in order to clarify the video, and thus convenience for the user is damaged.

Accordingly, hereinafter, an illumination control process of clearly displaying a video of the projector on the projection surface by acquiring the state of the application or the projection surface and automatically controlling an illuminator according to a status of the projection surface so that the user need not execute a task of adjusting the illumination will be described.

FIG. 148 is a flowchart illustrating an example of an operation of the information processing system 100 according to an embodiment of the present disclosure. Hereinafter, the example of the operation of the information processing system 100 according to the embodiment of the present disclosure will be described with reference to FIG. 148. In the following description, a case in which the information processing system 100*a* is of a projection type illustrated in FIG. 1 and the output unit 130*a* includes an illumination device will be described. In the following example, the description will be made assuming that the illumination device is different form a projector involving display of information and is a device that has a simple illumination function without involvement in display of information.

First, definitions of terms in the flowchart illustrated in FIG. 148 will be described. For an illumination map, an illumination controllable unit of the illumination device is set as a map. The number of cells is decided according to the form of the illumination device, for example, the number of illuminators. Numerical values of each cell indicate illumination intensity, 0 indicates no illumination output, and 100 indicates the maximum value of an illumination output.

FIG. 149 is an explanatory diagram illustrating examples of the illumination maps. FIG. 149 illustrates 3 patterns. FIG. 149 illustrates examples of illumination maps 3011 when only 1 illuminator is installed in the illumination device 3010, when 4 illuminators are installed in a square state, and when 8 illuminators are arranged in a rectangular form.

In the examples of FIG. 149, the number of cells of the illumination map is 1 when only 1 illuminator is installed in the illumination device 3010. When 4 illuminators are installed in the square state in the illumination device 3010, the number of cells of the illumination map is 4. When 8 illuminators are installed to be arranged in a rectangular form in the illumination device 3010, the number of cells of the illumination map is 8. Of course, the arrangement patterns of the illuminators or the patterns of the cells of the illumination maps in the illumination devices 3010 are not limited to these examples.

For an environment map, an obtainable unit of ambient light is set as a map. The number of cells is decided according to the obtainable unit of ambient light. The obtainable unit of ambient light defining the number of cells of the environment map is, for example, a disposition location of an illuminance sensor or a pixel value of an imaging device that images a projection surface.

Numerical values of each cell of the environment map are normalized to numerical values of each cell of the illumination map. By normalizing the numerical values of each cell of the environment map to the numerical values of each cell of the illumination map, the illuminance of ambient light and brightness of an illuminator are associated.

The information processing system 100 adopts various methods as methods of obtaining the illuminance of ambient light. For example, the illuminance of ambient light may be calculated from a pixel value of an image obtained by imaging the projection surface using the camera of the input unit 110, or an illuminance sensor may be provided in the input unit 110 to obtain the illuminance of ambient light from a value of the illuminance sensor.

FIG. 150 is an explanatory diagram illustrating examples of environment maps. FIG. 150 illustrates 3 patterns. FIG. 150 illustrates examples of illumination maps 3021 when only 1 illuminance sensor is installed in an illuminance sensor 3020 acquiring ambient light, when 4 illuminance sensors are installed in a square state in the illuminance sensor 3020, and when 3 sensors are arranged in the same direction in the illuminance sensor 3020.

In the examples of FIG. 150, the number of cells of the environment map is 1 when only 1 sensor is installed in the illuminance sensor 3020. The number of cells of the environment map is 4 when 4 sensors are installed in the square state in the illuminance sensor 3020. The number of cells of the environment map is 3 when 3 sensors are arranged in the same direction in the illuminance sensor 3020. Of course, the arrangement patterns of the sensors in the illuminance sensors 3020 or the patterns of the cells of the illumination map are not limited to these examples.

Association between the illuminance map and the environment map will be described. FIG. 151 is an explanatory diagram illustrating an example of association between the illuminance map and the environment map.

FIG. 151 illustrates an example of the association between the illuminance map and the environment map in a configuration of the illumination device 3010 in which 8 illuminators are installed to be arranged in the rectangular form and the illuminance sensor 3020 in which 3 sensors are installed to be arranged in the same direction.

When 3 sensors are arranged in the same direction in the illuminance sensor 3020, the number of cells of the environment map 3021 is 3 and the cells are defined as A00, A01, and A02. In the embodiment, by matching the number of cells of the environment map with the number of cells of the illumination map, the illumination map and the environment map are associated. In an environment map 3021' after conversion, the number of cells is converted from 3 to 8. The cells after the conversion are defined as B00 to B03 and B10 to B13. A conversion formula at the time of the conversion can be defined as follows, for example.

$$B00=B10=A00$$

$$B01=B11=0.5\times A00+0.5\times A01$$

$$B02=B12=0.5\times A01+0.5\times A02$$

$$B03=B13=A02$$

The information processing system 100 according to the embodiment of the present disclosure can control the illumination device 3010 based on the value of each cell of the environment map after the conversion by adapting the number of cells of the environment map to the number of cells of the illumination map in this way.

Next, the flowchart illustrated in FIG. 148 will be described in detail. First, the information processing system 100 sets a value of system setting in each cell of the illumination map (step S3001). The process of step S3001 can be executed by, for example, the control unit 120. In step S3001, the brightness of the illumination device 3010 set by the user of the information processing system 100 is set in each cell of the illumination map in the range of 0 to 100, for example, at a starting time point of the process illustrated in FIG. 148.

When the value of the system setting is set in each cell of the illumination map in the foregoing step S3001, the information processing system 100 subsequently acquires an execution state of a managed application and determines whether there are unprocessed applications (step S3002). The determination of step S3002 can be executed by, for example, the control unit 120.

When it is determined in the foregoing step S3002 that there are unprocessed applications (Yes in step S3002), the information processing system 100 subsequently acquires the application drawn on the innermost side among the unprocessed applications (step S3003). By executing the process from the innermost application, the information processing system 100 can reflect the value of the older application in the illumination map.

When the process of the foregoing step S3003, the information processing system 100 subsequently confirms whether the corresponding application is defined from an application illumination association table (step S3004). The process of step S3004 can be executed by, for example, the control unit 120.

The application illumination association table is a table in which an application to be executed by the information processing system 100 is associated with brightness (brightness realized in accordance with illumination light of the illumination device 3010 with ambient light) at the time of execution of the application. When an application is not defined in the application illumination association table, it means that the application can be used even under the system setting or illumination setting of another application without special illumination control.

FIG. 152 is an explanatory diagram illustrating an example of the application illumination association table. Referring to the application illumination association table illustrated in FIG. 152, the information processing system 100 can be aware of the brightness of the illumination device 3010 when a processing target application is executed. For example, for a “cinema moving image player,” it can be understood from the application illumination association table illustrated in FIG. 152 that the brightness is set to 0 to represent immersion in a movie.

The application illumination association table may have information regarding whether to notify the user when each application controls the brightness of the illumination device 3010. For example, it can be understood from the application illumination association table illustrated in FIG. 152 that notification to the user is not necessary when the “cinema moving image player” controls the brightness of the illumination device 3010 and notification to the user is necessary when a “child moving image player” controls the brightness of the illumination device 3010.

When it is determined in the foregoing step S3004 that the corresponding application is not defined in the application illumination association table (No in step S3004), the information processing system 100 assumes that the application is processed and returns the process to the process of the foregoing step S3002. Conversely, when it is determined that in the foregoing step S3004 that the corresponding application is defined in the application illumination association table (Yes in step S3004), the information processing system 100 acquires the value of the brightness of the application from the application illumination association table (step S3005). The process of step S3005 can be executed by, for example, the control unit 120.

When the process of the foregoing step S3005 ends, the information processing system 100 subsequently acquires a display area of the application in the display region by the projector (step S3006). The process of step S3006 can be executed by, for example, the control unit 120. Here, when there is no display area, for example, when there is the application but the application is iconized, the information processing system 100 may not set the application as a processing target.

When the process of the forgoing step S3006 ends, the information processing system 100 subsequently sets the value acquired from the application association table in the cell corresponding to the display area acquired in the foregoing step S3006 in the illumination map (step S3007). The process of step S3007 can be executed by, for example, the control unit 120. When the process of the foregoing step S3007 ends, the application is assumed to be processed and the process returns to the process of the foregoing step S3002.

When it is determined in the foregoing step S3002 that there is no unprocessed application (No in step S3002), the information processing system 100 subsequently acquires the ambient light and sets a value in the environment map (step S3008). The process of step S3008 can be executed by, for example, the control unit 120.

The information processing system 100 normalizes the value of the ambient light (or the illuminance of the illumination device 3010) to the value of an illumination output (brightness) at the time of the process of setting the value in the environment map in step S3008. The illuminators of the illumination device 3010 which output light to some extent (0% to 100%) and the degrees of illuminance under the illuminators may be associated in advance at the time of factory shipment.

When the process of the foregoing step S3008 ends, the information processing system 100 subsequently executes association to determine how much of an influence the environment map has on the range of the illumination map (step S3009). The process of step S3009 can be executed by, for example, the control unit 120. The association between the illumination map and the environment map is executed by causing the number of cells of the illumination map to match the number of cells of the environment map, as described above. The association between the illumination map and the environment map may be executed in advance at the time of factory shipment.

When the process of the foregoing step S3009 ends, the information processing system 100 subsequently determines whether there is an unprocessed cell of the illumination map (step S3010). The process of step S3010 can be executed by, for example, the control unit 120. The order of the processes on the illumination map may begin, for example, from lower numbers assigned to the cells of the illumination map.

When it is determined in the foregoing step S3010 that there is the unprocessed cell (Yes in step S3010), the information processing system 100 compares the value of the processing target cell of the illumination map to the value (the value of the cell of the environment map) of the ambient light corresponding to the processing target cell. Then, the information processing system 100 determines whether the value of the ambient light corresponding to the processing target cell of the illumination map is equal to or less than the value of the processing target cell of the illumination map (step S3011). The process of step S3010 can be executed by, for example, the control unit 120.

When it is determined in the foregoing step S3011 that the value of the ambient light corresponding to the processing target cell of the illumination map is equal to or less than the value of the processing target cell of the illumination map (Yes in step S3011), it means that brightness necessary for the application is not achieved by only the ambient light. Therefore, the information processing system 100 sets a value obtained by subtracting the value of the ambient light from the value of the processing target cell of the illumination map as a new illumination value of the cell (step S3012). The process of step S3010 can be executed by, for example, the output control unit 122.

Conversely, when it is determined in the foregoing step S3011 that the value of the ambient light corresponding to the value of the processing target cell of the illumination map is greater than the value of the processing target cell of the illumination map (No in step S3011), it means that brightness necessary for the application is exceeded by only the ambient light. Therefore, the information processing system 100 sets 0 as the value of the processing target cell of the illumination map (step S3013). The process of step S3013 can be executed by, for example, the output control unit 122.

When the process of the foregoing step S3013 ends, the information processing system 100 subsequently executes notification only on the application for which the notification is necessary when the brightness necessary for the application is exceeded by only the ambient light. Therefore, it is determined whether notification is set in the processing target application in the application illumination association table (step S3014). The process of step S3014 can be executed by, for example, the output control unit 122.

When it is determined in the foregoing step S3014 that the notification is set in the processing target application in the application illumination association table (Yes in step S3014), the information processing system 100 subsequently gives notification of the processing target application to the application (step S3015). The process of step S3015 can be executed by, for example, the output control unit 122.

The application receiving the notification in the foregoing step S3015 executes a notification process of displaying a message or outputting a sound, for example, "Surroundings are too bright. Please darken environment" or "Light is brighter than expected and recognition precision may deteriorate."

Conversely, when it is determined in the foregoing step S3014 that the notification is not set in the processing target application in the application illumination association table (No in step S3014), the information processing system 100 returns to the process of the foregoing step S3010 assuming that the processing target cell of the illumination map is processed.

When it is determined in the foregoing step S3010 that there is no unprocessed cell (No in step S3010), the information processing system 100 subsequently sets the value of the illumination map set in the above-described series of processes in the output unit 130 (step S3016). The process of step S3016 can be executed by, for example, the output control unit 122. The output unit 130 controls the brightness of each illuminator of the illumination device 3010 based on the value of the illumination map.

The information processing system 100 according to the embodiment of the present disclosure can execute the illumination control according to the application to be executed and the status of the projection surface such as the brightness of the ambient light by executing the above-described series of operations. The information processing system 100 according to the embodiment of the present disclosure can optimize the illumination according to the purpose of the user by executing the illumination control according to the status of the projection surface.

The process of acquiring the ambient light in step S3008 of the flowchart illustrated in FIG. 148 may be executed once at the time of activation of the application in the information processing system 100 or may be executed periodically during the activation of the information processing system 100.

Hereinafter, the illumination control according to the application to be executed and the status of the projection surface such as the brightness of the ambient light will be described exemplifying specific applications.

Example 1

Cinema Moving Image Player

A cinema moving image player is an application which darkens at the time of output of content to represent immersion of a movie. FIG. 153 is an explanatory diagram illustrating examples of values of the illumination map 3011 and the environment map 3021' when the information processing system 100 executes the cinema moving image player. The values of the cells of the illumination map 3011 and the environment map 3021' when the cinema moving image player is executed are assumed to be acquired, as illustrated in (1) of FIG. 153.

Referring to the application illumination association table illustrated in FIG. 152, the brightness of the cinema moving image player is defined as 0. Accordingly, the information processing system 100 realizes the brightness of the cinema moving image player defined in the application illumination association table by turning off the illuminator of the illumination device 3010. The values of the cells of the illumination map 3011 and the environment map 3021' when the illuminator of the illumination device 3010 is turned off are similar, as illustrated in, for example, (2) of FIG. 153.

Example 2

Child Moving Image Player

A child moving image player is an application which brightens at the time of output of content so that a child is not allowed to view an animation or the like in a dark place. FIG. 154 is an explanatory diagram illustrating examples of the illumination map 3011 and the environment map 3021' when the information processing system 100 executes the child moving image player. The values of the cells of the illumination map 3011 and the environment map 3021' when the child moving image player is executed are assumed to be acquired, as illustrated in (1) of FIG. 154.

Referring to the application illumination association table illustrated in FIG. 152, the brightness of the child moving image player is defined as 80. Accordingly, the information processing system 100 realizes the brightness of the child moving image player defined in the application illumination association table by turning on the illuminator of the illumination device 3010. The values of the cells of the illumination map 3011 and the environment map 3021' when the illuminator of the illumination device 3010 is turned on are similar, as illustrated in, for example, (2) of FIG. 154.

When the illuminator of the illumination device 3010 is turned on and brightness becomes the brightness defined in the application illumination association table, the information processing system 100 notifies the child moving image player that the brightness becomes the brightness defined in the application illumination association table. The notified child moving image player determines that a safe environment can be prepared so that a child can view content and starts producing the content.

Referring to the application illumination association table illustrated in FIG. 152, the notification is defined as "necessary" for the child moving image player. Accordingly, if the brightness is deficient even with the control of the illumination device 3010, for example, the information processing system 100 notifies the child moving image player that the brightness is deficient. Then, the notified child moving image player prompts the user to switch the light on in a room by displaying "Brighten surroundings" or the like.

When there is outside light entering from a window, the information processing system 100 reflects the outside light to the environment map 3021'. FIG. 155 is an explanatory diagram illustrating an example when the outside light is reflected to the environment map 3021'. FIG. 155 illustrates an example in which the outside light has an influence on the upper left portion of the environment map 3021' and values increase.

Example 3

Candle Application

A candle application is an application which projects a candle video to the projection surface such as a table. FIG. 156 is an explanatory diagram illustrating examples of the illumination map 3011 and the environment map 3021' when the information processing system 100 executes the candle application. The values of the cells of the illumination map 3011 and the environment map 3021' when the candle application is executed are assumed to be acquired, as illustrated in (1) of FIG. 156.

Referring to the application illumination association table illustrated in FIG. 152, the brightness of the candle application is defined as 20. Accordingly, the information processing system 100 realizes the brightness of the candle application defined in the application illumination association table by turning off the illuminator of the illumination device 3010. The values of the cells of the illumination map 3011 and the environment map 3021' when the illuminator of the illumination device 3010 is turned on are similar, as illustrated in, for example, (2) of FIG. 154.

However, in the example illustrated in FIG. 156, even when the illuminator of the illumination device 3010 is turned off, the values of the cells of the environment map 3021' become 50, and thus the brightness of the candle application defined in the application illumination association table may not be realized. Referring to the application illumination association table illustrated in FIG. 152, the notification is defined as "necessary" for the candle application.

Accordingly, when the brightness is excessive despite the control of the illumination device 3010, for example, the information processing system 100 notifies the candle application that the brightness is excessive. The candle application notified by the information processing system 100 prompts the user to close a curtain, for example, and darken the ambient light by displaying, for example, "Surroundings are too bright. Please darken environment."

Example 4

Projection Mapping Application

A projection mapping application is an application that aims to project an image to a wall surface of a room or an object. When the projection mapping application is executed, the user installs, for example, a hemisphere in a mirror state on the projection surface so that an image output from the projector of the output unit 130 is reflected from the hemisphere. By reflecting the image output from the projector of the output unit 130 from the hemisphere in the mirror state, it is possible to project an image to a wall surface of a room or an object.

Referring to the application illumination association table illustrated in FIG. 152, the brightness of the projection mapping application is defined as 0. Accordingly, the information processing system 100 realizes the brightness of the projection mapping application defined in the application illumination association table by turning off the illuminator of the illumination device 3010.

As the projection mapping application, for example, there are a planetarium application projecting an image of a starry sky to a wall surface of a room and a revolving lantern application realizing a revolving lantern by projecting an image to Japanese paper installed on the projection surface. Hereinafter, the planetarium application and the revolving lantern application will be exemplified as the projection mapping applications in the description.

FIG. 157 is an explanatory diagram illustrating a specific example of the application and an explanatory diagram illustrating the planetarium application. In (a) of FIG. 157, an example of an image output from the projector of the output unit 130 is illustrated. In (b) and (c) of FIG. 157, a form in which an image output from the projector of the output unit 130 is reflected from a hemisphere 3110 having a surface in a mirror state and installed on the projection surface is illustrated. In (d) of FIG. 157, an example of a state in which the image output from the projector of the output unit 130 is reflected from the hemisphere 3110 and is projected to a wall surface of a room is illustrated.

FIG. 158 is an explanatory diagram illustrating a specific example of the application and an explanatory diagram illustrating the revolving lantern application. In (a) of FIG. 158, an example of an image output from the projector of the output unit 130 is illustrated. In (b), (c), and (d) of FIG. 157, a form in which the image output from the projector of the output unit 130 is reflected from the hemisphere 3110 installed on the projection surface and having the surface in the mirror state and is projected to Japanese paper 3120 is illustrated.

Example 5

Globe Application

A globe application is an application that aims to express a globe by projecting an image to a hemisphere installed on the projection surface. When the globe application is executed, the user installs, for example, a hemisphere with a mat shape on the projection surface so that an image output from the projector of the output unit 130 is projected to the hemisphere. By projecting the image output from the projector of the output unit 130 to the hemisphere with the mat shape, it is possible to express the globe using the hemisphere.

FIG. 159 is an explanatory diagram illustrating a specific example of the application and an explanatory diagram illustrating the globe application. In (a) of FIG. 159, an example of an image output from the projector of the output unit 130 is illustrated. In (b) of FIG. 159, a form in which the image output from the projector of the output unit 130 is reflected from the hemisphere 3120 installed on the projection surface and having a surface of a mat shape is illustrated. In (c) of FIG. 159, an example of a state in which the image output from the projector of the output unit 130 is projected to the hemisphere 3120 having the mat shape to express the hemisphere 3120 having the mat shape as a globe and various kinds of information are projected to the projection surface in association with the globe is illustrated.

Example 6

Screen Recognition Application of Mobile Terminal

A screen recognition application of a mobile terminal is an application which recognizes a screen of a mobile terminal installed on the projection surface with the camera of the input unit 110 and executes a process according to the recognized screen. When the screen of the mobile terminal is recognized and the illuminator of the illumination device 3010 is turned off and darkened, the screen can be easily recognized with the camera of the input unit 110.

However, when the illuminator of the illumination device 3010 is turned off and darkened, the screen may be whitened depending on a dynamic range of the camera of the input unit 110.

Accordingly, in the embodiment, in order to easily recognize the luminescent screen, the illuminator of the illumination device 3010 is not turned off, but the illuminator of the illumination device 3010 is set to be dark for the purpose of reducing highlight, as illustrated in the application illumination association table of FIG. 152.

FIG. 160 is an explanatory diagram illustrating a specific example of the application and an explanatory diagram illustrating the screen recognition application of the mobile terminal. FIG. 160 illustrates a form in which a screen of a mobile terminal 3130 is recognized with the camera of the input unit 110 and information according to the screen of the mobile terminal 3130 is projected by the projector of the output unit 130.

Example 7

Food Package Recognition Application

A food package recognition application is an application which recognizes the surface of a food package installed on the projection surface with the camera of the input unit 110 and executes a process according to the recognized food package. When the food package is recognized and the illuminator of the illumination device 3010 is turned on and brightened, the food package which is a reflector is easily recognized with the camera of the input unit 110.

FIG. 161 is an explanatory diagram illustrating a specific example of the application and an explanatory diagram illustrating the food package recognition application. FIG. 161 illustrates a form in which the surfaces of food packages 3140 and 3150 are recognized with the camera of the input unit 110 and information according to the screens of the food packages 3140 and 3150 is projected by the projector of the output unit 130.

Example 8

General Object Recognition Application

A general object recognition application is an application which recognizes the surface of an object installed on the projection surface with the camera of the input unit 110 and executes a process according to the recognized object. When the object is recognized, the illuminator of the illumination device 3010 is brightened about half because it is not known in advance which object is placed on the projection surface. By brightening the illuminator of the illumination device 3010 about half, the surface of an object is easily recognized with the camera of the input unit 110.

FIG. 162 is an explanatory diagram illustrating a specific example of the application and an explanatory diagram illustrating the general object recognition application. FIG. 162 illustrates a form in which the surfaces of general objects 3160 and 3170 are recognized with the camera of the input unit 110 and information according to screens of the general objects 3160 and 3170 is projected by the projector of the output unit 130.

The information processing system 100 according to the embodiment can optimize the illumination for each purpose of the user by executing the illumination control according to a use status of the projection surface. The information processing system 100 according to the embodiment can adjust illumination of only a necessary spot of the projection surface by executing the illumination control using the environment map and the illumination map divided as the cells. By adjusting the illumination of only a necessary spot of the projection surface, the plurality of users can execute different tasks on content projected to the projection surface by the projector of the output unit 130 without stress.

The information processing system 100 according to the embodiment can clarify a video by detecting a portion in which an application is executed on the projection surface and adjusting the illumination. For example, the input unit 110 detects a portion on the projection surface in which eating is taking place and the brightness of the illuminator of the illumination device 3010 is adjusted, and thus it is possible to prevent the brightness of a neighboring area in which eating is taking place from being darkened.

The information processing system 100 according to the embodiment executes the illumination control when the general object recognition application is executed, and thus it is possible to improve recognition precision. The information processing system 100 according to the embodiment changes a control method for the illumination device 3010 according to a recognition target object, and thus it is possible to improve the recognition precision of the object placed on the projection surface.

The information processing system 100 according to the embodiment may control the brightness based on meta information or attribute information of content to be output from the output unit 130. For example, when the attribute information of the content to be output is set as an animation for children, the information processing system 100 controls the illumination device 3010 to brighten. When the attribute information is set as a movie for adults, the information processing system 100 may control the brightness of the illuminator of the illumination device 3010 to darken.

The information processing system 100 can change the brightness of individual content even for the same application by controlling the brightness based on meta information or attribute information of content to be output in this way.

The information processing system 100 may execute the control for immediate target brightness when the brightness of the illuminator of the illumination device 3010 is controlled. Additionally, the information processing system 100 may execute control through gradual brightening or darkening such that target brightness is ultimately achieved.

Example 2

Here, an example of a process of provoking a preset function when a specific condition on the projection surface is satisfied will be described. A condition for provoking a function of an application can normally be set by only a vendor supplying the application. Depending on a use environment, a function is not provoked in a behavior defined in an application in some cases. Depending on a use environment, a function is not executed in a behavior defined in an application in some cases.

Accordingly, the information processing system 100 according to the embodiment is configured to allow the user to freely set a function to be provoked and a provoking condition. In the information processing system 100 according to the embodiment, the user is allowed to freely set a function to be provoked and a provoking condition, so that various representations can be expressed.

Various objects are placed on the table 140*a* for the users and various interactions are executed daily on the table 140*a*. The information processing system 100 according to the embodiment allows the users to use functions using the interactions as chances to provoke functions. The information processing system 100 according to the embodiment delivers data to be used at the time of provoking of functions to processes (actions) to be executed at the time of provoking of the functions according to occurrence of the interactions.

Examples of the interactions to be used as provoking conditions (triggers) of the functions by the information processing system 100 according to the embodiment are as follows. Of course, the interactions are not limited to the following interactions:

- picking up a sound on the table surface;
- recognizing an AR marker generated by the user,
- recognizing depth information;
- detecting brightness of the table surface;
- recognizing a hand state on the table surface;
- recognizing a device placed on the table surface;
- arrival of a predetermined time;
- detecting a temperature;
- detecting the concentration of carbon dioxide;
- detecting a smell;
- detecting water vapor, and
- detecting humidity.

Examples of the triggers when a sound on the table surface is picked up are as follows:

- detecting a pattern of a sound (for example, recording a sound "knock, knock, knock" generated when the user knocks the surface of the table 140*a* with his or her fist three times);
- detecting a change in volume (for example, the information processing system 100 collects a sound with a predetermined threshold value or more);
- detecting a time for which a sound continues (for example, the information processing system 100 detects that silence continues for a predetermined time); and
- detecting a direction from which a sound emanates.

As data delivered to an action when a pattern of a sound is detected, for example, there is ID information for identifying the detected pattern. As data to be delivered to an action when a change in volume, a time for which a sound continues, or a direction from which a sound emanates, for example, there are volume, a sound time, and a sound direction.

Examples of the triggers when an AR marker generated by the user is recognized are as follows:

- discovering the AR marker (for example, the information processing system 100 discovers a marker registered by the user somewhere on the entire table surface or a region registered in advance); and losing the AR marker (for example, the information processing system 100 loses a marker registered by the user).

As data to be delivered to an action when an AR marker is discovered, for example, there are ID information of a discovered marker, discovered coordinates, a discovered posture, a discovered size, and a time at which the AR marker is discovered. As data to be delivered to an action when a discovered AR marker is lost, for example, there are ID information of the lost marker, coordinates at which the marker was last seen, a posture at which the marker was last seen, a size in which the marker was last seen, and a time at which the marker is lost.

Examples of the triggers when depth information is recognized are as follows:

recognizing a mass (for example, detecting that a predetermined amount of a mass increases or decreases somewhere on the entire table surface or a region registered in advance);

recognizing disposition of an object on the table surface (for example, a depth map may be combined with an RGB image when the depth map matches or does not match a depth map registered in advance);

detecting a change from a standard flat surface (for example, when nothing is placed for a predetermined time); and detecting a motion (for example, detecting an object actively moving somewhere on the entire table surface or a region registered in advance).

As data to be delivered to an action when a mass is recognized, for example, there are a location in which the mass is discovered, an area of the mass, a cubic volume of the mass, and a time at which the mass id recognized. As data to be delivered to an action when the disposition of an object on the table surface is recognized, for example, there are a location in which the disposition is changed, a time at which the disposition is changed, and a change amount (of area or cubic volume). As data to be delivered to an action when the change from the standard flat surface is detected, for example, there are an exterior, a location, an area, and a cubic volume of an object changed from a standard state and a date on which the object is first placed. As data to be delivered to an action when a motion is detected, for example, there are activeness of the motion, coordinates or area of a region in which the motion is mainly done, and a date on which the motion is done. The activeness of the motion is, for example, an index obtained by multiplying an area in which the motion is done by a speed of the motion.

An example of the trigger when the brightness of the table surface is detected is as follows:

detecting a change in the brightness (for example, detecting that the table surface is brightened or darkened by a preset threshold value or more).

As data to be delivered to an action when the change in the brightness is detected, for example, there is information regarding the brightness.

Examples of the triggers when a hand state on the table surface is recognized are as follows:

the number of hands (for example, detecting that the number of hands exceeds a predetermined number for a predetermined time or more);

a time at which a hand reaches the table surface; and the position of a hand (for example, detecting that a hand enters a region registered in advance).

As data to be delivered to an action when the number of hands is recognized, for example, there are the number of recognized hands, the number of spread hands, and the positions of recognized hands.

An example of the trigger when the device placed on the table surface is recognized is as follows:

connection of a device (for example, detecting connection between the information processing system 100 and the device or releasing of the connection between the information processing system 100 and the device).

As data to be delivered to an action when the connection of the device is recognized, for example, there are ID information of the recognized device, the position of the device, the posture of the device, and the size of the device.

Examples of the triggers when arrival of a predetermined time is recognized are as follows:

arrival of a designated time; and elapse of a predetermined time.

As data to be delivered to an action when a designated time arrives, for example, there is time information. As data to be delivered to an action when elapse of a predetermined time is recognized, for example, there are a starting time, an elapsed time, and a current time.

An example of the trigger when detection of a temperature is recognized is as follows:

a change in temperature (for example, detecting that a change in temperature per hour is equal to or greater than a predetermined amount).

As data to be delivered to an action when the change in temperature is detected, for example, there are a temperature change amount, an area in which the temperature is changed, an absolute temperature, and a date on which the change in temperature is detected.

An example of the trigger when detection of the concentration of carbon dioxide is recognized is as follows:

a change in the concentration of carbon dioxide (for example, detecting that the change in the concentration of carbon dioxide per hour is a predetermined amount or more).

As data to be delivered to an action when the change in the concentration of carbon dioxide is detected, for example, there are a change amount of a concentration of carbon dioxide, absolute concentration, and a date on which the change in the concentration is detected.

An example of the trigger when detection of a smell is recognized is as follows:

detecting a predetermined smell (chemical substance).

As data to be delivered to an action when a smell is detected, for example, there are a detection amount and a date on which the smell is detected.

Examples of functions executed according to the above-described interactions by the information processing system 100 according to the embodiment of the present disclosure are as follows:

projecting a video or an image;

reproducing music;

executing other applications;

imaging a photo;

adjusting illumination;

adjusting brightness of a projected image;

adjusting volume; and displaying an alert.

As an action when projection of a video or an image is executed, for example, there is projection of a visual effect to the projection surface. As display to be projected to the projection surface, for example, there are display of a visual effect registered in advance (an explosion effect, a glittering effect, or the like) and display of a visual effect generated by the user. An example of the visual effect may be an effect recorded in advance on the table surface, an effect drawn based on a movement trajectory of a hand or a finger on the table surface by the user, or an effect obtained by using an illustration drawn by a paint application or an image searched for and discovered on the Internet by the user.

As a use of data to be delivered from the trigger when the action of projecting the visual effect to the projection surface is executed, for example, there is a change in an amount of the visual effect in proportion to the magnitude of a sound generated in tapping on the table surface.

As an action when reproduction of music is executed, for example, there is an action of reproducing a sound or music. Specifically, for example, there is an action of outputting a sound effect registered in advance or an action of outputting favorite music registered by the user. As a use of data to be delivered from the trigger when an action of reproducing a sound or music is executed, for example, there is reflection of an increase or decrease in given data to loudness of a sound.

As actions when an application is activated, for example, there are activation of a general application, activation of an application designating an argument, and activation of a plurality of applications. As a specific example of the general application, for example, there is an application manipulating a television or an application displaying a clock. As the activation of the application designating an argument, for example, there is activation of a browser designating a URL. As a specific example of the activation of the plurality of applications, for example, there is reproduction of the positions, window sizes, and inclinations of the plurality of stored applications.

As an action of imaging a photo, for example, there are an action of imaging the entire projection surface and an action of imaging a part of the projection surface. As a use of data to be delivered as the trigger when an action of imaging a photo is executed, for example, there is an action of imaging a predetermined range centering on a recognized hand.

As actions when illumination is adjusted or the brightness of a projected image is adjusted, for example, there are adjustment of the brightness and an action of turning off an illuminator. As a specific example of the adjustment of the brightness, for example, the illumination is brightened or darkened, or a starting point and an ending point are designated and movement is executed between the points in a certain time. As a use of data to be delivered from the trigger when the action of adjusting the illumination is executed, for example, there are reflection of a delivered value in the brightness and adjustment of the brightness according to ambient light.

As actions when the volume is adjusted, for example, there are adjustment of the volume and muting of the volume. As a specific example of the adjustment of the volume, for example, a sound is increased or decreased, or a starting point and an ending point are designated and movement is executed between the points in a certain time. As a use of data to be delivered from the trigger when the action of adjusting the volume is executed, for example, there are reflection of a delivered value in the volume and adjustment of the volume according to surrounding volume.

As an action when an alert is displayed, for example, there is display (projection) of an alert message. As a use of data to be delivered from the trigger when the action of displaying an alert is executed, for example, there is an output of an alert message "Manipulation may not be executed with that hand" around a newly recognized hand when the number of recognized hands exceeds a threshold value.

In this way, relations between the function to be provoked and the provoking condition have a diverse range, and it is necessary for the user to simply set the function to be provoked and the provoking condition. Hereinafter, examples of GUIs which are output to the projection surface by the information processing system 100 when the user is allowed to set the function to be provoked and the provoking condition will be described.

FIGS. 163 to 171 are explanatory diagrams illustrating an example of a GUI which is output to the projection surface by the information processing system 100 according to an embodiment of the present disclosure. FIGS. 163 to 171 illustrate an example of a GUI when the user is allowed to set the provoking condition and an example of a GUI 3200 when a pattern of music is registered as the provoking condition.

When the user is allowed to set the provoking condition, the information processing system 100 according to the embodiment of the present disclosure first outputs the GUI 3200 for allowing the user to select a channel which is to be used as the provoking condition, as illustrated in FIG. 163. In the GUI 3200 illustrated in FIG. 163, a sound, a marker, an object on a desk surface (the surface of the table 140*a*) are shown as the channels. Of course, what is used as the channel when the user is allowed to set the provoking condition is not limited to the related example.

Here, when the user selects the sound as the channel, the information processing system 100 subsequently outputs the GUI 3200 for allowing the user to select the trigger, as illustrated in FIG. 164. FIG. 164 illustrating a pattern of the sound, volume of the sound, and a time for which the sound continues as triggers. Of course, what is used as the trigger is not limited to the related example.

Here, when the user selects the pattern of the sound as the trigger, the information processing system 100 subsequently outputs the GUI 3200 for allowing the user to record the pattern of the sound. When the user is ready to record, he or she touches a recording button illustrated in FIG. 165. The information processing system 100 starts the recording according to a manipulation from the user on the recording button. While the pattern of the sound is recorded, the information processing system 100 outputs the GUI 3200 illustrated in FIG. 166.

When the recording of the sound is completed, the information processing system 100 subsequently outputs the GUI 3200 illustrated in FIG. 167. The GUI 3200 illustrated in FIG. 167 is a GUI for allowing the user to decide whether to complete the recording and whether to use the recorded sound as the trigger. When the user selects to use the recorded sound as the trigger, the information processing system 100 outputs the GUI 3200 illustrated in FIG. 168. The GUI 3200 illustrated in FIG. 168 is output as a GUI for allowing the user to reproduce the recorded sound.

When the user reproduces the recorded sound and the information processing system 100 recognizes a sound reproduced by the user as the pattern of the sound, the information processing system 100 outputs the GUI 3200 illustrated in FIG. 169. The GUI 3200 illustrated in FIG. 169 is a GUI indicating that the information processing system 100 recognizes the pattern of the sound. Conversely, when the sound reproduced by the user is not recognized as the pattern of the sound, the information processing system 100 outputs the GUI 3200 illustrated in FIG. 170. The GUI 3200 illustrated in FIG. 170 is a GUI indicating that the information processing system 100 did not recognize the pattern of the sound reproduced by the user.

When the information processing system 100 recognizes the pattern of the sound, the information processing system 100 outputs the GUI 3200 illustrated in FIG. 171. The GUI 3200 illustrated in FIG. 171 is a GUI indicating that the information processing system 100 registers the pattern of the sound registered by the user is registered as a trigger.

The information processing system 100 according to the embodiment of the present disclosure can allow the user to simply set the function to be provoked and the provoking condition by outputting the GUI illustrated in FIGS. 163 to 171.

The example of the GUI 3200 output by the information processing system 100 when the sound produced by the user is registered as the trigger has been described above. Next, an example of a GUI output by the information processing system 100 when a marker placed on the projection surface by the user is registered as a trigger will be described.

FIGS. 172 to 179 are explanatory diagrams illustrating an example of a GUI which is output to the projection surface by the information processing system 100 according to an embodiment of the present disclosure. FIGS. 172 to 179 illustrate an example of a GUI when the user is allowed to set the provoking condition and an example of the GUI 3200 when the fact that the object is placed on the table surface is registered as a provoking condition.

When the user is allowed to set the provoking condition, the information processing system 100 according to the embodiment of the present disclosure first outputs the GUI 3200 for allowing the user to select a channel which is to be used as the provoking condition, as illustrated in FIG. 172. In the GUI 3200 illustrated in FIG. 172, a sound, a marker, an object on a desk surface (the surface of the table 140*a*) are shown as the channels. Of course, what is used as the channel is not limited to the related example.

Here, when the user selects the marker as the channel, the information processing system 100 subsequently outputs the GUI 3200 for allowing the user to select the trigger, as illustrated in FIG. 173. FIG. 173 illustrates mass recognition, disposition of an object, and flat surface recognition as triggers. Of course, what is used as the trigger is not limited to the related example.

Here, when the user selects the mass recognition as the trigger, the information processing system 100 subsequently outputs the GUI 3200 for allowing the user to designate an area in which the recognition is executed, as illustrated in FIG. 174. When the user designates the area in which the recognition is executed, the information processing system 100 subsequently outputs the GUI 3200 for allowing the user to designate the provoking condition of the function, as illustrated in FIG. 175. FIG. 175 illustrates the GUI 3200 for allowing the user to designate whether the function is provoked when an object is placed on the desk surface or the function is provoked when the object is removed from the desk surface.

FIG. 176 is an explanatory diagram illustrating an example of the GUI 3200 for allowing the user to designate the area in which the recognition is executed. The information processing system 100 can allow the user to set the area in which the object is recognized and which triggers the provoking of the function by outputting the GUI 3200 illustrated in FIG. 176. The area in which the object is recognized can be moved, expanded, reduced, rotated, and deformed through a manipulation by the user.

When the user sets the area in which the object is recognized and which triggers the provoking of the function, the information processing system 100 subsequently outputs the GUI 3200 for allowing the user to actually place the object in the area set by the user and recognizing the object, as illustrated in FIG. 177. When the user places any object in the area in which the object is recognized, the information processing system 100 recognizes the object placed in the area with the camera of the input unit 110. When the information processing system 100 recognizes the object placed in the area in which the object is recognized, the information processing system 100 outputs the GUI 3200 indicating that the object was recognized, as illustrated in FIG. 178.

When the information processing system 100 recognizes the object placed in the area in which the object is recognized, the information processing system 100 outputs the GUI 3200 indicating that the object placed on the desk surface by the user is registered as a trigger, as illustrated in FIG. 179.

FIGS. 180 to 184 are explanatory diagrams illustrating an example of a GUI which is output to the projection surface by the information processing system 100 according to an embodiment of the present disclosure. FIGS. 180 to 184 illustrate an example of a GUI when the user is allowed to set a function to be provoked and an example of the GUI 3200 when reproduction of a video is registered as the function to be provoked.

When the user is allowed to set the function to be provoked, the information processing system 100 according to the embodiment of the present disclosure first outputs the GUI 3200 for allowing the user to select a channel which is used as the function to be provoked, as illustrated in FIG. 180. The GUI 3200 illustrated in FIG. 180 shows 3 kinds of channels: pictures/videos, sound/music, and applications. Of course, what is used as a channel is not limited to the related example.

Here, when the user selects pictures/videos as the channel, the information processing system 100 subsequently outputs the GUI 3200 for allowing the user to select an action (function to be provoked), as illustrated in FIGS. 181 and 182.

FIG. 182 illustrates the GUI 3200 for allowing the user to select one of selection of an effect from an effect library, recording of the desk surface, and a picture drawn by a paint function using the desk surface, as the picture or video to be reproduced. What has been described may be combined to be used with the picture or video to be reproduced. For example, when a reproduction time is assumed to be 10 seconds, the information processing system 100 may allow the user to execute setting so that the effect is reproduced for 5 seconds and the picture drawn by the paint function is reproduced for 5 seconds.

When the user sets the action, the information processing system 100 subsequently outputs the GUI 3200 for allowing the user to confirm the action set by the user, as illustrated in FIG. 183. The user confirms the set action. When there is no problem, the user informs the information processing system 100 that that the user confirms the set action. When the user confirms the action that the user has set, the information processing system 100 outputs the GUI 3200 indicating that the registration of the action is completed, as illustrated in FIG. 184.

When the user registers the function to be provoked and the provoking condition, as described above, it is desirable to control visibility of the function to be provoked in accordance with the effect or implication of the function to be provoked. For example, a function set up as a surprise is preferably concealed so that others do not notice the function.

FIG. 185 is an explanatory diagram illustrating an example of the visibility of the function to be provoked by the information processing system 100. In FIG. 185, (1) illustrates a form in which an icon is placed for each function. In FIG. 185, (2) illustrates a form in which the registered functions are collectively disposed. In FIG. 185, (3) illustrates a form in which only an area in which the trigger is generated is displayed. In FIG. 185, (4) illustrates a form in which the function to be provoked is completely concealed.

As described above, the information processing system 100 can allow the user to register various provoking conditions of the functions. However, a case in which the user tries to assign the same condition to other functions is also considered. In that case, when the provoking condition that the user tries to register considerably resembles a previously registered condition, the information processing system 100 may reject the registration of the provoking condition.

For example, when the user registers a trigger for tapping a desk and the user registers the trigger because of the fact that a rhythm is slightly different but the number of taps is the same or when the user registers a trigger for placing an object on the desk and a reactive area and a previously registered area are superimposed, data may considerably resemble a registered condition and thus has high similarity. Additionally, for example, a case in which the user tries to assign recognition of objects with slightly different patterns, shapes, or hues to other functions is also considered. In this way, there are patterns in which the conditions have high similarity.

Accordingly, at a time point at which the similarity is proven to be sufficiently high, the information processing system 100 may display an indication reporting that the similarity is high or output a GUI prompting the user to register the provoking condition again or cancel the provoking condition.

FIG. 186 is an explanatory diagram illustrating an example of a GUI output by the information processing system 100 and illustrates an example of a GUI output when the provoking condition that the user tries to register considerably resembles a previously registered condition and the registration is rejected.

The information processing system 100 may generate a new trigger by combining a plurality of triggers registered by the user. FIG. 187 is an explanatory diagram illustrating an example of combination of the triggers. FIG. 187 illustrates a form in which a trigger "At 7 in the morning" and a trigger "When an arm of the user is swinging in a designated area" are combined.

FIG. 188 is an explanatory diagram illustrating an example of a GUI output by the information processing system 100 when the user is allowed to generate a new trigger by combining a plurality of triggers. The triggers are drawn in circles and the user executes a manipulation (for example, a drag and drop manipulation) of overlapping one of the triggers on the other. When the user executes the manipulation of overlapping one of triggers on the other, the information processing system 100 generates a new trigger by combining the two triggers.

An example of a GUI when the user registers the function to be provoked and the provoking condition, as described above, and the function set by the user to be provoked is bound up with the provoking condition will be described. FIG. 189 is an explanatory diagram illustrating an example of a GUI output by the information processing system 100 and illustrates an example of a GUI when the function set by the user to be provoked is bound up with the provoking condition.

In FIG. 189, the function (action) to be provoked and the provoking condition (trigger) are drawn in circles and the user executes a manipulation (for example, a drag and drop manipulation) of overlapping one of the trigger and the action on the other. When the user executes the manipulation of overlapping one of the trigger and the action on the other, the information processing system 100 maintains content of the binding of the trigger and the action.

The information processing system 100 according to the embodiment of the present disclosure allows the user to freely set the function to be provoked and the provoking condition, so that the user can set a program freely and simply in addition to a program by a vendor supplying an application. Accordingly, the provoking of the functions suitable for detailed circumstances on the table **140*a*** is realized.

Various objects are placed on the table **140*a* for the users and various interactions are executed daily. The information processing system 100** according to the embodiment allows the user to freely set the function to be provoked and the provoking condition, so that interactions executed every day can be used as chances to provoke the functions by the user. Thus, it is possible to adapt experiences to a daily life of the user.

Example 3

Herein, examples of a manipulation method and a mode of a window displayed by the information processing system 100 will be described.

An image, text, and other content can be displayed in the window displayed by the information processing system 100. Various kinds of content can be displayed in the window, and thus there may be cases in which not all of the content can be displayed in the region of the window. In such cases, the user browses the content by executing a manipulation of scrolling, moving, expanding or reducing the content, and the information processing system 100 has to distinguish the manipulation on the content from a manipulation on the window in which the content is displayed. This is because there may be cases in which, when the manipulation on the content is not correctly distinguished from the manipulation on the window, the manipulation on the window is executed rather than the content despite the fact that the user executes the manipulation on the content.

FIG. 190 is an explanatory diagram illustrating examples of a manipulation method and a mode of a window 3300 displayed by the information processing system 100. When an image, text, and other content are displayed in the window 3300 and the user merely executes a manipulation on the content, the information processing system 100 operates in a content manipulation mode for the window. When the user presses and holds a predetermined region in the window 3300, the information processing system 100 operates in a window manipulation mode for the window.

FIG. 191 is an explanatory diagram illustrating examples of a manipulation method and a mode of a window 3300 displayed by the information processing system 100. The information processing system 100 can allow the user to scroll, rotate, expand or reduce (scale) the content in the window 3300 in the content manipulation mode. On the other hand, the information processing system 100 can allow the user to move, rotate, or scale the window 3300 in the window manipulation mode.

When an operation is switched from the content manipulation mode to the window manipulation mode, the information processing system 100 may execute display (for example, changing the color of the entire window 3300) indicating that the window 3300 enters the window manipulation mode.

When an operation is switched from the content manipulation mode to the window manipulation mode by pressing and holding a predetermined region in the window 3300 in this way, there is the advantage that erroneous manipulations by the user decrease. However, it is necessary for the user to execute a manipulation of pressing and holding the predetermined region in the window 3300.

FIGS. 192 and 193 are explanatory diagrams illustrating examples of a manipulation method and a mode of the window 3300 displayed by the information processing system 100. The information processing system 100 provides, for example, an outside frame around the window 3300. As illustrated in FIG. 193, when the user manipulates content displayed in the window 3300, a process may be executed on the content. When the user manipulates the outside frame of the window 3300, an operation may be executed on the window 3300.

In the method of distinguishing the manipulation on the content from the manipulation on the window 3300 by providing the outside frame around the window 3300 in this way, the user is not forced to execute a press and hold manipulation. Therefore, there is the advantage that the manipulations can be distinguished by one manipulation. However, an erroneous manipulation may occur due to interference or the like of a manipulation area because the outside frame is provided.

Accordingly, in the following description, an example in which the user is not forced to execute a complex manipulation when the user is allowed to manipulate the window 3300 displayed by the information processing system 100 and a possibility of an erroneous manipulation occurring decreases will be described.

First, a movement concept of a window in which the content is scrolled and a window in which the content is not scrolled will be described. FIG. 194 is an explanatory diagram illustrating an example of a manipulation on the window and an explanatory diagram illustrating the movement concept of the window in which the content is scrolled and the window in which the content is not scrolled.

In FIG. 194, (1) illustrates a window in which the content is not scrolled and a manipulation other than a manipulation (for example, a tap manipulation or a scaling manipulation for the content) by the user on the content is referred to as a manipulation on the window.

In FIG. 194, (2) illustrates a window in which the content is scrolled. For example, a manipulation with one hand by the user is assumed to be a manipulation on the content and a manipulation with both hands is assumed to be a manipulation on the content. The outside frame is displayed around the window for a predetermined time at the time of the manipulation on the content, and a manipulation on the outside frame is assumed to be a manipulation on the content.

FIG. 195 is an explanatory diagram illustrating a manipulation by the user. FIG. 195 illustrates examples of a moving manipulation of the user moving the content or the window with one hand or two hands, a rotating manipulation of the user rotating the content or the window with one hand or two hands, and a scaling manipulation of the user scaling the content or the window with one hand or two hands.

FIG. 196 is a flowchart illustrating an example of an operation of the information processing system 100 according to an embodiment of the present disclosure. FIG. 196 illustrates an example of an operation of the information processing system 100 when a manipulation is executed on a window which is output by the information processing system 100 and in which content is displayed. Hereinafter, the example of the operation of the information processing system 100 according to the embodiment of the present disclosure will be described with reference to FIG. 196.

First, when the information processing system 100 detects a touch manipulation on the window by the user (step S3301), the information processing system 100 subsequently determines whether the manipulation is a moving manipulation (step S3302).

When the touch manipulation on the window by the user is the moving manipulation (Yes in step S3302), the information processing system 100 subsequently determines whether the touch manipulation on the window by the user is a manipulation in the window (step S3303).

When the touch manipulation on the window by the user is the manipulation in the window (Yes in step S3303), the information processing system 100 subsequently determines whether the user manipulation is a manipulation with two hands or the content displayed in the window is the content which is not scrolled (step S3304).

When the user manipulation is the manipulation with two hands or the content displayed in the window is the content which is not scrolled (Yes in step S3304), the information processing system 100 subsequently executes a process of moving a manipulation target window (step S3305). Conversely, when the user manipulation is a manipulation with one hand or the content displayed in the window is the content which is scrolled (No in step S3304), the information processing system 100 subsequently executes a process of scrolling the content displayed in the manipulation target window (step S3306).

When the touch manipulation on the window by the user is not the manipulation in the window (No in step S3303), the information processing system 100 subsequently executes a process of moving the manipulation target window (step S3305).

When it is determined in the foregoing step S3302 that the touch manipulation on the window by the user is not the moving manipulation (No in step S3302), the information processing system 100 subsequently determines whether the touch manipulation on the window by the user is a rotating manipulation (step S3307).

When the touch manipulation on the window by the user is the rotating manipulation (Yes in step S3307), the information processing system 100 subsequently determines whether the touch manipulation on the window by the user is a manipulation in the window (step S3308).

When the touch manipulation on the window by the user is the manipulation in the window (Yes in step S3308), the information processing system 100 subsequently determines whether the user manipulation is a manipulation with two hands or the content displayed in the window is the content which is not rotated in the window (step S3309).

When the user manipulation is the manipulation with two hands or the content displayed in the window is the content which is not rotated in the window (Yes in step S3309), the information processing system 100 subsequently executes a process of rotating the manipulating target window (step S3310). Conversely, when the user manipulation is the manipulation with one hand or the content displayed in the window is the content which is rotated (No in step S3309), the information processing system 100 subsequently executes a process of rotating the content displayed in the manipulating target window (step S3311).

When the touch manipulation on the window by the user is not the manipulation in the window (No in step S3308), the information processing system 100 subsequently executes a process of rotating the manipulation target window (step S3310).

When it is determined in the foregoing step S3307 that the touch manipulation on the window by the user is not the rotating manipulation (No in step S3307), the information processing system 100 subsequently determines whether the touch manipulation on the window by the user is a scaling manipulation (step S3307).

When the touch manipulation on the window by the user is the scaling manipulation (Yes in step S3312), the information processing system 100 subsequently determines whether the touch manipulation on the window by the user is a manipulation in the window (step S3313).

When the touch manipulation on the window by the user is the manipulation in the window (Yes in step S3313), the information processing system 100 subsequently determines whether the user manipulation is a manipulation with two hands or the content displayed in the window is the content which is not scaled in the window (step S3314).

When the user manipulation is the manipulation with two hands or the content displayed in the window is the content which is not scaled in the window (Yes in step S3314), the information processing system 100 subsequently executes a process of scaling the manipulating target window (step S3315). Conversely, when the user manipulation is the manipulation with one hand or the content displayed in the window is the content which is scaled (No in step S3315), the information processing system 100 subsequently executes a process of scaling the content displayed in the manipulating target window (step S3316).

When the touch manipulation on the window by the user is not the manipulation in the window (No in step S3313), the information processing system 100 subsequently executes a process of scaling the manipulation target window (step S3315).

When it is determined in the foregoing step S3312 that the touch manipulation on the window by the user is not the scaling manipulation (No in step S3312), the information processing system 100 subsequently executes handling according to the application which is being executed in response to the user manipulation (step S3317). For example, as an example of a case in which a touch manipulation on the window by the user is not moving, rotating, or scaling, for example, there is a tap manipulation by the user. When the tap manipulation is executed by the user, the information processing system 100 may execute a process (for example, displaying an image, reproducing a video, or activating another application) on content which is a tap manipulation target.

The moving manipulation, the rotating manipulation, and the scaling manipulation by the user can be executed simultaneously. In this case, for example, the information processing system 100 may determine which manipulation is the closest to a manipulation executed by the user among the moving manipulation, the rotating manipulation, and the scaling manipulation.

The example of the operation of the information processing system 100 according to the embodiment of the present disclosure has been described with reference to FIG. 196. Next, the example of the operation of the information processing system 100 according to the embodiment of the present disclosure will be described in more detail giving specific examples of the manipulations executed on the window by the user.

FIG. 197 is an explanatory diagram illustrating an example of a manipulation on a window by the user and an example of a manipulation when content which is not scrolled is displayed in the window. When the content which is not scrolled is displayed in the window 3300 and the user executes a moving manipulation, the information processing system 100 executes display control such that the entire window 3300 is moved.

FIG. 198 is an explanatory diagram illustrating an example of a manipulation on a window by the user and an example of a manipulation when content which is not scrolled is displayed in the window. When the content which is not scrolled is displayed in the window 3300 and the user executes a rotating manipulation as in (1) or (2) of FIG. 198, the information processing system 100 executes display control such that the entire window 3300 is rotated. When the content which is not scrolled is displayed in the window 3300 and the user executes a scaling manipulation as in (3) or (4) of FIG. 198, the information processing system 100 executes display control such that the entire window 3300 is scaled.

FIG. 199 is an explanatory diagram illustrating an example of a manipulation on the window by the user and an example of a manipulation when the content which is scrolled is displayed in the window. When the content which is scrolled is displayed in the window 3300 and the user executes a rotating manipulation on the outside frame of the window 3300 as in (1) or (2) of FIG. 199, the information processing system 100 executes display control such that the entire window 3300 is rotated. When the content which is scrolled is displayed in the window 3300 and the user executes a scaling manipulation as in (3) of FIG. 199, the information processing system 100 executes display control such that the entire window 3300 is scaled.

The information processing system 100 may distinguish display control on a window from display control on content even for the same rotating or scaling by detecting whether two fingers are fingers of the same hand or different hands.

FIG. 200 is an explanatory diagram illustrating an example of a manipulation on the window by the user and an example of a manipulation when the content which is scrolled is displayed in the window. When the content which is scrolled is displayed in the window 3300 and the user executes a rotating manipulation with one hand, as illustrated in (1) of FIG. 200, the information processing system 100 executes display control such that the content is rotated. On the other hand, when the user executes a rotating manipulation with two hands, as illustrated in (2) of FIG. 200, the information processing system 100 executes display control such that the entire window 3300 is rotated.

Similarly, when the user executes a scaling manipulation with one hand, as illustrated in (1) of FIG. 200, the information processing system 100 executes display control such that the content is scaled. On the other hand, when the user executes a scaling manipulation with two hands, as illustrated in (4) of FIG. 200, the information processing system 100 executes display control such that the entire window 3300 is scaled.

When the content that is not scrolled is displayed in the window, the content is scrolled in the window by rotating or scaling the content in some cases. As an application capable of displaying such a window, for example, there is an application drawing an illustration or an application displaying a map.

In such a window, the information processing system 100 may allow the rotated or scaled window to transition to a process for a window in which the content is scrolled.

FIG. 201 is an explanatory diagram illustrating an example of a manipulation on the window by the user. In FIG. 201, (1) illustrates an example of a manipulation when the content which is not scrolled is displayed in the window and a form in which an expanding manipulation is executed on the content by the user. When the content which is not scrolled is displayed in the window and an expanding manipulation is executed on the content by the user, a scroll margin is generated, as illustrated in (2) of FIG. 201. Accordingly, when the content that is not scrolled is displayed in the window and an expanding manipulation is executed on the content by the user, the information processing system 100 executes display control such that the window becomes a window in which the content which is scrolled is displayed.

When the content which is not scrolled is displayed in the window and a rotating manipulation is executed on the content by the user, a scroll margin is generated, as illustrated in (3) of FIG. 201. Accordingly, when the content which is not scrolled is displayed in the window and a rotating manipulation is executed on the content by the user, the information processing system 100 executes display control such that the window becomes a window in which the content which is scrolled is displayed.

A modification example of the rotating manipulation on the window will be described. FIG. 202 is an explanatory diagram illustrating an example of a manipulation on the window by the user. In FIG. 202, (1) illustrates a display control example of the window by the information processing system 100 when the user touches a predetermined position of the window and executes a direct moving manipulation. In this case, the information processing system 100 may execute display control such that the touch position on the window is constant and the window is moved so that the window is rotated until an outer product of a direction in which the user drags the window and a direction of a touch position of the user from the center of the window becomes 0.

A case in which the user rotates the window 180 degrees when the information processing system 100 executes such display control will be described. As illustrated in (2) of FIG. 202, the user can rotate the window 180 degrees by first dragging the right side (or the left side) of the window to the lower right (or lower left) and rotating the window a predetermined amount, dragging the upper side of the rotated window to the upper right (or upper left) and rotating the window a predetermined amount, and dragging the right side (or the left side) of the window to the lower right (or lower left) again and rotating the window a predetermined amount.

Next, a display control example according to a user manipulation on the window in which the content which is scrolled is displayed will be described. FIG. 203 is an explanatory diagram illustrating an example of a manipulation on the window by the user. In FIG. 203, (1) illustrates a state in which the content which is scrolled is displayed in the window 3300.

When the user executes a manipulation inside the window in this state, the information processing system 100 allows the manipulation to operate on the content displayed in the window, as illustrated in (2) of FIG. 203. For example, when the user executes a drag manipulation, the information processing system 100 executes display control such that the content is scrolled inside the window 3300. When the user executes a pinch manipulation, the information processing system 100 executes display control such that the content is scaled inside the window 3300. When the user executes a rotating manipulation, the information processing system 100 executes display control such that the content is rotated inside the window 3300.

On the other hand, when the user executes a manipulation on the edge of the window, the information processing system 100 displays a window handle for manipulating the window 3300 around the window 3300, as illustrated in (3) of FIG. 203. When a moving manipulation on the window handle by the user is detected, the information processing system 100 executes display control such that the window 3300 is moved according to the moving manipulation by the user.

FIG. 204 is an explanatory diagram illustrating an example of a manipulation on the window by the user and an example of a manipulation when the content which is scrolled is displayed in the window. In FIG. 204, (1) illustrates a display control example by the information processing system 100 when the content which is scrolled is displayed in the window and the user executes a rotating manipulation on the content. That is, when the user executes a rotating manipulation with one hand, the information processing system 100 executes display control such that the content in the window is rotated according to the rotating manipulation by the user.

In FIG. 204, (2) illustrates a display control example by the information processing system 100 when the content which is scrolled is displayed in the window and the user executes a rotating manipulation on the window. That is, when the user executes a rotating manipulation with both hands, the information processing system 100 executes display control such that the entire window is rotated according to the rotating manipulation by the user.

In FIG. 204, (3) illustrates a display control example by the information processing system 100 when the content which is scrolled is displayed in the window and the user executes a scaling manipulation on the content. That is, when the user executes a scaling manipulation with one hand, the information processing system 100 executes display control such that the content in the window is scaled according to the rotating manipulation by the user.

In FIG. 204, (4) illustrates a display control example by the information processing system 100 when the content which is scrolled is displayed in the window and the user executes a scaling manipulation on the window. That is, when the user executes a scaling manipulation with both hands, the information processing system 100 executes display control such that the entire window is scaled according to the scaling manipulation by the user.

Next, a display control example in which the window is rotated according to a user manipulation will be described. FIG. 205 is an explanatory diagram illustrating an example of a manipulation on the window by the user. When the user touches the window and executes a moving manipulation of dragging the window, the information processing system 100 may execute display control such that the window is moved after the window is rotated in a direction in which the window is dragged by the user. The rotation direction of the window may be an incident direction of a finger or may be a movement direction of the window.

The information processing system 100 may execute display control such that an outside frame is provided around the window and the window is moved while the window is rotated according to a moving manipulation on the outside frame. FIG. 206 is an explanatory diagram illustrating an example of a manipulation on the window by the user. When the user touches the outside frame of the window and executes a moving manipulation of dragging the window, the information processing system 100 may execute display control such that the window is moved after the window is rotated in a direction in which the window is dragged by the user.

The information processing system 100 may execute display control such that the window is moved while the window is rotated by a special gesture by the user. For example, the information processing system 100 may execute display control on the window by assuming that a manipulation other than a tap manipulation on the content is a manipulation on the window.

The information processing system 100 may execute display control on the window by assuming that a manipulation on the window in which the content is scrolled with one hand, as described above, is a manipulation on the content and assuming that a manipulation on the window with both hands is a manipulation on the window, or may execute display control on the window by displaying an outside frame around the window only for a predetermined time at the time of a manipulation and assuming that a manipulation on the outside frame is a manipulation on the window.

Next, an example of a process when there is a window outside a screen will be described. FIG. 207 is an explanatory diagram illustrating an example of a manipulation on the window by the user. For example, when the user executes a moving manipulation on the window 3300 to execute a moving manipulation of moving the window 3300 outside the screen (display region) as in (1) of FIG. 207, the information processing system 100 may execute display control such that the window 3300 is returned inside the screen (display region) by a reaction according to an amount by which the window 3300 is protruded outside the screen (display region), as in (2) of FIG. 207.

FIG. 208 is an explanatory diagram illustrating an example of a manipulation on the window by the user. When the user executes a moving manipulation of moving the window 3300 outside the screen (display region) by a force stronger than the above-described reaction and the user removes his or her finger from the window 3300 after moving the window 3300 outside the screen (display region) by a predetermined amount or more, the information processing system 100 may execute display control such that the window 3300 is closed or the window 3300 is minimized, as in FIG. 208.

When the user removes his or her finger from the window 3300 after executing a moving manipulation of moving the finger holding the window 3300 to a predetermined region of the screen (display region) by a force stronger than the above-described reaction, the information processing system 100 may execute display control such that the window 3300 is closed or the window 3300 is minimized, as in FIG. 208.

FIG. 209 is an explanatory diagram illustrating an example of a manipulation on the window by the user. The information processing system 100 may execute display control such that the window 3300 minimized according to the above-described manipulation by the user is returned to the original size through a user manipulation of moving the window 3300 inside the screen.

The information processing system 100 may execute display control using the law of inertia at the time of display control of the window. FIG. 210 is an explanatory diagram illustrating an example of a manipulation on the window by the user. When the user executes a manipulation of flinging the window 3300 by applying a force with his or her finger on the window 3300, the information processing system 100 may detect the user manipulation and execute display control such that the window 3300 is moved. When the window 3300 is flung by the user to be protruded outside the screen and the protrusion amount is equal to or less than a predetermined value, the information processing system 100 may execute display control such that the window 3300 is returned inside the screen by the reaction. When the protrusion amount exceeds a predetermined value, the information processing system 100 may execute display control such that the window 3300 is minimized or erased.

FIG. 211 is an explanatory diagram illustrating an example of a manipulation on the window by the user. When the user executes a manipulation of flinging the window 3300 outside the screen by applying a force with his or her finger on the window 3300, the information processing system 100 may execute display control such that the window 3300 is rotated along a side of the screen according to a user manipulation.

Next, a display control example when windows interfere with each other will be described. FIG. 212 is an explanatory diagram illustrating an example of a manipulation on windows by the user and illustrating an example when a plurality of windows interfere with one another (overlap).

When a region in which two windows overlap is equal to or less than a predetermined amount or a ratio of the region is a predetermined amount, the information processing system 100 may execute display control such that the windows merely overlap without executing special control, as illustrated in (1) of FIG. 212. Conversely, when the region in which two windows overlap exceeds the predetermined amount, as illustrated in (2) of FIG. 212 or the ratio of the region exceeds the predetermined amount, the information processing system 100 may execute special display control.

For example, as illustrated in (3) and (4) of FIG. 212, the information processing system 100 may execute display control such that repulsive forces are generated at the centers of the windows and the windows automatically move in an animated manner based on the repulsive forces.

FIG. 213 is an explanatory diagram illustrating an example of a manipulation on windows by the user and illustrating an example when a plurality of windows interfere with one another (overlap). When the user moves a window to overlap another window, the information processing system 100 may execute display control such that the other window moves out of the way in an animated manner in real time, as illustrated in (1) of FIG. 213, or may execute display control such that the other window moves out of the way in an animated manner at a time point at which the user removes his or her finger, as illustrated in (2) and (3) of FIG. 213.

FIG. 214 is an explanatory diagram illustrating an example of a manipulation on windows by the user and illustrating an example when a plurality of windows interfere with one another (overlap). When the user moves a window to overlap another window, the information processing system 100 may execute display control such that tabs are displayed, as illustrated in FIG. 214, and windows to be displayed in front are switched according to manipulations on the tabs.

When the user moves a window to overlap another window, the information processing system 100 executes display control such that the other window moves out of the way in an animated manner in real time, and the other window moves to an end of the screen (display region), and the information processing system 100 may execute display control such that the size of the other window is decreased.

FIG. 215 is an explanatory diagram illustrating an example of a manipulation on windows by the user and illustrating an example when a plurality of windows interfere with one another (overlap). When the window moving out of the way for the window manipulated to be moved by the user moves to the end of the screen (display region), as illustrated in FIG. 215, the information processing system 100 may execute display control such that the size of the other window is decreased. When the window is further driven by the window manipulated to be moved by the user, the information processing system 100 may execute display control such that the other window is minimized or erased.

When the other window moving out of the way for the window manipulated to be moved by the user is moved to the end of the screen (display region) in this way, the information processing system 100 may execute display control such that the other window is minimized or erased at a time point at which the user removes his or her finger. When the other window that is moving is moved to the end of the screen (display region) in this way, the information processing system 100 may execute display control such that the other window is rotated.

FIG. 216 is an explanatory diagram illustrating an example of a manipulation on the window by the user. When the user manipulates windows, the information processing system 100 may execute display control such that the windows are automatically rotated along sides of a screen (display region), as illustrated in FIG. 216.

When the position of the user can be detected by the information processing system 100, the information processing system 100 may control motions of windows according to the position of the user. FIG. 217 is an explanatory diagram illustrating an example of a manipulation on the window by the user. When the user approaches a screen (display region), as illustrated in FIG. 217, the information processing system 100 may detect the position of the user and execute display control such that the windows are automatically rotated to face the user from the user's viewpoint. When the information processing system 100 executes the display control in this way, the information processing system 100 may execute display control such that the windows do not face new users even when second and later users approach the screen (display region).

FIG. 218 is an explanatory diagram illustrating an example of a manipulation on the window by the user. When the user approaches a screen (display region), the information processing system 100 may detect the position of the user and execute display control such that a window is automatically rotated to face the user from the user's viewpoint and approaches the user, as illustrated in FIG. 218.

At this time, the information processing system 100 may execute display control such that only a window bound up with the user approaching the screen (display region) is automatically rotated to face the user from the user's viewpoint and approaches the user. The information processing system 100 may determine whether the window and the user are bound up together, for example, by determining whether the user and the window are originally set to be bound up together or determining whether the user is the last user to have touched the window.

When the position of the user can be detected by the information processing system 100, the information processing system 100 may control granularity of content to be displayed in a window according to the position of the user. FIG. 219 is an explanatory diagram illustrating an example of a manipulation on the window by the user. When the user approaches the screen (display region), the information processing system 100 may detect the position of the user and control the granularity of the content to be displayed in the window according to the position of the user, as illustrated in FIG. 219.

The information processing system 100 may control, for example, an image size or font sizes of letters as the granularity of the content displayed in the window. That is, the information processing system 100 may decrease the image size or the font size in a window close to the user and may increase the image size or the font size in a window far from the user.

Next, a display control example when a window interferes with a real object placed on the projection surface will be described. FIG. 220 is an explanatory diagram illustrating a display control example when a window interferes with a real object placed on the projection surface. When the window 3300 interferes with a real object 3310 placed on the projection surface, as illustrated in (1) of FIG. 220, the information processing system 100 may execute display control such that the position of the window 3300 is automatically moved to a position at which the window 3300 does not interfere with the object 3310, as illustrated in (2) of FIG. 220.

When the information processing system 100 executes the display control such that the position of the window 3300 is automatically moved to the position at which the window 3300 does not interfere with the object 3310, as illustrated in (3) and (4) of FIG. 220, the information processing system 100 may execute display control such that the position of the window 3300 is moved so that repulsive forces are generated between the central position of the window 3300 and the central position of the object 3310.

Example 4

Here, linking between the information processing system 100 and another device and an example of a GUI output by the information processing system 100 at the time of the linking will be described.

As described above, for example, when a form in which the information processing system 100 according to the embodiment of the present disclosure projects information to a table and causes a user to manipulate the information is adopted, as illustrated in FIG. 1, the information processing system 100 can be linked to a portable terminal such as a smartphone on the table. For example, when a user places a portable terminal such as a smartphone on a table and causes the input unit 110 to recognize the portable terminal, the information processing system 100 according to the embodiment of the present disclosure can identify the portable terminal to be linked to the identified portable terminal.

However, when a plurality of users own substantially portable terminals that are substantially the same, place the portable terminals on a table simultaneously and individually, and cause the information processing system 100 to recognize the portable terminals, the information processing system 100 may not be able to determine which portable terminal it is better to link to the information processing system 100.

When the linking with the device is executed without using object recognition, information regarding a positional relation between the information processing system 100 and the device to be linked is unusable. Accordingly, when the linking with the device is executed without using object recognition, the device is handled similarly regardless of the location at which the linking with the information processing system 100 starts. For example, when a plurality of users can simultaneously use information omnidirectionally and shared information is all displayed in the same direction or at the same position, the direction of the information is opposite to the direction of the users in some cases. Thus, it may be difficult for the users to handle the information.

FIG. 221 is an explanatory diagram illustrating a display example of information and an explanatory diagram illustrating an example when a plurality of users can simultaneously use information omnidirectionally and shared information is all displayed in the same direction or at the same position. When the shared information 1, 2, and 3 is all output in the same direction, as illustrated in FIG. 221, the directions of the information are opposite to the directions of the user in some cases.

Accordingly, the information processing system 100 capable of easily specifying the linked portable terminals even when the plurality of users own substantially the same portable terminals as described above and the same portable terminals are simultaneously and individually placed on the table has been described. The information processing system 100 capable of displaying content shared at the position or in the direction at or in which each of the users executing manipulations can easily use the content omnidirectionally has been described.

In the information processing system 100 according to the embodiment of the present disclosure, a portable terminal such as a smartphone placed on a table can be linked by executing, for example, the operation illustrated in FIG. 32 or 33. For example, when a user places a portable terminal such as a smartphone on a table and causes the input unit 110 to recognize the portable terminal, the information processing system 100 according to the embodiment of the present disclosure can identify the portable terminal to be linked to the identified portable terminal.

In the information processing system 100 according to the embodiment of the present disclosure, a connection mark can be displayed on the screen by executing, for example, the operation illustrated in FIG. 32 or 33, and the content shared at the position or the direction at or in which each user executing a manipulation can easily use the content omnidirectionally can be displayed by allowing the user to extract the connection mark.

Hereinafter, an example of a GUI output by the information processing system 100 when the information processing system 100 is linked to a portable terminal such as a smartphone will be described.

FIG. 222 is an explanatory diagram illustrating an example of a GUI 3400 output by the information processing system 100. For example, when the mode proceeds to the recognition mode in the process of step S1111 in FIG. 32, as illustrated in (1) of FIG. 222, the information processing system 100 may output the GUI 3400 in which ripples appear from four corners of a screen (display area). The GUI 3400 illustrated in (1) of FIG. 222 indicates the entire screen (the display region) is a recognition target region.

When the mode proceeds to the recognition mode, as illustrated in (2) of FIG. 222, the information processing system 100 may output the GUI 3400 in which ripples appear in a part of the screen (display region). The GUI 3400 illustrated in (2) of FIG. 222 indicates that the region in which the ripples appear on the screen (display region) is a recognition target region.

When the mode proceeds to the recognition mode, as illustrated in (3) of FIG. 222, the information processing system 100 may output the GUI 3400 in which a video showing a hand holding a terminal and putting the terminal down is output or a schematic illustration animation is reproduced. The GUI 3400 illustrated in (3) of FIG. 222 is a GUI for suggesting to the user which operation has to be executed to recognize the device.

FIG. 223 is an explanatory diagram illustrating an example of a GUI 3400 output by the information processing system 100. For example, when the mode proceeds to the recognition mode in the process of step S1111 in FIG. 32, the information processing system 100 may output predetermined text, as illustrated in FIG. 223, in addition to the GUI illustrated in FIG. 222. When the recognition of the object is successful, the information processing system 100 may output a GUI (for example, the GUI in which ripples are displayed around the recognized object, as illustrated in FIG. 34) indicating that the object has been recognized.

When the object is removed after the recognition of the object, the information processing system 100 displays a GUI for indicating connection with the object. FIG. 36 illustrates an example of a state in which the information processing system 100 displays the connection mark on the display surface. Another display example will be described. FIG. 224 is an explanatory diagram illustrating an example of the GUI 3400 output by the information processing system 100.

In FIG. 224, (1) illustrates an example of the GUI 3400 in which the same image as a marker for recognition is displayed in the same location in which the object is placed after the recognized object is taken away. In FIG. 224, (2) illustrates an example of the GUI 3400 in which a marker for recognition is iconized in the same location as the location in which the object is placed after the recognized object is taken away. In FIG. 224, (2) illustrates an example of the GUI 3400 in which a different image from the marker for recognition is displayed in the same location as the location in which the object is placed after the recognized object is taken away.

When the object is taken away after the recognition of the object, the information processing system 100 displays a GUI for allowing the user to execute a process linked to the object. FIG. 37 illustrates the example of the GUI in which the content stored by the device linked with the information processing system 100 is displayed. Another display example will be described. FIGS. 225 and 226 are explanatory diagrams illustrating examples of the GUI 3400 output by the information processing system 100 after another device is linked.

In FIG. 225, (1) illustrates an example of the GUI 3400 in which icons are displayed around the same image as the marker for recognition. In FIG. 225, (2) illustrates an example of the GUI 3400 in which thumbnails of content stored by the device linked to the information processing system 100 are displayed around the same image as the marker for recognition. In FIG. 225, (3) illustrates an example of the GUI 3400 in which any window is displayed in the same image as the marker for recognition.

In FIG. 226, (1) illustrates an example of the GUI 3400 in which a message prompting the user to select content to be shared in the linked device is displayed adjacent to the same image as the marker for recognition. In FIG. 226, (2) illustrates an example of the GUI 3400 in which the iconized marker for recognition and thumbnails of content stored by the linked device are combined and displayed.

Of course, it is needless to say that the information processing system 100 can output various GUIs in addition to the GUI 3400 illustrated in FIGS. 225 and 226.

Next, an example of a GUI for improving operability or visibility of content stored by a linked device will be described. FIG. 227 is an explanatory diagram illustrating an example of the GUI 3400 output by the information processing system 100 after another device is linked.

For example, when a book, a magazine, a dish, or another object has already been placed on a table, the information processing system 100 may recognize the placed object and output its icon, its thumbnail, or the like, avoiding the object. In FIG. 227, (1) illustrates an example of the GUI 3400 in which the icon, the thumbnail, or the like maintained by the linked device is output avoiding the object placed on the table.

When the information processing system 100 outputs a GUI for manipulating content owned by another device after the other device is linked, the information processing system 100 may change the GUI in which an icon, a thumbnail, or the like maintained by the linked device is output according to a location in which the device is placed. In FIG. 227, (2) illustrates a change example of the GUI 3400 in which the icon, the thumbnail, or the like maintained by the linked device is output according to the location in which the device is placed.

For example, the information processing system 100 normally displays any window displaying the content on the right side of the same image as the marker for recognition. When the device is placed at the right end of the display region, any window displaying the content is displayed on the left side of the same image as the marker for recognition. The information processing system 100 changes the GUI according to the location in which the device is placed in this way, and thus it is possible to improve operability for the user.

Next, an example of a GUI regarding an end timing of object recognition will be described. FIG. 228 is an explanatory diagram illustrating an example of the GUI 3400 output by the information processing system 100 after recognition of another device.

The information processing system 100 recognizing the object placed on a table or the like may output a GUI such as a window immediately after the recognition. In FIG. 228, (1) illustrates an example of the GUI 3400 in which the information processing system 100 recognizing the object placed on the table or the like outputs a window immediately after the recognition. When the information processing system 100 outputs the window immediately after the recognition, as in (1) of FIG. 228, and the user moves the position of the object, the information processing system 100 may track the movement and change the position of the output window.

The information processing system 100 recognizing the object placed on the table or the like may continue the recognition process while the object is placed on the table. In FIG. 228, (2) illustrates an example of the GUI 3400 when the information processing system 100 recognizing the object placed on the table continues the recognition process while the object is placed on the table. The information processing system 100 may continue the recognition process while the object is placed on the table, may stop the recognition process when the object is taken away from the table, and may output the window or the like according to the recognized object.

When the content taken from the device to be shared is manipulated, it is not necessary to execute the process of recognizing the object. Therefore, to reduce a calculation cost of the process of recognizing the object, the information processing system 100 may stop the recognition process when the object is taken away from the table.

The information processing system 100 recognizing the object placed on the table or the like may stop the recognition process at a time point at which the object is recognized and may output the window or the like according to the recognized object. In FIG. 228, (3) illustrates an example of the GUI 3400 when the information processing system 100 recognizing the object placed on the table or the like stops the recognition process at the time point at which the body is recognized and outputs the window or the like according to the recognized object.

The information processing system 100 recognizing the object placed on the table or the like can considerably reduce the calculation cost of the process of recognizing the object by stopping the recognition process at the time point at which the body is recognized Next, an example of a GUI for releasing the connection with the linked device will be described. FIG. 229 is an explanatory diagram illustrating an example of the GUI 3400 output by the information processing system 100 in order to release the connection with the linked device after another device is recognized.

In FIG. 229, (1) illustrates an example of the GUI 3400 in which a button for releasing the connection with the linked device is displayed to overlap the same image (connection mark) as the marker for recognition or is displayed near the connection mark so that the user can release the connection with the linked device. The user can cause the information processing system 100 to release the connection between the information processing system 100 and the device by touching the button for releasing the connection.

In FIG. 229, (2) illustrates an example of the GUI 3400 in which the user is allowed to move the same image (connection mark) as the marker for recognition outside the screen (display region) so that the user can release the connection with the linked device. The user can cause the information processing system 100 to release the connection between the information processing system 100 and the device by moving the connection mark outside the screen.

In FIG. 229, (3) illustrates an example of the GUI 3400 when the connection is released from the linked device so that the user can release the connection with the linked device. The user can cause the information processing system 100 to release the connection between the information processing system 100 and the device by executing a predetermined manipulation of releasing the connection from the linked device.

When the connection between the information processing system 100 and the device is released, the information processing system 100 erases the displayed connection mark in any GUI 3400 illustrated in FIG. 229. The information processing system 100 can indicate to the user that the connection between the information processing system 100 and the device is released in a way that is easy for the user to understand by erasing the displayed connection mark.

Of course, the GUIs output by the information processing system 100 when the information processing system 100 and the portable terminal are linked are not limited to the above-described GUIs.

Example 5

The present example is an embodiment of the above-described specific example 2. More specifically, particularly, a sound is focused on in the present example and display for optimizing a sound input and output for the user is executed.

Hereinafter, the projection type information processing system 100*a* will be assumed in the description. However, any type of information processing system described with reference to FIGS. 1 to 4 can realize a UI according to the example to be described below. The present example will be described with reference to FIGS. 230 to 265.

(Overview)

FIGS. 230 and 231 are explanatory diagrams illustrating an overview of a user interface according to the present example. As illustrated in FIG. 230, a plurality of application windows 4101 (display objects) and a microphone icon 4102 are displayed on the table 140*a* (display surface). The application windows 4101 are windows of applications. The microphone icon 4102 is display indicating that a sound input is received by the information processing system 100. Display in which information regarding the sound input received by the information processing system 100 is reflected is realized in or near the microphone icon 4102. In the example illustrated in FIG. 230, a display device 4103 producing a sound and people 4104 conversing are near the information processing system 100. For this reason, a sound "ABC" produced by a user 4105 is buried in ambient noise, and thus is not recognized by the information processing system 100. Accordingly, the information processing system 100 executes display such as "Sound is not recognized" from the microphone icon 4102.

Accordingly, as illustrated in FIG. 231, the information processing system 100 executes beamforming so that the microphone can have directivity. Specifically, the information processing system 100 improves precision of sound recognition by executing sound processing on the sound input to a microphone array to extract the sound in an emphasis manner in a user direction. Here, when the microphone is provided immediately above or near the microphone icon 4102, reference numeral 4106 denotes a range of the directivity formed when the microphone executes the beamforming. That is, when the user 4105 speaks within the range denoted by reference numeral 4106, the information processing system 100 can execute sound recognition with high precision. In the example illustrated in FIG. 231, the information processing system 100 recognizes the sound "ABC" uttered by the user 4105 within the range denoted by reference numeral 4106 and executes display "ABC" in the microphone icon 4102. The range denoted by reference numeral 4106 is also referred to as a beamforming range below.

The microphone icon 4102 may be displayed immediately below or near the microphone or may be displayed in the middle, the vicinity or any position of the screen or the table 140*a*. Hereinafter, an example in which various kinds of display of the beamforming range, volume, and the like are executed using the microphone icon 4102 as a center point will be described, but the present example is not limited to this example. For example, display other than the microphone icon 4102 may be the center point or an object indicating the center point may not be displayed. For example, various kinds of display may be executed using any position on the table 140*a* as the center point or various kinds of display may be executed using a position immediately below or near the microphone as the center point.

Further, the information processing system 100 according to the present example displays information indicating the beamforming range. Accordingly, the user can know that the beamforming related to the sound input is executed. For example, when the user is located in the beamforming range, the user can know that there is no need to shout for the sound not to be buried in ambient noise. Accordingly, the psychological burden on the user is reduced. Further, since the user does not shout, the physical burden is reduced. When the user is not located in the beamforming range, the user can know why the sound uttered by the user is not recognized. Thus, the psychological burden on the user is reduced. Further, the user can move inside the beamforming range. In this case, the precision of the sound recognition by the information processing system 100 is improved.

The sound input has been described in detail in this section, but the similar application may also be achieved in any other output such as a sound output. For example, in the information processing system 100, a speaker may execute the beamforming to display information indicating a sound output range. In this case, the user can know that the beamforming related to the sound output is executed, and thus can adjust volume appropriately and move to the beamforming range. The similar application may be achieved in any input other than the sound input.

The overview of the information processing system 100 according to the present example has been described above. Next, a specific configuration of the information processing system 100 according to the present example will be described.

Example of Configuration (1) Input Unit 110

The input unit 110 according to the present example has a function as a sound input unit. For example, the function of the input unit 110 as the sound input unit is realized by a mic (microphone). In particular, in the present example, a mic array in which a plurality of mics are combined is realized as a mic capable of executing the beamforming. The input unit 110 may include a mic amplifier circuit or an A-to-D converter that executes an amplification process on a sound signal obtained by the microphone or a signal processing circuit that executes a process, such as noise removal or sound source separation, on sound data. The input unit 110 outputs the processed sound data to the control unit 120.

(2) Detection Unit 121

The detection unit 121 according to the present example has a function as an input control unit controlling directivity of the mic which functions as the sound input unit. For example, as described above with reference to FIGS. 77 and 78, the detection unit 121 controls the directivity using the mic array in which a plurality of mics are combined.

The detection unit 121 has a user position estimation function of estimating the position of the user executing a sound input. The detection unit 121 can estimate the position of the user by various kinds of means. Hereinafter, examples of the user position estimation function will be described with reference to FIGS. 232 to 237.

FIG. 232 is an explanatory diagram illustrating an example of the user position estimation function according to the present example. As illustrated in FIG. 232, the input unit 110 executes imaging setting an imaging region 4107 broader than the table 140*a* as a monitoring target. A sound input start object 4108 for giving an instruction to start sound input is displayed on the table 140*a*. First, the detection unit 121 specifies the user 4105 touching the sound input start object 4108 based on a captured image of the imaging region 4107. Then, the detection unit 121 estimates a position 4109 of the specified user.

FIG. 233 is an explanatory diagram illustrating an example of the user position estimation function according to the present example. As illustrated in the left drawing of FIG. 233, the input unit 110 sets a region including a portion from a finger tip to the elbow of the arm of the user touching the sound input start object 4108 as the imaging region 4107. First, the detection unit 121 detects a direction 4110 of the finger or the arm touching the object from the captured image of the imaging region 4107 at a time point at which the touch on the sound input start object 4108 is detected. As illustrated in the right drawing of FIG. 233, the detection unit 121 estimates the user position 4109 as a position which is located on an extension line of the direction 4110 of the finger or the arm touching the object and is a predetermined distance 4111 away. The process can be used, for example, when the imaging region 4107 is restricted on the table 140*a*.

FIG. 234 is an explanatory diagram illustrating an example of the user position estimation function according to the present example. As illustrated in the left drawing of FIG. 234, the input unit 110 sets a region which is a region including the arm of the user touching the sound input start object 4108 and is on the table 140*a* as the imaging region 4107. First, the detection unit 121 detects the shape of the arm touching the object from the captured image of the imaging region 4107 at a time point at which the touch on the sound input start object 4108 is detected. Then, the detection unit 121 estimates the position of the face by collating the detected shape of the arm with a model 4112 indicating a relation between the direction of an arm and the position of a face. In this way, as illustrated in the right drawing of FIG. 234, the detection unit 121 estimates the position of the face of the user as the user position 4109. The process can be used, for example, when the imaging region 4107 is restricted on the table 140*a*.

FIG. 235 is an explanatory diagram illustrating an example of the user position estimation function according to the present example. As illustrated in the left drawing of FIG. 235, the detection unit 121 detects touch on the sound input start object 4108 and detects a direction 4113 from the mic icon 4102 to a touch point. Then, as illustrated in the right drawing of FIG. 235, the detection unit 121 estimates that the user is located on an extension line of the direction 4113 from the mic icon 4102 to the touch point. This process can be used, for example, when the imaging region 4107 is not present or the user is not detected in the imaging region 4107.

As described above, the detection unit 121 estimates the user position using the touch on the sound input start object 4108 as an opportunity, but this function is not limited to the example. Hereinafter, another example of the user position estimation function will be described with reference to FIGS. 236 to 237.

FIG. 236 is an explanatory diagram illustrating an example of the user position estimation function according to the present example. As illustrated in FIG. 236, the detection unit 121 detects a gesture of the user giving an instruction to start sound input. As the gesture, for example, circling or spreading of a finger is considered. Then, the detection unit 121 estimates that the user is located on the extension line of a direction 4114 from the mic icon 4102 to the position at which the gesture of the user is detected, as in the technology described above with reference to FIG. 235. Additionally, the detection unit 121 may estimate the user position using the gesture of the user as an opportunity, as in the technology described above with reference to FIGS. 232 to 234.

FIG. 237 is an explanatory diagram illustrating an example of the user position estimation function according to the present example. As illustrated in FIG. 237, the detection unit 121 detects a sound of the user giving an instruction to start sound input. The detection unit 121 can detect, for example, a keyword decided in advance as the sound of an instruction to start sound input. Then, the detection unit 121 estimates that the user is located on an extension line of a direction 4115 in which the sound of the user is detected from the mic icon 4102, as in the technology described above with reference to FIG. 235. Additionally, the detection unit 121 may estimate the user position using the detection of the user sound as an opportunity, as in the technology described above with reference to FIGS. 232 to 234.

Additionally, for example, the detection unit 121 may estimate the user position using the fact that the user is pulling a sound input start object 4180 toward his or her hand as an opportunity. In this case, the detection unit 121 can estimate that the user is located near the position to which the sound input start object 4180 is pulled or on an extension line of a direction from the mic icon 4102 to the sound input start object 4180.

The examples of the user position estimation function have been described above.

The detection unit 121 controls the sound input unit such that the estimated user position is included in the beamforming range, to form the directivity. The detection unit 121 may control the sound input unit such that a plurality of beamforming ranges are formed. For example, when the beamforming range is formed for each of the plurality of users, it is possible to improve the precision of the sound recognition of the sound input from each user.

The detection unit 121 may update the range of the formed directivity according to update of the estimation result of the user position. For example, the detection unit 121 allows the user to track the beamforming range when the user moves. Additionally, when the estimation result of the user position is stabilized, it is predicted that the user remains at the same position and the estimation result is correct, and therefore the detection unit 121 may narrow the beamforming range. In such a case, it is possible to improve the precision of the sound recognition. The detection unit 121 may change the range of the directivity of the sound input unit based on a user input. For example, the detection unit 121 vertically or horizontally moves, broadens, or narrows the range of the directivity formed by the sound input unit according to a user input.

(3) Output Control Unit 122

The output control unit 122 according to the present example has a function as a display control unit that controls display indicating the range of the directivity (beamforming range) formed when the sound input unit executes the beamforming. Specifically, the output control unit 122 controls the output unit 130 such that information indicating the beamforming range of the sound input unit is displayed. This display may be the same as the range of the directivity formed by the detection unit 121 or may be different from the range of the directivity. For example, the output control unit 122 may execute display indicating a range deformed by expanding, simplifying, or scaling the range of the directivity formed by the detection unit 121. The output control unit 122 may control display indicating the beamforming range of the sound output unit or any other input or output unit. The output control unit 122 may control any other output indicating the beamforming range in addition to the display. Hereinafter, a specific example of the display indicating the beamforming range will be described.

FIG. 238 is an explanatory diagram illustrating an example of a user interface according to the present example. As illustrated in FIG. 238, the output control unit 122 executes display 4120 indicating the beamforming range. Because of this display, the user can know that the beamforming related to a sound input is executed. Thus, as described above, the psychological burden and the physical burden on the user are reduced. The display 4120 indicating the beamforming range has a fan shape centering on the mic icon 4102. When the fan shape is viewed from the user side, the beamforming range converged on the mic icon 4102. Therefore, the user is prompted to naturally speak toward the mic icon 4102. When the mic is provided immediately above or near the mic icon 4102, the precision of the sound recognition is improved. Here, the display 4120 indicating the beamforming range is executed in any range in directions of 360 degrees centering on the mic icon 4102. Accordingly, regardless of the position at which the user is located around the table 140*a*, the user speaks toward the mic icon 4102. When the mic is provided immediately above or near mic icon 4102, the user speaks toward the mic at any position around the table 140*a*, and thus the precision of the sound recognition is improved.

The output control unit 122 may reflect the position of the user estimated by the detection unit 121 in at least one of the position or the shape of the display indicating the beamforming range. For example, the output control unit 122 may execute display indicating the beamforming range near the estimated user position or may execute display indicating the beamforming range in a shape spreading or narrowing toward the estimated user position. Hereinafter, an example of a user interface according to the user position according to the present example will be described with reference to FIGS. 239 and 240.

FIG. 239 is an explanatory diagram illustrating an example of a user interface according to the present example. As illustrated in the left drawing of FIG. 239, when the user touches the sound input start object 4108, the detection unit 121 detects the user position 4109 using one of the above-described processes. As illustrated in the right drawing of FIG. 239, the output control unit 122 executes the display 4120 indicating the beamforming range in the fan shape spreading to the right and left of a line connecting the mic icon 4102 and the estimated user position 4109. Because of the display indicating the beamforming range in which the user position is reflected, the user can know that the beamforming is executed for him or her as a target. For example, when the beamforming range is suitable for the position of the user, as described above, the psychological burden and the physical burden on the user are reduced FIG. 240 is an explanatory diagram illustrating an example of a user interface according to the present example. Reference numeral 4105A denotes a beginning user position at which a sound input starts and reference numeral 4105B denotes a user position after movement. As illustrated in FIG. 240, when the beginning position (4105A) at which the sound input starts deviates from the display 4120 indicating the beamforming range, the user is prompted to naturally move to the position (4105B) at which the deviation will be cancelled. Accordingly, when the user moves inside the range of the directivity formed by the mic, the precision of the sound recognition by the information processing system 100 is improved.

Various UIs indicating the beamforming range are considered. Variations of the UIs will be described in detail below.

The output control unit 122 may control display indicating volume of a sound obtained by the sound input unit. Accordingly, the user can know the volume of the input sound of the user and can also compare the volume to the volume of ambient noise. Hereinafter, an example of a user interface indicating volume according to the present example will be described with reference to FIG. 241.

FIG. 241 is an explanatory diagram illustrating an example of a user interface according to the present example. In the example illustrated in FIG. 241, the information processing system 100 displays display 4130 indicating volume in accordance with a volume level spreading in an arc shape around the mic icon 4102. Because of this display, the user knows the volume in each direction.

The output control unit 122 may simultaneously display information indicating the range of the directivity and information indicating volume. For example, the output control unit 122 may simultaneously execute display indicating the beamforming range and display indicating volume on the same display surface. Hereinafter, an example of a user interface when the display indicating the beamforming range and the display indicating the volume are simultaneously displayed will be described with reference to FIG. 242.

FIG. 242 is an explanatory diagram illustrating an example of a user interface according to the present example. In the example illustrated in FIG. 242, the information processing system 100 simultaneously executes the display 4120 indicating the beamforming range and the display 4130 indicating the volume. In the present example, in the display 4130 indicating the volume, a display color is changed according to a volume level.

The output control unit 122 may display information regarding the volume of the sound obtained inside the range of the directivity and information indicating the volume of the sound obtained outside the range of the directivity by distinguishing display methods. For example, the output control unit 122 may reflect information indicating the inside or the outside of the beamforming range in the display indicating the volume. Specifically, the output control unit 122 executes display indicating the volume by classifying display methods such as hue, shade, highness and lowness at the time of display of and a stereoscopic form, and a broken line or a solid line based on the volume of a sound obtained inside the beamforming range or the volume of a sound obtained outside the beamforming range. From another viewpoint, the output control unit 122 may reflect the information indicating the volume in the display indicating the beamforming range. In this way, the output control unit 122 can execute 3-dimensional display in which an axis of the volume is added to 2-dimensional display indicating a position range such as the beamforming range. In this case, since two meanings of the beamforming range and the volume can be expressed with one kind of display, the display region on the display surface can be saved and the user can understand the display more easily.

Various UIs in which the display indicating the beamforming range and the display indicating the volume are simultaneously executed are considered. Variations of the UIs will be described in detail below.

The output control unit 122 may display information indicating a result of the sound recognition based on the sound acquired by the sound input unit. For example, the output control unit 122 may activate an application such as a browser or may execute a sound input, such as a search word input, on an application based on the sound acquired by the sound input unit. Hereinafter, an example of a user interface related to the display indicating a result of the sound recognition will be described with reference to FIG. 243.

FIG. 243 is an explanatory diagram illustrating an example of a user interface according to the present example. In the example illustrated in FIG. 243, the output control unit 122 activates an application window 4101 according to a sound input by the user. Additionally, as illustrated in FIG. 230 or 231, the output control unit 122 may display information indicating success or failure of the sound input or words of the sound input in a text form.

The output control unit 122 may execute the display indicating the beamforming range a plurality of times or may dynamically change the display indicating the beamforming range. For example, when the plurality of beamforming ranges are formed by the detection unit 121, the output control unit 122 executes the display indicating the beamforming range a plurality of times accordingly. When the beamforming range is dynamically changed by the detection unit 121, the output control unit 122 can accordingly change the beamforming range. Variations of the UIs will be described in detail below.

(4) Output Unit 130

The output unit 130 according to the present example has a function as a display unit that displays an image. For example, as illustrated in FIGS. 1 to 4, the output unit 130 is realized by the projector projecting an image from the upper or lower side of the table 140*a* to the table 140*a*, a touch panel type display, or a flat panel type display. Additionally, the output unit 130 may have a function as a sound output unit such as a speaker.

The example of the configuration of the information processing system 100 which is characteristic of the present example has been described above.

(Variations of UI)

Display Indicating Beamforming Range

Hereinafter, a variation of a UI according to the present example will be described. First, a variation of a user interface related to display indicating the beamforming range will be described with reference to FIGS. 244 to 248.

FIG. 244 is an explanatory diagram illustrating an example of a user interface according to the present example. FIG. 244 illustrates the display 4120 indicating the beamforming range in a fan shape.

FIG. 245 is an explanatory diagram illustrating an example of a user interface according to the present example. In FIG. 245, the display 4120 indicating the beamforming range is indicated with an arrow. In this display, the direction of the directivity formed by the sound input unit is indicated by the direction of the arrow.

FIG. 246 is an explanatory diagram illustrating an example of a user interface according to the present example. In FIG. 246, the display 4120 indicating the beamforming range is expressed with hue. More specifically, an annular object displayed around the mic icon is displayed. A spot 4120 corresponding to the beamforming range in the annular object is displayed with a different color from the other spots.

FIG. 247 is an explanatory diagram illustrating an example of a user interface according to the present example. In FIG. 247, a balloon indicating a result of the sound recognition is displayed along with a mic icon. In this example, the mic icon and the balloon function as the display 4120 indicating the beamforming range. For example, the display 4120 indicating the mic icon and the balloon moves in a direction in which the directivity of the mic is oriented. Accordingly, the beamforming range is expressed in accordance with the display position of the display 4120 indicating the mic icon and the balloon. The output control unit 122 controls the display position such that the mic is located on an extension line of a line connecting the user position and the display 4210 indicating the mic icon and the balloon, and thus it is possible to improve the precision of the sound recognition.

FIG. 248 is an explanatory diagram illustrating an example of a user interface according to the present example. The example illustrated in FIG. 248 is an example in which display of the mic icon is omitted from the example illustrated in FIG. 247.

The variations of the user interfaces related to the display indicating the beamforming range have been described above.

Display Indicating Beamforming Range and Volume

Next, variations of user interfaces related to simultaneous display of the display indicating the beamforming range and the display indicating the volume will be described with reference to FIGS. 249 to 253.

FIG. 249 is an explanatory diagram illustrating an example of a user interface according to the present example. In the example illustrated in FIG. 249, display indicating volume is executed according to a volume level spreading in an arc shape around the mic icon 4102. In the example illustrated in FIG. 249, the beamforming range is expressed by hue of the volume level which reaches a sound-recognizable magnitude. For example, reference numeral 4140A denotes volume acquired from the beamforming range, that is, volume acquired from the user who is a sound recognition target. Reference numeral 4140B denotes volume of noise acquired outside the beamforming range, that is, volume of noise acquired from another user who is not the sound recognition target. In this way, the information processing system 100 can simultaneously execute the display indicating the beamforming range and the display indicating the volume.

FIG. 250 is an explanatory diagram illustrating an example of a user interface according to the present example. In FIG. 250, the display 4120 indicating the beamforming range is displayed to further overlap with the example illustrated in FIG. 249. According to this example, the user can see the beamforming range more simply.

FIG. 251 is an explanatory diagram illustrating an example of a user interface according to the present example. In the example illustrated in FIG. 251, display 4140 (4140A and 4140B) indicating the beamforming range and the volume is executed inside an end of the display surface. In the display 4140, the volume is expressed by a height from the end. In the display 4140, the beamforming range is expressed by hue. For example, reference numeral 4140A denotes volume acquired from the beamforming range, that is, volume acquired from the user who is a sound recognition target. Reference numeral 4140B denotes volume of noise acquired outside the beamforming range, that is, volume of noise acquired from another user who is not the sound recognition target.

FIG. 252 is an explanatory diagram illustrating an example of a user interface according to the present example. The example illustrated in FIG. 252 is a form in which the display illustrated in FIG. 251 is executed in the display 4120 indicating the balloon illustrated in FIG. 248.

FIG. 253 is an explanatory diagram illustrating an example of a user interface according to the present example. In the example illustrated in FIG. 253, the display 4140 indicating the same beamforming range and volume as those in the example illustrated in FIG. 251 is executed around the mic icon. In the display 4140, the volume is expressed by a height from the mic icon. In the display 4140, the beamforming range is expressed by hue.

The variations of the user interfaces related to the simultaneous display of the display indicating the beamforming range and the display indicating the volume have been described above.

Display Indicating Plurality of Beamforming Ranges

Next, variations of user interfaces related to a plurality of displays of the display indicating the beamforming range will be described with reference to FIGS. 254 to 261.

FIG. 254 is an explanatory diagram illustrating an example of a user interface according to the present example. As illustrated in FIG. 254, a plurality of users executing sound inputs can be around the table 140*a*. In this case, the detection unit 121 controls the sound input unit such that a plurality of directivities are formed so that the users are included in the respective beamforming ranges. When there are a plurality of beamformings, the output control unit 122 may execute a plurality of displays indicating the range of the directivity. For example, the output control unit 122 displays the plurality of displays indicating the beamforming ranges corresponding to the ranges of the respective plurality of formed directivities. In the example illustrated in FIG. 254, display 4120A indicating the beamforming range for a user 4105A and display 4120B indicating the beamforming range for a user 4105B are executed. In the example illustrated in FIG. 254, there are a plurality of applications receiving sound inputs and the sound input of each of the users is received from a different beamforming range. Specifically, a result of the sound recognition of the user 4105A is input to an application window 4101A and a result of the sound recognition of the user 4105B is input to an application window 4101B.

FIG. 255 is an explanatory diagram illustrating an example of a user interface according to the present example. As illustrated in FIG. 255, the output control unit 122 executes the display 4120A indicating the beamforming range for the user 4105A and the display 4120B indicating the beamforming range for the user 4105B. In the example illustrated in FIG. 255, one application receives sound inputs acquired from the plurality of beamforming ranges. Specifically, the results of the sound recognition of the user 4105A and the user 4105B are input to the application windows 4101.

FIG. 256 is an explanatory diagram illustrating an example of a user interface according to the present example. As illustrated in FIG. 256, the displays indicating the plurality of beamforming ranges can be superimposed. In this case, since sounds of the plurality of users can be mixed and input to the information processing system 100, there is a possibility of an erroneous operation occurring. For this reason, the output control unit 122 may execute warning display when the displays indicating the plurality of displayed ranges of the directivities are superimposed. In the example illustrated in FIG. 256, warning display 4150 is executed in a portion in which the display 4120A and the display 4120B indicating the beamforming ranges are superimposed. When the users move apart or execute manipulations of moving or narrowing the beamforming ranges according to the warning display 4150, it is possible to prevent an erroneous operation.

Here, as in the example illustrated in FIG. 254, when there are the plurality of applications receiving the sound inputs, it is desirable to clarify association of the beamforming ranges and the applications of sound input destinations. Therefore, the output control unit 122 may execute display to associate the display indicating the beamforming ranges with display objects receiving sounds input by the sound input unit forming the beamforming ranges. Hereinafter, the variations of the user interfaces related to the display of the association will be described with reference to FIGS. 257 to 259.

FIG. 257 is an explanatory diagram illustrating an example of a user interface according to the present example. In the example illustrated in FIG. 257, association of the display 4120 indicating the beamforming range and an end 4151 of the application window 4101 which is an input destination of the sound acquired from the beamforming range is expressed by the same hue.

FIG. 258 is an explanatory diagram illustrating an example of a user interface according to the present example. In the example illustrated in FIG. 258, association of the display 4120 indicating the beamforming range and the application window 4101 which is an input destination of the sound acquired from the beamforming range is expressed by connecting the display 4120 and the application window 4101 by a line 4152.

FIG. 259 is an explanatory diagram illustrating an example of a user interface according to the present example. In the example illustrated in FIG. 259, association of display 4140A indicating a volume level of the sound acquired from one beamforming range and an end 4151A of an application window 4101A which is an input destination of the sound acquired from the beamforming range is expressed by the same hue. Similarly, association of display 4140B indicating a volume level of the sound acquired from the other beamforming range and an end 4151B of an application window 4101B which is an input destination of the sound acquired from the beamforming range is expressed by the same hue.

Here, when there are a plurality of applications receiving sound inputs, a plurality of mic icons may be displayed. Hereinafter, a variation of a user interface related to the display of the plurality of mic icons will be described with reference to FIGS. 260 and 261.

FIG. 260 and FIG. 261 are each an explanatory diagram illustrating an example of a user interface according to the present example. In the example illustrated in FIG. 260, mic icons 4102A, 4102B, and 4102C are displayed in application windows 4101A, 4102B, and 4102C receiving sound inputs. Further, display 4120A, display 4120B, and display 4120C indicating the beamforming ranges are displayed from the mic icons 4102A, 4102B, and 4102C.

Here, as illustrated in FIG. 261, for example, when a mic is provided immediately above the center (denoted by reference numeral 4153) of the table 140*a*, mics are not provided immediately above the mic icons 4102A, 4102B, and 4102C. Therefore, as illustrated in FIG. 261, when the user speaks toward the mic icon 4102, a sound is uttered in a different direction from the position in which the mic is provided. Thus, it is difficult to say that the precision of the sound recognition is improved. However, because the uttered sound spreads, an influence on the precision of the sound recognition is considered to be slight.

The variations of the user interfaces related to the display indicating the plurality of beamforming ranges have been described above.

Dynamic Change of Display Indicating Beamforming Range

Next, variations of user interfaces related to a dynamic change of display indicating the beamforming range will be described with reference to FIGS. 262 to 265.

FIG. 262 is an explanatory diagram illustrating an example of a user interface according to the present example. For example, the detection unit 121 may estimate the user position erroneously and consequently form a beamforming range in an erroneous direction 4160A. In this case, as illustrated in the left drawing of FIG. 262, the output control unit 122 executes the display 4120A indicating an initial beamforming range deviated from the position of the user 4105A. However, the detection unit 121 can update the range of the directivity to be formed according to update of the estimation result of the user position. Similarly, the output control unit 122 may update the display indicating the beamforming range according to the update of the estimation result of the user position. As illustrated in the right drawing of FIG. 262, when the detection unit 121 reestimates the user position, the detection unit 121 forms the beamforming range in a reestimated direction 4160B of the user. In this case, the output control unit 122 executes the display 4120B indicating the updated beamforming range toward the position of the user 4105A. Accordingly, the user can know that the sound of the user is correctly recognized and can feel a sense of ease. When the user continues to speak in or near the initial beamforming range, the detection unit 121 may update the beamforming range toward the user. In this case, as illustrated in the right drawing of FIG. 262, the display 4120B indicating the beamforming range is oriented toward the user 4105A located near the display 4120A indicating the beginning beamforming range and is not oriented toward the user 4105B located in a different direction.

FIG. 263 is an explanatory diagram illustrating an example of a user interface according to the present example. As illustrated in the left drawing of FIG. 263, the output control unit 122 executes the display 4120 indicating a broad beamforming range in the beginning. When the user continues to speak in the beamforming range, the output control unit 122 narrows the display 4120 indicating the beamforming range centering on the direction of the user. Accordingly, the user can know that the sound of the user is correctly recognized and can feel a sense of ease.

The examples in which the display indicating the beamforming range is changed on the side of the information processing system 100 have been described above, but the present technology is not limited to the examples. For example, the user can change the display indicating the beamforming range. For example, when the displays indicating the plurality of beamforming ranges illustrated in FIG. 256 are superimposed, the user can execute a manipulation of resolving the superimposition of the beamforming ranges. Hereinafter, variations of user interfaces related to a dynamic change of the display indicating the beamforming range according to a user manipulation will be described with reference to FIGS. 264 and 265.

FIG. 264 is an explanatory diagram illustrating an example of a user interface according to the present example. As illustrated in the left drawing of FIG. 264, the display 4120A and the display 4210B indicating the beamforming ranges are superimposed and warning display 4150 is executed. As illustrated in the left drawing of FIG. 264, the user is assumed to execute a manipulation of sliding the display 4210A indicating the beamforming range from the right to the left. The beamforming range of the sound input unit is moved from the right to the left according to this manipulation. As illustrated in the right drawing of FIG. 264, the display 4120A indicating the beamforming range is moved from the right to the left with the movement. Accordingly, since the superimposition of the beamforming ranges is resolved, an erroneous operation is prevented. The display 4120A indicating the beamforming range illustrated in the left drawing of FIG. 264 may be, for example, preview display executed temporarily when the sound input start object 4108 is touched. In this case, the user can move the region of the preview display, and then cause the sound recognition to start.

FIG. 265 is an explanatory diagram illustrating an example of a user interface according to the present example. As illustrated in the left drawing of FIG. 265, the display 4120A and the display 4210B indicating the beamforming ranges are superimposed and warning display 4150 is executed. As illustrated in the left drawing of FIG. 264, the user is assumed to execute a manipulation of sliding the display 4210A indicating the beamforming range from the right to the left. As illustrated in the left drawing of FIG. 265, the user is assumed to execute a manipulation of narrowing the display region from the right and the left on the display 4120A indicating the beamforming range. The beamforming range of the sound input unit is narrowed according to this manipulation. As illustrated in the right drawing of FIG. 265, the display 4120A indicating the beamforming range is narrowed with the narrowing. Accordingly, since the superimposition of the beamforming ranges is resolved, an erroneous operation is prevented.

In the examples illustrated in FIGS. 264 and 265, the user input of changing the beamforming range has been described as the user manipulation on the display indicating the beamforming range, but the present technology is not limited to the examples. For example, the user input may be an input via hardware such as a keyboard or a remote controller or may be a sound input or the like.

The variations of the UIs according to the present example have been described above. Next, an operation process executed in the information processing system 100 according to the present example will be described with reference to FIG. 266.

(Operation Process)

FIG. 266 is a flowchart illustrating an example of the flow of a display control process executed in the information processing system 100 according to the present example.

As illustrated in FIG. 266, in step S4102, the detection unit 121 estimates 16 the user position. For example, the detection unit 121 estimates the position of the user who is a sound recognition target using the user position estimation function described above with reference to FIGS. 232 to 237.

Subsequently, in step S4104, the detection unit 121 executes the beamforming. For example, the detection unit 121 controls the sound input unit such that the directivity is formed so that the estimated user position is included in the beamforming range.

Subsequently, in step S4106, the output control unit 122 outputs the display indicating the beamforming range. For example, as described above with reference to FIGS. 238 to 261, the output control unit 122 controls the output unit 130 such that the display indicating the beamforming range of the sound input unit formed by the detection unit 121 is executed.

Subsequently, in step S4108, the output control unit 122 updates the display indicating the beamforming range. For example, as described above with reference to FIGS. 262 to 265, when the detection unit 121 dynamically changes the beamforming range, the output control unit 122 accordingly changes the beamforming range.

Subsequently, in step S4110, the output control unit 122 determines whether the display indicating the beamforming range ends. For example, the output control unit 122 determines whether the display indicating the beamforming range ends based on whether the user executes a manipulation of designating the end of the application or the display indicating the beamforming range.

When it is determined that the display does not end (No in S4110), the process proceeds to step S4108 again. When it is determined that the display ends (Yes in S4110), the process ends.

The operation process executed in the information processing system 100 according to the present example has been described above.

Example 6

The present example is an embodiment of the above-described specific example 9. In this example, details of an internal process according to the specific example 9 are described with reference to FIGS. 267 to 290. Hereinafter, the projection type information processing system 100a will be assumed in the description. However, any type of information processing system described with reference to FIGS. 1 to 4 can realize a UI according to the example to be described below.

(Overview)

FIG. 267 is an explanatory diagram illustrating an overview of a user interface according to the present example. The information processing system 100 according to the present example automatically selects a display region (a position, a size, and an inclination) of an application to be activated in a relation among a real object, an existing display object, and a user. Here, the real object refers to an actually existing real object, such as a book or a plate. The display object refers to a display image, such as an icon or an application window, which is displayed on the table 140a. The user refers to a subject of an application to be activated. The existing display object is also referred to as an existing window below. In the present example, the display surface is assumed to match the table 140a in the description.

In FIG. 267, reference numeral 4211 indicates that the user touches an activation instruction object 4224 to activate an application on the table 140a in which a real object 4222 and an existing window 4223 coexist. The information processing system 100 starts a display region decision process using a touch on the activation instruction object 4224 as an opportunity. Specifically, the information processing system 100 detects a display region (denoted by reference numeral 4212) of the existing window 4223, a presence region (denoted by reference numeral 4213) in which the real object 4222 is present, and the position and the direction (denoted by reference numeral 4214) of the user. For example, the information processing system 100 decides a display region of the display object 4221 (hereinafter also referred to as an activation window) of an application corresponding to an activation instruction based on a relation with the existing window 4223, a relation with the real object 4222, and a relation with the user. For example, as denoted by reference numeral 4215, the information processing system 100 decides the display region of the activation window 4221 by inclining the activation window 4221 at an angle θ to face the user according to the direction of the face of the user at a location close to the user and without superimposition on the display region of the existing window and the presence region of the real object In the projection type information processing system 100a, a real object is placed on the table 140a or an existing window is displayed in some cases and the user position is also variable. Therefore, when an appropriate display region is not decided, a situation in which the activation window may be far from the user and is not within reach, the user may expend effort to adjust the activation window so that the activation window is easily visible, or the existing window is hidden by the activation window may occur.

Accordingly, the information processing system 100 according to the present example appropriately decides the display region of the activation window based on the relation among the real object, the display object, and the user. Accordingly, since the activation window is displayed in a location in which the user can easily execute a manipulation, the user can manipulate the activation window immediately after the activation. When the activation window is displayed to face the user, the user can confirm information regarding the activation window without executing any manipulation. Further, when the activation window is displayed so that the existing window is not covered and hidden, the activation window is prevented from interfering with a manipulation on the existing window. In the present example, convenience for the user is improved in this way.

Example of Configuration

FIG. 268 is a block diagram illustrating an example of a logical configuration of the information processing system 100 according to the present example. As illustrated in FIG. 268, the information processing system 100 according to the present example includes the input unit 110, the control unit 120, and the output unit 130.

(1) Input Unit 110

The input unit 110 according to the present example is realized by, for example, a camera acquiring an image (a still image or a moving image) and a stereo camera acquiring depth information. For example, the input unit 110 outputs the acquired captured image and the acquired depth information to the control unit 120. The input unit 110 may be realized by a touch sensor provided on the table 140a or any input device such as a remote controller. The input unit 110 can acquire a user manipulation such as a sound input or a touch manipulation and output the user manipulation to the control unit 120.

(2) Output Unit 130

The output unit 130 according to the present example has a function as a display unit that displays an image. For example, as illustrated in FIGS. 1 to 4, the output unit 130 is realized by the projector projecting an image from the upper or lower side of the table 140a to the table 140a, a touch panel type display, or a flat panel type display. Additionally, the output unit 130 may have a function as a sound output unit such as a speaker.

(3) Control Unit 120

The control unit 120 according to the present example executes various processes to decide a display region of an application in the relation among the real object, the existing display object, and the user. As illustrated in FIG. 268, the control unit 120 includes the output control unit 122 and the detection unit 121 that has functions as a real object recognition unit 4201, a display object recognition unit 4202, and a user recognition unit 4203.

(3-1) Real Object Recognition Unit 4201

The real object recognition unit 4201 has a function of recognizing a real object on the table 140*a* (display surface). For example, the real object recognition unit 4201 recognizes the presence region of the real object on the table 140*a* from the depth information output from the input unit 110. Hereinafter, an example of a real object recognition function of the real object recognition unit 4201 will be described with reference to FIG. 269.

FIG. 269 is an explanatory diagram illustrating an example of a real object recognition function according to the present example. In FIG. 269, an example of the depth information output from the input unit 110 is illustrated and a depth is expressed with shade. Reference numeral 4231 denotes the depth of a region in which no real object is present on the table 140*a*. Reference numeral 4232 denotes the depth of a region in which a real object is present and reference numeral 4233 denotes the depth of a region in which a hand of the user is present. The real object recognition unit 4201 recognizes, as the presence region of the real object, a region in which the depth is smaller than the region denoted by reference numeral 4231 on the table 140*a* (a distance to the body is close), as denoted by reference numerals 4232 and 4233. Here, the real object recognition unit 4201 may not recognize the frequently moving region (denoted by reference numeral 4233) as the presence region of the real object and may recognize only a region (denoted by reference numeral 4232) in which the object does not move or a motion is slight as the presence region of the real object. This is because an arm or the like does not correspond to an obstacle of the activation window. The real object recognition unit 4201 may recognize the presence region of the real object based on, for example, an infrared sensing result in addition to the depth information.

The real object recognition unit 4201 may recognize content of the real object. For example, the real object recognition unit 4201 can recognize which real object is present on the table 140*a* by recognizing an image of a portion corresponding to the presence region the real object in a captured image obtained by imaging a state on the table 140*a*.

(3-2) Display Object Recognition Unit 4202

The display object recognition unit 4202 has a function of recognizing an existing display object which has already been displayed on the table 140*a*. For example, the display object recognition unit 4202 monitors a display control process by the output control unit 122 and recognizes a display region and content (a corresponding application) of the existing display object.

(3-3) User Recognition Unit 4203

The user recognition unit 4203 has a function of recognizing a user who is an application activation subject. For example, the user recognition unit 4203 recognizes the position and the direction of the user touching the activation instruction object 4224 based on a captured image output from the input unit 110. Various recognition processes by the user recognition unit 4203 are considered. The user recognition process will be described in detail below with reference to FIGS. 275 to 279, and thus the description thereof will be omitted here.

(3-4) Output Control Unit 122

The output control unit 122 functions as a display control unit that decides a display region of the activation window and controls the output unit 130 such that the activation window is displayed in the decided display region. Various display region deciding processes by the output control unit 122 are considered. In the present specification, two examples of the display region decision process will be described.

(1) First Process Example

For example, the output control unit 122 decides a display region of a display object (activation window) of an application to be activated based on at least one of the relation with the real object, the relation with the existing display object, and the relation with the user. For example, the output control unit 122 decides the display region of the activation window from at least one of the position, the size, and the angle. For example, the output control unit 122 decides a region in which the existing display object and the real object do not overlap as a window activatable area. The window activatable area is an area inside which the display region of the activation window can be decided. The output control unit 122 decides, as the display region of the activation window, a region which is inside the window activatable area and which is located at a position close to the user, has a size at which it does not overlap the existing display object or the real object, and has an angle at which it faces the user.

Relation with Real Object

The output control unit 122 decides the display region of the activation window displayed on the display surface according to information regarding the real object on the display surface. For example, the output control unit 122 decides the display region of the activation window so that the display region of the activation window does not overlap the real object. Additionally, the output control unit 122 may decide the display region of the activation window so that the display region of the activation window overlaps the real object.

The information regarding the real object is, for example, not only information regarding the presence region of the real object but also information including attribute information regarding the real object. The attribute information can include various kinds of information. For example, the attribute information may include information regarding the difficulty in moving the real object. The difficulty in moving the real object can be calculated from, for example, a movement history, the weight, and the size of the real object. For example, when the difficulty in moving the real object is considerable, the output control unit 122 decides the display region of the activation window so that the display region of the activation window does not overlap the real object. Conversely, when the difficulty in moving the real object is small, the output control unit 122 decides the display region of the activation window so that the display region of the activation window overlaps the real object and prompts the user to move the real object. The attribute information may include, for example, information regarding a relation with the activation window. For example, when the activation window is an activation window related to the real object, such as display of information for explaining food on the table 140*a*, the output control unit 122 decides the display region so that the display region is displayed near the real object or overlaps the real object. Accordingly, it is possible to improve convenience for the user.

Hereinafter, the display region decided based on the relation with the real object will be described with reference to FIGS. 270 and 271.

FIGS. 270 and 271 are explanatory diagrams illustrating an example of the display region decision process according to the present example. FIGS. 270 and 271 illustrate an example in which the activation window 4221 is displayed using a touch on the activation instruction object 4224 by the user as an opportunity. FIG. 270 illustrates an example in which the display region is decided so that the display region does not overlap the real object. As illustrated in FIG. 270, a window activatable area 4234 is a region other than a region in which the real object 4222 on the table 140*a* is present and the display region of the activation window 4221 is decided inside the window activatable area 4234. FIG. 271 illustrates an example in which the display region is decided so that the display region overlaps the real object. As illustrated in FIG. 271, the window activatable area 4234 is a region in the region in which the real object 4222 on the table 140*a* is present and the display region of the activation window 4221 is decided inside the window activatable area 4234.

Relation with Existing Display Object

The output control unit 122 may decide the display region of the activation window further according to information regarding another display object (existing display object) which has already been displayed on the display surface.

For example, the output control unit 122 may decide the display region of the activation window in front of an existing display object. Accordingly, the user can view and manipulate the activation windows immediately after the activation. The output control unit 122 may decide the display region of the activation window so that the display region of the activation window does not overlap the display region of the existing display object. The user can view and manipulate the activation window immediately after the activation and can also manipulate the existing window. The output control unit 122 may change the display region of the existing window so that the display region of the existing window does not overlap the display region of the activation window. Accordingly, for example, since the existing display object moves so that a location is cleared out for the activation window, the output control unit 122 can display the activation window in a region in which the user can more easily execute a manipulation.

The information regarding the existing display object is, for example, information including information indicating the display region of the existing display object and information regarding the relation with the activation window. For example, when the information regarding the existing display object is included in the activation window, the output control unit 122 decides the display region of the activation window near the existing display object. Accordingly, it is possible to improve convenience for the user.

Hereinafter, the display region decided based on the relation with the existing display object will be described with reference to FIGS. 272 to 274.

FIG. 272 is an explanatory diagram illustrating an example of the display region decision process according to the present example. FIG. 272 illustrates an example of the window activatable area in the relation with the existing display object. As illustrated in the upper drawing of FIG. 272, the output control unit 122 may set an entire surface including the display region of the existing window 4223 as the window activatable area 4234. As illustrated in the middle drawing of FIG. 272, the output control unit 122 may set a region excluding the display region of the existing window 4223 as the window activatable area 4234. As illustrated in the lower drawing of FIG. 272, the output control unit 122 may set a region including ends excluding the center portion of the display region of the existing window 4223 as the window activatable area 4234.

FIGS. 273 and 274 are explanatory diagrams illustrating an example of the display region decision process according to the present example. FIGS. 273 and 274 illustrate examples in which the activation window 4221 is displayed using a touch on the activation instruction object 4224 by the user as an opportunity.

FIG. 273 illustrates an example in which the display region is decided by permitting the existing display object to be overlapped. As illustrated in FIG. 273, the window activatable area 4234 is set to the entire region including the display region of the existing window 4223. In the left drawing of FIG. 273, the display region of the activation window 4221 is decided so that the display region of the activation window 4221 overlaps the existing window 4223. On the other hand, in the right drawing of FIG. 273, the display region of the activation window 4221 is decided so that the display region of the activation window 4221 overlaps the existing window 4223 and the display region of the existing window 4223 is changed so that the display region of the existing window 4223 does not overlap the display region of the activation window 4221.

FIG. 274 illustrates an example in which the display region is decided so that the display region does not overlap the existing display object. As illustrated in FIG. 274, the window activatable area 4234 is a region other than the presence area of the existing window 4223. In the left drawing of FIG. 274, the display region of the activation window 4221 is decided with a default size so that the display region of the activation window 4221 does not overlap the existing window 4223. On the other hand, in the right drawing of FIG. 274, the display region of the activation window 4221 is decided so that the size of the display region of the activation window 4221 is reduced and the display region of the activation window 4221 does not overlap the existing window 4223. The reduction display is effective when free space is scarce in a location close to the position of the user.

Relation with User

The output control unit 122 may decide the display region of the activation window further according to information regarding the user to whom the display object of the activation window is to be displayed. The information regarding the user includes, for example, information indicating at least one of the position and the direction of the user. For example, the output control unit 122 can decide the display region of the activation window at a position close to the user inside the window activatable area and at an inclination at which the display region of the activation window faces the user according to the direction of the user.

Hereinafter, the display region decided based on the relation with the user will be described with reference to FIGS. 275 to 282. Hereinafter, the display region will be described along with a specific example of the recognition process by the user recognition unit 4203.

FIG. 275 is an explanatory diagram illustrating an example of the display region decision process according to the present example. The left drawing of FIG. 275 illustrates an example of the recognition process by the user recognition unit 4203 and the right drawing of FIG. 275 illustrates an example of the display region decision process by the output control unit 122. As illustrated in the left drawing of FIG. 275, the input unit 110 executes imaging setting an imaging region 4241 broader than the table 140*a* as a monitoring target. The user recognition unit 4203 first specifies a user 4242 touching the activation instruction object 4224 based on a captured image of the imaging region 4241. Then, the user recognition unit 4203 estimates a position 4243 of the specified user. The user recognition unit 4203 estimates an angle θ of the face of the user 4242 based on the face of the user 4242 included in the imaging region 4241. Accordingly, as illustrated in the right drawing of FIG. 275, the output control unit 122 decides the display region of the activation window 4221 in a location close to the user at the inclination angle θ at which the display region of the activation window 4221 faces the user 4242.

FIG. 276 is an explanatory diagram illustrating an example of the display region decision process according to the present example. The left drawing of FIG. 276 illustrates an example of the recognition process by the user recognition unit 4203 and the right drawing of FIG. 276 illustrates an example of the display region decision process by the output control unit 122. As illustrated in the left drawing of FIG. 276, a mic icon 4244 is displayed on the table 140*a* and the user speaks toward the mic icon 4244. For example, a mic is assumed to be provided immediately above or near the mic icon 4244. The user recognition unit 4203 recognizes a sound of the user giving an instruction to activate the application. The user recognition unit 4203 can recognize, for example, a keyword decided in advance as the sound giving an instruction to activate the application. Then, the user recognition unit 4203 estimates that the user 4242 is located on an extension line of a direction 4245 in which the sound of the user is detected from the mic icon 4244 and the user 4242 faces in a direction oriented to the mic icon 4244 on the extension line. Accordingly, as illustrated in the right drawing of FIG. 276, the output control unit 122 decides the display region of the activation window 4221 in a location close to the user 4242 and in the direction 4245 so that the display region of the activation window 4221 faces the user 4242.

FIG. 277 is an explanatory diagram illustrating an example of the display region decision process according to the present example. The left drawing of FIG. 277 illustrates an example of the recognition process by the user recognition unit 4203 and the right drawing of FIG. 277 illustrates an example of the display region decision process by the output control unit 122. As illustrated in the left drawing of FIG. 277, the user recognition unit 4203 recognizes a direction 4246 of a finger or an arm of the user 4242 touching the activation instruction object 4224 based on, for example, a captured image. Then, the user recognition unit 4203 estimates that the user 4242 is located on an extension line in the direction 4246 of the finger or the arm and the user 4242 faces in the direction oriented to the activation instruction object 4224 on the extension line. Accordingly, as illustrated in the right drawing of FIG. 277, the output control unit 122 decides the display region of the activation window 4221 in a location close to the user and in the direction 4246 so that the display region of the activation window 4221 faces the user.

FIG. 278 is an explanatory diagram illustrating an example of the display region decision process according to the present example. The left drawing of FIG. 278 illustrates an example of the recognition process by the user recognition unit 4203 and the right drawing of FIG. 278 illustrates an example of the display region decision process by the output control unit 122. As illustrated in the left drawing of FIG. 278, the input unit 110 sets, as the imaging region 4241, a region which is a region including an arm of the user 4242 touching the activation instruction object 4224 and is on the table 140*a*. The user recognition unit 4203 first recognizes the shape of the arm that is touching the object from a captured image of the imaging region 4241 at a time point at which the touch on the activation instruction object 4224 is detected. Then, the user recognition unit 4203 estimates the position of the face by collating the detected shape of the arm with a model 4247 indicating a relation between the direction of an arm and the position of a face. The user recognition unit 4203 estimates that the user 4242 faces in a direction 4248 in which the user 4242 faces the edge of the table 140*a*. Accordingly, as illustrated in the right drawing of FIG. 278, the output control unit 122 decides the display region of the activation window 4221 in the direction 4248 in which the user faces the edge of the table 140*a* in a location close to the user. This process can be used, for example, when the imaging region 4241 is restricted on the table 140*a* and the shown hand is recognized successfully as one of the right and left hands.

FIG. 279 is an explanatory diagram illustrating an example of the display region decision process according to the present example. The left drawing of FIG. 279 illustrates an example of the recognition process by the user recognition unit 4203 and the right drawing of FIG. 279 illustrates an example of the display region decision process by the output control unit 122. As illustrated in the left drawing of FIG. 279, the user recognition unit 4203 recognizes a touch on the activation instruction object 4224 by the user. Then, the user recognition unit 4203 estimates that the user 4242 is located on an extension line of a direction 4250 oriented from a center point 4249 of the screen or the table 140*a* to the activation instruction object 4224 and the user 4242 faces in the direction oriented to the activation instruction object 4224 on the extension line. Accordingly, as illustrated in the right drawing of FIG. 279, the output control unit 122 decides the display region of the activation window 4221 in the direction 4250 so that the display region faces the user on the extension line in a direction 4250 from the center point 4249 to the activation instruction object 4224.

FIG. 280 is an explanatory diagram illustrating an example of the display region decision process according to the present example. As illustrated in FIG. 280, the output control unit 122 sets a region on the side of the table 40*a* on which the user 4242 is present as the window activatable area 4234. Accordingly, the output control unit 122 decides the display region of the activation window 4221 in a region 4251 which is broadest in the window activatable area 4234.

FIG. 281 is an explanatory diagram illustrating an example of the display region decision process according to the present example. As illustrated in FIG. 281, the input unit 110 executes imaging setting the imaging region 4241 broader than the table 140*a* as a monitoring target. Here, a case in which the user recognition unit 4203 succeeds in estimating the position 4243 of the user 4242 touching the activation instruction object 4224 based on a captured image of the imaging region 4241, but the estimation of the direction of the user 4242 fails is assumed. In this case, the user recognition unit 4203 recognizes whether the user 4242 is located in one of regions 4261, 4262, 4263, and 4264 around the table 140*a*, that is, recognizes a user side. The user side refers to a side of the screen or the table 140*a* on which the user places his or her hand. Then, the output control unit 122 decides the display region of the activation window 4221 in a location which is the closest to the user and in a direction corresponding to the user side. In the example illustrated in FIG. 281, the output control unit 122 decides the display region of the activation window 4221 in the location which is closest to the user and in the direction in which the user is assumed to face in an arrow direction in the region 4263.

FIG. 282 is an explanatory diagram illustrating an example of the display region decision process according to the present example. In the example illustrated in FIG. 282, the user recognition unit 4203 is assumed to succeed in estimating the position 4243 of the user 4242. The user recognition unit 4203 is assumed to fail to estimate the direction of the user 4242. In this case, as illustrated in the upper drawing of FIG. 282, the output control unit 122 may decide the display region of the activation window 4221 on a line connecting the center point 4249 of the screen or the table 140*a* and the position 4243 of the user and at a position which is the closest to the user adjoining a circle inscribed in the display surface. As illustrated in the lower drawing of FIG. 282, the output control unit 122 may decide the display region of the activation window 4221 on a line connecting the center point 4249 and the position 4243 of the user and at a position which is closest to the user adjoining an ellipse with an aspect ratio of the display surface.

Combination

The output control unit 122 may decide the display region of the activation window 4221 by combining at least one of the relation with the real object, the relation with the existing display object, and the relation with the user, as described above. Hereinafter, a display region decided by combining the relation with the real object, the relation with the existing display object, and the relation with the user will be described with reference to FIGS. 283 to 285.

FIG. 283 is an explanatory diagram illustrating an example of the display region decision process according to the present example. In the example illustrated in FIG. 283, the output control unit 122 decides the display region of the activation window 4221 so that the display region of the activation window 4221 does not overlap the real object 4222 based on the relation with the object. The output control unit 122 decides the display region of the activation window 4221 by permitting the display region of the activation window 4221 to overlap the front of the existing window 4223 based on the relation with the existing display object. The output control unit 122 decides the display region of the activation window 4221 in a location close to the user 4242 and at an inclination corresponding to the direction of the user 4242 based on the relation with the user.

FIG. 284 is an explanatory diagram illustrating an example of the display region decision process according to the present example. In the example illustrated in FIG. 284, the output control unit 122 decides the display region of the activation window 4221 so that the display region of the activation window 4221 does not overlap the real object 4222 based on the relation with the real object. The output control unit 122 decides the display region of the activation window 4221 so that the display region of the activation window 4221 does not overlap the existing window 4223 based on the relation with the existing display object. The output control unit 122 decides the display region of the activation window 4221 in a location close to the user 4242 and at an inclination corresponding to the direction of the user 4242 based on the relation with the user.

FIG. 285 is an explanatory diagram illustrating an example of the display region decision process according to the present example. In the example illustrated in FIG. 285, the output control unit 122 decides the display region of the activation window 4221 so that the display region of the activation window 4221 does not overlap the real object 4222 based on the relation with the real object. The display region of the existing window 4223 is changed so that the display region of the existing window 4223 does not overlap the display region of the activation window 4221 while the output control unit 122 decides the display region of the activation window 4221 by permitting the display region of the activation window 4221 to overlap the existing window 4223 based on the relation with the existing display object. The output control unit 122 decides the display region of the activation window 4221 in a location close to the user 4242 and at an inclination corresponding to the direction of the user 4242 based on the relation with the user.

The examples of the display region decision process for the activation window by the output control unit 122 have been described above.

(2) Second Process Example

For example, the output control unit 122 may decide the display region using an evaluation function evaluating a candidate of the display region of the activation window. The evaluation function can be designed so that the content described above in regard to the relation with the real object, the relation with the existing display object, and the relation with the user is reflected. More specifically, the following factors of the evaluation function are considered, for example.

Superimposition evaluation value with existing window
Superimposition evaluation value with real object
Distance evaluation value from user position
Distance evaluation value from user side
Distance evaluation value from touch position
Coincidence evaluation value with finger direction The superimposition evaluation value with the existing window is an evaluation value in regard to superimposition of the activation window and the existing window. When a plurality of existing windows are displayed, the superimposition evaluation value with the existing windows can be calculated as a statistical value such as a total sum or an average of evaluation values calculated for the existing windows. The output control unit 122 may calculate the superimposition evaluation value with the existing window and may lower the degree of influence on the evaluation for the old existing window using a superimposition evaluation value×(1/index). Here, index is an index (sequence) assigned to the existing window, 1 is given to the newest window, and a larger value is given to an older window. The output control unit 122 may calculate an evaluation value and may consider mutual compatibility of the applications.

The superimposition evaluation value with the real object is an evaluation value in regard to superimposition of the activation window and the real object. When there are a plurality of real objects, the superimposition evaluation value with the real objects can be calculated as a statistical value such as a total sum or an average of evaluation values calculated for the real objects. The output control unit 122 may calculate an evaluation value, and may consider shapes such as the height and the area of the real object or consider a previous movement history.

The distance evaluation value from a user position is an evaluation value in regard to a distance between the activation window and the user position. When the distance is closer, a better evaluation value is calculated.

The distance evaluation value from a user side is an evaluation value in regard to distance between the activation window and the user side. When the distance is closer, a better evaluation value is calculated.

The distance evaluation value with a touch position is an evaluation value in regard to the distance between the activation window and the touch position. When the distance is closer, a better evaluation value is calculated.

The coincidence evaluation value with a finger direction is an evaluation value in regard to coincidence between the direction of the activation window and the direction of the touching finger. When the directions are more coincident, a better evaluation value is calculated. For example, when the directions are coincident, 1 can be calculated. When the directions are not coincident, 0 can be calculated.

The examples of the factors of the evaluation function have been described above. The output control unit 122 can design the evaluation function as the following expression by weighting the factors.

Evaluation value=Superimposition evaluation value with existing window×30+ superimposition evaluation value with real object×200+ distance evaluation value from user position×1+ distance evaluation value from user side×1+ distance evaluation value from touch position×1+ coincidence evaluation value with finger direction×10

Any weighted parameter can be set. Any function design (parameter design) can be used in the factors. The output control unit 122 may learn various parameters in the evaluation function. The output control unit 122 may set parameters of the evaluation function according to a user manipulation. Accordingly, the user can set the parameters so that the activation window is displayed in a preferred display region of the user. For example, by setting fine compatibility in applications which are frequently used adjacently, the user can activate the applications adjacently.

The output control unit 122 decides a candidate with the best evaluation value calculated by the evaluation function among candidates for the display region as the display region of the activation window. For example, the output control unit 122 can search for the display region with the best evaluation value by adopting any scheme such as a hill-climbing method or a genetic algorithm. In the present specification, the examples in which higher evaluation values are set to be better have been described, but lower evaluation values may also be set to be better. That is, the searching of the display region by the output control unit 122 may be a minimization problem or a maximization problem.

Hereinafter, specific design of the evaluation function will be described. For example, the output control unit 122 can use the following formula 1 as the evaluation function.

[Math. 1]

$$S_{app_m}(p) = w_{app}\sum_{n=1}^{N_{app}} f_{app_m,app_n}(p) + w_{obj}\sum_{n=1}^{N_{obj}} f_{app_m,obj_n}(p) + w_{np}f_{np}(p) + w_{us}f_{us}(p) + w_{tp}f_{tp}(p) + w_{fd}f_{fd}(p) \quad \text{formula 1}$$

In the foregoing formula, $app_m$ means an m-th application window and indicates an activation window. Further, $app_n$ means an n-th application window and indicates an existing window, $obj_n$ means an n-th real object, and p means the display region of an activation window. In the foregoing formula 1, an evaluation value is calculated when p is the display region of an activation window.

The first term of the foregoing formula 1 is an evaluation term regarding the relation with the existing window. Further, $w_{app}$ is a weighted parameter, and $N_{app}$ indicates the number of existing windows. A total sum calculation target is an evaluation function in regard to the compatibility and the distance between the activation window $app_m$ and the existing window $app_n$, and is defined by the following formula, for example.

[Math. 2]

$$f_{app_m,app_n}(p) = \frac{N_{app} - (n-1)}{N_{app}} \cdot c(app_m, app_n) \cdot \{d - (r_1 + r_2)\} \quad \text{formula 2}$$

$N_{app}-(n-1)/N_{app}$ is an evaluation value in regard to a display sequence and indicates that the value is lower as the display sequence is earlier. A lower index n is given to the existing window in a new display sequence.

Here, c ($app_m$, $app_n$) is an evaluation value in regard to the compatibility between the activation window $app_m$ and the existing window $app_n$. For example, the better the compatibility is, the higher the value is. As the compatibility, for example, the compatibility between a photo file and a photo edit application is considered to be good and the compatibility between a music file and a music player is considered to be good. The evaluation value in regard to the compatibility can be decided as shown in the following table which is an example of a compatibility table.

TABLE 2

| | Photo application | Still image edit application | Moving image edit application | . . . |
|---|---|---|---|---|
| Photo application | | | | . . . |
| Still image edit application | 2 + 1 = 3 | | | . . . |
| Moving image edit application | 1 + 1 = 2 | 0 + 1 − 1 = 0 | | . . . |
| . . . | . . . | . . . | . . . | . . . |

Table 2 is an example of the compatibility table for deciding evaluation values in regard to the compatibility. The evaluation values in regard to the compatibility include a portion which is decided statically and a portion which is dynamically changed. The portion which is statically decided is decided by, for example, compatibility between applications decided in advance at the time of installation or whether the same media (files) can be handled. The portion which is dynamically changed is changed according to, for example, whether the same user (the same hand or a hand coming from the same direction) activates an application or compatibility indicated by a previous manipulation history. Additionally, as an example of the portion which is dynamically changed, the evaluation value can increase when one application is activated and the other application is subsequently activated within a predetermined time or when one application is activated and subsequently approaches the other application within a predetermined time. Conversely, the evaluation value can decrease when one application is activated and is subsequently distanced from the other application within a predetermined time.

In the example shown in Table 2, an evaluation value in regard to compatibility between a still image edit application and a photo application becomes “3” obtained by dynamically adding “1” to static “2.” Further, an evaluation value in regard to compatibility between a moving image edit application and the photo application becomes “2” obtained by dynamically adding “1” to static “1.” An evaluation value in regard to compatibility between the moving image edit application and the still image edit application becomes "0" obtained by dynamically adding "1" to static "0" and reducing "1."

The compatibility table has been described above. The foregoing formula 2 will be described again. $\{d-(r_1+r_2)\}$ is an evaluation value in regard to superimposition between the activation window $app_m$ and the existing window $app_n$. An example of a relation among $r_1$, $r_2$, and d is illustrated in FIG. 286.

FIG. 286 is an explanatory diagram illustrating an example of the display region decision process according to the present example. Here, $r_1$ is a parameter indicating the size of the activation window 4221 and is a distance between the center point and an end of the activation window 4221 in the example illustrated in FIG. 286. Further, $r_2$ is a parameter indicating the size of the existing window 4223 and is a distance between the center point and an end of the existing window 4223 in the example illustrated in FIG. 286. Furthermore, d is a parameter indicating a distance between the activation window 4221 and the existing window 4223 and is a distance between the center points in the example illustrated in FIG. 286. As illustrated in FIG. 286, a value of $\{d-(r_1+r_2)\}$ is higher as the distance is larger, and the value of $\{d-(r_1+r_2)\}$ is lower as the superimposed region is larger. The output control unit 122 may handle $\{d-(r_1+r_2)\}$ as 0 when $\{d-(r_1+r_2)\}$ is a negative value.

The first term of the foregoing formula 1 has been described above. Next, the second term of the foregoing formula 1 will be described.

The second term of the foregoing formula 1 is an evaluation term regarding the relation with the real object. Here, $w_{obj}$ is a weighted parameter. $N_{obj}$ indicates the number of real objects. A total sum calculation target is an evaluation function in regard to the compatibility and the distance between the activation window $app_m$ and the real object $obj_n$ and is defined by the following formula, for example.

[Math. 3]

$$f_{app_m,obj_n}(p)=c(app_m,obj_n)\cdot\{d-(r_1+r_2)\}\cdot a/V_{obj}\cdot b/\int vdt\cdot c/F \quad \text{formula 3}$$

Here, c $(app_m, obj_n)$ is an evaluation value in regard to the compatibility between the activation window $app_m$ and the real object $obj_n$. For example, the better the compatibility is, the higher the value is. As the compatibility, for example, the compatibility between a ruler application and the real object is considered to be good, the compatibility between a game application using an obstacle and the real object which can be the obstacle is considered to be good, and the compatibility between an application of a ramen timer and a round real object with a predetermined size is considered to be good. The evaluation value in regard to the compatibility can be decided by the compatibility table similar to Table 2 shown above.

$\{d-(r_1+r_2)\}$ is an evaluation value in regard to superimposition between the activation window $app_m$ and the real object $obj_n$. An example of a relation among $r_1$, $r_2$, and d is illustrated in FIG. 287.

FIG. 287 is an explanatory diagram illustrating an example of the display region decision process according to the present example. Here, $r_1$ is a parameter indicating the size of the real object 4222 and is a distance between the center point and an end of the real object 4222 in the example illustrated in FIG. 287. Further, $r_2$ is a parameter indicating the size of the existing window 4223 and is a distance between the center point and an end of the existing window 4223 in the example illustrated in FIG. 287. Furthermore, d is a parameter indicating a distance between the real object 4222 and the existing window 4223 and is a distance between the center points in the example illustrated in FIG. 287. As illustrated in FIG. 287, a value of $\{d-(r_1+r_2)\}$ is higher as the distance is larger, and the value of $\{d-(r_1+r_2)\}$ is lower as the superimposed region is larger. The output control unit 122 may handle $\{d-(r_1+r_2)\}$ as 0 when $\{d-(r_1+r_2)\}$ is a negative value.

Here, $a/V_{obj}$ is an evaluation value in regard to a convex hull cubic volume of an object. This evaluation value is low, for example, when the real object $obj_n$ is small or thin. Accordingly, an influence of a small or thin real object on the evaluation function is small.

Here, $b/\int vdt$ is an evaluation value in regard to a recent movement distance. This evaluation value is lower, for example, as the recent movement distance is larger. Accordingly, an influence of a real object of which the recent movement distance is large on the evaluation function is small. This is because the object of which the movement distance is large is a movable object or an object placed recently and newly, and thus the user is considered to be able to remove the object.

Here, c/F is an evaluation in regard to the shape of an object. This evaluation value is lower, for example, as an influence of the shape on an image to be projected is smaller. For example, a low value can be given to a pyramid. Accordingly, an influence of a real object with a shape having a small influence on an image to be projected on the evaluation function is small.

The second term of the foregoing formula 1 has been described above. Next, terms subsequent to the third term of the foregoing formula 1 will be described.

Terms subsequent to the third term of the foregoing formula 1 are evaluation terms regarding the relation with the user. Here, $w_{up}$ is a weighted parameter and $f_{up}(p)$ is an evaluation function regarding a distance between the user position and the activation window. Further, $w_{us}$ is a weighted parameter and $f_{us}(p)$ is an evaluation function regarding a distance between the user side and the activation window. Further, $w_{tp}$ is a weighted parameter and $f_{tp}(p)$ is an evaluation function regarding a distance between a touch position and the activation window. Further, $w_{fd}$ is a weighted parameter and $f_{fd}(p)$ is an evaluation function regarding the coincidence of a direction of a finger of the user and a direction in which the activation window is oriented.

The specific example of the evaluation function has been described above.

The example of the configuration of the information processing system 100 has been described above. Next, an example of an operation process executed in the information processing system 100 according to the present example will be described with reference to FIGS. 288 to 290.

(Operation Process)

FIG. 288 is a flowchart illustrating an example of the flow of a display control process executed in the information processing system 100 according to the present example.

As illustrated in FIG. 288, in step S4201, the input unit 110 receives an application activation instruction. For example, the input unit 110 outputs input information indicating that the activation instruction object is touched to the control unit 120.

Subsequently, in step S4202, the detection unit 121 recognizes the real object, the existing display object, and the user. For example, the real object recognition unit 4201 recognizes the presence region of the real object on the table 140*a* from the depth information output from the input unit 110. For example, the display object recognition unit 4202 monitors a display control process by the output control unit 122 and recognizes the display region of the existing window. For example, the user recognition unit 4203 recognizes the position and the direction of the user touching the activation instruction object based on a captured image output from the input unit 110.

Next, in step S4203, the output control unit 122 executes the display region decision process for the activation window. Since specific content of the display region decision process will be described in detail below, the detailed description thereof will be omitted here.

In step S4204, the output control unit 122 executes the display process. For example, the output control unit 122 controls the output unit 130 such that the activation window is displayed in the display region decided in the foregoing step S4203.

The flow of the display control process executed in the information processing system 100 has been described above. Next, the flow of the display region decision process of the foregoing step S4203 will be described with reference to FIGS. 289 and 290.

FIG. 289 is a flowchart illustrating an example of the flow of the display region decision process executed in the information processing system 100 according to the present example. The flowchart relates to the above-described first process example.

As illustrated in FIG. 289, in step S4221, the output control unit 122 first decides the window activatable area based on information regarding the existing window and the real object. For example, the output control unit 122 decides a region not overlapping the presence region of the real object and the display region of the existing window as the window activatable area.

Subsequently, in step S4222, the output control unit 122 determines whether the estimation of the position of the user is successful. For example, the output control unit 122 executes the determination with reference to the recognition result by the user recognition unit 4203.

When the output control unit 122 determines that the estimation of the position of the user is successful (YES in S4222), the output control unit 122 determines in step S4223 whether the estimation of the direction of the user is successful. For example, the output control unit 122 executes the determination with reference to the recognition result by the user recognition unit 4203.

When the output control unit 122 determines that the estimation of the direction of the user is successful (YES in S4223), the output control unit 122 decides the display region of the activation window based on the position and the direction of the user in step S4424. For example, the output control unit 122 decides the display region of the activation window in the window activatable area decided in the foregoing step S4221 so that the display region of the activation window is inclined to face the user according to the direction of the user at a position close to the user.

Conversely, when the estimation of the position of the user is successful and the estimation of the direction of the user fails (NO in S4223), the output control unit 122 decides the display region of the activation window based on the position of the user in step S4225. For example, the output control unit 122 decides the display region of the activation window at the position close to the user and in the direction corresponding to the user side in the window activatable area decided in the foregoing step S4221.

When the output control unit 122 determines that the estimation of the position of the user fails (NO in S4222), the output control unit 122 decides the display region of the activation window based on the information regarding the real object and the existing window in step S4226. For example, the output control unit 122 decides any region as the display region of the activation window in the window activatable area decided in the foregoing step S4221.

The example of the flow of the display region decision process has been described above. Next, another example of the flow of the display region decision process will be described with reference to FIG. 290.

FIG. 290 is a flowchart illustrating an example of the flow of the display 26 region decision process executed in the information processing system 100 according to the present example. The flowchart relates to the above-described second process example. Specifically, the output control unit 122 calculates a quasi-optimum solution of an evaluation function using a hill-climbing method.

As illustrated in FIG. 290, the output control unit 122 first selects N coordinates in the screen as coordinates of an evaluation target at random in step S4231. For example, the output control unit 122 selects the N coordinates in the display surface at random regardless of considering, for example, whether the coordinates overlap the presence region of the real object or whether the coordinates overlap the existing window.

Subsequently, in step S4232, the output control unit 122 evaluates the neighborhood coordinates. For example, the output control unit 122 calculates an evaluation value of the evaluation function for each of 8 points shifted vertically and horizontally by one pixel from the coordinates selected in the foregoing step S4231. At this time, the output control unit 122 may calculate the evaluation value while also changing the size and the inclination of the display region.

Next, in step S4233, the output control unit 122 changes the coordinates at which the evaluation value is the best as the coordinates of the evaluation target. At this time, when the coordinates at which the evaluation value is better are present in the 8 neighborhood points (NO in S4234), the process returns to step S4232 again and the evaluation (S4232) and the update (S4233) of the coordinates of the evaluation target are repeated.

When the coordinates at which the evaluation value is better are not present at the 8 neighborhood points (YES in S4234), the output control unit 122 determines whether the evaluation (S4232 to S4234) is completed on the N coordinates in step S4235.

When it is determined that the evaluation is not completed (NO in S4235), the process returns to step S4232 again. Accordingly, the output control unit 122 executes the process related to the foregoing steps S4232 to S4234 at the unevaluated coordinates.

When it is determined that the evaluation is completed (YES in S4235), the output control unit 122 decides the display region in which the evaluation value is the best in step S4236.

The example of the flow of the display region decision process has been described above.

Example 7

The present example is an embodiment of the above-described specific example 8. In this example, details of an internal process according to the specific example 8 are described with reference to FIGS. 291 to 298. Hereinafter, the projection type information processing system 100*a* will be assumed in the description. However, any type of information processing system described with reference to FIGS. 1 to 4 can realize a UI according to the example to be described below.

Example of Configuration

FIG. 291 is a block diagram illustrating an example of a logical configuration of the information processing system 100 according to the present example. As illustrated in FIG. 291, the information processing system 100 according to the present example includes the input unit 110, the control unit 120, and the output unit 130.

(1) Input Unit 110

The input unit 110 according to the present example is realized by, for example, a camera acquiring an image (a still image or a moving image) and a stereo camera acquiring depth information. For example, the input unit 110 outputs the acquired captured image and the acquired depth information to the control unit 120. The input unit 110 acquires the depth information and outputs the depth information to the control unit 120 not only at the time of imaging but also at the time of projection of a captured image by the output unit 130. The input unit 110 may be realized by a touch sensor provided on the table 140*a* or any input device such as a remote controller. The input unit 110 can acquire a user manipulation such as a sound input or a touch manipulation and output the user manipulation to the control unit 120.

(2) Output Unit 130

The output unit 130 according to the present example has a function as a display unit that displays an image. For example, as illustrated in FIGS. 1 to 4, the output unit 130 is realized by the projector projecting an image from the upper or lower side of the table 140*a* to the table 140*a*, a touch panel type display, or a flat panel type display. Additionally, the output unit 130 may have a function as a sound output unit such as a speaker.

(3) Control Unit 120

The control unit 120 according to the present example executes various processes to reproduce a captured image obtained by imaging a subject on the table 140*a* with the original size. As illustrated in FIG. 291, the control unit 120 includes the detection unit 121 which has functions as an environment information acquisition unit 4301 and an environment information accumulation unit 4303 and the output control unit 122 which has a function as a setting information generation unit 4305.

(3-1) Environment Information Acquisition Unit 4301

The environment information acquisition unit 4301 has a function of acquiring environment information. The environment information is information regarding an environment of the information processing system 100 having an influence on an input to the information processing system 100 or an output from the information processing system 100. For example, environment information at the time of imaging is information which can influence the size of a subject shown in a captured image. Examples of the environment information at the time of imaging include a distance (depth information) at the time of imaging from a camera to the table 140*a*, a view angle of the camera at the time of imaging, and the number of pixels of the camera at the time of imaging. The environment information at the time of projection is information which can influence the size of a subject shown a captured image to be projected. Examples of the environment information at the time of projection include a distance at the time of projection from a projector at the time of projection to the table 140*a*, a view angle of the projector, and the number of pixels of the projector at the time of projection.

(3-2) Environment Information Accumulation Unit 4303

The environment information accumulation unit 4303 has a function of accumulating the environment information acquired by the environment information acquisition unit 4301. For example, the environment information accumulation unit 4303 associates the environment information acquired at the time of imaging of a captured image with the captured image captured by a camera for storage. For example, the environment information may be stored as metadata of the captured image.

(3-3) Setting Information Generation Unit 4305

The setting information generation unit 4305 has a function of generating setting information for projecting the captured image by the output unit 130. In particular, the setting information generation unit 4305 generates the setting information for reproducing the form of the subject at the time of imaging without change based on the environment information at the time of imaging and the environment information at the time of projection. For example, the setting information generation unit 4305 can calculate a projection magnification for reproducing the subject with the original size and generates the projection magnification as setting information. Hereinafter, a calculation example of the projection magnification for reproducing the subject with the original size by the setting information generation unit 4305 will be described with reference to FIG. 292.

FIG. 292 is an explanatory diagram illustrating a process of calculating the projection magnification according to the present example. The left drawing of FIG. 292 is a front view illustrating when the table 140*a* is viewed from a camera or a projector. The right drawing of FIG. 292 is a side view when the table 140*a* is viewed from a side of the camera (the input unit 110) or the projector (the output unit 130). Y indicates the number of pixels in the vertical direction of the camera or the projector. L indicates a distance from the camera or the projector to the table 140*a*. θ indicates a view angle in the vertical direction of the camera or the projector. The setting information generation unit 4305 calculates the projection magnification for reproducing the subject with the original size by, for example, the following expression.

[Math. 4]

$$\text{projection\_magnification} = \frac{Y_1 L_1 \tan\frac{\theta_1}{2}}{Y_2 L_2 \tan\frac{\theta_2}{2}} \quad \text{formula 4}$$

$Y_1$ indicates the number of pixels in the vertical direction of the camera at the time of imaging, $L_1$ indicates a distance from the camera at the time of imaging to the table 140*a*, and $\theta_1$ indicates a view angle in the vertical direction of the camera at the time of imaging. $Y_2$ indicates the number of pixels in the vertical direction of the projector at the time of projection, $L_2$ indicates a distance at the time of projection from the projector to the table 140*a*, and $\theta_2$ indicates a view angle in the vertical direction of the projector at the time of projection.

The example in which the projection magnification is calculated using the number of pixels Y in the vertical direction has been described in FIG. 292. However, the projection magnification may be calculated using the number of pixels in the horizontal direction.

Various kinds of setting information generated by the setting information generation unit 4305 are considered in addition to the projection magnification. For example, the setting information generation unit 4305 may calculate luminance, contrast, or the like for reproducing hue of a subject or an arrival status of outside light and generate the luminance, the contrast, or the like as setting information.

Based on the setting information generated by the setting information generation unit 4305, the output control unit 122 controls the output unit 130 such that the captured image is projected. Specifically, the output control unit 122 controls the projector using the projection magnification calculated by the setting information generation unit 4305 such that the captured image is expanded or reduced to be projected.

The output control unit 122 may control the output unit 130 such that notification to the user is output to reproduce the form of the subject at the time of imaging without change. For example, a case in which an expanded captured image does not fall on the table 140*a* when the captured image is expanded and projected is considered. Therefore, the output control unit 122 may output, to the user, a notification requesting the user to execute adjustment related to the table 140*a* so that the expanded captured image falls on the table 140*a*.

The example of the configuration of the information processing system 100 according to the present example has been described above. Next, a specific example of a user interface according to the present example will be described with reference to FIGS. 293 to 297. FIGS. 293 to 297 are explanatory diagrams illustrating an example of a user interface according to the present example.

Example of UI

First, a specific example of a user interface when the projection magnification is changed according to an environment change from the time of imaging to the time of projection will be described with reference to FIGS. 293 to 295. The left drawings of FIGS. 293 to 295 illustrate environment information and a subject at the time of imaging. The setting information generation unit 4305 calculates the projection magnification using the foregoing formula 4 according to a difference between the environment information at the time of imaging illustrated in the left drawings of FIGS. 293 to 295 and the environment information at the time of projection illustrated in the right drawings of FIGS. 293 to 295. As illustrated in the right drawings of FIG. 293 to 295, the output unit 130 project the captured image using the calculated projection magnification. For example, the view angle $\theta_1$ at the time of imaging is assumed to be 45°, the distance $L_1$ is assumed to be 1 meter, and the number of pixels $Y_1$ is assumed to be 1080 pixels.

FIG. 293 illustrates an example in which the distance to the table 140*a* is changed. Specifically, while the distance $L_1$ from the camera (the input unit 110) to the table 140*a* is 1 meter, a distance $L_2$ from the projector (the output unit 130) to the table 140*a* is 2 meters. Therefore, as illustrated in the right drawing of FIG. 293, the projection magnification is 0.5 times. The subject shown in the captured image is projected with the original size by reducing and projecting the captured image as the distance is longer. Conversely, when the distance is shortened, the subject shown in the captured image is projected with the original size by expanding and projecting the captured image.

FIG. 294 illustrates an example in which the view angle is changed. Specifically, while the view angle $\theta_1$ of the input unit 110 is 45°, a view angle $\theta_2$ of the output unit 130 is 60°. Therefore, as illustrated in the right drawing of FIG. 294, the projection magnification is 0.72 times. The subject shown in the captured image is projected with the original size by reducing and projecting the captured image as the view angle is spread. Conversely, when the view angle is narrowed, the subject shown in the captured image is projected with the original size by expanding and projecting the captured image.

FIG. 295 illustrates an example in which the number of pixels is changed. Specifically, while the number of pixels $Y_1$ of the input unit 110 is 1080 pixels, the number of pixels $Y_2$ of the output unit 130 is 720 pixels. Therefore, as illustrated in the right drawing of FIG. 295, the projection magnification is 1.5 time. The subject shown in the captured image is projected with the original size by expanding and projecting the captured image as the number of pixels decreases. Conversely, when the number of pixels increases, the subject shown in the captured image is projected with the original size by reducing and projecting the captured image.

The specific example of the user interface when the projection magnification is changed according to the environment change from the time of imaging to the time of projection has been described above. Next, a specific example of a notification requesting the user to execute adjustment to reproduce the form of a subject at the time of imaging without change will be described with reference to FIGS. 296 and 297.

FIG. 296 illustrates an example in which the output control unit 122 outputs a notification requesting the user to keep a body (the output unit 130) distant by 30 centimeters from a screen (the table 140*a*). The user may keep the body distant and may replace the table 140*a* with a low table. In any case, since the distance from the output unit 130 to the table 140*a* is lengthened, the captured image is reduced and projected, and thus falls on the table 140*a*. Additionally, the output control unit 122 may output a notification requesting the user to replace the table 140*a* with a table with a larger area.

FIG. 297 illustrates an example in which the output control unit 122 omits a portion not completely falling on the table 140*a* and outputs a notification requesting the user to scroll the projected image while projecting the captured image with the original size. The user can shift and project the omitted portion by scrolling the projected image. In this case, the user may not make an effort, for example, to keep the body distant or replace the table 140*a*, in order to lengthen the distance from the output unit 130 to the table 140*a*. The user may select the method of keeping the body distant, as illustrated in FIG. 296, or the method of omitting the portion not completely falling on the table, as illustrated in FIG. 297. The selection may be executed at the time of projection, may be set in advance, or may be automatically executed by the information processing system 100.

The specific example of the user interface according to the example has been described above. Next, an example of an operation process by the information processing system 100 according to the present example will be described with reference to FIG. 298.

(Operation Process)

FIG. 298 is a flowchart illustrating an example of the flow of the display control process executed in the information processing system 100 according to the present example.

As illustrated in FIG. 298, in step S4302, the setting information generation unit 4305 refers to the environment information stored in association with the captured image by the environment information acquisition unit 4305. The environment information includes, for example, information indicating the distance at the time of imaging from the camera to the table 140*a*, the view angle of the camera at the time of imaging, and the number of pixels of the camera at the time of imaging.

Subsequently, in step S4304, the environment information acquisition unit 4301 acquires the current environment information. The environment information includes, for example, the distance from the project to the table 140*a*, the view angle of the projector, and the number of pixels of the projector.

Subsequently, in step S4306, the setting information generation unit 4305 calculates a projection magnification. Specifically, the setting information generation unit 4305 calculates the projection magnification by applying the environment information referred to in the foregoing step S4302 and the environment information acquired in the foregoing step S4304 to the foregoing formula 4.

In step S4308, the output control unit 122 controls the projector such that the captured image is projected. Specifically, the output control unit 122 controls the projector using the projection magnification calculated in the foregoing step S4306 such that the captured image is expanded or reduced to be projected.

The example of the operation process by the information processing system 100 according to the present example has been described above.

(Conclusion)

As described above, according to the present example, the subject can be reproduced with the original size by storing the captured image and the environment information at the time of storage in association therewith and changing the projection magnification according to the difference from the environment information at the time of projection. Additionally, a technology for imaging a subject along with a comparison object such as a cigarette pack or a coin can also be considered. However, in this technology, it is difficult to project a captured image with the original size when an environment at the time of projection is different from an environment at the time of imaging. Accordingly, it is necessary to execute, for example, a manipulation of comparing the comparison object of a real object to a projected comparison object and adjusting a projection magnification. In contrast, according to the present example, a subject can be reproduced with the original size even when an environment at the time of projection is different from an environment at the time of imaging.

Example 8

The present example is an embodiment of the above-described specific example 4. In this example, details of an internal process according to the specific example 4 are described with reference to FIGS. 299 to 317. Hereinafter, the projection type information processing system 100*a* will be assumed in the description. However, any type of information processing system described with reference to FIGS. 1 to 4 can realize a UI according to the example to be described below.

Example of Configuration

First, a characteristic configuration of the information processing system 100 according to the present example will be described.

(1) Input Unit

The input unit 110 according to the present example has a function of detecting an object on the table 140*a*. The input unit 110 can be realized by, for example, a camera acquiring an image (a still image or a moving image) on the table 140*a*, a stereo camera acquiring depth information, or a touch sensor provided on the table 140*a*. For example, the input unit 110 detects a touch on the table 140*a* by a finger or a hand floating above the table 140*a* with the finger separated. Then, the input unit 110 outputs detected input information to the control unit 120.

(2) Output Unit 130

The output unit 130 according to the present example has a function as a display unit that displays an image. For example, as illustrated in FIGS. 1 to 4, the output unit 130 is realized by the projector projecting an image from the upper or lower side of the table 140*a* to the table 140*a*, a touch panel type display, or a flat panel type display. Additionally, the output unit 130 may have a function as a sound output unit such as a speaker.

(3) Detection Unit

Finger Detection Function

The detection unit 121 according to the present example has a function of detecting a finger of the user based on the input information output from the input unit 110. The detection unit 121 has a manipulable number detection function and a finger detection function.

Manipulable Number Decision Function

The detection unit 121 has a function of deciding a manipulable number. Hereinafter, a process of deciding a manipulable number by the detection unit 121 will be described in detail.

The detection unit 121 first decides a system recognition limit number N. The system recognition limit number means an upper limit number which can be recognized by the information processing system 100 and corresponds to the above-described computational recognizable upper limit. For example, the detection unit 121 may dynamically calculate the system recognition limit number N from a processing load of an application which is being used and may decide the system recognition limit number N as a fixed value from hardware requisites of the system.

Subsequently, the detection unit 121 decides a manipulation limit number M for each application. Here, $M \leq N$ is set. The detection unit 121 may decide M according to content of the application. For example, the detection 121 sets M=2 in a hockey game and sets M=4 in a mah-jong. The detection unit 121 may set M=N.

Next, the detection unit 121 decides a surplus number P. Normally, the detection unit 121 sets P=1. Additionally, the detection unit 121 may set any number satisfying $N>P>=N-M$.

Then, the detection unit 121 decides a manipulable number to (M−P). The manipulable number corresponding to the above-described recognizable upper limit based on specification. Since the manipulable number is smaller than at least the system recognition limit number because of the surplus number, the information processing system 100 can feed back the fact that a finger for which the manipulable number is exceeded is not recognizable.

Finger Detection Function

The detection unit 121 detects a finger of the user by classifying fingers into two types of fingers, fingers having a manipulation authority and fingers having no manipulation authority. The detection unit 121 detects fingers detected until arrival of the manipulable number as the fingers having the manipulation authority. The detection unit 121 detects fingers detected after arrival of the manipulable number as the fingers having no manipulation authority.

When a finger having the manipulation authority continues to touch the table 140*a*, the detection unit 121 continues to give the manipulation authority to the finger. Conversely, when the finger having the manipulation authority stops touching the table 140*a* and stops the manipulation, the manipulation authority is lost and the manipulation authority transitions to another finger. However, even when a finger having the manipulation authority stops touching the table 140*a* and a manipulation stops, the detection unit 121 continues to give the manipulation authority to the finger when a manipulation is expected to be executed again. Hereinafter, an example in which a manipulation is expected to be executed again will be described specifically with reference to FIGS. 299 and 300.

FIG. 299 is an explanatory diagram illustrating an example of a user interface according to the present example. The example illustrated in FIG. 299 shows a state in which the user separates his or her finger having the manipulation authority distantly from a touch point 4401. For example, within a predetermined time after the finger having the manipulation authority stops touching the touch point 4401, the detection unit 121 considers that the finger continues to be present in a nearby area 4402 with any breadth in which the manipulated touch point 4401 is a starting point. The detection unit 121 suspends the manipulation authority until the predetermined time passes and gives the suspended manipulation authority to a finger touching the nearby area 4402. Conversely, after the predetermined time passes, the detection unit 121 opens the manipulation authority and gives, for example, another finger, the manipulation authority. Even before the predetermined passes, the detection unit 121 does not give the suspended manipulation authority to a finger touching a portion outside the nearby area 4402. By suspending the manipulation authority in this way, for example, the user can interrupt a manipulation, pick up an object falling below the table 140*a*, and resume the manipulation from the same location.

FIG. 300 is an explanatory diagram illustrating an example of a user interface according to the present example. The example illustrated in FIG. 300 shows a state in which the user separates his or her finger having the manipulation authority from a touch point 4403, but a hand is put on the table 140*a*. For example, when the finger having the manipulation authority stops a touch but a shape 4404 of the hand is continuously detected in accordance with depth information or the like, the detection unit 121 considers that the hand has the manipulation authority. Accordingly, for example, when the user views a moving image or the like on the screen with his or her hand detached after a manipulation, the manipulation can resume with the hand.

The manipulation authority can be given not only to a finger executing a touch and starting a manipulation but also a finger expected to start a manipulation. Hereinafter, an example in which start of a manipulation is executed will be described specifically with reference to FIG. 301.

FIG. 301 is an explanatory diagram illustrating an example of a user interface according to the present example. The example illustrated in FIG. 301 shows a state in which the user is holding out his or her finger above the table 140*a* but does not executes a manipulation. For example, when a touch is not detected and a finger is detected in accordance with depth information or the like, the detection unit 121 gives the finger the manipulation authority. Accordingly, for example, when the user is holding out his or her finger but hesitates and does not instantly execute a manipulation, the manipulation can be executed with the finger.

(4) Output Control Unit 122

The output control unit 122 according to the present example has a function of controlling the output unit 130 such that whether a manipulation is possible is fed back to the user. For example, when a manipulation by a finger having the manipulation authority is detected, the output control unit 122 executes feedback indicating that a manipulation is possible. Conversely, when a manipulation by a finger having no manipulation authority is detected and, for example, when fingers exceeding the manipulable number are newly detected, the output control unit 122 executes feedback indicating that the manipulation is not possible. Even when the number of fingers exceeds the manipulable number (M-P), the output control unit 122 can detect up to the system recognition limit number N. Therefore, the output control unit 122 can feed back a warning indicating that a manipulation is not possible to fingers until the number of fingers reaches N.

Various conditions in which the output control unit 122 feeds back the warning are considered. For example, when fingers having no manipulation authority are detected a predetermined number of times or more or fingers having no manipulation authority are continuously detected for a predetermined period or more, the output control unit 122 may feed back the warning. The output control unit 122 may combine a plurality of feedbacks or may set a different condition for each feedback. For example, the output control unit 122 may execute feedback indicating that the color of a pointer meaning drag start from an instant at which a finger is detected for the first time and may start feedback indicating that a beep sound emanates after 5 seconds from the instant.

Hereinafter, variations of the feedback by the output control unit 122 will be described with reference to FIGS. 302 to 315. FIG. 302 to FIG. 315 are explanatory diagrams illustrating an example of a user interface according to the present example. FIGS. 302 to 312 illustrate feedback A indicating that a manipulation is possible and feedback B indicating that a manipulation is not possible.

In the example illustrated in FIG. 302, marks with different hues are displayed in input spots (finger tips or touch points) when a manipulation is possible and is not possible.

In the examples illustrated in FIGS. 303 to 305, marks with different shapes are displayed in input spots when a manipulation is possible and is not possible. For example, in the example illustrated in FIG. 303, a mark with a sign x expressing that a manipulation is not possible is displayed when the manipulation is not possible. In the example illustrated in FIG. 304, a character with a hand sign x expressing that a manipulation is not possible is displayed when the manipulation is not possible. In the example illustrated in FIG. 305, a mark surrounding a hand to express that a manipulation is not possible even when the hand moves outside an enclosure is displayed when the manipulation is not possible.

In the examples illustrated in FIGS. 306 and 307, the marks are displayed in different locations when a manipulation is possible and is not possible. For example, in the example illustrated in FIG. 306, a mark is displayed in an input spot when a manipulation is possible, and a mark is displayed on the back of a hand when a manipulation is not possible. In the example illustrated in FIG. 307, a mark showing that a finger is cut is displayed when a manipulation is not possible.

In the examples illustrated in FIGS. 308 to 310, static marks are displayed when a manipulation is possible, and dynamically changing marks are displayed when a manipulation is not possible. For example, in the example illustrated in FIG. 308, when a manipulation is not possible, the similar mark as the mark when a manipulation is possible is temporarily displayed, but an effect of diffusing the mark is displayed. Accordingly, the user can know that the user has no manipulation authority. In the example illustrated in FIG. 309, an effect of moving a mark back gradually from the finger tip is displayed when a manipulation is not possible. In the example illustrated in FIG. 310, an effect of holding back a finger is displayed when a manipulation is not possible. In the examples illustrated in FIGS. 309 and 310, the user is prompted to holding back his or her finger naturally.

In the example illustrated in FIG. 311, a reaction of a manipulation on a display object is differently displayed when a manipulation is possible and a manipulation is not possible. The display object refers to, for example, a manipulable object such as an application window, a menu icon, or an activation icon. For example, when a manipulation is possible, the hue of the touched display object is not changed. Conversely, when a manipulation is not possible, the hue of the touched display object is diluted to express that the manipulation is not possible.

In the example illustrated in FIG. 312, a message indicating that a manipulation is not possible is displayed when the manipulation is not possible. In this example, "Maximum number of people capable of carrying out manipulation is exceeded" is displayed as an example of the message.

In the example illustrated in FIG. 313, different manipulation objects are displayed in a game when a manipulation is possible and is not possible. For example, a fighter icon is displayed at the tip of a finger having the manipulation authority, and thus the user can participate in the game by manipulating a fighter. On the other hand, a flag icon is displayed at the tip of a finger having no manipulation authority, and thus the user can merely wave a flag for cheering.

In the example illustrated in FIG. 314, the number of consumption and the number of rests of the manipulation authority are displayed on the table 140*a*. For example, in the example illustrated in FIG. 314A, since the number of fingers having the manipulation authority is 2, the fact that the number of consumptions of the manipulation authority is 2 and the number of rests is 1 is displayed. In the example illustrated in FIG. 314B, since the number of fingers having the manipulation authority is 3, the fact that the number of consumptions of the manipulation authority is 3 and the number of rests is 0 is displayed. In the example illustrated in FIG. 314C, the number of fingers having the manipulation authority is 3 and the number of fingers having no manipulation authority is 2. Therefore, in the example illustrated in FIG. 314C, the fact that the number of consumptions of the manipulation authority is 3 and the number of rests is 0 is displayed and marks with different hues are displayed between the fingers having the manipulation authority and the fingers having no manipulation authority.

In the example illustrated in FIG. 315, different sounds are output when a manipulation is possible and is not possible. For example, no sound may be output when a manipulation is possible. A sound may be output when a manipulation is not possible. In this case, for example, a negative beep sound or a speech "The number of people is over" can be output. The output control unit 122 may output such a sound from a speaker provided in a location close to the user for which a manipulation is not possible.

The example of the characteristic configuration of the information processing system 100 according to the present example has been described above. Next, an operation process of the information processing system 100 according to the present example will be described with reference to FIGS. 316 and 317.

(Operation Process)

FIG. 316 is a flowchart illustrating an example of the flow of a display control process executed in the information processing system 100 according to the present example. FIG. 316 illustrates an example of the flow of a preliminary process of deciding the manipulable number.

As illustrated in FIG. 316, in step S4402, the detection unit 121 first decides the system recognition limit number N.

Subsequently, in step S4404, the detection unit 121 decides the manipulation limit number M.

Subsequently, in step S4406, the detection unit 121 decides the surplus number P.

Then, in step S4408, the detection unit 121 decides the manipulable number (M−P).

The preliminary process of deciding the manipulable number has been described above.

FIG. 317 is a flowchart illustrating an example of the flow of the display control process executed in the information processing system 100 according to the present example. FIG. 317 illustrates an example of the flow of a process of detecting a finger for each frame when the information processing system 100 detects a user manipulation. The process illustrated in FIG. 317 is repeated when a frame is switched and data of a new finger recognition processing target is obtained.

As illustrated in FIG. 317, in step S4412, the detection unit 121 first acquires finger recognition processing target data. For example, the detection unit 121 acquires input information output from the input unit 110.

Subsequently, in step S4414, the detection unit 121 executes a finger recognition process on fingers having the manipulation authority in a previous frames. At this time, the detection unit 121 detects the fingers having the manipulation authority, including not only fingers for which a touch manipulation is detected but also fingers for which the touch manipulation described above with reference to FIGS. 299 to 301 is not detected. The detection unit 121 may combine and use the detection technologies described above with reference to FIGS. 299 to 301. In this way, the detection unit 121 preferentially gives the manipulation authority to the finger having the manipulation authority in the previous frame by setting the finger having the manipulation authority in the previous frame as a finger recognition target in the first place.

Next, in step S4416, the detection unit 121 determines whether the number of recognized fingers reaches the system recognition limit number N.

When the number of recognized fingers reaches the recognition limit number N (YES in S4416), the process ends.

Conversely, when the number of recognized fingers does not reach the recognition limit number N (NO in S4416), the detection unit 121 executes the finger recognition process on the fingers having no manipulation authority in the previous frames. Accordingly, the detection unit 121 recognizes a newly appearing finger from a current frame.

When the new finger is not recognized (NO in S4420), the process ends.

Conversely, when the new finger is recognized (YES in S4420), the detection unit 121 determines in step S4422 whether the newly recognized finger falls in the manipulable number.

When it is determined that the newly recognized finger does not fall in the manipulable number (NO in step S4422), the output control unit 122 executes feedback indicating the manipulation is not possible in step S4424. The output control unit 122 may combine the feedback examples illustrated in FIGS. 302 to 315 or may execute any other feedback.

Conversely, when it is determined that the newly recognized finger falls in the manipulable number (YES in step S4422), the detection unit 121 determines whether a manipulation by the recognized finger is an effective manipulation in step S4426.

When the detection unit 121 determines that the manipulation is the effective manipulation (YES in S4426), the detection unit 121 issues a manipulation event in step S4428. At this time, for example, the detection unit 121 gives the manipulation authority to the newly recognized finger. When it is determined that the manipulation is not the effective manipulation (NO in S4426), the manipulation event is not issued. Even when the manipulation event is not issued, the detection unit 121 may give the manipulation authority to the newly recognized finger.

Subsequently, in step S4430, the detection unit 121 determines whether the finger recognition process is executed up to the final target data. For example, the detection unit 121 executes the determination depending on whether a region is not an unscanned region in the finger recognition process in step S4418.

When it is determined that the finger recognition process is not executed up to the final target data (NO in S4430), the process returns to step S4416 again. Conversely, it is determined that the finger recognition process is executed up to the final target data (YES in S4430), the process in the current frame ends.

The operation process of the information processing system 100 according to the present example has been described above.

3. HARDWARE CONFIGURATION EXAMPLE

Next, a hardware configuration of the information processing system 100 according to an embodiment of the present disclosure will be described with reference to FIG. 318. FIG. 318 is a block diagram illustrating a hardware configuration example of the information processing system 100 according to the embodiment of the present disclosure.

As illustrated in FIG. 318, the information processing system 100 includes a CPU (Central Processing Unit) 901, a ROM (Read Only Memory) 903, and a RAM (Random Access Memory) 905. In addition, the information processing system 100 may include a host bus 907, a bridge 909, an external bus 911, an interface 913, an input device 915, an output device 917, a storage device 919, a drive 921, a connection port 923, and a communication device 925. Further, the information processing system 100 may include an imaging device 933 and a sensor 935 as necessary. The information processing a system 100 may include a processing circuit such as a DSP (Digital Signal Processor) or ASIC (Application Specific Integrated Circuit), alternatively or in addition to the CPU 901.

The CPU 901 serves as an operation processor and a control device, and controls all or some operations in the information processing system 100 in accordance with various programs recorded in the ROM 903, the RAM 905, the storage device 919 or a removable recording medium 927. The ROM 903 stores programs and operation parameters which are used by the CPU 901. The RAM 905 temporarily stores program which are used in the execution of the CPU 901 and parameters which are appropriately modified in the execution. The CPU 901, ROM 903, and RAM 905 are connected to each other by the host bus 907 configured to include an internal bus such as a CPU bus. In addition, the host bus 907 is connected to the external bus 911 such as a PCI (Peripheral Component Interconnect/Interface) bus via the bridge 909.

The input device 915 is a device which is operated by a user, such as a mouse, a keyboard, a touch panel, buttons, switches and a lever. The input device 915 may include a mic that detects a sound of a user. The input device 915 may be, for example, a remote control unit using infrared light or other radio waves, or may be an external connection device 929 such as a portable phone operable in response to the operation of the information processing system 100. Furthermore, the input device 915 includes an input control circuit which generates an input signal on the basis of the information which is input by a user and outputs the input signal to the CPU 901. By operating the input device 915, a user can input various types of data to the information processing system 100 or issue instructions for causing the information processing system 100 to perform a processing operation. The imaging device 933 to be described below can function as an input device by imaging a motion or the like of a hand of the user.

The output device 917 includes a device capable of visually or audibly notifying the user of acquired information. The output device 917 may include a display device such as an LCD (Liquid Crystal Display), a PDP (Plasma Display Panel), an organic EL (Electro-Luminescence) displays, and a projector, a hologram display device, an audio output device such as, a speaker or a headphone, and a peripheral device such as a printer. The output device 917 may output the results obtained from the process of the information processing system 100 in a form of a video such as text or an image, and an audio such as voice or sound. The output device 917 may include a light or the like to bright surroundings.

The storage device 919 is a device for data storage which is configured as an example of a storage unit of the information processing system 100. The storage device 919 includes, for example, a magnetic storage device such as a HDD (Hard Disk Drive), a semiconductor storage device, an optical storage device, or a magneto-optical storage device. The storage device 919 stores programs to be executed by the CPU 901, various data, and data obtained from the outside.

The drive 921 is a reader/writer for the removable recording medium 927 such as a magnetic disk, an optical disk, a magneto-optical disk, or a semiconductor memory, and is embedded in the information processing system 100 or attached externally thereto. The drive 921 reads information recorded in the removable recording medium 927 attached thereto, and outputs the read information to the RAM 905. Further, the drive 921 writes in the removable recording medium 927 attached thereto.

The connection port 923 is a port used to directly connect devices to the information processing system 100. The connection port 923 may include a USB (Universal Serial Bus) port, an IEEE1394 port, and a SCSI (Small Computer System Interface) port. The connection port 923 may further include an RS-232C port, an optical audio terminal, an HDMI (High-Definition Multimedia Interface) port, and so on. The connection of the external connection device 929 to the connection port 923 makes it possible to exchange various data between the information processing system 100 and the external connection device 929.

The communication device 925 is, for example, a communication interface including a communication device or the like for connection to a communication network 931. The communication device 925 may be, for example, a communication card for a wired or wireless LAN (Local Area Network), Bluetooth (registered trademark), WUSB (Wireless USB) or the like. In addition, the communication device 925 may be a router for optical communication, a router for ADSL (Asymmetric Digital Subscriber Line), a modem for various kinds of communications, or the like. The communication device 925 can transmit and receive signals to and from, for example, the Internet or other communication devices based on a predetermined protocol such as TCP/IP. In addition, the communication network 931 connected to the communication device 925 may be a network or the like connected in a wired or wireless manner, and may be, for example, the Internet, a home LAN, infrared communication, radio wave communication, satellite communication, or the like.

The imaging device 933 is a device that generates an image by imaging a real space using an image sensor such as a charge-coupled device (CCD) or a complementary metal-oxide-semiconductor (CMOS) sensor, as well as various members such as one or more lenses for controlling the formation of a subject image on the image sensor, for example. The imaging device 933 may be a device that takes still images, and may also be a device that takes moving images.

The sensor 935 is any of various sensors such as an acceleration sensor, a gyro sensor, a geomagnetic sensor, an optical sensor, or a sound sensor, for example. The sensor 935 acquires information regarding the state of the information processing system 100, such as the orientation of the case of the information processing system 100, as well as information regarding the environment surrounding the information processing system 100, such as the brightness or noise surrounding the information processing system 100, for example. The sensor 935 may also include a Global Positioning System (GPS) sensor that receives GPS signals and measures the latitude, longitude, and altitude of the apparatus.

The foregoing thus illustrates an exemplary hardware configuration of the information processing system 100. Each of the above components may be realized using general-purpose members, but may also be realized in hardware specialized in the function of each component. Such a configuration may also be modified as appropriate according to the technological level at the time of the implementation.

4. CONCLUSION

According to an embodiment of the present disclosure, as described above, there is provided the information processing system 100 capable of displaying information more appropriately and efficiently according to an environment in which information is displayed or a situation of displayed information.

Steps in processes executed by devices in this specification are not necessarily executed chronologically in the order described in a sequence chart or a flow chart. For example, steps in processes executed by devices may be executed in a different order from the order described in a flow chart or may be executed in parallel.

Further, a computer program can be created which causes hardware such as a CPU, ROM, or RAM, incorporated in each of the devices, to function in a manner similar to that of structures in the above-described devices. Furthermore, it is possible to provide a recording medium having the computer program recorded thereon. Moreover, by configuring respective functional blocks shown in a functional block diagram as hardware, the hardware can achieve a series of processes.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Note that software that realizes a user interface or an application shown in the above-described embodiments may be realized as a web application that is used via a network such as the Internet. Such a web application may be realized with a markup language, for example, HyperText Markup Language (HTML), Standard Generalized Markup Language (SGML), Extensible Markup Language (XML), or the like.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A display control device including:

a display control unit configured to decide a display region of a display object to be displayed on a display surface according to information regarding a real object on the display surface.

(2)

The display control device according to (1), wherein the information regarding the real object includes attribute information regarding the real object.

(3)

The display control device according to (2), wherein the attribute information includes information regarding difficulty in moving the real object.

(4)

The display control device according to (2) or (3), wherein the attribute information includes information regarding a relation with the display object.

(5)

The display control device according to any one of (1) to (4), wherein the display control unit decides the display region of the display object from at least one of a position, a size, and an angle.

(6)

The display control device according to any one of (1) to (5), wherein the display control unit decides the display region of the display object so that the display region does not overlap the real object.

(7)

The display control device according to any one of (1) to (6), wherein the display control unit decides the display region using an evaluation function of evaluating a candidate of the display region of the display object.

(8)

The display control device according to (7), wherein the display control unit sets a parameter of the evaluation function according to a user manipulation.

(9)

The display control device according to any one of (1) to (8), wherein the display control unit decides the display region of the display object further according to information regarding another display object already displayed on the display surface.

(10)

The display control device according to (9), wherein the display control unit decides the display region of the display object in front of the other display object.

(11)

The display control device according to (9) or (10), wherein the display control unit decides the display region of the display object so that the display region does not overlap a display region of the other display object.

(12)

The display control device according to any one of (9) to (11), wherein the display control unit changes a display region of the other display object so that the display region does not overlap the display region of the display object.

(13)

The display control device according to any one of (9) to (12), wherein the information regarding the other display object includes information regarding a relation with the display object.

(14)

The display control device according to any one of (1) to (13), wherein the display control unit decides the display region of the display object further according to information regarding a user to whom the display object is to be displayed.

(15)

The display control device according to (14), wherein the information regarding the user includes information indicating at least one of a position and a direction of the user.

(16)

A display control method including:

deciding, by a processor, a display region of a display object to be displayed on a display surface according to information regarding a real object on the display surface.

(17)

A program causing a computer to function as:

a display control unit configured to decide a display region of a display object to be displayed on a display surface according to information regarding a real object on the display surface.

100 information processing system
110 input unit
120 control unit
130 output unit

The invention claimed is:

1. A display control device comprising:

circuitry configured to detect information regarding a real object on a display surface, information regarding a first display object displayed on the display surface prior to display of a second display object, and information regarding a user with respect to the display surface, decide a position, a size, and an angle of a display region of the second display object to be newly displayed on the display surface according to the detected information regarding the real object on the display surface, the detected information regarding the first display object which is already displayed on the display surface, and the detected information regarding the user to whom the second display object is to be displayed, and initiate display, on the display surface, of the second display object to be newly displayed in the display region having the decided position, size, and angle according to a touch of the user on the display surface, wherein the detected information regarding the real object includes a position of the real object on the display surface and attribute information regarding the real object, wherein the detected information regarding the first display object includes a position of a display region of the first display object and a relation between the first display object and the second display object, wherein the detected information regarding the user indicates a position and a direction of the user with respect to the display surface, wherein the direction of the user is determined according to a determined angle of at least one detected body part of the user performing the touch with respect to the display surface, wherein the decided angle of the display region of the second display object is based on the determined angle of the at least one detected body part of the user performing the touch with respect to the display surface, and wherein when the circuitry initiates display of the newly displayed second display object following the touch of the user on the display surface, at least a portion of the display region of the second display object overlaps the display region of the first display object before the position of the display region of the first display object is changed so that there is no overlap with the display region of the second display object.

2. The display control device according to claim 1, wherein the attribute information regarding the real object includes information regarding difficulty in moving the real object.

3. The display control device according to claim 2, wherein the difficulty in moving the real object is determined based on at least one of a movement history, a weight, and a size of the real object.

4. The display control device according to claim 1, wherein the attribute information regarding the real object includes information regarding a relation between the real object and at least one of the first display object or the second display object.

5. The display control device according to claim 1, wherein the circuitry is further configured to decide the display region using an evaluation function of evaluating a plurality of candidates of the display region of the second display object.

6. The display control device according to claim 5, wherein the circuitry is further configured to set a parameter of the evaluation function according to a user manipulation.

7. The display control device according to claim 1, wherein the circuitry is further configured to recognize the position of the user based on the at least one detected body part of the user.

8. The display control device according to claim 1, wherein the circuitry is further configured to recognize the position of the user based on collated images of a detected arm of the user, each of the collated images indicating a direction of the arm of the user with respect to the display surface.

9. The display control device according to claim 1, wherein the circuitry is further configured to estimate the angle of the at least one detected body part of the user performing the touch with respect to the display surface based on a captured image of an imaging region including the at least one detected body part of the user and the display surface.

10. The display control device according to claim 1, wherein the second display object comprises screen content of a first application displayed and the first display object comprises screen content of a second application.

11. The display control device according to claim 1, wherein the circuitry detects information regarding a plurality of display objects including the first display object already displayed on the display surface when the display of the second display object is initiated, and wherein a position of each display region of the plurality of display objects already displayed on the display surface is changed so that there is no overlap between any display region of the plurality of display objects and the second display object.

12. The display control device according to claim 1, wherein the circuitry initiates the display of the second display object to be newly displayed immediately following the touch of the user on the display surface.

13. A display control method, implemented via at least one processor, the method comprising:

detecting information regarding a real object on a display surface, information regarding a first display object displayed on the display surface prior to display of a second display object, and information regarding a user with respect to the display surface;

deciding a position, a size, and an angle of a display region of the second display object to be newly displayed on the display surface according to the detected information regarding the real object on the display surface, the detected information regarding the first display object which is already displayed on the display surface, and the detected information regarding the user to whom the second display object is to be displayed, and displaying, on the display surface, the second display object to be newly displayed in the display region having the decided position, size, and angle according to a touch of the user on the display surface, wherein the detected information regarding the real object includes a position of the real object on the display surface and attribute information regarding the real object, wherein the detected information regarding the first display object includes a position of a display region of the first display object and a relation between the first display object and the second display object, wherein the detected information regarding the user indicates a position and a direction of the user with respect to the display surface, wherein the direction of the user is determined according to a determined angle of at least one detected body part of the user performing the touch with respect to the display surface, wherein the decided angle of the display region of the second display object is based on the determined angle of the at least one detected body part of the user performing the touch with respect to the display surface, and wherein when the second display object is newly displayed following the touch of the user on the display surface, at least a portion of the display region of the second display object overlaps the display region of the first display object before the position of the display region of the first display object is changed so that there is no overlap with the display region of the second display object.

14. A non-transitory computer-readable medium having embodied thereon a program, which when executed by a computer, causes the computer to execute a method, the method comprising:

detecting information regarding a real object on a display surface, information regarding a first display object displayed on the display surface prior to display of a second display object, and information regarding a user with respect to the display surface;

deciding a position, a size, and an angle of a display region of the second display object to be newly displayed on the display surface according to the detected information regarding the real object on the display surface, the detected information regarding the first display object which is already displayed on the display surface, and the detected information regarding the user to whom the second display object is to be displayed, and displaying, on the display surface, the second display object to be newly displayed in the display region having the decided position, size, and angle according to a touch of the user on the display surface, wherein the detected information regarding the real object includes a position of the real object on the display surface and attribute information regarding the real object, wherein the detected information regarding the first display object indicates a position of a display region of the first display object and a relation between the first display object and the second display object, wherein the detected information regarding the user includes information indicating a position and a direction of the user with respect to the display surface, wherein the direction of the user is determined according to a determined angle of at least one detected body part of the user performing the touch with respect to the display surface, wherein the decided angle of the display region of the second display object is based on the determined angle of the at least one detected body part of the user performing the touch with respect to the display surface, and wherein when the second display object is newly displayed following the touch of the user on the display surface, at least a portion of the display region of the second display object overlaps the display region of the first display object before the position of the display region of the first display object is changed so that there is no overlap with the display region of the second display object.

* * * * *